US010852942B2

(12) United States Patent
Seo et al.

(10) Patent No.: US 10,852,942 B2
(45) Date of Patent: *Dec. 1, 2020

(54) PORTABLE DEVICE COMPRISING A TOUCH-SCREEN DISPLAY, AND METHOD FOR CONTROLLING SAME

(71) Applicant: SAMSUNG ELECTRONICS CO., LTD., Suwon-si (KR)

(72) Inventors: Joon-kyu Seo, Seongnam-si (KR); Kyung-a Kang, Seoul (KR); Ji-yeon Kwak, Seoul (KR); Hyun-Jin Kim, Seoul (KR); Hyun-Jung Song, Seoul (KR); Sung-Sik Yoo, Yongin-si (KR); Ju-youn Lee, Seongnam-si (KR); Dong-Seok Ryu, Seoul (KR); Min-Kyu Park, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/834,705

(22) Filed: Mar. 30, 2020

(65) Prior Publication Data
US 2020/0225846 A1 Jul. 16, 2020

Related U.S. Application Data

(63) Continuation of application No. 16/741,377, filed on Jan. 13, 2020, now Pat. No. 10,642,485, which is a
(Continued)

(51) Int. Cl.
G06F 3/041 (2006.01)
G06F 3/0488 (2013.01)
(Continued)

(52) U.S. Cl.
CPC ........ *G06F 3/04883* (2013.01); *G06F 1/1616* (2013.01); *G06F 1/1641* (2013.01);
(Continued)

(58) Field of Classification Search
CPC .. G06F 3/0416; G06F 3/04817; G06F 3/0484; G06F 3/0485; G06F 3/0486;
(Continued)

(56) References Cited

U.S. PATENT DOCUMENTS 6,392,877 B1 5/2002 Iredale
6,396,506 B1 5/2002 Hoshino et al.
(Continued)

FOREIGN PATENT DOCUMENTS

CN 1573648 A 2/2005
CN 100407094 A 7/2008
(Continued)

OTHER PUBLICATIONS

Communication dated Aug. 25, 2016, issued by the European Patent Office in counterpart European Application No. 12745181.3.
(Continued)

*Primary Examiner* — Vijay Shankar
(74) *Attorney, Agent, or Firm* — Sughrue Mion, PLLC

(57) ABSTRACT

A controlling a portable device comprising a first touch screen and a second touch screen is provided. The method includes displaying first information related to a first application on the first touch screen and displaying second information related to the first application on the second touch screen; receiving a first user input moving to the first touch screen on the second touch screen; and replacing the first information and the second information with a third information and a fourth information related to the first application on the first touch screen and the second touch screen, in response to receiving the first user input, wherein
(Continued)

each of the third information and the fourth information is displayed while being slidden in direction from the second touch screen to the first touch screen and the third information is displayed over a boundary between the first touch screen and the second screen during the sliding of the third information and the fourth information.

32 Claims, 227 Drawing Sheets

Related U.S. Application Data continuation of application No. 16/414,476, filed on May 16, 2019, now Pat. No. 10,534,531, which is a continuation of application No. 15/344,665, filed on Nov. 7, 2016, now Pat. No. 10,459,625, which is a continuation of application No. 14/790,496, filed on Jul. 2, 2015, now Pat. No. 9,489,079, which is a continuation of application No. 13/984,805, filed as application No. PCT/KR2012/000888 on Feb. 7, 2012, now Pat. No. 9,489,078.

(60) Provisional application No. 61/441,491, filed on Feb. 10, 2011.

(51) Int. Cl.
| | | |
|---|---|---|
| *G06F 1/16* | (2006.01) | |
| *H04M 1/725* | (2006.01) | |
| *G06F 3/0481* | (2013.01) | |
| *G06F 3/0484* | (2013.01) | |
| *G06F 3/0485* | (2013.01) | |
| *G06F 3/0486* | (2013.01) | |
| *G06F 3/14* | (2006.01) | |
| *G09G 5/14* | (2006.01) | |
| *H04M 1/02* | (2006.01) | |
| *G06F 3/0482* | (2013.01) | |

(52) U.S. Cl.
CPC .......... *G06F 1/1643* (2013.01); *G06F 1/1647* (2013.01); *G06F 1/1652* (2013.01); *G06F 3/041* (2013.01); *G06F 3/0416* (2013.01); *G06F 3/0484* (2013.01); *G06F 3/0485* (2013.01); *G06F 3/0486* (2013.01); *G06F 3/0488* (2013.01); *G06F 3/04817* (2013.01); *G06F 3/04842* (2013.01); *G06F 3/04845* (2013.01); *G06F 3/04847* (2013.01); *G06F 3/1431* (2013.01); *G06F 3/1438* (2013.01); *G09G 5/14* (2013.01); *H04M 1/0214* (2013.01); *H04M 1/0241* (2013.01); *H04M 1/72519* (2013.01); *G06F 3/0482* (2013.01); *G06F 3/04886* (2013.01); *G06F 2203/04102* (2013.01); *G06F 2203/04806* (2013.01); *G09G 2380/14* (2013.01)

(58) Field of Classification Search
CPC ............... G06F 3/0488; G06F 3/04842; G06F 3/04845; G06F 3/04847; G06F 3/04883; G06F 3/1438; G06F 2203/04806; G06F 2203/04102

See application file for complete search history.

(56) References Cited

U.S. PATENT DOCUMENTS

| | | | |
|---|---|---|---|
| 6,464,195 B1 | 10/2002 | Hildebrandt | |
| 6,941,160 B2 | 9/2005 | Otsuka et al. | |
| 9,158,494 B2 | 10/2015 | Sirpal et al. | |
| 9,489,078 B2 | 11/2016 | Seo et al. | |
| 9,489,079 B2 | 11/2016 | Seo et al. | |
| 10,261,615 B2 | 4/2019 | Lee et al. | |
| 10,459,625 B2 | 10/2019 | Seo et al. | |
| 10,534,531 B2 | 1/2020 | Seo et al. | |
| 10,642,485 B1* | 5/2020 | Seo et al. ............ G06F 3/04883 |
| 2002/0033795 A1 | 3/2002 | Shahoian et al. | |
| 2003/0008689 A1 | 1/2003 | Uda | |
| 2004/0244146 A1 | 12/2004 | Park | |
| 2005/0164745 A1 | 7/2005 | Oe et al. | |
| 2006/0264243 A1 | 11/2006 | Aarras | |
| 2008/0168379 A1 | 7/2008 | Forstall et al. | |
| 2009/0228820 A1 | 9/2009 | Kim et al. | |
| 2009/0249235 A1 | 10/2009 | Kim et al. | |
| 2010/0066643 A1 | 3/2010 | King et al. | |
| 2010/0085274 A1 | 4/2010 | Kilpatrick, II et al. | |
| 2010/0182265 A1 | 7/2010 | Kim et al. | |
| 2010/0188352 A1 | 7/2010 | Ikeda | |
| 2010/0251152 A1 | 9/2010 | Cho et al. | |
| 2010/0262928 A1 | 10/2010 | Abbott | |
| 2010/0295802 A1 | 11/2010 | Lee | |
| 2010/0298032 A1 | 11/2010 | Lee et al. | |
| 2010/0298033 A1 | 11/2010 | Lee | |
| 2010/0299598 A1 | 11/2010 | Shin et al. | |
| 2010/0302179 A1 | 12/2010 | Ahn et al. | |
| 2010/0309158 A1 | 12/2010 | Iwayama et al. | |
| 2010/0328860 A1 | 12/2010 | Kim et al. | |
| 2011/0006971 A1 | 1/2011 | Ebey et al. | |
| 2011/0018821 A1 | 1/2011 | Kii | |
| 2012/0083319 A1 | 4/2012 | Sirpal et al. | |
| 2012/0127109 A1 | 5/2012 | Nishio et al. | |

FOREIGN PATENT DOCUMENTS

| | | |
|---|---|---|
| CN | 101241427 A | 8/2008 |
| CN | 101527745 A | 9/2009 |
| CN | 101697556 A | 4/2010 |
| CN | 101789993 | 7/2010 |
| CN | 101795322 A | 8/2010 |
| CN | 101853124 A | 10/2010 |
| CN | 101893914 A | 11/2010 |
| CN | 101901071 A | 12/2010 |
| CN | 101938538 A | 1/2011 |
| EP | 1 753 239 A2 | 2/2007 |
| EP | 2 207 076 A2 | 7/2010 |
| EP | 2214088 A2 | 8/2010 |
| EP | 2 254 314 A1 | 11/2010 |
| EP | 2254313 A1 | 11/2010 |
| EP | 2 309 369 | 4/2011 |
| JP | 2003-280622 A | 10/2003 |
| JP | 2008-141519 A | 6/2008 |
| JP | 2008-541183 A | 11/2008 |
| JP | 2009-124449 A | 6/2009 |
| JP | 2010-176332 A | 8/2010 |
| JP | 2010250465 A | 11/2010 |
| JP | 2010-286911 A | 12/2010 |
| KR | 1020000064572 A | 11/2000 |
| KR | 10-2005-0037839 A | 4/2005 |
| KR | 100577394 B1 | 5/2006 |
| KR | 10-2006-0086923 A | 8/2006 |
| KR | 10-0887778 B1 | 3/2009 |
| KR | 10-2009-0102108 A | 9/2009 |
| KR | 10-2010-0082451 A | 7/2010 |
| KR | 10-2010-0104562 A | 9/2010 |
| KR | 10-2010-0128781 A | 12/2010 |
| WO | 2010/010835 | 1/2010 |
| WO | 2010/028405 A1 | 3/2010 |
| WO | 2010114007 A1 | 10/2010 |
| WO | 2011/013400 A1 | 2/2011 |

OTHER PUBLICATIONS

Communication dated Aug. 31, 2015 issued by the State Intellectual Property Office of P.R. China in counterpart Chinese Patent Application No. 201280017792.2.
Communication dated Jul. 29, 2016, issued by the Australian Patent Office in counterpart Australian Application No. 2012215303.

(56) References Cited

OTHER PUBLICATIONS

Communication dated Mar. 7, 2016, issued by the Japanese Patent Office in counterpart Japanese Patent Application No. 2013-553351.
International Search Report (PCT/ISA/210) and Written Opinion (PCT/ISA/237) dated Oct. 4, 2012, issued in International Application No. PCT/KR2012/000888.
Notice of Allowance issued in prior U.S. Appl. No. 13/984,805 dated Jun. 26, 2015.
Notice of Allowance issued in prior U.S. Appl. No. 13/984,805 dated Mar. 16, 2015.
Office Action dated Aug. 31, 2015 in Chinese Patent Application No. 201280017792.2, with partial English translation thereof.
Notice of Allowance issued in parent U.S. Appl. No. 14/790,496 dated Dec. 18, 2015.
Second Notice of Allowance issued in parent U.S. Appl. No. 14/790,496 dated Feb. 26, 2016.
Third Notice of Allowance issued in parent U.S. Appl. No. 14/790,496 dated Jun. 21, 2016.
Communication dated Jun. 28, 2017 by the Korean Intellectual Property Office in counterpart Korean Patent Application No. 10-2011-0080024.
Communication dated Nov. 10, 2017, issued by the Korean Intellectual Property Office in counterpart Korean Application No. 10-2012-0012426.
Communication dated Jul. 24, 2018, issued by the Korean Intellectual Property Office in counterpart Korean Application No. 10-2012-0066401.
Communication dated May 31, 2018, issued by the State Intellectual Property Office of P.R. China in counterpart Chinese Patent Application No. 201610169069.6.
Communication dated Sep. 10, 2018, issued by the State Intellectual Property Office of the People's Republic of China in counterpart Chinese Patent Application No. 201610169057.3.
Communication dated Oct. 26, 2018, issued by the State Intellectual Property Office of the People's Republic of China in counterpart Chinese Patent Application No. 201610602742.0.
Communication dated Mar. 13, 2019, issued by the European Patent Office in counterpart European Application No. 12745181.3.
Communication dated Sep. 5, 2019, issued by the Korean Intellectual Property Office in counterpart Korean Application No. 10-2019-0071540.
Communication dated Oct. 16, 2019 issued by the Indian Patent Office in counterpart Indian Application No. 7242/CHENP/2013.
Communication dated Nov. 11, 2019, by the Chinese Patent Office in Application No. 201610169069.6.
European Patent Office, communication dated Mar. 23, 2020 in European Application No. EP 19 19 2184.
Communication dated May 29, 2020, issued by the Korean Intellectual Property Office in counterpart Korean Application No. 10-2019-0071540.
Communication dated Aug. 31, 2020 issued by the European Patent Office in European Application No. EP 20 17 3889.
YouTube, https://www.youtube.com/watch?v=JKXQcChRVGw, "A Closer Look at The Toshiba Libretto W100", Jul. 9, 2010, 2 pages total.
Communication dated Oct. 1, 2020, issued by the European Patent Office in counterpart European Patent Application No. 20173907.5.
Communication dated Oct. 1, 2020, issued by the European Patent Office in counterpart European Patent Application No. 20173924.0.
Communication dated Oct. 1, 2020, issued by the European Patent Office in counterpart European Patent Application No. 20173932.3.
Communication dated Oct. 1, 2020, issued by the European Patent Office in counterpart European Patent Application No. 20173916.6.

\* cited by examiner

PORTABLE DEVICE COMPRISING A TOUCH-SCREEN DISPLAY, AND METHOD FOR CONTROLLING SAME

CROSS-REFERENCE TO RELATED APPLICATIONS

This is a continuation of U.S. application Ser. No. 16/741,377 filed on Jan. 13, 2020, which continuation of U.S. application Ser. No. 16/414,476 filed on May 16, 2019, now U.S. Pat. No. 10,534,531 issued on Jan. 14, 2020, which is a continuation of U.S. application Ser. No. 15/344,665 filed on Nov. 7, 2016, now U.S. Pat. No. 10,459,625 issued on Oct. 29, 2019, which is a continuation of U.S. application Ser. No. 14/790,496 filed Jul. 2, 2015, now U.S. Pat. No. 9,489,079 issued on Nov. 8, 2016, which is a continuation of U.S. application Ser. No. 13/984,805 filed on Aug. 9, 2013, now U.S. Pat. No. 9,489,078 issued on Nov. 8, 2016, which is a National Stage Application of International Application No. PCT/KR2012/000888, filed on Feb. 7, 2012, and which claims priority from U.S. Provisional Application No. 61/441,491, filed on Feb. 10, 2011, the disclosures of which are herein incorporated by reference in their entireties.

BACKGROUND

Field

Methods and apparatuses consistent with exemplary embodiments relate to a portable device, and more particularly, to a portable device displaying a plurality of task screens through a touch screen display and executing an application according to a touch gesture of a user detected on the plurality of task screens, and a method of controlling the same.

Description of Related Art

An electronic device directly controlled by a user includes at least one display device, and the user controls the electronic device through an input device while viewing an operation of an application executed on the display device of the electronic device. Particularly, a portable electronic device (hereinafter, referred to as a portable device) manufactured to be carried by the user is developed to include a display device using a user interface in a form of a touch screen due to a limited size thereof in many cases.

A Graphical User Interface (GUI) used in a touch screen display should provide an optimized form to allow the user to intuitively recognize an operation of a running application and also allow the user to more easily, quickly, and variously control the portable device and the running application. Accordingly, various user interfaces have been developed according to forms of the applied application or display device.

Particularly, as a Central Processor Unit (CPU) and a software technology are developed, the portable device can provide a plurality of task screens displaying one or a plurality of applications. The plurality of task screens may be provided through one or more touch screens which are physically or graphically divided. Accordingly, the portable device providing the plurality of task screens requires a graphic user interface for a touch screen which can allow the user to more intuitively and conveniently use the portable device.

Further, a more advanced portable device can detect a touch gesture, a motion or a pose of the portable device, and a motion or a shape of the user as an input, as well as an input of a hard or soft key. Accordingly, a user interface for allowing the user to more conveniently use the portable device through various inputs is also required.

SUMMARY

One or more exemplary embodiments provide a portable device including a touch screen display and a control method thereof.

One or more exemplary embodiments also provide a portable device including a plurality of touch screen displays providing a plurality of task screens by one or a plurality of applications, and a control method thereof.

One or more exemplary embodiments also provide a portable device which detects a touch gesture of a user from a plurality of connected touch screen displays and displays information in response to the detection, and a control method thereof.

One or more exemplary embodiments also provide a portable device which provides an optimized user interface corresponding to a portrait view mode or a landscape view mode to at least one touch screen display, and a control method thereof.

One or more exemplary embodiments also provide a portable device which provides a plurality of task screens for a plurality of applications or one application to at least one touch screen display, and a control method thereof.

One or more exemplary embodiments also provide a portable device which displays some information on a plurality of applications to be partially hidden in a form of received cards, and expands more detailed information on a corresponding application according to a touch motion of the user and displays the expanded information, and a control method thereof.

One or more exemplary embodiments also provide a portable device which displays maps according to a map application in a first touch screen display and displays at least one image corresponding to a position or path selected by a touch gesture of the user on the maps in a second touch screen display, and a control method thereof.

One or more exemplary embodiments also provide a portable device which displays a task management area listing a shortcut icon of at least one application in a designated position and displays an application selected by a touch gesture of the user in one of a plurality of touch screen displays, and a control method thereof.

One or more exemplary embodiments also provide a portable device which displays positions of a plurality of personal broadcasters in a map of a first touch screen display, lists and displays simple information on the personal broadcasters in a second touch screen display, and makes a request for broadcasting to a desired personal broadcaster in response to a touch gesture of the user, and a control method thereof.

One or more exemplary embodiments also provide a portable device which displays a clipboard in a designated position in response to folding of dual displays connected by a hinge or bending of a flexible display, and a control method thereof.

One or more exemplary embodiments also provide a portable device which sets a bookmark of an e-book displayed in a display, or moves pages and then displays the e-book in response to folding of dual displays connected by a hinge or bending of a flexible display, and a control method thereof.

One or more exemplary embodiments also provide a portable device which provides a video for a video conference to a first touch screen display and displays a document file or a white board shared by participants of the video conference in a second touch screen display, and a control method thereof.

One or more exemplary embodiments also provide a portable device which provides a game interface for a first user to a first touch screen display and displays game information for another user in a second touch screen display, and a control method thereof.

One or more exemplary embodiments also provide a portable device which provides a user interface for a calendar application through a dual touch screen display, and a control method thereof.

One or more exemplary embodiments also provide a portable device which provides a user interface for a call application through a dual touch screen display, and a control method thereof.

One or more exemplary embodiments also provide a portable device which provides a user interface for a camera application through a dual touch screen display, and a control method thereof.

One or more exemplary embodiments also provide a portable device which controls a view mode through a motion of the portable device in a dual touch screen display, and a control method thereof.

One or more exemplary embodiments also provide a portable device for navigating information displayed in two touch screens of a dual touch screen display, and a control method thereof.

One or more exemplary embodiments also provide a portable device for modifying a home screen by using lists displayed in a sub touch screen in a dual touch screen display, and a control method thereof.

One or more exemplary embodiments also provide a portable device for displaying a virtual keypad by using a touch screen located in a lower part in a landscape view mode of a dual touch screen display, and a control method thereof.

In accordance with an aspect of an exemplary embodiment, there is provided a method of controlling a portable device including at least one foldable panel and first and second touch screens arranged on the at least one foldable panel, the method including displaying, on the first touch screen, a first page including at least one of a widget area designated as a home screen and an icon related to at least one application, and a dock area including a call icon of a call application, displaying, on the second touch screen, first information in a state where a first panel of the at least one foldable panel includes the first touch screen, a second panel of the at least one foldable panel includes the second touch screen, and the first panel and second panel are unfolded, detecting a first tap gesture that selects the call icon. The method also includes, in response to a detection of the first tap gesture, replacing the first page and the dock area displayed on the first touch screen with an outgoing call screen provided by the call application by displaying the outgoing call screen on the first touch screen, wherein the outgoing call screen includes at least one of a number display area, a keypad area, a call key, a video call key, and a message sending key, and the second touch screen maintains the first information while the outgoing call screen is displayed on the first touch screen, receiving a phone number input through the keypad area and detecting a second tap gesture from the call key, replacing the outgoing call screen displayed on the first touch screen with a dialing screen by displaying the dialing screen on the first touch screen in response to a detection of the second tap gesture, and displaying, on the second touch screen, a guide message screen indicating to fold the portable device for a call, wherein the dialing screen includes a call participant identification area indicating a counterpart call participant and a function key area providing mid-call functions, replacing the dialing screen displayed on the first touch screen with a mid-call screen by displaying the mid-call screen on the first touch screen in response to the call being connected with the counterpart call participant, and removing the guide message screen displayed on the second touch screen, and displaying the first information, wherein the mid-call screen includes a call participant identification area indicating the counterpart call participant and a function key area providing a call duration time and mid-call functions.

In accordance with an aspect of another exemplary embodiment, there is provided a method of controlling a portable device including a first touch screen and a second touch screen, the method including, displaying first information on the first touch screen and detecting an outgoing call request while second information is displayed on the second touch screen, replacing the first information displayed on the first touch screen with an outgoing call screen by displaying the outgoing call screen in response to the detecting the outgoing call request, wherein the outgoing call screen includes at least one of a number display area displaying a dialed number, a call key, a video call key, and a message sending key, and the second touch screen maintains the second information while the outgoing call screen is displayed on the first touch screen, receiving a phone number input through the keypad area and detecting a first tap gesture from the call key, replacing the outgoing call screen displayed on the first touch screen with a dialing screen by displaying the dialing screen in response to the detecting the first tap gesture, wherein the dialing screen includes a call participant identification area indicating a counterpart call participant corresponding to the input phone number and a function key area providing mid-call functions. The method also includes deactivating the second information displayed on the second touch screen and displaying, on the second touch screen, a guide message indicating to fold the portable device for the call while the outgoing call screen is displayed, replacing the dialing screen on the first touch screen with a mid-call screen by displaying the mid-call screen in response to the call being connected with the counterpart call participant, and removing the guide message displayed on the second touch screen, and displaying the first information, wherein the mid-call screen includes a call participant identification area indicating the counterpart call participant and a function key area providing a call duration time and mid-call functions.

In accordance with an aspect of another exemplary embodiment, a portable device including at least one foldable panel, a first touch screen and a second touch screen arranged on the at least one foldable panel, and at least one processor that is configured to: display, on the first touch screen, a first page including at least one of a widget area designated as a home screen and an icon related to at least one application, and a dock area including a call icon of a call application, display, on the second touch screen, first information in a state where a first panel of the at least one foldable panel includes the first touch screen, a second panel of the at least one foldable panel includes the second touch screen, and the first panel and second panel are unfolded, detect a first tap gesture that selects the call icon, and replace the first page and the dock area displayed on the first touch screen with an outgoing call screen provided by the call application by displaying the outgoing call screen on the first touch screen in response to a detection of the first tap gesture, wherein the outgoing call screen includes at least one of a number display area, a keypad area, a call key, a video call key, and a message sending key, and the second touch screen maintains the first information while the outgoing call screen is displayed in the first touch screen. The processor is also configured to receive a phone number input through the keypad area and detect a second tap gesture from the call key, replace the outgoing call screen displayed on the first touch screen with a dialing screen by displaying the dialing screen on the first touch screen in response to the detection of the second tap gesture, and display, on the second touch screen, a guide message indicating to fold the portable device for a call, wherein the dialing screen includes a call participant identification area indicating a counterpart call participant and a function key area providing mid-call functions, replace the dialing screen displayed on the first touch screen with a mid-call screen by displaying the mid-call screen on the first touch screen in response to the call being connected with the counterpart call participant, and remove the guide message displayed on the second touch screen, and display the first information, wherein the mid-call screen includes a call participant identification area indicating the counterpart call participant and a function key area providing a call duration time and mid-call functions.

In accordance with an aspect of another exemplary embodiment, there is provided a portable device including a first touch screen and a second touch screen, and at least one processor that is configured to display first information on the first touch screen and detect an outgoing call request while second information is displayed on the second touch screen, replace the first information displayed on the first touch screen with an outgoing call screen by displaying the outgoing call screen on the first touch screen in response to the detection of the outgoing call request, wherein the outgoing call screen includes at least one of a number display area displaying a dialed number, a call key, a video call key, and a message sending key, and the second touch screen maintains the second information while the outgoing call screen is displayed on the first touch screen, receive a phone number input through the keypad area and detect a first tap gesture from the call key, and replace the outgoing call screen displayed on the first touch screen with a dialing screen by displaying the dialing screen on the first touch screen in response to the detection of the first tap gesture, and display, on the second touch screen, a guide message indicating to fold the portable device for a call, wherein the dialing screen includes a call participant identification area indicating a counterpart call participant corresponding to the input phone number and a function key area providing mid-call functions. The processor is also configured to replace the dialing screen displayed on the first touch screen with a mid-call screen by displaying the mid-call screen on the first touch screen in response to the call being connected with the counterpart call participant, and remove the guide message on the second touch screen, and displaying the first information, wherein the mid-call screen includes a call participant identification area indicating the counterpart call participant and a function key area providing a call duration time and mid-call functions.

In accordance with an aspect of another exemplary embodiment, there is provided a non-transitory computer-readable medium storing a program executable by a computer to perform a method of controlling a portable device including at least one foldable panel and first and second touch screens arranged on the at least one foldable panel, the method including, displaying, on the first touch screen, a first page including at least one of a widget area designated as a home screen and an icon related to at least one application, and a dock area including a call icon of a call application, displaying, on the second touch screen, first information in a state where a first panel of the at least one foldable panel includes the first touch screen, a second panel of the at least one foldable panel includes the second touch screen, and the first panel and second panel are unfolded, detecting a first tap gesture that selects the call icon, and replacing the first page and the dock area displayed on the first touch screen with an outgoing call screen provided by the call application by displaying the outgoing call screen on the first touch screen in response to the detecting the first tap gesture, wherein the outgoing call screen includes at least one of a number display area, a keypad area, a call key, a video call key, and a message sending key, and the second touch screen maintains the first information while the outgoing call screen is displayed in the first touch screen. The method also includes receiving a phone number input through the keypad area and detecting a second tap gesture from the call key, replacing the outgoing call screen displayed on the first touch screen with a dialing screen by displaying the dialing screen on the first touch screen in response to the detecting the second tap gesture, and displaying, on the second touch screen, a guide message indicating to fold the portable device for a call, wherein the dialing screen includes a call participant identification area indicating a counterpart call participant and a function key area providing mid-call functions, replacing the dialing screen displayed on the first touch screen with a mid-call screen by displaying the mid-call screen on the first touch screen in response to the call being connected with the counterpart call participant, and removing the guide message displayed on the second touch screen, and displaying the first information, wherein the mid-call screen includes a call participant identification area indicating the counterpart call participant and a function key area providing a call duration time and mid-call functions.

In accordance with an aspect of another exemplary embodiment, there is provided a non-transitory computer-readable medium storing a program executable by a computer to perform a method of controlling a portable device including a first touch screen and a second touch screen, the method including, displaying first information on the first touch screen and detecting an outgoing call request while second information is displayed on the second touch screen, replacing the first information displayed on the first touch screen with an outgoing call screen by displaying the outgoing call screen in response to the detecting the outgoing call request, wherein the outgoing call screen includes at least one of a number display area displaying a dialed number, a call key, a video call key, and a message sending key, and the second touch screen maintains the second information while the outgoing call screen is displayed on the first touch screen, receiving a phone number through the keypad area and detecting a first tap gesture from the call key, replacing the outgoing call screen displayed on the first touch screen with a dialing screen by displaying the dialing screen on the first touch screen in response to the detecting the first tap gesture, and display, on the second touch screen, a guide message indicating to fold the portable device for a call, wherein the dialing screen includes a call participant identification area indicating a counterpart call participant corresponding to the input phone number and a function key area providing mid-call functions, replacing the dialing screen displayed on the first touch screen with a mid-call screen by displaying the mid-call screen on the first touch screen in response to the call being connected with the counterpart call participant, and removing the guide message displayed on the second touch screen, and displaying the first information, wherein the mid-call screen includes a call participant identification area indicating the counterpart call participant and a function key area providing a call duration time and mid-call functions.

In accordance with an aspect of another exemplary embodiment, there is provided a method of controlling a portable device including a first touch screen and a second touch screen arranged on at least one foldable panel, the method including, displaying first information on the first touch screen and detecting a generation of a first incoming call while second information is displayed on the second touch screen in a state where a first panel of the at least one foldable panel includes the first touch screen and a second panel of the at least one foldable panel includes the second touch screen are unfolded, replacing the first information displayed on the first touch screen with a first incoming call screen related to the first incoming call provided by a call application by displaying the first incoming call screen on the first touch screen in response to the generation of the first incoming call, wherein the first incoming call screen includes at least one of a call participant identification area indicating a counterpart call participant, an incoming key, and a rejection message key, deactivating the second information displayed on the second touch screen and displaying a guide message indicating to fold the portable device for a call while displaying the first incoming call screen, detecting a pre-designated first touch gesture from the incoming key within the first incoming call screen, replacing the incoming call screen displayed on the first touch screen with a mid-call screen by displaying the mid-call screen on the first touch screen in response to the detecting the first touch gesture, and removing the guide message displayed the second touch screen, wherein the mid-call screen includes a call participant identification area indicating the counterpart call participant and a function key area providing a call duration time and mid-call functions, and replacing the mid-call screen displayed on the first touch screen with the first information by displaying the first information on the first touch screen in response to the first incoming call ending.

In accordance with an aspect of another exemplary embodiment, there is provided a method of controlling a portable device including a first touch screen and a second touch screen, the method including, detecting a first incoming call while displaying first information on the first touch screen and displaying second information on the second touch screen, replacing the first information displayed on the first touch screen with a first incoming call screen related to the first incoming call by displaying the first incoming call screen on the first touch screen in response to the detecting the first incoming call, wherein the first incoming call screen includes at least one of a call participant identification area indicating a counterpart call participant corresponding to the first incoming call, an incoming key, and a rejection message key, deactivating the second information displayed on the second touch screen and displaying a guide message indicating to fold the portable device for a call while displaying the first incoming call screen, detecting a pre-designated first touch gesture from the incoming key within the first incoming call screen, and replacing the first incoming call screen displayed on the first touch screen with a mid-call screen by displaying the mid-call screen on the first touch screen in response to the detecting the first touch gesture, and removing the guide message displayed on the second touch screen, wherein the mid-call screen includes a call participant identification area indicating the counterpart call participant and a function key area providing a call duration time and mid-call functions.

In accordance with an aspect of another exemplary embodiment, there is provided a portable device including at least one foldable panel, a first touch screen and a second touch screen arranged on at least one foldable panel, and at least one processor that is configured to display, on the first touch screen, a first page including at least one of a widget area designated as a home screen and an icon related to at least one application and a dock area including a call icon of a call application, display, on the second touch screen, first information in a state where a first panel of the at least one foldable panel includes the first touch screen, a second panel of the at least one foldable panel includes the second touch screen, and the first and second panels are unfolded, detect a first tap gesture that selects the call icon, replace the first page and the dock area displayed on the first touch screen with an outgoing call screen provided by the call application by displaying the outgoing call screen on the first touch screen in response to a detection of the first tap gesture, wherein the outgoing call screen includes at least one of a number display area, a keypad area, a call key, a video call key, and a message sending key, and the second touch screen maintains the first information while the outgoing call screen is displayed in the first touch screen, receive a phone number through the keypad area and detect a second tap gesture from the call key, replace the outgoing call screen displayed on the first touch screen with a dialing screen by displaying the dialing screen on the first touch screen in response to the detection of the second tap gesture, and display, on the second touch screen, a guide message indicating to fold the portable device for a call, wherein the dialing screen includes a call participant identification area indicating a counterpart call participant and a function key area providing mid-call functions, replace the dialing screen displayed on the first touch screen with a mid-call screen by displaying the mid-call screen on the first touch screen in response to the call being connected with the counterpart call participant, and remove the guide message displayed on the second touch screen, and display the first information, wherein the mid-call screen includes a call participant identification area indicating the counterpart call participant and a function key area providing a call duration time and mid-call functions.

In accordance with an aspect of another exemplary embodiment, there is provided a portable device including at least one foldable panel, a first touch screen and a second touch screen arranged on the at least one foldable panel, and at least one processor that is configured to display, on the first touch screen, first information and detect a generation of a first incoming call while second information is displayed on the second touch screen in a state where a first panel of the at least one foldable panel includes the first touch screen, a second panel of the at least one foldable panel includes the second touch screen, and the first and second touch screens are unfolded, replace the first information displayed on the first touch screen with a first incoming call screen related to the first incoming call provided by a call application by displaying the first incoming call screen on the first touch screen in response to the generation of the first incoming call, wherein the first incoming call screen includes at least one of a call participant identification area indicating a counterpart call participant, an incoming key, and a rejection message key, deactivate the second information displayed on the second touch screen and display a guide message indicating to fold the portable device for a call while displaying the first incoming call screen, detect a pre-designated first touch gesture from the incoming key within the first incoming call screen, replace the incoming call screen displayed on the first touch screen with a mid-call screen by displaying the mid-call screen on the first touch screen in response to the detection of the first touch gesture, and remove the guide message screen on the second touch screen, wherein the mid-call screen includes a call participant identification area indicating the counterpart call participant and a function key area providing a call duration time and mid-call functions, and replace the mid-call screen on the first touch screen with the first information by displaying the first information on the first touch screen in response to the first incoming call ending.

In accordance with an aspect of another exemplary embodiment, there is provided a portable device including a first touch screen and a second touch screen, and at least one processor that is configured to detect a first incoming call while first information is displayed on the first touch screen and second information is displayed on the second touch screen, replace the first information displayed on the first touch screen with a first incoming call screen related to the first incoming call by displaying the first incoming call screen on the first touch screen in response to the detection of the first incoming call, wherein the first incoming call screen includes at least one of a call participant identification area indicating a counterpart call participant corresponding to the first incoming call, an incoming key, and a rejection message key, deactivate the second information on the second touch screen and display a guide message screen indicating to fold the portable device for a call while the first incoming call screen is displayed, detect a pre-designated first touch gesture from the incoming key within the first incoming call screen, and replace the first incoming call screen displayed on the first touch screen with a mid-call screen by displaying the mid-call screen on the first touch screen in response to the detection of the first touch gesture, and remove the guide message screen displayed on the second touch screen, wherein the mid-call screen includes a call participant identification area indicating the counterpart call participant and a function key area providing a call duration time and mid-call functions.

In accordance with an aspect of another exemplary embodiment, there is provided a non-transitory computer-readable medium storing a program executable by a computer to perform a method of controlling a portable device including a first touch screen and a second touch screen arranged on at least one foldable panel, the method including displaying, on the first touch screen, a first page including at least one of a widget area designated as a home screen and an icon related to at least one application or and displaying a dock area a call icon of a call application, displaying, on the second touch screen, first information in a state where a first panel of the at least one foldable panel includes the first touch screen, a second panel of the at least one foldable panel includes the second touch screen are unfolded, detecting a first tap gesture that selects the call icon, replacing the first page and the dock area on the first touch screen with an outgoing call screen provided by the call application by displaying the outgoing call screen on the first touch screen in response to a detection of the first tap gesture, wherein the outgoing call screen includes at least one of a number display area, a keypad area, a call key, a video call key, and a message sending key, and the second touch screen maintains the first information while the outgoing call screen is displayed in the first touch screen, receiving a phone number through the keypad area and detecting a second tap gesture from the call key, replacing the outgoing call screen displayed on the first touch screen with a dialing screen by displaying the dialing screen on the first touch screen in response to the detecting the second tap gesture, and displaying, on the second touch screen, a guide message indicating to fold the portable device for a call, wherein the dialing screen includes a call participant identification area indicating a counterpart call participant and a function key area providing mid-call functions, replacing the dialing screen displayed on the first touch screen with a mid-call screen by displaying the mid-call screen on the first touch screen in response to the call being connected with the counterpart call participant, and removing the guide message displayed on the second touch screen, and displaying the first information, wherein the mid-call screen includes a call participant identification area indicating the counterpart call participant and a function key area providing a call duration time and mid-call functions.

In accordance with an aspect of another exemplary embodiment, there is provided a non-transitory computer-readable medium storing a program executable by a computer to perform a method of controlling a portable device including a first touch screen and a second touch screen arranged on at least one foldable panel, the method including displaying first information on a first touch screen and detecting a generation of a first incoming call while second information is displayed on a second touch screen in a state where a first panel of the at least one foldable panel includes the first touch screen, a second panel of the at least one foldable panel includes the second touch screen, and the first and second panels are unfolded, replacing the first information displayed on the first touch screen with a first incoming call screen related to the first incoming call provided by a call application by displaying the first incoming call screen on the first touch screen in response to the generation of the first incoming call, wherein the first incoming call screen includes at least one of a call participant identification area indicating a counterpart call participant, an incoming key, and a rejection message key, deactivating the second information displayed on the second touch screen and displaying a guide message indicating to fold the portable device for a call while displaying the first incoming call screen, detecting a pre-designated first touch gesture from the incoming key within the first incoming call screen, replacing the incoming call screen displayed on the first touch screen with a mid-call screen by displaying the mid-call screen on the first touch screen in response to the detecting the first touch gesture, removing the guide message screen displayed on the second touch screen, wherein the mid-call screen includes a call participant identification area indicating the counterpart call participant and a function key area providing a call duration time and mid-call functions, and replacing the mid-call screen displayed on the first touch screen with the first information by displaying the first information on the first touch screen in response to the first incoming call ending.

In accordance with an aspect of another exemplary embodiment, there is provided a non-transitory computer-readable medium storing a program executable by a computer to perform a method of controlling a portable device including a first touch screen and a second touch screen arranged on at least one foldable panel, the method including detecting a first incoming call while displaying first information on the first touch screen and displaying second information on the second touch screen, replacing the first information displayed on the first touch screen with a first incoming call screen related to the first incoming call by displaying the first incoming call screen on the first touch screen in response to the detecting the first incoming call, wherein the first incoming call screen includes at least one of a call participant identification area indicating a counterpart call participant corresponding to the first incoming call, an incoming key, and a rejection message key, deactivating the second information displayed on the second touch screen and displaying a guide message indicating to fold the portable device for a call while displaying the first incoming call screen, detecting a pre-designated first touch gesture from the incoming key within the first incoming call screen, and replacing the first incoming call screen displayed on the first touch screen with a mid-call screen by displaying the mid-call screen on the first touch screen in response to the detecting the first touch gesture, and removing the guide message screen displayed on the second touch screen, wherein the mid-call screen includes a call participant identification area indicating the counterpart call participant and a function key area providing a call duration time and mid-call functions.

Other aspects and advantages of the invention will be apparent from the following description and the appended claims.

BRIEF DESCRIPTION OF THE DRAWINGS

The foregoing and other aspects will become more apparent from the following detailed description of exemplary embodiments taken in conjunction with the accompanying drawings in which.

DETAILED DESCRIPTION OF THE EXEMPLARY EMBODIMENTS

Figure 1:
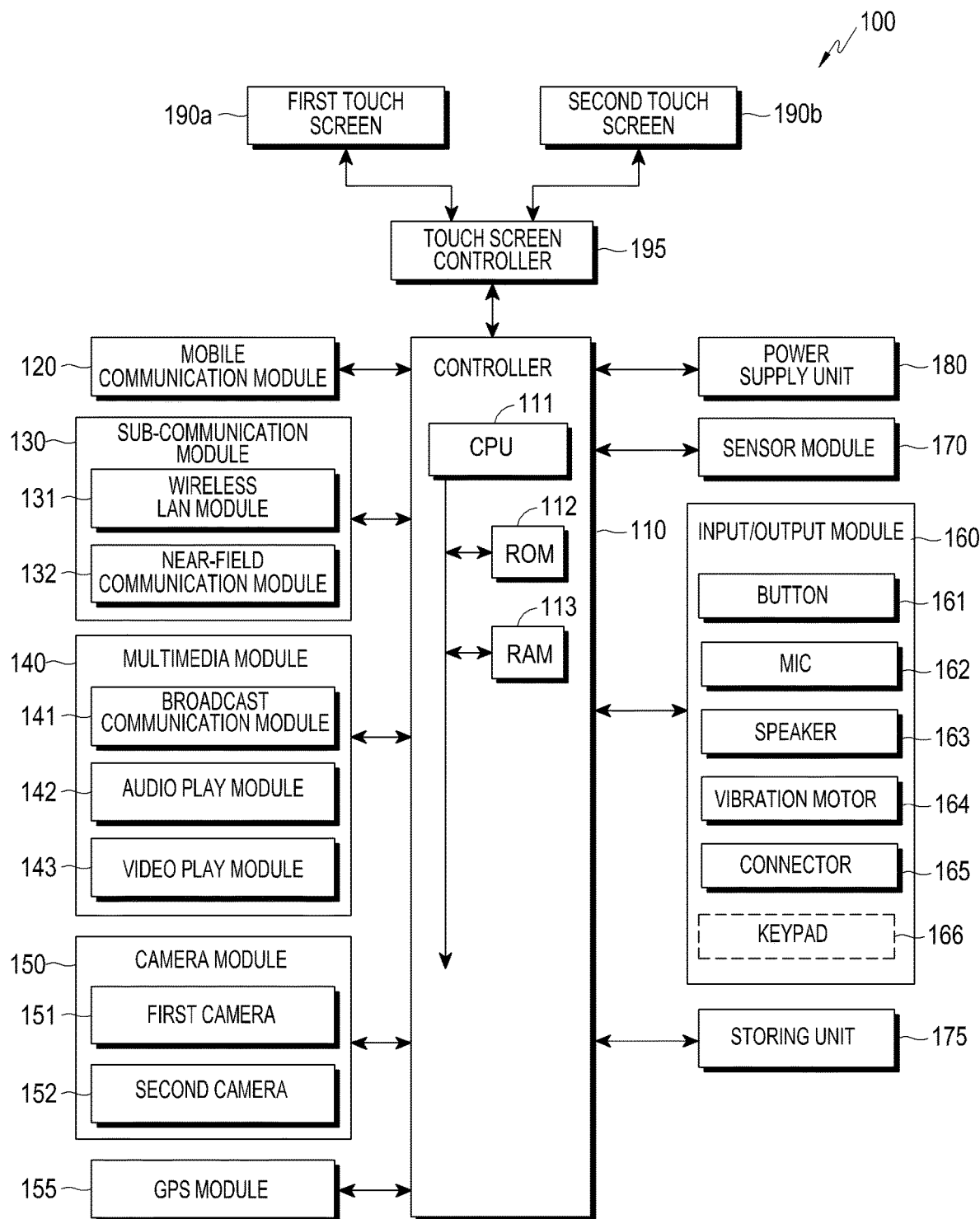
FIG. 1 is a block diagram illustrating a schematic configuration of a portable device according to an exemplary embodiment.

Hereinafter, an operation principle of one or more exemplary embodiments will be described in detail with reference to the accompanying drawings. In the following description of one or more exemplary embodiments, a detailed description of known functions and configurations incorporated herein will be omitted when it may make the subject matter of one or more exemplary embodiments rather unclear. Further, terms described below are defined in consideration of the functions of one or more exemplary embodiments, and may have different meanings according to the intention of a user or operator or the convention. Therefore, its definition will be made based on the overall contents of this specification.

Throughout the drawings and the detailed description, unless otherwise described, the same drawing reference numerals will be understood to refer to the same elements, features, and structures. The relative size and depiction of these elements may be exaggerated for clarity, illustration, and convenience.

The term ". . . unit" used in the embodiments indicates a component including software or hardware, such as a Field Programmable Gate Array (FPGA) or an Application-Specific Integrated Circuit (ASIC), and the ". . . unit" performs certain roles. However, the ". . . unit" is not limited to software or hardware. The ". . . unit" may be configured to be included in an addressable storage medium or to reproduce one or more processors. Therefore, for example, the ". . . unit" includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and ". . . units" may be combined into a smaller number of components and ". . . units", or further divided into additional components and ". . . units".

The term "module" as used herein means, but is not limited to, a software or hardware component, such as an FPGA or ASIC, which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although the terms used herein are generic terms which are currently widely used and are selected by taking into consideration functions thereof, the meanings of the terms may vary according to the intentions of persons skilled in the art, legal precedents, or the emergence of new technologies. Furthermore, some specific terms may be randomly selected by the applicant, in which case the meanings of the terms may be specifically defined in the description of the exemplary embodiment. Thus, the terms should be defined not by simple appellations thereof but based on the meanings thereof and the context of the description of the exemplary embodiment. As used herein, expressions such as "at least one of," when preceding a list of elements, modify the entire list of elements and do not modify the individual elements of the list.

It will be understood that when the terms "includes," "comprises," "including," and/or "comprising," when used in this specification, specify the presence of stated elements and/or components, but do not preclude the presence or addition of one or more elements and/or components thereof. As used herein, the term "module" refers to a unit that can perform at least one function or operation and may be implemented utilizing any form of hardware, software, or a combination thereof.

The portable device in this specification has a display including one or more touch screens and corresponds to a device configured to execute an application or display contents, for example, a tablet Personal Computer (PC), a Portable Multimedia Player (PMP), Personal Digital Assistant (PDA), a smart phone, a mobile phone, or a digital frame. Hereinafter, although a portable device corresponding to a cellular phone or a smart phone will be described with reference to exemplary embodiments, it should be noted that the present invention is not limited thereto.

FIG. 1 is a block diagram illustrating a schematic configuration of a portable device according to an exemplary embodiment. The portable device 100 illustrated in FIG. 1 may be connected to an external device (not shown) by using at least one of a cellular communication module 120, a sub communication module 130, and a connector 165. The "external device" includes at least one of a different device from the portable device 100, a mobile phone, a smart phone, a tablet Personal Computer (PC), and a computer server.

Referring to FIG. 1, the portable device 100 includes at least one of touch screen displays 190a and 190b and a touch screen controller 195. Also, the portable device 100 includes a controller 110, the cellular communication module 120, the sub communication module 130, a multimedia module 140, a camera module 150, a Global Positioning System (GPS) module 155, an input/output module 160, a sensor module 170, a storage unit 175, and a power supplier 180. The sub communication module 130 includes at least one of a wireless LAN module 131 and a near field communication module 132, and the multimedia module 140 includes at least one of a broadcasting communication module 141, an audio reproduction module 142, and a video reproduction module 143. The camera module 150 includes at least one of a first camera 151 and a second camera 152, and the input/output module 160 includes at least one of a button set 161, a microphone 162, a speaker 163, a vibration motor 164, the connector 165, and a keypad 166.

The controller 110 may include a CPU 111, a Read-Only Memory (ROM) 112 for storing a control program for controlling the portable device 100, and a Random Access Memory (RAM) 113 for storing a signal or data input from an outside of the portable device 100 or used as a storage area for an operation performed in the portable device 100. The CPU 111 may include at least one of a single core processor, a dual core processor, a triple core, processor and a quad core processor. The CPU 111, the ROM 112, and the RAM 113 may be mutually connected through an internal bus.

The controller 110 may control the cellular communication module 120, the sub communication module 130, the multimedia module 140, the camera module 150, the GPS module 155, the input/output module 160, the sensor module 170, the storage unit 175, the power supplier 180, the touch screens 190a and 190b, and the touch screen controller 195.

The cellular communication module 120 connects the portable device 100 with the external device (particularly, a base station of a cellular system) through at least one of or a plurality of antennas (not shown) by using a wireless access technology according to a cellular communication protocol under a control of the controller 110. The cellular communication module 120 transmits/receives a wireless signal for voice phone communication, video phone communication, a Short Messaging Service (SMS), or a Multimedia Messaging service (MMS) to/from other communicable devices such as a mobile phone, a smart phone, a tablet PC, or another device having a phone number input into the portable device 100.

The sub communication module 130 may include at least one of the wireless LAN module 131 and the near field communication module 132. For example, the sub communication module 130 may include only the wireless LAN module 131, only the near field communication module 132, or both the wireless LAN module 131 and the near field communication module 132.

The wireless LAN module 131 may be connected to an Internet in a place where a wireless Access Point (AP) (not shown) is installed, according to a control of the controller 110. The wireless LAN module 131 supports a wireless LAN standard (IEEE802.11x) of the Institute of Electrical and Electronics Engineers (IEEE). The near field communication module 132 may wirelessly perform near field communication between the portable device 100 and the external device according to a control of the controller 110. Near field communication techniques may include Bluetooth, Infrared Data Association (IrDA) and the like.

The portable device 100 may include at least one of the cellular communication module 120, the wireless LAN module 131, and the near field communication module 132. For example, the portable device 100 may include a combination of the cellular communication module 120, the wireless LAN module 131, and the near field communication module 132 according to a capability of the display device 100.

The multimedia module 140 may include at least one of the broadcasting communication module 141, the audio reproduction module 142, and the video reproduction module 143. The broadcasting communication module 141 may receive a broadcasting signal (for example, a TV broadcasting signal, a radio broadcasting signal, or a data broadcasting signal) and broadcasting additional information (for example, Electric Program Guide (EPS) or Electric Service Guide (ESG)) broadcasted from a broadcasting station through a broadcasting communication antenna (not shown) according to a control of the controller 110. The audio reproduction module 142 may reproduce a digital audio file (for example, a file having an extension of mp3, wma, ogg or way) stored or received according to a control of the controller 110. The video reproduction module 143 may reproduce a digital video file (for example, a file having an extension of mpeg, mpg, mp4, avi, mov or mkv) stored or received according to a control of the controller 110. The video reproduction module 143 may reproduce the digital audio file.

The multimedia module 140 may include the audio reproduction module 142 and the video reproduction module 143 except for the broadcasting communication module 141. Further, the audio reproduction module 142 or the video reproduction module 143 of the multimedia module 140 may be included in the controller 110.

The camera module 150 may include at least one of the first camera 151 and the second camera 152 for photographing a still image or a video according to a control of the controller 110. The first camera 151 and the second camera 152 may be arranged in a housing of the portable device 100 or connected to the portable device 100 by using a separate connection means. At least one of the first camera 151 or the second camera 152 may include an auxiliary light source (for example, a flash (not shown)) for providing an amount of light required for the photographing. In one embodiment, the first camera 151 may be disposed in a front surface of the portable device 100, and the second camera 152 may be disposed in a rear surface of the portable device 100. In another embodiment, the first camera 151 and the second camera 152 may be disposed to be adjacent to each other (for example, an interval between the first camera 151 and the second camera 152 is larger than 1 cm or smaller than 8 cm), and thus a three-dimensional still image or a three-dimensional video may be photographed.

The camera module 150 can detect a motion or a shape of the user through at least one of the first camera 151 and the second camera 152 and transmit the detected motion or shape to the controller 110 as an input for executing or controlling the application. In one embodiment, the motion of the user refers to a motion of a hand of the user detected through the first camera or the second camera, and the shape of the user refers to a shape of a face of the user detected through the first camera or the second camera. In another embodiment, the portable device 100 can detect a motion of the user by using another means such as a infrared ray detector and execute or control the application in response to the motion.

The GPS module 155 may receive a radio wave from a plurality of GPS satellites (not shown) in Earth orbit and calculate a position of the portable device 100 by using Time of Arrival from the GPS satellites (not shown) to the portable device 100 and GPS parameters.

The input/output module 160 may include at least one of at least one physical button 161, the microphone 162, the speaker 163, the vibration motor 164, the connector 165, and the keypad 166. The at least one physical button 161 may be formed in a front surface, a side surface, or a rear surface of the housing of the portable device 100 in a push type or touch type, and may include at least one of a power/lock button, a volume control button, a menu button, a home button, a back button, and a search button. The microphone 162 receives a voice or sound according to a control of the controller 110 and generates an electrical signal.

The speaker 163 may output sounds corresponding to various signals (for example, a wireless signal, a broadcasting signal, a digital audio file, a digital video file, photographing a picture or the like) of the cellular communication module 120, the sub communication module 130, the multimedia module 140, or the camera module 150 to an outside of the display device 100 according to a control of the controller 110. The speaker 163 may output sounds (for example, a button control sound or a ring back tone corresponding to phone communication) corresponding to functions performed by the portable device 100. One or more speakers 163 may be formed in a proper position or positions of the housing of the portable device 100. For example, the speaker 163 includes an internal speaker module disposed in a position suitable for approaching ears of the user during phone communication and an external speaker module having a higher output suitable for being used during a reproduction of an audio/video file or watching of broadcasting and disposed in a proper position of the housing of the portable device 100.

The vibration motor 164 may convert an electrical signal to a mechanical vibration according to a control of the controller 110. For example, when the portable device 100 in a vibration mode receives voice phone communication from another device (not shown), the vibration motor 164 operates. One or more vibration motors 164 may be formed within the housing of the portable device 100. The vibration motor 164 may operate in response to a touch gesture of the user detected on the touch screens 190*a* and 190*b* and continuous touch motions detected on the touch screens 190*a* and 190*b*.

The connector 165 may be used as an interface for connecting the portable device 100 with an external device or a power source. The connector 165 may transmit data stored in the storage unit 175 of the portable device 100 to the external device through a wired cable connected to the connector 165 or receive the data from the external device according to a control of the controller 110. Power may be input or a battery (not shown) may be charged from the power source through the wired cable connected to the connector 165.

The keypad 166 may receive a key input from the user to control the portable device 100. The keypad 166 includes a physical keypad formed in the portable device 100 and/or a virtual keypad displayed on the touch screens 190*a* and 190*b*. The physical keypad formed in the portable device 100 may be omitted according to a capability or a structure of the portable device 100.

The sensor module 170 includes at least one sensor for detecting a state of the portable device 100. For example, the sensor module 170 may include a proximity sensor for detecting whether the user is close to the portable device 100, an illumination sensor for detecting an amount of light adjacent to the portable device 100, and a motion sensor for detecting an operation of the portable device 100 (for example, a rotation of the portable device 100, an absolute/relative movement of at least one panel included in the portable device 100, or an acceleration or vibration applied to the portable device 100). Each sensor of the sensor module 170 may detect the state, generate a signal corresponding to the detection, and transmit the generated signal to the controller 110. The sensor of the sensor module 170 may be added or omitted according to a capability of the portable device 100.

The storage unit 175 may store signals, information, or data input/output in accordance with operations of the cellular communication module 120, the sub communication module 130, the multimedia module 140, the camera module 150, the GPS module 155, the input/output module 160, the sensor module 170, and the touch screens 190*a* and 190*b* according to a control of the controller 110. The storage unit 175 may store a control program for controlling the portable device 100 or the controller 110 and applications. Hereinafter, the term "storage unit" includes a memory card (for example, an SD card or a memory stick) removable from/mounted to the storage unit 175, the ROM 112, the RAM 113, or the portable device 100. Further, the storage unit may include a nonvolatile memory, a volatile memory, a Hard Disk Drive (HDD), or a Solid State Drive (SSD).

The power supplier 180 may supply power to one battery or a plurality of batteries disposed within the housing of the portable device 100 according to a control of the controller 110. The one battery or the plurality of batteries supply power to the controller 110 of the portable device 100 and each component module. Further, the power supplier 180 may supply power input from an external power source through the wired cable connected to the connector 165 to the portable device 100.

The touch screens 190*a* and 190*b* are display devices of displaying various applications (for example, phone communication, data transmission, broadcasting, camera and the like) which can be executed by the controller 110 and providing a user interface configured to adapt the various applications, and may receive at least one touch gesture through a user's body (for example, fingers including a thumb) or a detectable input means (for example, a stylus pen). The user interface may include a predetermined touch area, a soft key, and a soft menu. The touch screens 190*a* and 19*b* may transmit an electrical signal corresponding to the at least one touch gesture input through the user interface to the touch screen controller 195. Further, the touch screens 190*a* and 190*b* may detect continuous touch motions and transmit electrical signals corresponding to continuous or discontinuous touch motions to the touch screen controller 195. The touch screens 190*a* and 190*b* may be implemented in, for example, a resistive type, a capacitive type, an infrared type, or an acoustic wave type.

The touch screen controller 195 converts the electrical signal received from the touch screens 190*a* and 190*b* to a digital signal (for example, X and Y coordinates) and transmits the digital signal to the controller 110. The controller 110 may control the touch screens 190*a* and 190*b* by using the digital signal received from the touch screen controller 195. For example, the controller 110 may allow a soft key displayed on the touch screens 190*a* and 190*b* to be selected or an application corresponding to the soft key to be executed in response to the touch gesture. Further, the touch screen controller 195 may be included in the controller 110.

The touch gesture according to the specification is not limited to a direct contact between the touch screens 190*a* and 190*b* and a user's body or a touchable input means and may include a non-contact (for example, a case where a detectable interval between the touch screens 190*a* and 190*b* and the user's body or the touchable input means is 1 cm or shorter). The detectable interval of the touch screens 190*a* and 190*b* may be changed according to a capability or a structure of the portable device 100.

In an exemplary embodiment, the touch gesture may include all types of user gestures which can be detected by the portable device through a direct contact or a close approach to the touch screen. For example, the touch gesture corresponds to a user's action of selecting one position or a plurality of continuous positions on the touch screen by using a finger of a right hand or left hand (particular, an index finger), a thumb, or an object (for example, a stylus pen) which can be detected by the touch screen, and may include actions such as a touch, a contact, a release of the touch, a tap, a contact and rotate, a pinch, a spread, a touch drag and the like. Here, the touch drag corresponds to a gesture of moving a finger or a thumb in a predetermined direction in a state where the finger, the thumb, or a stylus pen contacts the touch screen, and may include, for example, gestures such as a touch and drag, a flick, a swipe, a slide, a sweep and the like. A contact state with the touch screen may include a state where the finger, the thumb, or the stylus pen directly contacts the touch screen or closely approaches the touch screen without a direct contact.

The portable device 100 is a device for executing an application, a widget, and a function which is stored in the storage unit and can be executed by the controller 110 through the touch screen. In general, the touch screen provides application, widgets, functions, and graphic objects (that is, soft key or short-cut icon) corresponding to a group thereof, and the portable device executes a corresponding application, widget, or function in response to the detection of the touch gesture of the user on each graphic object.

Here, the widget refers to a mini application which is downloaded and used by the user or can be generated by the user, and includes, for example, a weather widget, a stock widget, a calculator widget, an alarm clock widget, a dictionary widget and the like. A short-cut icon for executing the widget may provide simple advance information through a corresponding widget application. For example, an icon of the weather widget simply provides a current temperature and a weather symbol and a widget application executed through a touch of the icon provides much more information such as weather in each period/area. The application in this specification includes a widget based application and a non-widget based application.

In one embodiment, the touch screen is implemented by one panel (or tablet) and displays one or a plurality of task screens corresponding to one or a plurality of applications under a control of the controller. In another embodiment, the touch screen display is implemented by two panels which are physically separated and mutually connected with each other by a predetermined connector, and the panels may be folded in or folded out by a predetermined angle with respect to the connector. Here, the connector may be a hinge, a flexible connector, or a part of a flexible touch screen. In another embodiment, the touch screen display may be implemented by a flexible touch screen which can be folded or bent at least one or more times. The touch screen display displays one or a plurality of task screens related to one or a plurality of applications under a control of the controller.

Figure 2:
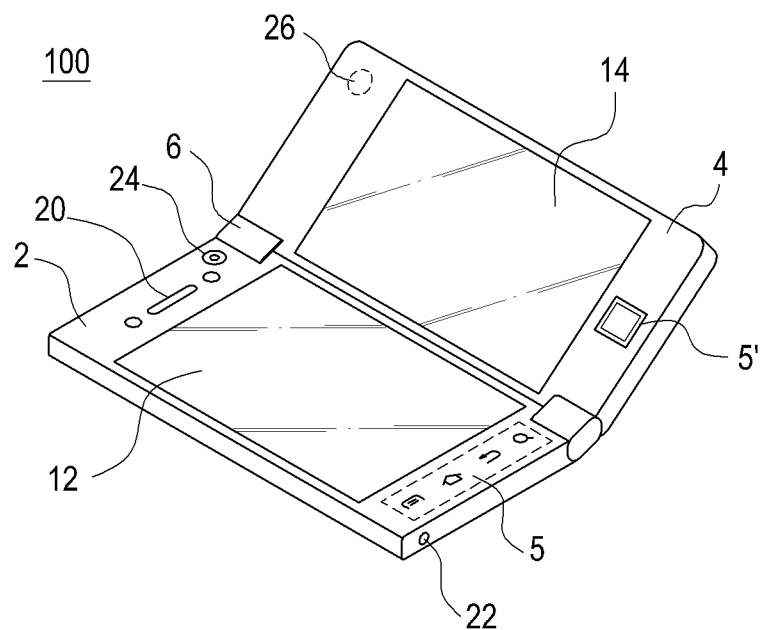
FIG. 2 is a perspective view of a portable device according to an exemplary embodiment.

FIG. 2 is a perspective view of the portable device according to an exemplary embodiment. FIG. 2 shows a configuration in a case where the portable device includes a display device including two touch screens which are connected by a hinge.

Referring to FIG. 2, the portable device 100 includes a first panel 2 and a second panel 4, and the first panel 2 and the second panel 4 are connected by a hinge 6 to be relatively movable. One surface of the first panel 2 has a first touch screen 12, and at least one physical button 5 may be disposed in a lower end of the first touch screen 12. One surface of the second panel 4 has a second touch screen 14 disposed in parallel with the first touch screen 12, and at least one physical button 5' may be disposed in a lower end of the second touch screen 14. The physical buttons 5 and 5' include at least one of a push button and a touch button. As one embodiment, the first touch screen 12 arranged on the first panel 2 having a speaker 20 and a microphone 22 operates as a main screen, and the second touch screen 14 arranged on the second panel 4 operates as a sub screen. As one embodiment, the first panel 2 includes a front camera 24, and the second panel 4 includes a rear camera 26. As another example, as the front camera 24 is disposed in the same surface as that of the second screen 14, in a state where the first panel 2 and the second panel 4 are unfolded, the front camera 24 may work as a front camera, and in a state where the first panel 2 and the second panel 4 are folded, the front camera 24 may work as a rear camera.

As long as the first panel 2 and the second panel 4 are connected by the hinge 6 to be relatively movable, the portable device 100 can be any device such as a mobile phone, a notebook, a tablet PC, a PMP or the like. Although a case where the first touch screen 12 and the second touch screen 14 are included in the first panel 2 and the second panel 4, respectively has been described, the case can be applied to a device in which the touch screen display is provided to only one of the two panels. Further, at least one of the function buttons 5 and 5' in lower ends of the touch screens may be omitted. Furthermore, although a case where the first panel 2 and the second panel 4 are connected by the hinge 6 has been described as an example, the hinge 6 may be replaced with another component as long as the first panel 2 and the second panel 4 can be folded through a relative movement.

The portable device includes a display device having a first touch screen and a second touch screen which are physically or graphically separated, and supports various screen modes as shown in FIG. 3 by using the two touch screens.

FIGS. 3A to 3D are diagrams illustrating screen modes according to a relative angle between the first panel 2 and the second panel 4 of the portable device 100. The relative angle ⊖ is a rotation angle at which the second panel 4 rotates with respect to the first panel 2 in a predetermined direction (for example, counterclockwise).

Figure 3A:
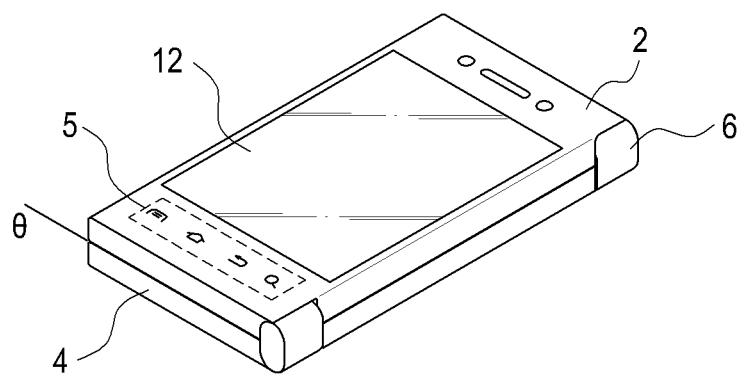
FIGS. 3A to 3D are diagrams illustrating screen modes according to a relative angle between a first panel and a second panel of a portable device according to one or more exemplary embodiments.

FIG. 3A is a perspective view of the folded portable device 100, which shows a state where the first panel 2 and the second panel 4 contact each other while each of the touch screens 12 and 14 of the first panel 2 and the second panel 4 faces outward, that is, a state where the portable device 100 is completely folded outward. The state corresponds to a dual screen. At this time, the relative angle ⊖ is 0 degrees. For example, when the relative angle between the first and second panels 2 and 4 ranges from 0 to 60 degrees, the portable device recognizes a dual screen mode. The dual screen mode is useful when the portable device is in a locked state in which the portable device is not used and useful in a call application. The touch screen 12 in a front surface may display a task screen of at least one application and the touch screen 14 in a rear surface may be turned off in the dual screen mode. Some applications can turn on the touch screen 14 in the rear surface by using an option menu.

Figure 3B:
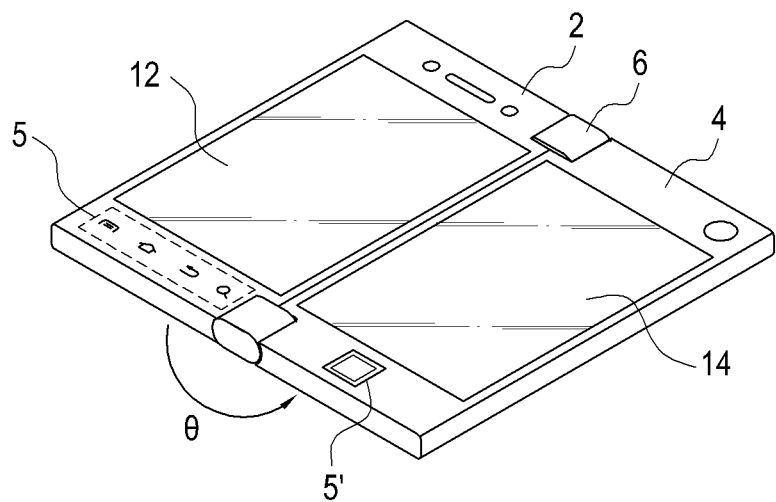

FIG. 3B shows a state where the first panel 2 and the second panel 4 are parallel in which the relative angle ⊖ is 180 degrees or close to 180 degrees within a predetermined range, that is, an unfolded state. The state corresponds to a double screen. For example, when the relative angle ⊖ between the first and second panels 2 and 4 ranges from 175 to 185 degrees, the portable device may consider that the first and second panels 2 and 4 are unfolded. The double screen mode may provide various view modes of displaying two task screens for two applications in the two touch screens 12 and 14, respectively, displaying two task screens for one application in the two touch screens 12 and 14, or widely displaying one task screen for one application in the two touch screens 12 and 14. When there is no application executed within one touch screen, the corresponding touch screen may display a home screen.

Figure 3C:
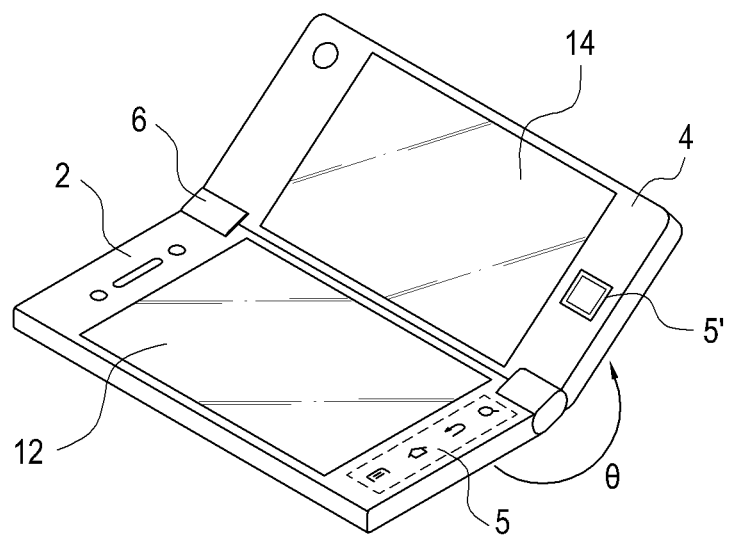

FIG. 3C shows a state where the relative angle ⊖ of the second panel 4 with respect to the first panel 2 exceeds 180 degrees, that is, a state where the two touch screens 12 and 14 are slightly folded inward. That state corresponds to an in-folded screen. For example, when the relative angle ⊖ between the first and second panels 2 and 4 ranges from 180 to 210 degrees, the portable device recognizes an in-folded screen mode. The in-folded screen mode corresponds to the state where the two touch screens 12 and 14 are slightly folded inward and is useful when the portable device is used as a similar form to that of a notebook or an electric book. The in-folded screen mode may be used similarly to the double screen mode.

Figure 3D:
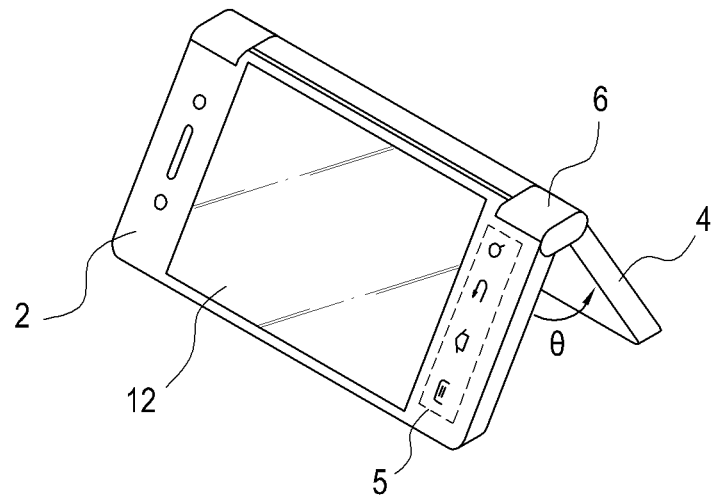

FIG. 3D shows a state where the relative angle ⊖ of the second panel 4 with respect to the first panel 2 is smaller than 180 degrees, that is, a state where the two touch screens 12 and 14 are nearly completely folded outward in opposite directions. The state corresponds to an out-folded screen. For example, when the relative angle ⊖ between the first and second panels 2 and 4 ranges from 30 to 90 degrees, the portable device recognizes an out-folded screen mode. The out-folded screen mode has a structure in which the two touch screens 12 and 14 are folded outward and is useful when the portable device is charged because the portable device can stand on the floor in a triangle shape, when the portable device is used as a digital clock or frame, and when personal broadcasting, a movie, a video or the like is watched for a long time. As another embodiment, the out-folded screen mode may be applied to an application requiring cooperation or interaction between two or more users, for example, a video conference, a collaborative game or the like. Some applications may display a task screen in only the touch screen 12 of the front surface in the dual screen mode and turn off the touch screen 14 of the rear surface. Some applications may turn on the touch screen 14 of the rear surface by using an option menu.

Figure 4:
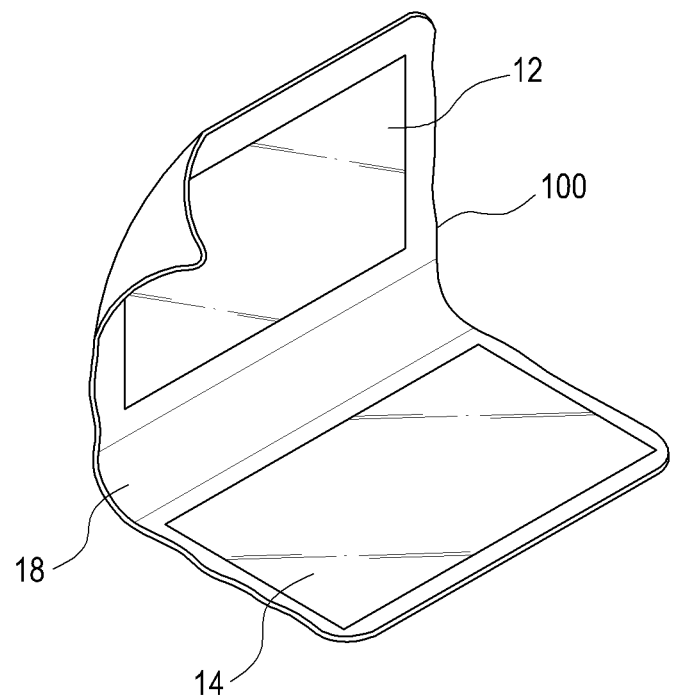
FIG. 4 is a perspective view of a portable device according to another exemplary embodiment.

FIG. 4 is a perspective view of the portable device according to another exemplary embodiment. As illustrated in FIG. 4, the portable device 100 includes a display having two flexible touch screens 12 and 14. The two touch screens 12 and 14 may be mutually connected by a flexible connector 18 and freely folded or bent by a flexible connector 20.

Figure 5A:
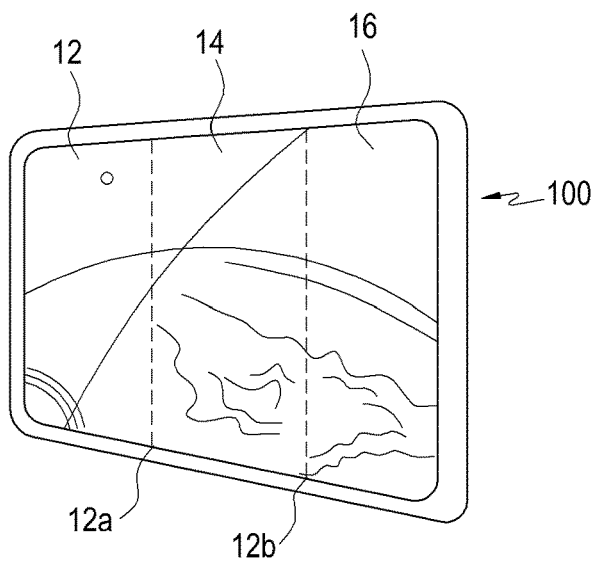
FIGS. 5A to 5C are perspective views of a portable device according to one or more exemplary embodiments.
Figure 5B:
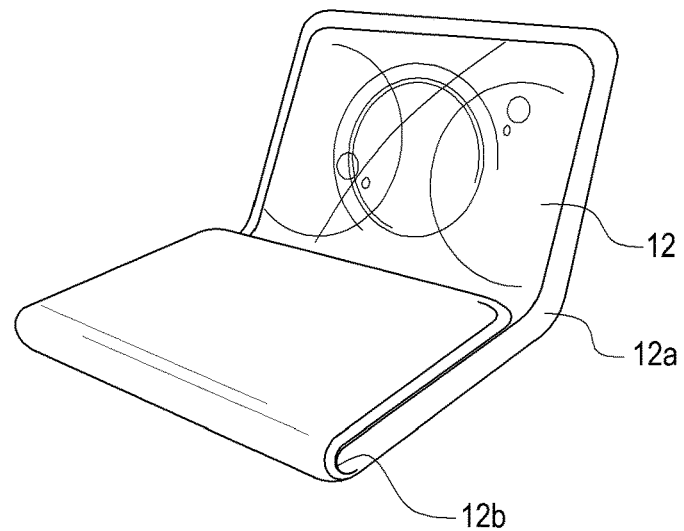
Figure 5C:
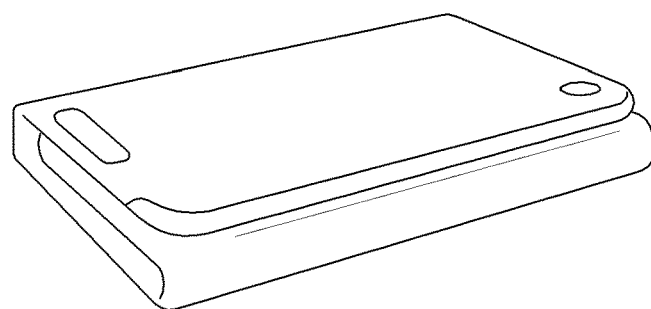

FIGS. 5A, 5B, and 5C are perspective views of the portable device according to another exemplary embodiment. FIGS. 5A, 5B, and 5C illustrate a configuration in which the display device of the portable device 100 is unfolded, a configuration in which the display device is partially closed, and a configuration in which the display device is closed, respectively. Here, although it is illustrated that the portable device 100 has a tri-folded configuration, the portable device 100 may have a bi-folded configuration, a tri-folded configuration or more, or partially folded configuration. In FIGS. 5A, 5B, and 5C, the display device of the portable device 100 may be implemented by two or more foldable touch screens 12, 14, and 16 which are divided by one or more foldable boundaries 12a and 12b.

When the portable device is turned on and completely booted, the portable device provides a home screen through the touch screen. Further, the portable device provides the home screen when there is no application which is being executed or by an input of an external home button. The home screen can be designated basically by a manufacturer and edited by the user and guides the portable device to easily move to various executable applications, widgets, and functions.

The portable device includes a home screen function which provides two pages designated as the home screen through a touch screen display device including a first touch screen and a second touch screen arranged on at least one foldable panel and navigates pages in response to a touch gesture of the user on the home screen.

FIGS. 6A to 6G illustrate a user interface of the home screen according to one or more exemplary embodiments.

Figure 6A:
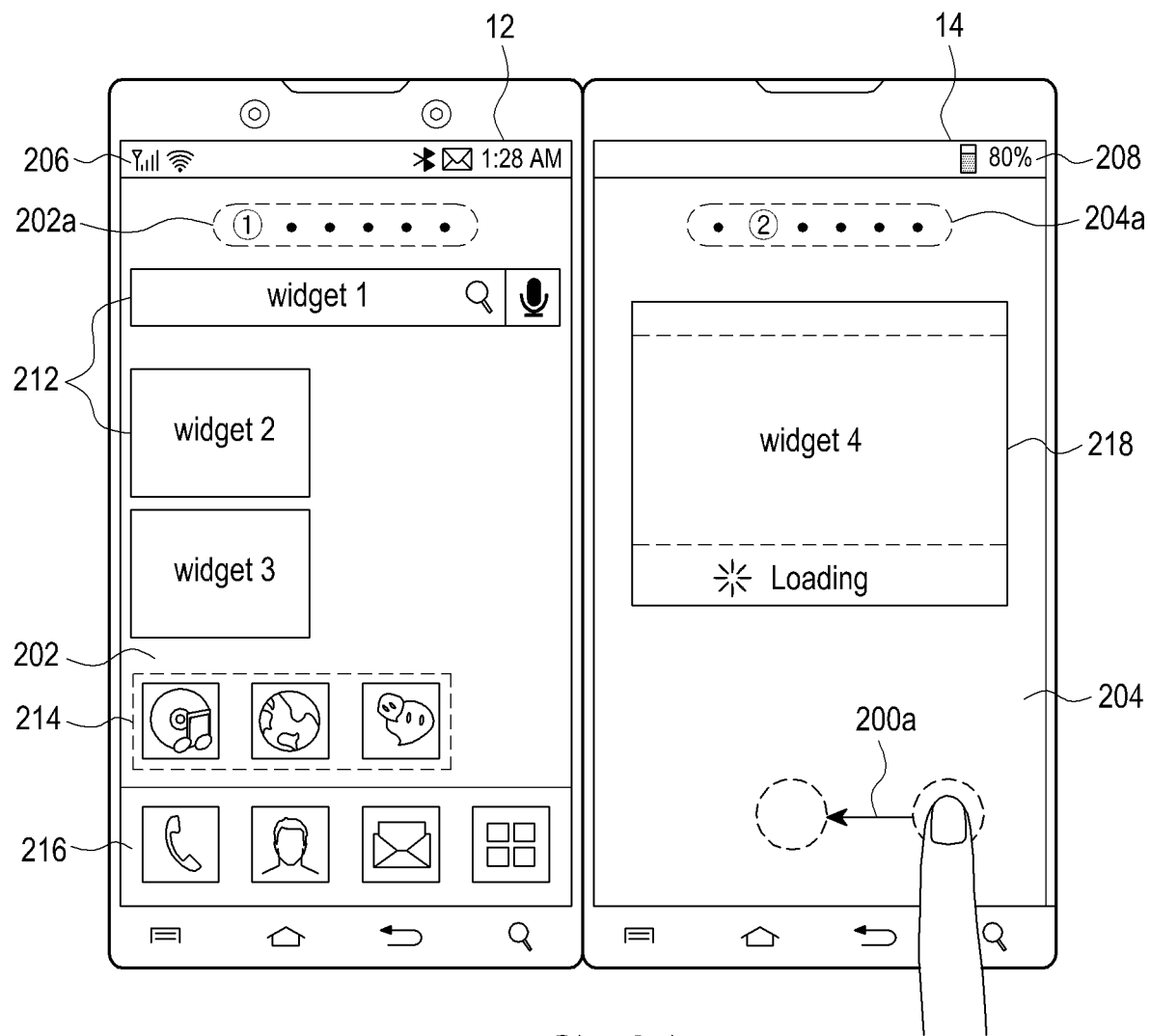
FIGS. 6A to 6G are diagrams illustrating a user interface of a home screen according to one or more exemplary embodiments.

Referring to FIG. 6A, the first touch screen 12 displays a first page 202 of the home screen and the second touch screen 14 displays a second page 204 of the home screen. The first and second touch screens 12 and 14 may be physically or graphically separated.

The first page 202 of the home screen includes a first group including at least one widget area 212 designated as the home screen and/or at least one shortcut icon 214 and the second page 204 includes a second group including at least one widget area 218 designated as the home screen and/or at least one short icon. The first page 202 and the second page 204 can display the widget areas 212 and 218 and/or the shortcut icon 214 in a common background image or respective background images designated as a background screen. As a selectable embodiment, one background image may be displayed over the first and second touch screens 12 and 14.

Each shortcut icon corresponds to each application or each application group, and the corresponding application is executed or shortcut icons included in the corresponding application group are displayed through a detection of a user's touch. Each widget area or each shortcut icon may be basically provided when the portable device is manufactured or may be formed by the user.

In addition, the first touch screen 12 can further display a counter 202a indicating a page of the home screen, frequently used applications, for example, a call application, a contact information application, a message application, a dock area 216 including short icons of an application menu providing application lists, and a status bar 206 providing signal intensity indicator(s) for wireless communication such as cellular or WiFi communication, a Bluetooth connection mode, a received message, a battery status indicator, and a current time together with the first page 202. The second touch screen 14 can further display a page counter 204a and a status bar 208. The status bar on the second touch screen 14 can provide information different from that of the first touch screen 12. The status bars 206 and 208 may be displayed together with the home screen or the application or may be omitted. The status bars 206 and 208 are maintained within the first and second touch screens 12 and 14 regardless of switching of pages. In the following description, description of whether the status bars 206 and 208 are displayed will be omitted.

The home screen may further provide additional pages including one or more widget areas and/or one or more icons within a predetermined maximum number of pages, and the pages are switched by a pre-designated touch gesture.

Figure 6B:
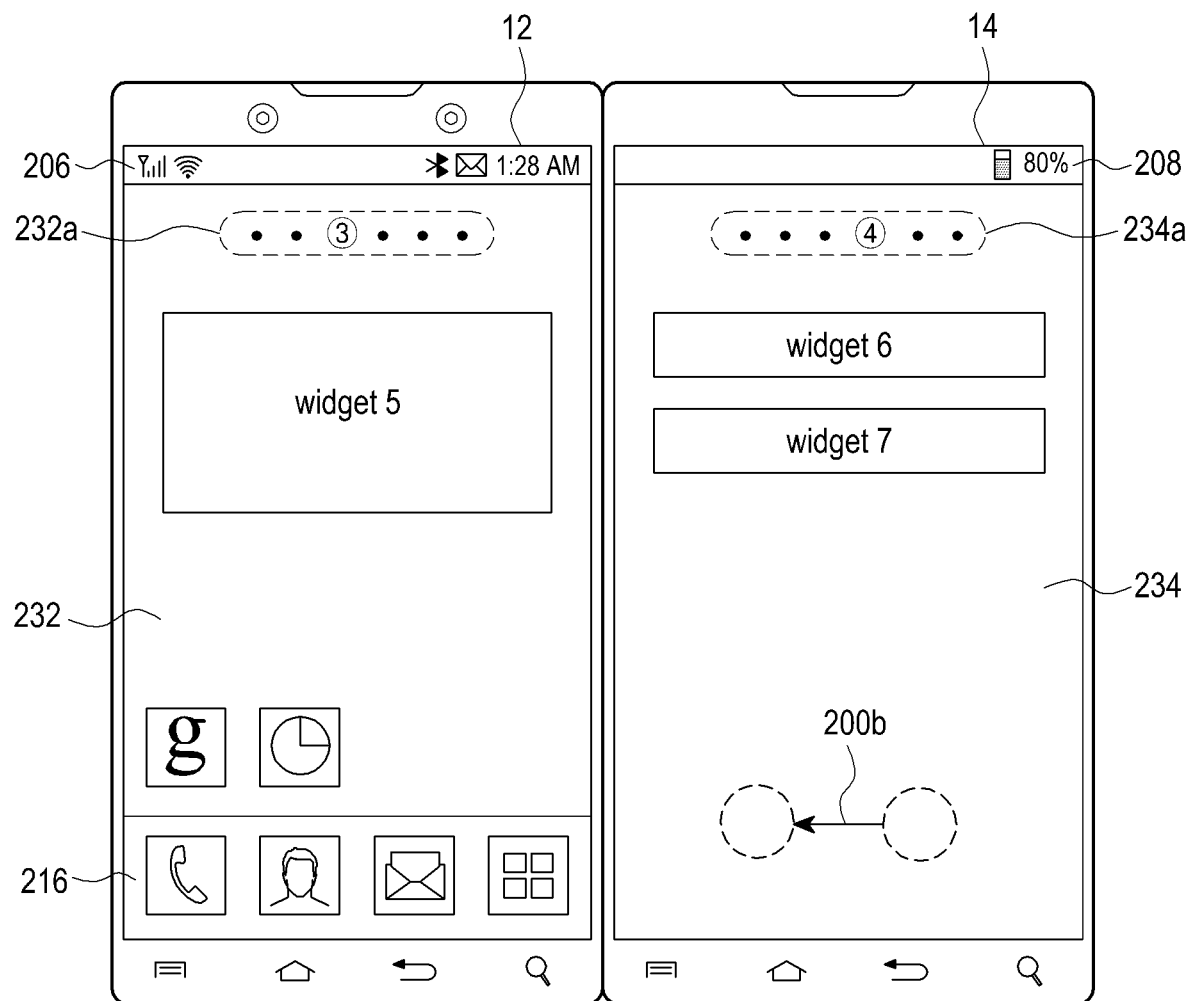

The portable device detects a pre-designated touch gesture 200a to switch a page of the home screen in at least one of the first touch screen 12 and the second touch screen 14 and proceeds to FIG. 6B.

Referring to FIG. 6B, the first and second touch screens 12 and 14 display the following two pages designated as the home screen, that is, third and fourth pages 232 and 234 and page counters 232a and 234a in response to the detection of the touch gesture 200a. The third and fourth pages 232 and 234 may include a widget area and/or an icon different from those of the first and second pages 202 and 204. The third and fourth pages 232 and 234 are displayed in the second touch screen 14 together with the page counters 232a and 234a while sliding in a direction from the second touch screen 14 to the first touch screen 12, and the third page 232 and the page counter 232a may be displayed over both the first and second touch screens 12 and 14 during the sliding. As an embodiment, the dock area 216 providing lists of frequently used applications may be fixedly displayed in a designated position within the first touch screen 12 regardless of the page switching (that is, independently).

As an example, the touch gesture 200a includes a touch drag in a direction from one position of the second touch screen 14 to the first touch screen 12 (or opposite direction). As another example, the touch gesture 200a includes a touch drag in a direction from one position of the second touch screen 14 to one position of the first touch screen 12 (or opposite direction). As still another example, the touch gesture 200a includes a touch drag of passing though a hinge or connector between the first and second touch screens 12 and 14. As a selectable embodiment, it is possible that the touch drag 200a for switching the page of the home screen moves by a predetermined distance or more. As another example, the touch gesture 200a includes a flick on the first or second screen 12 or 14 in a direction from the second touch screen 14 to the first touch screen 12.

Figure 6C:
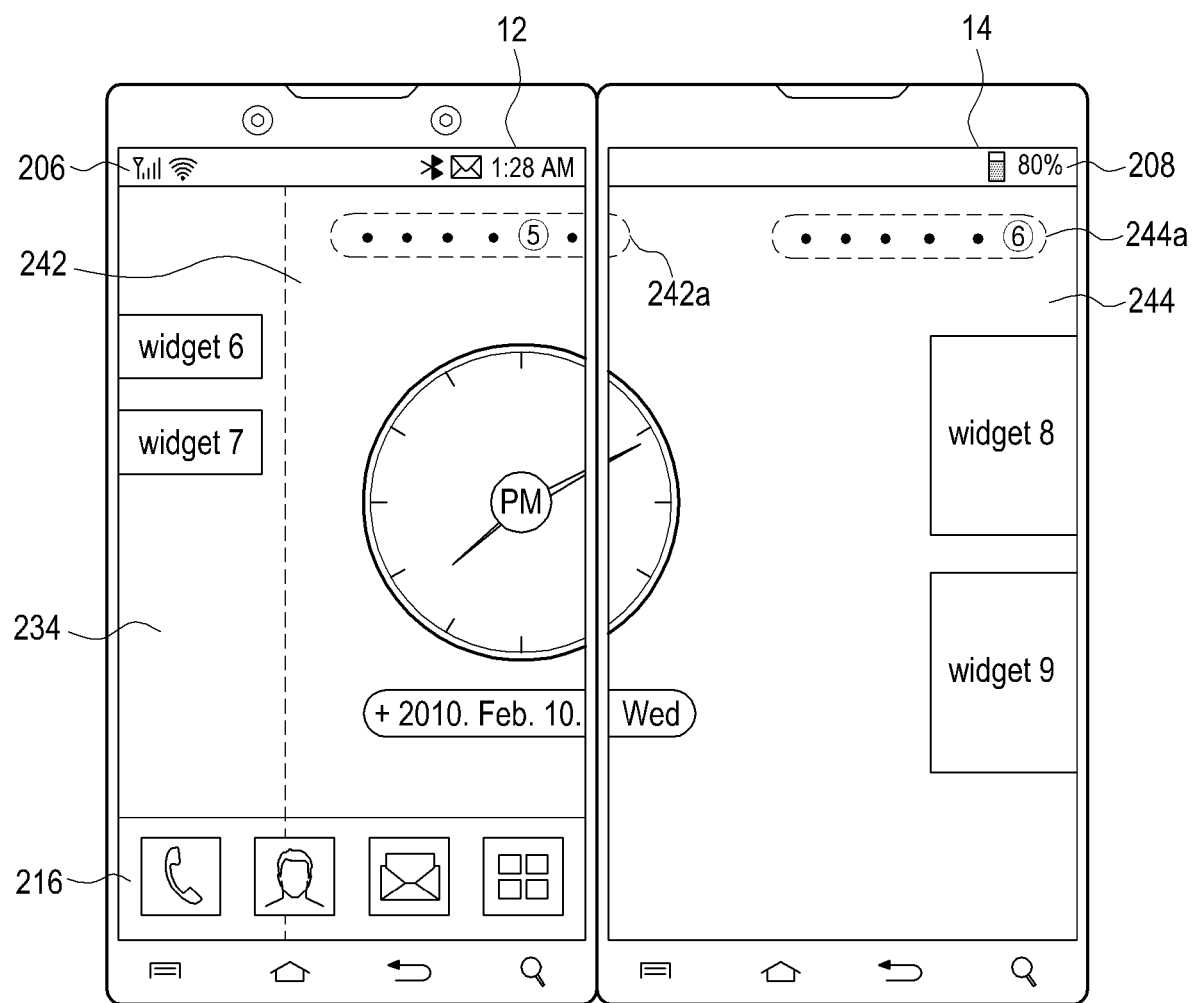

When a pre-designated touch gesture 200b is detected from one of the first touch screen 12 and the second touch screen 14 while the third and fourth pages 232 and 234 are displayed in the first and second touch screens 12 and 14, the portable device proceeds to FIG. 6C.

Referring to FIG. 6C, the first and second touch screens 12 and 14 display the following two pages, that is, fifth and sixth pages 242 and 244 and page counters 242a and 244a, respectively, in response to the touch gesture 200b. Similar to FIG. 6, the fifth and six pages 242 and 244 may be displayed while sliding in a direction from the second touch screen 14 to the first touch screen 12 according to the touch gesture 200b, and the dock area 216 is fixed on a designated position within the first touch screen 12 regardless of the touch gesture 200b.

Although not illustrated, when a touch drag in a direction from one position of the first touch screen 12 to the second touch screen 14 is detected while the fifth and sixth pages 242 and 244 are displayed, the portable device 100 displays the previous pages, that is, the third pate 232 and the fourth page 234 in the first and second touch screens in response to the touch drag. Similarly, the third and fourth pages 232 and 234 may be displayed while sliding through the hinge in a direction from the touch screen 12 to the second touch screen 14 according to the touch drag.

When the first and second touch screens 12 and 14 are connected to be discontinuous by the hinge or a separate connector, pages of the home screen may be displayed over both the first and second touch screens 12 and 14 when sliding through the hinge or connector as illustrated in FIG. 6C.

The portable device switches the home screen in the unit of one page or two pages by two touch gestures which are differently defined. For example, in FIG. 6A, the touch gesture 200a is defined as a touch drag of moving on the home screen by a predetermined distance or more, and the portable device switches the first and second pages 202 and 204 of the first and second touch screens 12 and 14 to the third and fourth pages 232 and 234, that is, in the unit of two pages in response to the detection of the touch drag 200a. Further, the home screen may be switched in the unit of one page by a touch gesture of moving by a short distance. That is, in FIG. 6A, when a pre-designated touch gesture, for example, a flick in a direction from the second touch screen 14 to the first touch screen 12 is detected from one of the first touch screen 12 and the second touch screen 14 to shortly switch the home screen, the portable device proceeds to FIG. 6D.

Figure 6D:
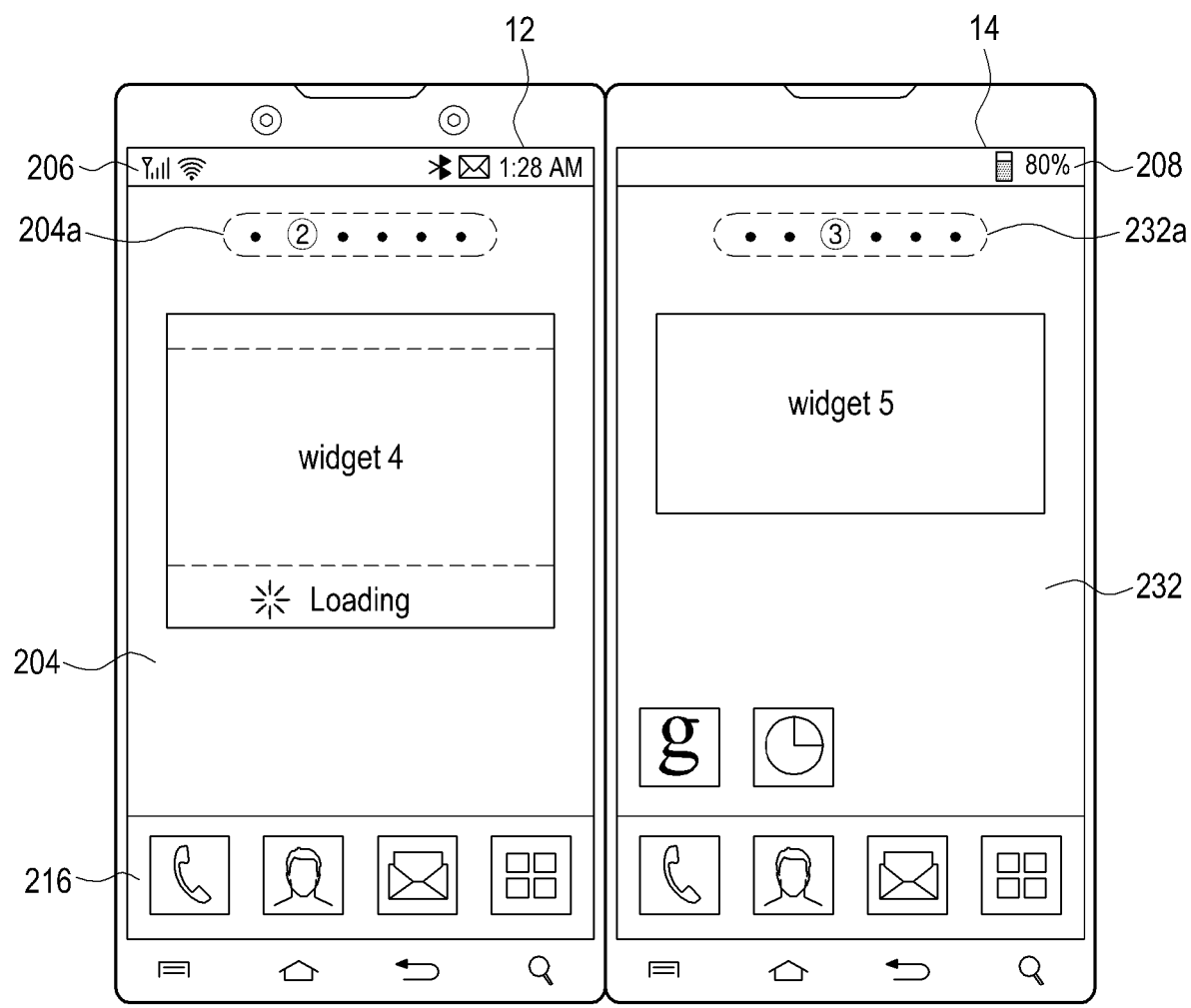

Referring to FIG. 6D, in response to the flick detected from one of the first and second touch screens 12 and 14 displaying the first and second pages 202 and 204, the portable device displays the second page 204 in the first touch screen 12 and displays the third page 232 in the second touch screen 14. The second and third pages 204 and 232 are displayed while sliding in a direction from the second touch screen 14 to the first touch screen 12 according to a flick and, and the second page 202 may be displayed over both the first and second touch screens 12 and 14.

Figure 6E:
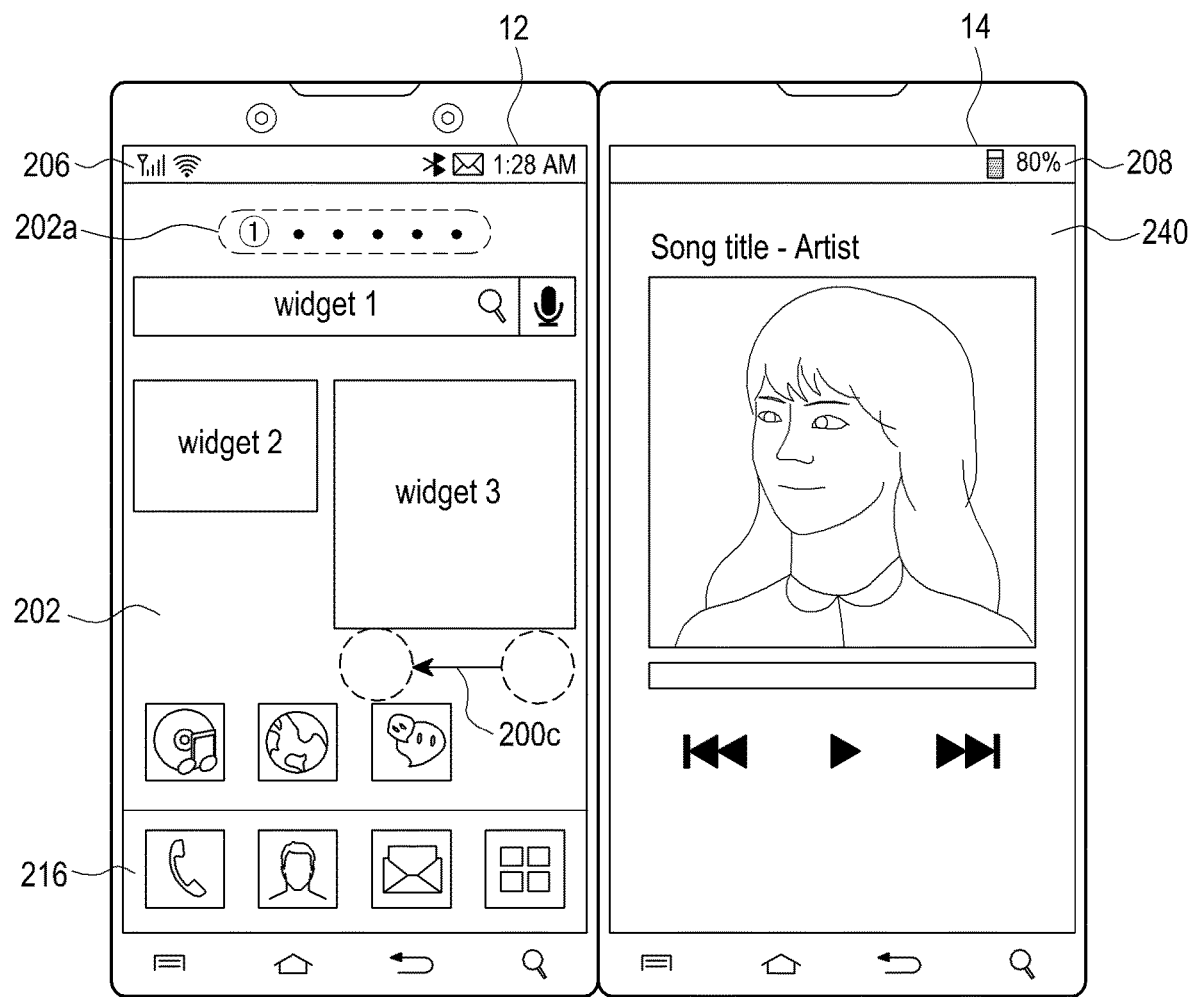
Figure 6F:
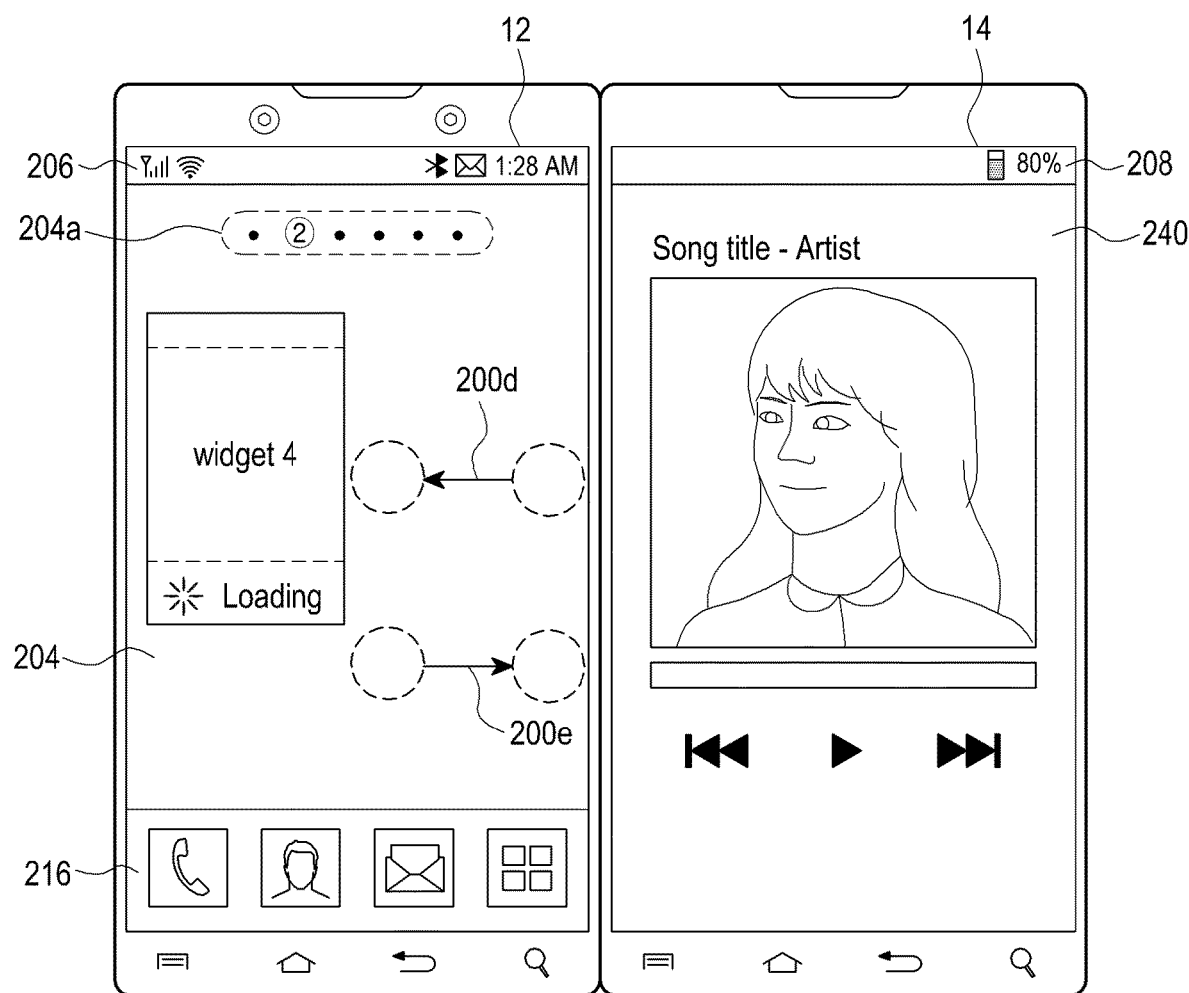
Figure 6G:
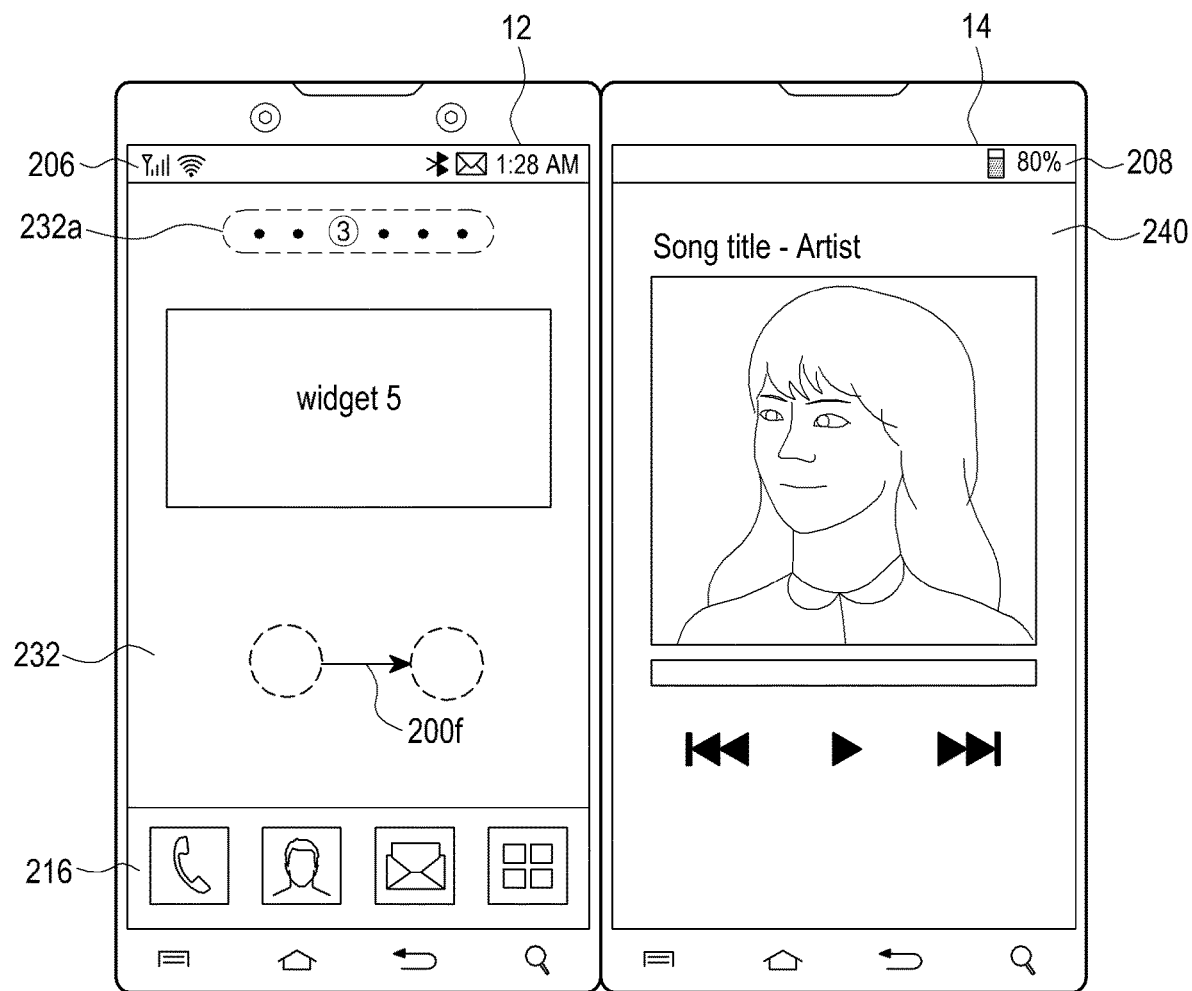

FIGS. 6E to 6G illustrate a scenario of switching the page of the home screen while an application different from the home screen is displayed in the first and second touch screens 12 and 14.

Referring to FIG. 6E, the first touch screen 12 displays the first page 202, the page counter 202a, and the dock area 216 of the home screen, and the second touch screen 14 displays another application 240. In the shown example, the application 240 is a music play application. When a pre-designated touch gesture 200c for switching the page of the home screen is detected from the first touch screen 12, the portable device proceeds to FIG. 6H. As an example, the touch gesture 200c is generated within the first touch screen 12 and corresponds to a flick or a touch drag which moves in a direction from the second touch screen 14 to the first touch screen 12.

Referring to FIG. 6F, the portable device replaces the first page 202 and the page counter 202a of the first touch screen 12 with the second page 204 and the page counter 204a of the second page 204 and then displays the replaced second page 204 and page counter 204a in response to the detection of the touch gesture 200c. Here, the dock area 216 of the first touch screen 12 and the application 240 of the second touch screen 14 are maintained in spite of the touch gesture 200c. As one embodiment, the second page 204 may be displayed while sliding in a direction from the second touch screen 14 to the first touch screen 12 according to a motion direction and a speed of the touch gesture 200c.

When a touch gesture 200e in a direction of the second touch screen 14 is detected from the first touch screen 12 displaying the second page 204, the portable device returns to FIG. 6E to display the first page 202 corresponding to a previous page in the first touch screen 12 and maintain the dock area 216 of the first touch screen 12 and the application 240 of the second touch screen 14. When a touch gesture 200d in a direction from the second touch screen 14 to the first touch screen 12 is detected from the first touch screen 12 displaying the second page 204, the portable device moves to FIG. 6G to display a next page.

Referring to FIG. 6G, the portable device replaces the second page 204 and the page counter 204a of the first touch screen 12 with the third page 232 and the page counter 232a of the home screen and displays the replaced third page 232 and page counter 232a in response to the detection of the touch gesture 200d. Similarly, the dock area 216 of the first touch screen 12 and the application 240 of the second touch screen 14 are maintained in spite of the touch gesture 200d. When a touch gesture 200f in a direction of the second touch screen 14 is detected from the first touch screen 12 displaying the third page 232, the portable device returns to FIG. 6F to display the second page 204.

FIGS. 7A to 7J illustrate scenarios of adding an icon of an application to the home screen displayed in the first and second touch screens 12 and 14.

Figure 7A:
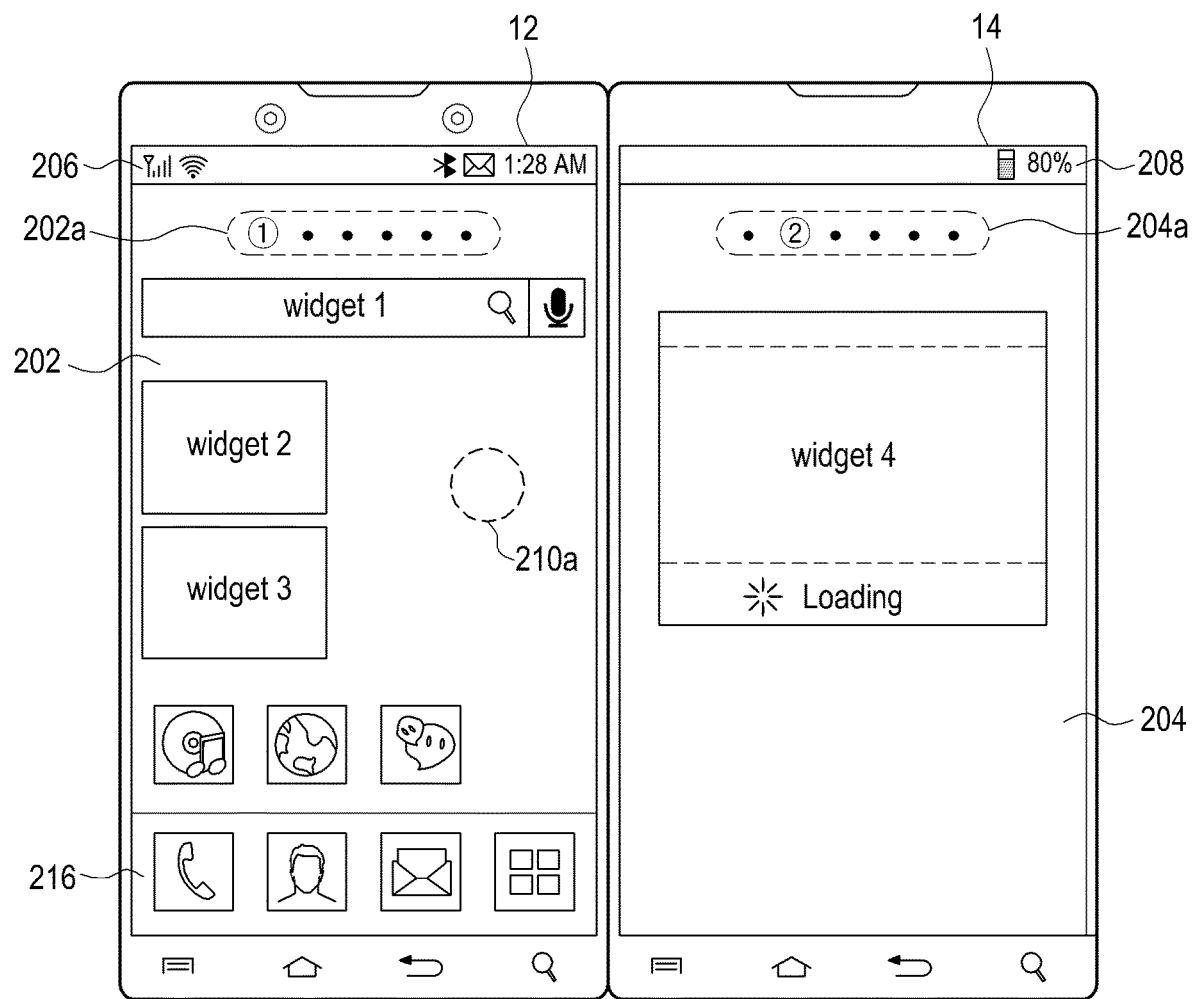
FIGS. 7A to 7J are diagrams illustrating a scenario of adding an icon of an application to a home screen displayed in first and second touch screens 12 and 14 according to one or more exemplary embodiments.

Referring to FIG. 7A, the first touch screen 12 displays the first page 202 of the home screen, and the second touch screen 14 displays the second page 204 of the home screen. Although not illustrated, even when another application or information, other than the home screen is displayed in the second touch screen 14, the following scenario of adding the icon may be similarly applied. When a predetermined touch gesture 210a, for example, a touch which is maintained for a predetermined effective time or more, that is, a long-tap is detected from one of the first and second touch screens 12 and 14 displaying the home screen, for example, from the first touch screen 12 in the shown example, the portable device proceeds to FIG. 7C.

Figure 7B:
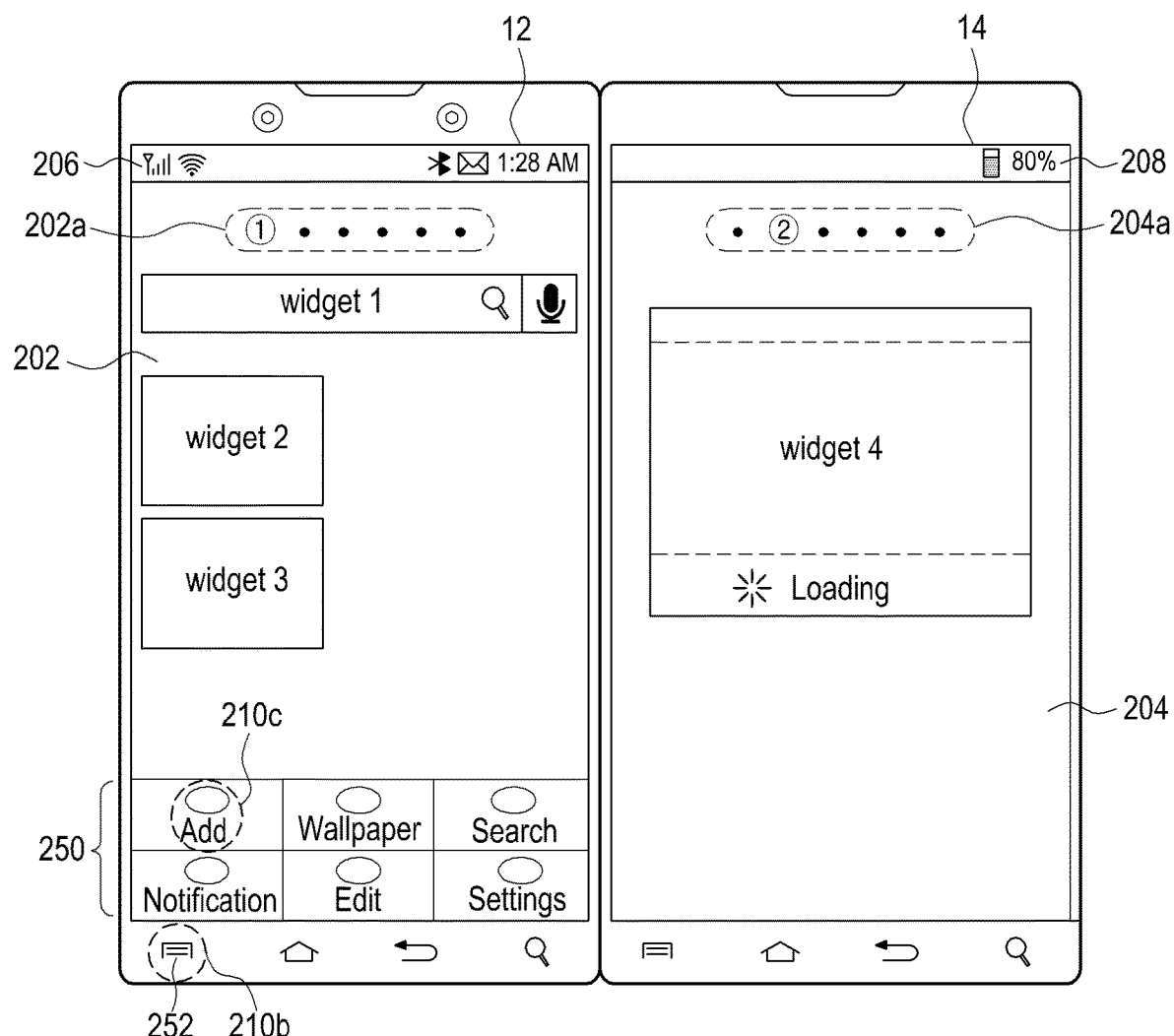

As a selectable embodiment, an icon may be added using a menu button 252 which is one of physical buttons arranged in the first panel having the first touch screen 12 as illustrated in FIG. 7B. The portable device detects an input 210b of the menu button 252 arranged in the first panel, for example, a tap gesture or a touch-and-hold on a touch detection type menu button and displays a menu window 250 for the home screen in a lower end of the first touch screen 12. The menu window 250 includes at least one of an icon addition key, a background screen setting key, a search key, a notification setting key, an icon editing key, and a home screen setting key. When a predetermined touch gesture 210c, for example, a tap gesture is detected from the icon addition key within the menu window 250, the portable device proceeds to FIG. 7C.

Figure 7C:
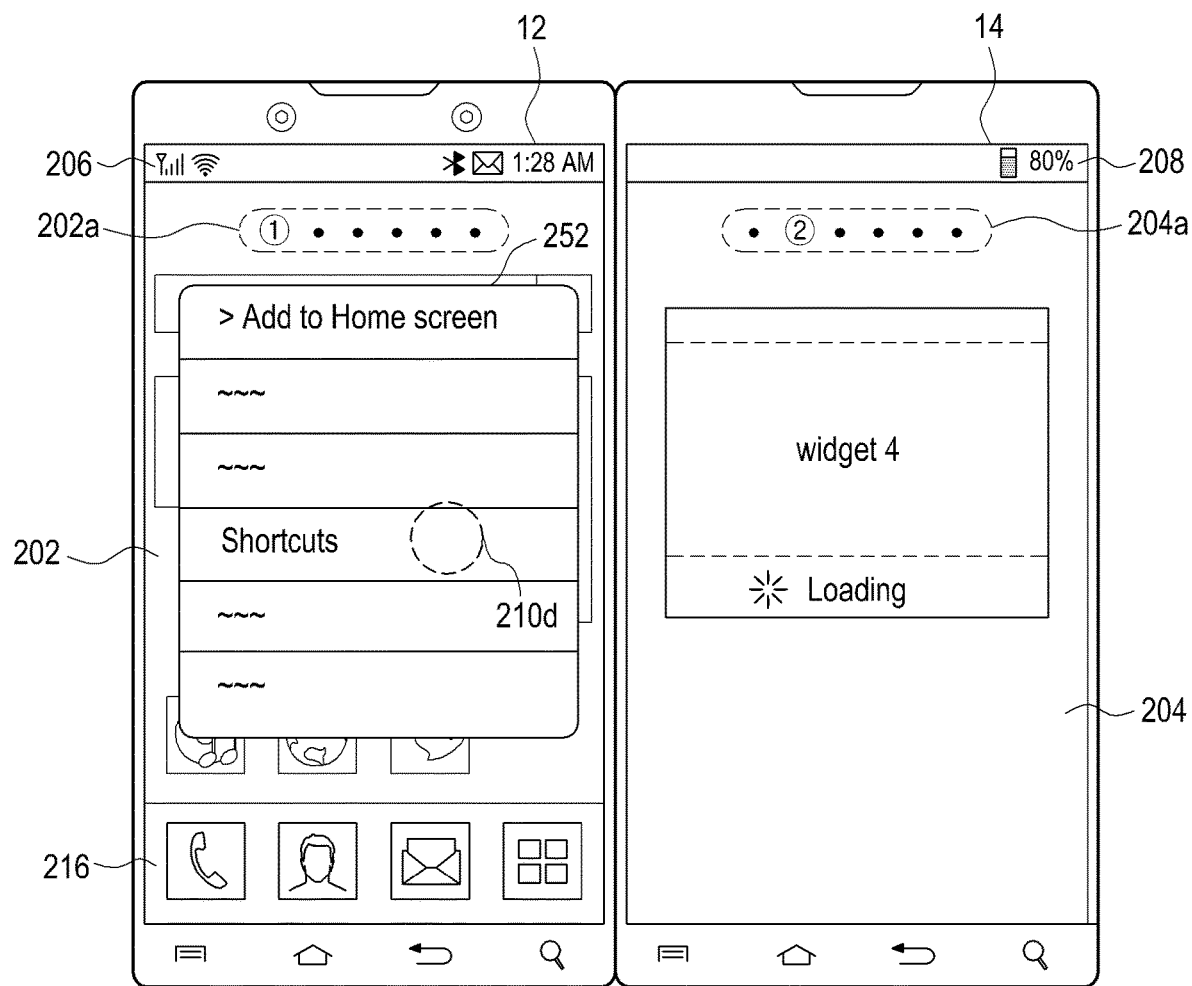

Referring to FIG. 7C, the first touch screen 12 displays an item addition popup window 252 for adding items of the home screen to the first page 202 in response to detections of the touch gestures 210a and 210c. The popup window 252 includes at least a shortcut icon item. When a tap gesture 210d is detected from the shortcut icon item, the portable device proceeds to FIG. 7D.

Figure 7D:
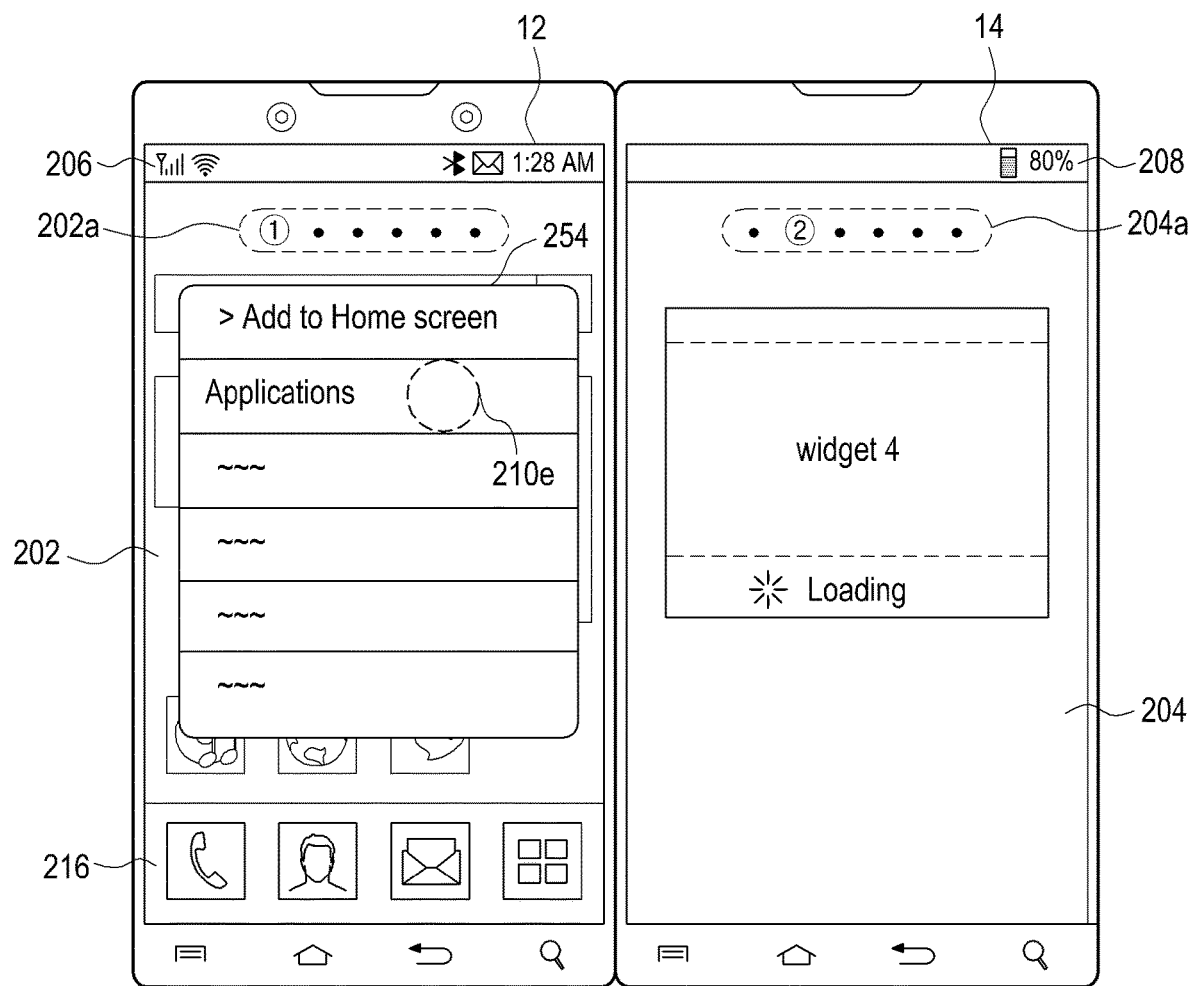

Referring to FIG. 7D, the portable device replaces the icon addition popup window 252 with a shortcut icon selection window 254 and displays the replaced shortcut icon selection window 254 in response to the detection of the tap gesture 210d. As another embodiment, the shortcut icon selection window 254 may be displayed to be overwritten on the icon addition popup window 252. The shortcut icon selection window 254 includes at least an application menu item. When a tap gesture 120e is detected from the application menu item, the portable device proceeds to FIG. 7E.

Figure 7E:
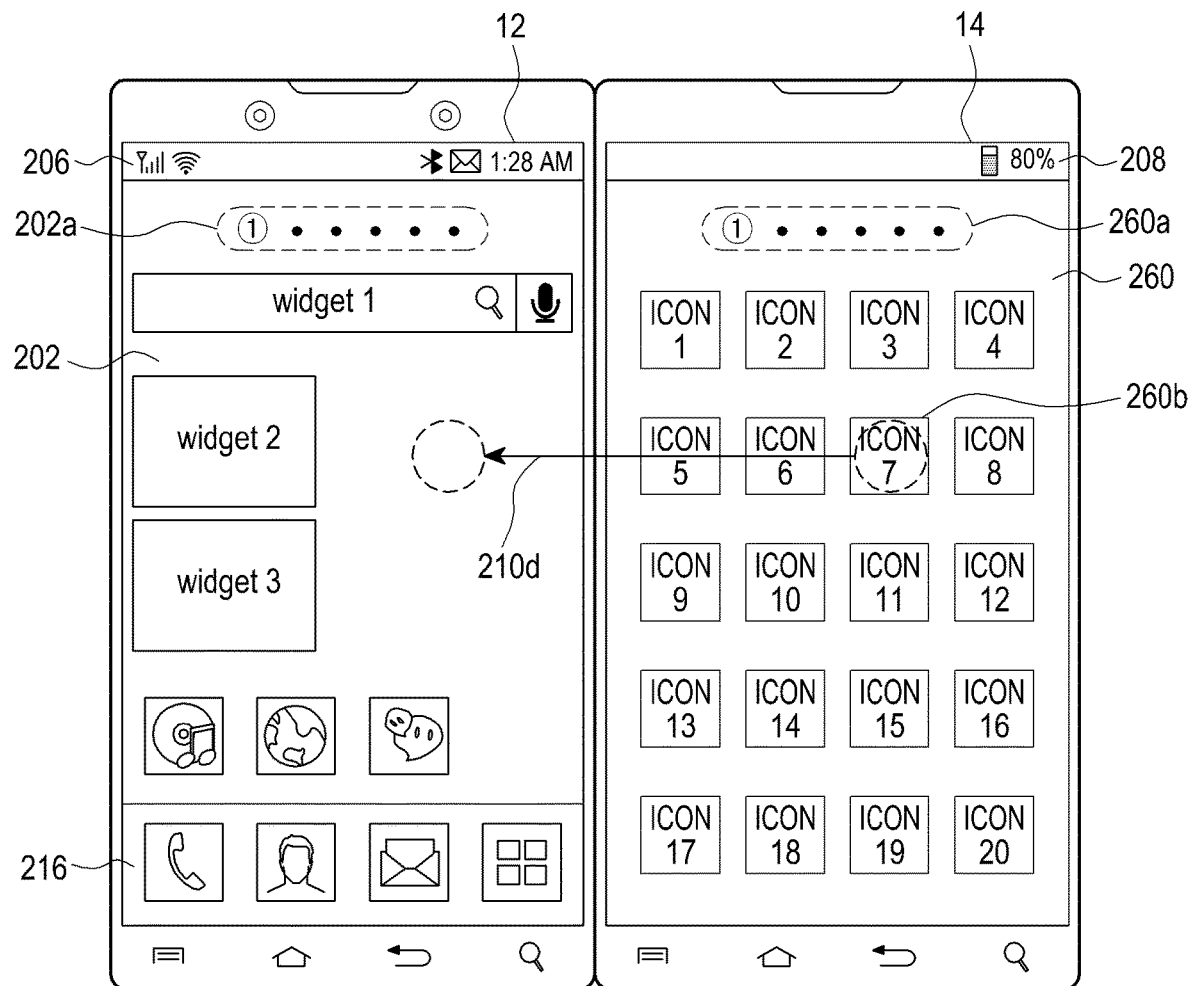

Referring to FIG. 7E, the portable device displays existing information, that is, the first page 202 of the home screen in the first touch screen 12 and displays a first page 260 of the application menu in the second touch screen 14 in response to the detection of the tap gesture 210e. The application menu is configured to provide lists of applications which are stored and executable in the portable device, and the first page 260 includes at least some of shortcut icons of applications registered in the application menu. When the application menu includes a plurality of pages, the second touch screen 14 can display a page counter 260a together with the first page 260.

Figure 7F:
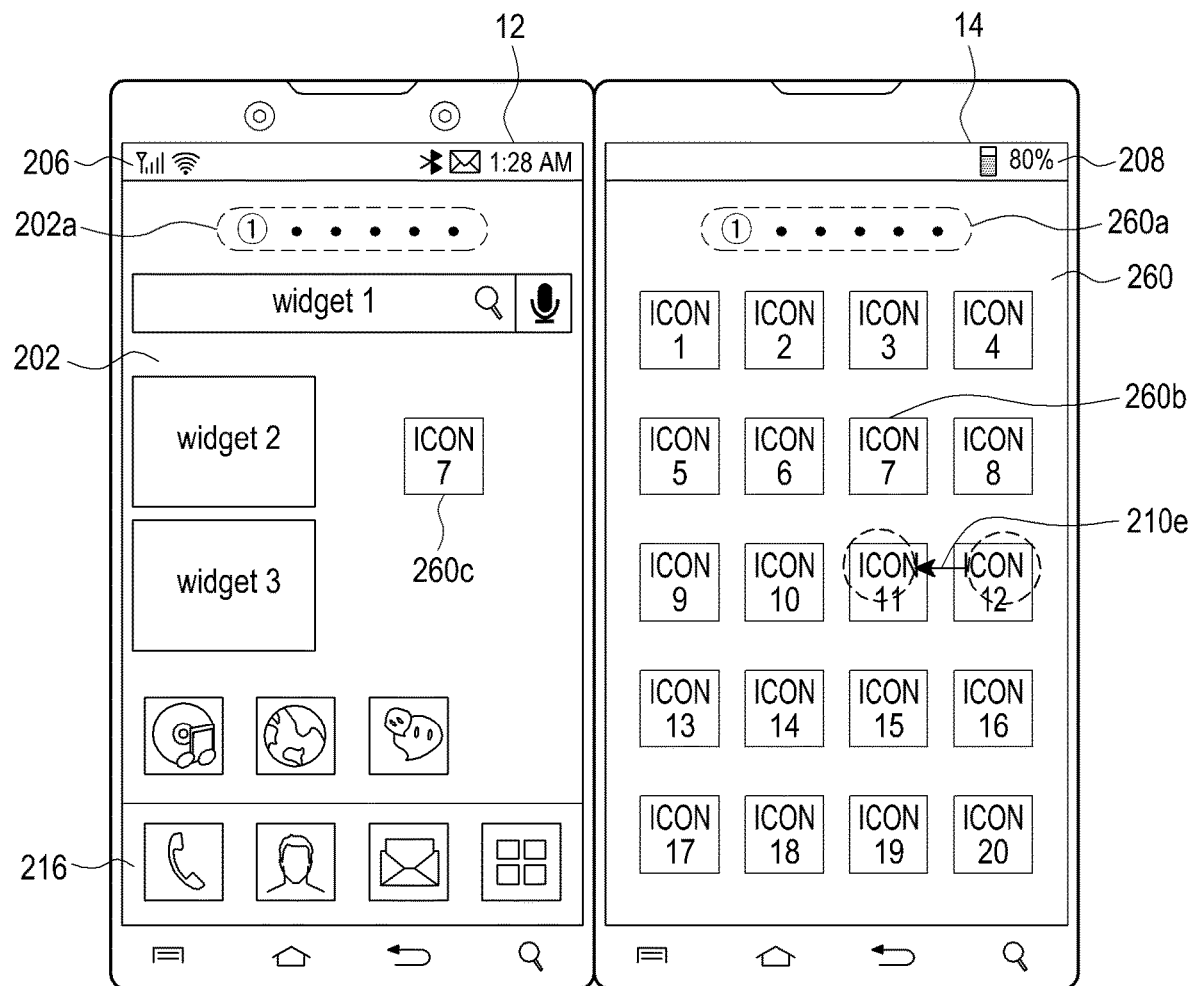

When the touch gesture 210d which starts at one 260b of the icons included in the first page 260 of the application menu displayed in the second touch screen 14, that is, "ICON7" in the shown example and is released on the first touch screen 12, for example, a touch drag and drop is detected, the portable device proceeds to FIG. 7F.

Referring to FIG. 7F, the portable device displays an icon 260c which is a copy of the icon 260b selected by the touch gesture 210d in the first touch screen 12 in response to the detection of the touch gesture 210d. For example, the icon 260c may be disposed in a position where the touch gesture 210d is released.

Figure 7G:
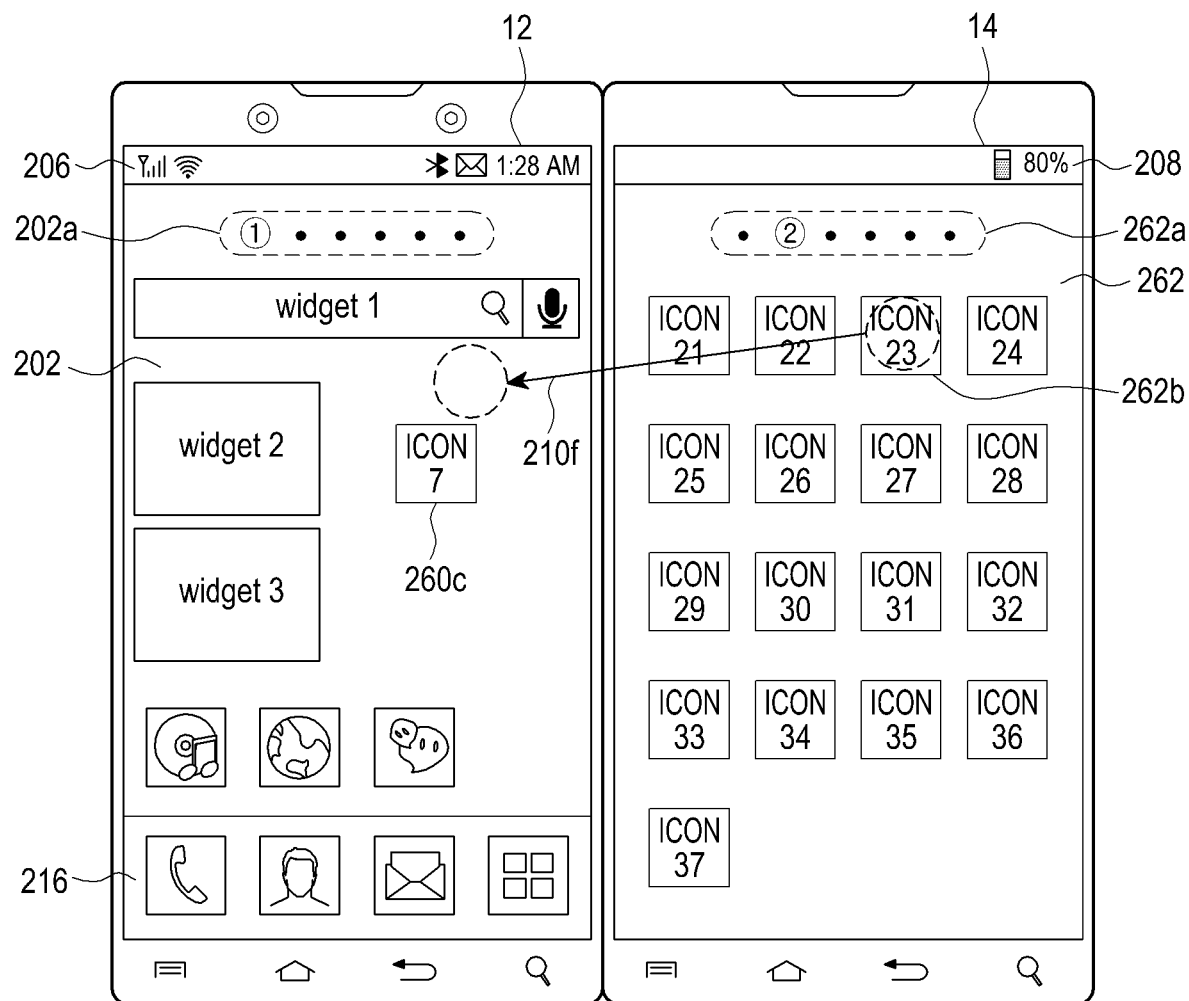

When the predetermined touch gesture 210e for switching the page, for example, a flick which starts at one position of the second touch screen 14 and moves in a direction of the first touch screen 12 is detected while the first page 260 of the application menu is displayed in the second touch screen 14, the portable device proceeds to FIG. 7G. The touch gesture 210e starts and is released within the second touch screen 14.

Referring to FIG. 7G, the portable device displays a second page 262 of the application menu in the second touch screen 14 in response to the detection of the touch gesture 210e. The first page 260 is replaced with the second page 262 and the second page 262 may be displayed while sliding in a direction of the first touch screen 12. When the application menu includes a plurality of pages, the second touch screen 14 can display a page counter 262a together with the second page 262. When one 262b of the icons included in the second page 262 of the application menu displayed in the second touch screen 14, that is, the touch gesture 210f which starts at "ICON23" and is released on the first touch screen 12, for example, a touch drag and drop is detected, the portable device proceeds to FIG. 7H.

Figure 7H:
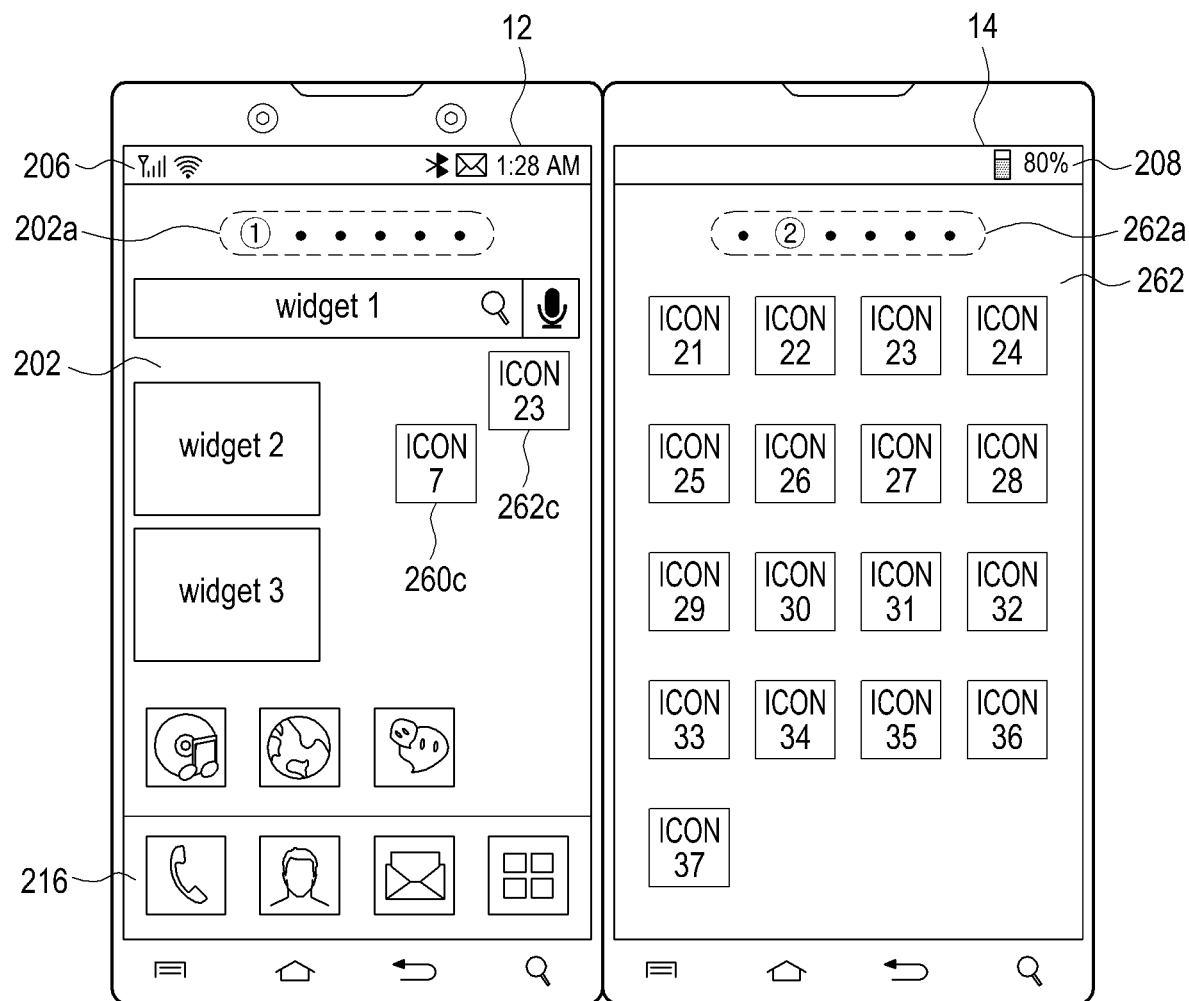

Referring to FIG. 7H, the portable device displays an icon 262c which is a copy of the icon 262b selected by the touch gesture 210f in the first touch screen 12 in response to the detection of the touch gesture 210f. For example, the icon 262c may be disposed in a position where the touch gesture 210f is released.

Figure 7I:
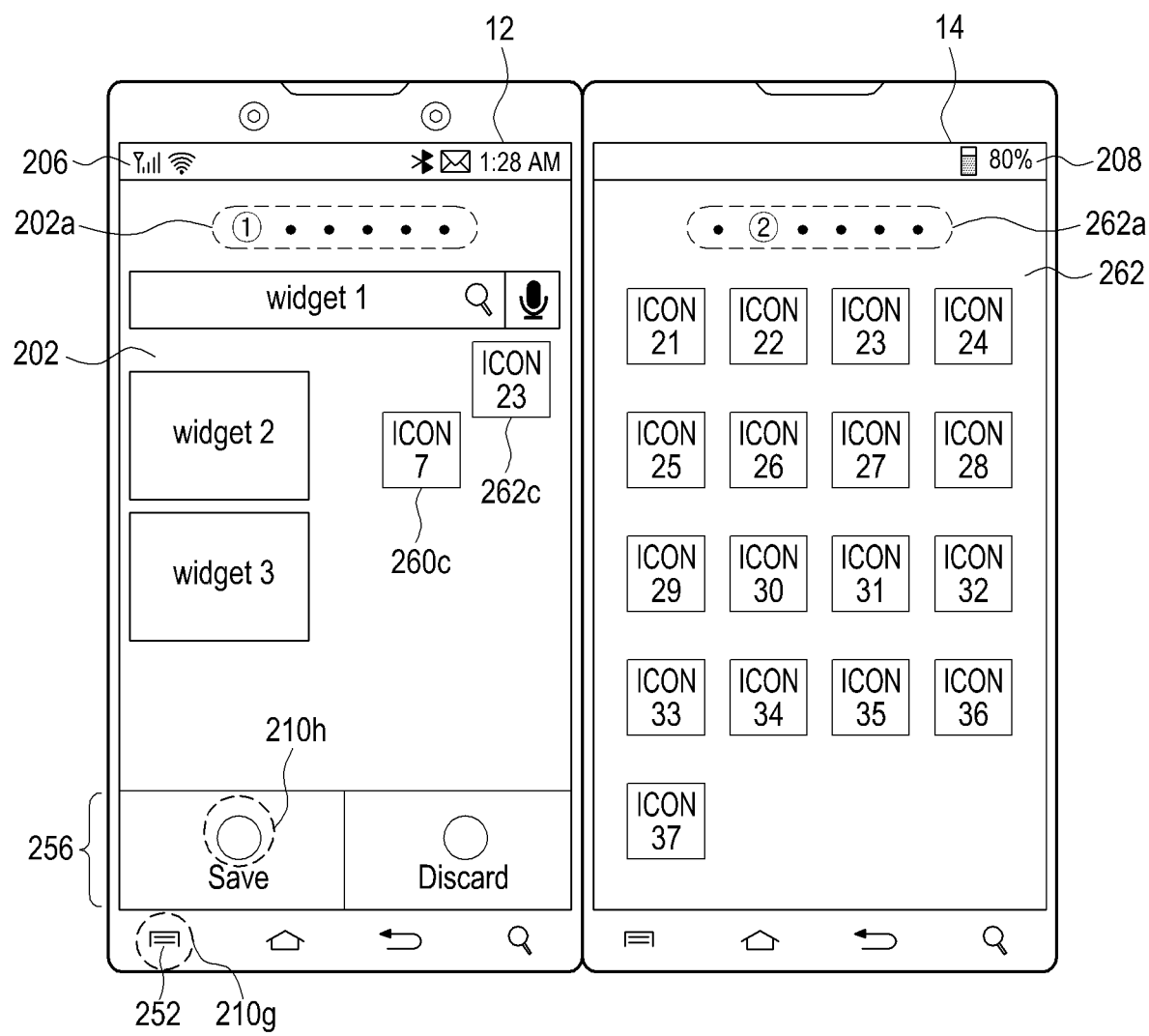

When the home screen is displayed in the first touch screen 12 and the back button or the home button which is one of the physical buttons arranged in the first panel is input while the application list is displayed in the second touch screen 14 as illustrated in FIGS. 7F to 7H, the portable device stores icons displayed in the first touch screen 12 as the home screen and displays the next page 204 of the home screen instead of removing the application list from the second touch screen 14 as illustrated in FIG. 7I.

Figure 7J:
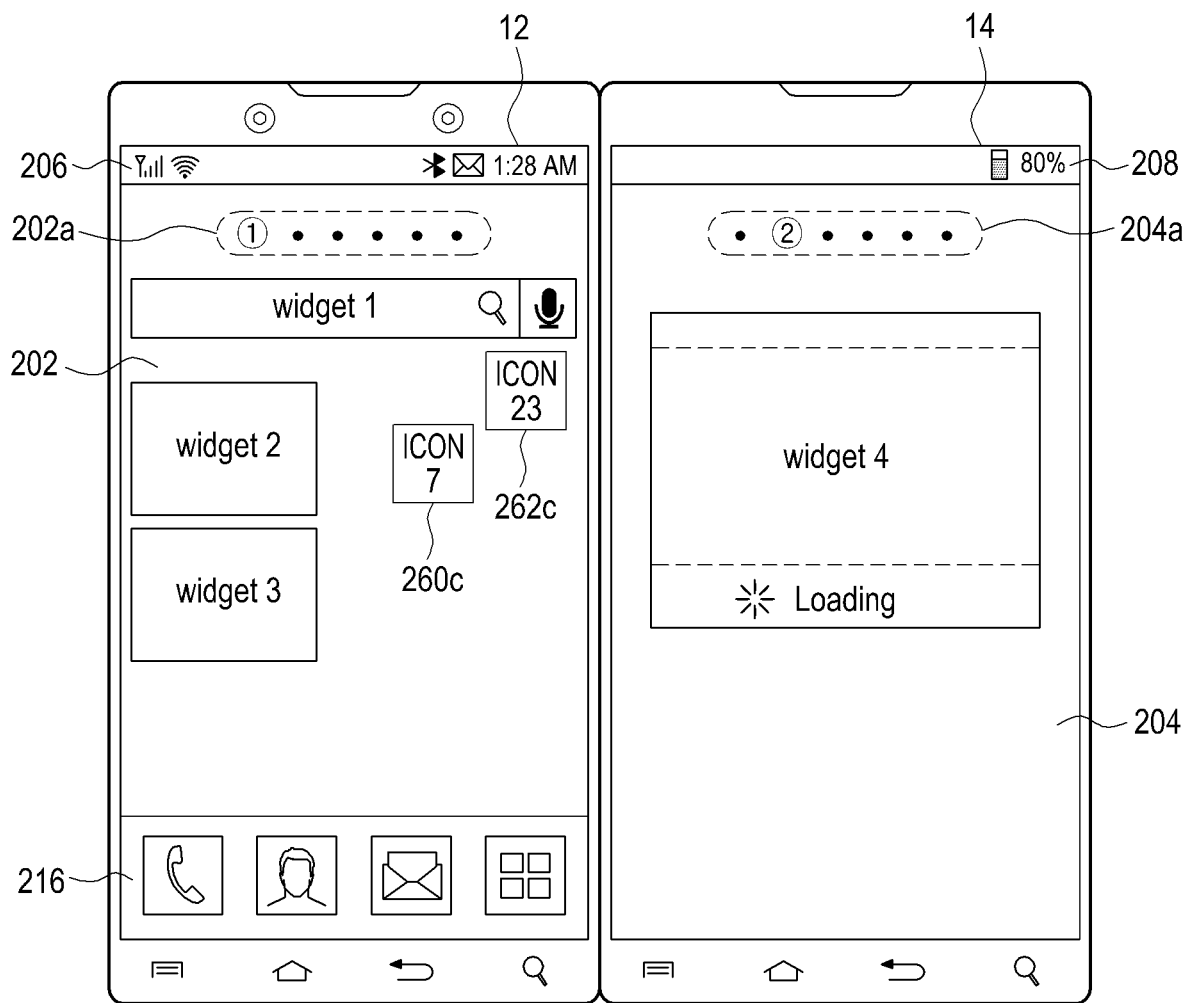

As another embodiment, when the home screen is displayed in the first touch screen 12 and the menu button which is one of the physical buttons arranged in the first panel is input while the application menu for editing the home screen is displayed in the second touch screen 14, the portable device displays the menu window 256 for completing the home screen editing. The menu window 256 includes at least one of a storage key and an ignore key. When a tap gesture 210h is detected from the storage key within the menu window 256, the portable device stores icons, which include icons 260c and 262c copied from the application lists 260 and 262, displayed in the first touch screen 12 as the home screen and displays previous information, that is, the second page 204 of the home screen instead of removing the application menu from the second touch screen 14 as illustrated in FIG. 7J.

Although not illustrated, when the tap gesture is detected from the disregard key within the menu window 256, the portable device removes the added icons 260c and 262c from the first touch screen 12 and returns to FIG. 7A.

The aforementioned dual home screen function may be similarly applied to the application menu which is a basic application of the portable device. The application menu may be loaded by an icon or menu displayed in the home screen or an external button and provide more application lists, that is, icons in comparison with the home screen. The application menu provides a plurality of pages including a plurality of icon groups designated as the application menu.

Figure 8A:
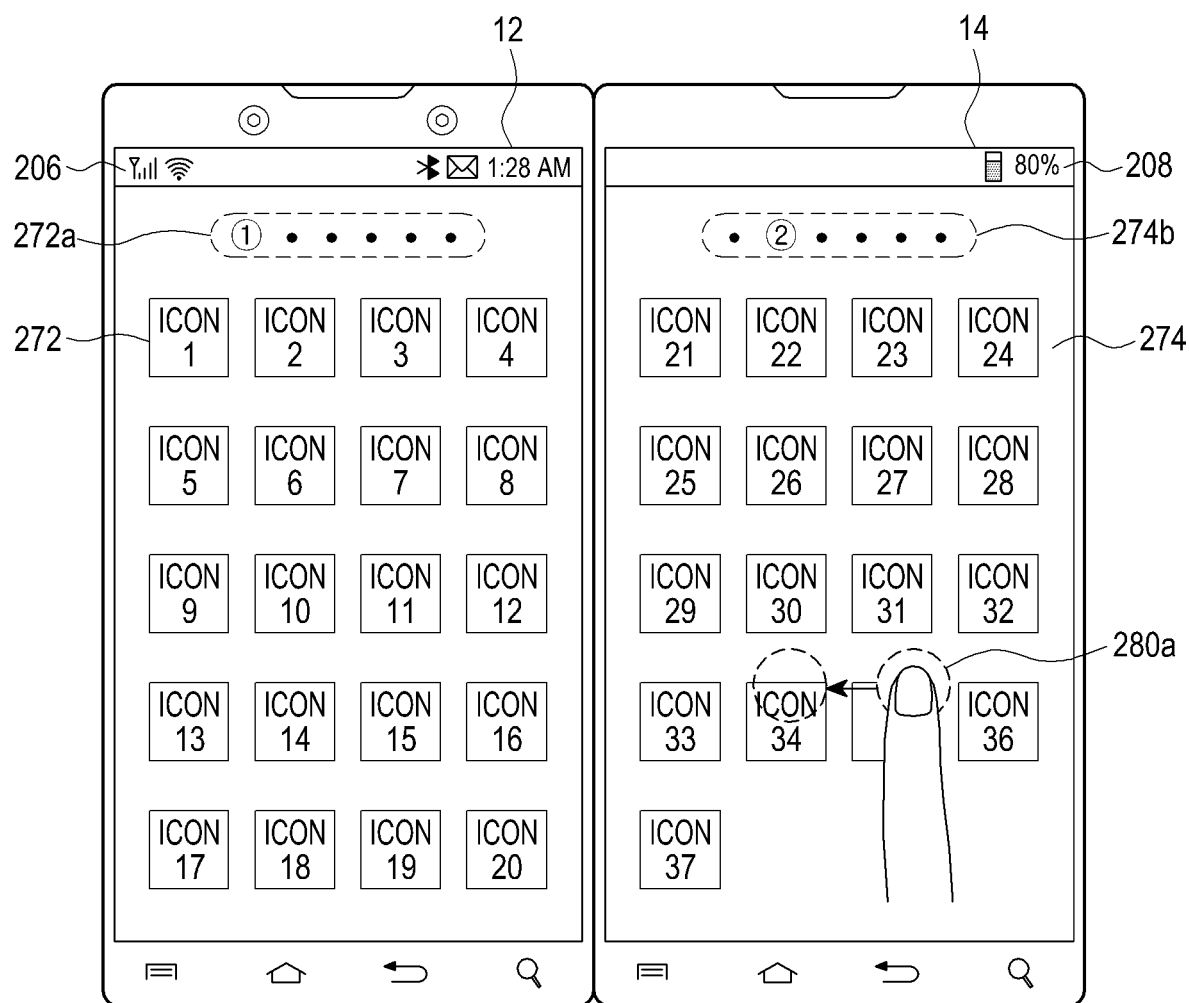
FIGS. 8A to 8C are diagrams illustrating a user interface of an application menu according to one or more exemplary embodiments.
Figure 8B:
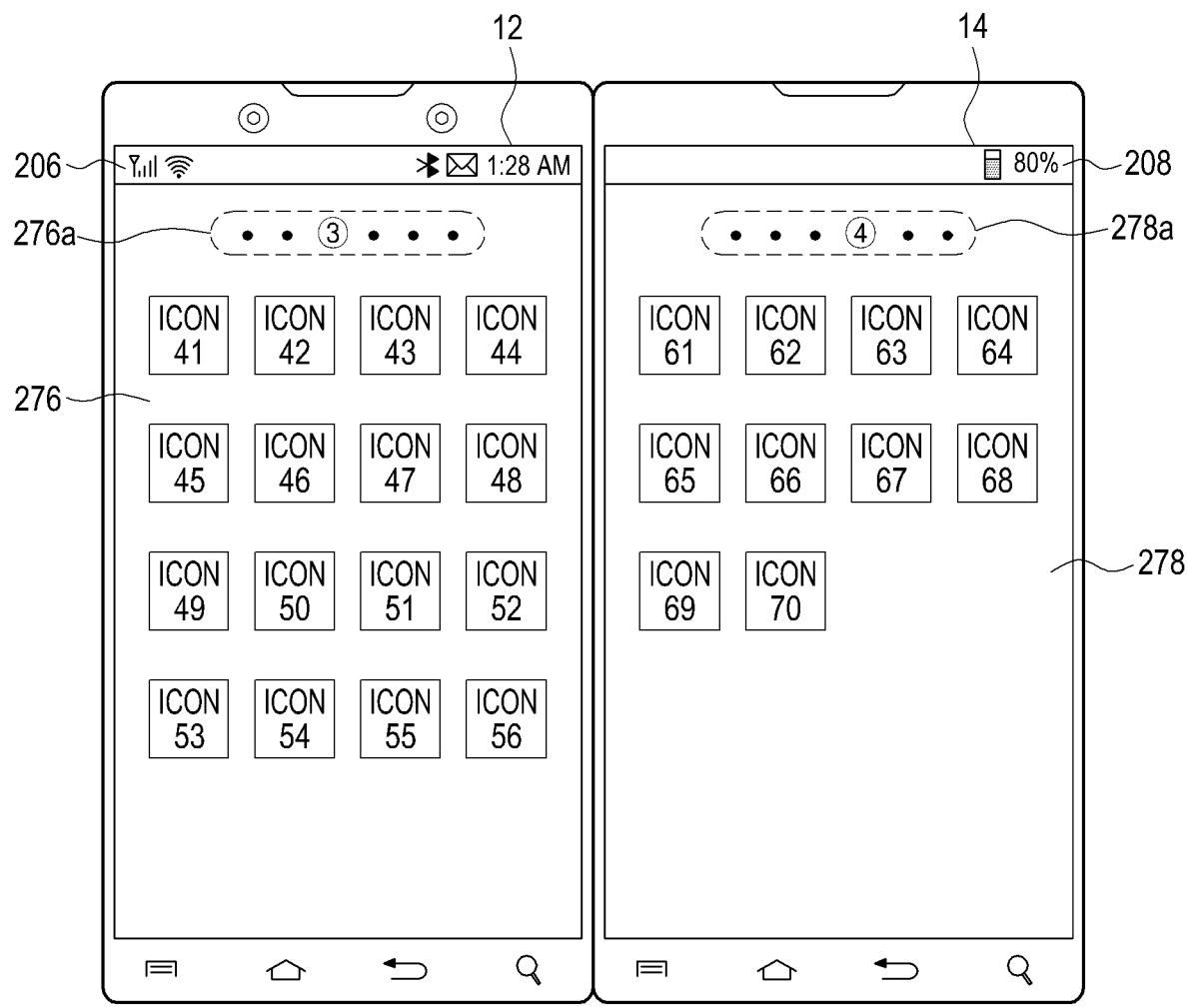

The portable device provides two pages designated as the application menu through the display device including the first touch screen and the second touch screen arranged on at least one foldable panel, and moves and navigates in the unit of two pages in response to a touch gesture of the user FIGS. 8A and 8B illustrate a user interface of the application menu according to one or more exemplary embodiments.

Referring to FIG. 8A, when a tap gesture is detected from the icon of the application list provided in the home screen or the physically configured home button is input, the application menu is executed and first and second pages 272 and 274 designated as the application menu are displayed in the first and second touch screens 12 and 14. Each of the pages 272 and 274 includes one or more icons corresponding to each of the applications or application groups. When the application menu includes a plurality of pages, the first and second touch screens 12 and 14 may further display page counters 272a and 274a together with the first and second pages 272 and 274.

When a pre-designated touch gesture 280a in a direction of the first touch screen 12, for example, a flick or a touch drag is detected from one position of the second touch screen 14, the portable device displays the next pages of the application menu, that is, a third page 276 including a third icon group and a fourth page 278 including a fourth icon group in the first and second touch screens 12 and 14 in response to the touch gesture 280a as illustrated in FIG. 8B. Here, the third page 276 and the fourth page 278 may be displayed while sliding in a direction from the second touch screen 14 to the first touch screen 12 according to a motion direction and a speed of the touch gesture 280a. Similarly, the first and second touch screens 12 and 14 may further display page counters 276a and 278a together with the third page 276 and the fourth page 278.

Although not illustrated, when a touch gesture in a direction from the first touch screen 12 to the second touch screen 14 is detected from the first or second touch screen 12 or 14, the portable device displays previous pages of the application menu, that is, the first page 272 including the first icon group and the second page 274 including the second icon group in the first and second touch screens 12 an 14 in response to the touch gesture. Similarly, the first and second pages 272 and 274 may be displayed while sliding in a direction from the first touch screen 12 to the second touch screen 14 according to the touch gesture.

When the first and second touch screens 12 and 14 are connected not to be continuous by the hinge or separate connector, the pages may be displayed over both the first and second touch screens 12 and 14 when sliding through the hinge or connector. As a selectable embodiment, each icon within each page may be displayed while rapidly passing though the hinge or connector without being displayed over both the first and second touch screens 12 and 14.

When a plurality of items such as icons of the home screen or the application menu or thumbnail images of a photo gallery application are displayed in two touch screens in a list or a grid form, the items may be scrolled (or translated) together by the touch gesture. The touch gesture may be a flick, a sweep, or a touch drag.

As one embodiment, the touch gesture may start at one position within the first touch screen 12 and be released at another position (farther from the second touch screen 14) within the first touch screen 12. As an embodiment, the touch gesture may start at one position within the second touch screen 14 and be released at another position (closer to the first touch screen 12) within the second touch screen 14 or released at one position within the first touch screen 12.

When the touch gesture starts and is released within one of the first and second touch screens 12 and 14, the portable device replaces two pages of the items displayed in the first and second touch screens 12 and 14 with the next or previous two pages according to a motion direction of the touch gesture and then displays the replaced next or previous two pages. As another embodiment, the items displayed in the first and second touch screens 12 and 14 may be scrolled according to a motion direction, a motion distance, and a speed of the touch gesture. As an example, the portable device scrolls items corresponding to the distance or speed at which the touch gesture has moved.

As another embodiment, when the touch gesture is a flick which is generated in one of the first and second touch screens 12 and 14 and moves through the hinge (or connector), the portable device scrolls two pages displayed in the first and second touch screens 12 and 14 up to first or last two pages according to a motion direction of the touch gesture. As still another embodiment, when the touch gesture is the sweep which is generated in one of the first and second touch screens 12 and 14 and moves through the hinge (or connector), the portable device scrolls and displays the two pages displayed in the first and second touch screens 12 and 14 by the speed of the touch gesture.

When the items are scrolled, each of the items is not displayed over the two touch screens. That is, when each of the items reaches the hinge (or connector), it skips over the hinge and then is displayed in the next touch screen.

The touch screens of the portable device are switched to a portrait view mode or a landscape view mode based on a detection signal received from one or more accelerometers and then display information according to the switched mode. That is, the accelerometer may be included in the sensor module 170 and senses a rotation of the portable device. The accelerometer detects the switching between the portrait view mode in which the touch screens of the portable device are arranged in a left side and a right side and the landscape view mode in which the touch screens of the portable device are arranged in an upper side and a lower side, and generates the detection signal.

When the portable device is rotated substantially by 90 degrees and switched to the landscape view mode while displaying items in a grid form in the portrait view mode, the items within the grid may be rotated in a horizontal direction and scrolled. When the items are horizontally arranged, the items on the grid may be scrolled in a vertical direction according to a selection of the manufacturer or user or simultaneously scrolled in both an upper screen and a lower screen in a horizontal direction. Similarly, a movement of each grid is based on a direction and a speed of the motion of the touch gesture.

As another selectable embodiment, when a list is displayed in one touch screen and not displayed in the other touch screen in the portrait view mode, the list is displayed in both the two touch screens according to a setting of the manufacturer or user or information of another touch screen is extensively displayed in the two touch screens when the portable device rotates by 90 degrees.

When the portable device is rotated by 90 degrees and switched to the landscape view mode while displaying the home screen or the application menu in the portrait view mode, the portable device may operate to display a search window or a pre-designated application (for example, a search window of an Internet browsing application) in at least one of the touch screens.

Figure 8C:
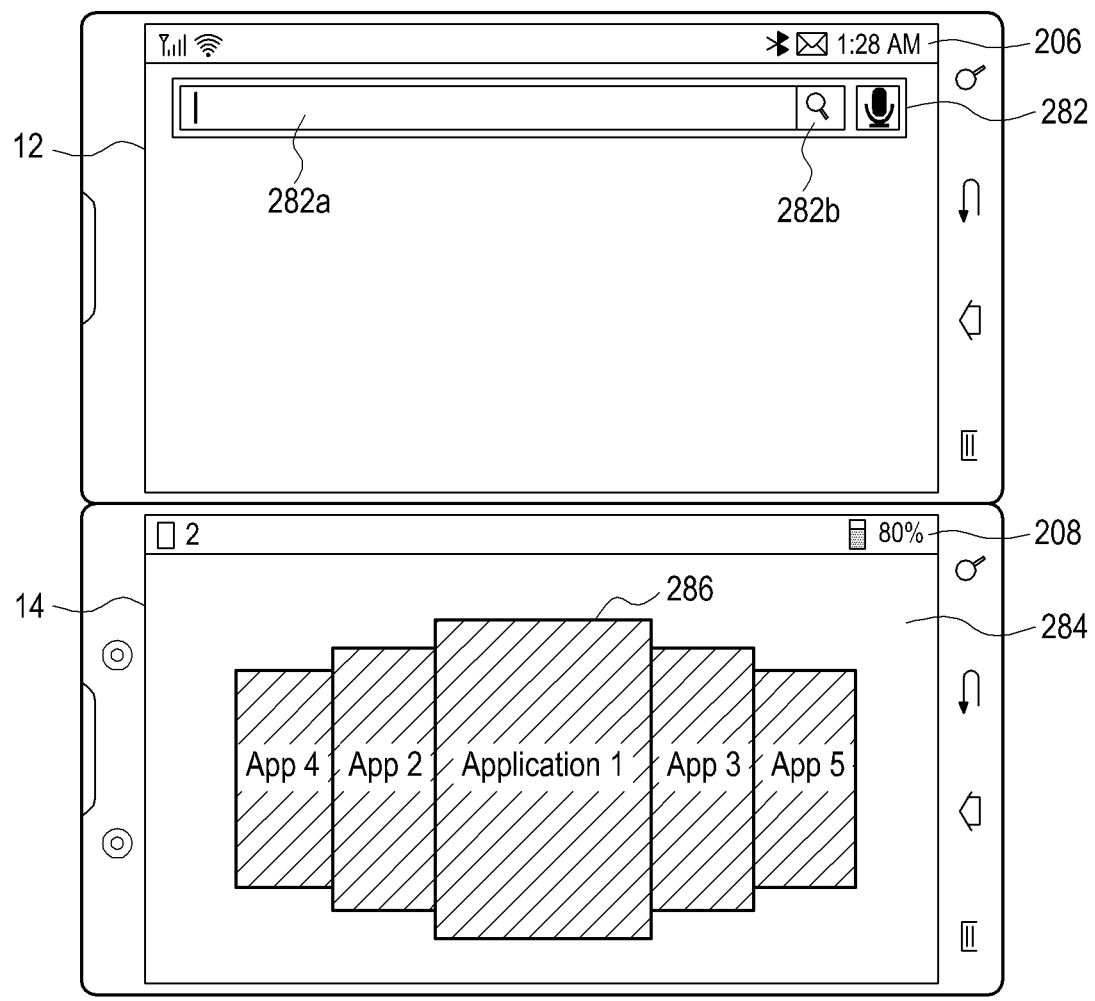

FIG. 8C illustrates an example of a user interface for using the landscape view mode of the home screen according to an exemplary embodiment. Here, although a touch screen layout in a case where the portable device rotates by 90 degrees in a left direction is illustrated, the case can be applied when the portable device rotates by 90 degrees in a right direction. In the landscape view mode, it is described that the touch screen located in an upper part is the first touch screen 12.

Referring to FIG. 8C, when portable device is switched to the landscape view mode, that is, the portable device rotates by about 90 degrees while providing the home screen or pages of the application menu through the first and second touch screens 12 and 14 in the portrait view mode as illustrated in FIG. 6A or FIG. 8A, the first touch screen 12 displays a search window 282 interworking with the Internet browsing application or a pre-designated application. As one embodiment, the search window 282 may be displayed with or on the previously displayed home screen or page of the application menu of which a mode is switched to the landscape view mode. As another embodiment, the search window 282 may be displayed in an upper part of the second touch screen 14. As a selectable embodiment, the dock area 216 may be displayed in a position of one of the first and second touch screens 12 and 14, for example, a right end of the first touch screen 12 in the landscape view mode and shortcut icons within the dock area may be vertically arranged.

As a selectable embodiment, when the switching to the landscape view mode is performed, the second touch screen 14 replaces the page of the home screen with at least one pre-designated application, that is, a task manager screen including at least one running application 286 and displays the replaced page in the shown example. At this time, preview windows including simple information on each running application 286 or last executed information may be displayed in the task manager screen of the second touch screen 14 in an in activated state, for example, in a shaded state, or a shortcut icon of each running application 286 may be displayed in a grid or a list form. Further, the preview windows of the running application 286 may be displayed to partially overlap each other or displayed in a grid form not to overlap each other. The preview window refers to an area in a deactivated state in which a touch input is not allowed in comparison with a task screen which actually executes an application and provides a user interface such as the touch input.

As another embodiment, when the switching to the landscape view mode is performed, the second touch screen 14 displays the previously displayed home screen or page of the application menu of which a mode is switched to the landscape view mode and the search window 282 or displays a pre-designated application and the search window 282. The pre-designated application may be designated by the manufacturer or user. For example, the pre-designated application may be a quick search application, an Internet browsing application, a recommended application list in the landscape view mode provided by the portable device, and another application designated by the user.

As a selectable embodiment, when a touch gesture of the user is detected from one of the preview windows (or shortcut icons) of the running application, the second touch screen 14 can display a task screen (providing an activated user interface) through an execution of the corresponding application.

When a touch gesture (for example, tap gesture) of the user is detected from an input area 282a included in the search window 282 displayed in the first touch screen 12 in the landscape view mode in which the first touch screen is located in the upper part and the second touch screen 14 is located in the lower part, a virtual keypad for receiving a text input, that is, a keypad area (not shown) is displayed in a predetermined area, for example, a lower part of the first touch screen 12, a lower part of the second touch screen 14, or the whole second touch screen 14. When a keyword desired to be searched for through the keypad area is input by the user and then a touch gesture (for example, tap gesture) of the user is detected from a search execution key 282b displayed within the search window 282 or next to the search window 282, search results corresponding to the keyword provided by the search application interworking with the search window 282 are displayed in the first touch screen 12, the second touch screen 14, or entire areas including the first and second touch screens 12 and 14.

The portable device includes the display device including the first touch screen and the second touch screen arranged on at least one foldable panel and supports the following various view modes by using the two touch screens.

A multi mode or a multi tasking mode refers to a mode in which different applications are displayed in two touch screens, respectively, and each of the applications may respond to a touch gesture detected from the corresponding touch screen. For example, the first touch screen displays a photo gallery application, and the second touch screen displays an Internet browsing application. The portable device can swap information of the two touch screens by a pre-designated touch gesture. For example, the touch gesture includes two touches which are generated in the two touch screens, respectively and move to the hinge (or connector). The portable device can replace the photo gallery application of the first touch screen with the Internet browsing application and replace the Internet browsing application of the second touch screen with the photo gallery application in response to the detection of the two touches.

A main-sub mode (or slit mode) displays two task screens for one application in two touch screens, respectively. The two task screens provide task screens having different depths (or levels) of the application or task screens having different functions. That is, some applications may be configured to provide a plurality of task screens and the task screens may have different depths.

For example, the photo gallery application can provide a search screen including a plurality of thumbnail images and a full image screen displaying a picture image of one thumbnail image selected from the thumbnail images with a larger size, that is, with a full size through different touch screens. In this case, the full image screen may be designated to have a final depth. As another example, a music play application provides a playlist screen including a plurality of listed music and a music play screen for playing one of the music through different touch screens. In this case, the music play screen may be designated to have a final depth.

A full mode (or expanded mode) extensively displays one task screen of one application in two touch screens regardless of the hinge (or connector). For example, the first touch screen displays a first page of thumbnail images provided through the photo gallery application and the second touch screen displays a second page of the thumbnail images. As another example, one picture image is displayed to fully fills the whole of the first touch screen and the second touch screen. Here, displaying the picture image to fully fill the touch screens means that the picture image is displayed to fully fill horizontal widths and/or vertical widths of the first and second touch screens. As still another example, the first touch screen displays a map area having a first scale of a map application and the second touch screen displays a map area having a more detailed scale.

A change between the view modes may be achieved according to a running application, a detection of the touch gesture on the first and/or second touch screens, or a motion gesture of the portable device. The motion gesture includes a physical motion such as a rotation of the portable device and bending/folding of the first and/or second touch screens. Here, the bending/folding of the touch screens may refer to bending/folding within a predetermined relative angle. As a selectable embodiment, the change between the view modes is loaded by expanding a setting menu of the portable device or an upper status bar of the main touch screen or two touch screens and may be achieved by using a view mode changing button disposed within a quick panel allowing a quick control of a change in a status and a mode of the portable device.

FIGS. 9A to 9J illustrate examples of a change in the view mode according to a touch gesture according to one or more exemplary embodiments.

Figure 9A:
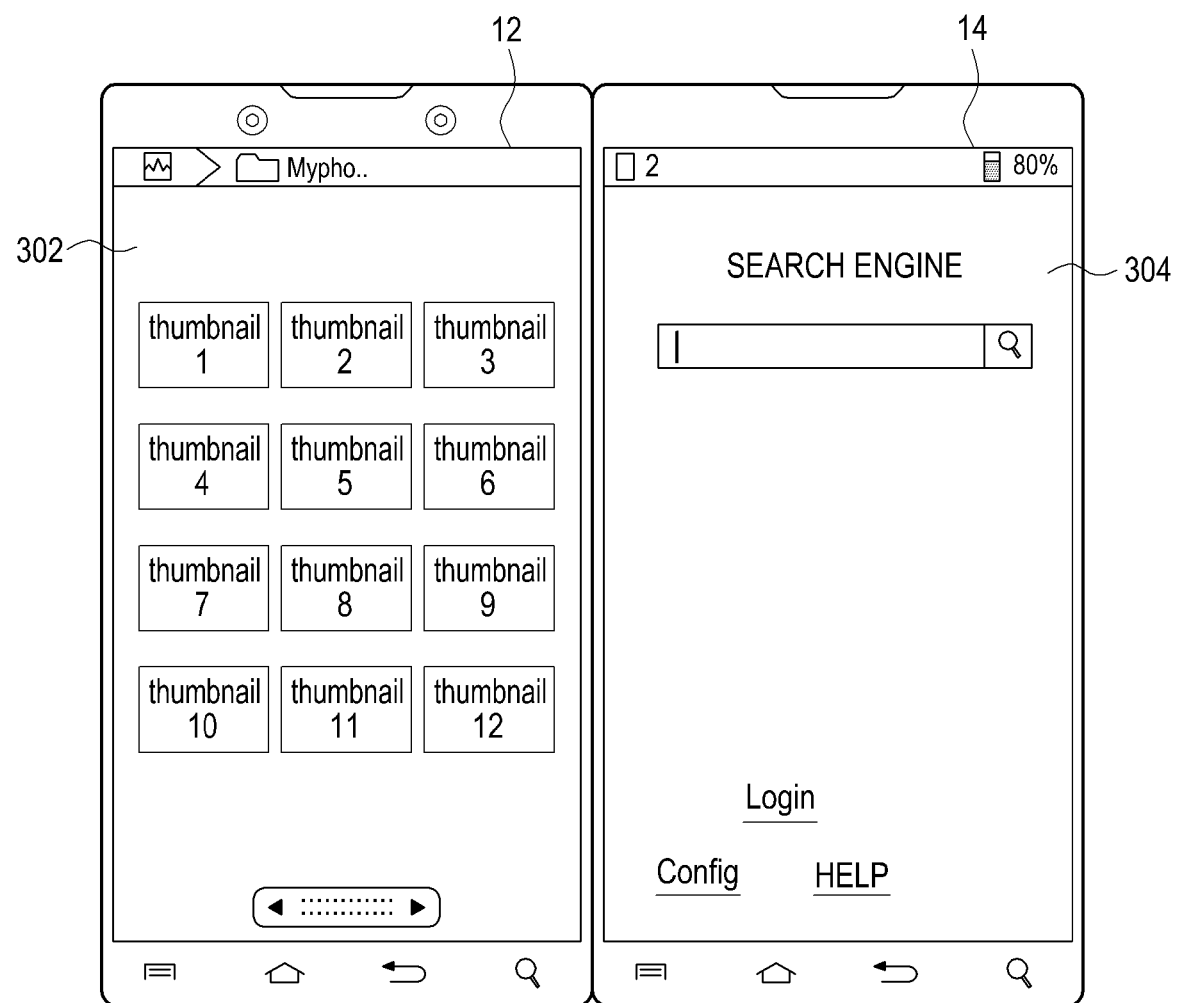
FIGS. 9A to 9J are diagrams illustrating a change in a view mode according to a touch gesture according to one or more exemplary embodiments.

As illustrated in FIG. 9A, the first touch screen 12 displays a first application 302 and the second touch screen 14 displays a second application 304. For example, the first touch screen 12 displays the photo gallery application and the second touch screen 14 displays the Internet browsing application.

Figure 9B:
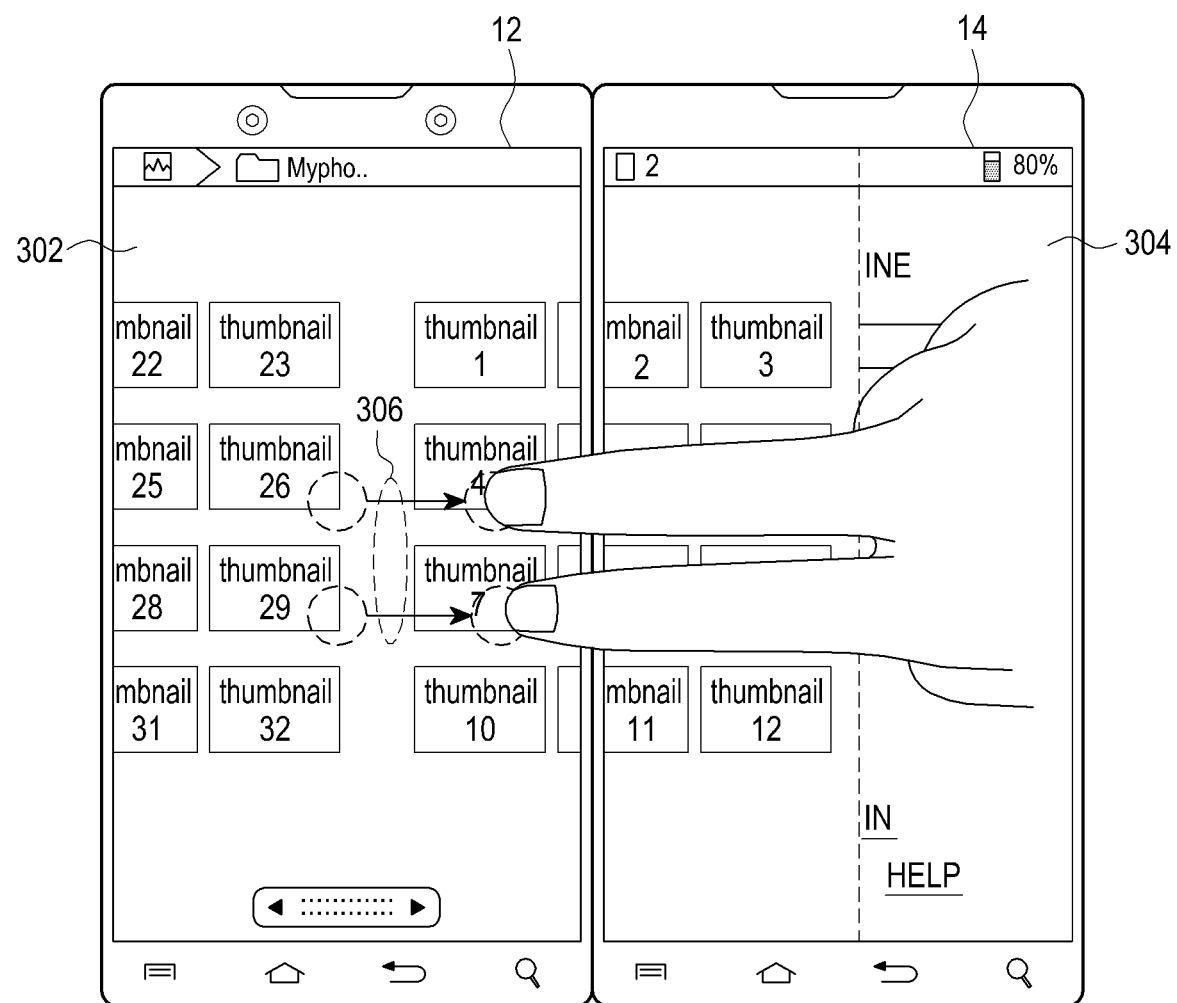

As illustrated in FIG. 9B, when the portable device 100 detects a predetermined touch gesture 306 from the first and/or second touch screens 12 and/or 14, the first application 302 of the first touch screen 12 is displayed in both the first touch screen 12 and the second touch screen 14. At this time, as an example, the first application 302 may be displayed in the two touch screens 12 and 14 in the full mode or separately displayed in the two touch screens 12 and 14 through two task screens in the main-sub mode.

For example, the touch gesture 306 includes actually simultaneously generated two or more flicks which move in a direction from the first touch screen 12 to the second touch screen 14. As another example, the touch gesture 306 includes actually simultaneously generated two or more touch drags which move in a direction from the first touch screen 12 to the second touch screen 14. Specifically, when the portable device 100 detects a plurality of touches starting at the first touch screen 12 and detects that the detected touches simultaneously move in a direction from the first touch screen 12 to the second touch screen 14, the portable device 100 displays the first application 302 in the both the first touch screen 12 and the second touch screen 14. As one embodiment, the flicks or the touch drags may move through the hinge or connector between the first and second touch screens 12 and 14.

Here, although it has been illustrated that the flicks or touch drags are generated in parallel, the flicks or the touch drags can be generated irregularly. As a selectable embodiment, when an interval between the flicks or the touch drags is equal to or smaller than a predetermined value, that is, 2 cm, the portable device can recognize the touch gesture for changing the view mode. As another selectable embodiment, positions of the first touch screen 12 where the touches are first detected may be horizontally or vertically arranged side by side.

As still another embodiment, the touch gesture 306 includes a pinch gesture for expanding a selected area, that is, a pinch zoom-in gesture. As an embodiment, two touches of the pinch zoom-in gesture start at the first touch screen 12, wherein a first touch is released within the first touch screen 12 and a second touch is released within the second touch screen 14.

At this time, the task screen of the first application 302 may be displayed while sliding in a direction from the first touch screen 12 to the second touch screen 14 according to a motion (and a speed) of the touch gesture 306. When the first and second touch screens 12 and 14 are connected by the hinge or separated connector not to be continuous, the task screen of the first application 302 may be displayed over both the first and second touch screens 12 and 14 when sliding through the hinge or connector.

Although not illustrated, the first application 302 enlarged over the first and second touch screens 12 and 14 by the touch gesture 306 may be reduced within the first touch screen 12 by another pre-designated touch gesture. As one example, when a pinch zoom-out gesture including two touches which start at first and second touch screens 12 and 14, respectively and are released in one touch screen, for example, the second touch screen 14 is detected, the portable device reduces the first application 302 and displays the reduced first application 302 in the second touch screen 14. At this time, the first touch screen 12 can display the second application 304 or the home screen.

[2-2. From the Full Mode to the Main-Sub Mode]

Figure 9C:
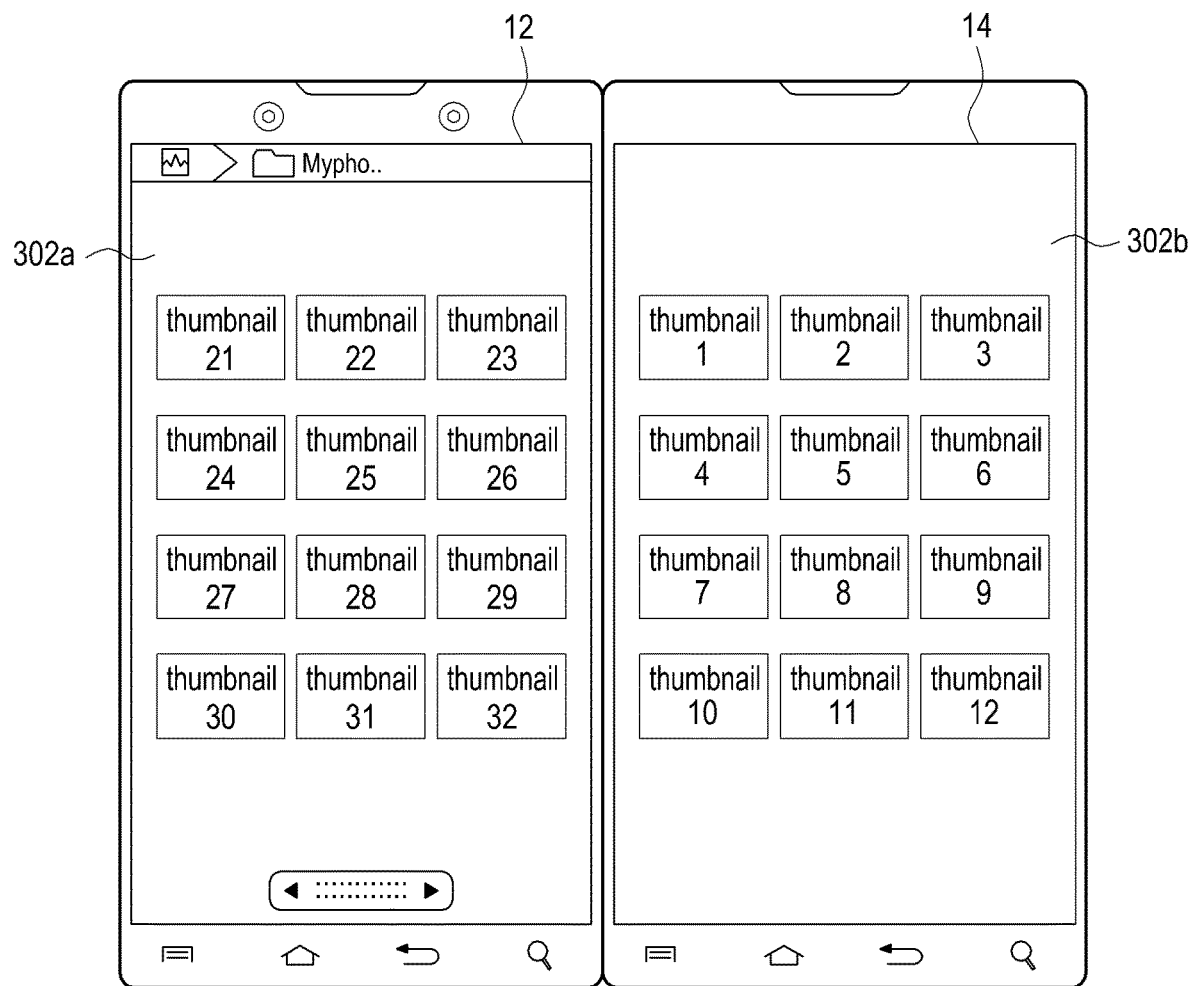

When the first application 302 is the photo gallery application, the photo gallery application 302 displays the first page of a plurality of thumbnail images in the first touch screen 12 as illustrated in FIG. 9A. In response to the detection of the touch gesture 306 of FIG. 9B, the portable device displays the first and second pages 302a and 302b of the plurality of thumbnail images in the first and second touch screens 12 and 14 as illustrated in FIG. 9C. At this time, according to a motion of the touch gesture 306, the first page 302b of the thumbnail images displayed in the first touch screen 12 slides to the second touch screen 14 and the second page 302a of the thumbnail images slides to the first touch screen 12 following the first page 302b.

When a plurality of items such as the thumbnail image are displayed in the first and second touch screens 12 and 14 in a grid form, the items may be scrolled (that is, translated) according to a motion and a speed of the touch gesture as illustrated and described in FIGS. 8A and 8B. That is, when a touch gesture such as the flick or sweep is generated in one of the first and second touch screens 12 and 14, the thumbnail images are scrolled according to a motion direction and a speed of the touch gesture. At this time, the thumbnail images may be scrolled over the hinge (or connector) between the first and second touch screens 12 and 14.

Figure 9D:
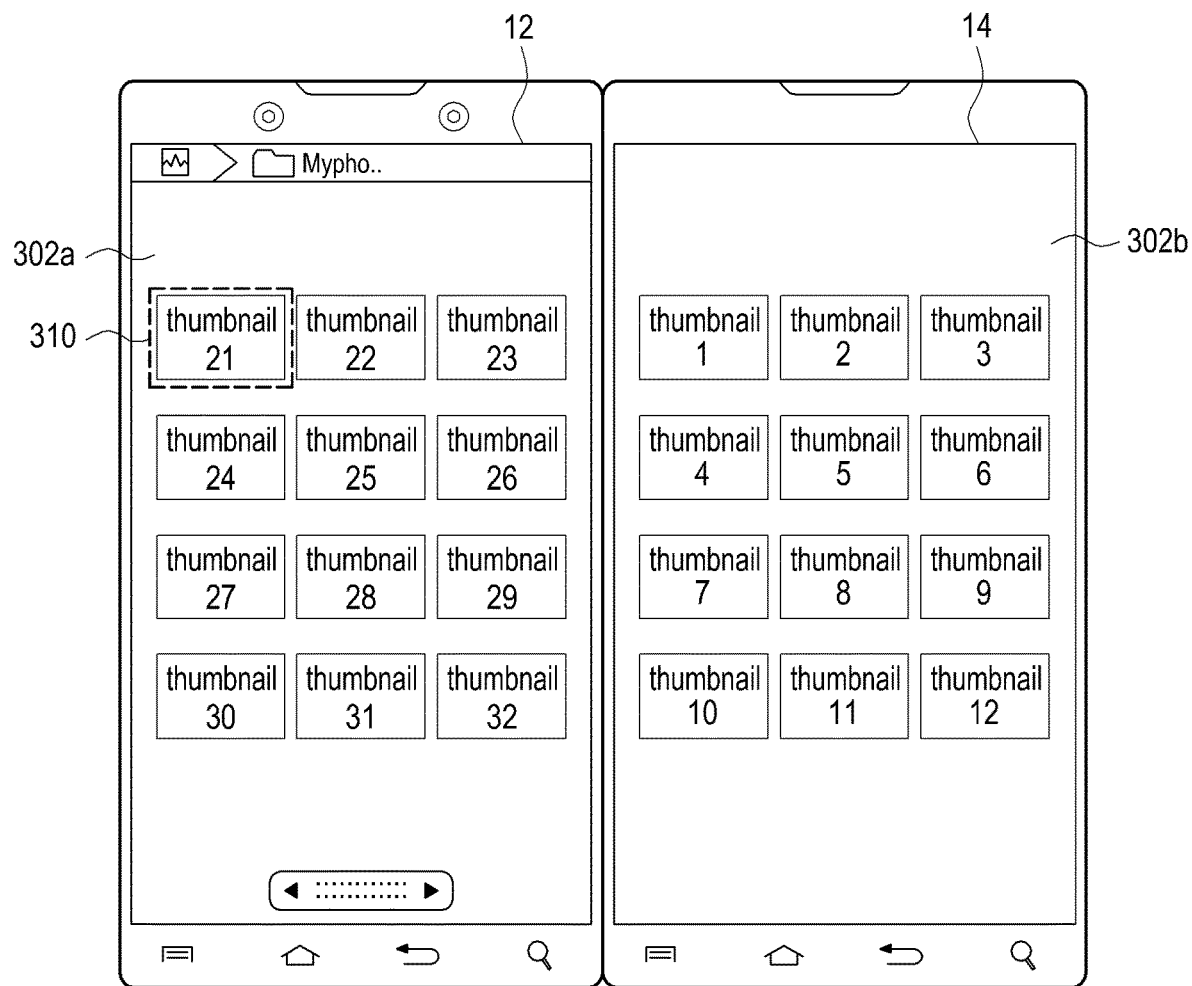
Figure 9E:
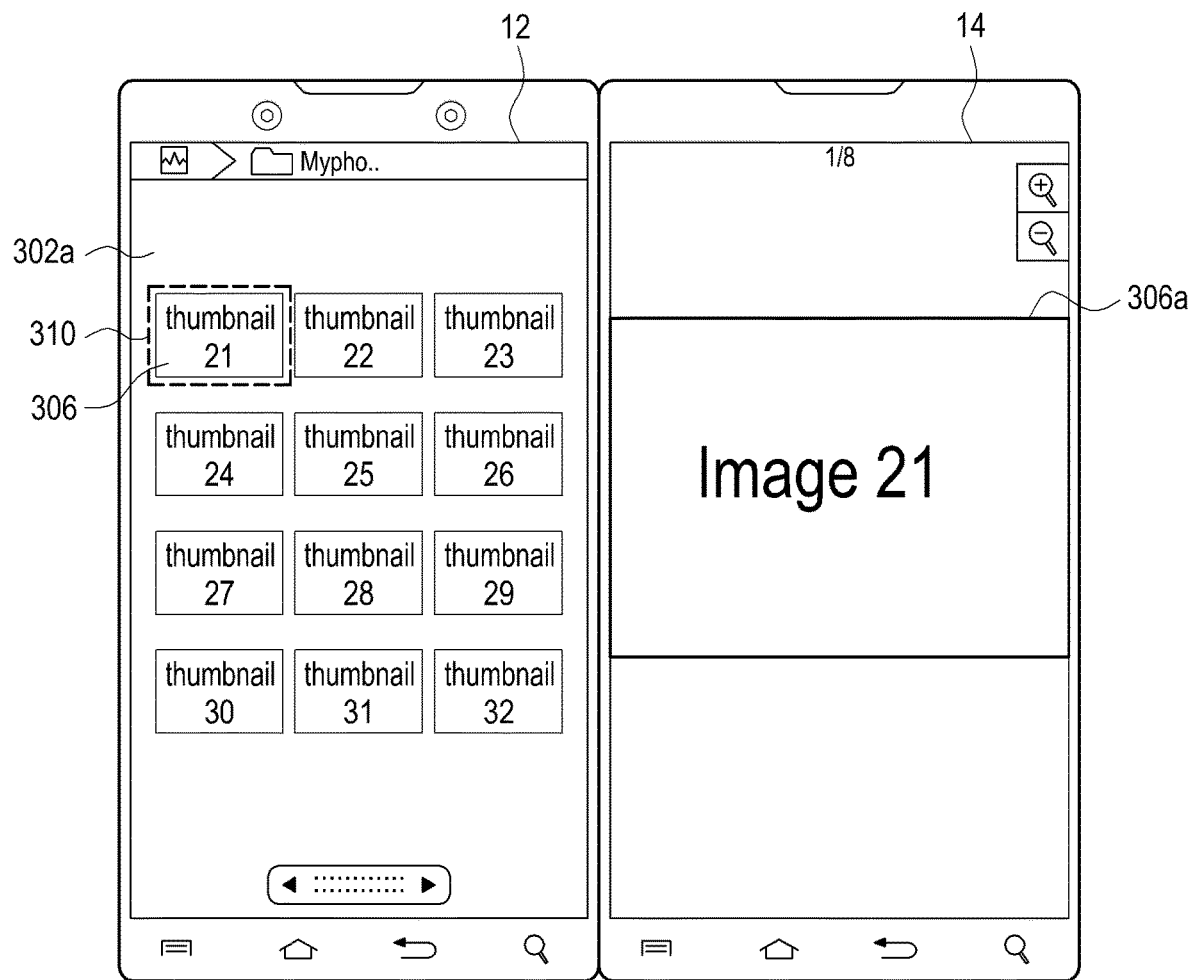
Figure 9F:
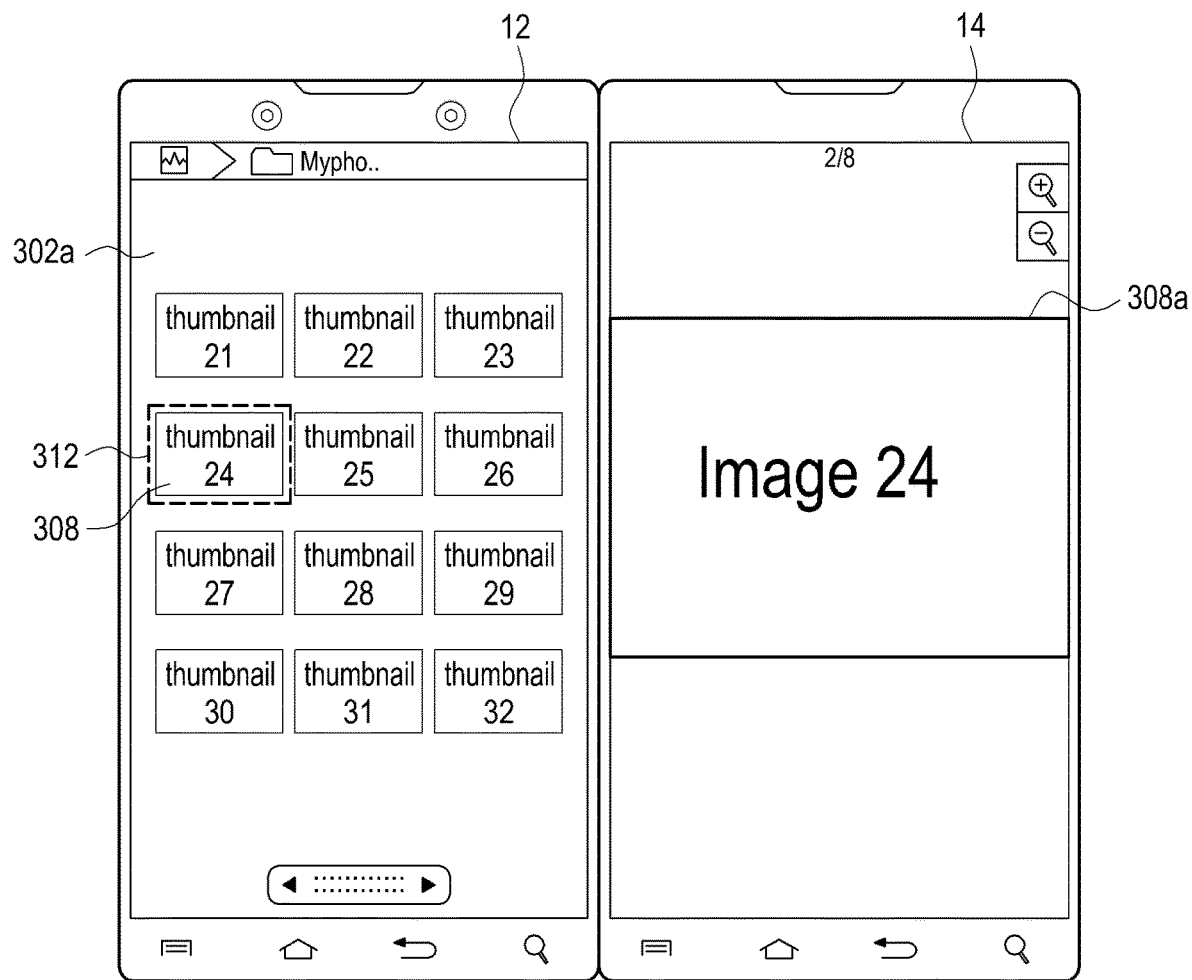

Referring to FIG. 9D, the portable device 100 detects a touch gesture 310 (for example, tap gesture) of the user on a first thumbnail image 306 which is one of the thumbnail images 302a of the first touch screen 12, that is, "thumbnail21". Then, as illustrated in FIG. 9E, the second touch screen 14 replaces the first page 302b of the thumbnail images with a picture image 306a of the first thumbnail image 306 and displays the replaced picture image 306a in response to the detection of the touch gesture 310. The picture image 306a has a larger size than the first thumbnail image 306 and may be displayed to fill one of a horizontal width and a vertical width of the second touch screen 14. As illustrated in FIG. 9F, when a touch gesture 312 (for example, tap gesture) of the user is detected on a second thumbnail image 308 among the thumbnail images 302a of the first touch screen 12, the picture image 306a of the first thumbnail image 306 is replaced with a picture image 308a of the second thumbnail image 308 and the replaced picture image 308a is displayed in the second touch screen 14 in response to the detection of the touch gesture 312.

Figure 9G:
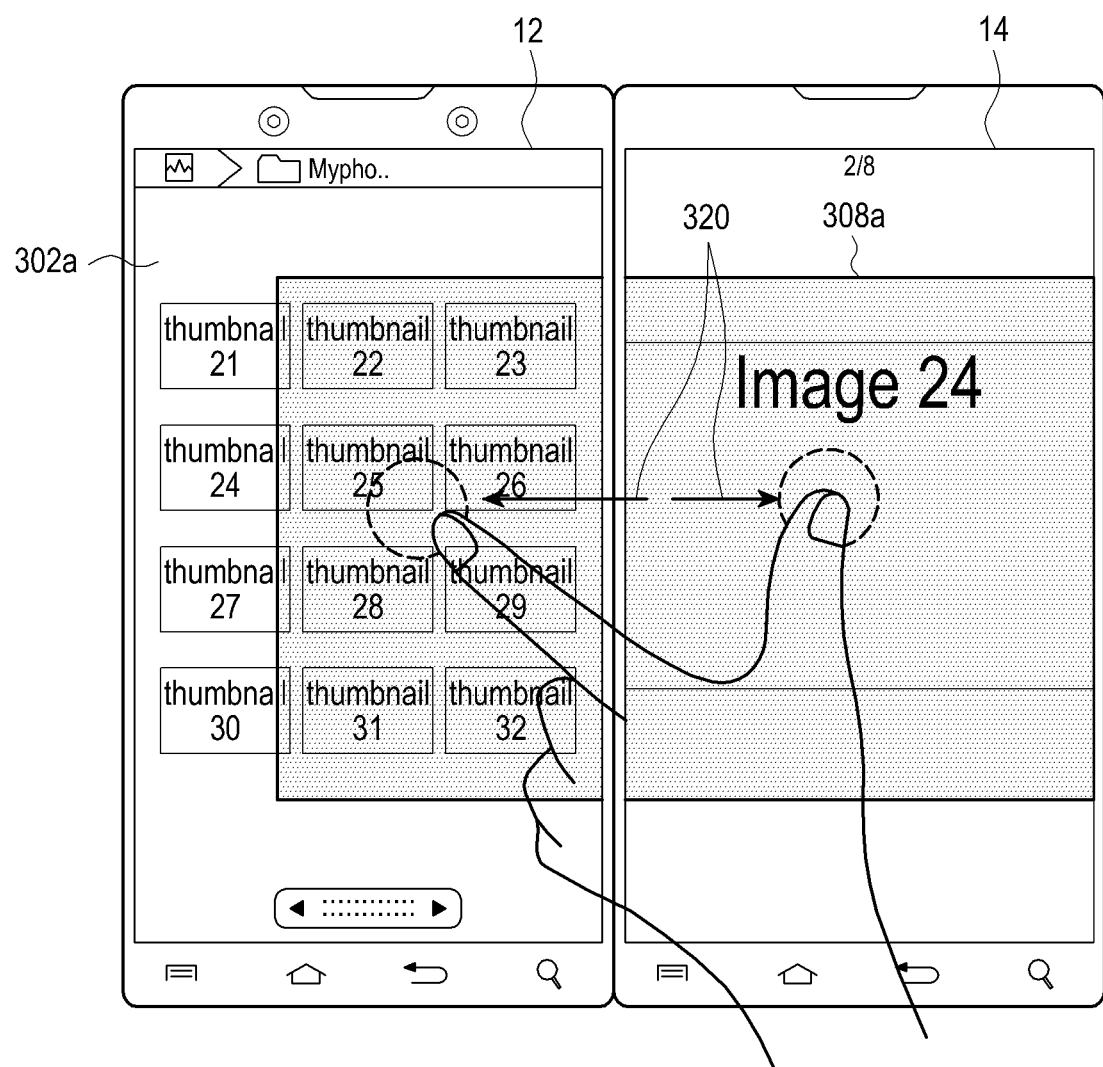
Figure 9H:
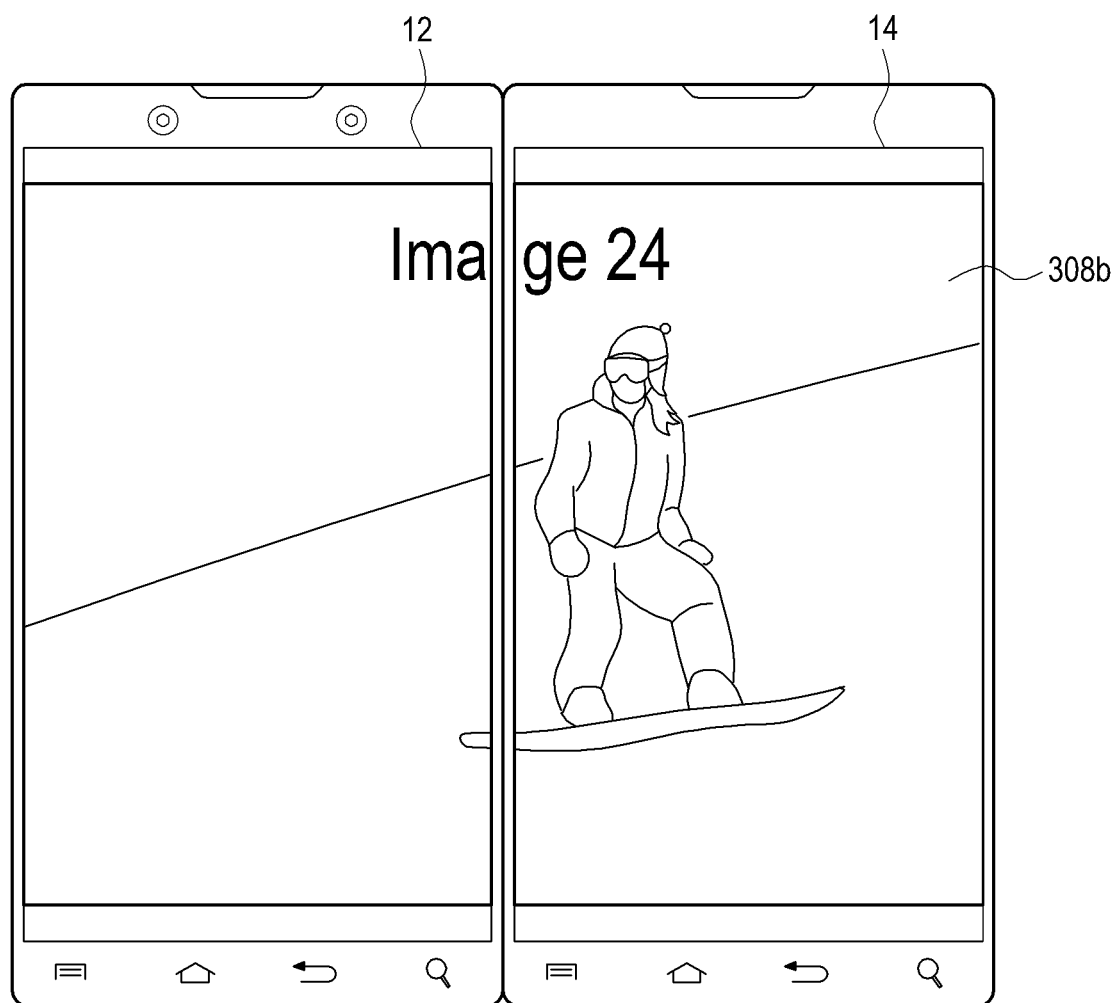

Referring to FIG. 9G, the portable device 100 detects a predetermined touch gesture 320 on the first picture image 308a displayed in the second touch screen 14 in a state where the first touch screen 12 displays the plurality of thumbnail images 302a provided through the photo gallery application and the second touch screen 14 displays the first picture image 308a of the first thumbnail image selected from the plurality of thumbnail images 302a. Then, as illustrated in FIG. 9H, the portable device 100 enlarges the first picture image 308a and displays the enlarged first picture image 308a to fully fill the first touch screen 12 and the second touch screen 14. The first picture image 308b expands up to the first touch screen 12 while covering the thumbnail images 302a of the first touch screen 12. When the expansion is completed, a part (for example, a left half) of the first picture image 308a is displayed in the first touch screen 12 and the remaining part (for example, a right half) of the first picture image 308b is displayed in the second touch screen 14. As a selectable embodiment, when the first picture image 308b is an image generated in the portrait view mode (vertically long image), the first picture image 308b may be displayed in one of the first and second touch screens 12 and 14.

As one embodiment, the touch gesture 320 includes a pinch gesture of expanding a selected area, that is, a pinch zoom-in gesture. First and second touches of the pinch zoom-in gesture are all generated in the second touch screen 14, wherein the first touch is released within the second touch screen 14 and the second touch is released within the first touch screen 12. As another embodiment, the touch gesture 320 includes two touch drags which are simultaneously generated in the second touch screen 14 and move farther from each other in approximately opposite directions. As one example, at least one of the touch drags may start at one position of the second touch screen 14 and end at another position of the second touch screen 14. As another example, at least one of the touch drags may start at one position of the second touch screen 14 and end at one position of the first touch screen 12.

When the portable device 100 substantially simultaneously or sequentially detects two touches from the second touch screen 14 and substantially simultaneously detects that the detected touches are father from each other in opposite directions or continuously farther from each other in approximately opposite directions, the portable device 100 expands the first picture image 308*a* and displays the expanded the first picture image 308*a* to fully fill the first touch screen 12 and the second touch screen 14.

Although not illustrated, when a pinch zoom-out gesture including two touches which start at the first and second touch screens 12 and 14, respectively and are released on one touch screen, for example, the first touch screen 12 is detected while the first picture image 308*a* is displayed in the first and second touch screens 12 and 14, the portable device reduces the first picture image 308*a* and displays the reduced first picture image 308*a* to fully fill the first touch screen 12.

Figure 9I:
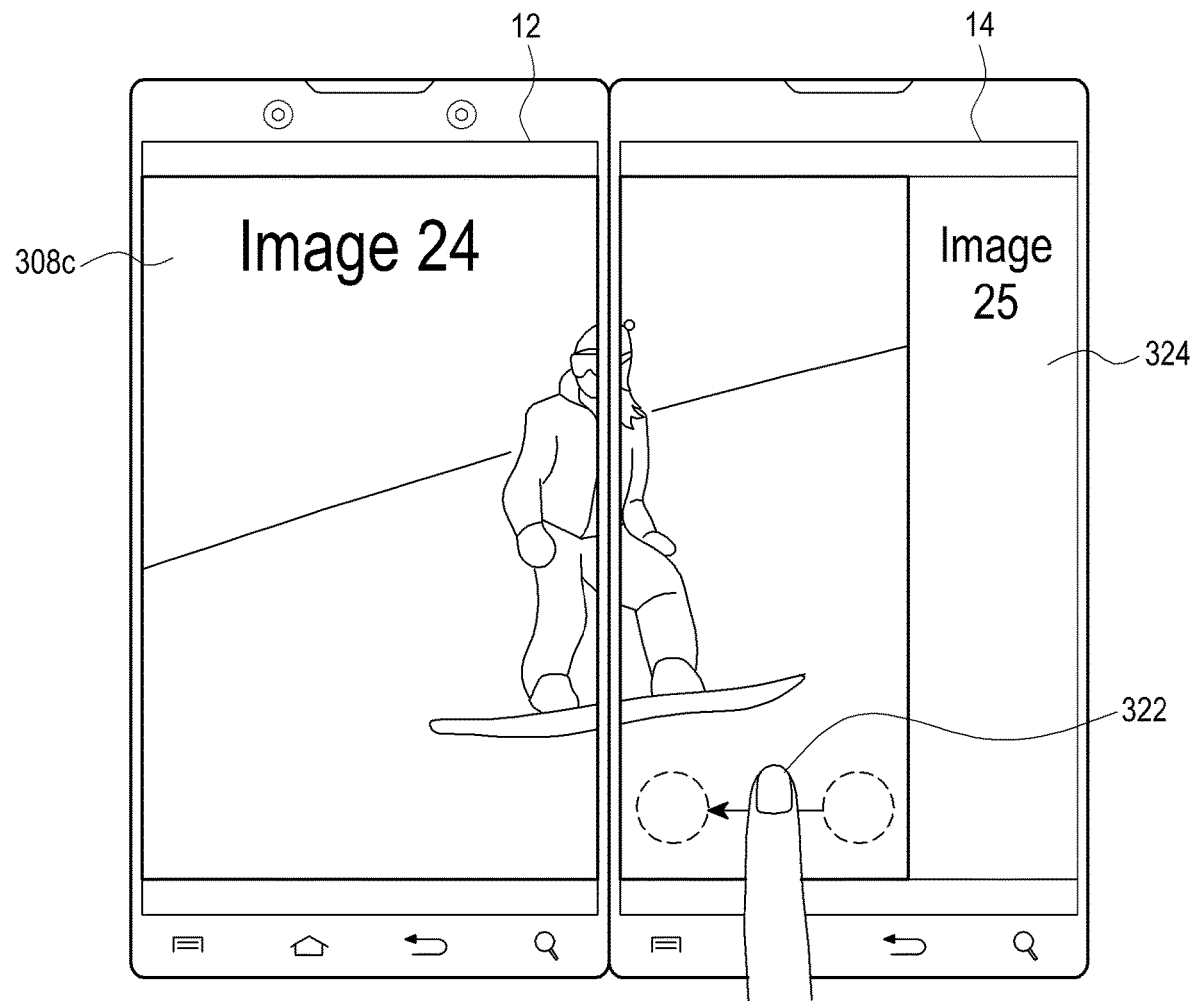
Figure 9J:
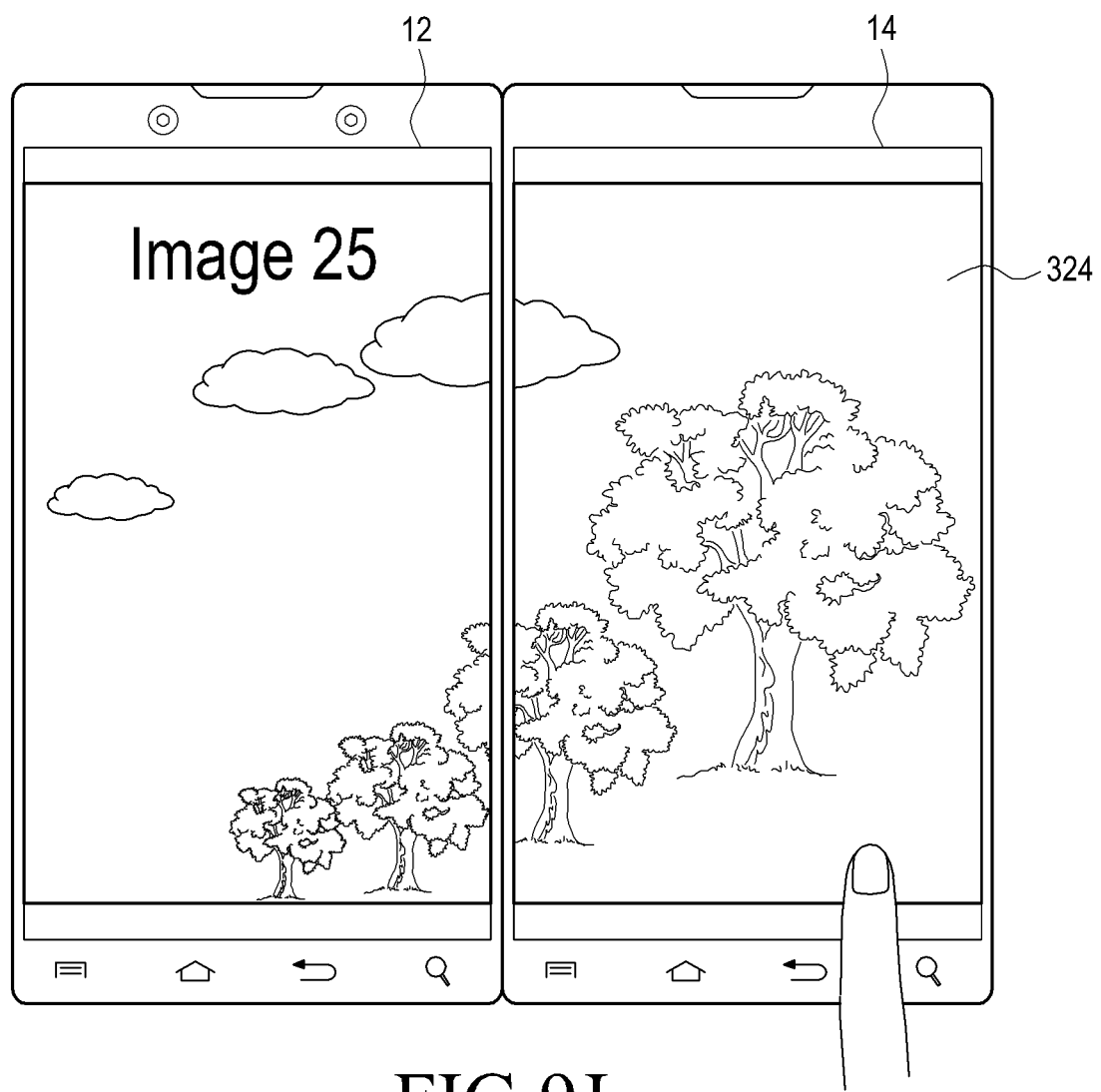

As illustrated in FIG. 9I, the portable device 100 detects a touch gesture 322 in a predetermined direction from the first picture image 308*c* displayed in both the first touch screen 12 and the second touch screen 14, for example, a flick or a touch drag in a direction from the second touch screen 14 to the first touch screen 12 (or opposite direction). Then, as illustrated in FIG. 9J, the portable device 100 replaces the first picture image 308*c* displayed in the first touch screen 12 and the second touch screen 14 with a second picture image 324 continuous to the first picture image 308*c* and displays the replaced second picture image 324 in response to the touch gesture 322. At this time, the first picture image 308*c* may be removed while sliding in a direction from the second touch screen 14 to the first touch screen 12 (or opposite direction) according to a direction and a speed of a motion of the touch drag 322. The second picture image 324 slides within the first touch screen 12 and the second touch screen 14 while following the first picture image 308*c*.

As a selectable embodiment, the touch drag 322 may be performed on one touch screen. As another selectable embodiment, the touch drag 322 may be performed over the two touch screens 12 and 14, that is, passing through the hinge.

The portable device can provide a familiar and a new home user interface such as a foldable wallet or compact powder through the display device including the first touch screen and the second touch screen arranged on at least one foldable panel. It is referred to as a pocket mode home screen in this specification. The portable device can provide the home screen as illustrated in FIG. 6 or the pocket mode home screen which will be described later according to a setting made when the portable device is manufactured or a setting of the user. As an embodiment, the pocket mode home screen may be usefully used in a double screen mode or an in-folded screen mode.

FIGS. 10A to 10H illustrate user interfaces of the pocket mode home screen according to one or more exemplary embodiments.

Figure 10A:
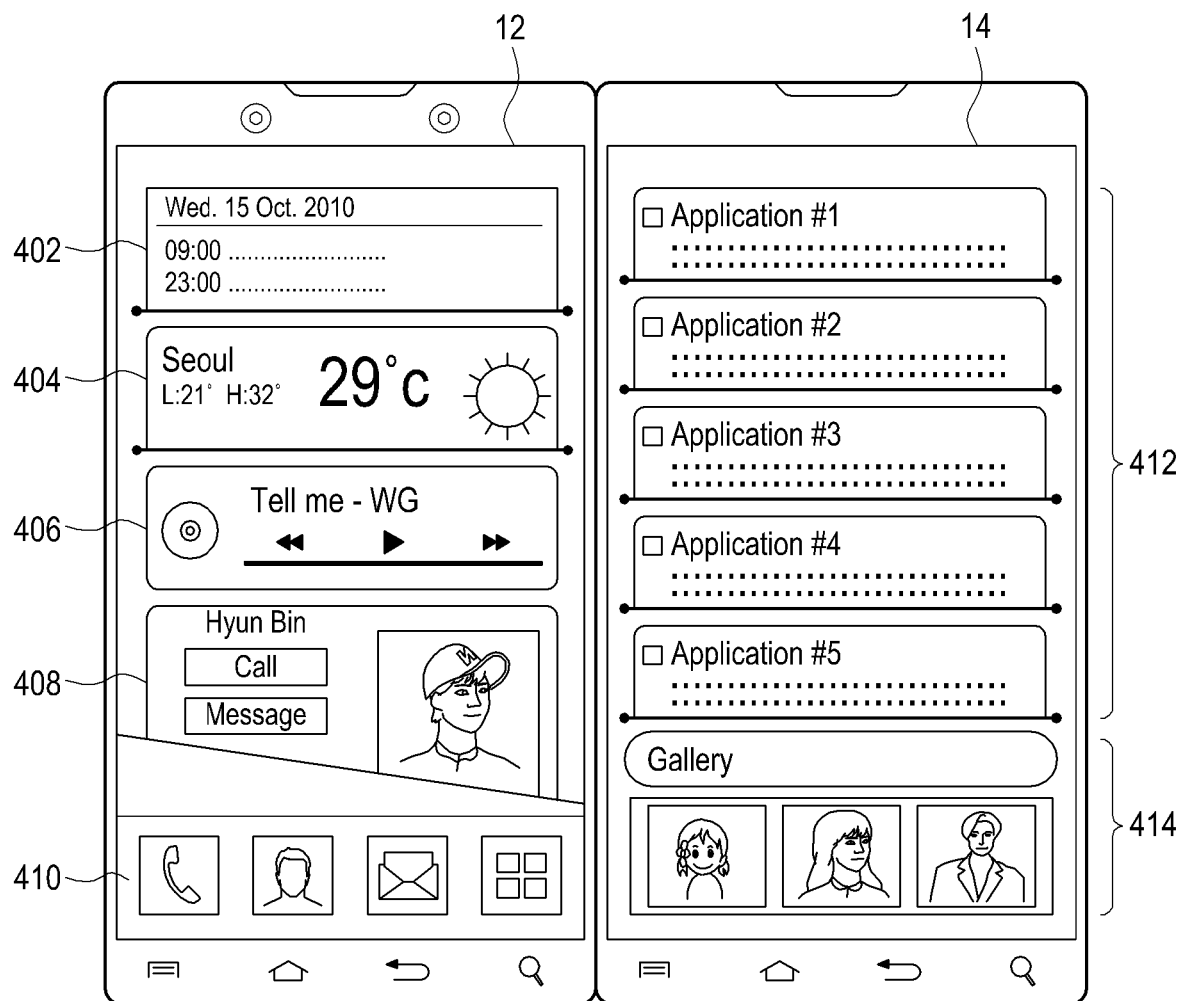
FIGS. 10A to 10H are diagrams illustrating a user interface of a pocket mode home screen according to one or more exemplary embodiments.

Referring to FIG. 10A, the first touch screen 12 displays areas 402, 404, 406, and 408 in a form of cards, for example a credit card or identification card, each stored in a card slot of a wallet which include some information on widgets or applications designated as the home screen and further displays a dock area 410 including icons of frequently used applications. Each of the areas 402, 404, 406, and 408 may have a form of the received credit card partially hidden by a graphic image embodying a slit for receiving the credit card in the wallet and may be vertically aligned with the received credit cards. The areas 402 to 408 display at least one of simple information provided by the widget or application and a shortcut key for executing a predetermined function. The simple information includes information which the user desires to first know through the application and may be updated in real time according to the application. For example, an area related to a message application can display whether a newly received message exists through a notice such as a flickering phrase of "NEW". As a selectable embodiment, the area 408 located in a bottommost part may have a form of the received credit card partially hidden by a slit of a diagonal line.

When a pre-designated touch gesture, for example, a tap gesture or a touch and hold is detected from one of the areas 402, 404, 406, and 408, the portable device displays an application of the corresponding area to occupy the whole of the first touch screen 12 or the second touch screen 14 or displays the application to occupy the whole of the first touch screen 12 and the second touch screen 14.

At least some of the areas (for example, the areas 402, 404, and/or 408) display simple information provided by the widget or application, and the simple information may be enlarged and displayed in response to a pre-designated touch gesture. For example, the area 402 of a schedule widget includes today's date and time and titles of N schedules (for example, one or two schedules), the area 404 of a weather widget includes a current city, a current temperature, and a weather icon, and the area 408 of a business card widget includes a person's name in contact information, shortcut keys for connecting a call and/or sending a message, and a picture image. The picture image may be replaced with a default image.

As one embodiment, in response to the detection of a predetermined touch gesture, for example, a flick or a touch drag up from one of the areas 402, 404, and 408, the portable device expands the corresponding area in a form of the credit card partially withdrawn from a graphic image having a slit form. The expanded area includes more information in comparison with the corresponding widget or application. The expanded area may be reconstructed to an original size in response to the detection of a touch drag down from the enlarged area or the detection of a touch gesture from another area.

At least some of the areas (for example, the area 406) display shortcut keys for functions provided by the application while operating as the background. For example, the area 406 of a music play application displays a status bar showing an album image, a title, a musician, and a play status of a played music and additionally provides shortcut keys such as a previous music selecting key, a stop/play key, and a next music selecting key. When a tap gesture is detected from one of the shortcut keys, the music play application executes a function corresponding to the corresponding shortcut key as the background.

Figure 10B:
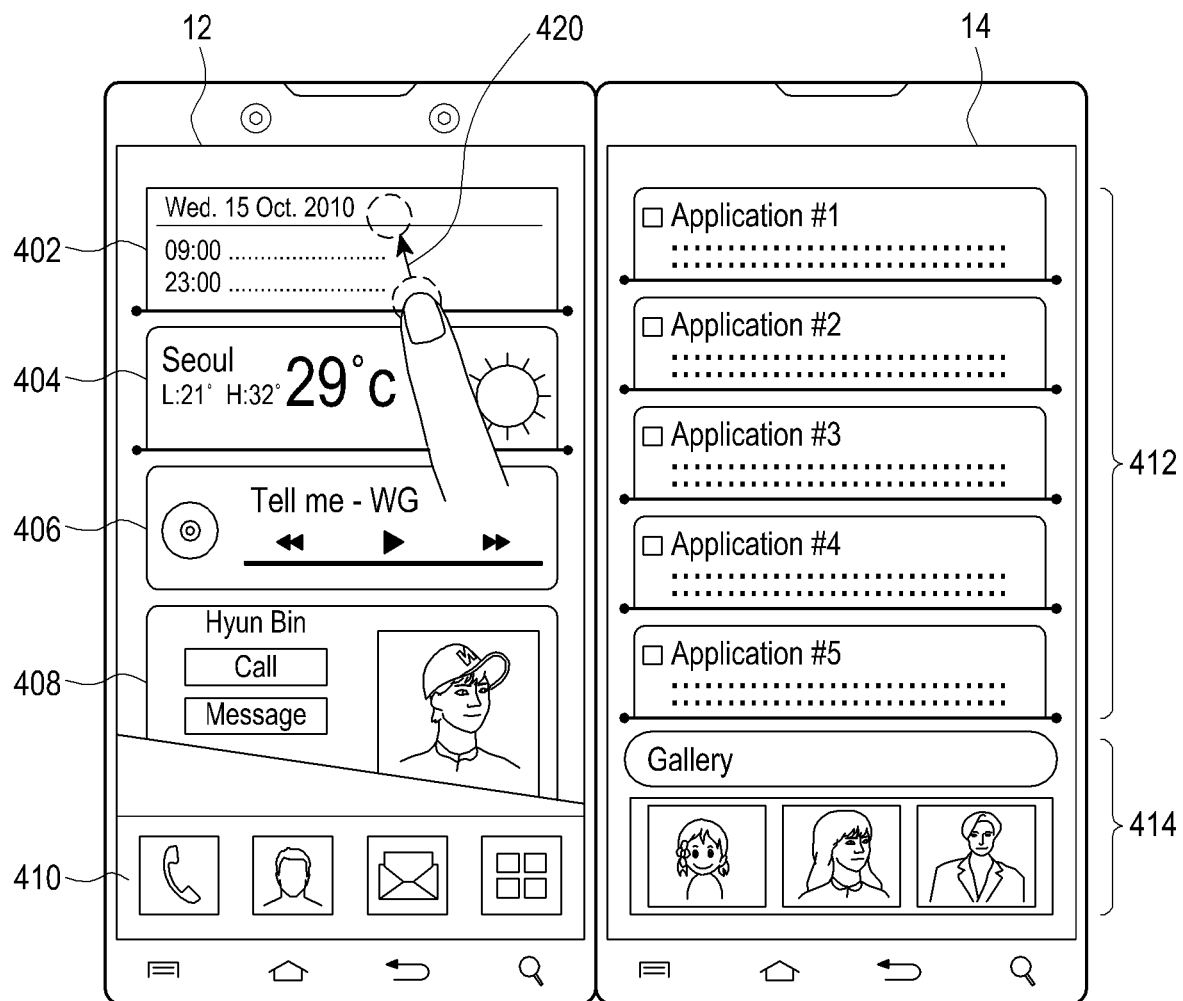
Figure 10C:
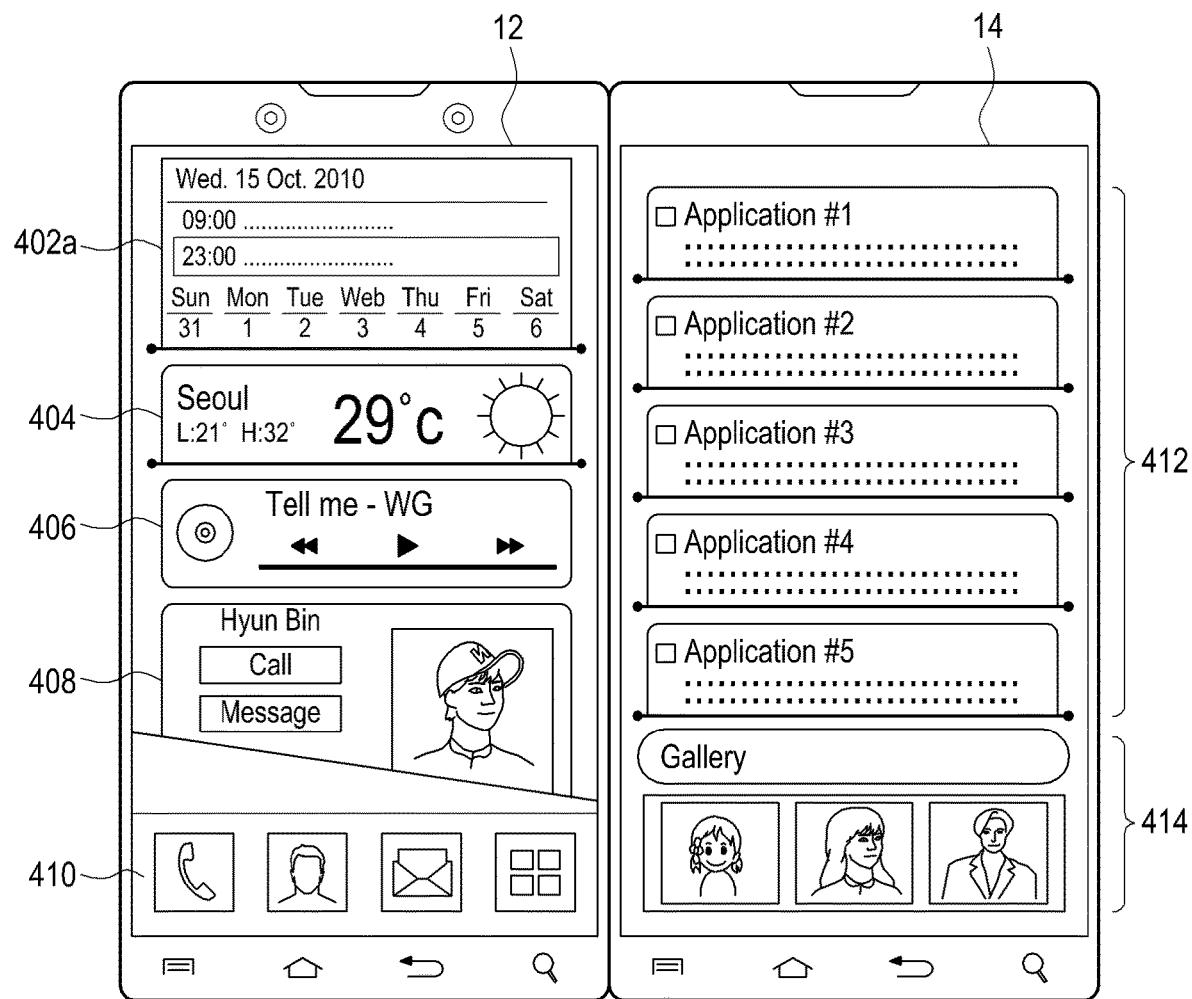

Referring to FIG. 10B, the portable device detects a pre-designated touch gesture 420, for example, a flick or a touch drag up from the area 402 of the schedule widget. Referring to FIG. 10C, in response to the detection of the touch gesture 420, the area 402 of the schedule widget is expanded in a top direction and then the expanded area 402*a* is displayed. The expanded area 402*a* displays time and titles of M schedules (for example, three or more schedules) and may further selectively display a weekly schedule according to an expanded length. The area 402 may be expanded in a top direction according to a movement of the touch gesture 420 and expanded to reach a terminus of the first touch screen 12 within a predetermined maximum size.

Figure 10D:
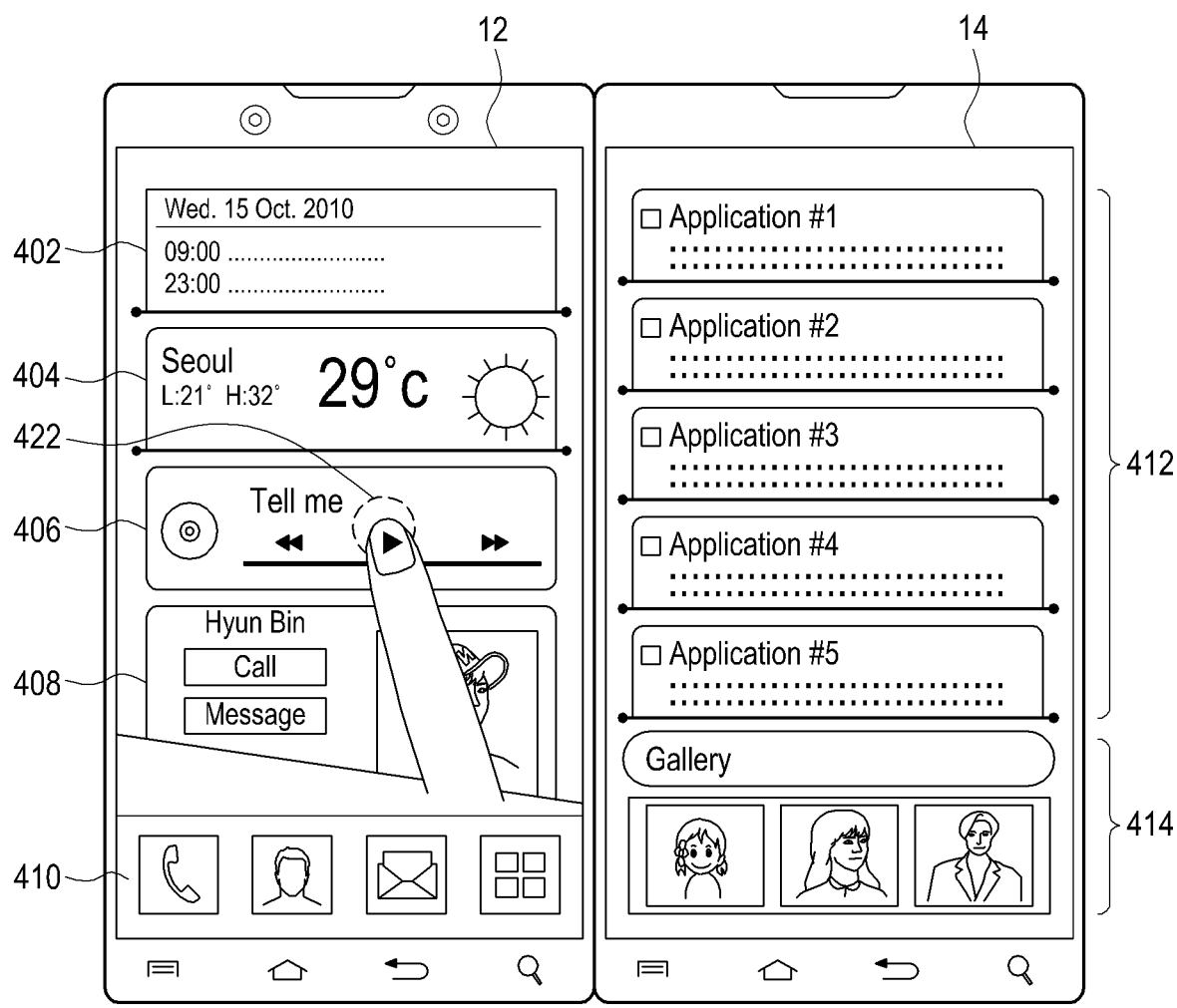

Referring to FIG. 10D, the portable device detects a pre-designated touch gesture 422, for example, a tap gesture or a touch drag from one of the shortcut keys and the status bar included in the area 406 of the music play application. Then, the music play application performs a function of playing music, playing previous music, stopping music, playing next music, or moving a play position. The area 406 of the music play application which operates as the background and does not require an area expansion may be embodied and displayed in a form of a sewed label, not the form of the received credit card.

Figure 10E:
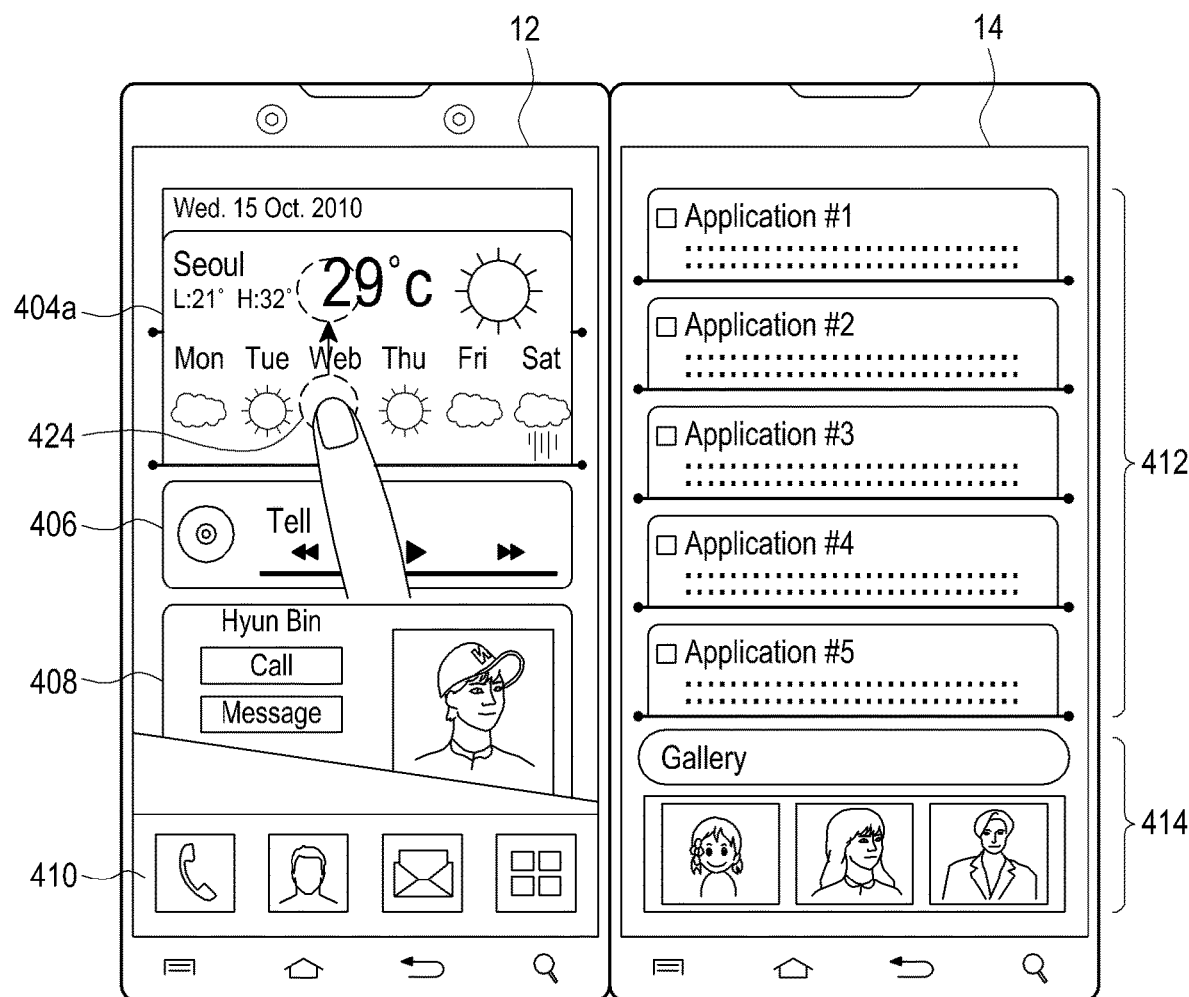

Referring to FIG. 10E, the portable device detects a pre-designated touch gesture 424, for example, a flick or a touch drag up from the area 404 of the weather widget. In response to the detection of the touch gesture 424, the area 404 of the weather widget is expanded in a top direction and then the expanded area is displayed. The expanded area 404*a* may further display more detailed information on the weather, for example, additional information on today's weather and weekly weather. The area 404 of the weather widget may be expanded in a top direction according to a movement of the touch gesture 424 and expanded to reach a terminus of the first touch screen 12 within a predetermined maximum size. The area 404 of the weather widget may be expanded to cover at least some of the area 402 of the schedule widget which had been located in an upper part. As one embodiment, the area 404 cannot be expanded to exceed a predetermined maximum range. When an expanded length of the expanded area 404*a* reaches the maximum range, the expanded area 404*a* remains in an expanded state or is reconstructed to the area 404 in an original size.

Figure 10F:
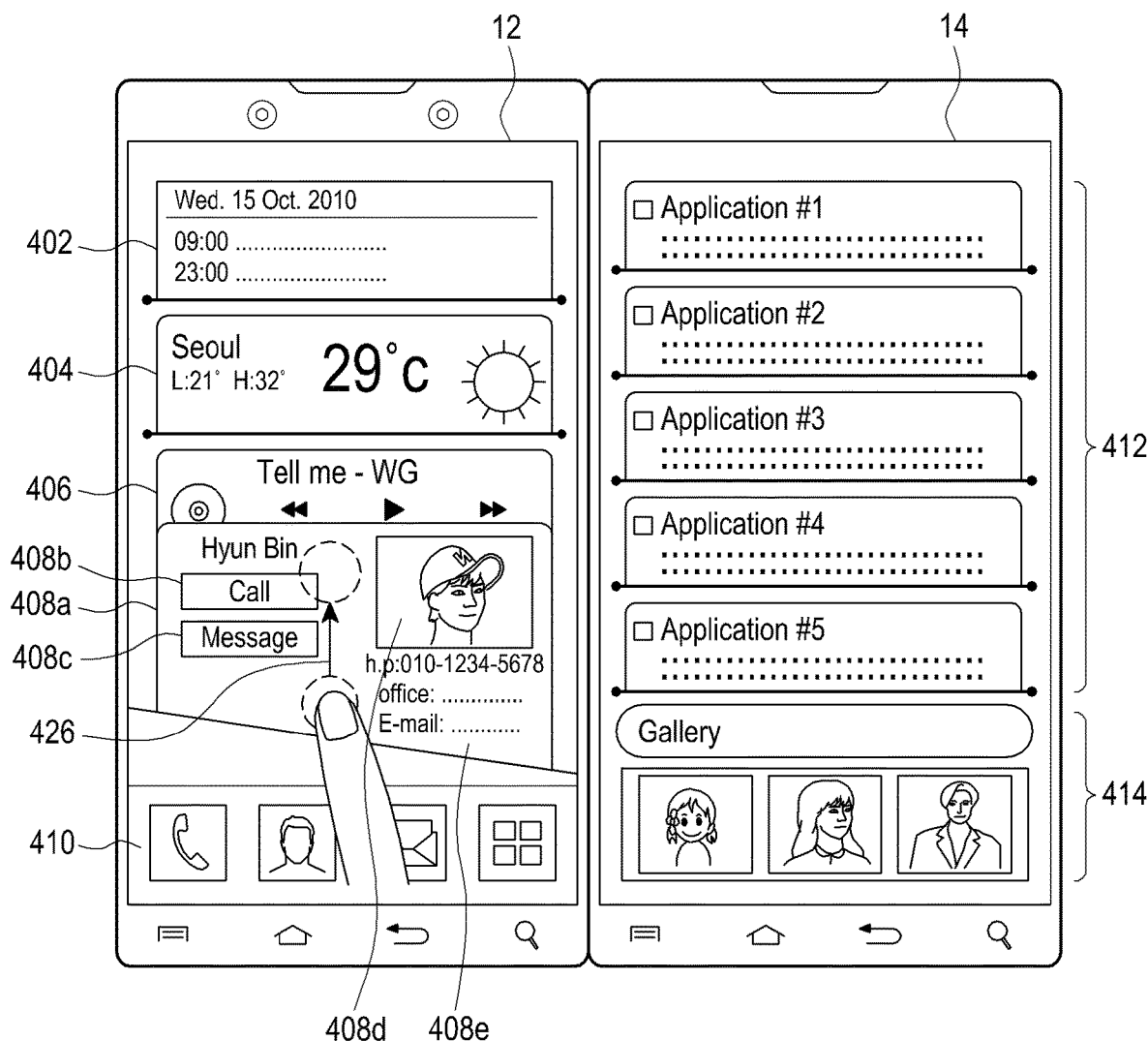

Referring to FIG. 10F, the portable device detects a pre-designated touch gesture 426, for example, a flick or a touch drag up in a top direction from the area 408 of the business card widget. In response to the detection of the touch gesture 426, the area 408 of the business card widget is expanded in a top direction and the expanded area 408*a* is displayed. The expanded area 408*a* may further include a picture image 408*d* of the person in the contact information and more detailed information 408*e* in comparison with those before the expansion, for example, a mobile phone number, an office phone number, a birthday, an address, an e-mail address and the like. The area 408 may be expanded to cover at least one widget (406, 404, and/or 402) which had been located in upper parts according to a movement of the touch gesture 426 and expanded to reach a terminus of the first touch screen 12 within a predetermined maximum range. As one embodiment, the area 408 cannot be expanded to exceed a predetermined maximum rage. When an expanded length of the expanded area 408*a* reaches the maximum range, the expanded area 408*a* remains in an expanded state or is automatically returned to the area 408 in an original size.

Figure 10G:
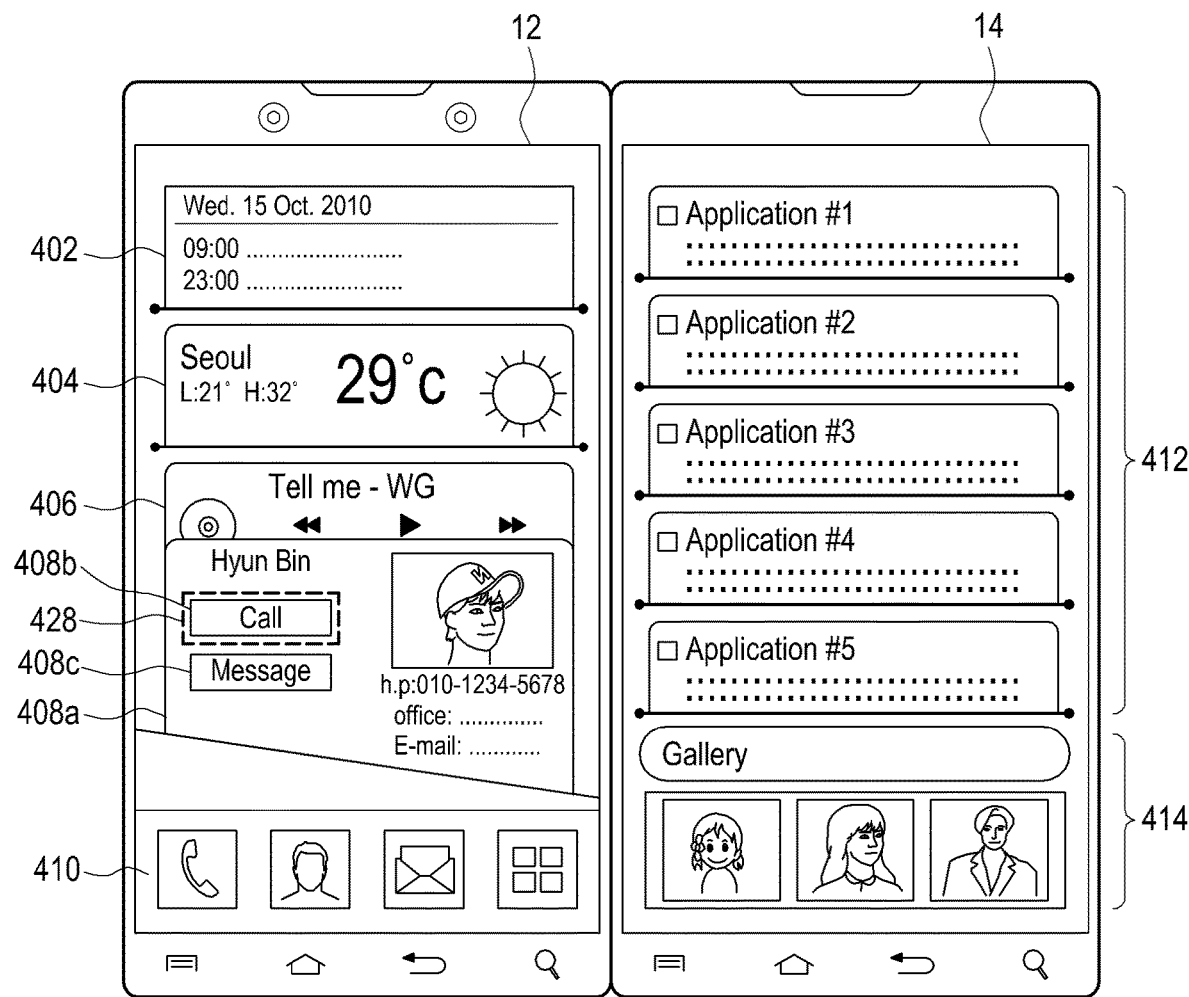

Referring to FIG. 10G, the area 408 of the business card widget and the expanded area 408*a* display at least one of shortcut keys 408*b* and 408*c* for connecting a call and sending a message. When a pre-designated touch gesture 428, for example, a tap gesture is detected from the shortcut key 408*b* for connecting the call, the portable device proceeds to FIG. 10H.

Figure 10H:
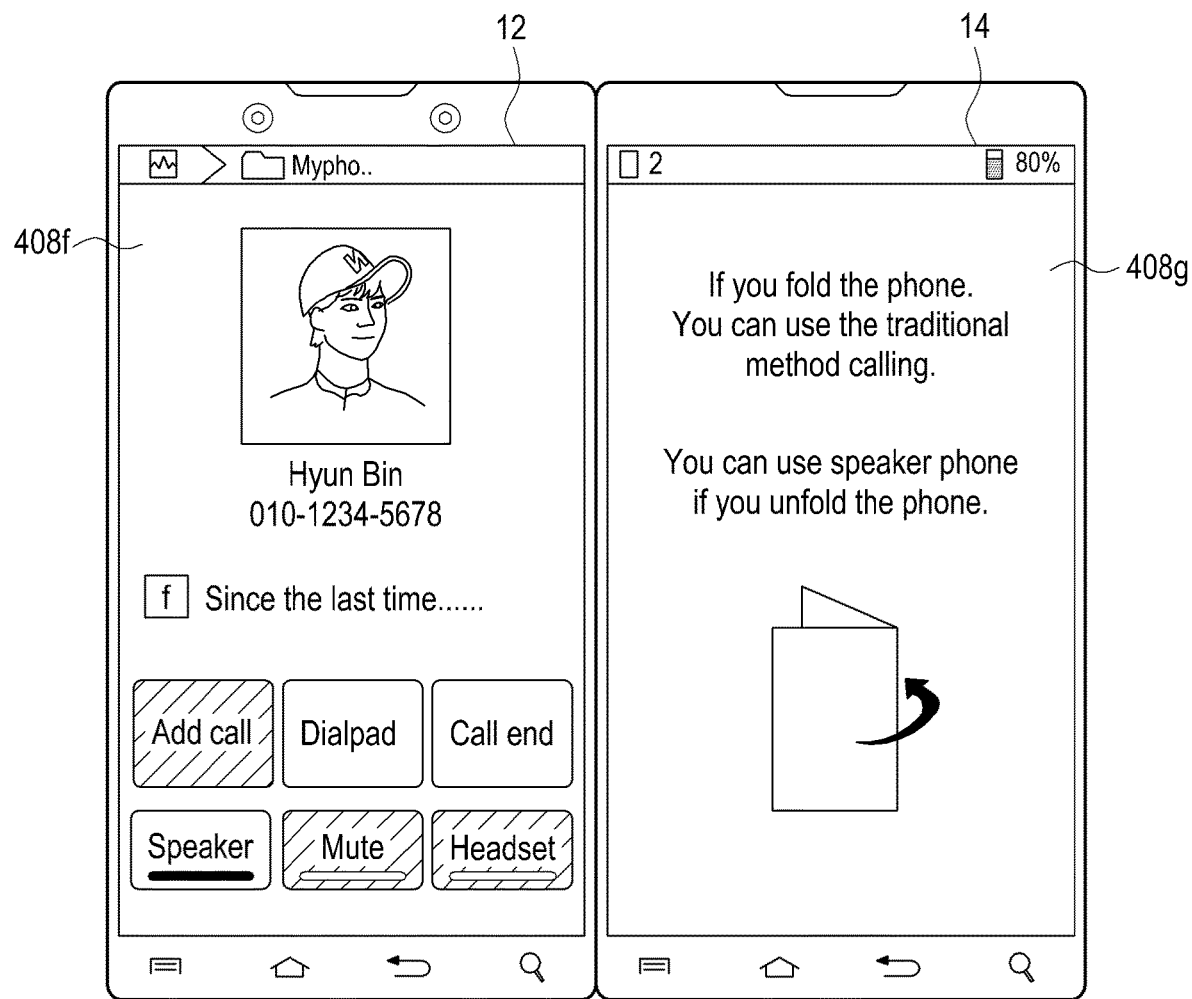

Referring to FIG. 10H, the portable device attempts to connect a call to a phone number related to the area 408 of the business card through a call application and displays a dialing screen 408*f* of the call application in some or all of the first and second touch screens 12 and 14. The dialing screen 408*f* may replace at least a part of the pocket mode home screen of the first and second touch screens 12 and 14 and then be displayed. In the shown example, the dialing screen 408*f* is displayed in the whole of the first touch screen 12 and includes a call participant identification area including a picture image and a phone number of a counterpart call participant and soft keys of mid-call functions such as adding a phone number, calling a dial pad, ending the call, connecting a speakerphone, mute, and a headset. As a selectable embodiment, the second touch screen 14 maintains the home screen, is turned off, or provides a guide message screen 408*g* for recommending to fold the portable device for the call.

Although not illustrated, when a tap gesture is detected from the shortcut key 408*c* for sending the message included in the area 408 of the business card widget or the expanded area 408*a*, a text input area and a virtual keypad for sending the message provided by the message application are displayed in some or all of the first touch screen 12. As one embodiment, the virtual keypad is displayed while partially covering the lower part of the first touch screen 12. As another embodiment, the virtual keypad is continuously displayed over the lower part of the first touch screen 12 and a lower part of the second touch screen 14. As a selectable embodiment, the keypad is displayed in the lower part of the first touch screen 12 and may be expanded through an expand button provided within the virtual keypad and displayed in both the lower parts of the first and second touch screens 12 and 14.

FIG. 11A to FIG. 11F illustrate user interfaces of the home screen in the pocket mode according to one or more exemplary embodiments.

Figure 11A:
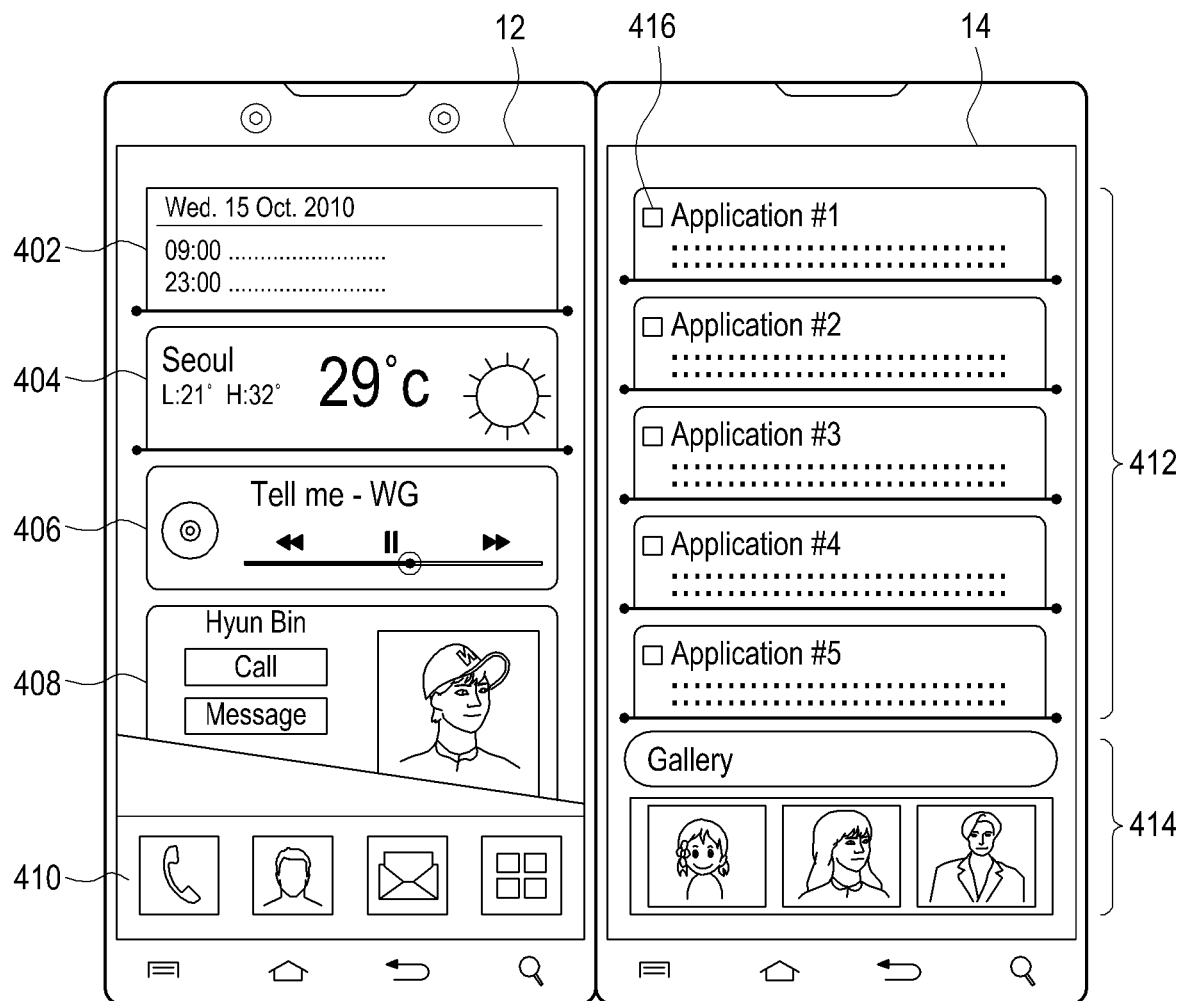
FIGS. 11A to 11F are diagrams illustrating a user interface of a pocket mode home screen according to one or more exemplary embodiments.

Referring to FIG. 11A, the second touch screen 12 displays first areas 412 of applications designated as the home screen. The first areas 412 are displayed in a form of stored cards partially hidden by a graphic image in a form of a slit for receiving the cards within a wallet and include at least one of simple information (for example, two to three lines) provided by each application and a shortcut key 416 for executing a predetermined function. The simple information may be automatically updated in real time according to the application. As one embodiment, an area of a Social Networking Service (SNS) application can display whether an update is recently performed and display a part of contents of a recently updated message.

As a selectable embodiment, an area 414 of a photo gallery application which is one of the areas displayed in the second touch screen 12 can provide a predetermined number of thumbnail images. As an embodiment, the area 414 additionally includes a shortcut key for changing view modes of the thumbnail images. For example, the shortcut key includes a slider switch. Further, the thumbnail images may be scrolled according to an arranged direction of the thumbnail images within the area 414, for example, a motion direction and a speed of a touch gesture in a horizontal direction. As a selectable embodiment, because the area 414 of the photo gallery application does not need an area expansion, the area 414 may be embodied and displayed in a form of a sewed label, not the form of a received credit card.

The second touch screen 14 displays the first areas 412 including simple information on a predetermined number of applications, for example, three applications according to a setting of the home screen in the pocket mode. It is possible that the first areas 412 are sequentially arranged in a vertical direction like the stored cards. For example, each of the first areas 412 includes a name of a graphic symbol of the application, information of one or two lines provided by the application, and an indicator showing an updated state of the application. When a pre-designated touch gesture (for example, a flick up or a touch drag up) is detected from each of the first areas 412, the corresponding first area 412 may be expanded to a top direction within a predetermined maximum size.

Figure 11B:
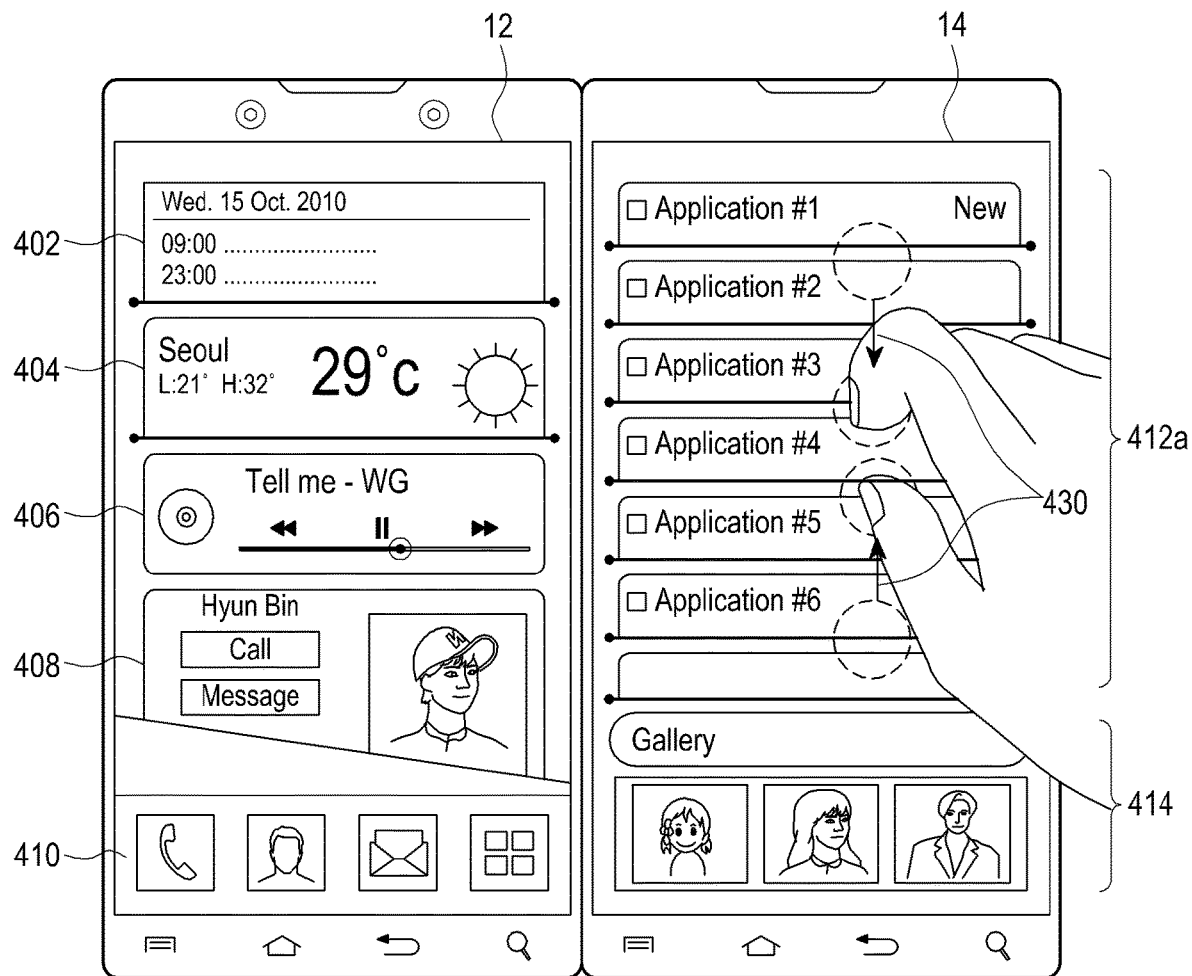

Referring to FIG. 11B, when a pinch gesture 430 for reducing the area, that is, a pinch zoom-out is detected from the first areas 412, each of the first areas 412 is reduced and reduced areas 412a of other applications are further displayed in a space within the second touch screen 14 generated by the reduced areas. That is, the reduced first areas 412 and the second areas 412a including the reduced areas of the other applications include more applications (for example, six or more applications) in comparison with the first areas 412, and accordingly display less information in comparison with the first areas 412, for example, only a name, a graphic symbol, and an update indicator of the application with one line.

Figure 11C:
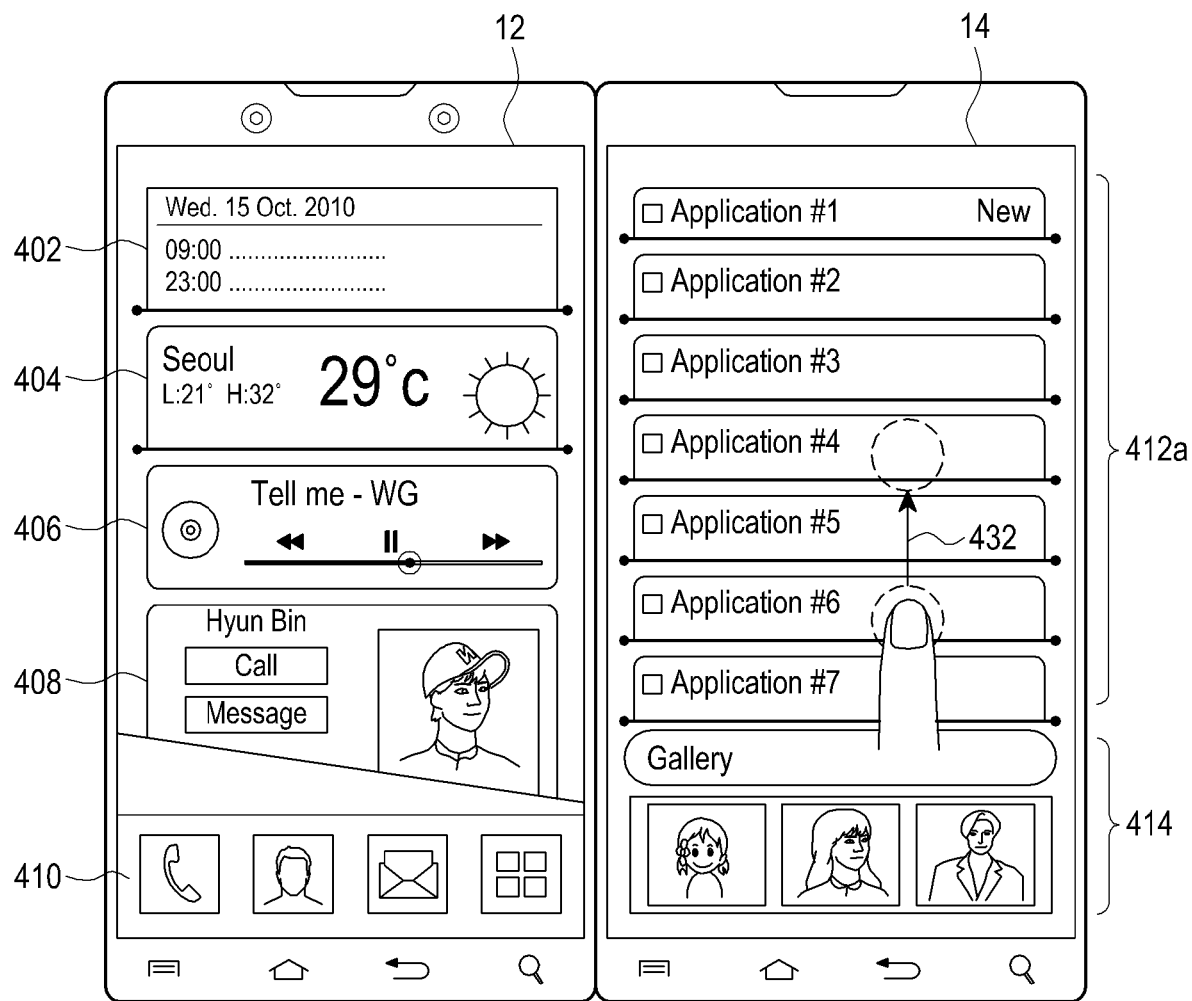
Figure 11D:
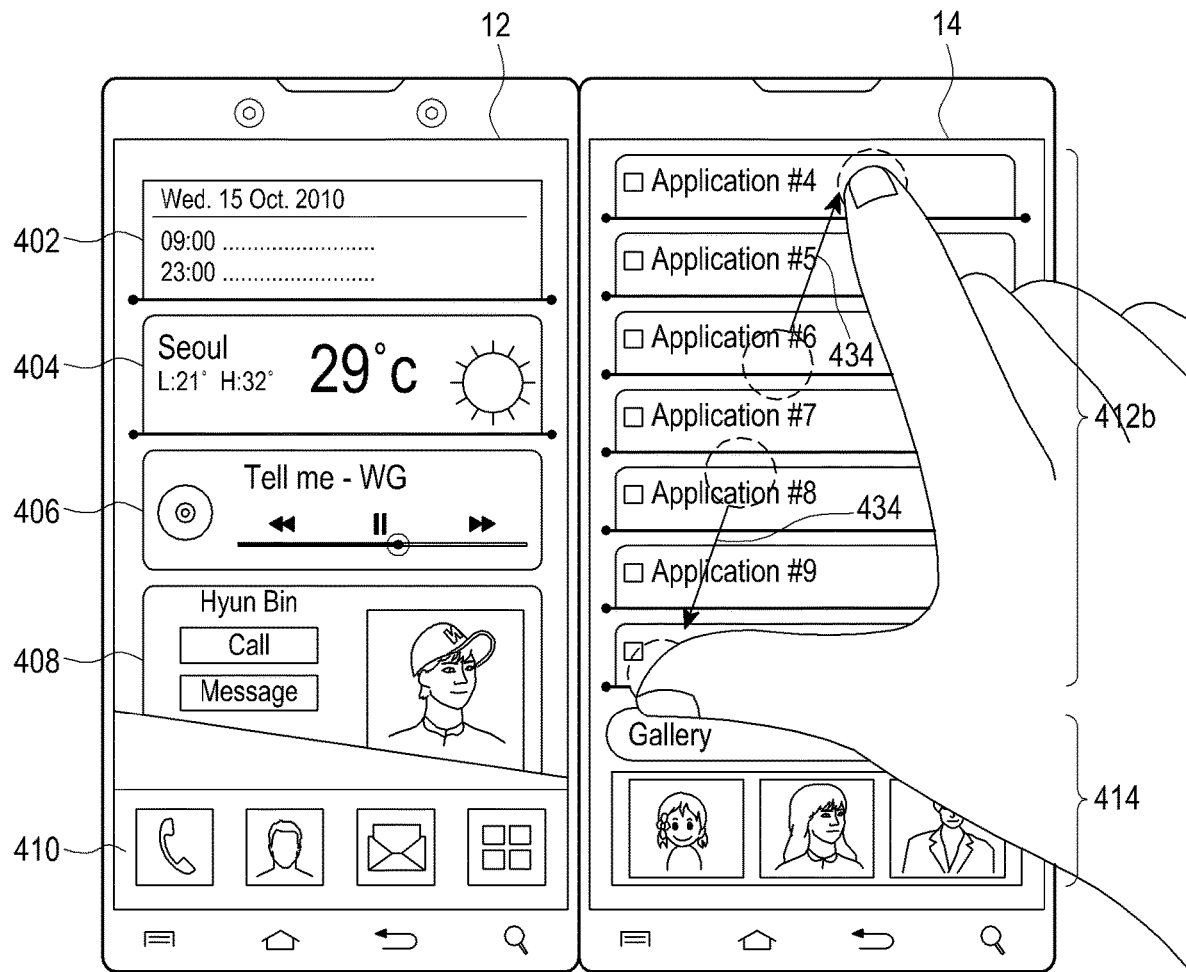

As illustrated in FIG. 11C, when a touch gesture 432 in a predetermined direction, that is, a flick up/down or a touch drag up/down is detected from the second areas 412a, the portable device proceeds to FIG. 11D. Referring to FIG. 11D, the portable device displays reduced areas 412b of applications designated as the home screen in the pocket mode while scrolling the reduced areas 412b in a top direction or a bottom direction in response to the touch gesture 432.

Figure 11E:
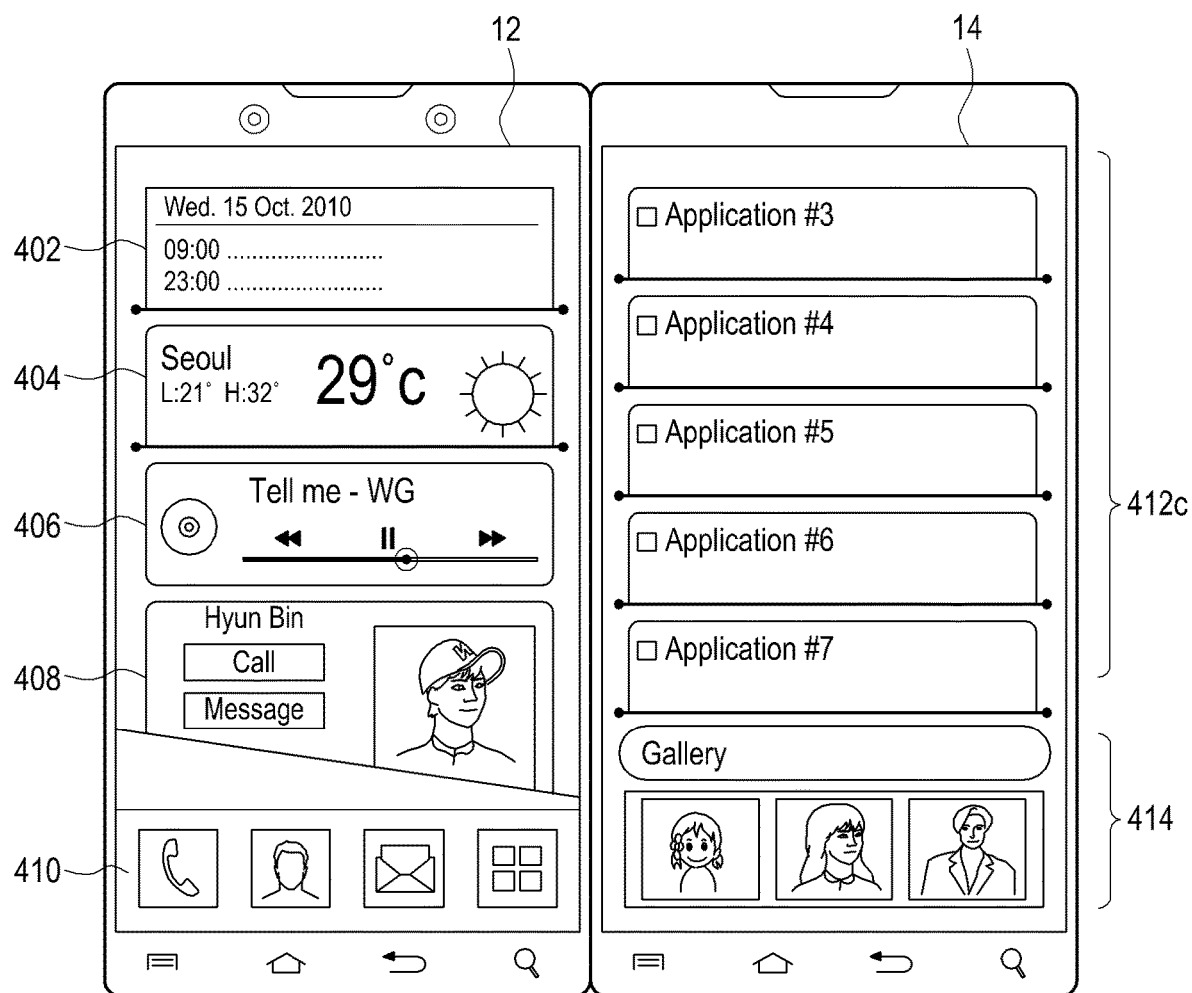

When a pinch gesture 434 for expanding the area, for example, a pinch zoom-in is detected from the reduced areas 412b, the portable device proceeds to FIG. 11E. Referring to FIG. 11E, the reduced areas 412b according to the pinch gesture 434 are expanded to have an original size 412c and reduced areas (for example, topmost part and/or bottommost areas) of some applications by the area expansion are not displayed in the second touch screen 14 anymore. The areas 412c include a number of applications according to a basic setting of the home screen in the pocket mode, for example, five applications.

Figure 11F:
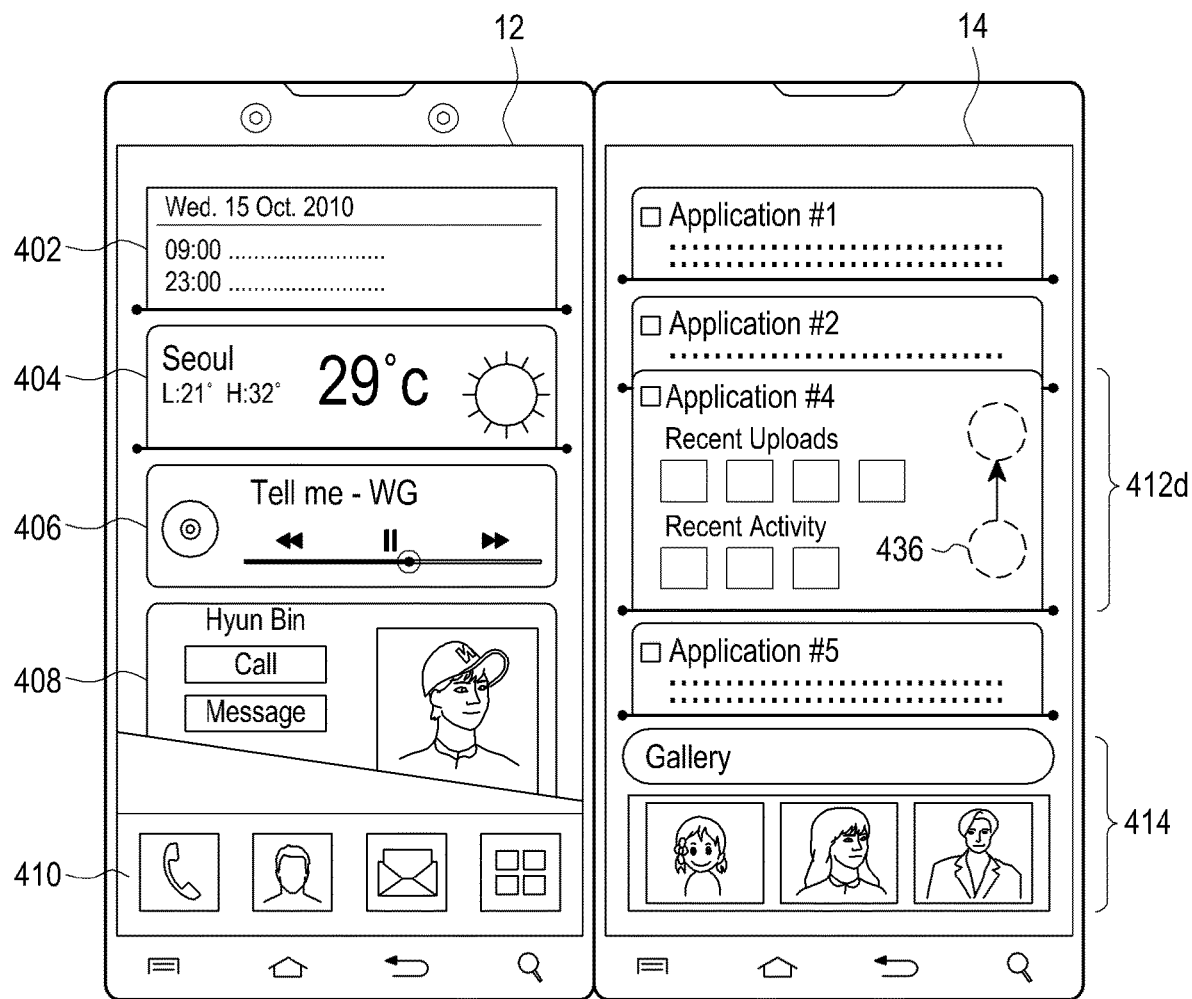

Referring to FIG. 11F, when a pre-designated touch gesture 436, for example, a flick in a top direction or a touch drag up is detected from one of the reduced areas 412a and 412b or the areas 412 and 412c having the original sizes, the corresponding area is expanded in a top direction and the expanded area 412d is displayed. The expanded area 412d may further display more detailed information of the corresponding application, for example, a recently uploaded image and more information on a recent activity. The expanded area 412d is generated by an expansion in a top direction according to a movement of the touch gesture 436 and may be expanded to reach a predetermined maximum range. According to a type of application, the expanded area 412d can provide at least one of a text input window having a size which can be included in the expanded area 412d and soft keys for predetermined functions together with the more detailed information.

As one example, the area in the form of the received credit card related to the message application is expanded by a touch drag up of the user and displays a miniaturized text input window and a transmission shortcut key in an area secured through the expansion.

As a selectable embodiment, when the pre-designated touch gesture 436, for example, a tap gesture is detected from a first area which is one of the areas 412, 412a, 412b, and 412c, the portable device expands the first area and displays the expanded first area in the second touch screen 14. At this time, the first area may be expanded in the same or similar sizes to those of all of the areas 412, 412a, 412b, and 412c or expanded to occupy the whole second touch screen 14. For example, the area in the form of the received credit card related to the social network service application is expanded by a tap gesture by the user and displays a predetermined number of recently received messages in an area secured through the expansion. The expanded area may include shortcut keys such as forward, reply, copy and the like on each message. The expanded area may be reconstructed to have an original size by a touch on another area or a pinch gesture.

As another selectable embodiment, when the pre-designated touch gesture 436, for example, a tap gesture is detected from the first area which is one of the areas 412, 412a, 412b, and 412c, the portable device displays an application corresponding to the first area in the whole second touch screen 14.

The portable device can display a gallery map application corresponding to a combination of the photo gallery application and the map application through the display device including the first touch screen and the second touch screen arranged on at least one foldable panel. The first touch screen and the second touch screen displays a map and at least one picture image registered in the map, respectively. The gallery map application can register and manage at least one picture image of one position on the map. As one embodiment, the gallery map application receives the picture image registered in a server located in the Internet and position information on the picture image from the server, links the picture image with a position indicated by the position information, and manages the linked information. The picture image may be shot or generated in the position or include contents related to the position. As one embodiment, the gallery map application may be useful for the double screen mode or the in-folded screen mode.

FIGS. 12A to 12I illustrate user interfaces of the gallery map application according to one or more exemplary embodiments.

Figure 12A:
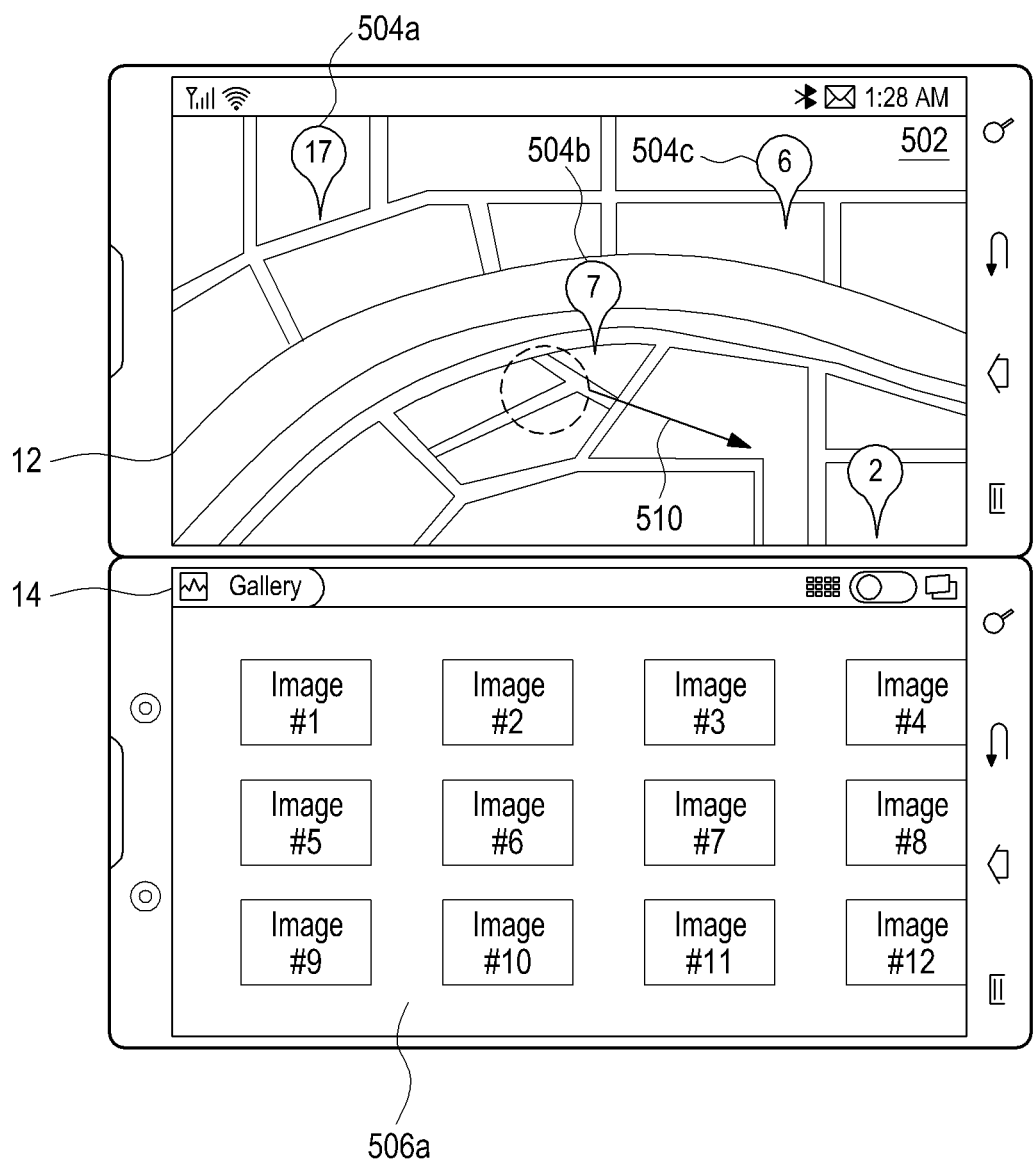
FIGS. 12A to 12I are diagrams illustrating a user interface of a gallery map application according to one or more exemplary embodiments.

Referring to FIG. 12A, the first touch screen 12 displays a map area 502 provided by the gallery map application. For example, the map area 502 may include a geographical area of a predetermined scale including a current position of the user or a geographical area of a predetermined scale including a position designated by the user. The map area 502 includes at least one of position indicators 504a, 504b, and 504c indicating a search result, a tourist attraction spot, or a position in which the picture image is registered.

The second touch screen 14 displays a gallery area 506a in which thumbnail images of the picture images registered in positions included in the map area 502 are listed. The gallery area 506a lists at least some of the thumbnail images of the registered picture images of the position indicators 504a, 504b, and 504c included in the map area 502. When all the thumbnail images cannot be simultaneously displayed in the gallery area 506a, the thumbnail images may be divisibly displayed in a plurality of pages, and the second touch screen 14 can scroll the thumbnail images according to a touch drag detected from the gallery area 506a. The thumbnail images may be displayed in a grid view mode, a list view mode, or a group view mode according to a basic setting or a setting of the user. In the group view mode, thumbnail images for each group may be displayed in a disordered form where at least some of the thumbnail images overlap.

Figure 12B:
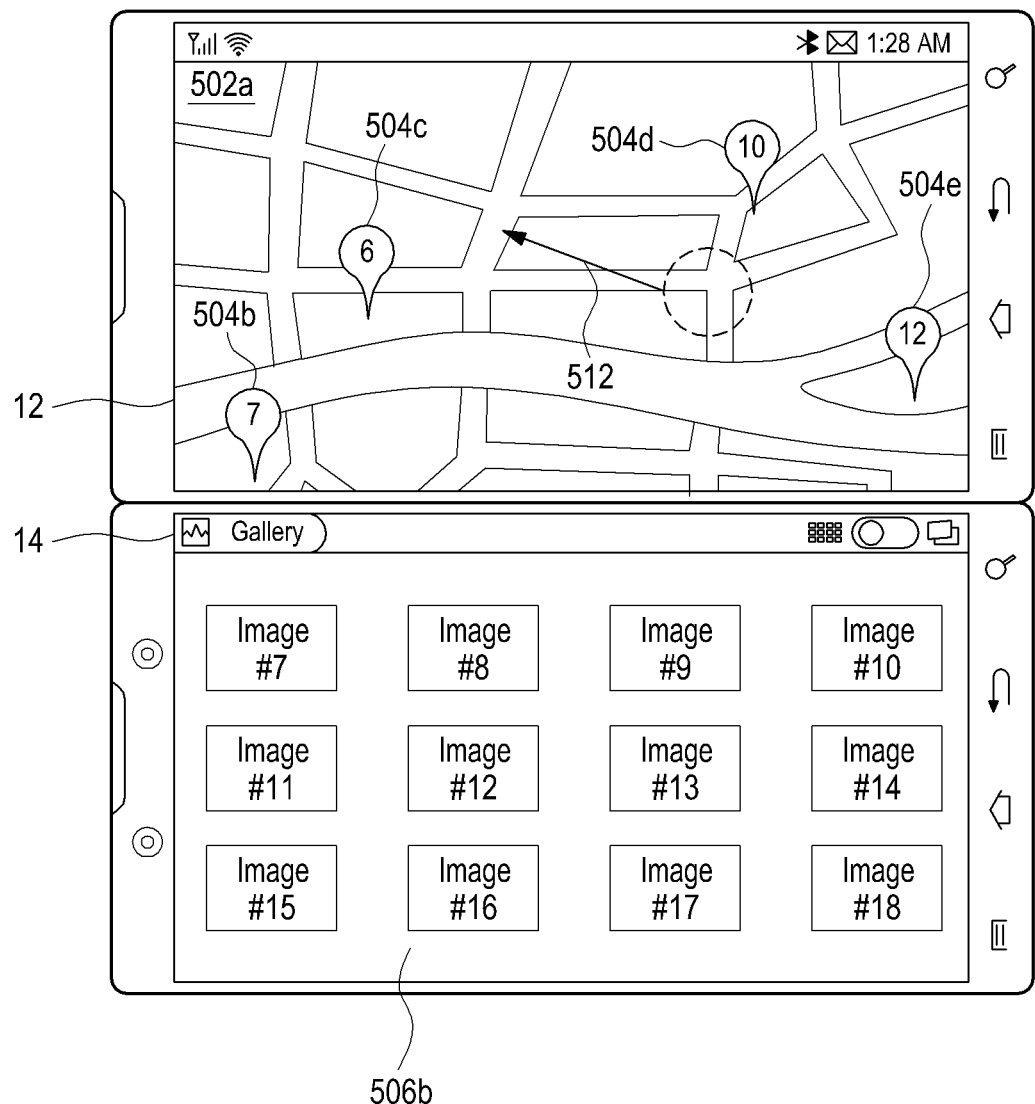

When a touch gesture 512 in a predetermined direction, for example, a flick or a touch drag is detected from the map area 502 displayed in the first touch screen 12, a map area 502a moved according to a motion of the touch gesture 512 is displayed in the first touch screen 12 as illustrated in FIG. 12B. Then, the second touch screen 14 displays a gallery area 506b in which at least some of the thumbnail images of the registered picture images of the position indicators 504b, 504c, 504d, and 504e included in the map area 502a are listed.

Although not illustrated, when a pre-designated touch gesture, for example, a tap gesture is detected from one (for example, the position indicator 504c) of the position indicators 504b, 504c, 504d, and 504e displayed on the map area 502a displayed in the first touch screen 12, the gallery area of the second touch screen 14 can display at least some of the thumbnail images of the registered picture image of the selected position indicator 504c.

Figure 12C:
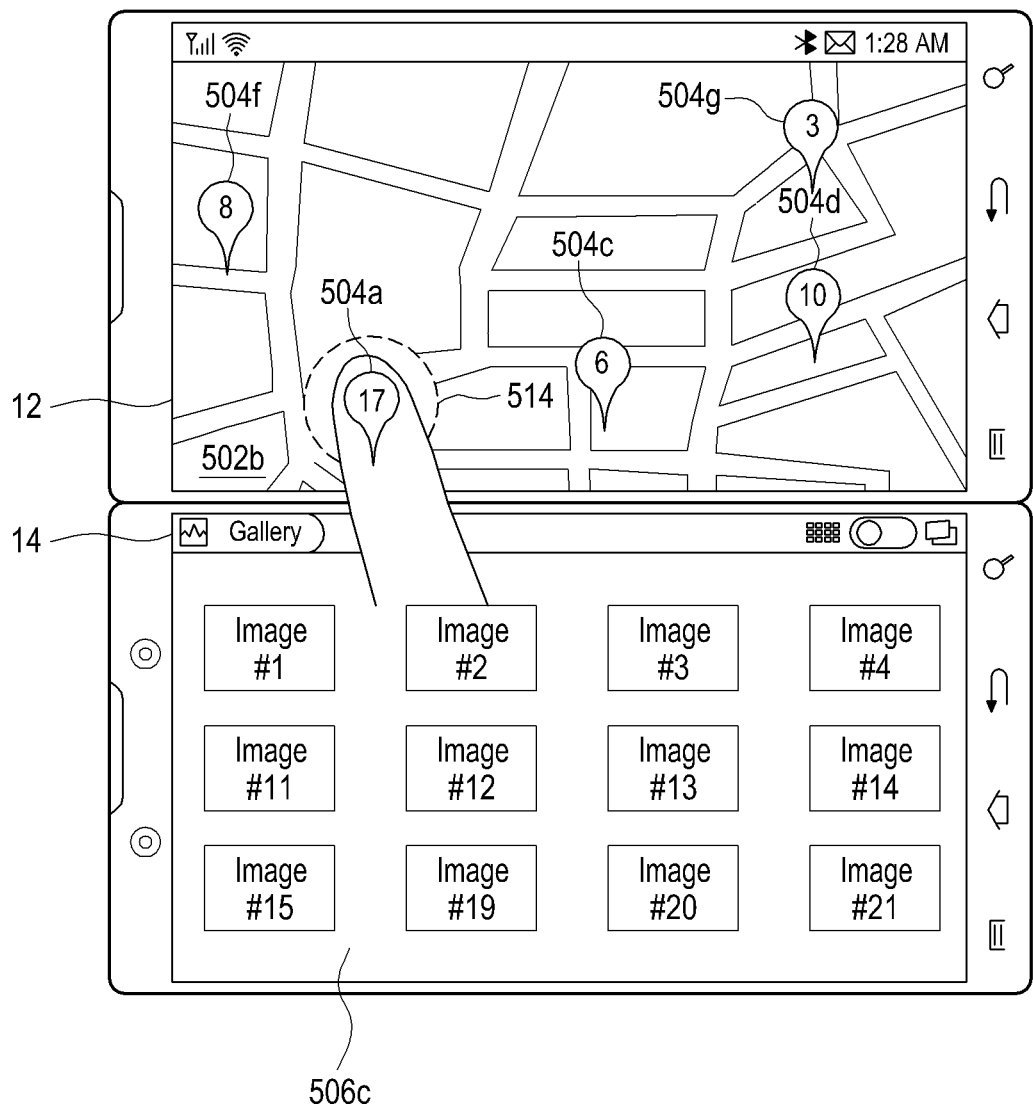
Figure 12D:
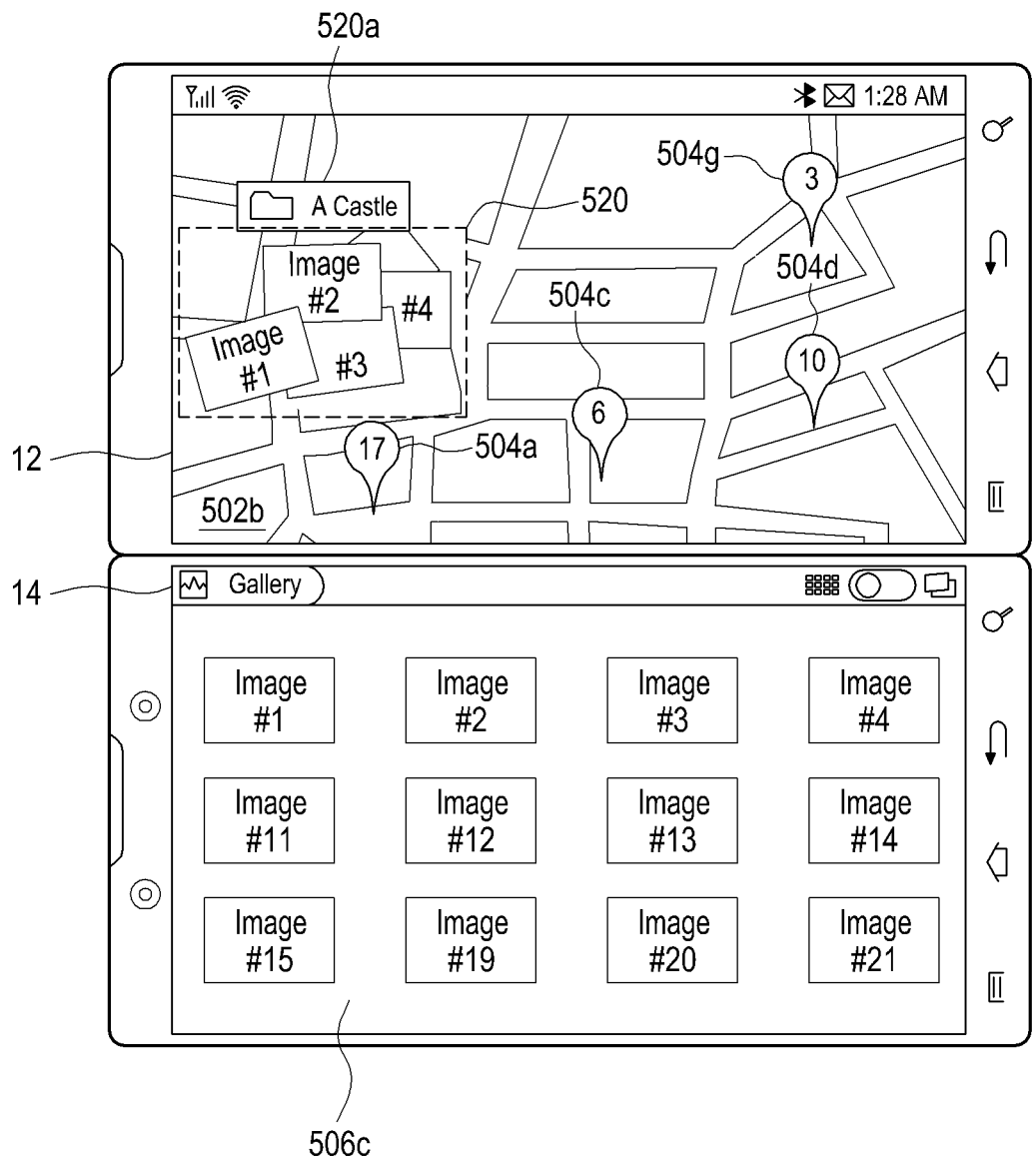

Referring to FIG. 12C, the first touch screen 12 displays the map area 502b and the gallery area 506c of the second touch screen 14 displays the thumbnail images of the registered picture images of the positions included in the map area 502b. The portable device detects a pre-designated touch gesture 514, for example, a tap gesture or a touch and hold from one 504a of the position indicators 504a, 504c, 504d, 504f, and 504g displayed on the map area 502b displayed in the first touch screen 12. Then, in response to the detection of the touch gesture, the first touch screen 12 displays thumbnail images 520 of the registered images of the position indicator 504a in an area adjacent to the position indicator 504a 514as illustrated in FIG. 12D. The thumbnail images 520 may be displayed in the grid form or in the group view mode where at least some of the thumbnail images 520 overlap each other, and a name 520a of the registered image group of the position indicator 504a, for example, "A Castle" may be displayed together with the thumbnail images 520.

Figure 12E:
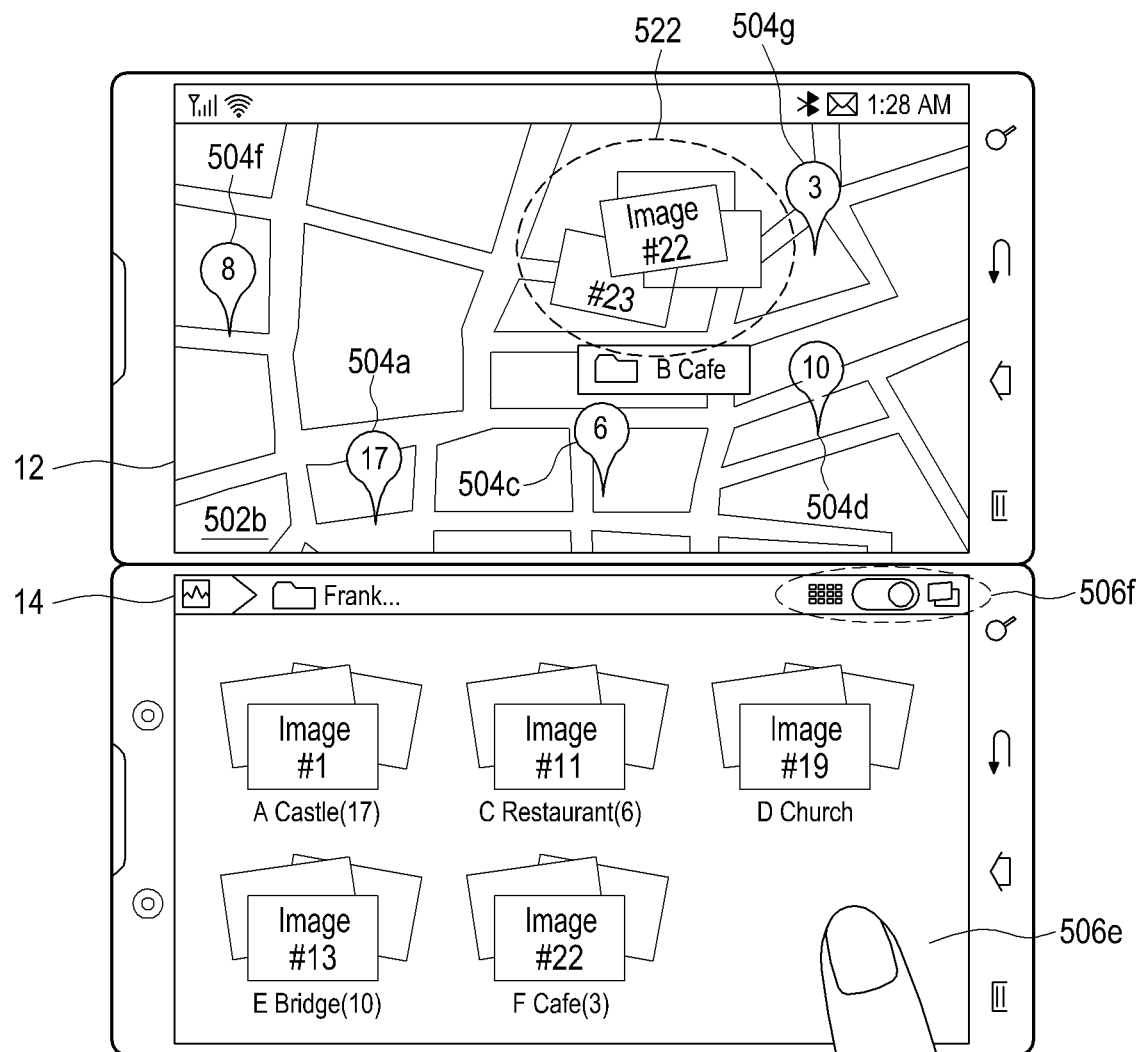

Referring to FIG. 12E, the portable device detects a touch gesture from one 504g of the position indicators 504a, 504c, 504d, 504f, and 504g displayed on the map area 502b displayed in the first touch screen 12 and displays thumbnail images 522 of registered images of the position indicator 504g in an area adjacent to the position indicator 504g. The thumbnail images 522 may be displayed in the grid form or the partially overlapping form, and a name 522b of the registered image group of the position indicator 504g, for example, "B Café" may be displayed together with the thumbnail images 522.

The second touch screen 14 provides a soft key 530 for selecting the view mode to change the view mode of the gallery area 506c into the group view mode or the grid view mode. For example, the soft key 530 includes a slider switch. When a touch of the user is detected from the slider switch and the slider switch moves to an icon indicating the view mode in a group form according to the touch, a gallery area 506e of the second touch screen 14 groups the registered thumbnail images of the position indicators 504a, 504c, 504d, 504f, and 504g included in the map area 502b displayed in the first touch screen 12 for each position and then displays the grouped thumbnail images. In the group view mode, the thumbnail images of each group may be displayed in a disordered form where the thumbnail images partially overlap each other.

Figure 12F:
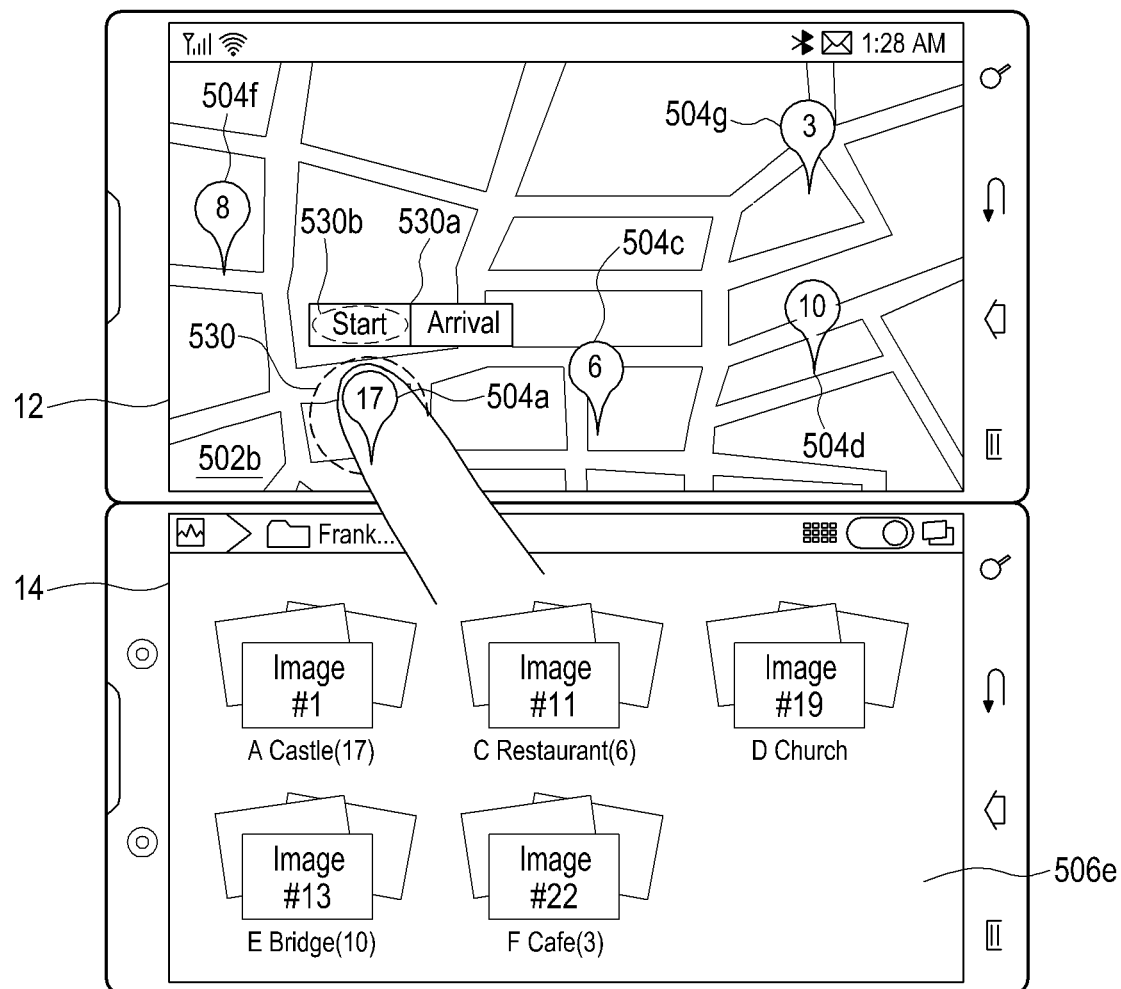

Referring to FIG. 12F, the first touch screen 12 displays the map area 502b provided by the gallery map application. The map area 502b includes position indicators 504a, 504c, 504d, 504f, and 504g indicating a search result, a registered tourist attraction spot, or a position in which the picture image is registered. The second touch screen 14 includes a gallery area 506e in which thumbnail images of the picture images registered in positions included in the map area 502b are listed. The gallery area 506e displays at least some of the registered thumbnail images of the position indicators 504a, 504c, 504d, 504f, and 504g included in the map area 502b in the grid view mode or the group view mode.

When a pre-designated touch gesture 530, for example, a tap gesture or a touch and hold (that is, long tap) is detected from one (for example, the position indicator 504a) of the position indicators 504a, 504c, 504d, 504f, and 504g on the map area 502b, the first touch screen 12 displays a menu window 530a for selecting a path in an area adjacent to the position indicator 504a. The menu window 530a includes a start key and an arrival key. When a tap gesture 530b is detected from the start key of the menu window 530a, the gallery map application designates the position indicator 504a as a start position in response to the detection of the tap gesture 530b. At this time, the position indicator 504a may be changed to a conspicuous color, for example, red in order to be visually distinguished from other displayed position indicators 504c, 504d, 504f, and 504g.

Figure 12G:
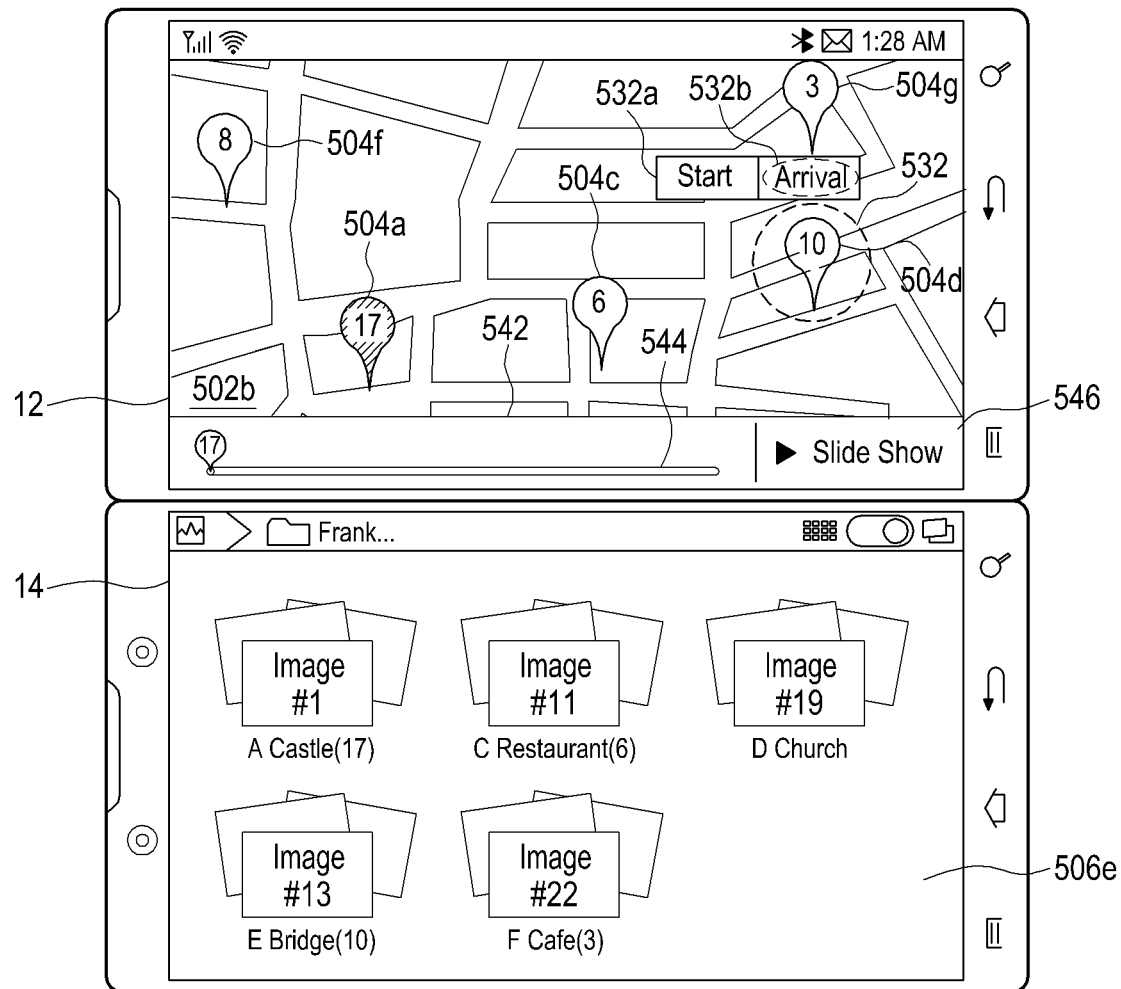

Referring to FIG. 12G, when a pre-designated touch gesture 532, for example, a tap gesture or a touch and hold is detected from one (for example, the position indicator 504d) of the position indicators 504a, 504c, 504d, 504f, and 504g on the map area 502b displayed in the first touch screen 12, the first touch screen 12 displays a menu window 532a for selecting a path in an area adjacent to the position indicator 504d. The menu window 532a includes a start key and an arrival key. When a tap gesture 532b is detected from the arrival key of the menu window 532a, the gallery map application designates the position indicator 504d as an arrival position in response to the detection of the tap gesture 532b. At this time, the position indicator 504d may be changed to a conspicuous color, for example, red in order to be visually distinguished from other displayed position indicators 504c, 504f, and 504g.

When the start position or the arrival position is registered, the gallery map application displays a slide show control area 542 including information on the path from the start position to the arrival position in a lower part of the first touch screen 12. The slide show control area 542 may be displayed while partially covering the map area 502b.

Figure 12H:
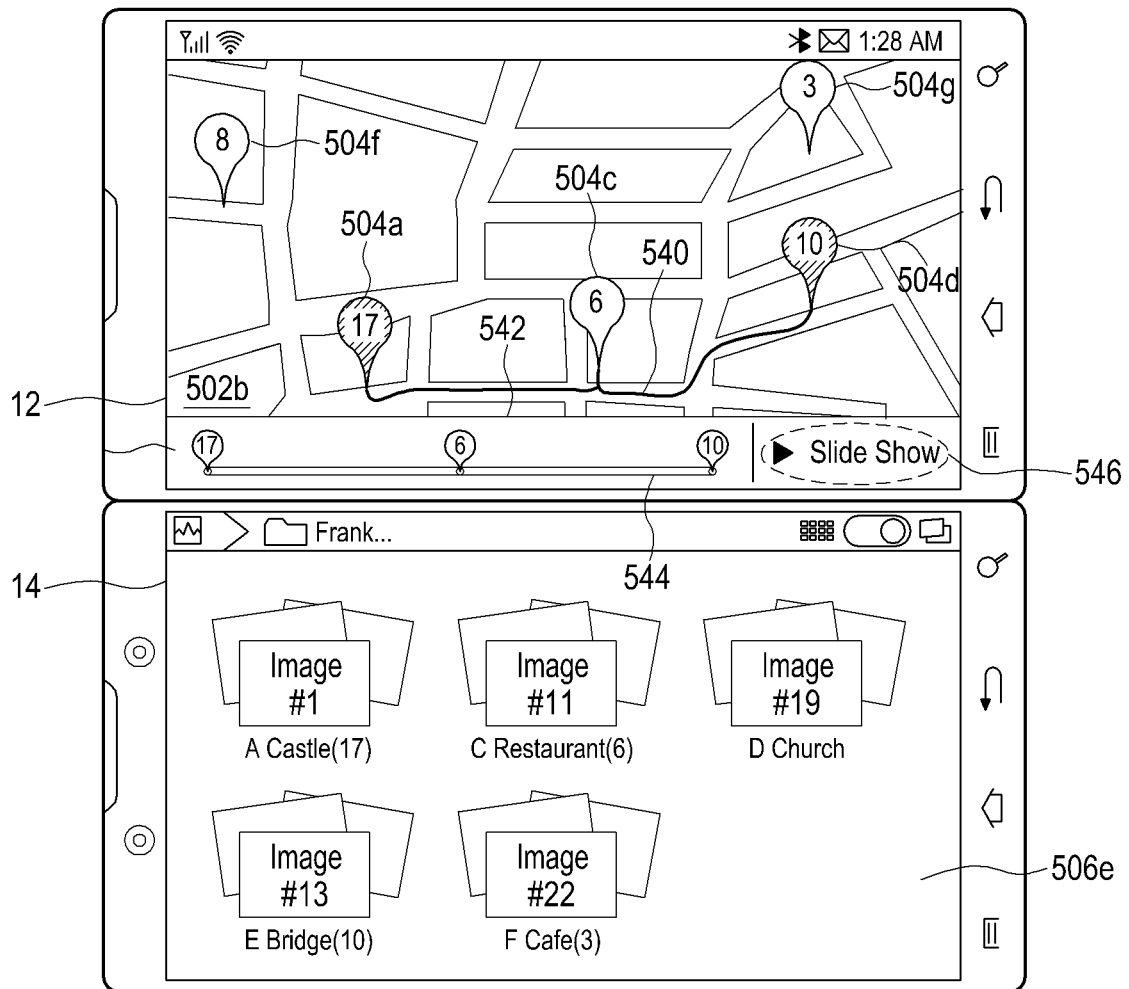

Referring to FIG. 12H, when the start position 504a and the arrival position 504d are registered, the gallery map application displays a path 540 from the start position 504a to the arrival position 504d in a graphic line form in the map area 502b of the first touch screen 12. The path 540 is displayed along an actual road between the start position 504a and the arrival position 504d and may include at least one indicator 504c existing between the start position 504a and the arrival position 504d as an intermediate position. The slide show control area 542 displayed in the lower part of the first touch screen 12 may include a path trace bar 544 showing position indicators included in the path from the start position to the arrival position and movement states according to the path and a slide show view key 546 for selecting to initiate a slide show of the picture images included in the path 540. As another embodiment, the slide show control area 542 is displayed in response to the display of the path 540.

Figure 12I:
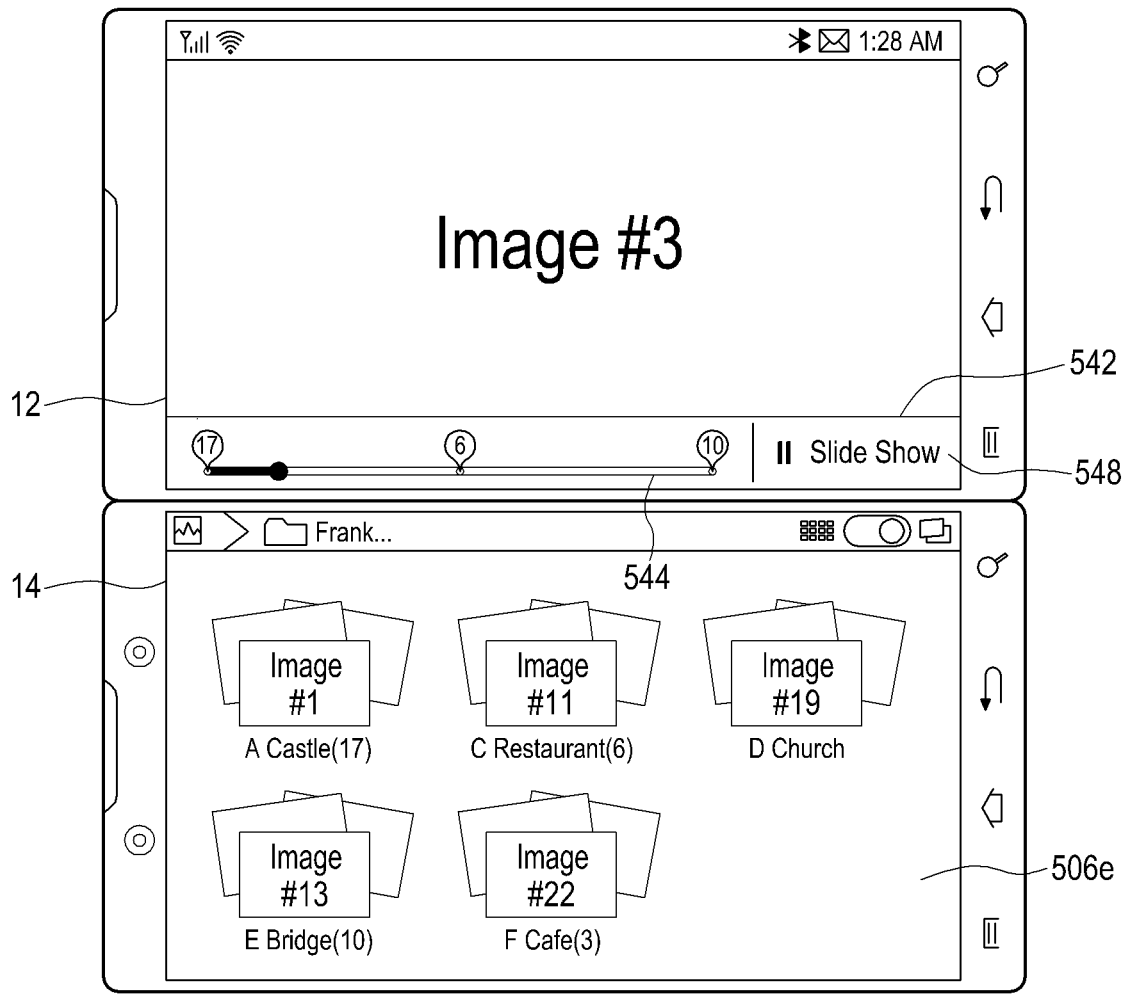

When a pre-designated touch gesture, for example, a tap gesture is detected from the slide show view key 546, the portable device removes the map area 502b from the first touch screen 12 and reproduces the slide show of the picture images registered in the positions included in the path 540 as illustrated in FIG. 12I. As one embodiment, the picture images are sequentially displayed to completely fill at least one of a horizontal width and a vertical width of the first touch screen 12 during the slide show. During the slide show, the path trace bar 544 of the slide show control area 542 includes a current slide indicator indicating a position of the picture image currently displayed in the first touch screen 12 and the slide show control area 542 provides a slide show stop key 548 for selecting to stop the slide show instead of the slide show view key 546.

As a selectable embodiment, the slide show control area 542 may be hidden from the first touch screen 12 during the slide show in order not to interrupt viewing of the slid picture images. The slide show control area 542 may be displayed again in a predetermined area of the first touch screen 12 for the slide show by, for example, detecting a predetermined touch gesture in the lower part of the first touch screen.

The portable device can display a task manager area including icons of a plurality of running applications through the display device including the first touch screen and the second touch screen arranged on one foldable panel. As another embodiment, the task manager area may include icons of favorite applications designated by the user. The task manager area may be disposed in pre-designated positions of the first touch screen and the second touch screen, for example, lower parts of the first touch screen and the second touch screen. That is, some of the icons of the task manager area are displayed in the lower part of the first touch screen and the remaining icons are displayed in the lower part of the second touch screen. The icons of the task manager area may be continuously disposed in the lower parts of the first and second touch screens.

FIGS. 13A to 13J illustrate user interfaces of a task manager panel according to one or more exemplary embodiments.

Figure 13A:
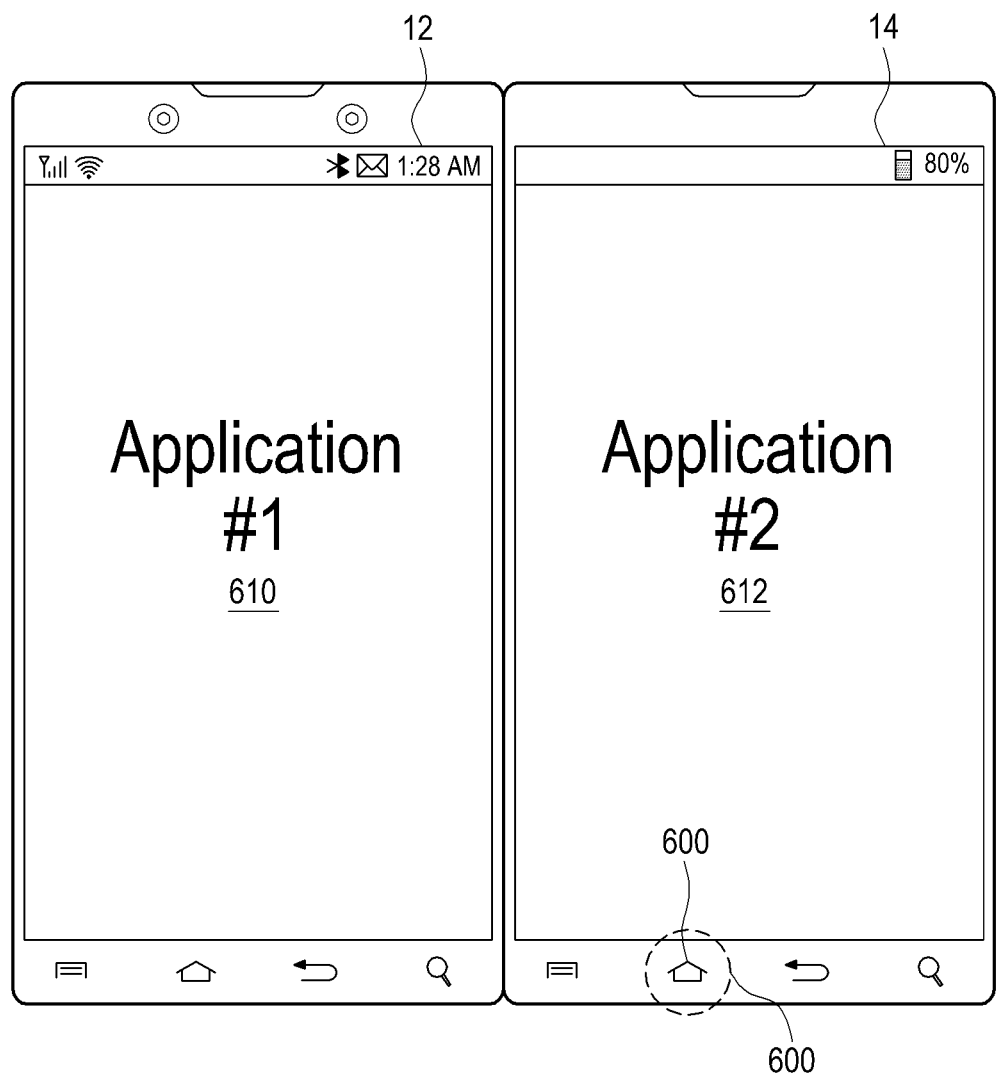
FIGS. 13A to 13J are diagrams illustrating a user interface of a task manager panel according to one or more exemplary embodiments.

Referring to FIG. 13A, the first touch screen 12 displays a task screen 610 of a first application and the second touch screen 14 displays a task screen 612 of a second application. The task screens 610 and 612 have sizes to fill displayable areas of the first and second touch screens 12 and 14, display information executed by each application, and provide a user interface. Although a multi mode in which the first and second touch screens 12 and 14 display the task screens 610 and 612 of different applications is illustrated herein, an execution of the task manager which will be described below may be similarly applied to a case where the home screen or the application menu is displayed in at least one of the first and second touch screens 12 and 14 or the first and second touch screens 12 and 14 operate in the main-sub mode or the full mode.

The portable device detects a predetermined command or a user gesture for executing the task manager. The command or the user gesture includes, for example, at least one of an input of a physical button included in the housing of the portable device, a detection of a touch on a predetermined area within at least one of the first and second touch screens 12 and 14, a detection of a touch on a soft key provided through at least one of the first and second touch screens 12 and 14, and a control of a soft menu.

FIG. 13A illustrates an example of executing a task manager function by using one 600a of the physical buttons arranged in a second panel including the second touch screen 14. The button 600a for executing the task manager function may be, for example, a home button which is one of the touch detection typed physical buttons arranged in the second panel. When the portable device detects an input 602 of the home button 600a arranged in the second panel, for example, a tap gesture on the home button or a touch and hold, the portable device proceeds to FIG. 13B.

Figure 13B:
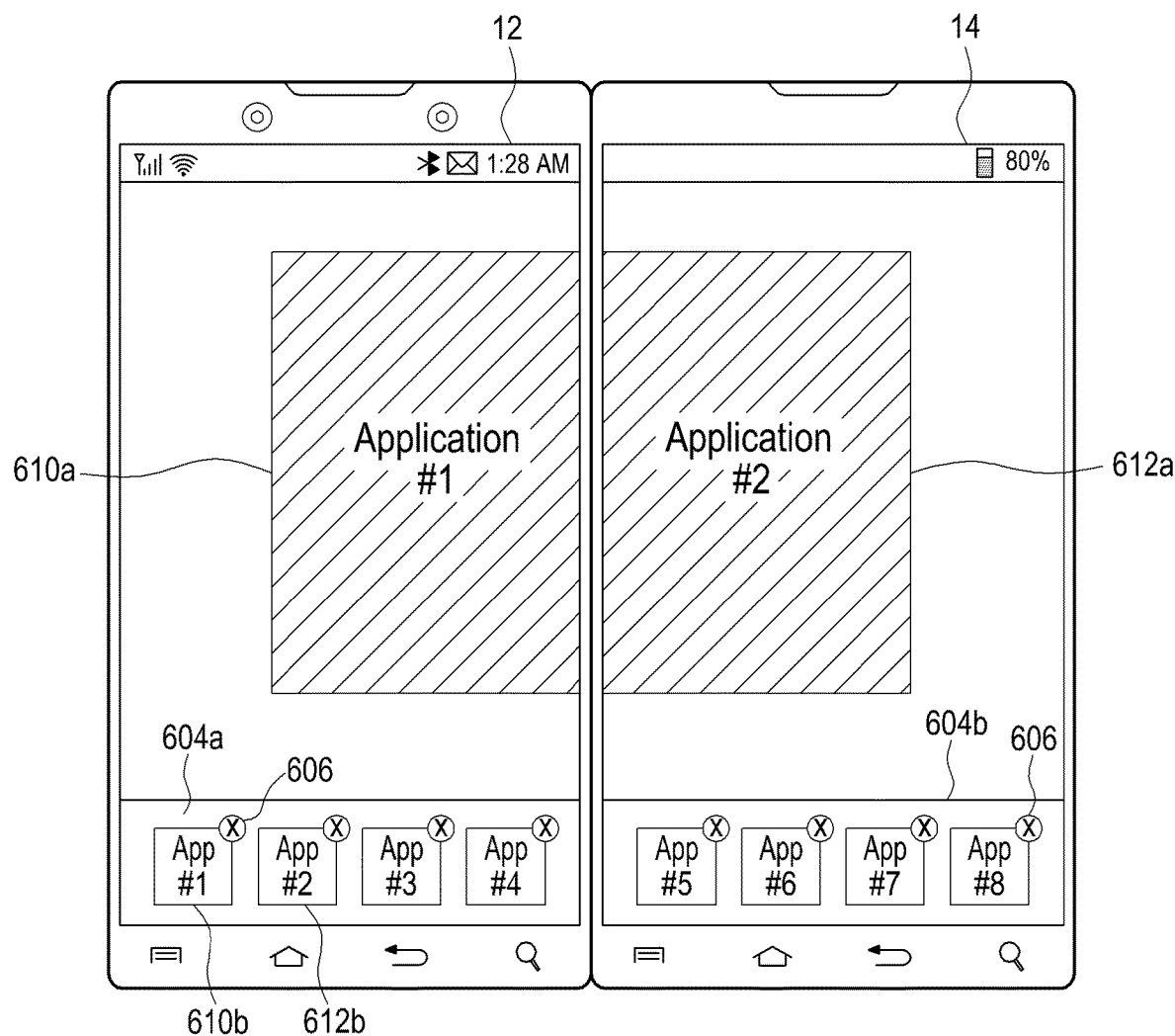

Referring to FIG. 13B, the portable device displays task manager panels 604a and 604b in predetermined positions of the first and/or second touch screens 12 or/and 14, for example, lower parts of the first and second touch screens 12 and 14 in response to the input 602. The task manager panels 604a and 604b form the task manager areas and are located in different touch screens 12 and 14 and disposed close to each other to be continuous. As another embodiment, the task manager panels 604a and 604b may be disposed in basically set positions or positions designated by the user, for example, upper parts of the first and/or second touch screens 12 and 14, a left part of the first touch screen 12, a right part of the second touch screen 14, and a right part of the first touch screen 12, and a left part of the second touch screen 14.

With displays of the task manager panels 604a and 604b, the first and second touch screens 12 and 14 replace the task screens 610 and 612 of the first and second applications with preview windows 610a and 612a of the first and second applications. The preview windows 610a and 612a have smaller sizes in comparison with the task screens 610 and 612 and may be displayed with a shadow in order to indicate a deactivated state in which the user interface such as a touch input or the like is not allowed.

In the shown example, the task manager panels 604a and 604b are divisibly displayed through two touch screens including the first touch screen 12 and the second touch screen 14 and include at least some of the icons of the running applications. For example, each of the task manager panels 604a and 604b may include a maximum of four icons which do not overlap each other. That is, the first task manager panel 604a includes icons of first to fourth running applications App #1 to App #4, and the second task manager panel 604b includes icons of fifth to eighth running applications App #5 to App #8. When the number of running applications exceeds a maximum number of icons which can be displayed in the task manager panels 604a and 604b, that is, when the number of running applications exceeds eight, the task manager panels 604a and 604b display only eight icons and may further display other icons by scrolling the displayed icons in response to a touch gesture.

As one embodiment, orders of the applications included in the task manager panels 604a and 604b are based on a last played time. Icons 610b and 612b of the first and second applications displayed in the first and second touch screens 12 and 14 before the execution of the task manger are located in first and second positions within the task manager panels 604a and 604b. When the number of running applications is smaller than a maximum number (for example, eight) of icons which can be included in the two task manager panels 604a and 604b, the icons of the running applications may be center-aligned from the hinge between the first and second touch screens 12 and 14. The center-aligned icons may move within the first task manger panel 604a or the second task manager panel 604b by a touch drag in a left direction or a right direction.

An end indicator 606 (for example, in an X form) for immediately ending the corresponding running application may be attached to each icon. A tap gesture is detected from the end indicator 606 attached to the application App #8 which is one of the displayed icons, the portable device ends the application App #8 of the corresponding icon. When a preview screen of the application App #8 is displayed within the first and/or second touch screens 12 and/or 14, the preview screen of the application App #8 of the corresponding touch screen is replaced with one page of the home screen. When the preview screen of the application App #8 is not displayed within the first and/or second touch screens 12 and/or 14, the application App #8 ends as the background.

Figure 13C:
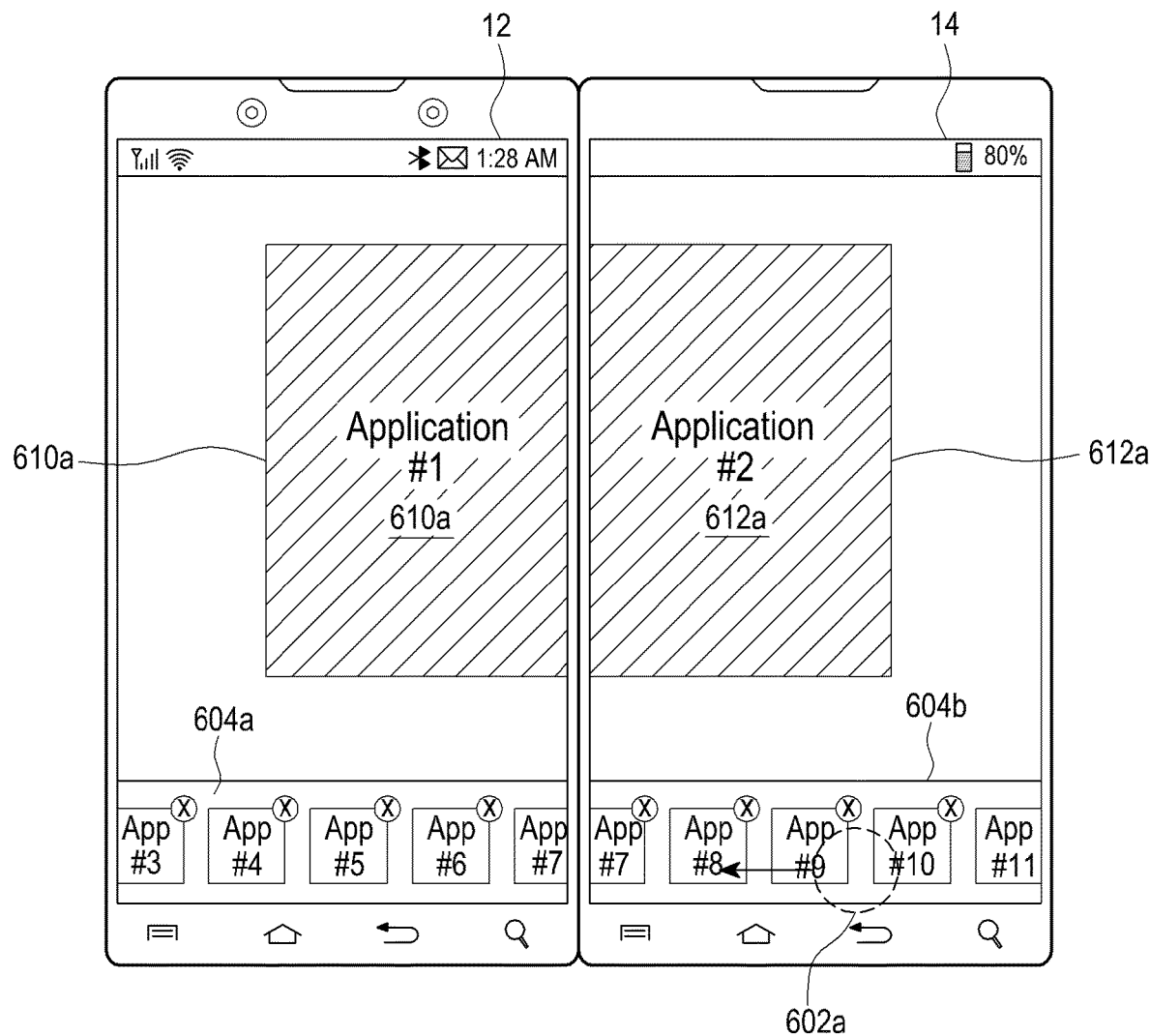

Referring to FIG. 13C, the portable device detects a touch gesture 602*a* acting in parallel to a direction in which the icons are arranged on the first and/or second task manger panels 604*a* and 604*b*, for example, a flick or a touch drag in a left direction or a right direction and scrolls and displays the icons displayed in the first and second task manager panels 604*a* and 604*b* according to the touch gesture 602. The icons designated as the task manger may be scrolled while rotating. When passing though the hinge between the first and second touch screens 12 and 14 according to the touch gesture 602*a*, each of the icons may be displayed over the two touch screens 12 and 14. As another embodiment, when passing through the hinge according to the touch gesture 602*a*, each of the icons is displayed to skip the hinge without being divisibly displayed in the two touch screens 12 and 14.

Figure 13D:
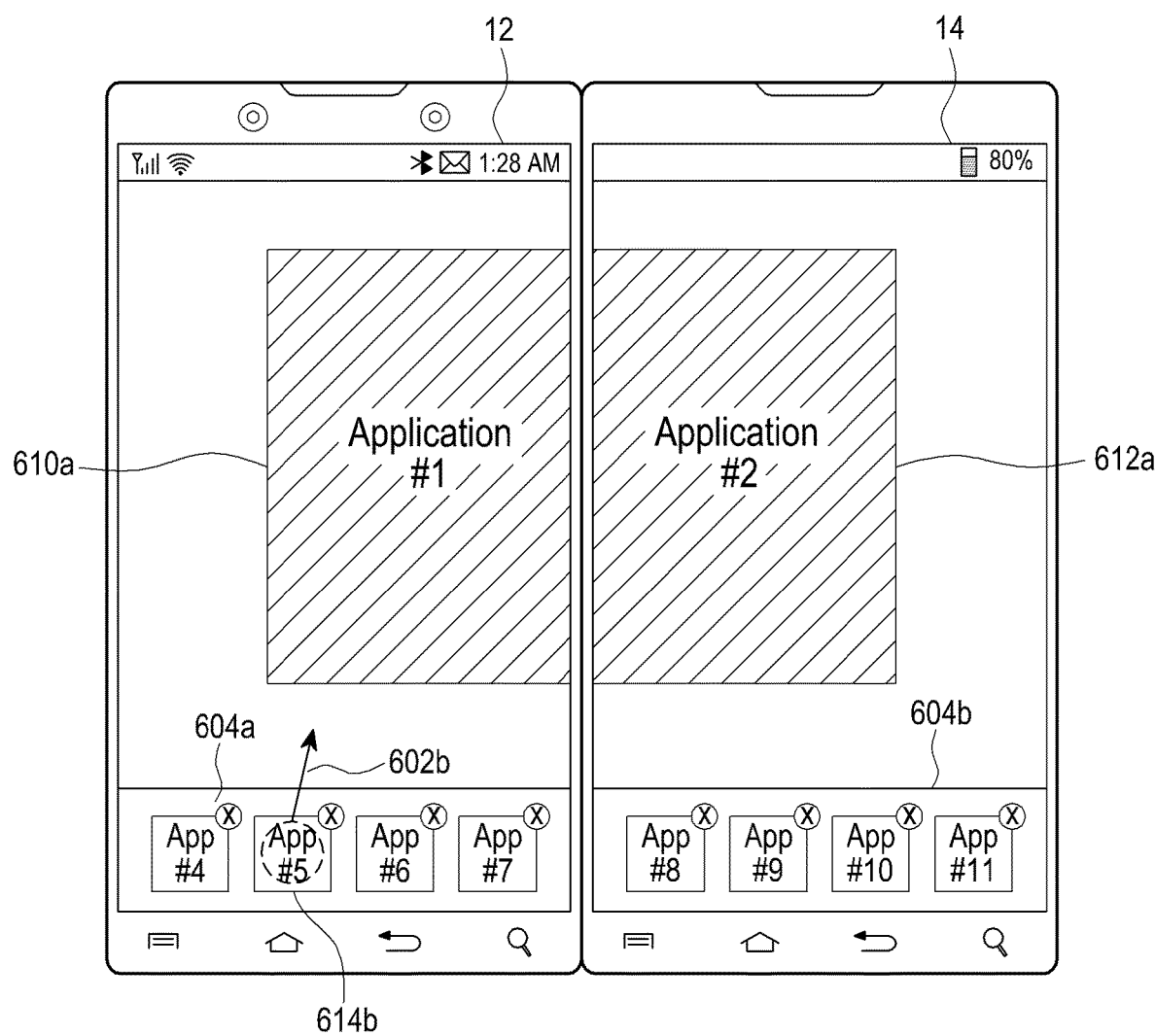
Figure 13E:
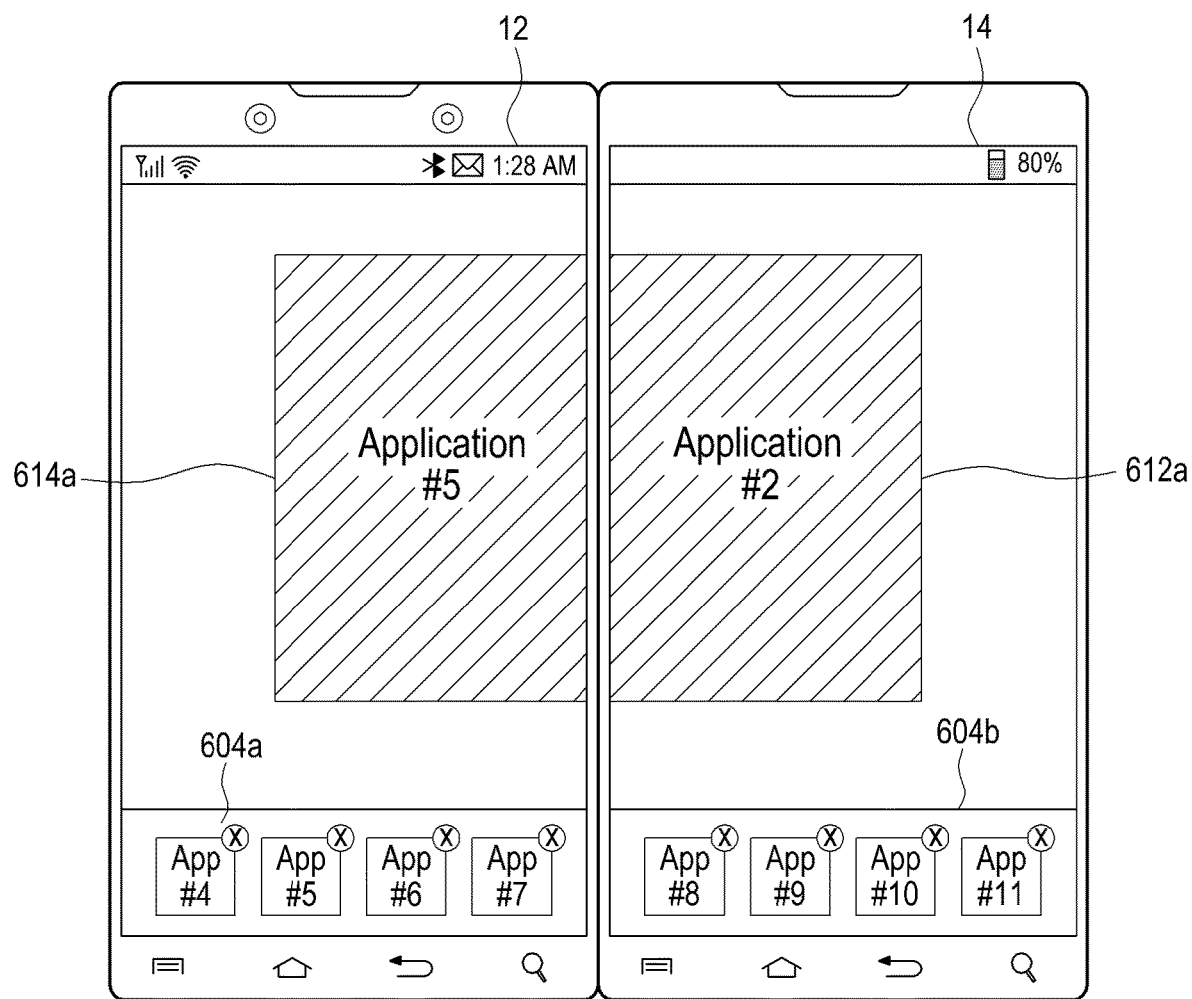

Referring to FIG. 13D, the portable device detects a predetermined touch gesture 602*b* which starts at one 614*b* of the icons included in the first and/or second task manager panels 604*a* and/or 604*b* and heads for outsides of the first and/or second task manger panels 604*a* and/or 604*b*, for example, a touch drag which starts at the icon 614*b* of the application App #5 and is released at an area included in the first touch screen except for the first task manager panel 604*a*. As illustrated in FIG. 13E, the first touch screen 12 replaces the preview window 610*a* of the first application displayed in the first touch screen 12 with a preview window 614*a* of the application App #5 related to the icon 614*b* and displays the replaced preview window 614*a* in response to the detection of the touch drag 602*b*.

Figure 13F:
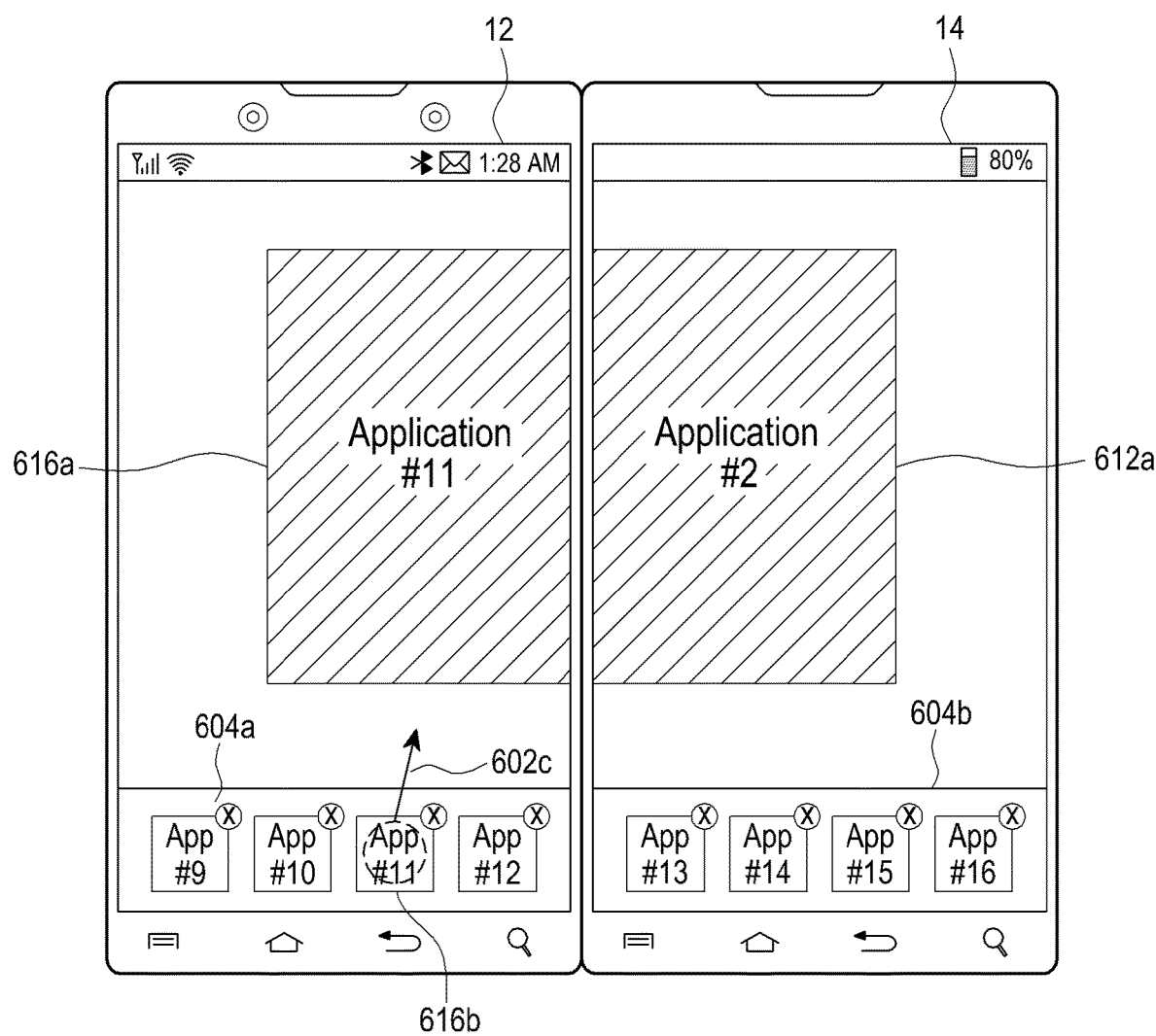
Figure 13G:
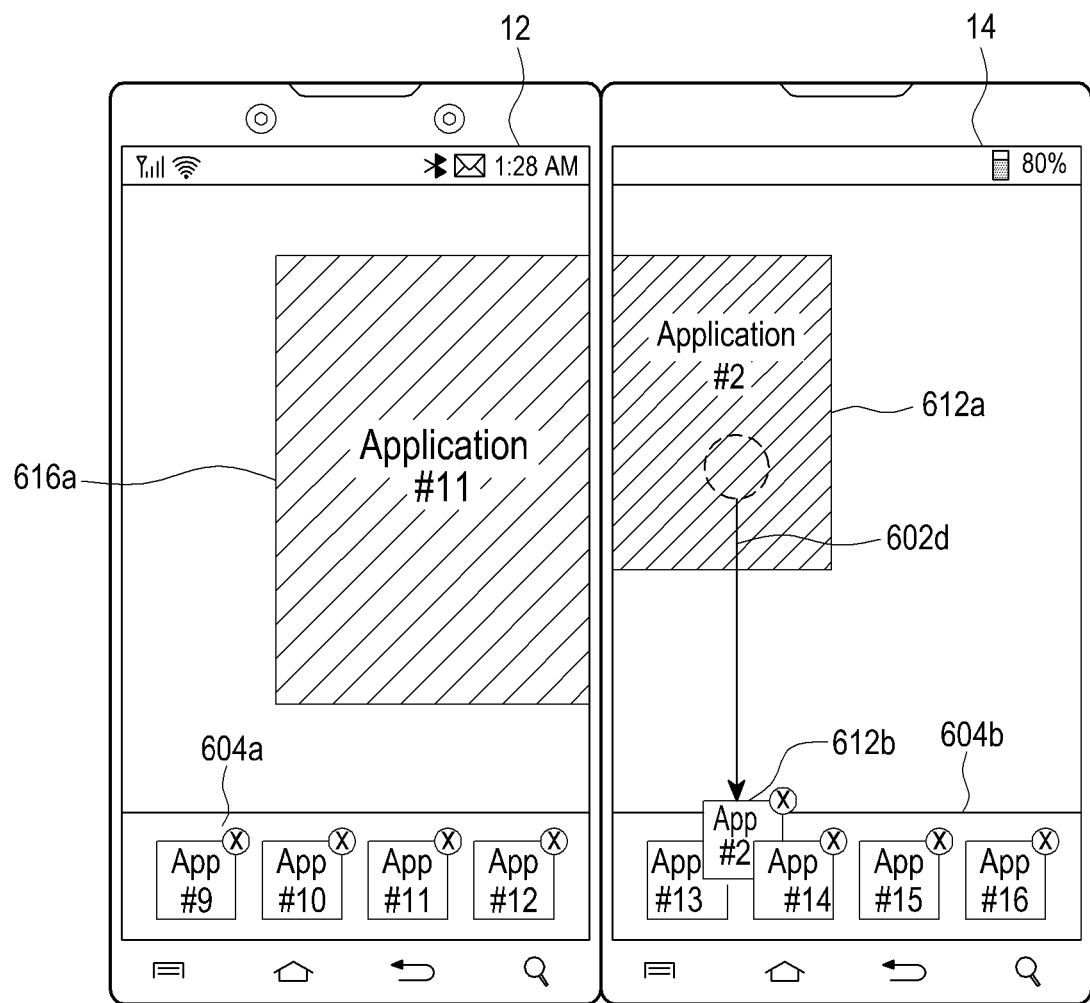

Referring to FIG. 13F, the portable device detects a touch drag 602*c* from an icon 616*b* of the application App #11 included in the first task manager panel 604*a* to an area included in the first touch screen 12 except for the first task manager panel 604*a*. The touch drag 602*c* starts at the icon 616*b* and is released at one point within an area included in the first touch screen 12 except for the first task manger panel 604*a*. As illustrated in FIG. 13G, the first touch screen 12 replaces the preview window 614*a* of the application App #5 with the preview window 616*a* of the application App #11 related to the icon 616*b* and displays the replaced preview window 616*a* in response to the detection of the touch drag 602*c*.

Although it has been illustrated that the replacement of the preview window made in the first touch screen 12 in FIGS. 13D to 13G, the preview window of the application corresponding to the icon included in the first task manager panel 604*a* may be drawn to the second touch screen 14 or the preview window of the application corresponding to the icon included in the second task manager panel 604*b* may be drawn to the first touch screen 12 according to a start position and a release position of the touch drag.

Referring to FIG. 13G, the portable device detects a pre-designated touch gesture 602*d* headed for an inside of the second task manager panel 604*b* displayed in the second touch screen 14, for example, a touch drag which starts at one position of the preview window 612*a* and is released at one position within the second task manager panel 604*b* from the preview window 612*a* of the second application displayed in the second touch screen 14. Then, the second touch screen 14 converts the preview window 612*a* to the icon 612*b* of the second application in response to the detection of the touch drag 602*d* and moves the icon 612*b* to the second task manager panel 604*b* according to the touch drag 602*d*. The icon 612*b* may be disposed between icons conventionally displayed within the second task manager panel 604*b*, that is, a position where the touch drag 602*d* is released.

Figure 13H:
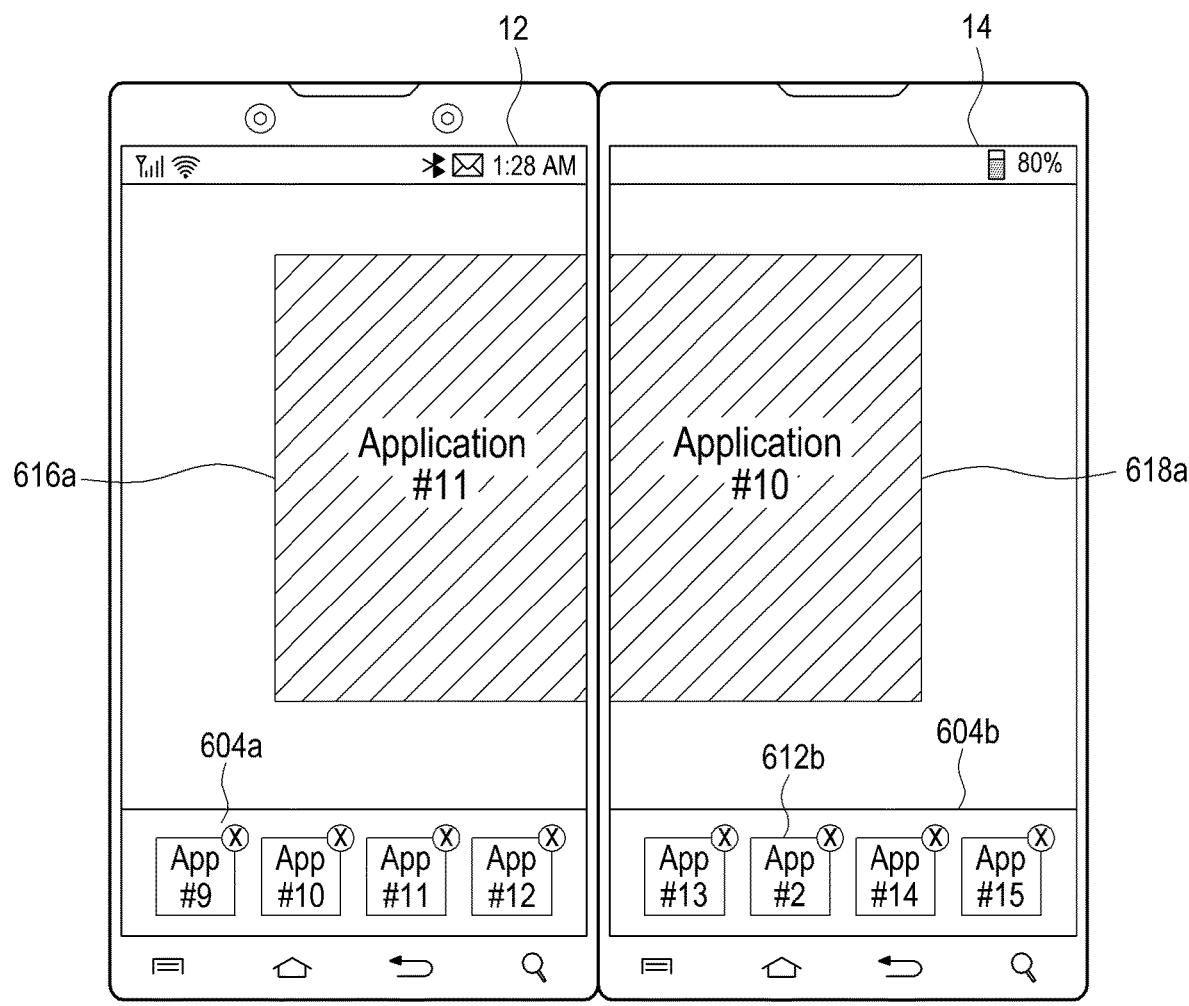

Referring to FIG. 13H, as the icon 612*b* enters an area of the second task manager panel 604*b* according to the touch drag 602*d*, the second task manager panel 604*b* inserts the icon 612*b* between the previously displayed icons and displays them together. The icons displayed within the first and second task manager panels 604*a* and 604*b* may rearranged with the newly entered icon 612*b*. At this time, the second touch screen 14 replaces the preview window 612*a* of the second application with a preview window 618*a* of the running application App #10 and displays the replaced preview window 618*a*.

After the preview window 612*a* is removed according to the touch drag 602*d*, the second touch screen 14 may not display any preview window or task window except for the second task manager panel 604*b*. As a selectable embodiment, the second touch screen 14 can display a first page of the home screen after the preview window 612*a* is removed. Thereafter, when the preview window 616*a* of the first touch screen 12 is removed by the touch drag headed for the task manager panel 604*a* or 604*b*, the portable device displays the first page of the home screen in the first touch screen 12 and displays a second page of the home screen in the second touch screen 14. At this time, the first page of the home screen may be displayed together with a dock area in the first or second touch screen 12 or 14.

Figure 13I:
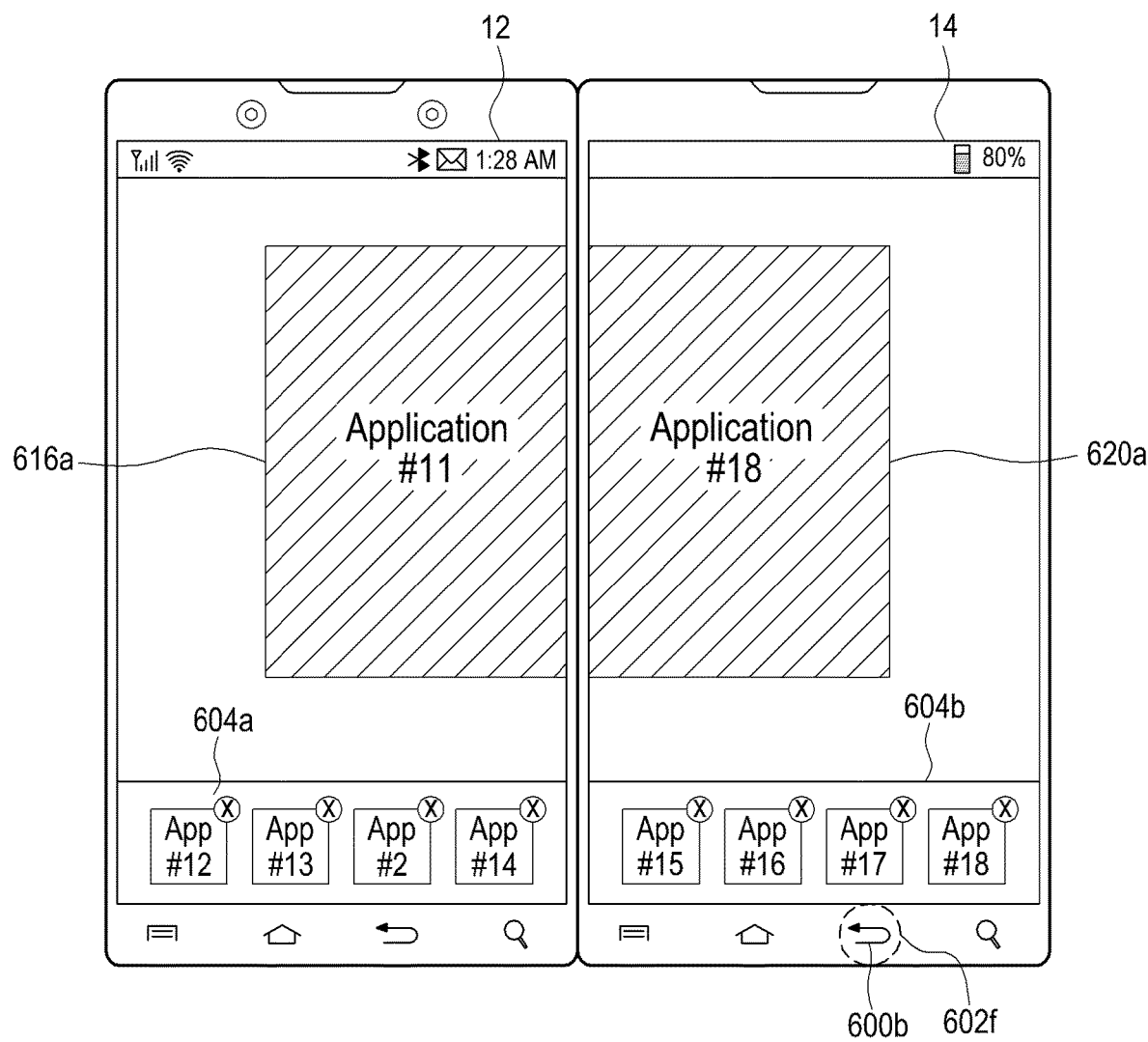

Referring to FIG. 13I, the portable device detects a predetermined command or user gesture for ending the task manager while the preview windows 616*a* and 620*a* of the applications are displayed in the first and second touch screens 12 and 14. The command or the user gesture includes, for example, at least one of an input of a physical button included in the housing of the portable device, a detection of a touch on a predetermined area within at least one of the first and second touch screens 12 and 14, a detection of a touch on a soft key provided through at least one of the first and second touch screens 12 and 14, and a control of a soft menu.

FIG. 13I illustrates an example of executing a task manager function by using one 600*b* of the physical buttons arranged in a second panel including the second touch screen 14. The button 600*b* for executing the task manager function may be, for example, a back button which is one of the touch detection typed physical buttons arranged in the second panel. The portable device detects an input 602*f* of the back button 600*b* arranged in the second panel, for example, a tap gesture or a touch and hold on the back button 600*b*.

Figure 13J:
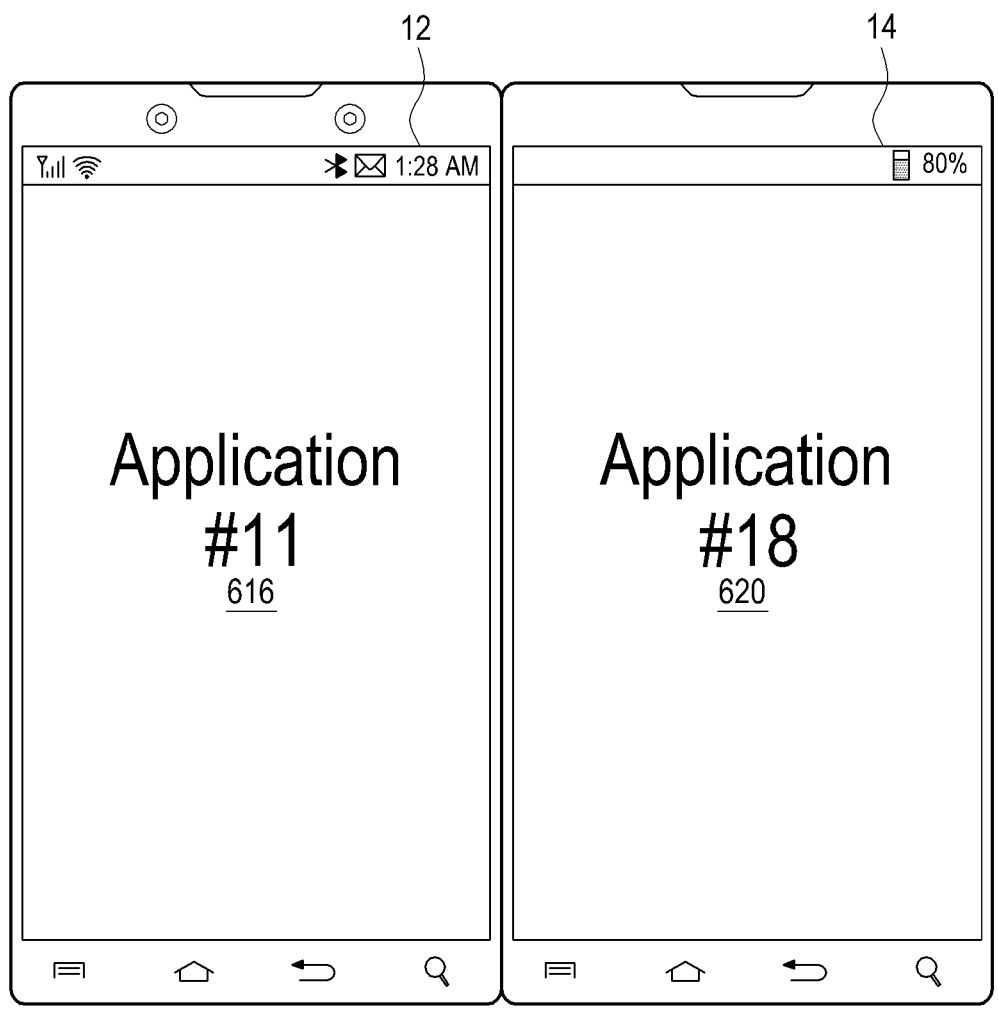

Referring to FIG. 13J, in response to the input 602*f*, the portable device removes the first and second task manager panels 604*a* and 604*b* from the first and second touch screens 12 and 14 and replaces the preview windows 616*a* and 620*a* which previously displayed in the first and second touch screens 12 and 14 with activated task screens 616 and 620 of the corresponding applications and displays the replaced task screens 616 and 620.

The portable device can support a personal broadcasting service by the user through the display device including the first touch screen and the second touch screen arranged on at least one foldable panel. The user having the portable device who corresponds to a broadcaster of the personal broadcasting service can broadcast an image recorded through a camera of the portable device by using the personal broadcasting application installed in the portable device.

FIGS. 14A to 14M illustrate user interfaces of the personal broadcasting application according to one or more exemplary embodiments.

Figure 14A:
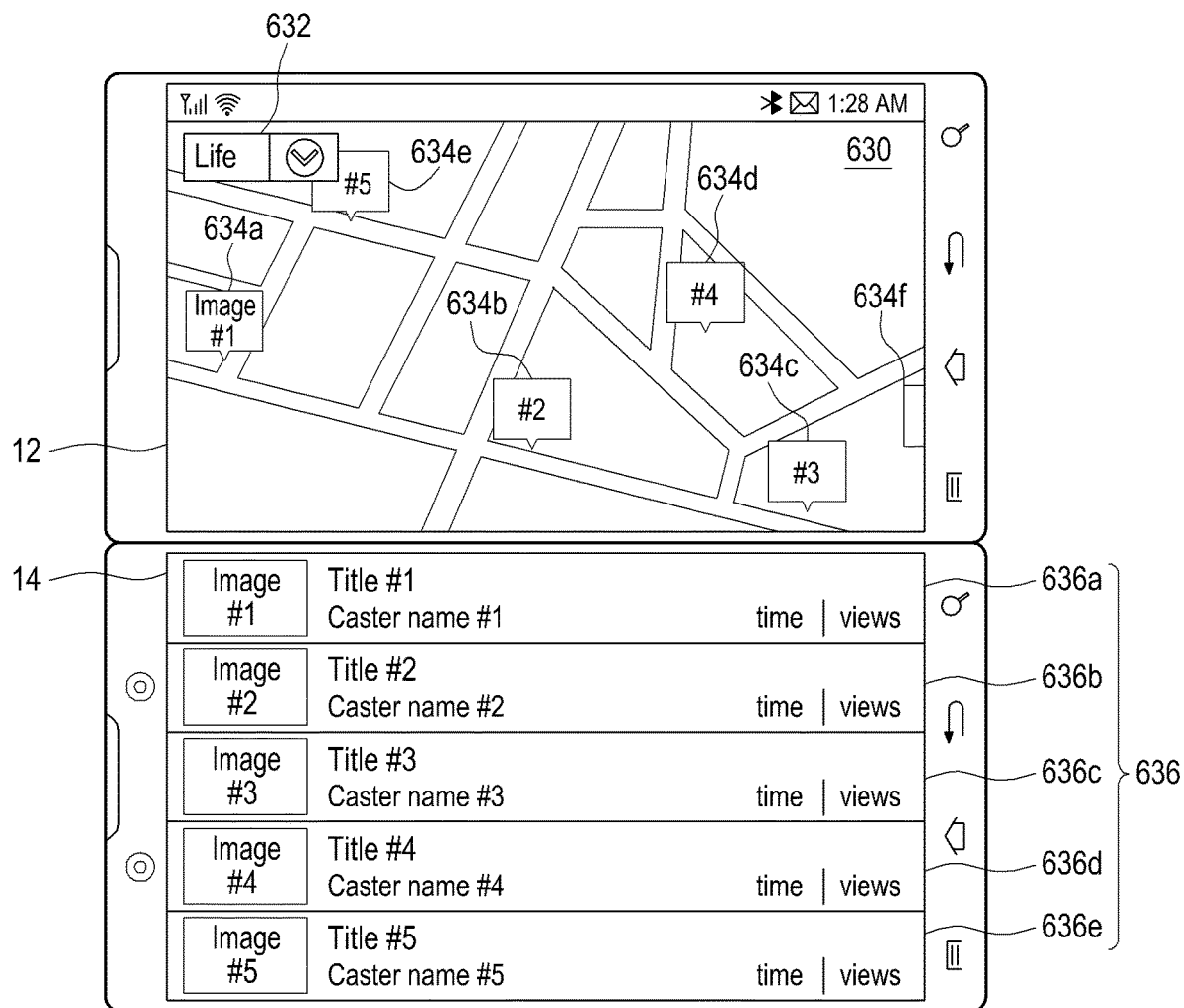
FIGS. 14A to 14M are diagrams illustrating a user interface of a personal broadcasting application according to one or more exemplary embodiments.

Referring to FIG. 14A, the first touch screen 12 displays a map area 630 provided by the personal broadcasting application. For example, the map area 630 may includes a geographical area of a predetermined scale including a current position of the user or a geographical area of a predetermined scale including a position selected by the user. The map area 630 includes at least one of caster indicators 634*a*, 634*b*, 634*c*, 634*d*, 634*e*, and 634*f* indicating a position of at least one broadcaster. The caster indicators 634*a* to 634*f* are simple information on broadcast contents broadcasted by the broadcasters, and may include, for example, at least one of a captured image, a caster name, and a broadcast title. As a selectable embodiment, the first touch screen 12 displays a broadcasting category including the broadcast contents of the broadcaster displayed within the map area 630, for example, at least one of all, lift, sports, and entertainment, and may further display a category display line 632 for a change to a desired broadcast category.

The second touch screen 14 displays broadcast lists 636 including at least some broadcast items 636*a*, 636*b*, 636*b*, 636*c*, 636*d*, and 636*e* indicating broadcast contents provided by the broadcasters included in the map area 630. Each of the broadcast items 636*a* to 636*e* includes a captured image of the broadcast contents, a broadcast title, a name of the broadcaster, broadcasting hours, and the number of views.

Figure 14B:
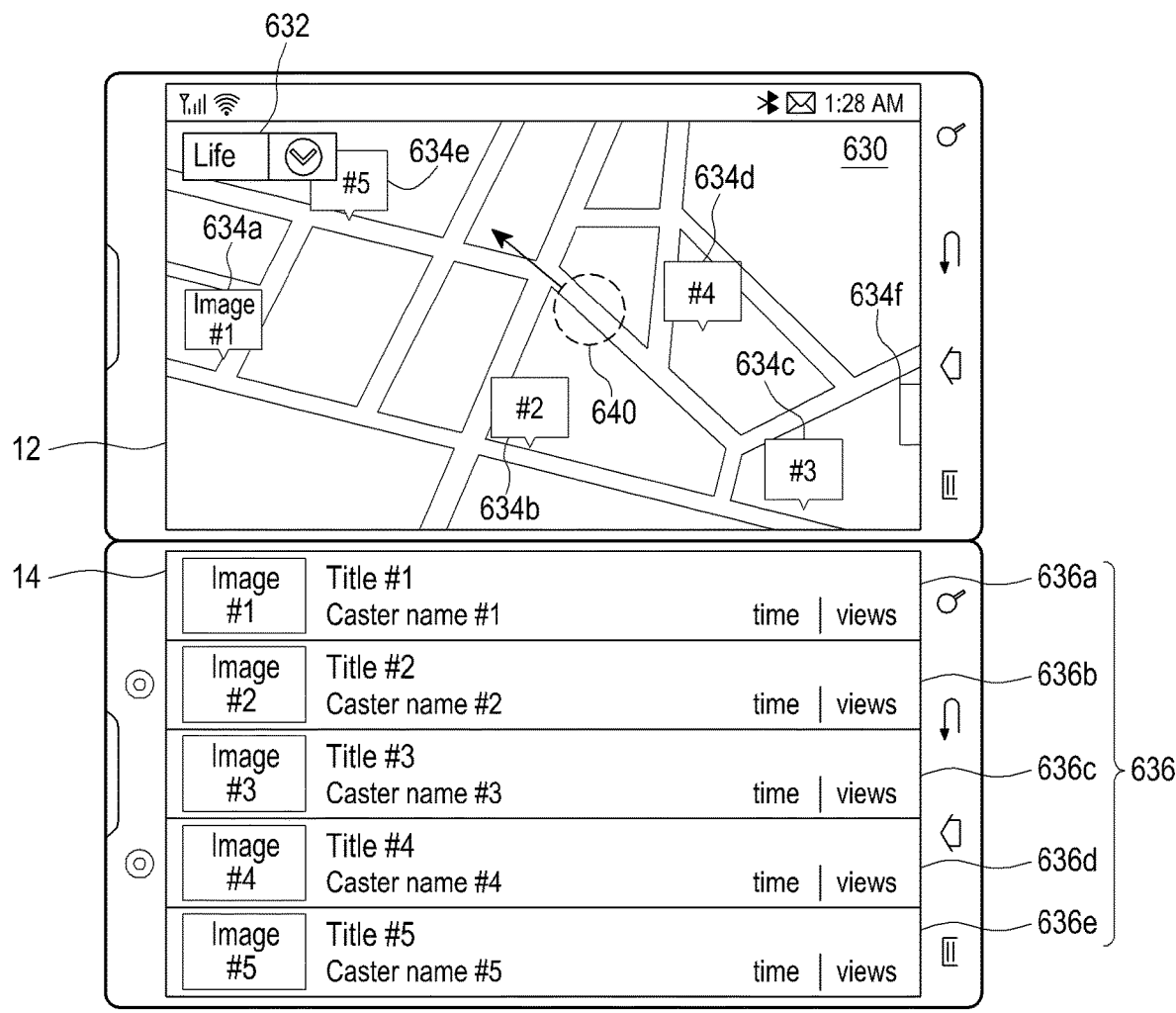
Figure 14C:
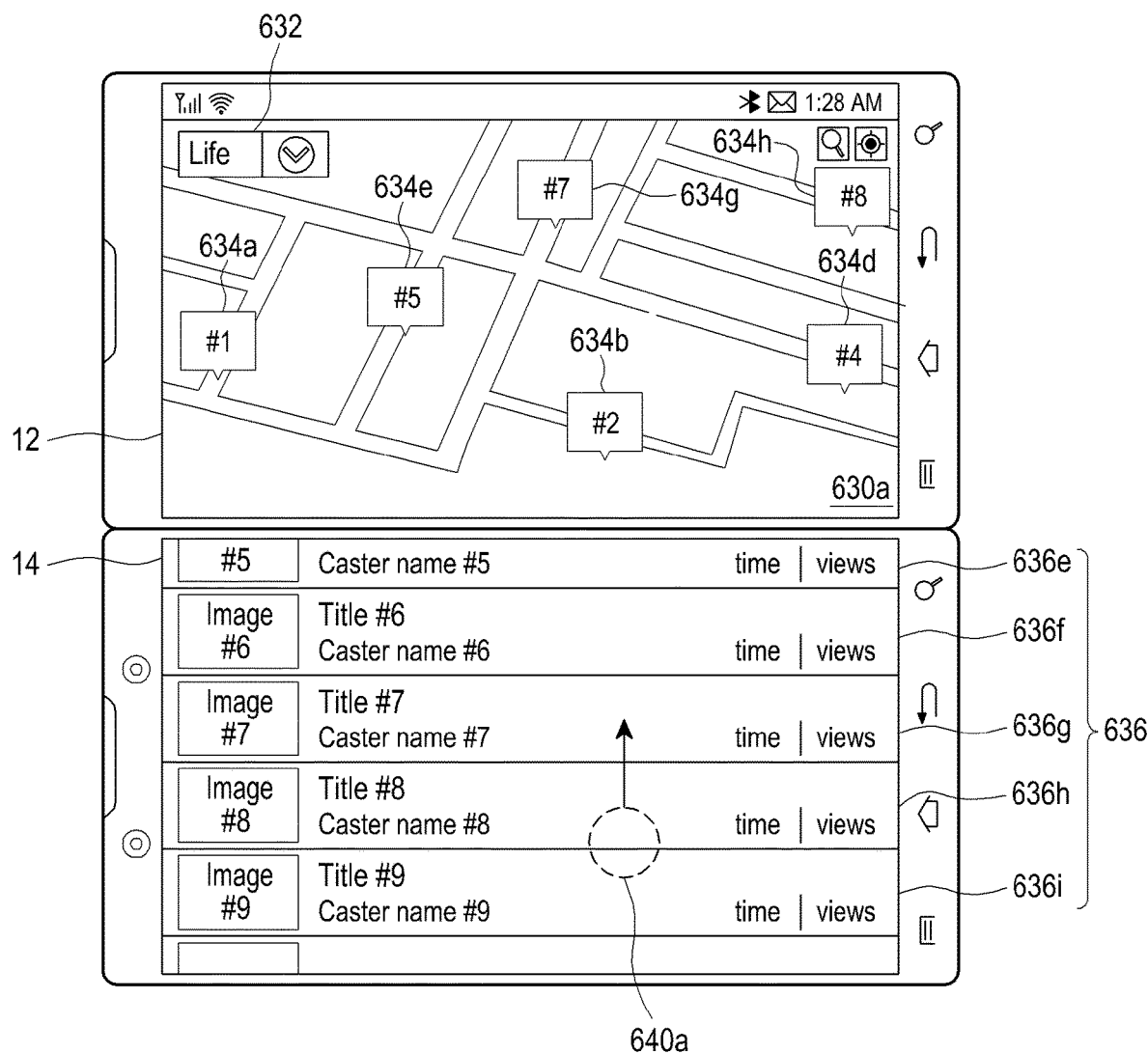

Referring to FIG. 14B, the portable device detects a touch gesture 640 in a predetermined direction, for example, a flick or a touch drag from the map area 630 displayed in the first touch screen 12. Referring to FIG. 14C, the first touch screen 12 displays a map area 630 moved from the map area 630 according to a motion direction and a speed of the touch gesture 640. Then, the second touch screen 14 displays the broadcast lists 636 including the broadcast items 636*e*, 636*f*, 636*g*, 636*h*, 636*i*, and 636*h* of the broadcast contents provided by the caster indicators 634*a*, 634*b*, 634*d*, 634*e*, 634*g*, and 634*h* included in the map area 630*a*.

Referring to FIG. 14C, the second touch screen 14 detects a touch gesture 640*a* in a predetermined direction, for example, a flick in a vertical direction or a touch drag in a vertical direction from the displayed broadcast lists 636. Then, the second touch screen 14 scrolls and displays the broadcast items of the broadcast lists 636 according to the touch gesture 640*a*.

Figure 14D:
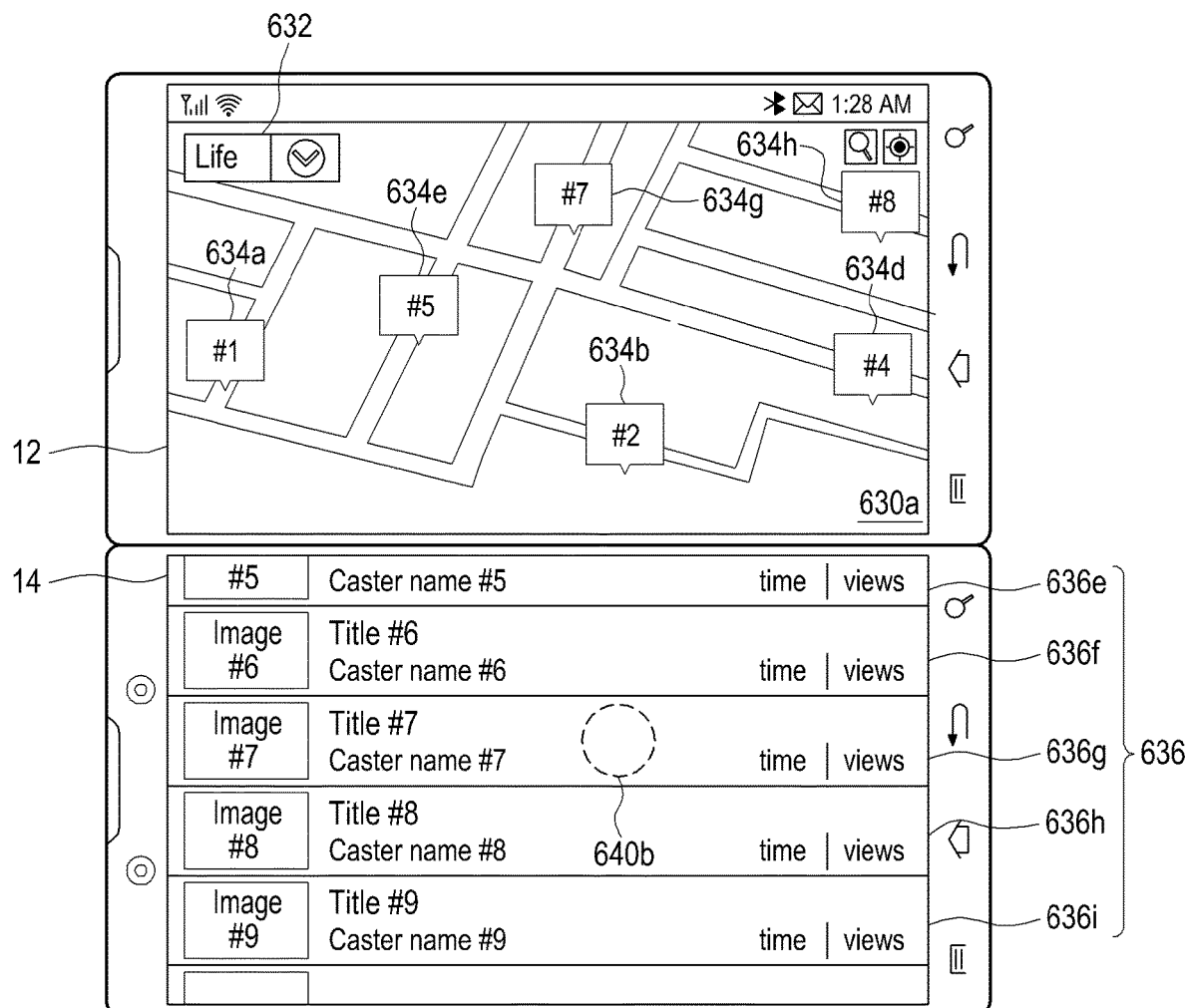
Figure 14E:
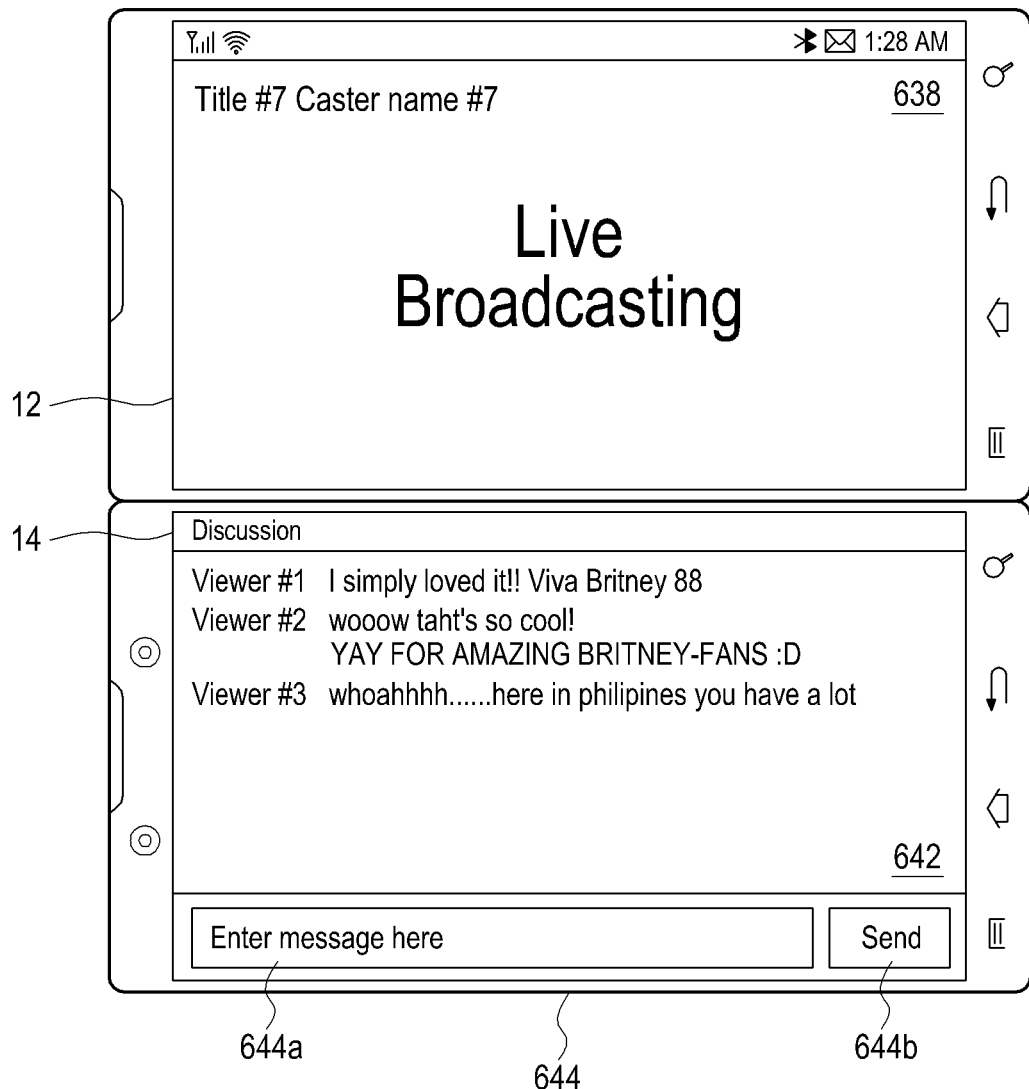

Referring to FIG. 14D, the portable device detects a predetermined touch gesture 640*b*, for example, a tap gesture or a touch and hold from one (for example, the broadcast item 636*g* of the broadcast items of the broadcast lists 636 displayed in the second touch screen 14. Then, as illustrated in FIG. 14E, the first touch screen 12 displays a broadcast image 636 reproducing broadcast contents corresponding to the broadcast item 636*g* and the second touch screen 14 displays discussion areas 642 and 644 in which viewers who view the broadcast image 638 can participate in response to the detection of the touch gesture 640*b*. The discussion areas 642 and 644 include a message display window 642 and a message input window 644, and the message input window 644 includes a message input area 644*a* and a message sending key 644*b*. The message input area 644*a* receives a message including a text and/or a conversation icon from the user. When a tap gesture is detected from the message sending key 644*b* in a state where a message input into the message input area 644*a* exists, the message display window 644 displays the input message together with a name of the user (actual name or a nickname registered in the personal broadcasting application).

Figure 14F:
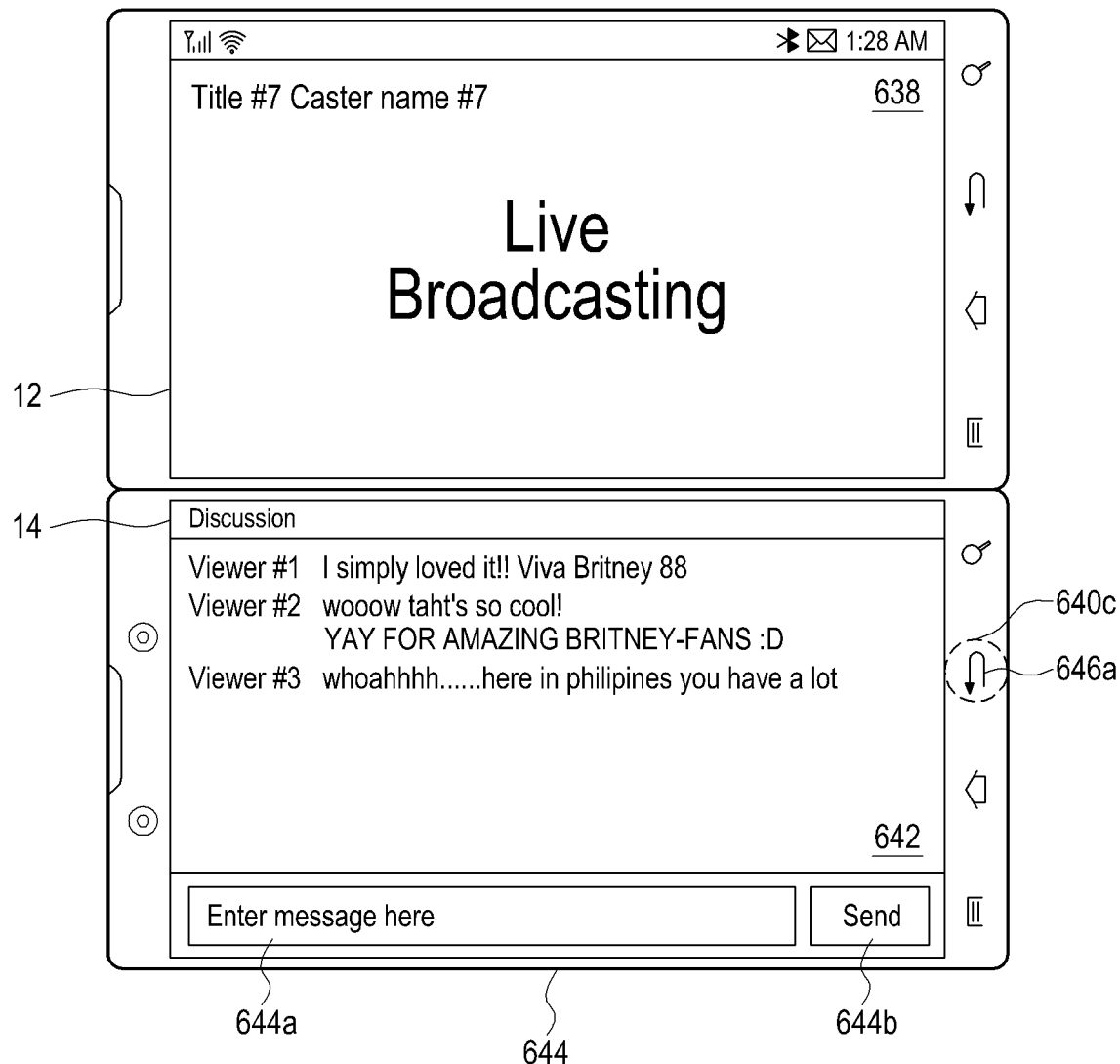

Referring to FIG. 14F, the portable device detects an input of one 646*a* of physical buttons arranged in the second panel including the second touch screen 14, for example, an input 640*c* of the back button, that is, a tap gesture while the broadcasting image 638 is displayed in the first touch screen 12 and the discussion areas 642 and 644 are displayed in the second touch screen 14. Then, as illustrated in FIG. 14G, the portable device replaces the broadcasting image 638 and the discussion areas 642 and 644 of the first and second touch screens 12 and 14 with the previously displayed map area 630*a* and broadcast lists 636 and displays the replaced map area 630*a* and broadcast lists 636 in response to the input 640*c*.

When the user cannot find a desired broadcast through a movement of the map area 630*a* and a search for the broadcast lists 636, the user can make a request for the desired broadcast to other users through a broadcast request function provided by the personal broadcasting application. Hereinafter, a scenario for making a request for the broadcast will be described.

Figure 14G:
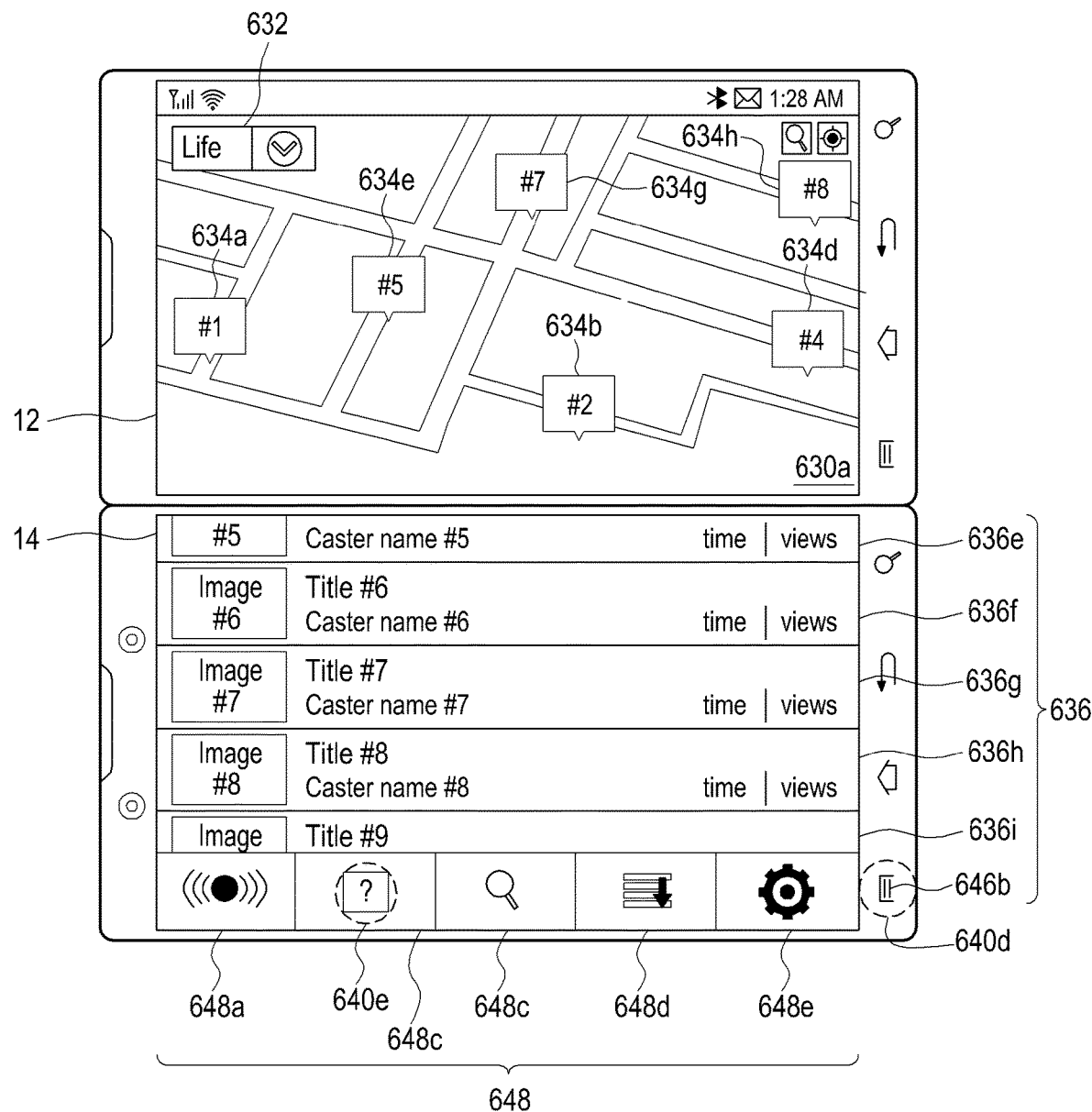
Figure 14H:
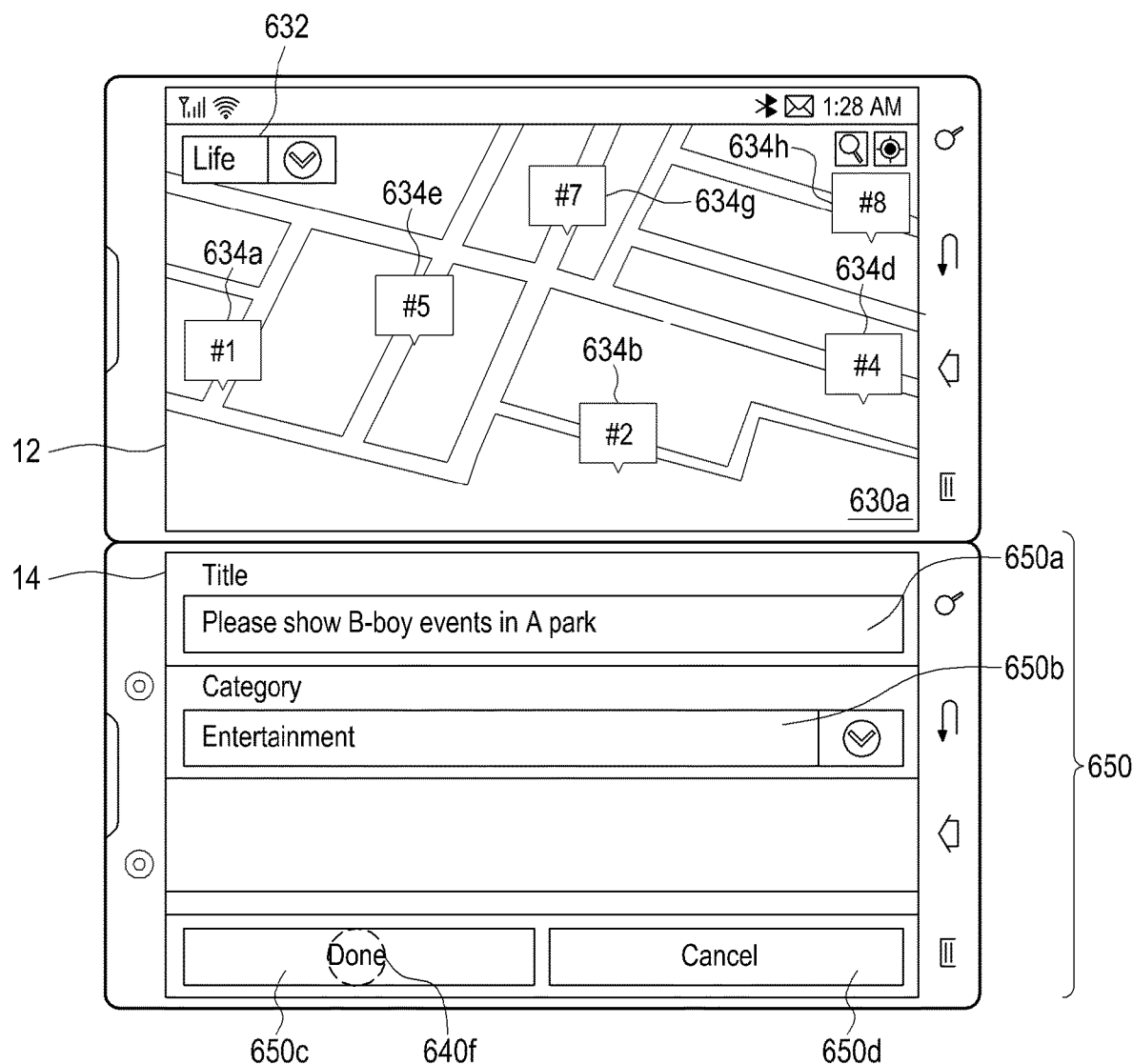
Figure 14I:
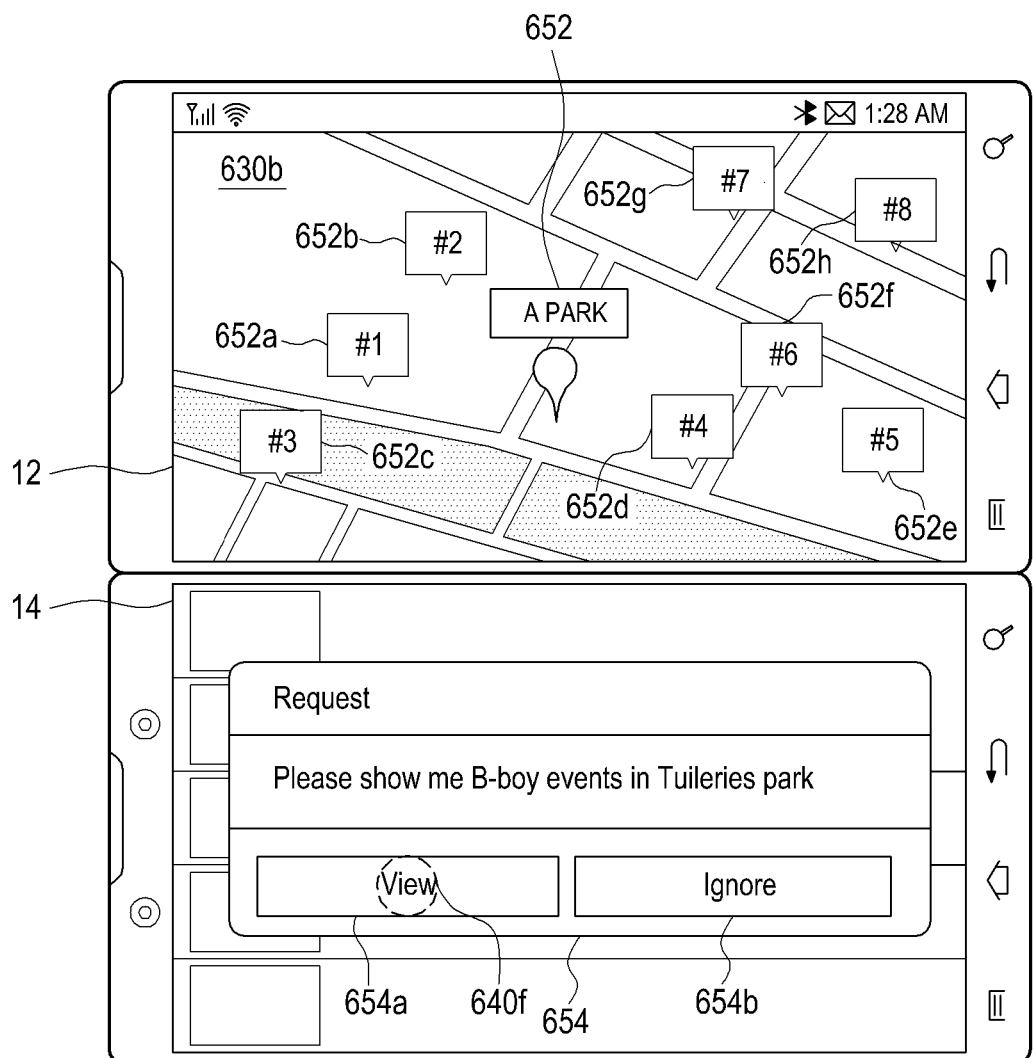

FIGS. 14G to 14I illustrate a user interface for a requester who makes a request for a desired broadcast through the personal broadcasting application.

Referring to FIG. 14G, the portable device displays the map area 630*a* and the broadcast lists 636 through the first and second touch screens 12 and 14 or detects an input of one 646*b* of the physical buttons arranged in the second panel including the second touch screen 14, for example, an input 640*d* of the menu button, that is, a tap gesture while displaying the broadcasting image 638 and the discussion areas 642 and 644. Then, in response to the input 640*d*, a menu window 648 for the personal broadcasting application is displayed in the lower part of the second touch screen 14. The menu window 648 includes at least one of a create broadcast key 648*a*, a broadcast request key 648*b*, a broadcast item search key 648*c*, a broadcast item sorting key 648*d*, and a setting key 648*e*. When the portable device detects a predetermined touch gesture 640*e*, for example, a tap gesture from the broadcast request key 648*b*, the portable device proceeds to FIG. 14H.

Referring to FIG. 14H, in response to the detection of the tap gesture 640*e*, on the second touch screen 14, the broadcast request window 650 replaces the broadcast lists 636 or is displayed on the broadcast lists 636. The broadcast request window 650 includes at least one of a message input area 650*a* for receiving a message for the broadcast request, a category selection area 650*b* for selecting a desired broadcast category, a completion key 650*c*, and a cancel key 650*d*. After the message for the broadcast request, for example, "Please show me B-boy events in A park" is input into the message input area 650*a* and the desired broadcast category is selected from the category selection area 650*b*, the portable device detects a predetermined touch gesture 640*f*, for example, a tap gesture from the completion key 650*c*.

The personal broadcasting application transmits a broadcast request including the input information (request message and category) and selective additional information (name of the requester and current position of the requester) to users of other portable devices which are running the personal broadcasting application in response to the detection of the touch gesture 640*f* The broadcast request may be transmitted through a cellular network or a WiFi network. As a selectable embodiment, the broadcast request is transmitted to other users located within a predetermined range from a current position of the requester or a position designated by the requester.

FIGS. 14I to 14M illustrate a user interface for the user who receives the broadcast request through the personal broadcasting application.

Referring to FIG. 14I, the portable device receives a broadcast request of the requester through the personal broadcasting application and displays a request message window 654 including a request message of "Please show me B-boy events in A park" according to the broadcast request in the second touch screen 14 while the first touch screen 12 displays the map area 630b which can include at least one of caster indicators 652a, 652b, 652c, 652d, 652e, 652f, 652g, and 652h and the second touch screen 12 displays broadcast lists related to the caster indicators 652a to 652h. The request message window 654 further includes a view key 654a and a ignore key 654b together with the request message. As one embodiment, the request message window 654 may be displayed to overlap the broadcast lists displayed in the second touch screen 14 or the discussion areas displayed in the second touch screen 14. As another embodiment, the request message window 654 may be displayed to overlap the map area 630b or the broadcast image displayed in the first touch screen 12.

As a selectable embodiment, the personal broadcasting application receives the broadcast request, and inserts and displays a broadcast request indicator 652 indicating a position of the requester of the broadcast request on the map area 630b displayed in the first touch screen 12. When a predetermined touch gesture, for example, a tap gesture or a touch and hold is detected from the broadcast request indicator 652, the second touch screen 14 displays the request message window 654 according to the broadcast request.

Figure 14J:
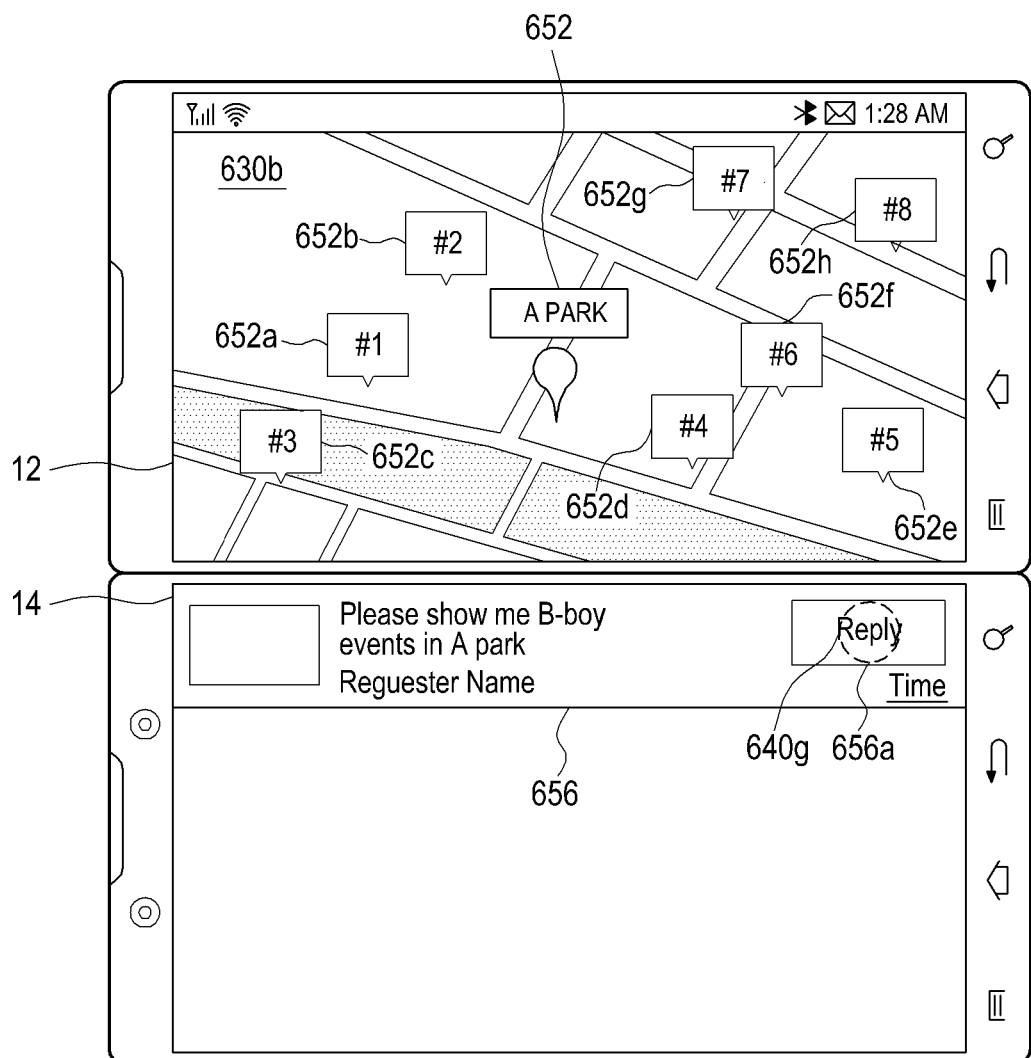

The portable device detects a predetermined touch gesture 640f, for example, a tap gesture from the view key 654a of the request message window 654 and proceeds to FIG. 14J. Referring to FIG. 14J, the second touch screen 14 displays broadcast request lists including a broadcast request item 656 according to the broadcast request in response to the detection of the touch gesture 640f. The broadcast request item 656 includes a response key 656a. The portable device detects a predetermined touch gesture 640g, for example, a tap gesture from the response key 656a within the broadcast request item 656 and proceeds to FIG. 14K. As another embodiment, the request message window 654 of FIG. 14I may further include the response key, and the first and second touch screens 12 and 14 may proceed to FIG. 14K in response to the tap gesture detected from the response key within the request message window 654.

Figure 14K:
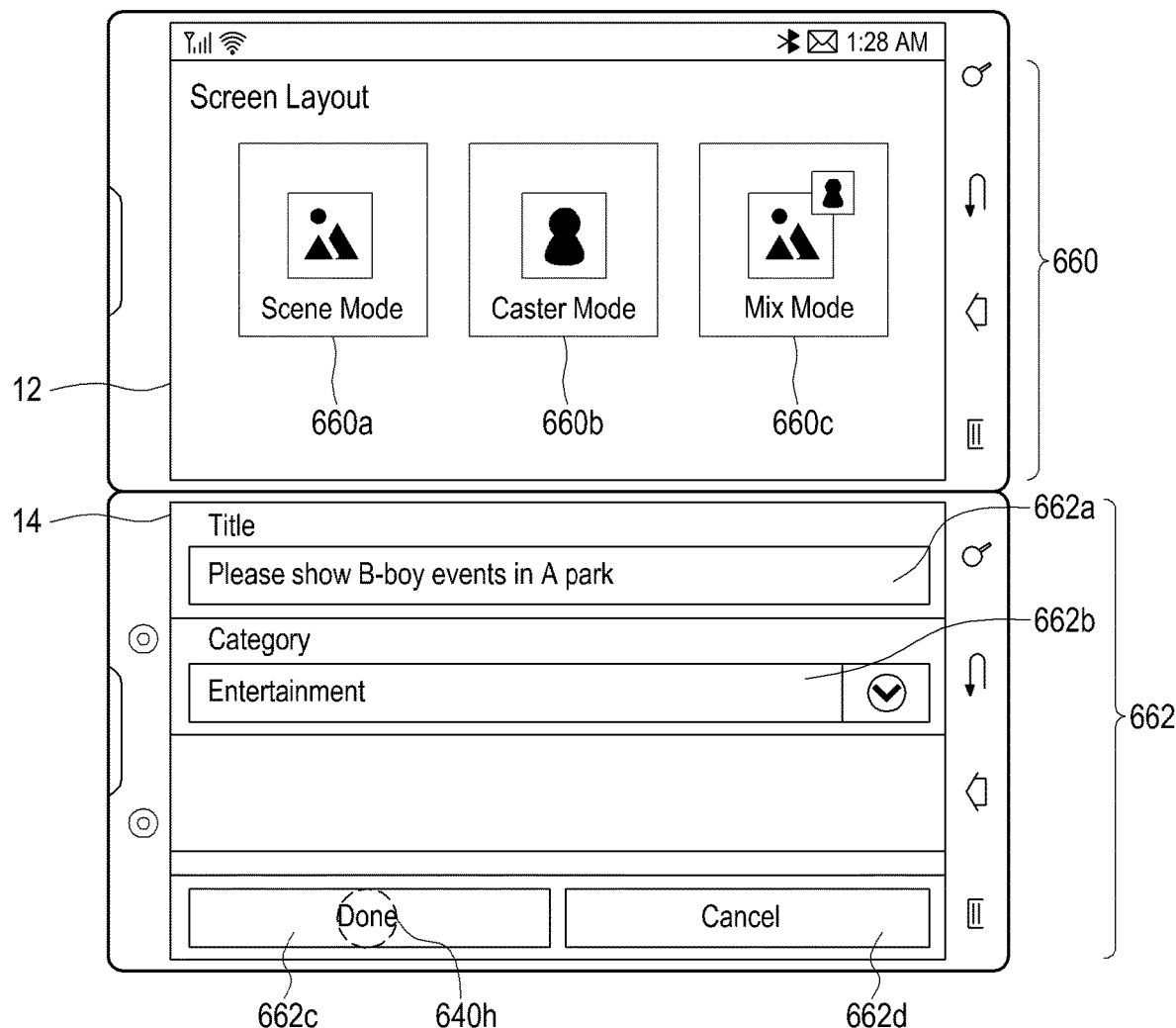

Referring to FIG. 14K, the first and second touch screens 12 and 14 display first and second broadcast create windows 660 and 662, respectively, in response to the detection of the touch gesture 640g. As a selectable embodiment, the first and second broadcast create windows 660 and 662 may be located in one of the first and second touch screens 12 and 14.

The first broadcast create window 660 displayed in the first touch screen 12 includes mode selection areas 660a, 660b, and 660c for receiving one broadcast among a scene mode, a caster mode, and a mix mode. The second broadcast create window 662 displayed in the second touch screen 14 includes at least one of a title input window 662a for receiving a broadcast title, a category selection area 662b for selecting a broadcast category, a completion key 662c, and a cancel key 662d. Here, the view mode refers to a mode in which a scene image shot through the rear camera 26 of the portable device is broadcasted, the caster mode refers to a mode in which a caster image shot through the front camera 24 of the portable device is broadcasted, and the mix mode refers to a mode in which the caster image is combined with the scene image in a Picture In Picture (PIP) manner and then broadcasted.

After a broadcast mode, a broadcast title, and a broadcast category are input through the first and second broadcast create windows 660 and 662, the portable device detects a predetermined touch gesture 640h, for example, a tap gesture from the completion key 662c. In response to the detection of the touch gesture 640h, the personal broadcasting application operates at least one of the front camera 24 and the rear camera 26 according to a selected mode, collects an image shot by the at least one operated camera 24 or 26, and carries a broadcast image generated through a combination of the collected images and broadcast service data including the input information (broadcast mode, broadcast title, and broadcast category) and selective additional information (name and current position of the caster) on a wireless signal according to a pre-designated transmission scheme and broadcasts the wireless signal. The broadcast service data may be transmitted through, for example, a cellular network or a WiFi network.

Figure 14L:
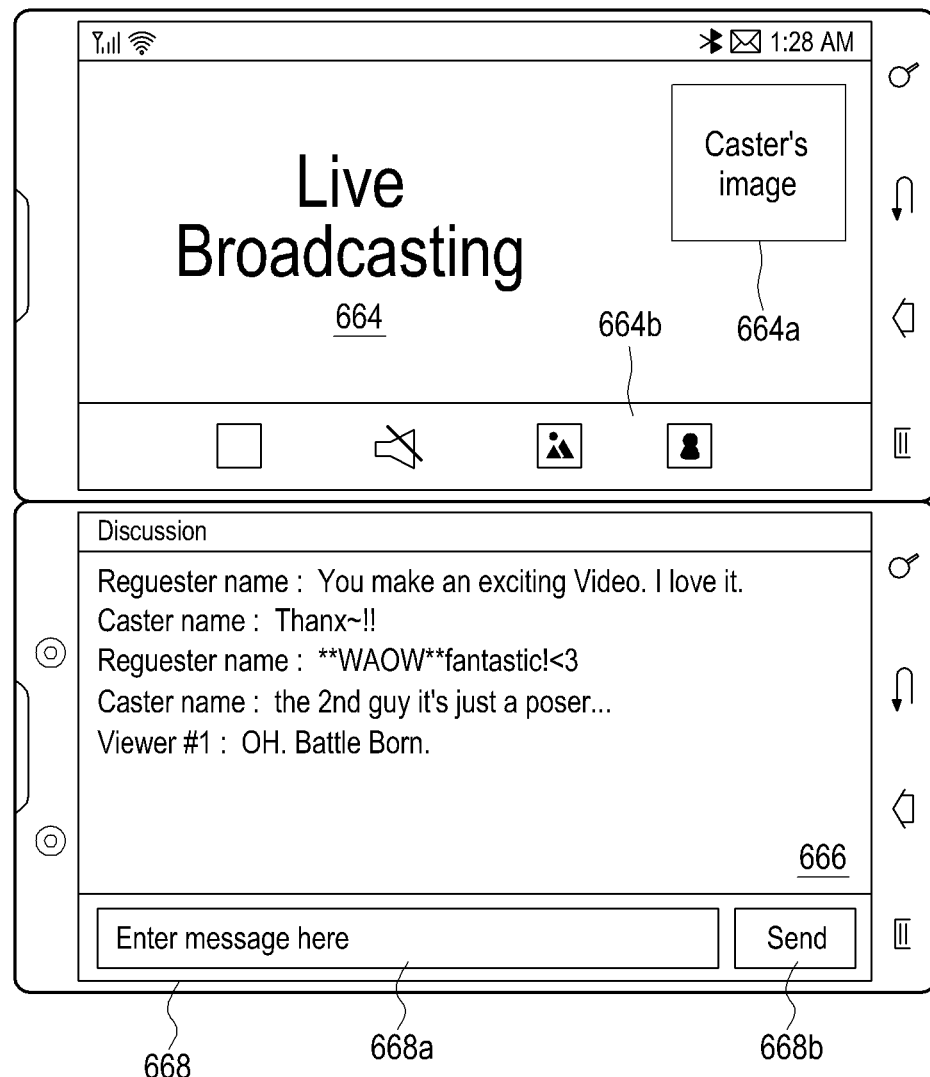

Referring to FIG. 14L, in response to the detection of the touch gesture 640h, the portable device displays a broadcast image 664 shot by the at least one camera 24 or 26 and generated by the personal broadcasting application in the first touch screen 12 and displays discussion areas 666 and 668 in which a caster of the broadcast image 664 and viewers who view the broadcast image 664 can participate in the second touch screen 14. The discussion areas 666 and 668 include a message display window 666 and a message input window 668, and the message input window 668 includes a message input area 668a and a message sending key 668b. The message input area 668a receives a message including a text and/or a conversation icon from the user. When a tap gesture is detected from the message sending key 668b in a state where a message input into the message input area 668a exists, the message display window 666 displays the input message together with a name of the user (an actual name or a nickname registered in the personal broadcasting application).

Although not illustrated, when the caster creates a broadcast, a caster indicator indicating the broadcast by the caster newly appears in the map area 630a of the requester and a broadcast item indicating the broadcast is included in the broadcast lists. When a tap gesture is detected from the broadcast item, the first and second touch screens of the requester display the broadcast area and discussion area of the broadcast by the caster.

Figure 14M:
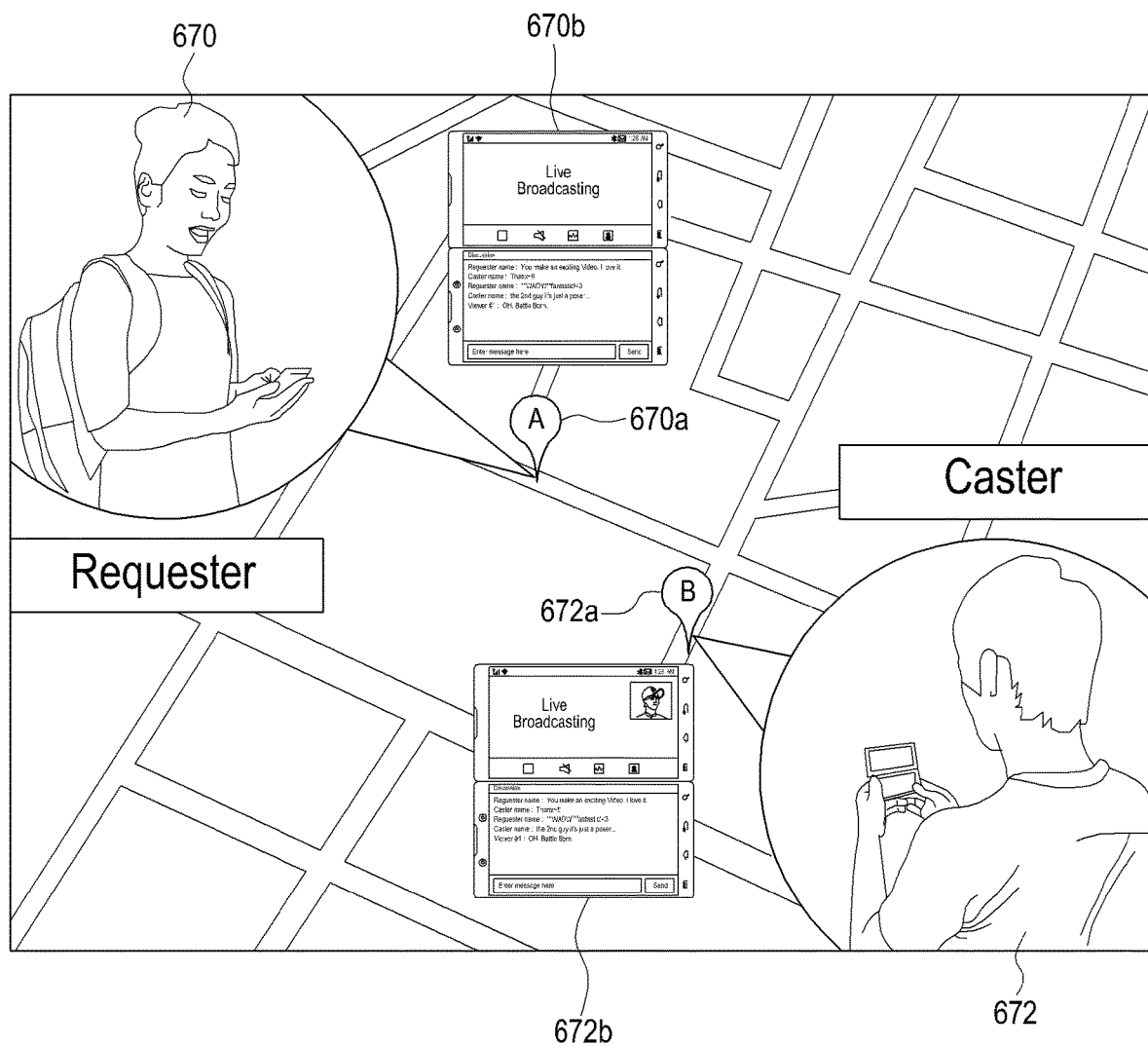

FIG. 14M illustrates a request for and a response of a broadcast through the personal broadcasting application. As illustrated in FIG. 14M, a requester 670 can make a request for a desired broadcast to other users within a desired area by using the personal broadcasting application executed by a portable device 670b of the requester 670. One of the other users is a caster 672 in response to the request, and the caster 672 creates and transmits the requested broadcast by using the personal broadcasting application executed by a portable device 672b of the caster 672. A position indicator 670a of the requester 670 and a position indicator 672a of the caster 672 may be displayed in map areas displayed in the portable devices 670b and 672b of the requester 670 and the caster 672.

When the portable device includes the display device including the first touch screen and the second touch screen arranged on at least one foldable panel and the first touch screen and the second touch screen are connected by the hinge or the flexible connector, the portable device can recognize motions of the first panel including the first touch screen and the second panel including the second touch screen as an input of a command. The motion includes, for example, folding back and folding hold. Here, the folding back includes bending of the flexible panel as well as folding of hard panels.

The folding back command refers to a user interface scheme of executing a predetermined function in the portable device by folding two panels within an effective angle range and then unfolding the two panels within an effective time. The folding hold command refers to a user interface scheme of executing a predetermined function in the portable device by folding two panels within an effective angle range and maintaining the two panels for an effective time. Hereinafter, the folding back command and the folding hold command will be described in detail with reference to the drawings.

FIG. 15 is a diagram for describing a detection of the folding back command according to an exemplary embodiment.

Figure 15A:
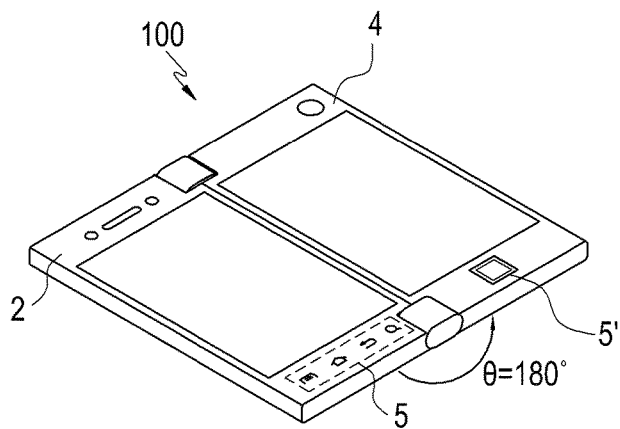
FIGS. 15A to 15C are diagrams describing a detection of a folding back command according to one or more exemplary embodiments.
Figure 15B:
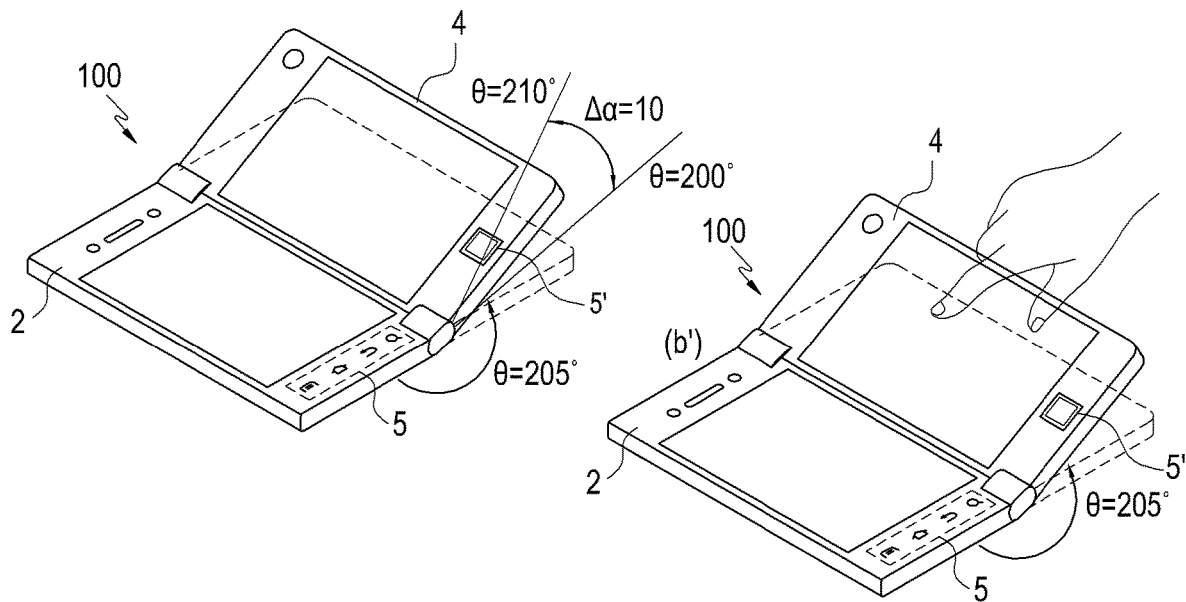
Figure 15C:
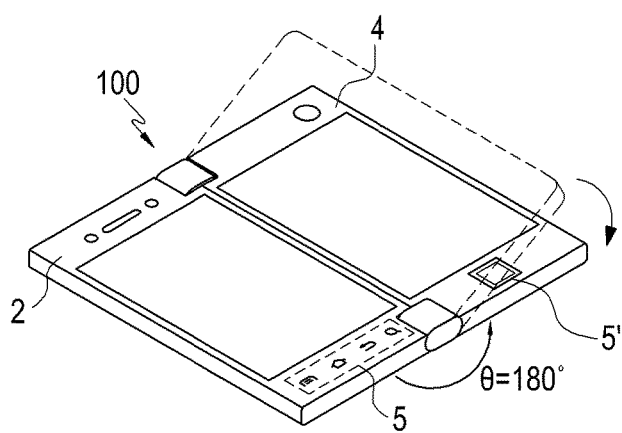

FIG. 15A illustrates a state before the folding back command is input into the portable device 100, wherein a relative angle of the second panel 4 with respect to the first panel 2 is 180 degrees or close to 180 degrees within a predetermined range. Here, although it is illustrated that the relative angle ⊖ is 180 degrees for the convenience, the relative angle can be any angle. As illustrated in FIG. 15B, the portable device 100 detects that the second panel 4 relatively moves such that the relative angle becomes a predetermined relative angle within an effective angle range Δα, for example, a range from 200 to 210 degrees (for example, 205 degrees). Further, as illustrated in FIG. 15C, the portable device 100 detects that the relative angle escapes from the effect angle range because the second panel 4 moves in a direction opposite to an entering direction of the effective angle range within an effective time (for example, one second).

The, the folding back command is input into the portable device 100 and the portable device 100 executes a function according to the folding back command.

As one embodiment, as long as the relative angle between the two panels 2 and 4 escapes from the effective angle range in the direction opposite to the entering direction within the effective time, the folding back command can be considered as being input. The second panel 4 does not need to return to an original position, that is, a state where the relative angle ⊖ is 180 degrees (see FIG. 15A), and the folding back command is input when the second panel 4 moves such that the relative angle ⊖ becomes a random value smaller than 200 degrees. Further, although it has been described that the second panel 4 moves in the direction opposite to the entering direction and thus escapes from the effective angle range in FIG. 15C, even when the relative angle between the first panel 2 and the second panel 4 becomes a random value smaller than 200 degrees by moving the first panel in a bottom direction instead of moving the second panel 4 in the state of FIG. 15B, the folding back command can be input. That is, regardless of which panel moves, as long as the relative angle between the first panel 2 and the second panel 4 enters the effective angle range and escapes in the direction opposite to the entering direction, the folding back command is input.

Here, the effective angle range refers to a range of the relative angle between the two panels 2 and 4 preset by a manufacturer to recognize the folding back command, and the relative angle ⊖ is not limited to an angle range of 10 degrees between 200 degrees and 210 degrees but may be set to have various ranges. Further, the effective angle range may be changed to an angle range designated by the user. That is, the portable device allows the user to directly change the effective angle range through an environment setting menu and thus to optimize the portable device in accordance with a utilization pattern of the user.

Further, the effective time refers to a time interval preset by the manufacturer to recognize the folding back command and is computed after a time point when the relative angle between the two panels 2 and 4 enters the effective angle range. Although it has been described that the effective time taken when the two panels 2 and 4 are unfolded after the two panels 2 and 4 are folded within the effective angle range is one second in the present embodiment, the effective time may be variously set to a value larger or smaller than one second. Similarly, the portable device may be implemented to set a time desired by the user as the effective time so that the portable device can be optimized in accordance with a utilization pattern of the user.

Although the folding back command has been described by using parameters such as the effective angle range and the effective time in the aforementioned embodiments, the present invention is not limited thereto and the portable device can input the folding back command without using the effective angle range in other embodiments. That is, when the relative angle between the two panels is changed by moving at least one panel of the two panels in a first direction and then the relative angle between the two panels is returned to the original angle (or an angle close to the original angle within a predetermined range) by moving at least one panel of the two panels in a second direction actually opposite to the first direction, the portable device may recognize that the folding back command is input.

The folding back command may be subdivided according to whether there is an additional input. As illustrated in FIG. 15B', when the relative angle enters the effective angle range Δα as the second panel 4 moves in the first direction and then a touch gesture of the user is detected from the first and/or second touch screen within an effective time or an additional input generated by pressing at least one of the physical buttons 5 and 5' is detected and when the relative angle escapes from the effective angle range as the second panel 4 moves in the second direction opposite to the first direction, the portable device may recognize that a folding back command executing a different function from that of the aforementioned folding command is input. That is, the folding back command of folding and then unfolding the two panels 2 and 4 is divided into a folding back single command (in FIGS. 15A, 15B, and 15C) having no additional input by the user within the effective time and a folding back combination command (in FIGS. 15A, 15B', and 15C) having an additional input (of touching the screen or pressing the physical button) by the user within the effective time. The portable device is implemented to execute different functions with respect to the folding back single command and the folding back combination command so as to execute the subdivided folding back commands.

FIG. 16 is a diagram for describing a detection of the folding hold command according to an exemplary embodiment.

Figure 16A:
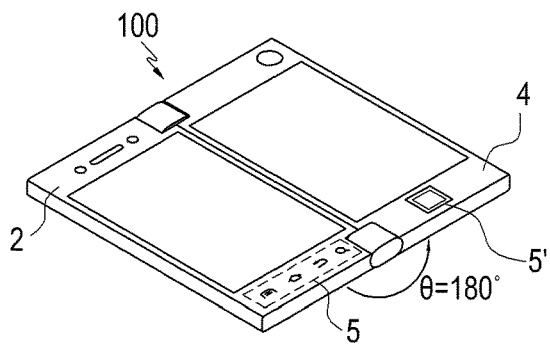
FIGS. 16A to 16D are diagrams describing a detection of a folding hold command according to one or more exemplary embodiments.
Figure 16B:
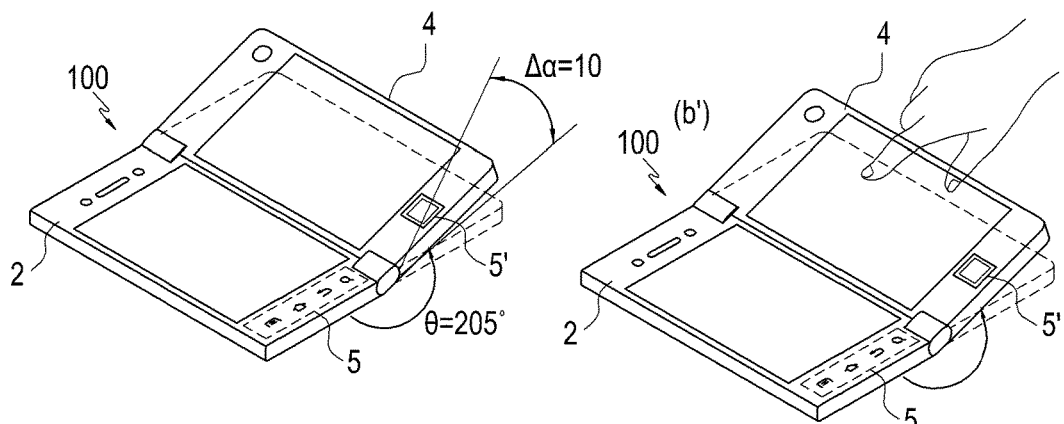
Figure 16C:
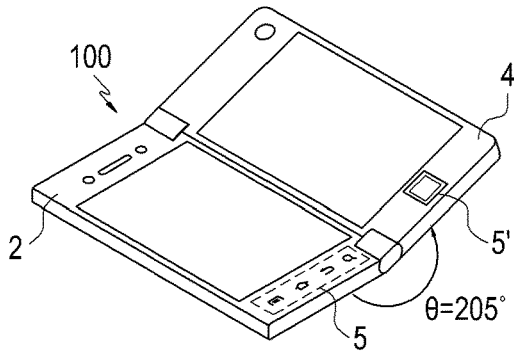

FIG. 16A illustrates a state before the folding hold command is input into the portable device 100, wherein a relative angle ⊖ of the second panel 4 with respect to the first panel 2 is 180 degrees or close to 180 degrees within a predetermined range. Although it is illustrated herein that the relative angle ⊖ is 180 degrees for convenience, the relative angle can be any angle. As illustrated in FIG. 16B, the portable device 100 detects that the second panel 4 relatively moves such that the relative angle ⊖ becomes a predetermined relative angle within an effective angle range Δα, for example, a range from 200 to 210 degrees (for example, 205 degrees). Further, as illustrated in FIG. 15C, when the relative angle maintains an effective angle range for an effective time (for example, 0.5 seconds), the portable device 100 determines that the folding hold command is input and executes a function according to the folding hold command.

Here, the effective angle range and the effective time may be preset by the manufacturer or designated by the user as described above.

The folding hold command may be subdivided according to an existence or nonexistence of an additional input like the folding back command. As illustrated in FIG. 16B', when the second panel 4 moves such that the relative angle is within the effective angle range Δα and then a touch gesture of the user on the first and/or second touch screens is detected or an additional input of pressing at least one of the physical buttons 5 and 5' is detected while the relative angle is maintained for an effective time, the portable device can recognize the detection as an input of a folding hold command for performing a function different from the aforementioned folding hold command. That is, the folding hold command in which the relative angle after the two panels 2 and 4 are folded is maintained within the effective angle range for the effective time is divided into a folding hold single command (FIGS. 16A, 16B, and 16C) in which there is no additional input by the user within the effective time and a folding hold combination command (FIGS. 16A, 16B', and 16C) in which there is the additional input by the user within the effective time. The portable device is implemented to execute different functions with respect to the folding hold single command and the folding hold combination command so as to execute the subdivided folding hold commands.

Figure 16D:
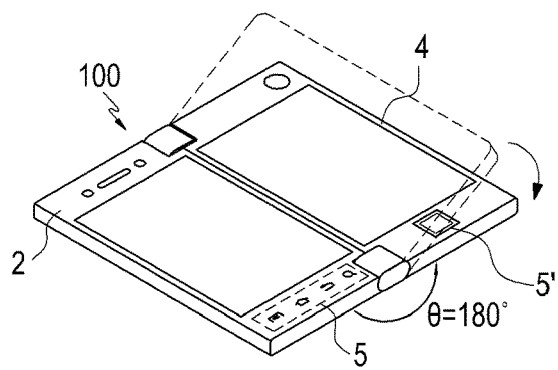

The folding hold command may be implemented to execute a function of performing consecutive operations, for example, a zoom-in/out function, a quick play function, a rewind function and the like. In a case where a function by the folding hold command (single command or combination function) is executed, when the relative angle between the first panel 2 and the second panel 4 escapes from the effective angle range as illustrated in FIG. 16D, the function by the folding hold command is stopped. Here, the portable device can be implemented such that the executed function is stopped as long as the relative angle between the two panels escapes from the effective angle range in any direction regardless of the entering direction of the effective angle range.

When the portable device includes the display device including the first touch screen and the second touch screen arranged on one foldable panel and the first touch screen and the second touch screen are arranged on at least one foldable or bendable panel, the portable device can support a clipboard function by the folding back command input by the touch screen display device. Objects (text, image, sound and the like) cut or copied by a cut or copy command in the portable device are stored in an area called a clipboard. The clipboard stores the objects until a paste command from the clipboard is input or the objects area removed from the clipboard, and visually displays and provides the objects in response to a predetermined command.

FIGS. 17A to 17K illustrate user interfaces for the clipboard function according to one or more exemplary embodiments.

Figure 17A:
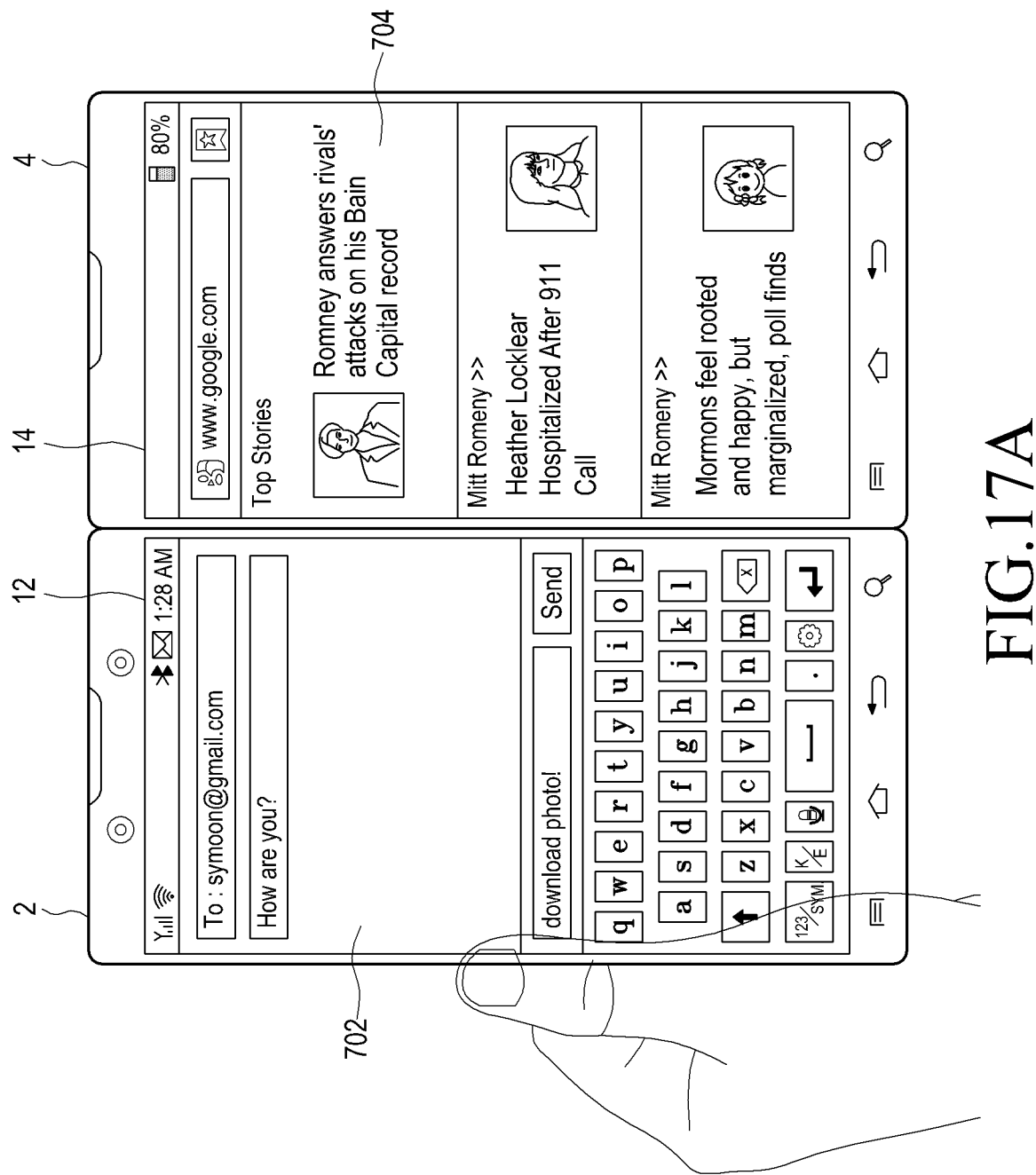
FIGS. 17A to 17K are diagrams illustrating a user interface for a clipboard function according to one or more exemplary embodiments.

Referring to FIG. 17A, a relative angle between the first panel 2 including the first touch screen 12 and the second panel 4 including the second touch screen 14 is actually 180 degrees (hereinafter, referred to as a first relative angle), the first touch screen 12 displays a first application 702, and the second touch screen 14 displays a second application 704. The first and second applications 702 and 704 may be any of the home screen, the application menu, the basic application, the application installed by the user. For example, the first and second applications 702 and 704 may be configured to display and input an object such as a text or image. In the shown example, the first application 702 is a message application such as a Short Messaging Service (SMS), an e-mail, or an Instant Messaging Service (IMS), and the second application 704 is an Internet browsing application.

Figure 17B:
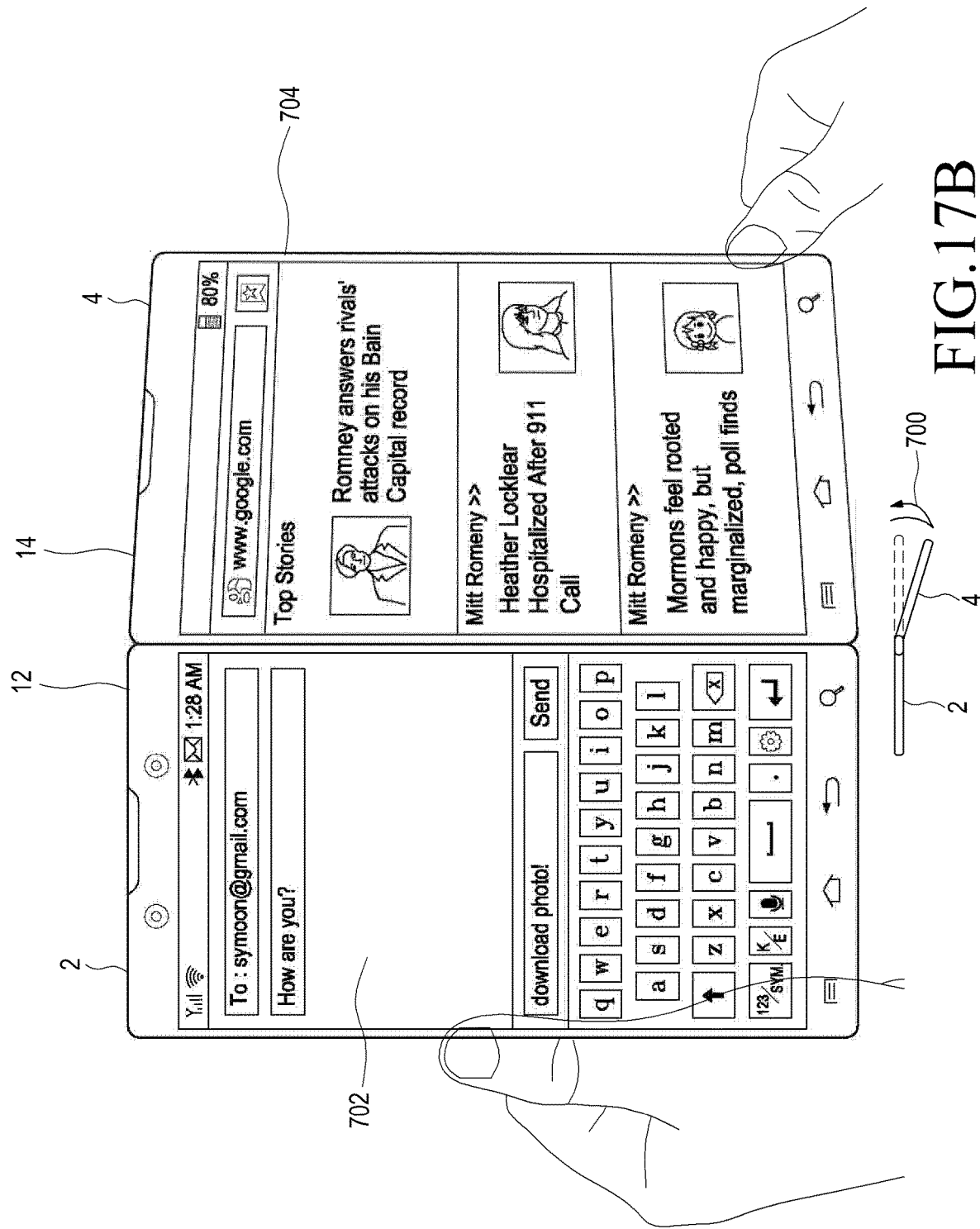

Referring to FIG. 17B, as the second panel 4 relatively moves with respect to the first panel 2, that is, moves in a first direction, the portable device recognizes that a relative angle between the first panel 2 and the second panel 4 is changed. As one example, as the second panel 4 rotates based on the hinge between the first panel 2 and the second panel 4, the relative angle between the first panel 2 and the second panel 4 becomes an angle (hereinafter, referred to as a second relative angle) within a predetermined range exceeding 180 degrees. As the second panel 4 relatively rotates with respect to the first panel 2, that is, in a second direction opposite to the first direction within a predetermined effective time after the relative angle between the first and second panels 2 and 4 becomes the second relative angle, the portable device detects that the relative angle between the first panel 2 and the second panel 4 becomes again the first relative angle (or actually becomes the first relative angle) and determines that a folding back command 700 is input. As described above, the folding back command 700 is detected when the first and second panels 2 and 4 including the first and second touch screens 12 and 14 are slightly folded outward and then unfolded back.

Figure 17C:
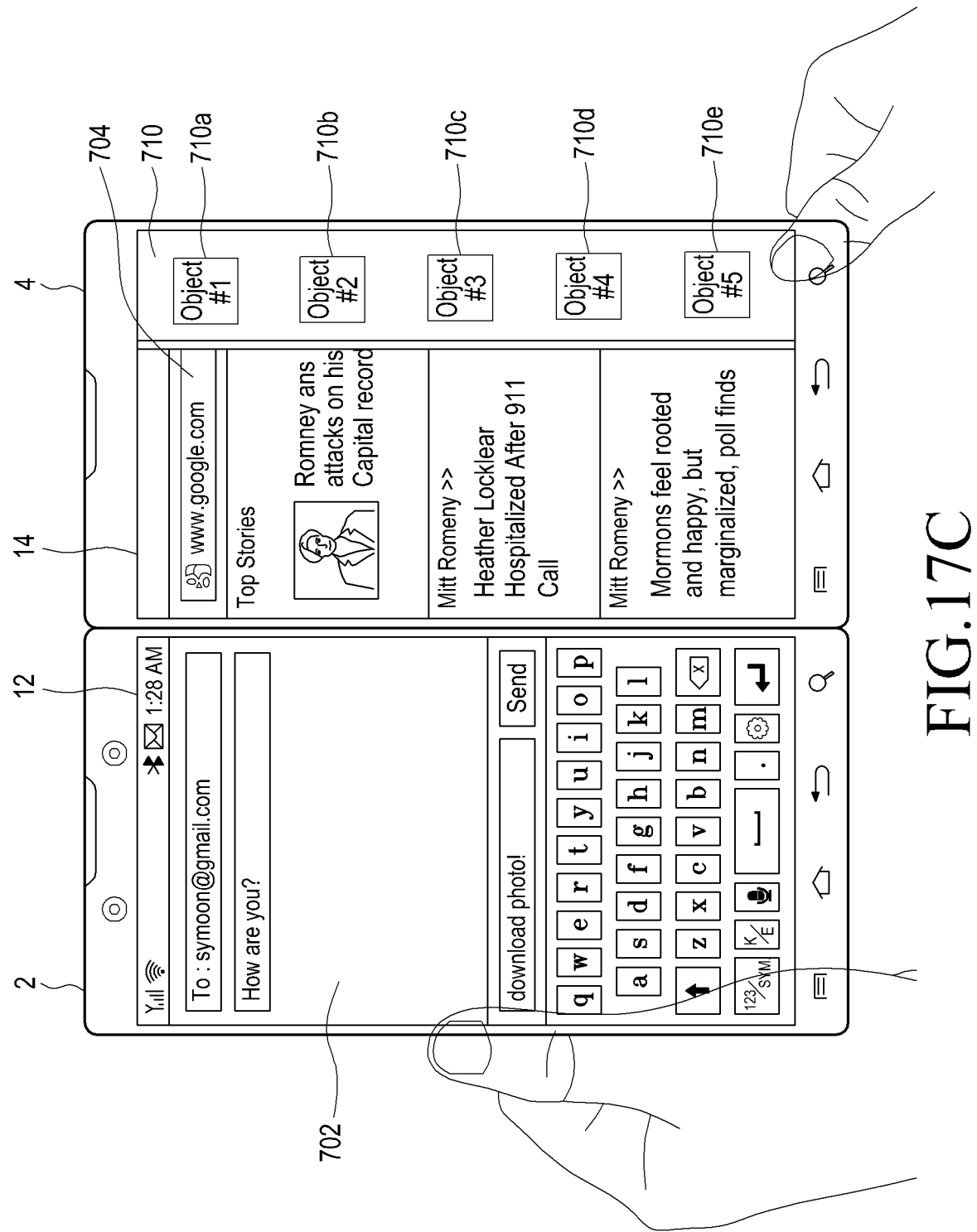

Referring to FIG. 17C, the portable device displays a clipboard 710 in a predetermined area of the first and/or second touch screen 12 and/or 14, for example, a right part of the second touch screen 14 in response to the folding back command 700.

The clipboard 710 is an area in which objects 710a, 710b, 710c, 710d, and 710e cut or copied by a cut or copy command are stored and displayed, and a text, an image, and a sound which are the original of each the objects 710a to 710e are displays in a form of a simplified (or miniaturized) image or icon within the clipboard 710. As one example, each of the objects 710a to 710e within the clipboard 710 may be displayed together with a date and time derived from the original.

Although not illustrated, when the folding back command is input again while the clipboard 710 is displayed, the second touch screen 14 can remove the clipboard 710. Then, the original second application 704 is displayed again in the second touch screen 14.

Figure 17D:
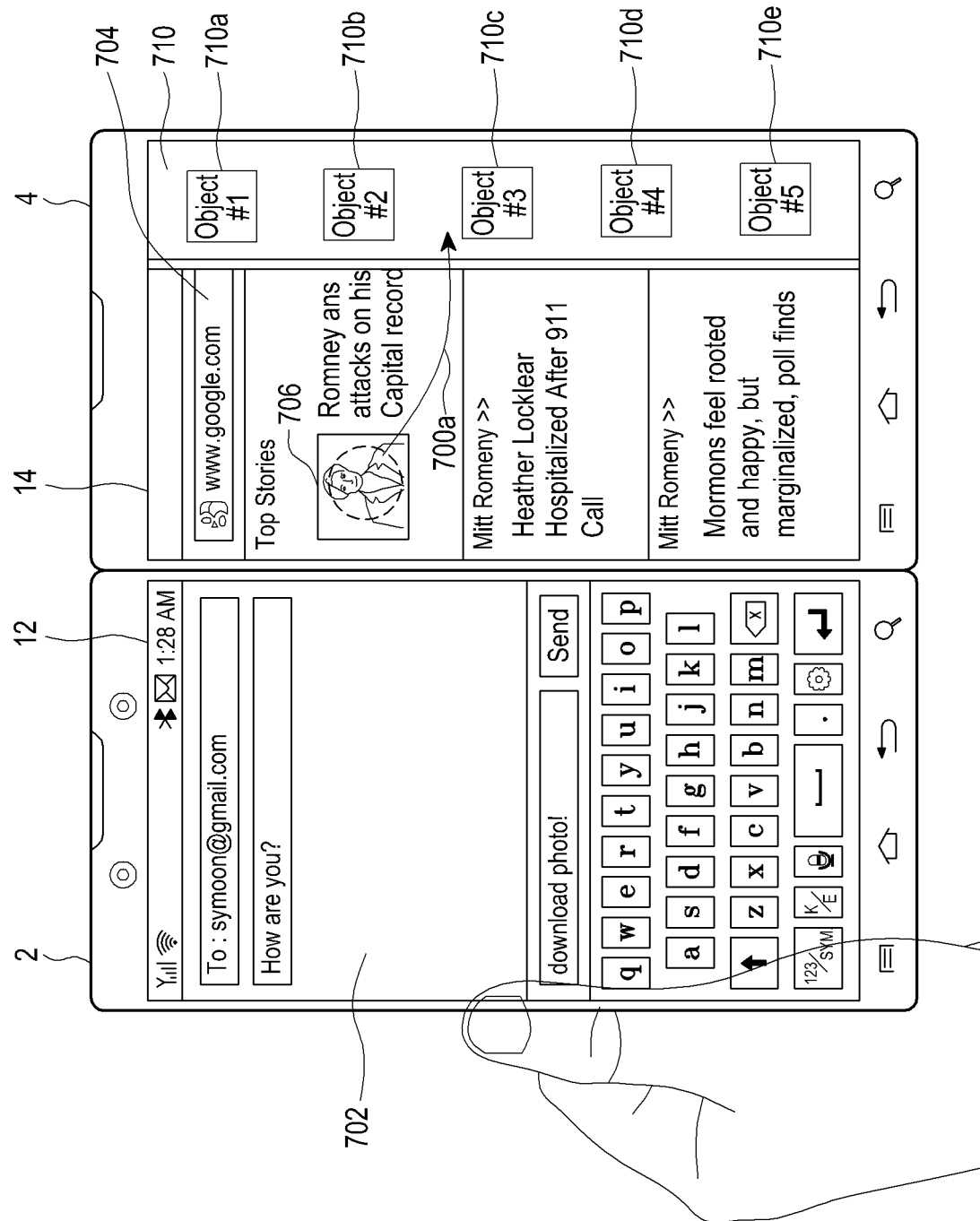
Figure 17E:
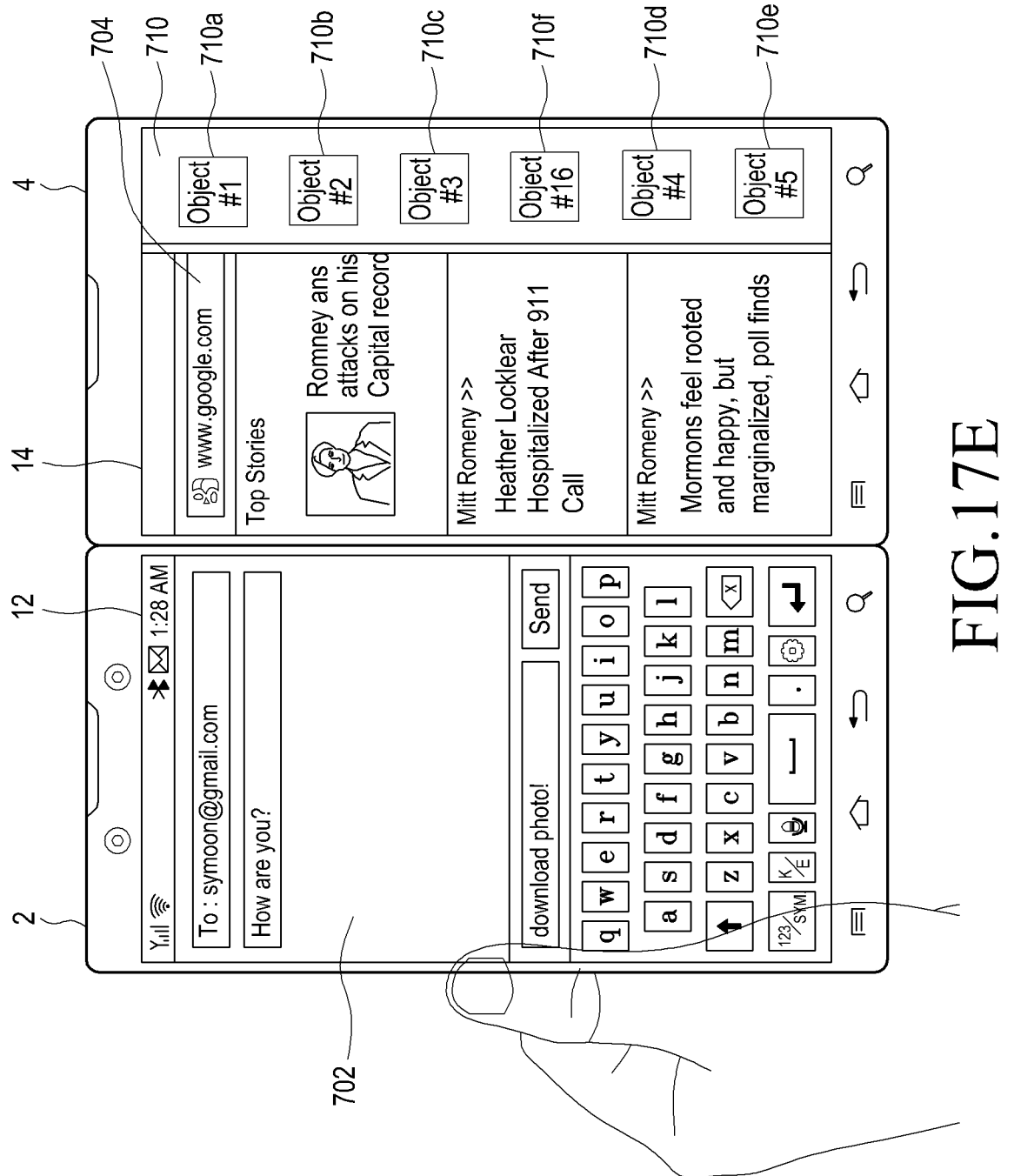

Referring to FIG. 17D, the portable device detects a touch gesture 700a moving from one object 706 among objects displayed by the first or second application 702 or 704 in the first or second touch screen 12 or 14, that is, texts or images to one position (hereinafter, referred to as a first position) within the clipboard 710, for example, a touch drag and proceeds to FIG. 17E. Referring to FIG. 17E, in response to the detection of the touch gesture 700*a*, an object 710*f* which is a copy of the object 706 becomes included in the clipboard 710. The clipboard 710 may be displayed in the first position in a symbol form of a simplified image or icon. As the object 710*f* newly enters the clipboard 710, the objects displayed within the clipboard 710 may be rearranged together with the newly entered object 710*f*.

Figure 17F:
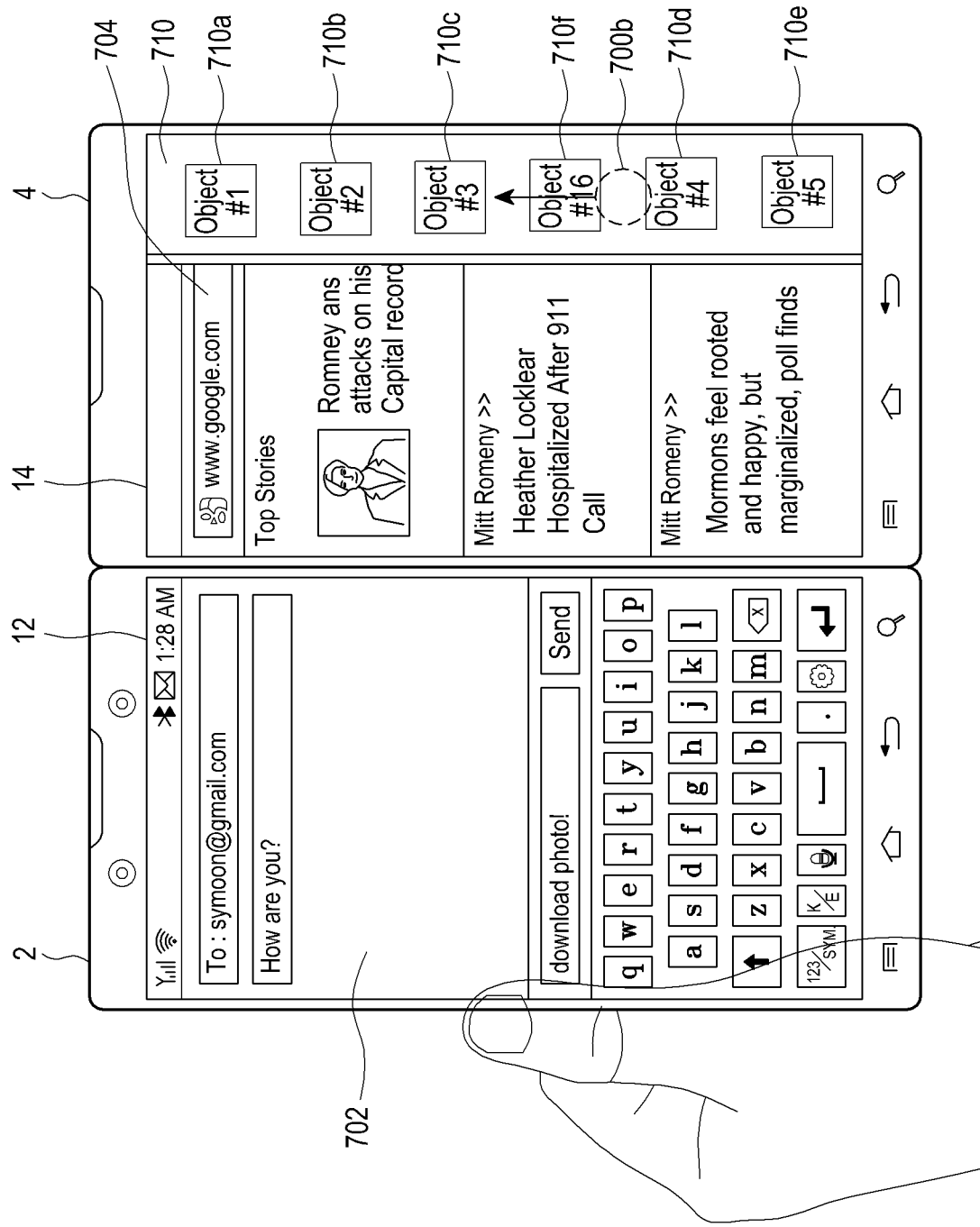

Referring to FIG. 17F, the portable device detects a touch gesture 700*b* in a direction of the arranged objects 710*a*, 710*b*, 710*c*, 710*d*, and 710*e* within the clipboard 710, for example, a flick up/down or a touch drag up/down and displays the objects included in the clipboard 710 while scrolling the objects in a top direction or a bottom direction in response to the touch gesture 700*b*.

Figure 17G:
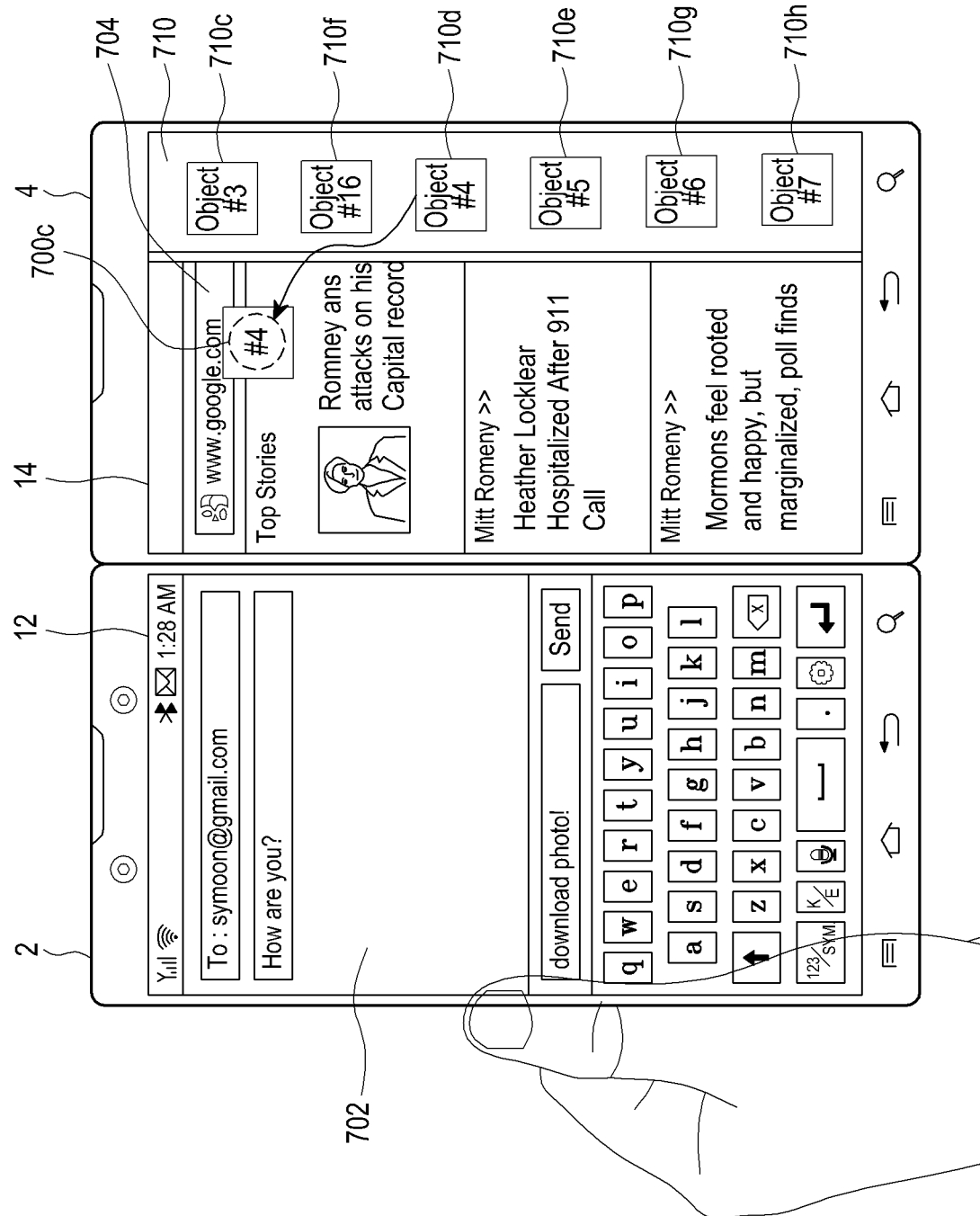
Figure 17H:
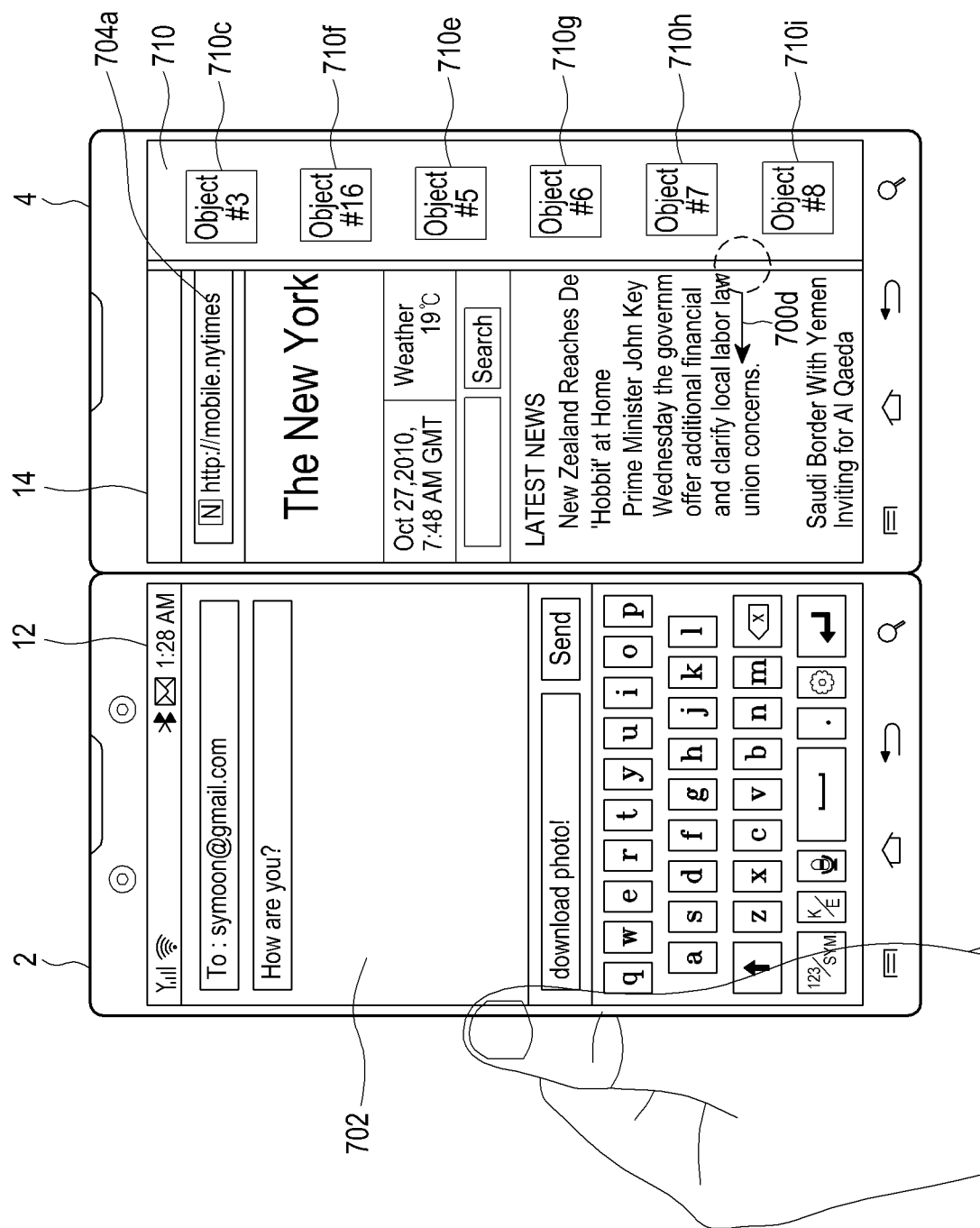

Referring to FIG. 17G, the portable device detects a touch gesture 700*c* moving from one object 710*d* among the objects 710*c*, 710*f*, 710*d*, 710*e*, 710*g*, and 710*h* displayed in the clipboard 710 to one position (hereinafter, referred to as a second position) of the first or second touch screen 12 or 14, for example, a touch drag. In the shown example, the object 170*d* is an Internet address, that is, "http://mobile-.nytimes.com" which is a text of the Uniform Resource Locator (URL) and is dragged to an address input window of the Internet browsing application 704 displayed in the second touch screen 14. As illustrated in FIG. 17H, the Internet browsing application 704 receives a text of the object 710*d* as an Internet address according to the touch gesture 700*c* and displays a webpage 704*a* corresponding to the Internet address.

Figure 17I:
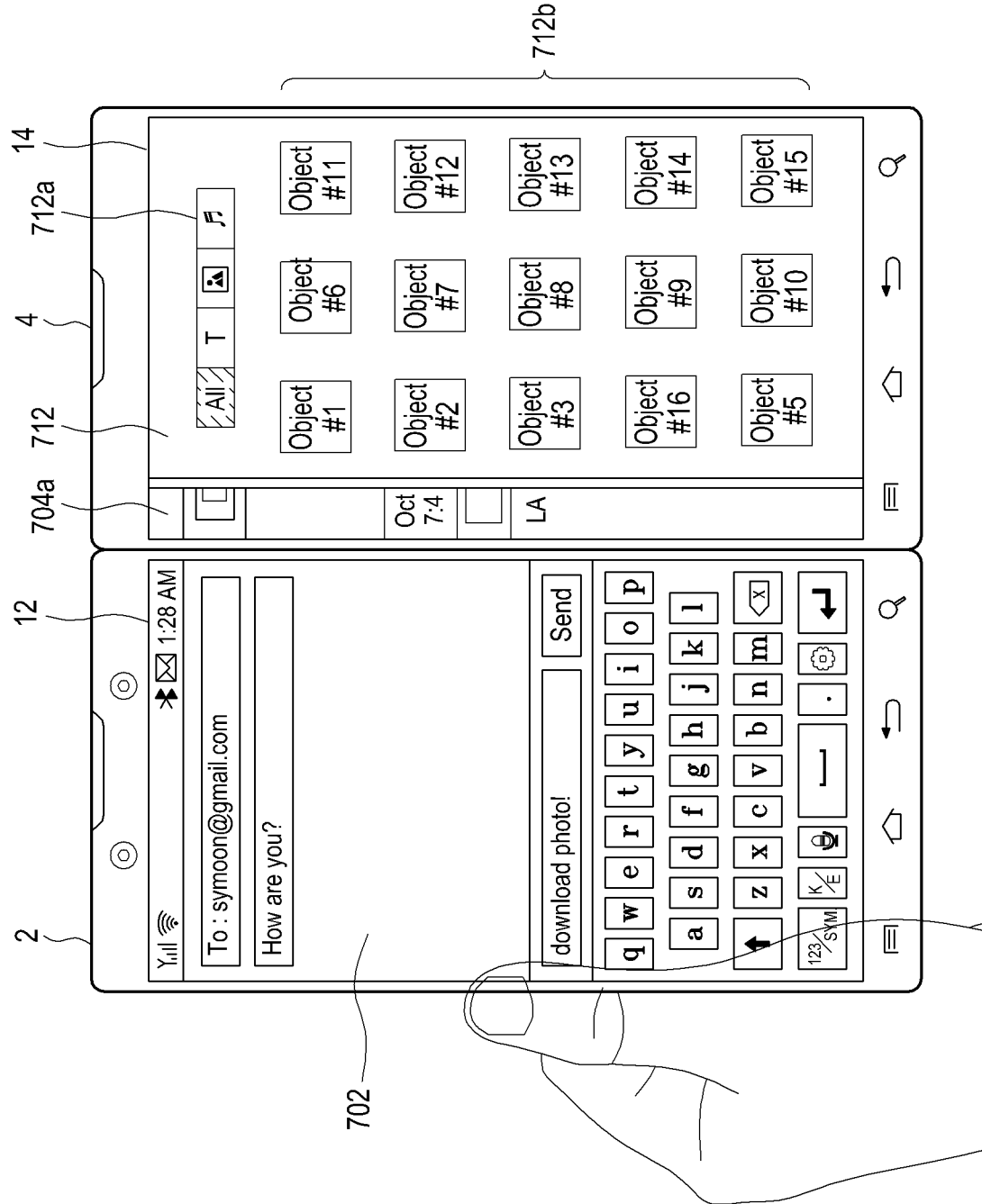

Referring to FIG. 17H, the portable device detects a touch gesture 700*d* heading for an outside of the clipboard 710 from a boundary between the application 704*a* and the clipboard 710 displayed in the second touch screen 14, for example, a flick or a touch drag. As illustrated in FIG. 17I, the clipboard 710 is expanded within the second touch screen 14 according to the touch gesture 700*d*. For example, the touch gesture 700*d* is a touch drag which starts at the boundary of the clipboard 710 and ends at one position (hereinafter, referred to as a third position) of the second touch screen 14 located in the outside of the clipboard 710. Then, the expanded clipboard 712 has a horizontal length allowing the boundary thereof to meet the third position. As another example, the touch gesture 700*d* includes a flick starting at the boundary of the clipboard 710 and moving in a direction of the first touch screen 12 and the expanded clipboard 712 has a horizontal length predetermined within a range of the second touch screen 14. As the clipboard 712 expanded by the touch gesture 700*d* spreads, the application 704*a* displayed in the second touch screen 14 may be partially or mostly hidden by the expanded clipboard 712.

The expanded clipboard 712 can display more objects 712*b* in comparison with the original sized clipboard 710. As a selectable embodiment, the expanded clipboard 712 may include a menu window 712*a* in which categories of the displayed objects, for example, all, text, image, and sound can be selected. The initially expanded clipboard 712 displays the objects 712*b* of all categories. When a tap gesture is detected from one category key within the menu window 712*a*, only objects of the corresponding category are filtered and displayed.

Although not illustrated, when a touch gesture headed for an inside of the expanded clipboard 712 from the boundary between the application 704*a* and the expanded clipboard 712 displayed in the second touch screen 14, for example, a flick or a touch drag is detected, the second touch screen 14 reduces the expanded clipboard 712 to the original sized clipboard 710 and displays the reduced clipboard 710.

Also although not illustrated, when the folding back command is input while the expanded clipboard is 712 is displayed, the second touch screen 14 removes the expanded clipboard 712 without displaying the clipboard 712 anymore. Then, the original second application 704*a* is displayed again in the second touch screen 14.

Figure 17J:
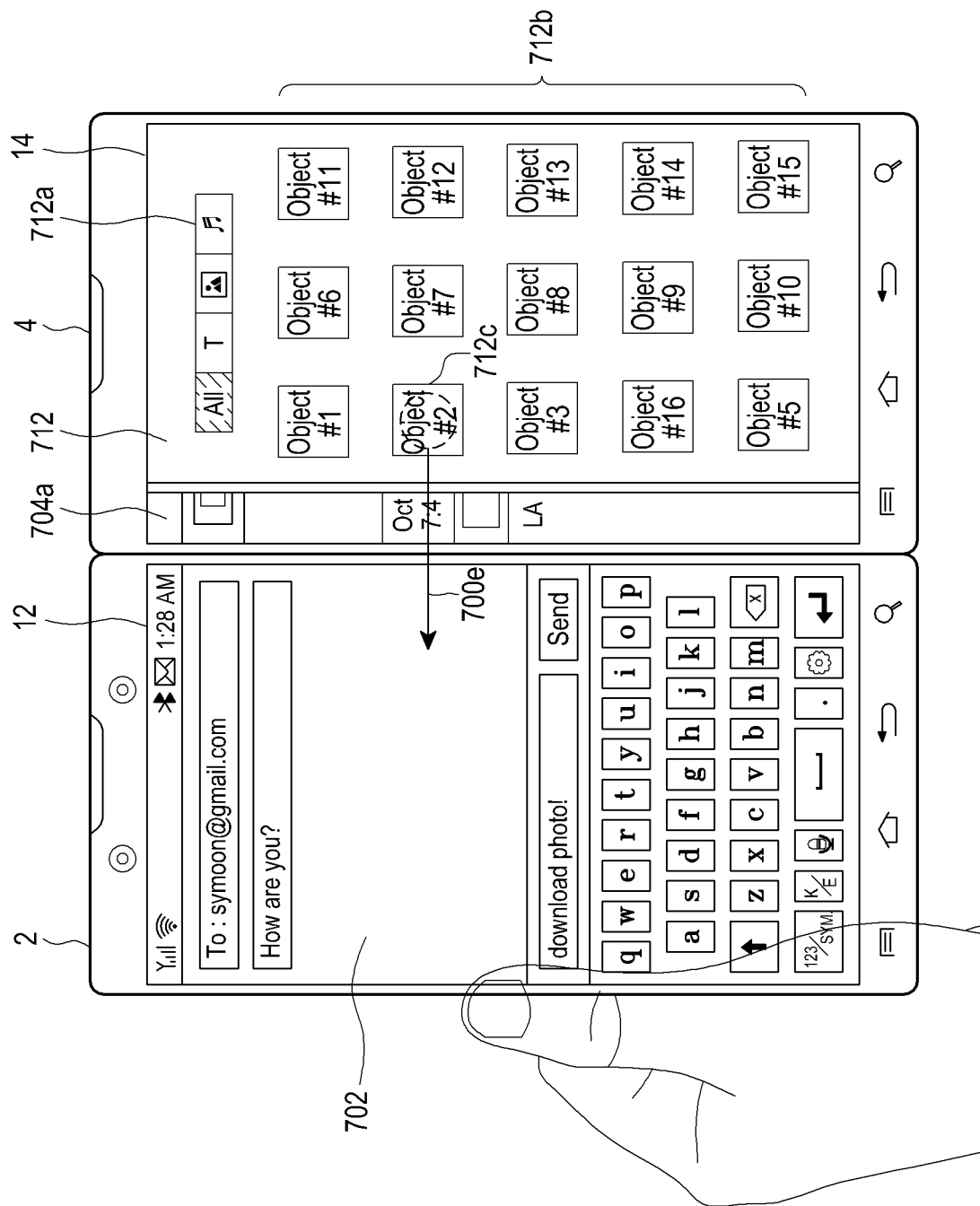
Figure 17K:
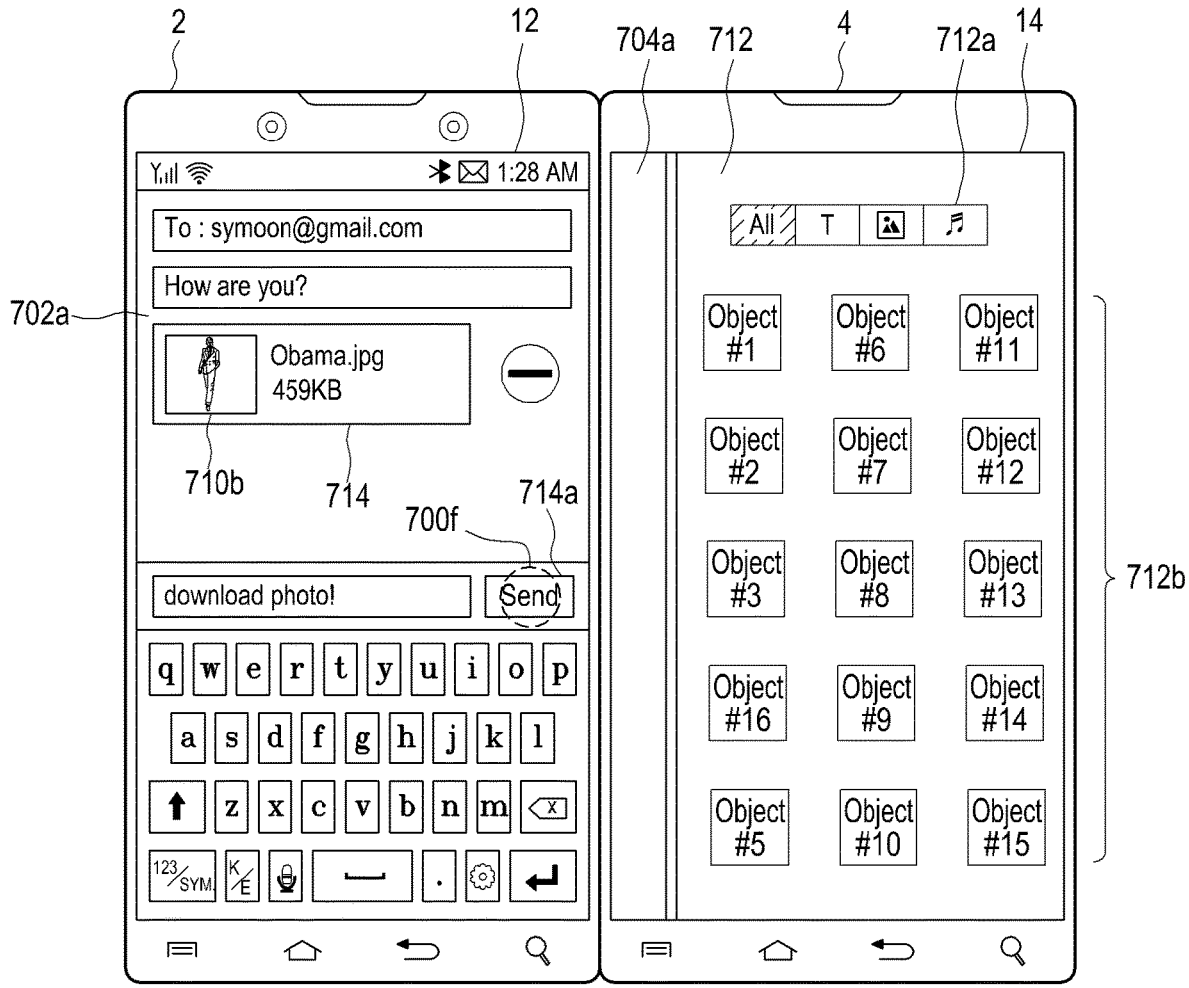

Referring to FIG. 17J, the portable device detects a touch gesture 700*e* moving from one object 712*c* among the objects 712*a* displayed in the expanded clipboard 712 to one position (hereinafter, referred to as a fourth position) of the first or second touch screen 12 or 14, for example, a touch drag. In the shown example, the object 712*c* is a picture image and is dragged to the message application 702 displayed in the first touch screen 12 according to the touch gesture 700*e*. As illustrated in FIG. 17K, the message application 702 receives a picture image 714*b* of the object 712*c* in response to a release of the touch gesture 700*e* and displays 702*a* a message sending input window 714 for sending the picture image 714*b* and a sending key 714*a* for executing the sending of the picture image 714*b* in the first touch screen 12. When a tap gesture 700*f* is detected from the sending key 714*a*, the message application 702 sends a message including the picture image to a recipient.

As a selectable embodiment, when a touch gesture headed for the inside of the clipboard 710 from the boundary of the clipboard 710, for example, a flick or a touch drag reaching the opposite boundary of the clipboard 710 is detected while the clipboard 710 is displayed in the second touch screen 14, the second touch screen 14 removes the clipboard 710. In other words, the clipboard 710 which does not expand may be removed from the second touch screen 14 by the touch gesture or folding back command.

When the portable device includes the display device including the first touch screen and the second touch screen arranged on one foldable panel and the first touch screen and the second touch screen are arranged on at least one foldable or bendable panel, an electronic book function may be supported by the folding back command input by the touch screen display device.

Figure 18A:
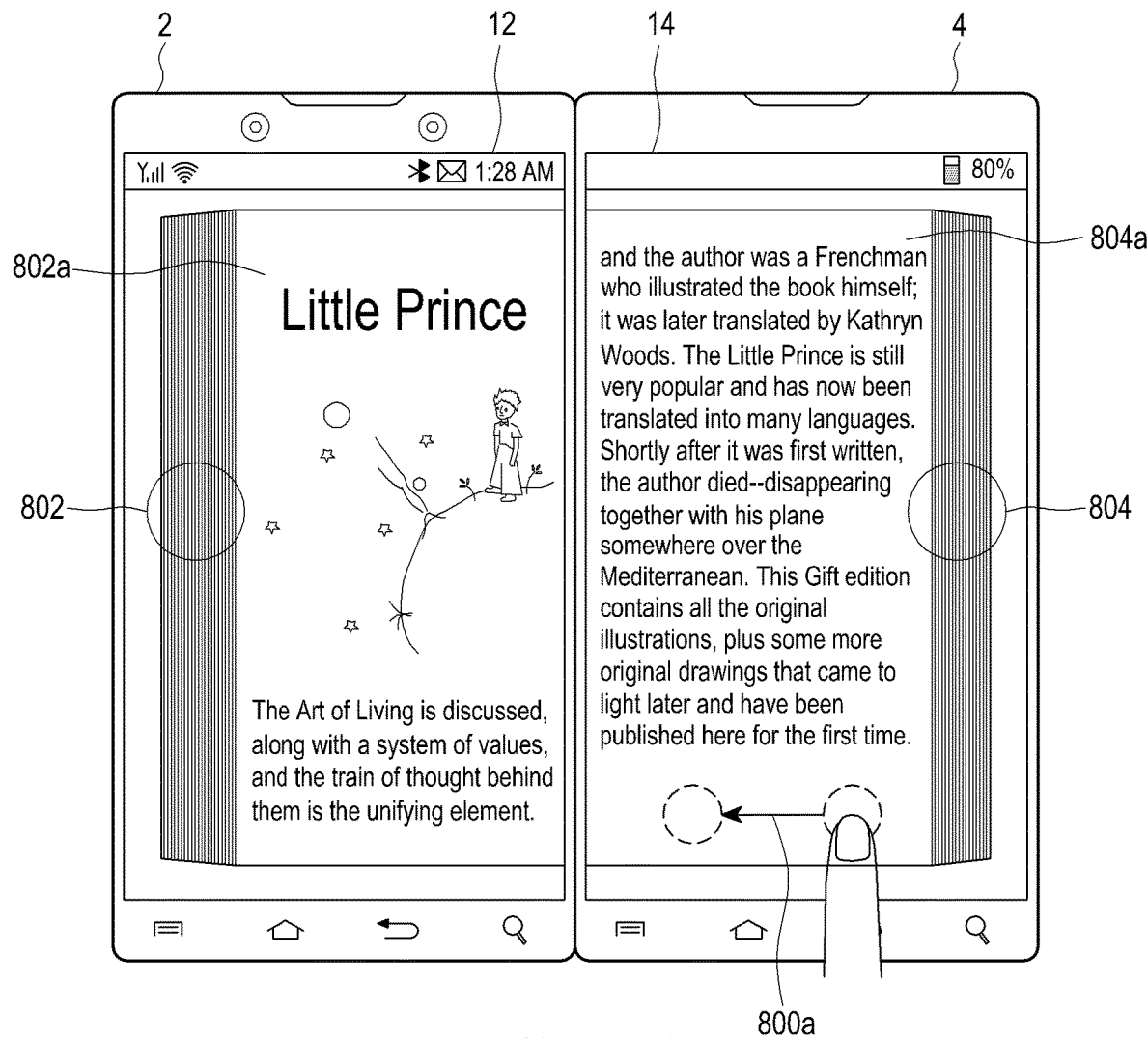
FIGS. 18A to 18P are diagrams illustrating a user interface for an electronic book function according to one or more exemplary embodiments.
Figure 18B:
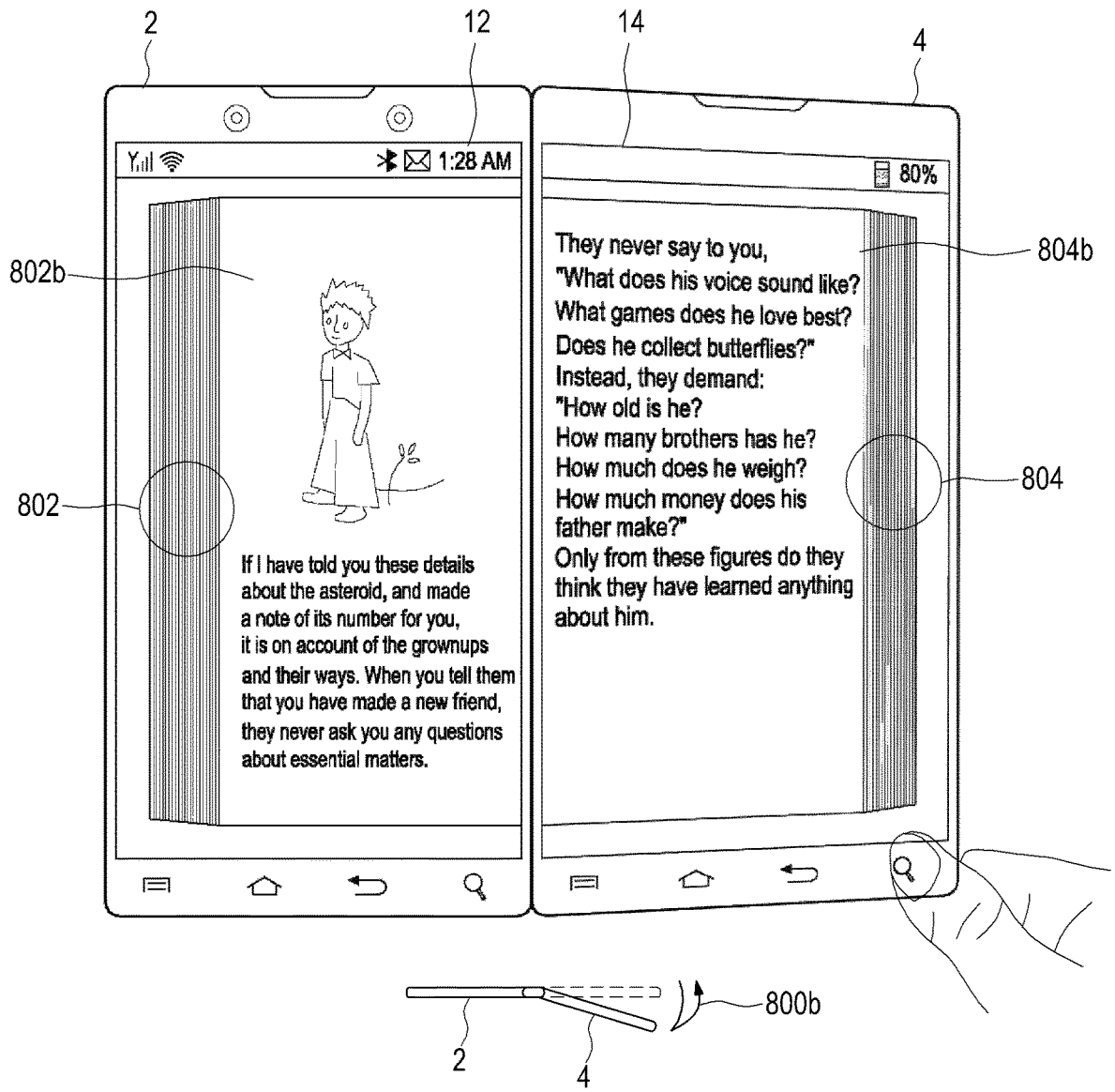
Figure 18C:
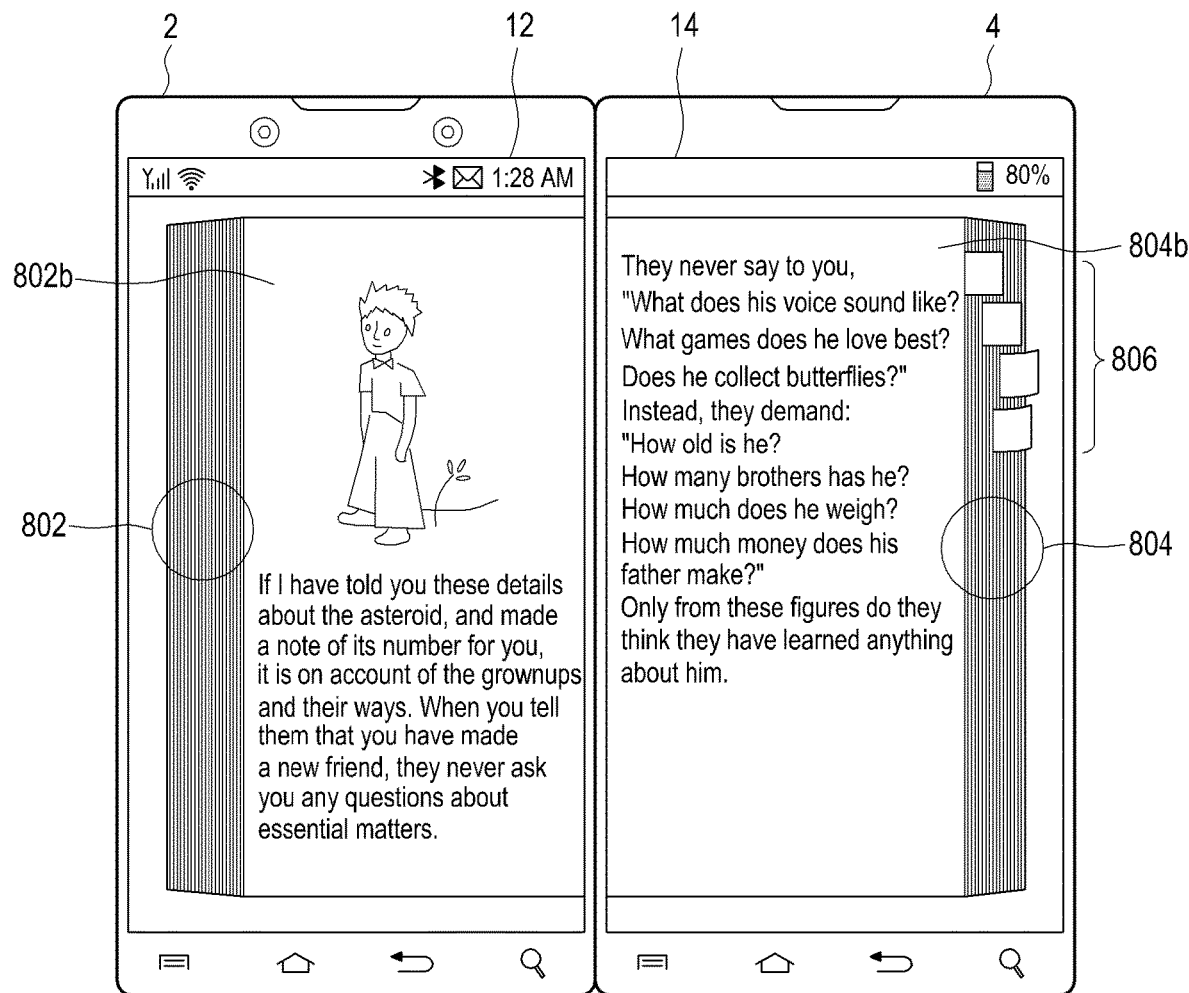
Figure 18D:
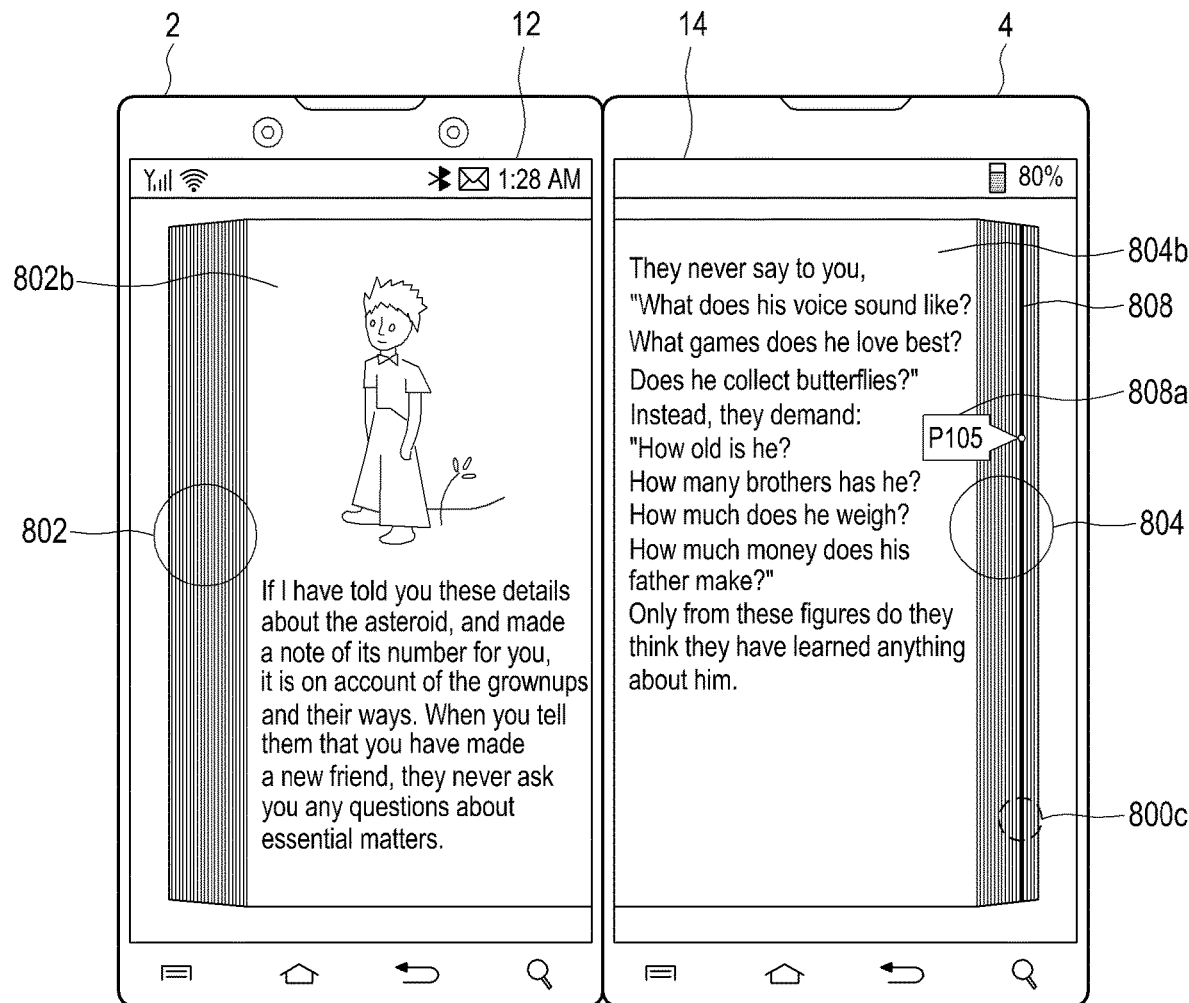
Figure 18E:
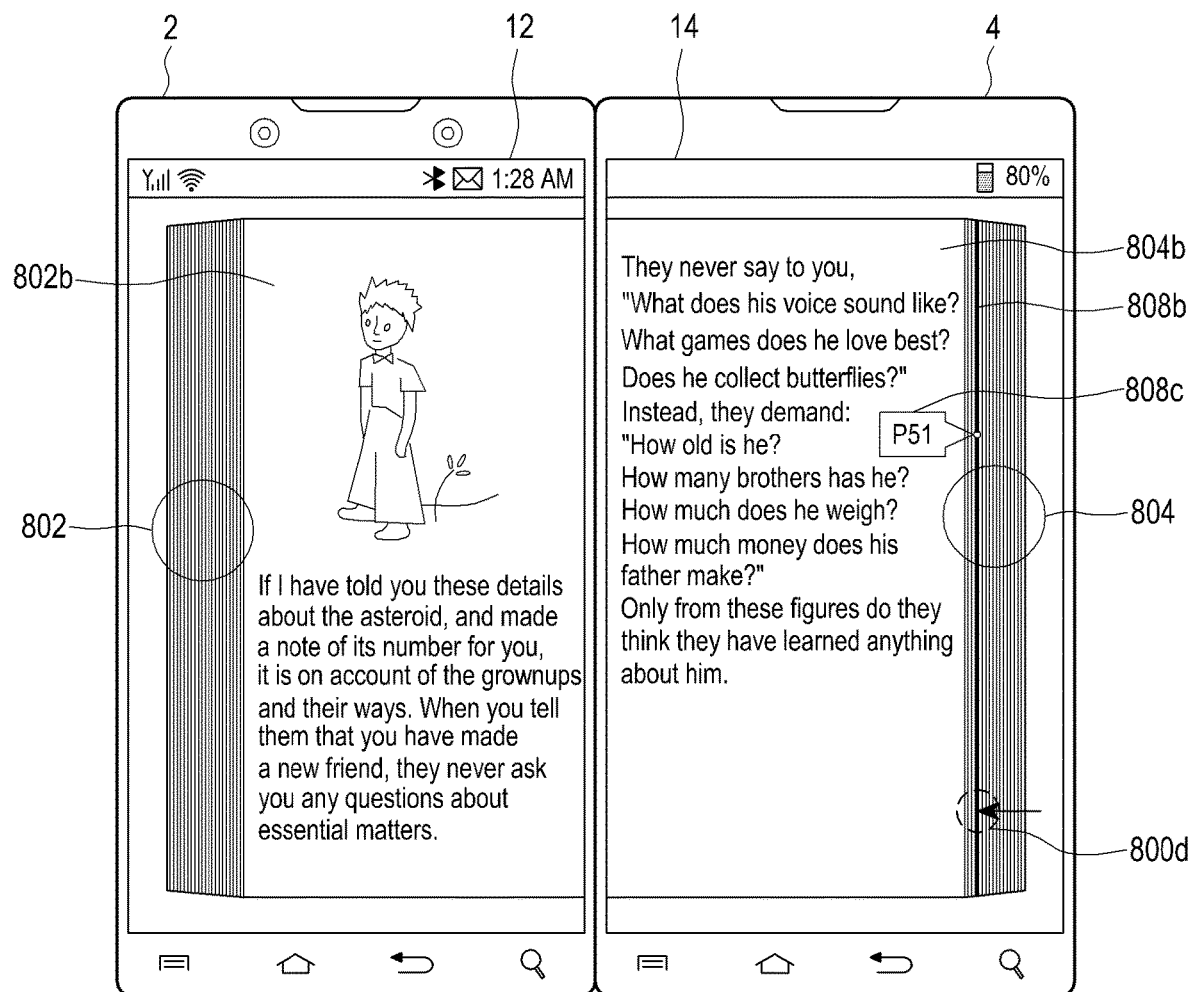
Figure 18F:
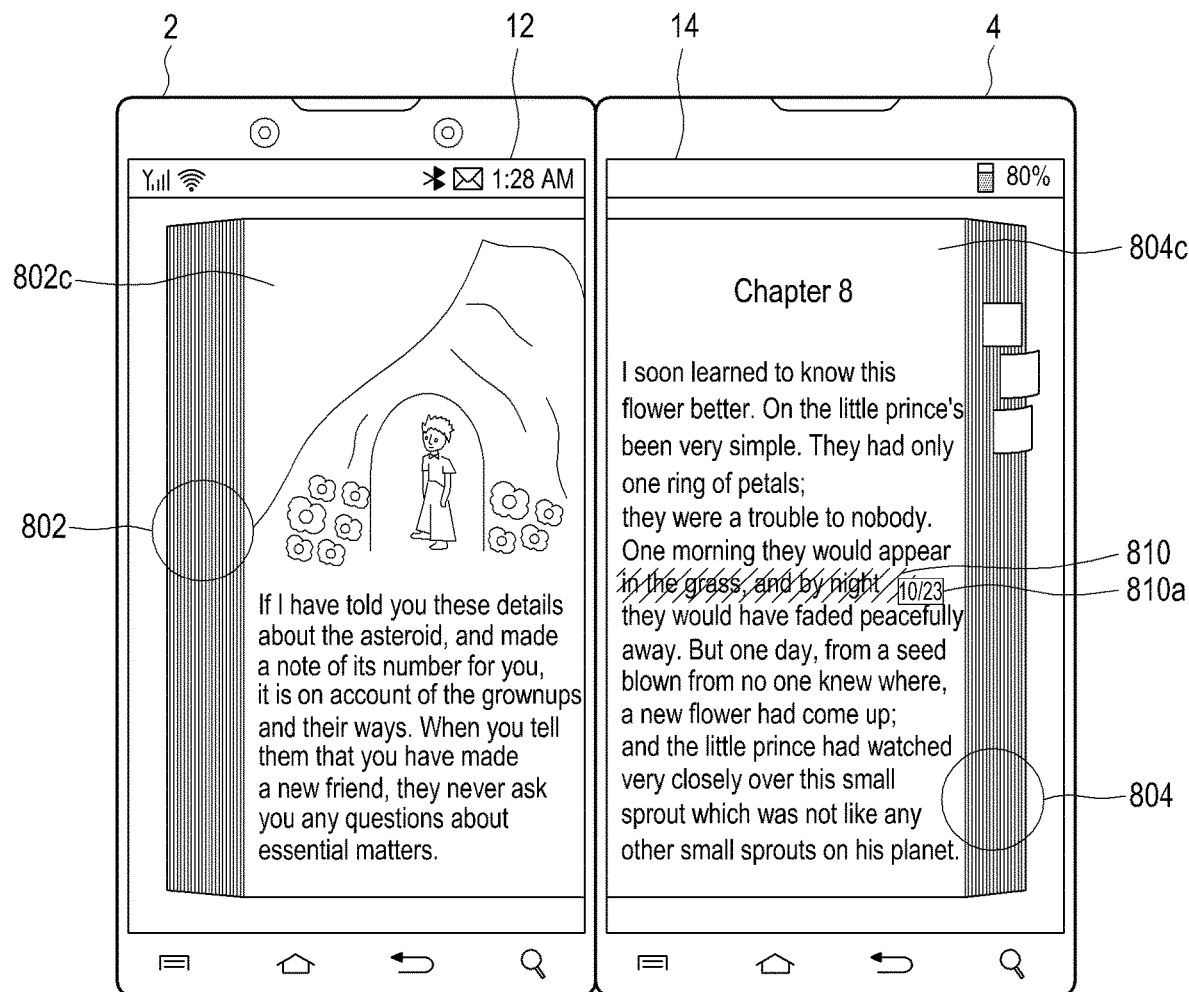
Figure 18G:
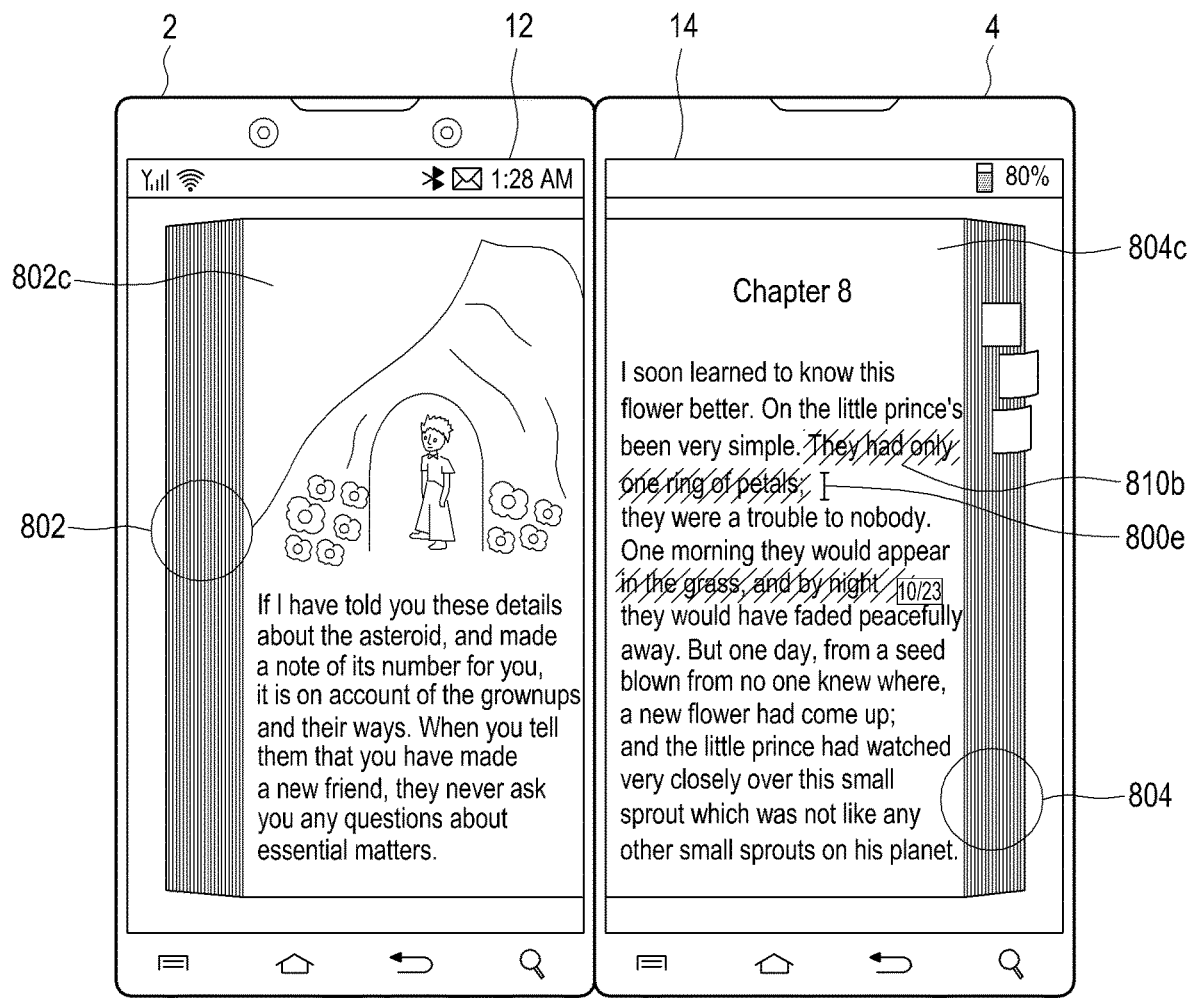
Figure 18H:
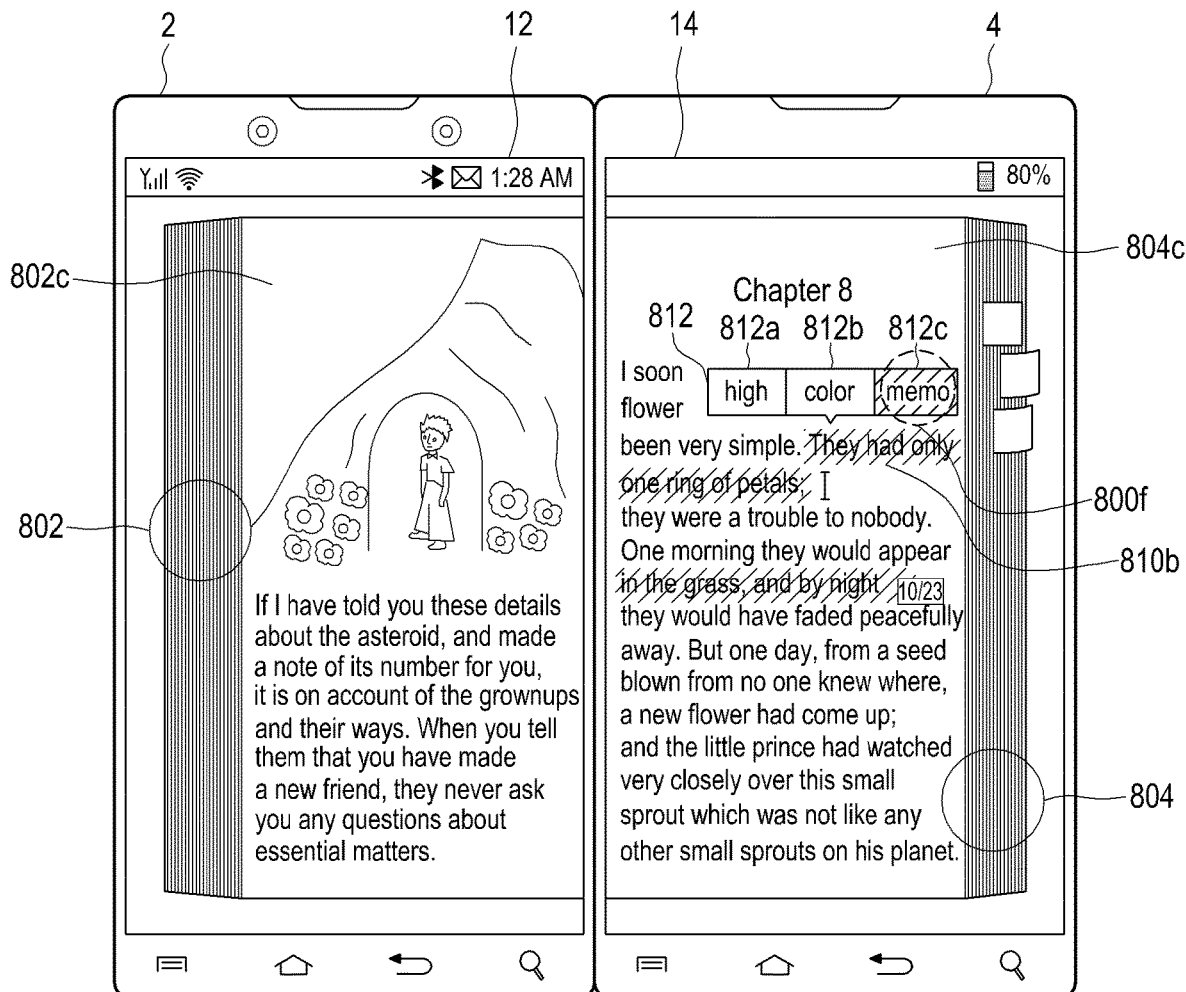
Figure 18I:
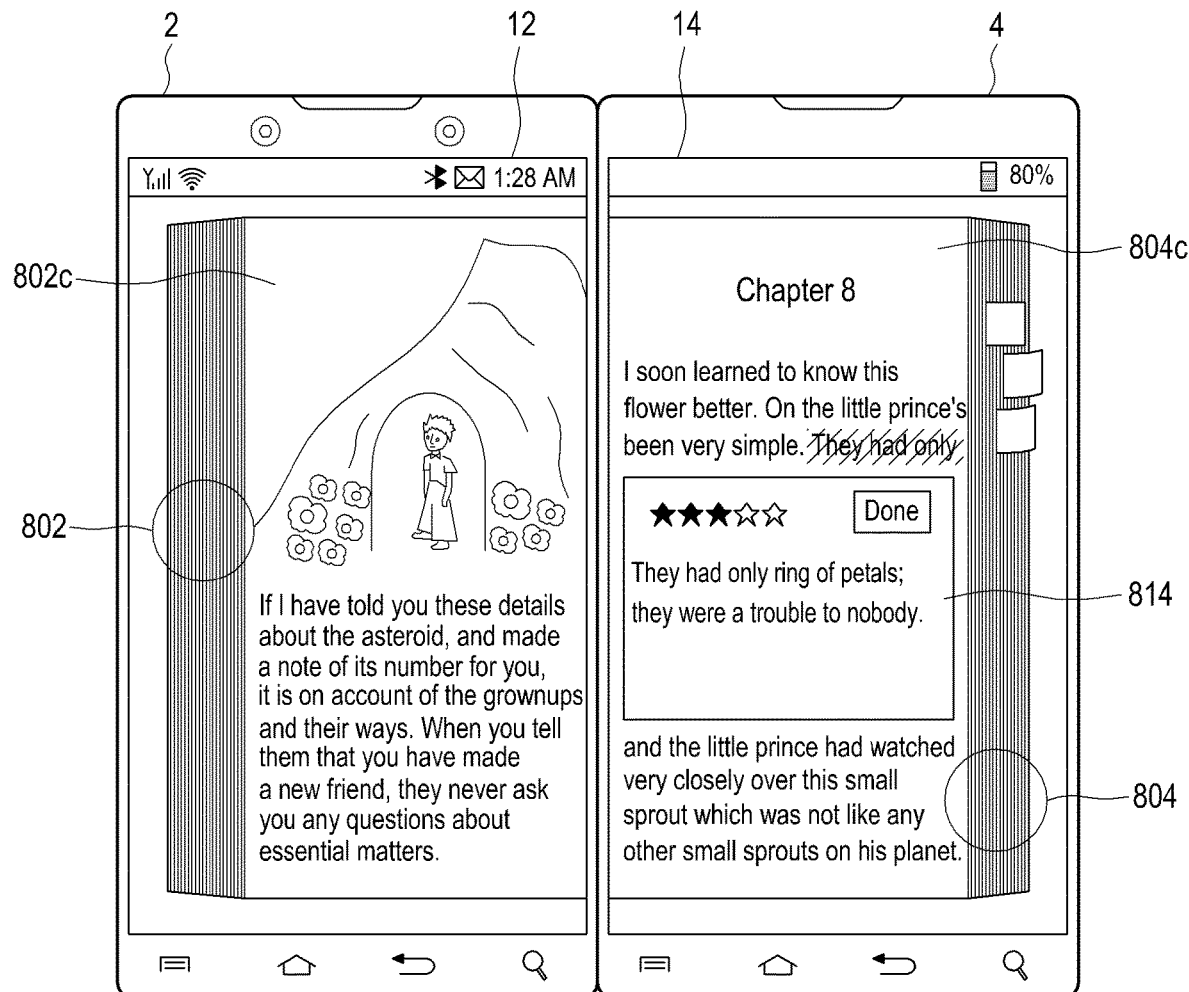
Figure 18J:
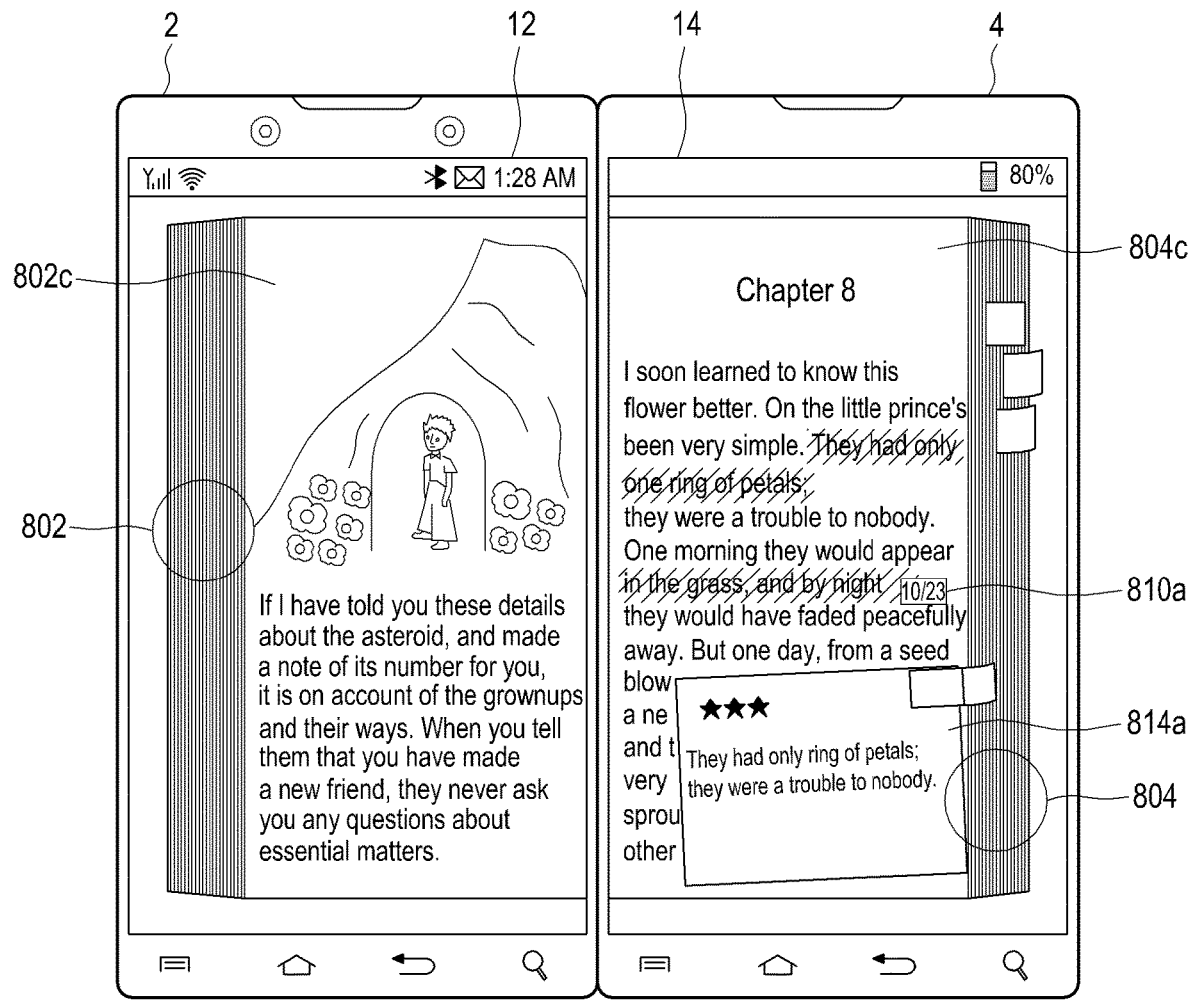
Figure 18K:
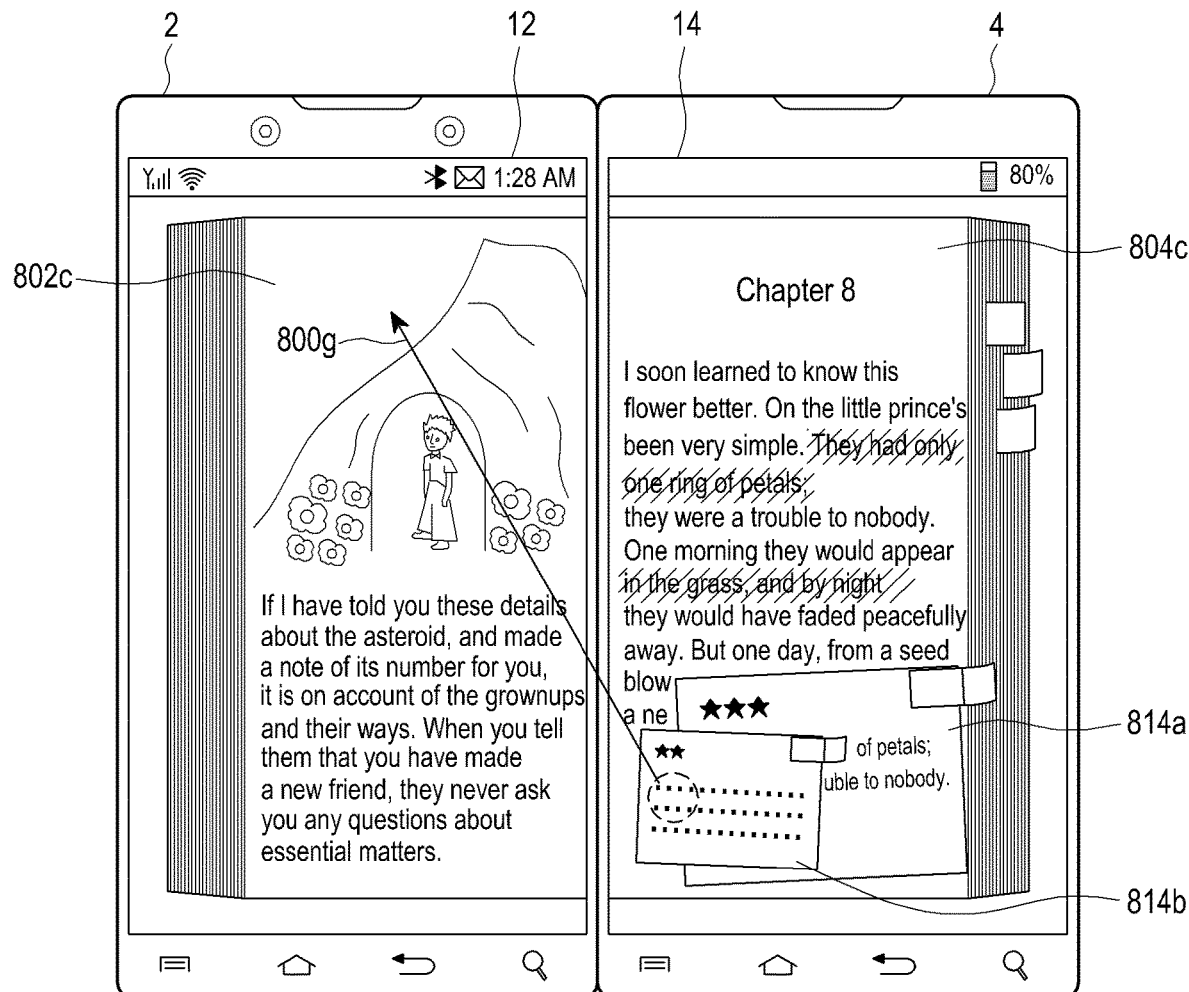
Figure 18L:
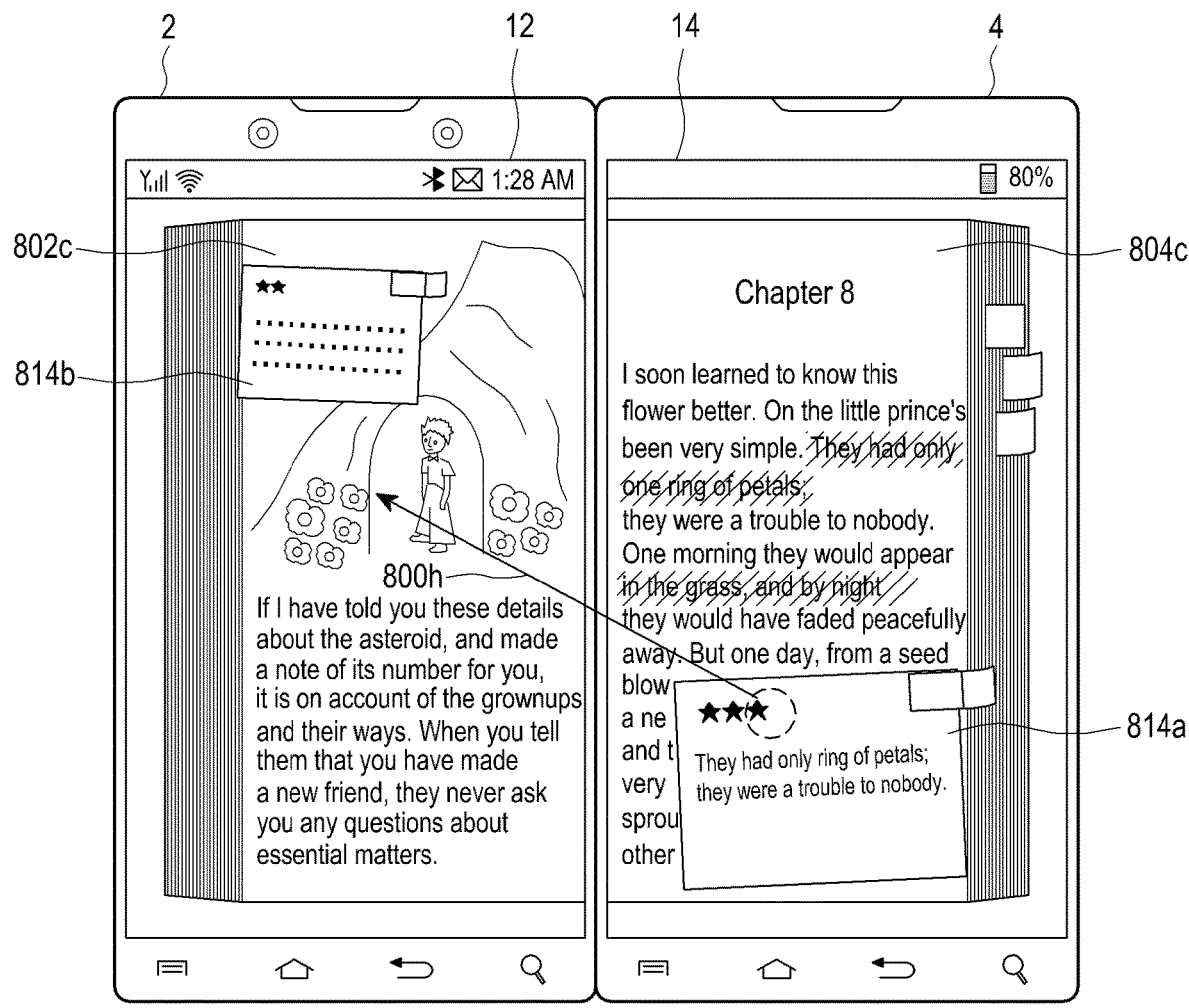
Figure 18M:
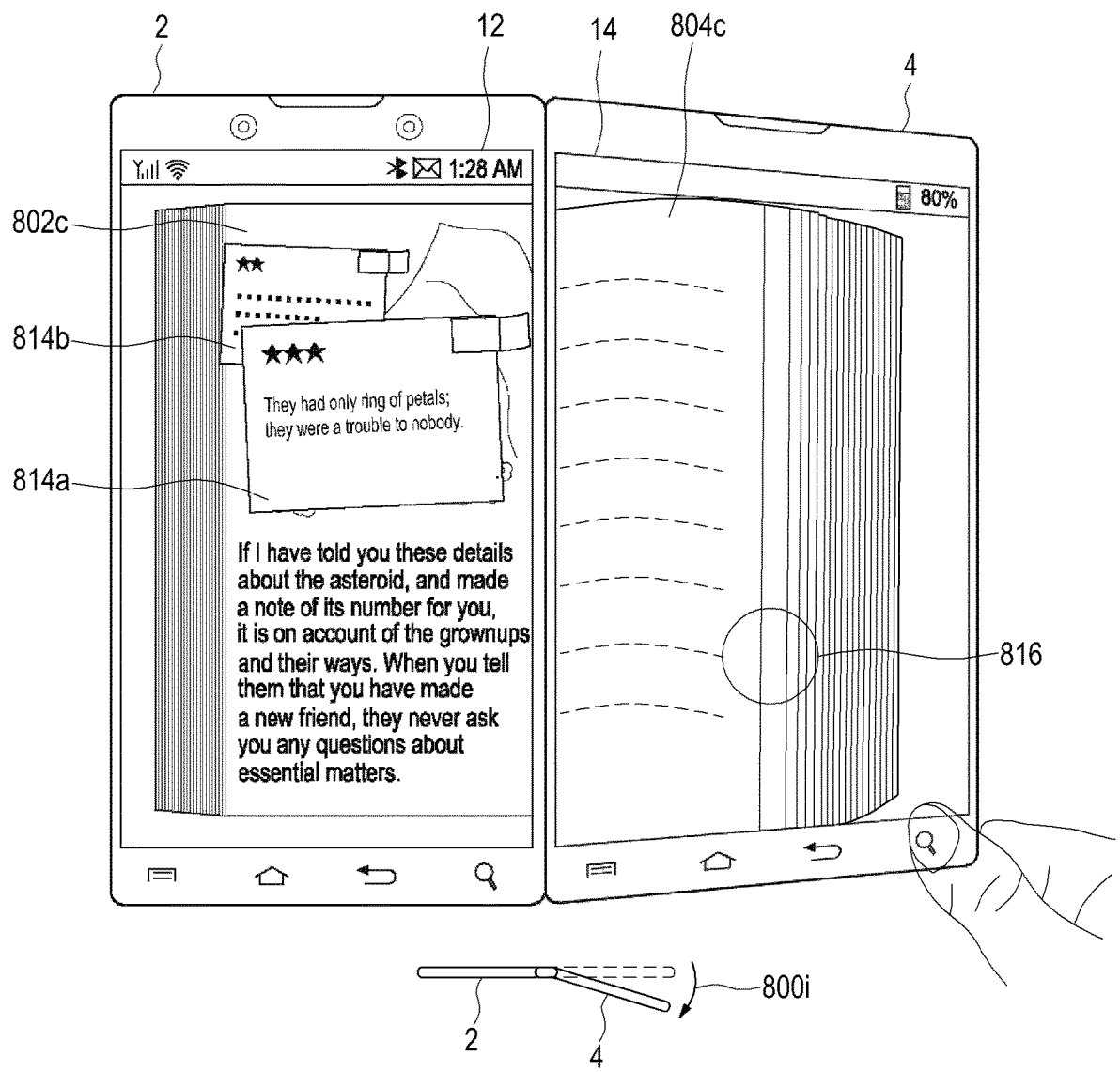
Figure 18N:
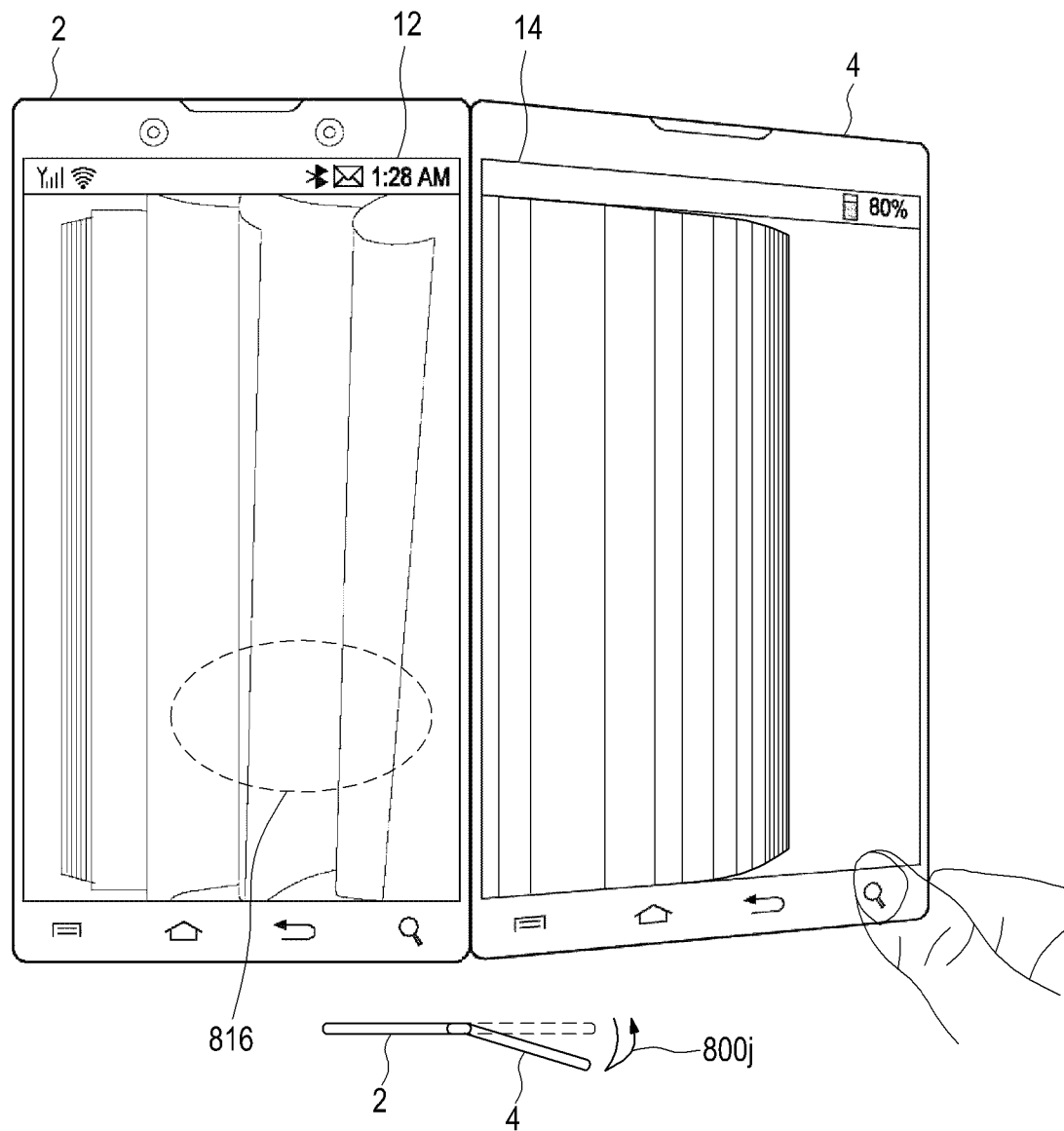
Figure 18O:
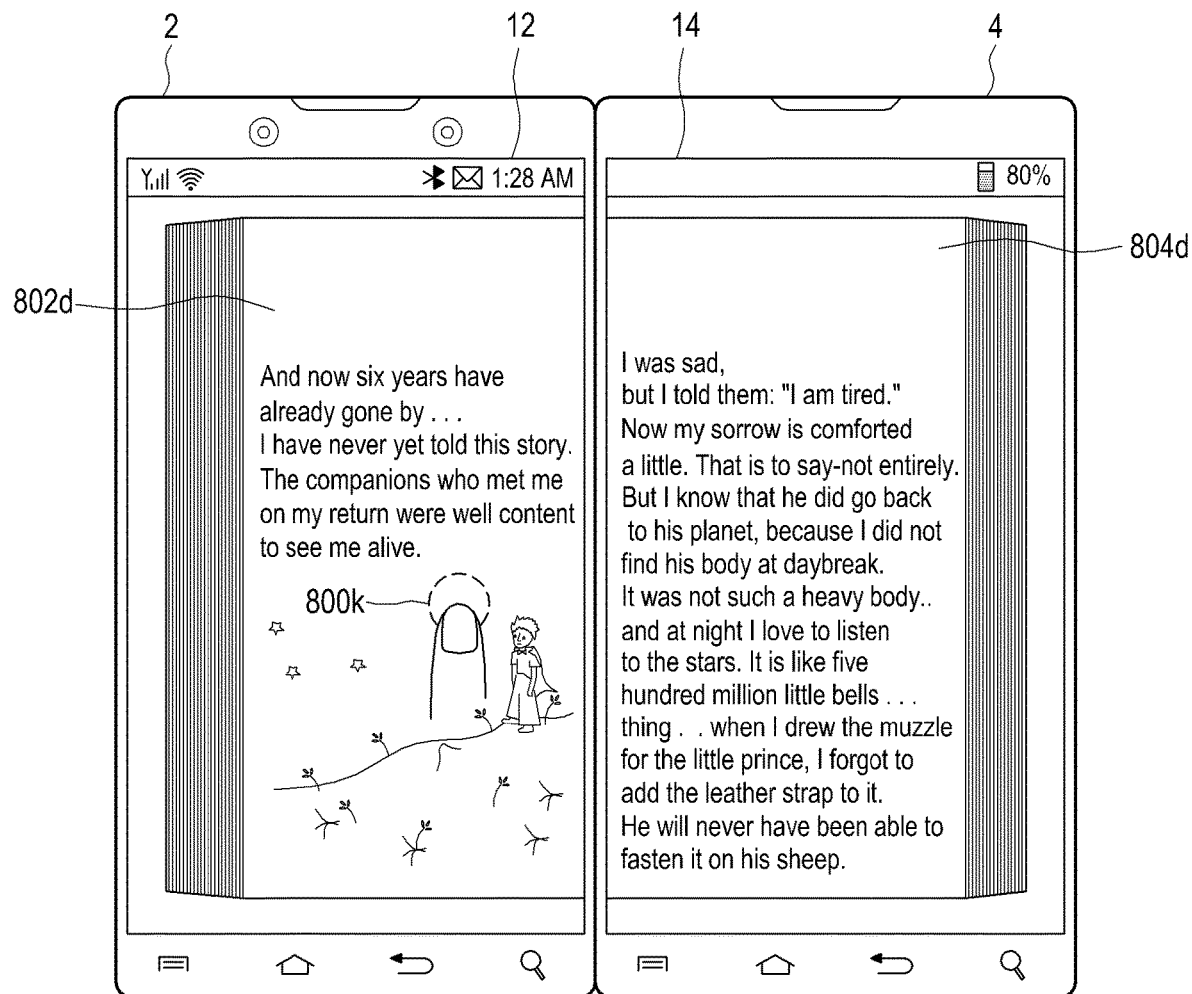
Figure 18P:
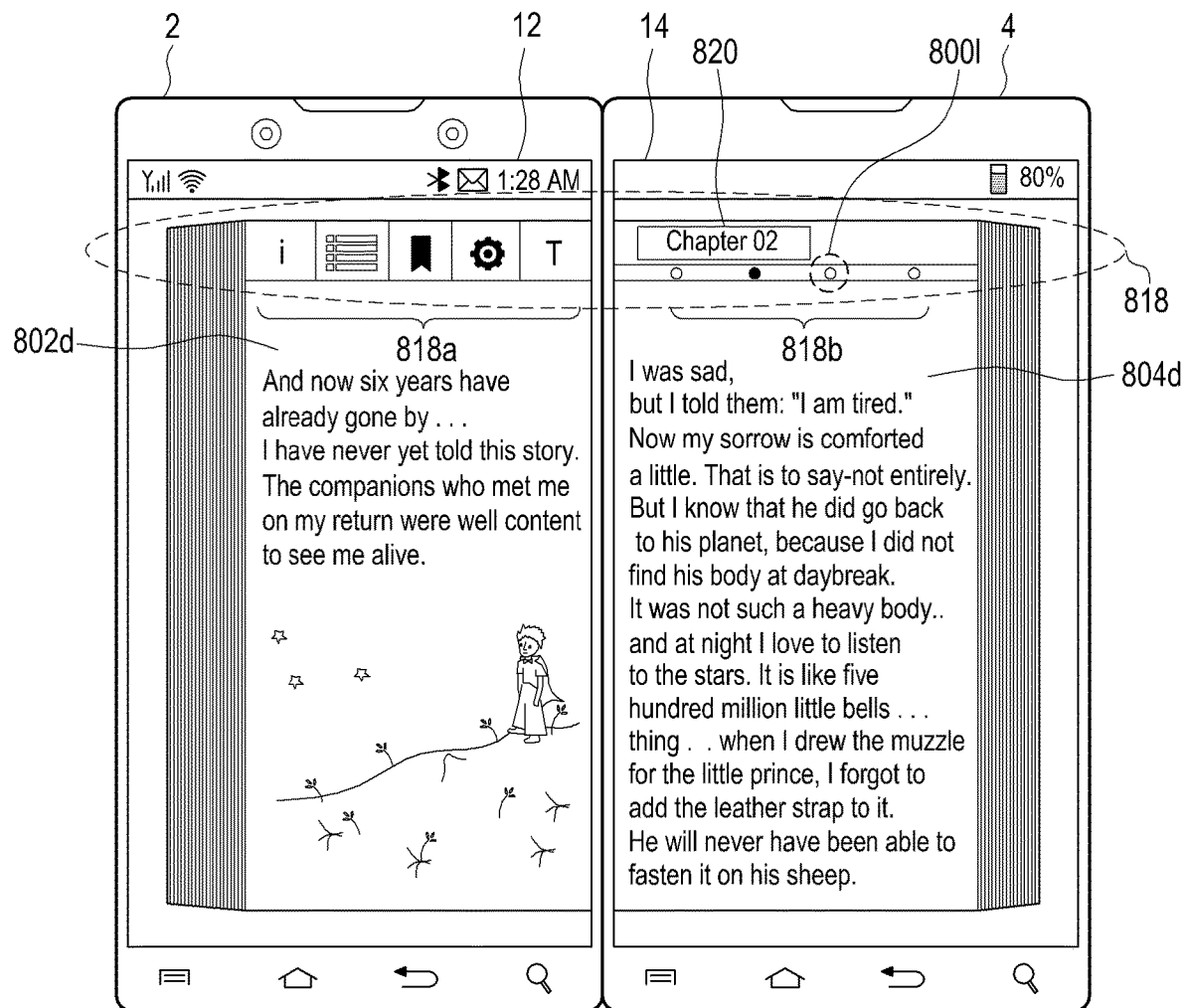

FIGS. 18A to 18P illustrate user interfaces for an electronic book function according to one or more exemplary embodiments.

Referring to FIG. 18A, a relative angle between the first panel 2 including the first touch screen 12 and the second panel 4 including the second touch screen 14 is actually 180 degrees (hereinafter, referred to as a first relative angle), the first touch screen 12 displays edge lines 802 of a first page 802*a* and previous pages provided by an electronic book application, and the second touch screen 14 displays edge lines 804 of a second page 804*a* and next pages provided by the electronic book application. The first and second page 802*a* and 804*a* include a text and/or an illustration of the same electronic book contents.

As one embodiment, the edge lines 802 and 804 may have different areas and intervals depending on amounts of the previous pages and the next pages. For example, when currently displayed pages correspond to 20 to 40% of the electronic book contents, the edge lines 802 of the previous pages are displayed as 1 cm and the edge lines 804 of the next pages are displayed as 2 cm. When the currently displayed pages correspond to 40 to 60% of the electronic book contents, the edge lines 802 of the previous pages are displayed as 1.5 cm and the edge lines 804 of the next pages are displayed as 1.5 cm. When the currently displayed pages correspond to 60 to 80% of the electronic book contents, the edge lines 802 of the previous pages are displayed as 2 cm and the edge lines 804 of the next pages are displayed as 1 cm. When the currently displayed pages correspond to 80 to 100% of the electronic book contents, the edge lines 802 of the previous pages are displayed as 2.5 cm and the edge lines 804 of the next pages are displayed as 0.5 cm.

As another embodiment, the edge lines 802 and 804 corresponding to the previous and next pages are hidden in a state where the first and second panels 2 and 4 are unfolded, and the corresponding edge lines 802 and 804 are displayed when one of the first and second panels 2 and 4 is slightly folded inward and then the folding state is maintained for a predetermined effective time. As one example, when the second panel 4 is slightly folded inward, for example, the second panel 4 is folded such that the relative angle becomes an angle equal to or larger than 180 degrees and smaller than 210 degrees, the second touch screen 14 displays the edge lines 804 in a right side of the displayed second page 804a. When the second panel 4 is further folded, for example, when the second panel 4 is folded such that the relative angle becomes an angle equal to or larger than 210 degrees and smaller than 230 degrees, the edge lines 804 may be expansively displayed to have a wider area or interval in accordance with the relative angle. Similarly, when the first panel 2 is slightly folded inward, for example, the first panel 2 is folded such that the relative angle becomes an angle equal to or larger than 180 degrees and smaller than 210 degrees, the first touch screen 12 displays the edge lines 802 in a left side of the displayed first page 802a. When the first panel 2 is further folded, for example, when the first panel 2 is folded such that the relative angle becomes an angle equal to or larger than 210 degrees and smaller than 230 degrees, the edge lines 802 may be expansively displayed to have a wider area or interval in accordance with the relative angle. As a selectable embodiment, when the first and second panels 2 and 4 are unfolded again, the edge lines 802 and 804 may be removed from the first and second touch screens 12 and 14.

When the portable device detects a pre-designated touch gesture 800a heading for a direction of the first touch screen 12 from the second touch screen 14, for example, a flick or a touch drag is detected, the portable device proceeds to FIG. 18B.

As illustrated in FIG. 18B, the first and second touch screens 12 and 14 replace the first and second pages 802a and 804 with succeeding third and fourth pages 802b and 804b and display the third and fourth pages 802b and 804b in response to the detection of the touch gesture 800a. At this time, the third and fourth pages 802b and 804b may be displayed with a three dimensional graphic effect of turning the second page 804a. After the second page 804a is turned, the edge lines 802 and 804 of the previous and next pages of the third and fourth pages 802b and 804b are still displayed.

Referring to FIG. 18B, as the second panel 4 relatively moves with respect to the first panel 2, that is, in a first direction, the portable device detects that the relative angle between the first panel 2 and the second panel 4 is changed. As one example, as the second panel 4 rotates based on the hinge between the first panel 2 and the second panel 4, the relative angle between the first angle 2 and the second angle 4 becomes an angle (hereinafter, referred to as a second relative angle) within a predetermined range (for example, 200 to 210 degrees) exceeding 180 degrees. As the second panel 4 relatively moves with respect to the first panel 2, that is, in a second direction opposite to the first direction within a predetermined effective time after the relative angle between the first and second panels 2 and 4 becomes the second relative angle, the portable device detects that the relative angle between the first panel 2 and the second panel 4 becomes the first relative angle (or actual first relative angle) again and determines that a folding back command 800b is input.

Referring to FIG. 18C, the portable device displays tags 806 attached to at least some edge lines of the edge lines 804 of the next pages of the fourth page 804b displayed in the second touch screen 14 in response to the folding back command 800b. Each of the tags 806 is located in an edge line of the page designated by the user or a provider of the electronic book contents, and the tags 806 may have different colors which are visually distinguished from the pages 802b and 804b and the edge lines 804. As a selectable embodiment, each of the tags 806 may be attached to an edge line of the page including a memo or highlighted item designated by the user or the provider of electronic book contents. Although not illustrated, when a touch gesture for example, a tap gesture is detected from a first tag which is one of the tags 806, the portable device executes a graphic effect of turning the pages and displays two pages including the page to which the first tag is attached in the first and second screens 12 and 14. As a selectable embodiment, the tags 806 may be removed when the folding back command is input again.

Referring to FIG. 18D, the portable device detects a predetermined touch gesture 800c, for example, a touch or a touch and hold from a first edge line 808 which is one of the edge lines 804 of the next pages of the fourth page 804b displayed in the second touch screen 14. The second touch screen 14 changes a color of the first edge line 808 into a color (a first color, for example, red) visually distinguished from other edge lines in response to the detection of the touch 800c. At this time, a page number of the first edge line 808, for example, a page indicator 808a showing "P105" may be displayed on the first edge line 808.

Referring to FIG. 18E, as the touch 800c moves in a direction of intersecting the edge lines 804 while being held, the touch 800c is released 800d at a second edge line 808b within the edge line area 804. Accordingly, when the touch drag 800c or 800d reaching the second edge line 808b from the first edge line 808 is detected, the second touch screen 14 changes a color of the second edge line 808b into the first color. At this time, page number of the second edge line 808b, for example, a page indicator 808c showing "P51" may be displayed on the second edge line 808b.

Referring to FIG. 18F, the portable device detects that the touch 800c is released 800d, and replaces the third and fourth pages 802b and 804b displayed in the first and second touch screens 12 and 14 with fifth and sixth pages 802c and 804c including the page of the second edge line 808b and displays the replaced fifth and sixth pages 802c and 804c. At this time, the fifth and sixth pages 802c and 804c may be displayed with a graphic effect of successively turning pages between the third and fourth pages 802b and 804b and the fifth and sixth pages 802c and 804c. Further, the edge lines 802 and 804 of previous and next pages of the fifth and sixth pages 802c and 804c are still displayed.

Referring to FIG. 18F, the second touch screen 14 can highlight a first item (text or illustration) 810 among items included in the sixth page 804c and display the highlighted first item 810. The highlighted first item 810 may be designated by the user or the provider of the electronic book contents and displayed together with an indicator 810a showing a designated date/time.

Referring to FIG. 18G, the portable device detects a touch drag 800e moving along a second item 810b among items included in the sixth page 804c in the second touch screen 14, and highlights the second item 810b with a designated color according to the touch drag 800e and displays the highlighted second item 810b.

Referring to FIG. 18H, the portable device detects that the touch drag 800e is released and displays a menu bar 812 which is a soft menu for controlling a highlight function in a position where the touch drag 800e is released, that is, an end of the second item 810b. For example, the menu bar 812 includes a highlight key 812a for selecting whether the highlight is performed or controlling the highlight, a color key 812b for changing a highlight color (or character), and a memo key 812c for attaching a memo. When a predetermined touch gesture 800f, for example, tap gesture is detected from the memo key 812c, the portable device proceeds to FIG. 18I.

Referring to FIG. 18I, the portable device displays a memo input window 814 in the second touch screen 14 in response to the detection of the touch gesture 800f on the memo key 812c. For example, a memo input window 814 includes at least contents of the second item 810b selected by the touch drag 800e and allows an editing function by the user. When a tap gesture is detected from a done key included in the memo window 814, the second touch screen 14 displays a memo window 814a including contents of the second item 810b input and edited by the memo input window 814 in a predetermined position as illustrated in FIG. 18J. The memo window 814a has a size smaller than the memo input window 814 and may include some of the contents input through the memo input window 814 or reduced contents and have a shape simplified from the memo input window 814. Further, a tag having the same color as the highlight color of the corresponding second item 810b may be attached to the memo window 814a. As a selectable embodiment, when the memo window 814a is displayed, a tag having the same color as that of the memo window 814a may be attached to an edge line of the page including the memo window 814a.

Referring to FIG. 18K, the second touch screen 14 displays one or more memo windows 814a and 814b including items selected from the sixth page 804c by the user. Referring to FIG. 18K, in response to a touch drag 800g which starts at the memo window 814b and is released at an external position (first position) of the memo window 814b within the first and second touch screens 12 and 14, the portable device can move the memo window 814b to the first position and then display the moved memo window in the first position. In the shown example, the first position is located within the first touch screen 12. Similarly, referring to FIG. 18L, in response to a touch drag 800h headed for an external position (second position) of the memo window 814a from the memo window 814a, the portable device can move the memo window 814a to the second position and display the moved memo window 814a in the second position.

Referring to FIG. 18M, as the second panel 4 relatively moves with respect to the first panel 2, that is, in a first direction while the pages 802c and 804c are displayed in the first and second touch screens 12 and 14, the portable device detects that the relative angle between the first panel 2 and the second panel 4 is changed. For example, as the second panel 4 rotates based on the hinge between the first panel 2 and the second panel 4, the relative angle between the first panel 2 and the second panel 4 becomes an angle (hereinafter, referred to as a second relative angle) within a predetermined range (for example, 200 to 210 degrees) exceeding 180 degrees. When the relative angle between the first and second panels 2 and 4 becomes the second relative angle and the second relative angle remains for a predetermined effective time or more, the portable device determines that a folding hold command 800i is input.

The portable device displays a graphic effect 816 of successively turning pages from current pages 802c and 804c displayed in the first and second touch screens 12 and 14 to next pages, that is, a moving image in response to the folding hold command 800i. Here, when each page is turned in a direction from the second touch screen 14 to the first touch screen 12, the page may be displayed over both the first and second touch screens 12 and 14.

Referring to FIG. 18N, as the second panel 4 relatively moves with respect to the first panel 2, that is in a second direction opposite to the first direction, the portable device detects that the relative angle between the first panel 2 and the second panel 4 becomes again the first relative angle (or actual first relative angle) and determines that the folding hold command 800i is released and a folding back command 800j is input while the graphic effect 816 of successively turning the pages according to the folding hold command 800i is displayed.

Referring to FIG. 18O, the portable device ends the graphic effect 816 of turning the pages in response to the detection of the folding back command 800j and displays new pages 802d and 804d which have not been turned in the first and second touch screens 12 and 14. The successive page turning function can be executed at different speeds depending on the relative angle between the first and second panels 2 and 4 while the folding hold command 800i is maintained. For example, a range of the relative angle is subdivided into four angle ranges, a 1× backward page turning function is executed when the second relative angle is within a first angle range, a 2× backward page turning function is executed when the second relative angle is within a second angle range, a 1× forward page turning function is executed when the second relative angle is within a third angle range, and a 2× forward page turning function is executed when the second relative angle is within a fourth angle range.

Referring to FIG. 18O, when the portable device detects a pre-designated touch gesture 800k, for example, a touch and hold from a random position of the current pages 802d and 804d displayed in the first and second touch screens 12 and 14, the portable device proceeds to FIG. 18D.

As illustrated in FIG. 18P, the portable device displays an electronic book setting menu 818 in a predetermined area within the first and second touch screens 12 and 14 in response to the detection of the touch gesture 800k. As one example, the electronic book setting menu 818 may be displayed in a translucent state in upper parts of the current pages 802d and 804d and includes soft keys 818a for a font change, an index, and a text input and a chapter list 818b.

As one example, the chapter list 818b includes a current chapter indicator 820 indicating chapter numbers and a current chapter position included in the electronic book contents. When a tap gesture 800l is detected from a first chapter number which is one of the chapter numbers of the chapter list 818b, the portable device can display first pages (not shown) of a first chapter corresponding to the first chapter number in the first and second touch screens 12 and 14 in response to the detection of the tap gesture 800l.

As another embodiment, the chapter list 818b does not require an input of a touch gesture and may be displayed in upper or lower parts of the first and second touch screens 12 and 14 all the time.

The portable device can support a video conference application in a separate work environment through the display device including the first touch screen and the second touch screen arranged on one foldable panel. Participants of the video conference can participate in the video conference through a connection of a group call.

FIGS. 19A to 19G illustrate user interfaces of a video conference application according to one or more exemplary embodiments.

Figure 19A:
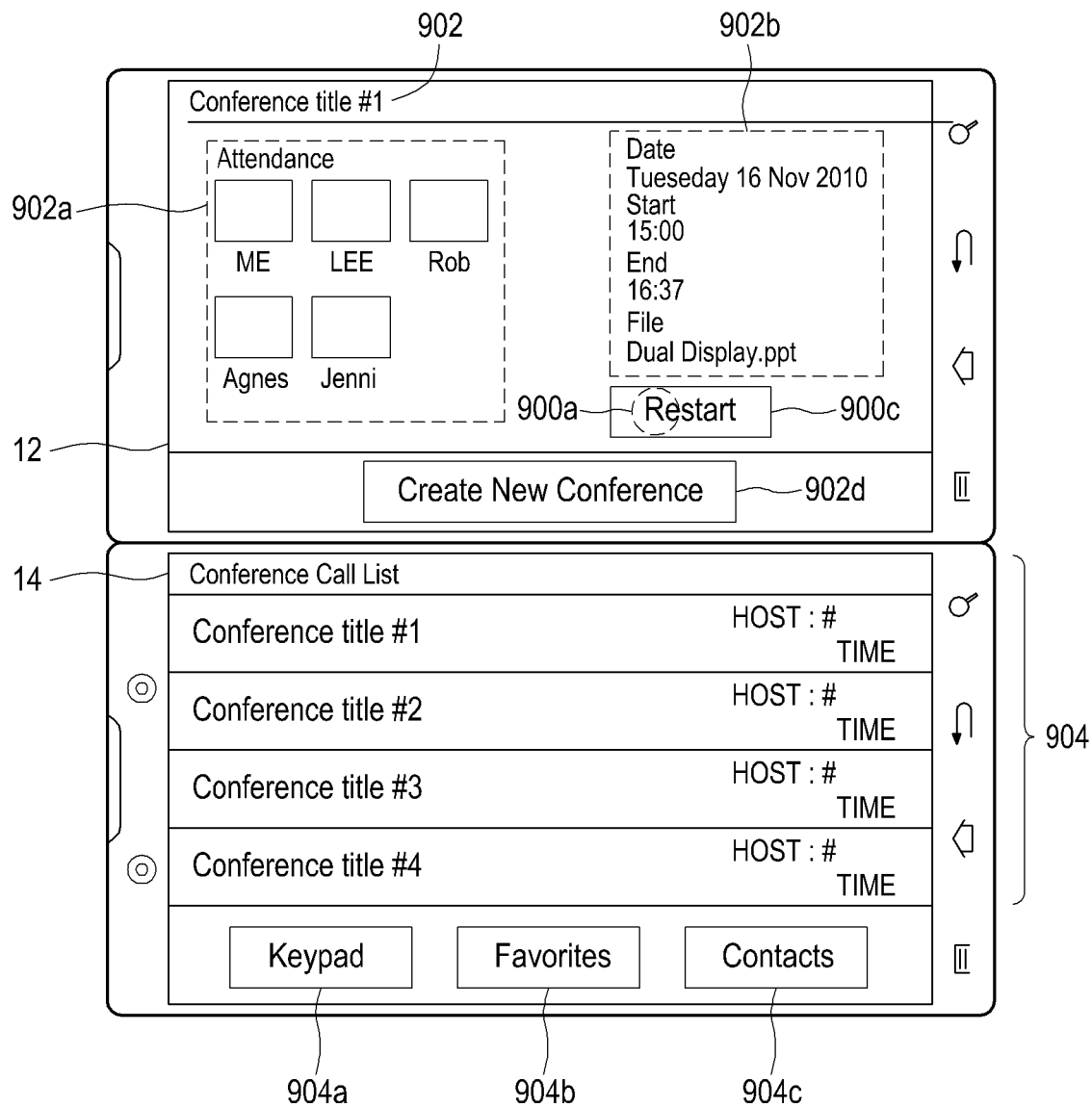
FIGS. 19A to 19G are diagrams illustrating a user interface of a video conference application according to one or more exemplary embodiments.

Referring to FIG. 19A, the first touch screen 12 displays at least one of a participant list area 802a, a basic information area 902b, a conference restart key 902c, and a new conference create key 902d which are related to a first video conference among a plurality of video conferences which can be provided by a video conference application. The participant list area 802a includes names (or nicknames) of the participants including the user of the portable device and picture images (thumbnails). The basic information area 902b includes at least one of a conference date, for example, "Tuesday 16 Nov. 2010", a conference start and end (expected) time, for example, "15:00" and "16:37", and a name of a document file used for the conference, for example, "Dual Display.ppt". When the first video conference is temporarily stopped, the conference restart key 902c is a soft key used to make a request for the restart of the first video conference to the participants or to inform the participants of the restart of the first video conference. The new conference create key 902d is a soft key used to create a new video conference.

The second touch screen 14 displays video conference lists 904 including at least some of conference items indicating video conferences which can be provided by the video conference application. Each of the conference items included in the video conference lists 904 include at least one of a title of the video conference, a start time, a host, a number of participants, and a progress time. In addition, the second touch screen 14 may further display at least one of a keypad key 904a for loading a virtual keypad, a favorites key 904b for selecting only frequently used video conferences, and a contact key 904c for loading contact numbers. Although not illustrated, when a tap gesture is detected from a conference item of a second video conference of conference items displayed in the second touch screen 14, the portable device replaces information 902a ad 902b related to the first video conference displayed in the first touch screen 12 with information related to the second video conference and displays the replaced information.

Figure 19B:
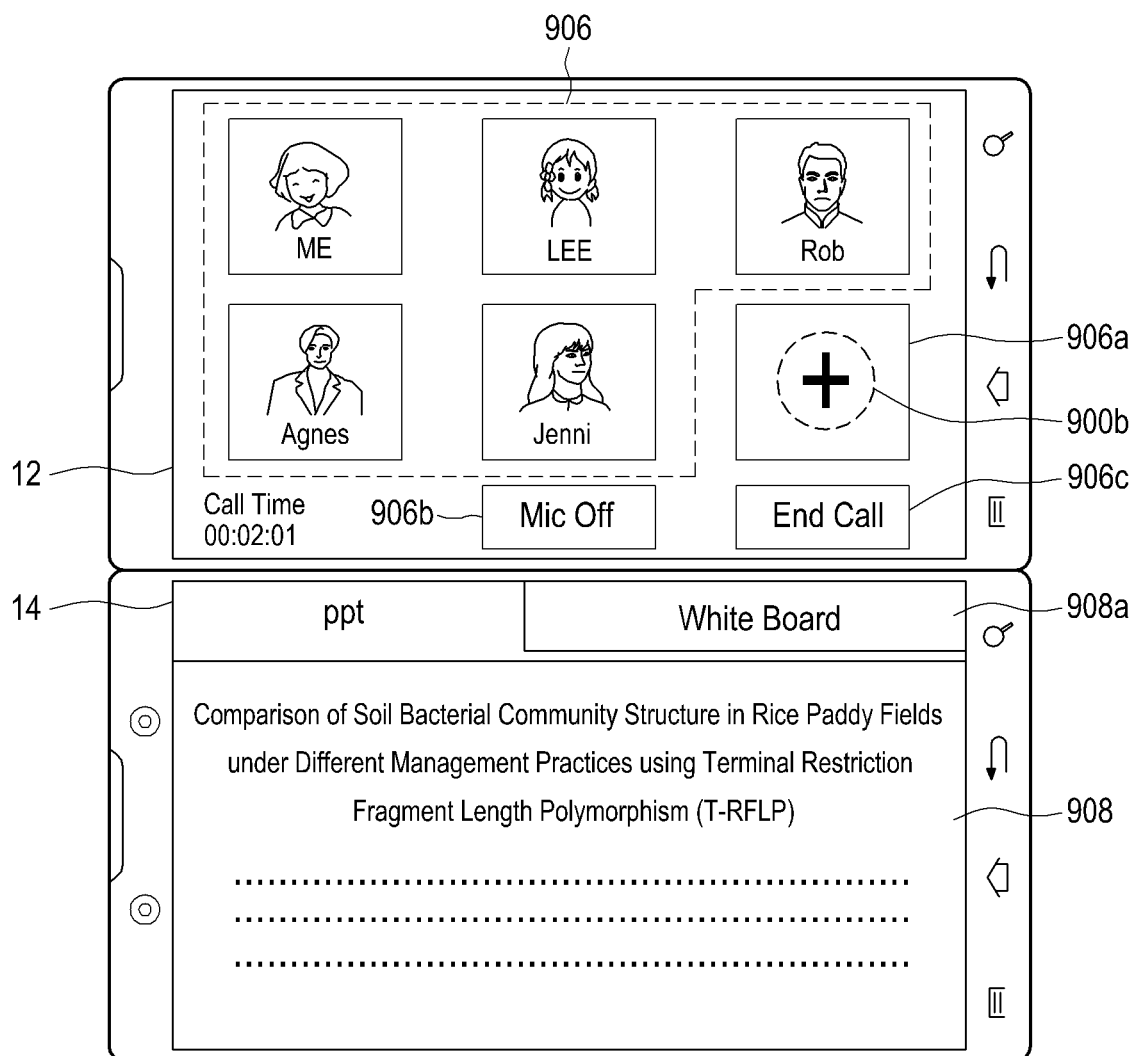

When the portable device detects a predetermined touch gesture 900a, for example, a tap gesture from the conference restart key 902c of the first touch screen 12, the portable device proceeds to FIG. 19B.

Referring to FIG. 19B, the portable device displays a participant list area 906 expanded from the participant list area 902a of the first video conference in the first touch screen 12 and displays a shared board area 14 for the first video conference in the second touch screen 14 in response to the detection of the touch gesture 900a. The participant list area 906 includes names (or nicknames) of the connected participants including the user him/herself, "ME" and picture images, and each of the picture images may have a larger size than the picture image within the participant list area 902a. As a selectable embodiment, the participant list area 906 can provide more information on each of the participants in comparison with the participant list area 902a.

In addition, the first touch screen 12 further displays at least one of a participant addition key 906a for adding a new participant, a microphone off key 906b for turning off a microphone, and a call end key 906c for ending or leaving from the video conference. The shared board area 908 displays contents of a document file, for example, "Atomic Structure.ppt" registered to be used for the first video conference according to a basic setting. The second touch screen 14 scrolls up/down the contents of the displayed document file in response to the detection of a touch gesture, for example, a flick up/down or a touch drag up/down on the shared board area 908. In addition, the second touch screen 14 may further display a white board key 908a for selecting to use the shared board area 908 as the white board area.

Figure 19C:
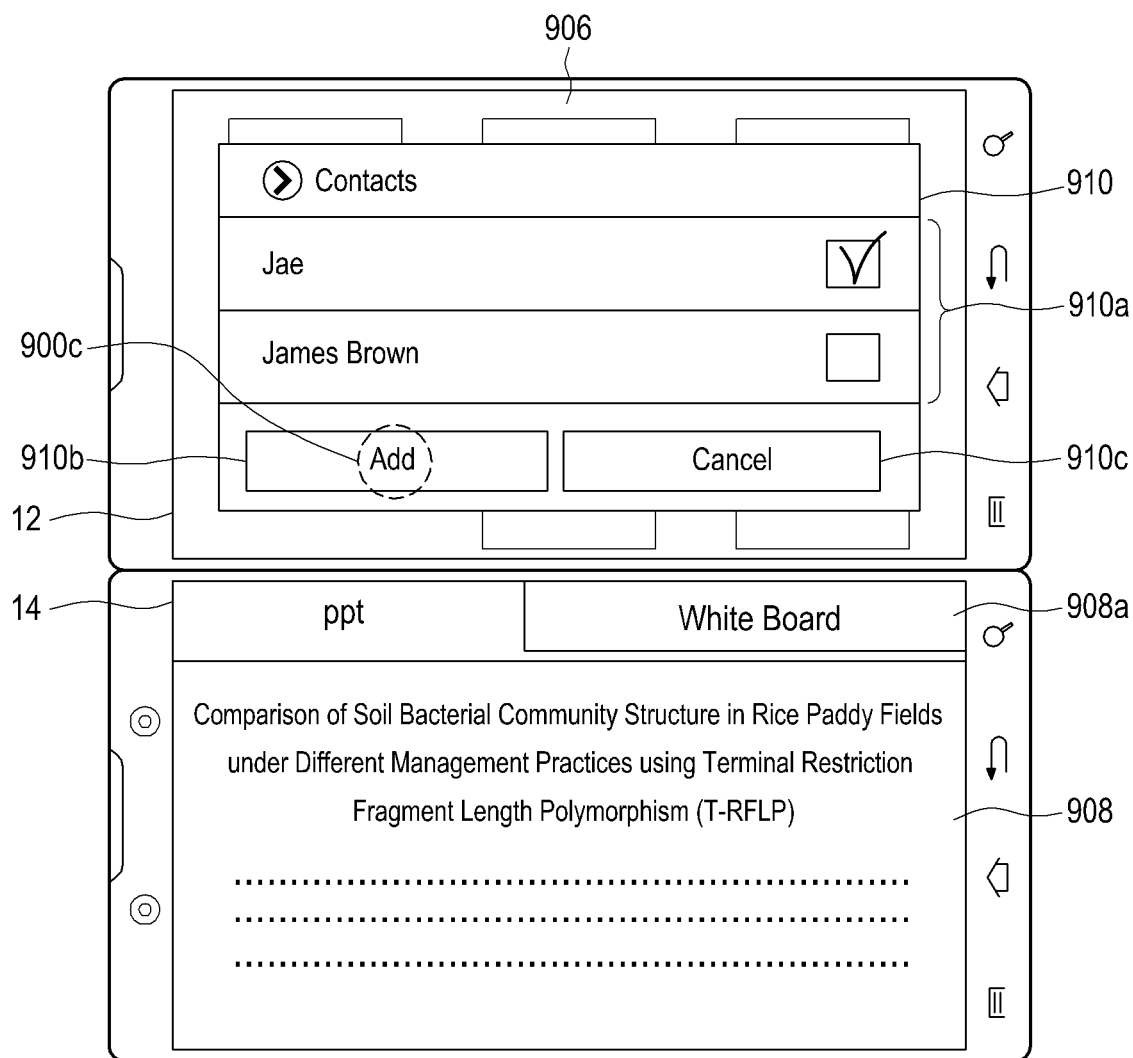

When the portable device detects a predetermined touch gesture 900b, for example, a tap gesture from the participant addition key 906a of the first touch screen 12, the portable device proceeds to FIG. 19C.

Figure 19D:
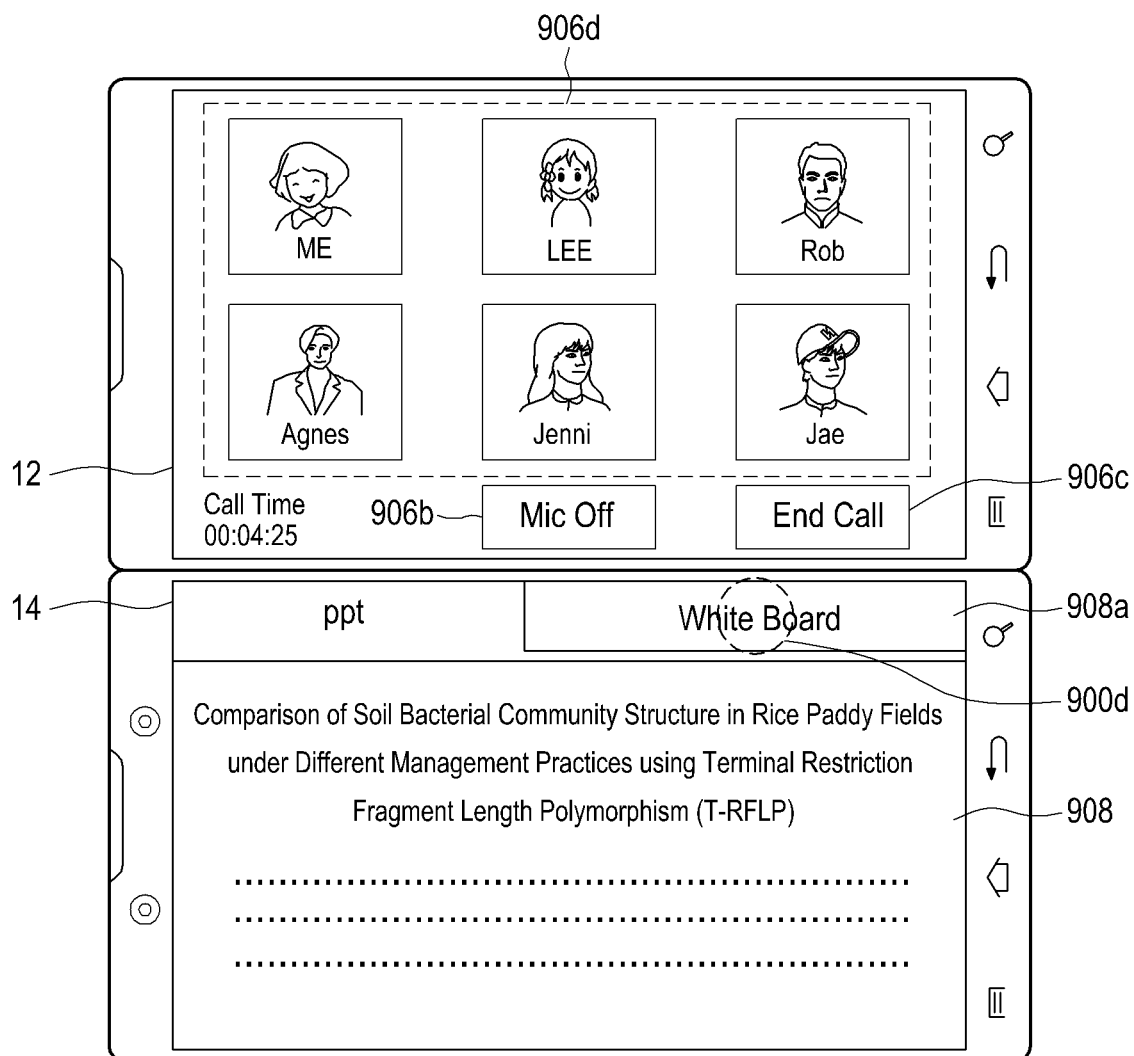

Referring to FIG. 19C, the portable device displays a contact window 910 including person lists in the contact information who can participate in the first video conference in the first touch screen 12 in response to the detection of the touch gesture 900b. The contact information window 910 includes person lists 910a including names of respective people and check boxes, an addition key 910b, and a cancel key 910c. When a check box of at least one person, for example, "Jae" within the person lists 910a is checked and a touch gesture 900c, for example, a tap gesture is detected from the addition key 910, the portable device proceeds to FIG. 19D. Referring to FIG. 19D, the portable device displays a participant list area 906d including a name and a picture image of "Jae" which is the person designated from the contact information window 910 as a new participant in the first touch screen 12 in response to the detection of the touch gesture 900c.

Figure 19E:
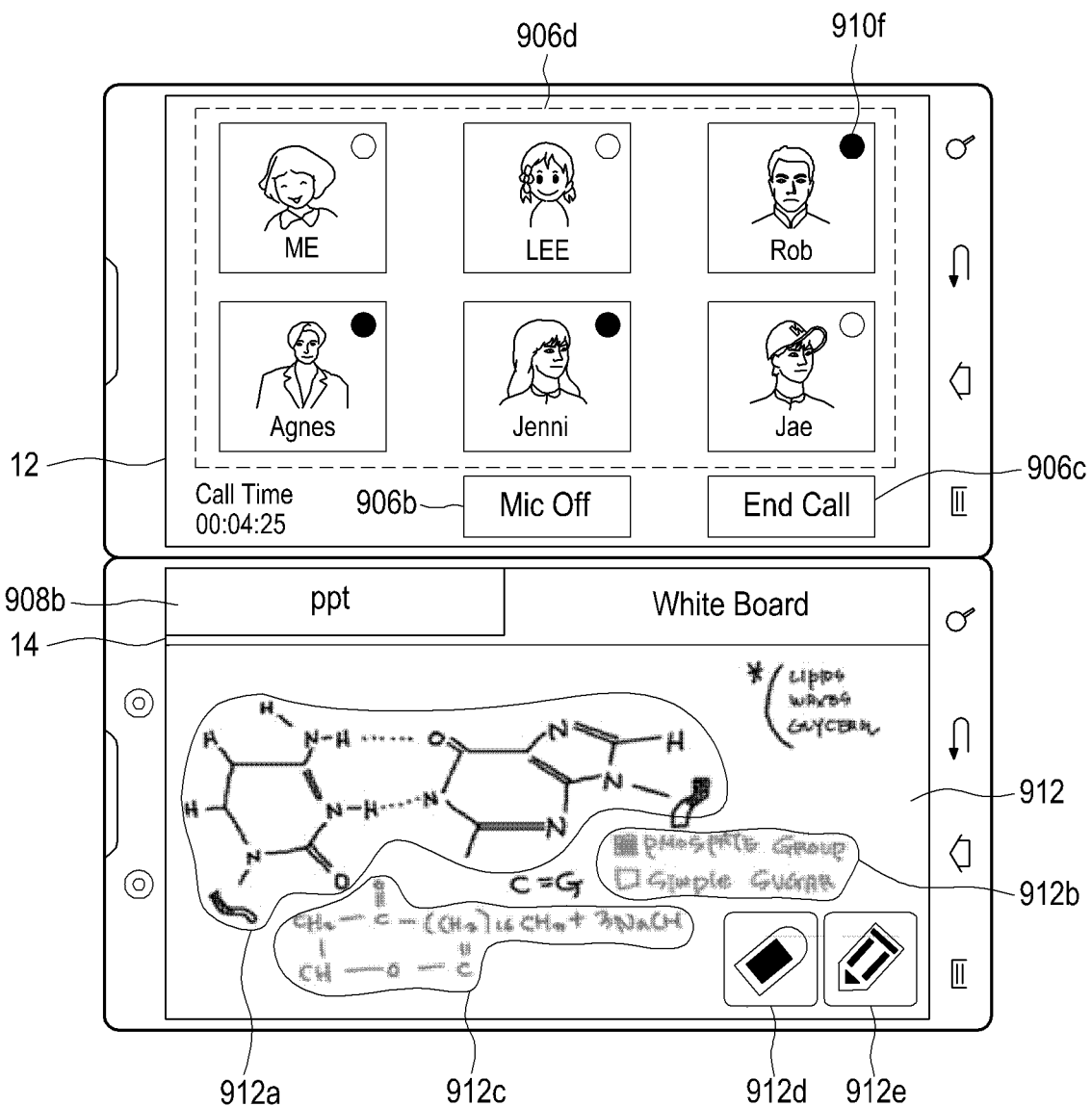

When a predetermined touch gesture 900d, for example, a tap gesture is detected from the white board key 908a displayed in the second touch screen 14, the portable device proceeds to FIG. 19E.

Referring to FIG. 19E, the portable device replaces the document file displayed in the shared board area 908 of the second touch screen 14 with a white board area 912 in response to the detection of the touch gesture 900d and displays the replaced white board area 912. The white board area 912 allows an input of a freehand drawing object by a touch of the user and displays freehand drawing objects 912a, 912b, and 912c input by respective participants of the first video conference including the user. The freehand drawing objects 912a, 912b, and 912c refer to graphic data in a form of a text or image input by the respective participants through the white board areas provided to the respective participants.

It is possible that each the freehand drawing objects 912a, 912b, and 912c has different colors for each participant. During a display of the white board area 912, a color indicator 912f indicating a color of the corresponding freehand drawing object 912a, 912b, or 912c is displayed in each picture image included in the participant list area 906d of the first touch screen 12. The color indicator of the participant who is inputting the freehand drawing object into the white board area 912 is displayed while flickering. In addition, the white board area 912 may include keys 912d and 912e for inputting and erasing the freehand drawing of the user.

During the display of the white board area 912, the second touch screen 14 further displays a document file selection key 908b for displaying a document file in the shared board area. When a tap gesture is detected from the document file selection key 908b, the second touch screen 14 replaces the white board area 912 with the document file and displays the replaced document file.

When the first touch screen 12 and the second touch screen 14 are arranged on at least one foldable or bendable panel, the portable device can support the video conference application in an out-folded screen mode.

Figure 19F:
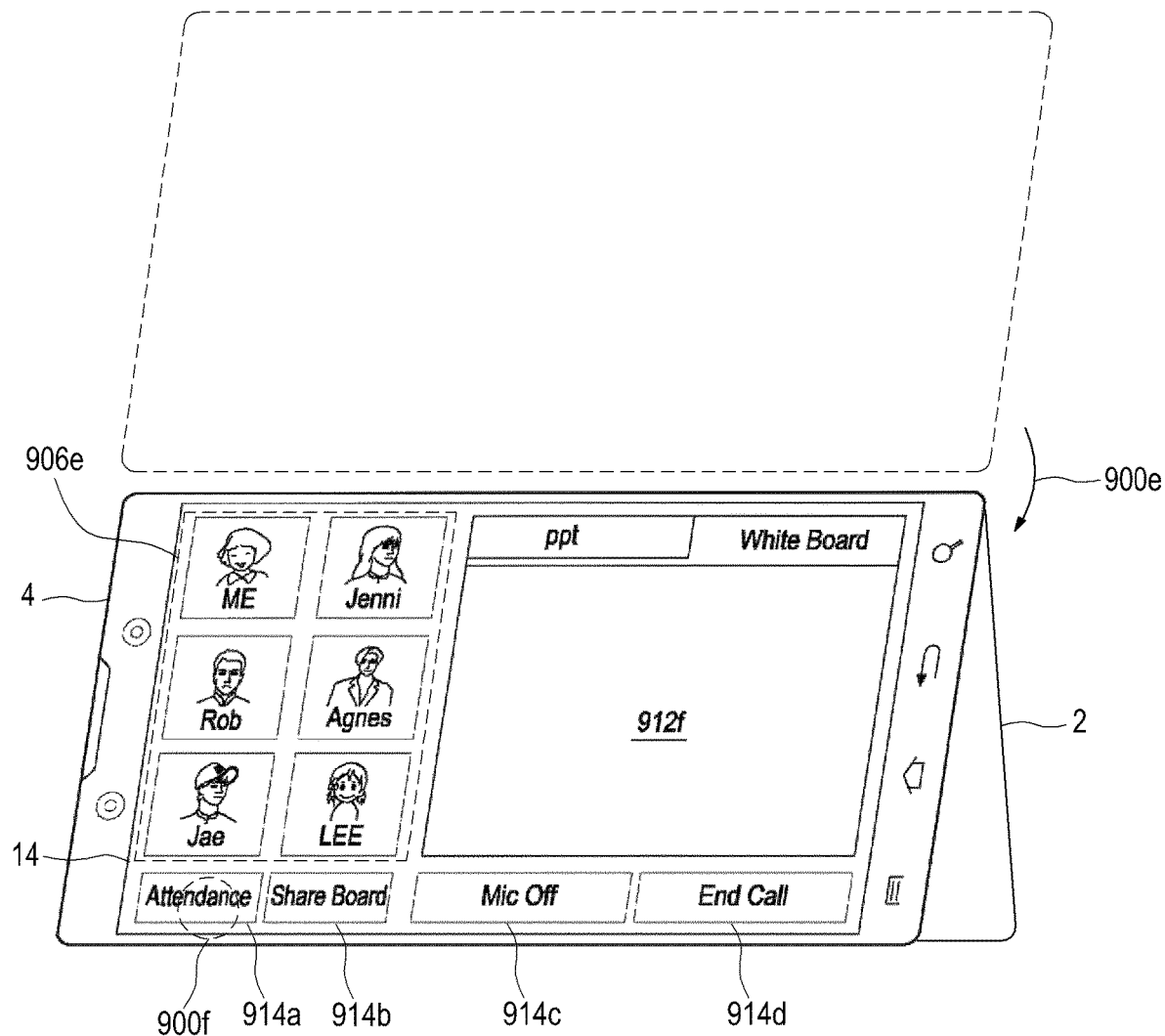

Referring to FIG. 19F, as the first panel 2 including the first touch screen 12 relatively moves with respect to the second panel 4 while the video conference application is displayed in the first and second touch screens 12 and 14, the portable device detects that the relative angle between the first panel 12 and the second panel 14 becomes an angle smaller than 180 degrees and determines that a fold-out command 900e is input. As one example, when the relative angle between the first panel 2 and the second panel 4 becomes an angle within a predetermined range (for example, 30 to 60 degrees) which is smaller than 180 degrees as the first panel 2 rotates based on the hinge between the first panel 2 and the second panel 4, the portable device determines that the fold-out command 900e is input.

The portable device replaces information of the second touch screen 14 with a participant list area 906e and a shared board area 912f in response to the detection of the fold-out command 900e and displays the replaced participant list area 906e and shared board area 912f. At this time, it is possible that the first touch screen 12 which has moved to the back is turned off. The participant list area 906e and the shared board area 912f have smaller sizes of those of the participant list area 906d and the shared board area 912 before the fold-out command 900e. In addition, the second touch screen 14 further displays at least one of a participant list selection key 914a for expansively showing participant lists in the second touch screen 14, a shared board selection key 914b for selecting whether to show the shared board area 912f in the second touch screen 14, a microphone off key 914c, and a call end key 914d. The first touch screen 12 may be turned off in response to the fold-out command 900e or display information such as a clock according to an option which can be designated by the user.

Figure 19G:
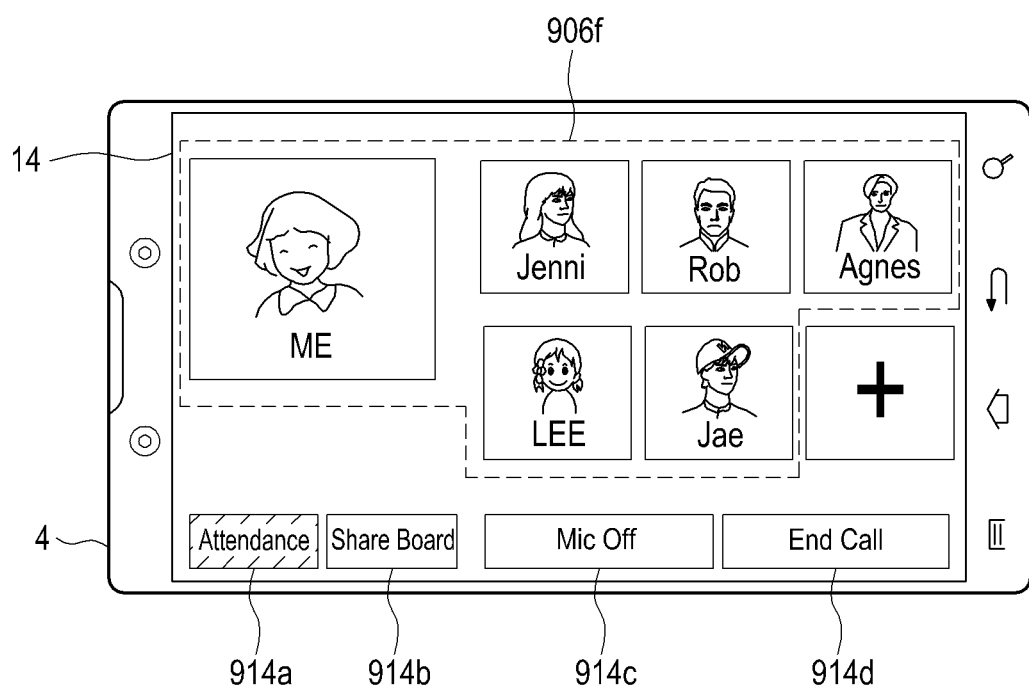

When a tap gesture 900f is detected from the participant list selection key 914a, the portable device proceeds to FIG. 19G.

Referring to FIG. 19G, the portable device expands the participant list area 906f in response to the detection of the touch gesture 900f and displays the expanded participant list area in the second touch screen 14. The participant list area 906f includes picture images having a larger size than that of the participant list area 906e of FIG. 19F. In addition, the second touch screen 14 further displays at least one of the participant list selection key 914a, the shared board selection key 914b, the microphone off key 914c, and the call end key 914d.

Although not illustrated, when a tap gesture is detected from the shared board selection key 914b, the portable device displays the shared board area including the document file of the white board area in the second touch screen 14 and displays simple participant lists together with the shared board area, for example, lists of only names without picture images or lists of smaller picture images and names.

The portable device can support an application requiring an interaction between two or more users, for example, a collaborative game application through the display device including the first touch screen and the second touch screen arranged on one foldable panel. The collaborative game application may be useful for an out-folded screen mode in which two touch screens are almost folded outwardly to face almost opposite directions. That is, the folded-out portable device is stood in a triangle shape, a front touch screen is used as a main touch screen for providing a user interface for a holder of the portable device, and a back touch screen is used as a sub touch screen shown to another user. That is, the back touch screen provides information to a holder of another portable device who executes the linked collaborative game application.

FIGS. 20A to 20H illustrate user interfaces of the collaborative game application according to one or more exemplary embodiments. Here, a touch screen layout in a case where the portable device rotates by 90 degrees in a left direction is illustrated, wherein the first touch screen 12 located in a lower part before the fold-out becomes the main touch screen which provides a user interface for a user having the portable device, that is, the front touch screen, and the second touch screen 14 located in an upper part becomes the sub touch screen shown to other users, that is, the back touch screen. The above case also can be applied when the portable device rotates by 90 degrees in a right direction.

Figure 20A:
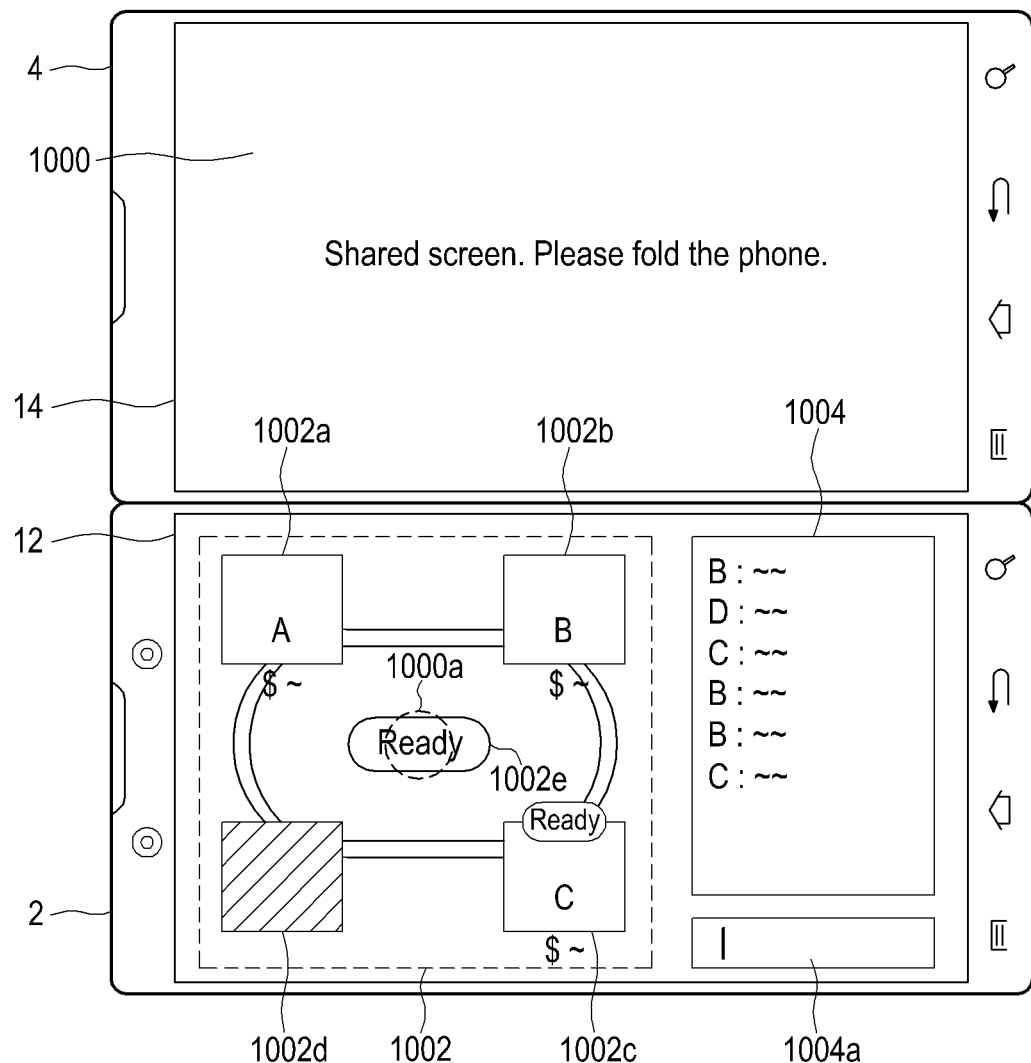
FIGS. 20A to 20H are a diagrams illustrating a user interface of a collaborative game application according to one or more exemplary embodiments.

Referring to FIG. 20A, the first touch screen 12 displays a game ready screen 1002 provided by the collaborative game application, and the second touch screen 14 displays a guide phrase 1000 of making a request for turning off or folding-out the second touch screen 14. As one embodiment, when the collaborative game application supporting the out-folded screen mode is executed in the portable device, the collaborative game application identifies whether the panels 2 and 4 including the first and second touch screens 12 and 14 are folded-out. When it is detected that the panels 2 and 4 are not folded-out, the collaborative game application displays the guide phrase 1000 making a request for folding-out the second touch screen 14, for example, "Please fold the phone".

The game ready screen 1002 displayed in the first touch screen 12 includes participant identification areas 1002a, 1002b, 1002c, and 1002d for participants of the game including the user having the portable device and a ready key 1002e for selecting a game ready completion. Each of the participant identification areas 1002a, 1002b, 1002c, and 1002d includes a picture image, a name (or nickname), or carried money of each participant. In one embodiment, the collaborative game application is a poker game application, and the game ready screen 1002 has a form embodied as a physical table on which the poker game is performed. Further, the first touch screen 12 may further display a chatting area 1004 including a chatting input window 1004a for the participants and potential participants. When a tap gesture is detected from the chatting input window 1004a, the second touch screen 14 displays a virtual keypad in a predetermined area, for example, some of lower parts of the chatting area 1004 or second touch screen 14.

Figure 20B:
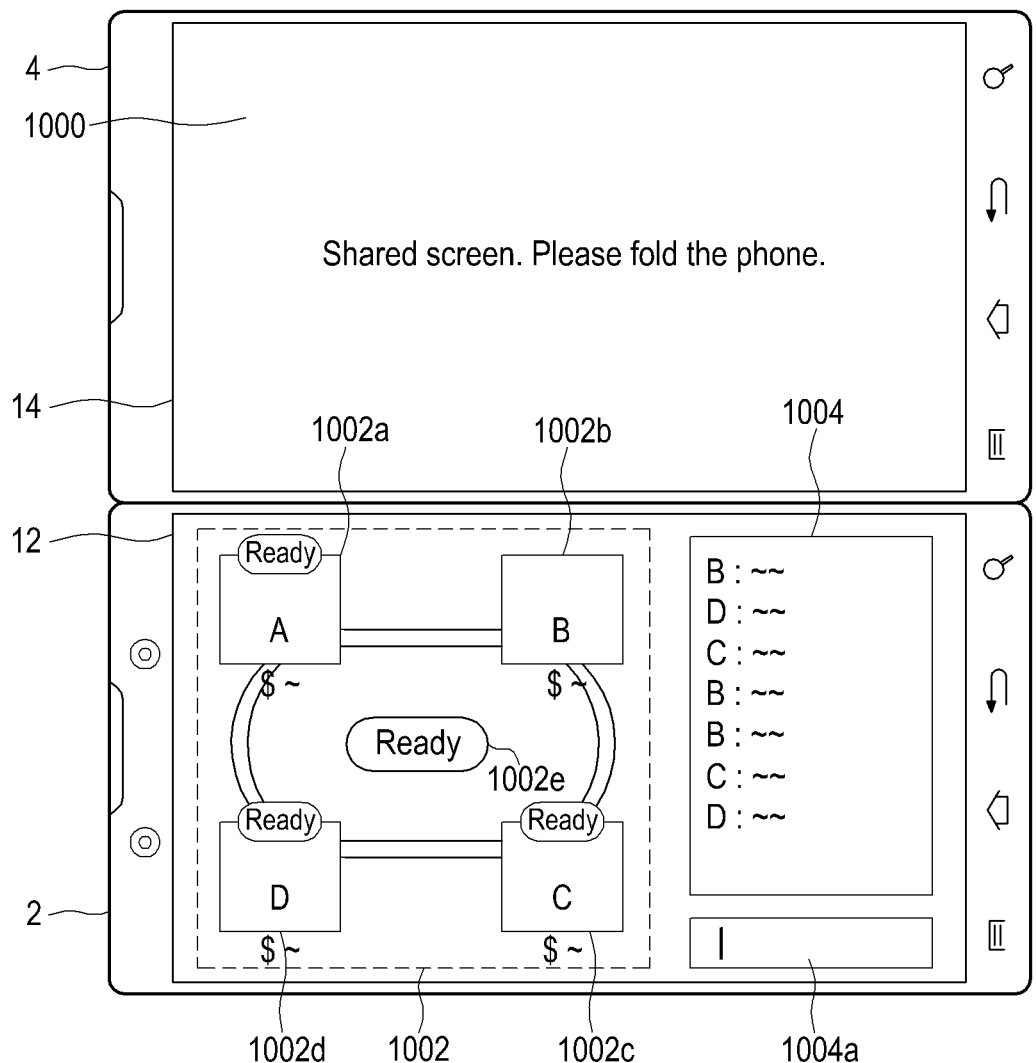

When a predetermined touch gesture 1000a, for example, a tap gesture is detected from the ready key 1002e of the first touch screen 12, the portable device proceeds to FIG. 20B.

Referring to FIG. 20B, the portable device determines that the user becomes in a "Ready" state in response to the detection of the tap gesture 1000a, displays a state indicator of "Ready" in the participant identification area 1002a, and informs a portable device of another participant who is participating in the game that the user becomes in the "Ready" state by using a predetermined communication means. That is, the portable devices of all participants are mutually interworked by executing the poker game application, inform other participants of information generated from the poker game application of each participant, receive the information generated from the poker game application of another participant, and display the received information. When all the participants become in the "Ready" state, the portable device proceeds to FIG. 20C to start one round of the poker game.

Figure 20C:
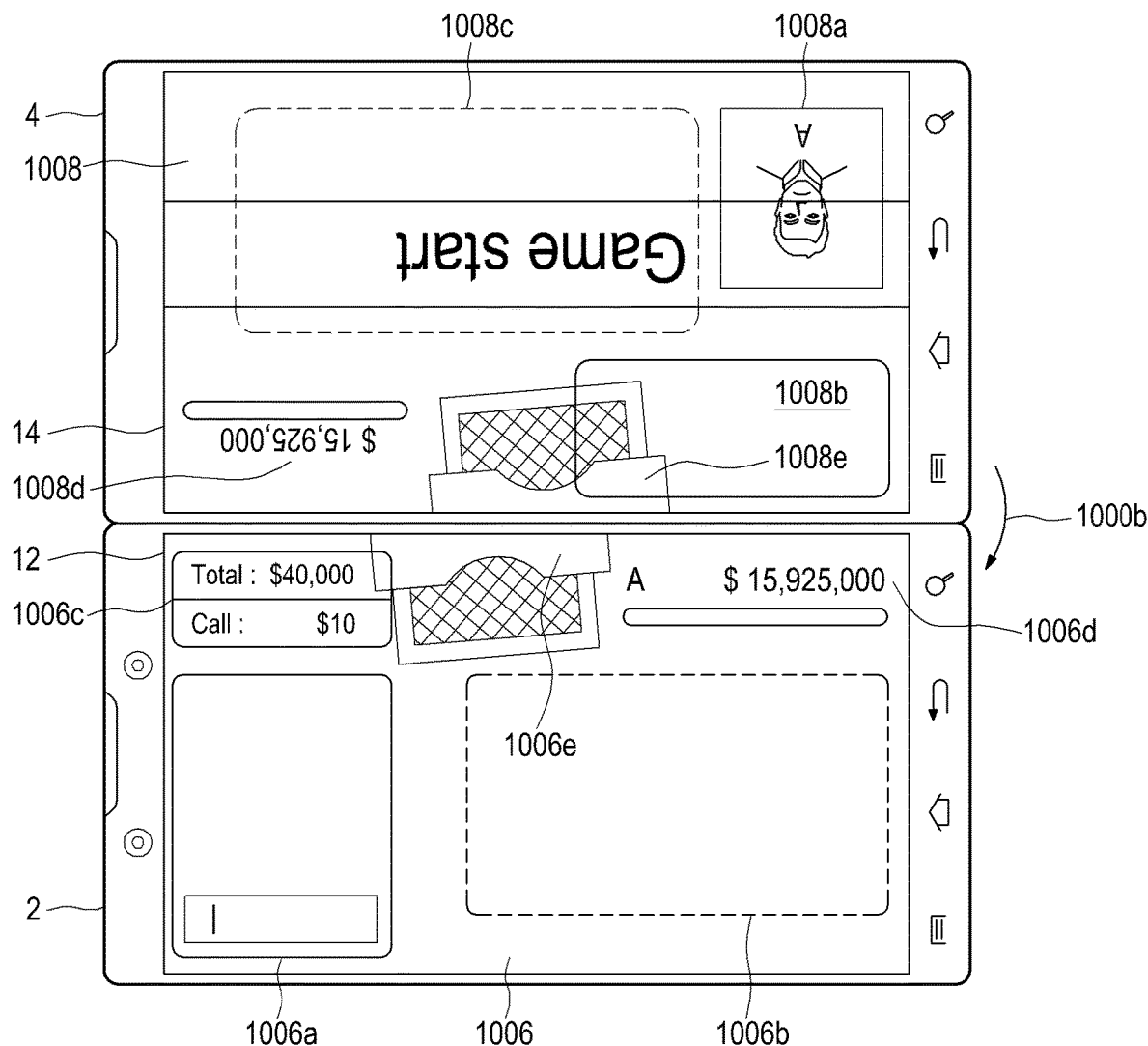

As illustrated in FIG. 20C, when one round of the poker game starts, the portable device displays a game interface screen 1006 for the user of the portable device in the first touch screen 12. As one example, the game interface screen 1006 of the first touch screen 12 includes a chatting area 1006a receiving an input of a chatting message of the user and displaying chatting messages of other participants, a carried card area 1006b showing playing cards given to the user, a betting money area 1006c displaying money bet in the poker game of the current round, a carried money area 1006d displaying carried money of the user, and a card slot area 1006e displaying a card pool including closed cards which have not been provided to the participants.

Further, when one round of the poker game starts, the portable device displays game information 1008 for other participants in the second touch screen 14. As one example, the game information 1008 for other participants displayed in the second touch screen 14 includes an identification area 1008a of the user, a betting display area 1008b displaying a betting item selected by the user, an open card area 1008c displaying cards selected to be shown to other users by the user, a carried money area 1008d displaying carried money of the user, and a card slot area 1008e displaying a card pool including closed cards which have not been provided to the participants.

As a selectable embodiment, when the portable device detects that the panels including the first and second touch screens 12 and 14 are folded outwardly (folded-out) while displaying the guide phrase 1002a making a request for folding-out the second touch screen 14 by the poker game application, the portable device displays the game information 1008 for other participants in the second touch screen 14. That is, the guide phrase 1002a may be displayed in the second touch screen 14 until the fold-out is generated, and the game information 1008 may be displayed after the folding-out.

As another selectable embodiment, the poker game application activates the ready key 1002e only in a state where the panels of the portable device are folded-out. That is, the poker game application can start the poker game only in a fold-out state, and continuously displays the guide phrase 1002a in the second touch screen 14 until the second touch screen 14 is folded-out.

Figure 20D:
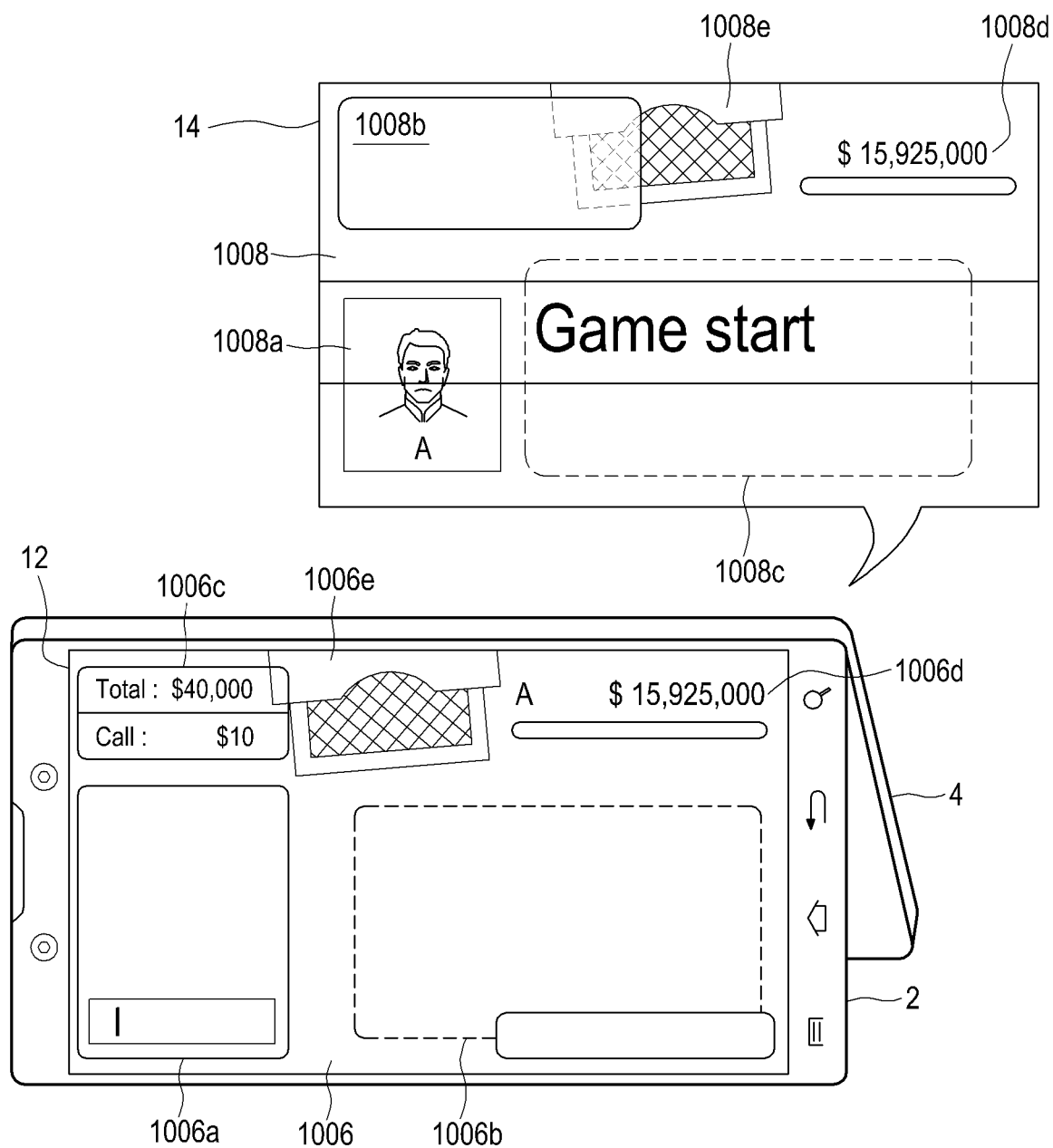
Figure 20E:
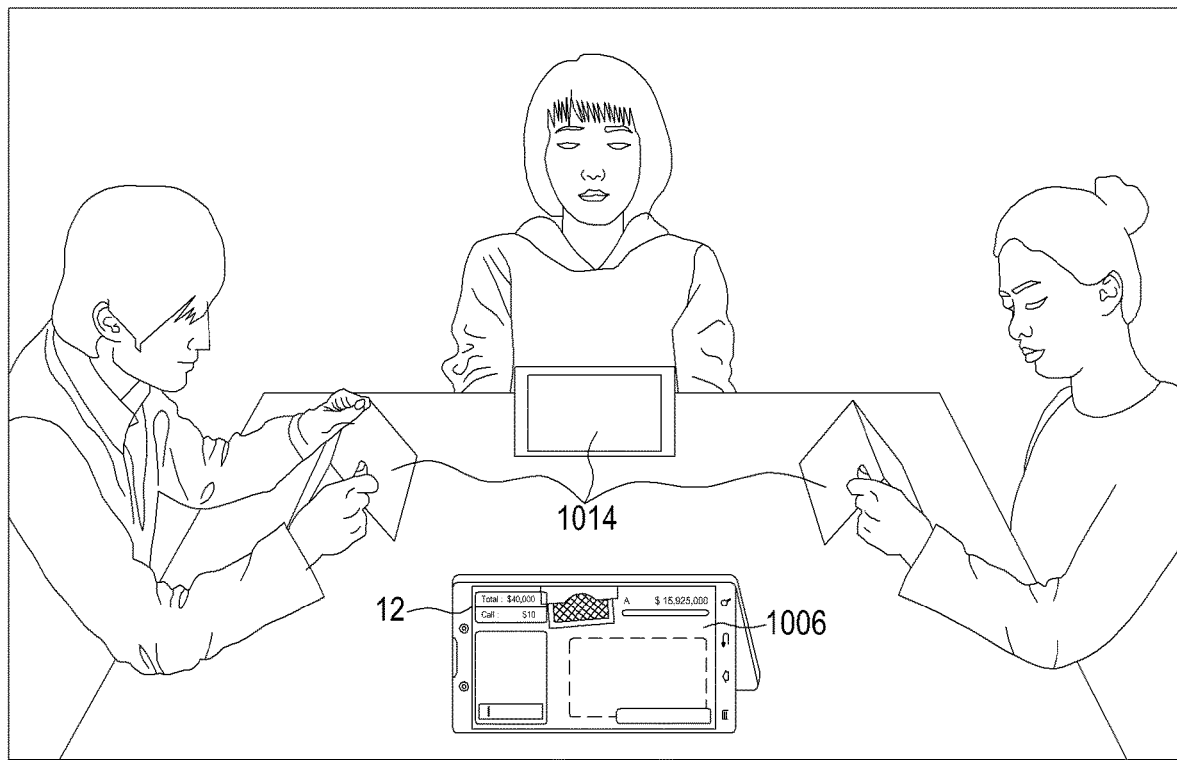

FIG. 20D is a perspective view of the portable device having folded-out panels. As illustrated in FIG. 20D, the portable device is stood in a triangle shape which is supported by two folded-out panels, wherein the game interface screen 1006 for the user having the portable device is displayed in the first touch screen 12 located in the front side and the game information 1008 for other participants is displayed in the second touch screen 14 located in the back side. Here, other participants refer to other users who execute the poker game application and have respective portable devices interworking with the portable device of the user. FIG. 20E illustrates portable devices of participants which interwork with each other through the poker game application. As illustrated in FIG. 20E, the portable device of the user displays the game interface screen 1006 for the user through the first touch screen 12. The portable devices for other participants also display game information for the corresponding participants through the front touch screen shown to the respective participants and displays game information 1014 for other participants through the opposite touch screen.

Figure 20F:
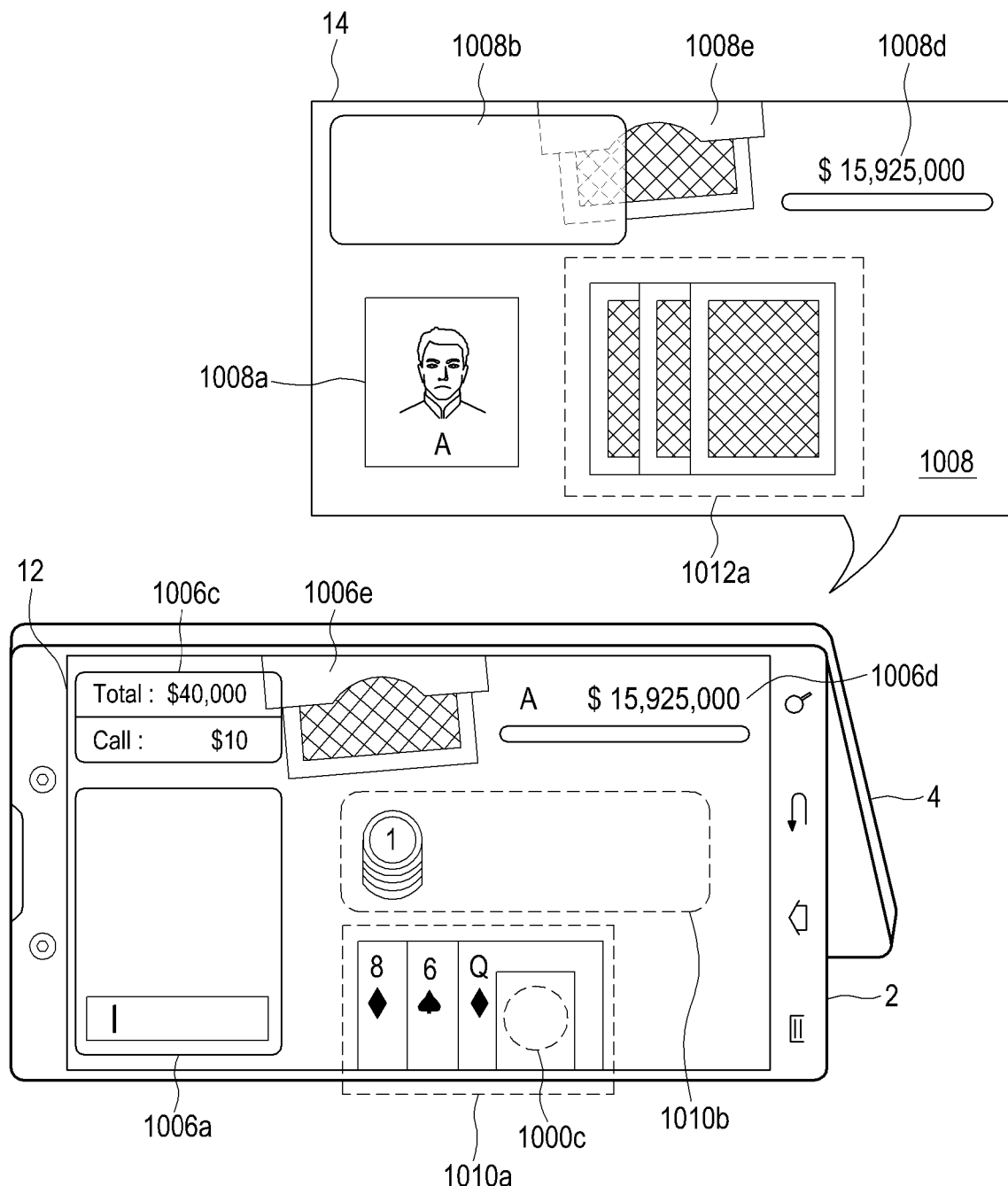

Referring to FIG. 20F, after one round of the poker game starts, the portable device sequentially withdraws the predetermined number of cards from the card slot area 1006e of the first touch screen 12 in a first turn of the user and arranges to expose front surfaces of the cards in a carried card area 1010a. Simultaneously, the portable device sequentially withdraws the same number of cards from the card slot area 1008e of the second touch screen 14 and arranges to expose back surfaces of the cards in an open card area 1012a. In addition, the first touch screen 12 can display stacked coins corresponding to currently bet money in an area 1010b. When a predetermined touch gesture 1000c, for example, a tap gesture or a flick up is detected from at least one of the cards arranged in the carried card area 1010a, the portable device proceeds to FIG. 20G.

Figure 20G:
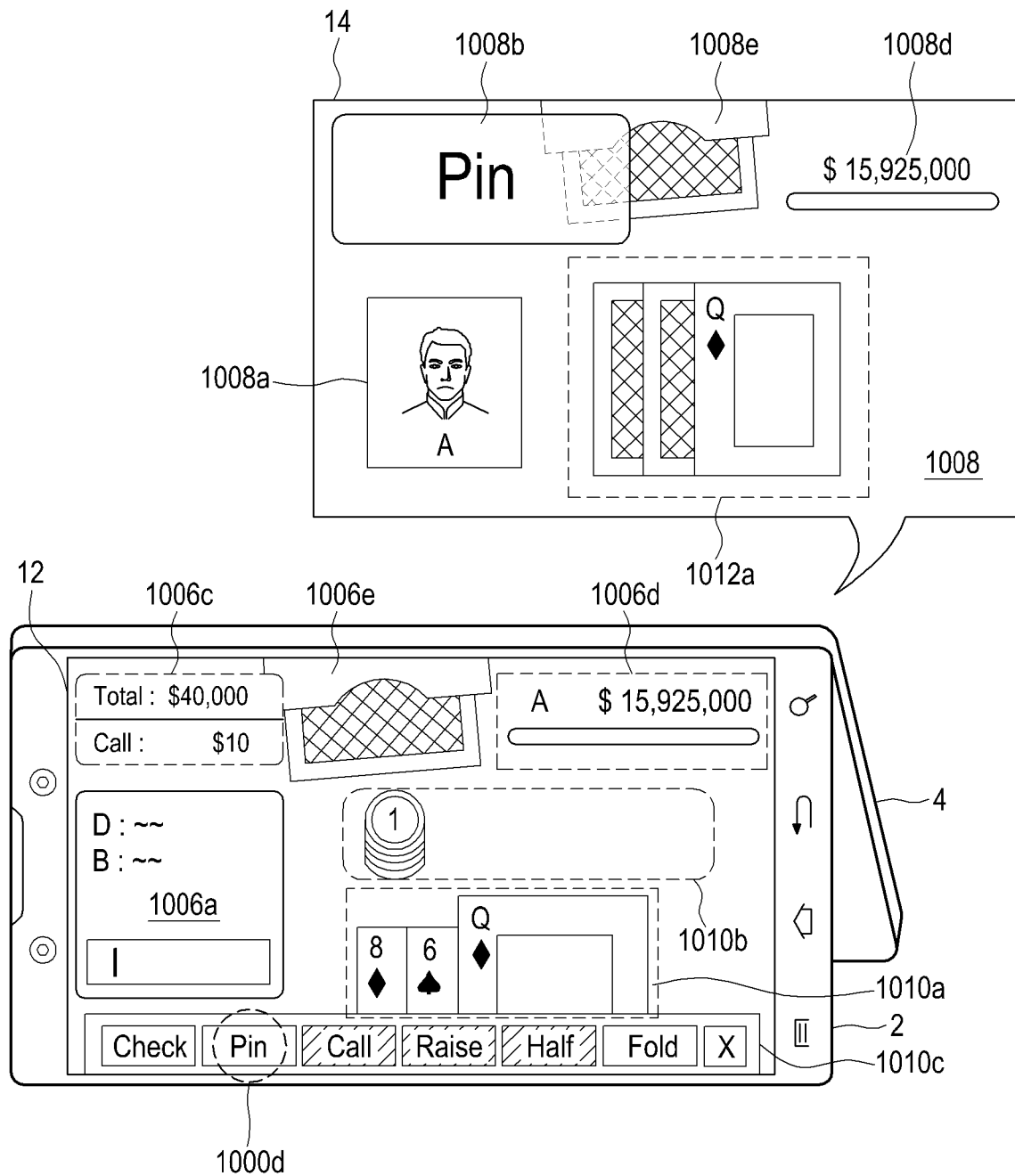

Referring to FIG. 20G, the portable device slightly moves the card selected by the touch gesture 1000c among the cards of which the front surfaces are exposed in the carried card area 1010a of the first touch screen 12 and simultaneously turns face-up and displays, that is, opens a card in a position corresponding to the selected card among the cards located in the open card area 1012a of the second touch screen 14. When open cards are selected by all the participants, the portable device displays a betting command window 1010c through which betting items can be input into the first touch screen 12 when an order determined according to a rule of the poker is reached. The betting command window 1010c includes at least one of the betting items for the poker game, that is, "Check", "Pin", "Call", "Raise", "Half", and "Fold". At this time, the betting item which cannot be selected in the current order can be displayed in a deactivated state, that is, in a shadow.

When a predetermined touch gesture 1000d, for example, a tap gesture is detected from one of the betting items of the betting command window 1010c displayed in the first touch screen 12, for example, "Pin", the portable device updates the game interface screen 1006 according to the betting item selected by the tap gesture 1000d, displays the selected betting item of "Pin" in the betting display area 1008b of the second touch screen 14, and informs the portable devices of other participants of the selected betting item at the same time. When the betting of all the participants is completed, the portable device withdraws a new card from the card slot area 1006e of the first touch screen 12, displays to expose the front surface of the card in the card slot area 1006e, withdraws a new card from the card slot area 1008e of the second touch screen 12, and displays to expose the front surface of the card in the open card area 1012a at the same time, and then displays a betting command window 1010c in the first touch screen 12 when an order determined according to a rule of the poker game is reached similarly to FIG. 20F.

Figure 20H:
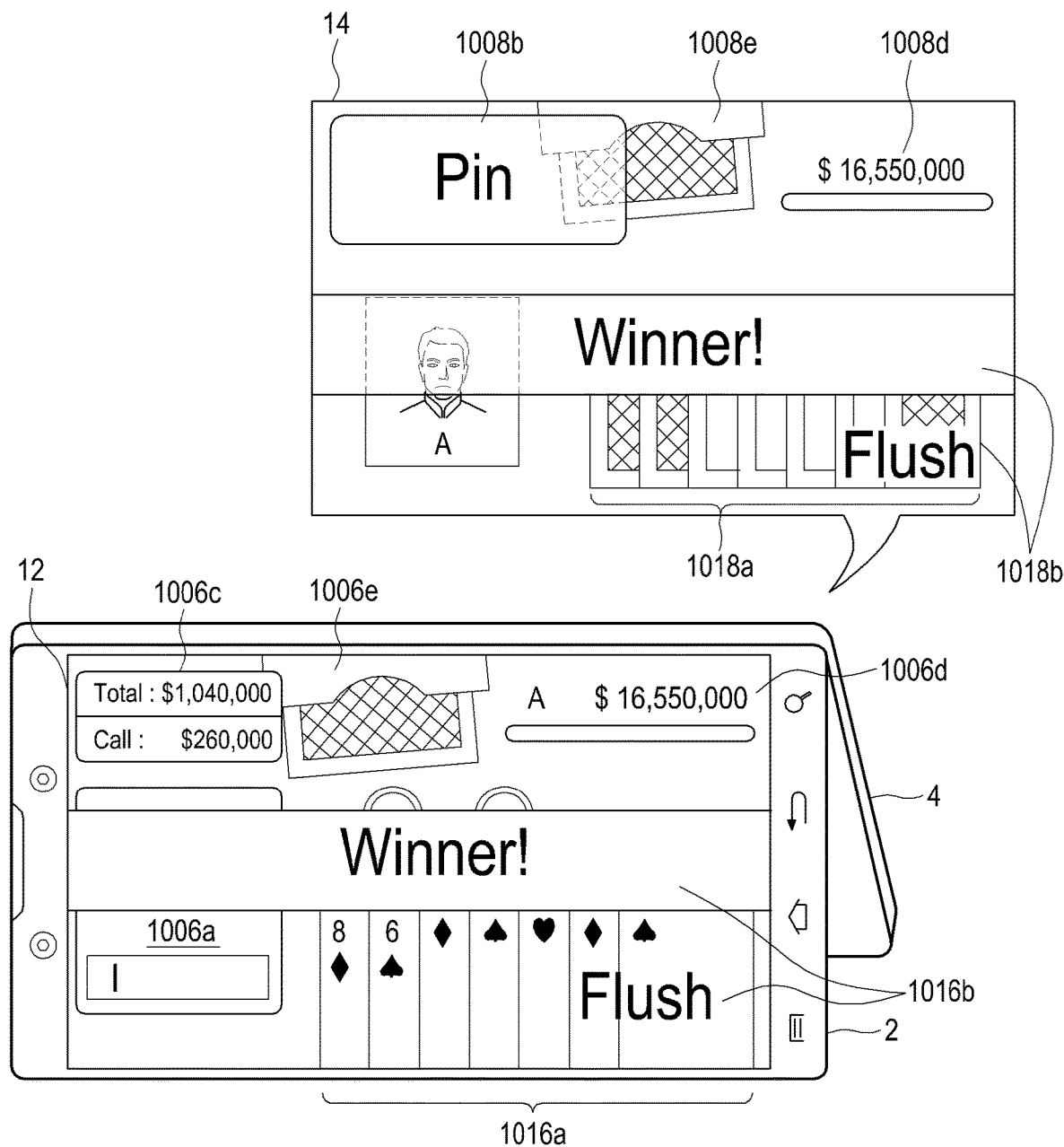

FIG. 20H illustrates screens when one round of the poker game ends. When one round of the poker game ends, the first touch screen 12 displays open states 1016a of all cards of the user and a game result 1016b, for example, "Flush" and "Winner" and the second touch screen 14 displays open states 1018a of at least some of the cards given to the user and a game result 1018b at the same time.

The portable device can provide a more convenient user interface for a schedule management application through the display device including the first touch screen and the second touch screen arranged on one foldable panel. An example of the application for the schedule management may include a calendar application.

Figure 21A:
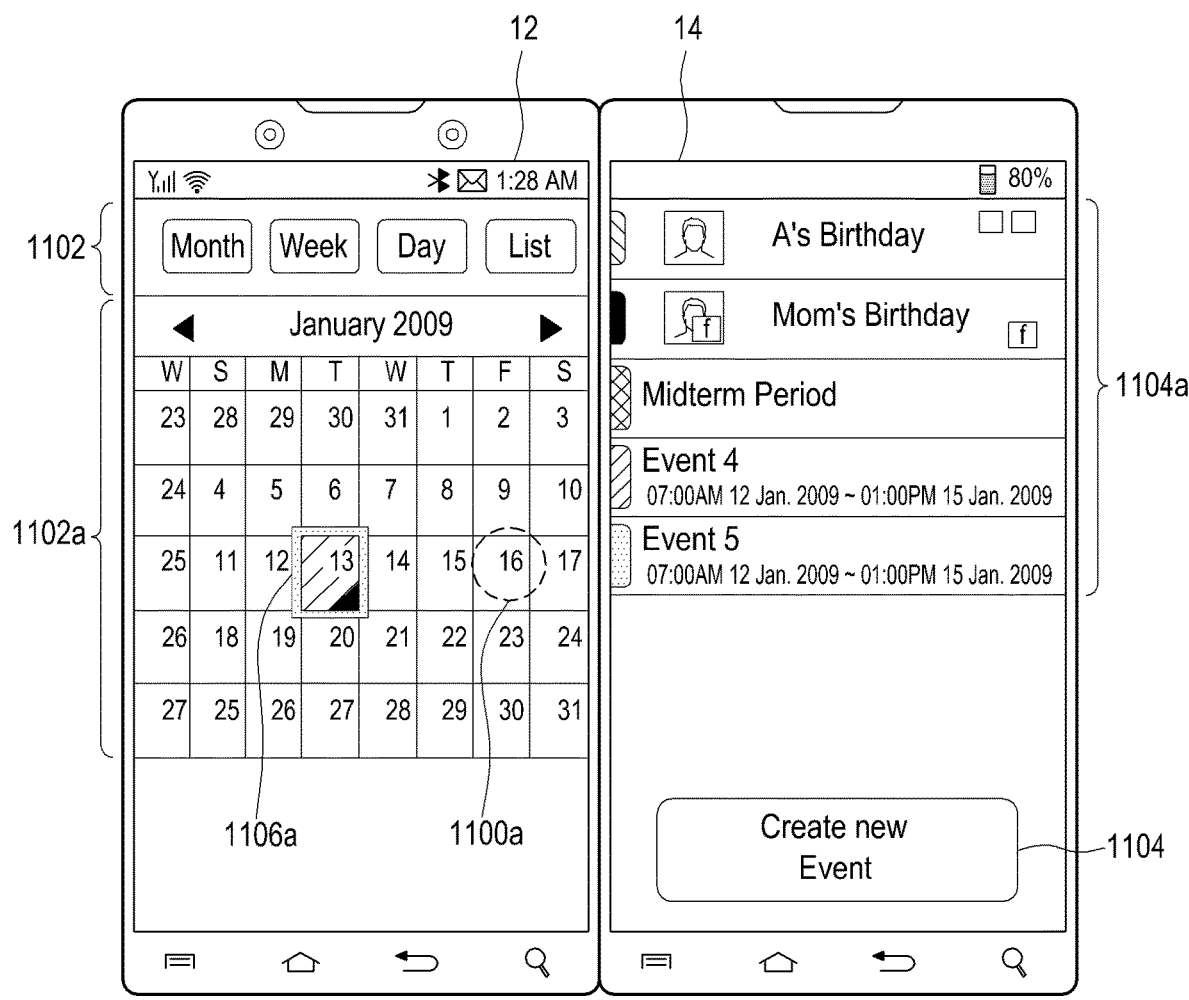
FIGS. 21A to 21O are diagrams illustrating a user interface of a schedule management application according to one or more exemplary embodiments.
Figure 21B:
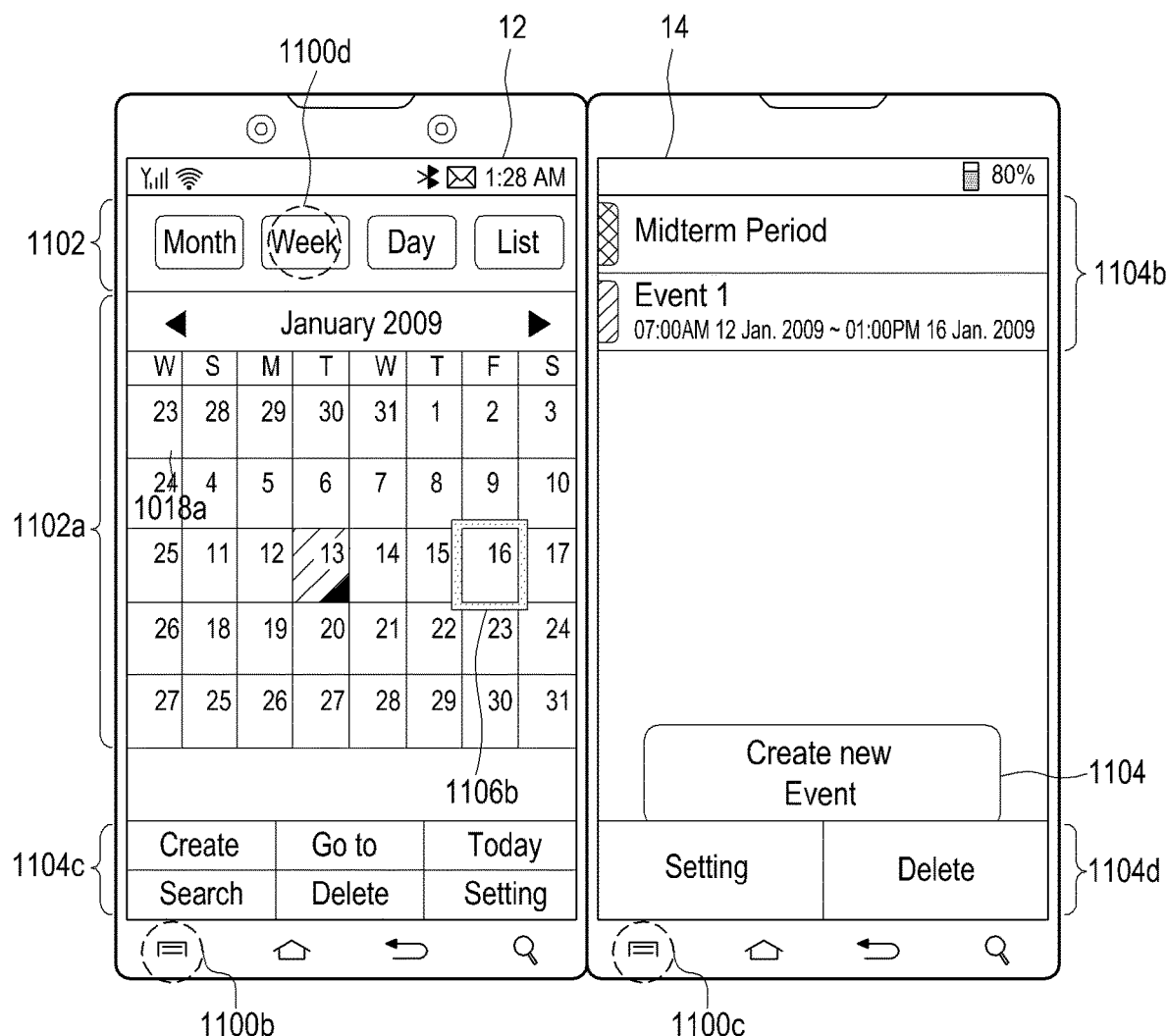
Figure 21C:
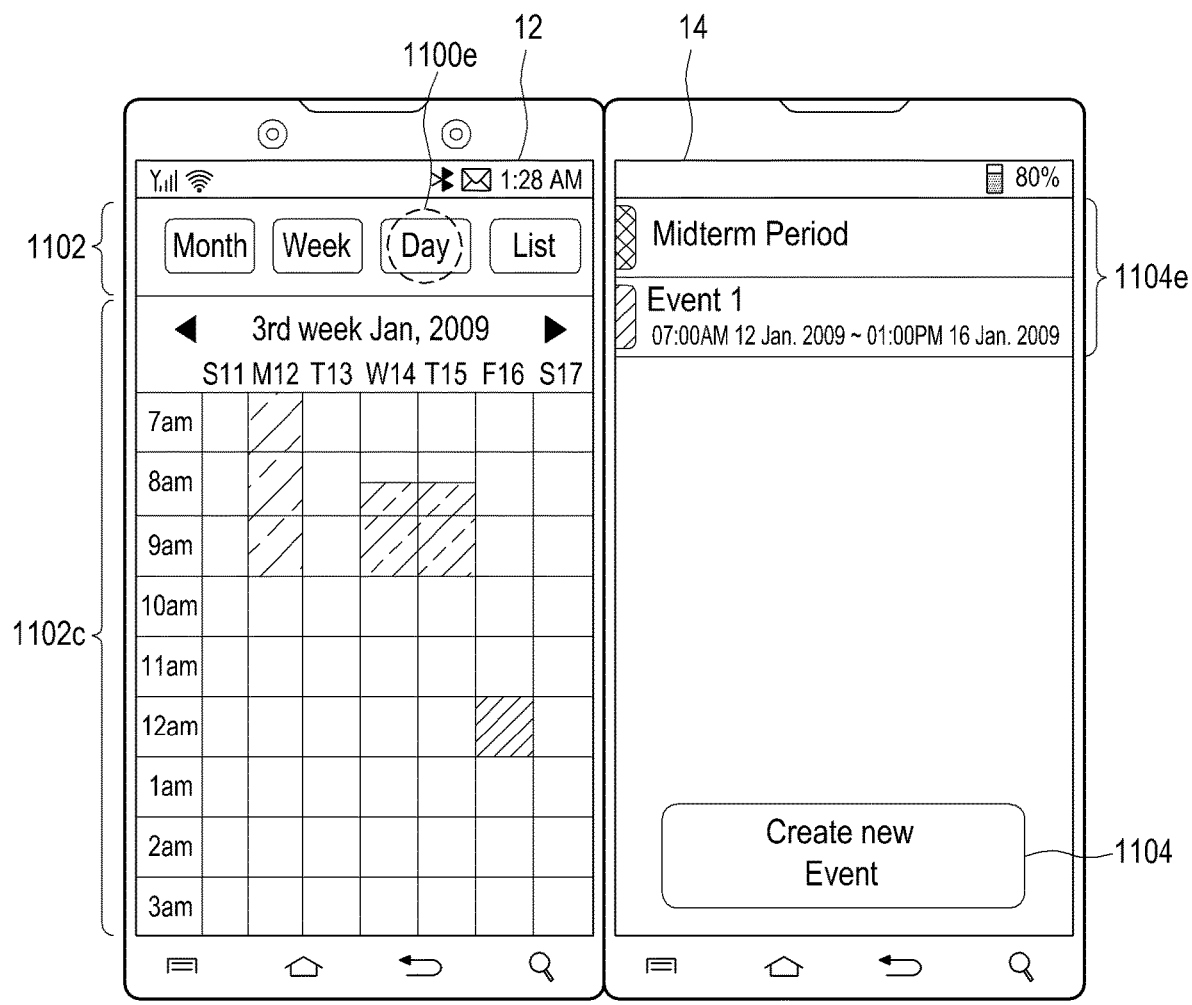
Figure 21D:
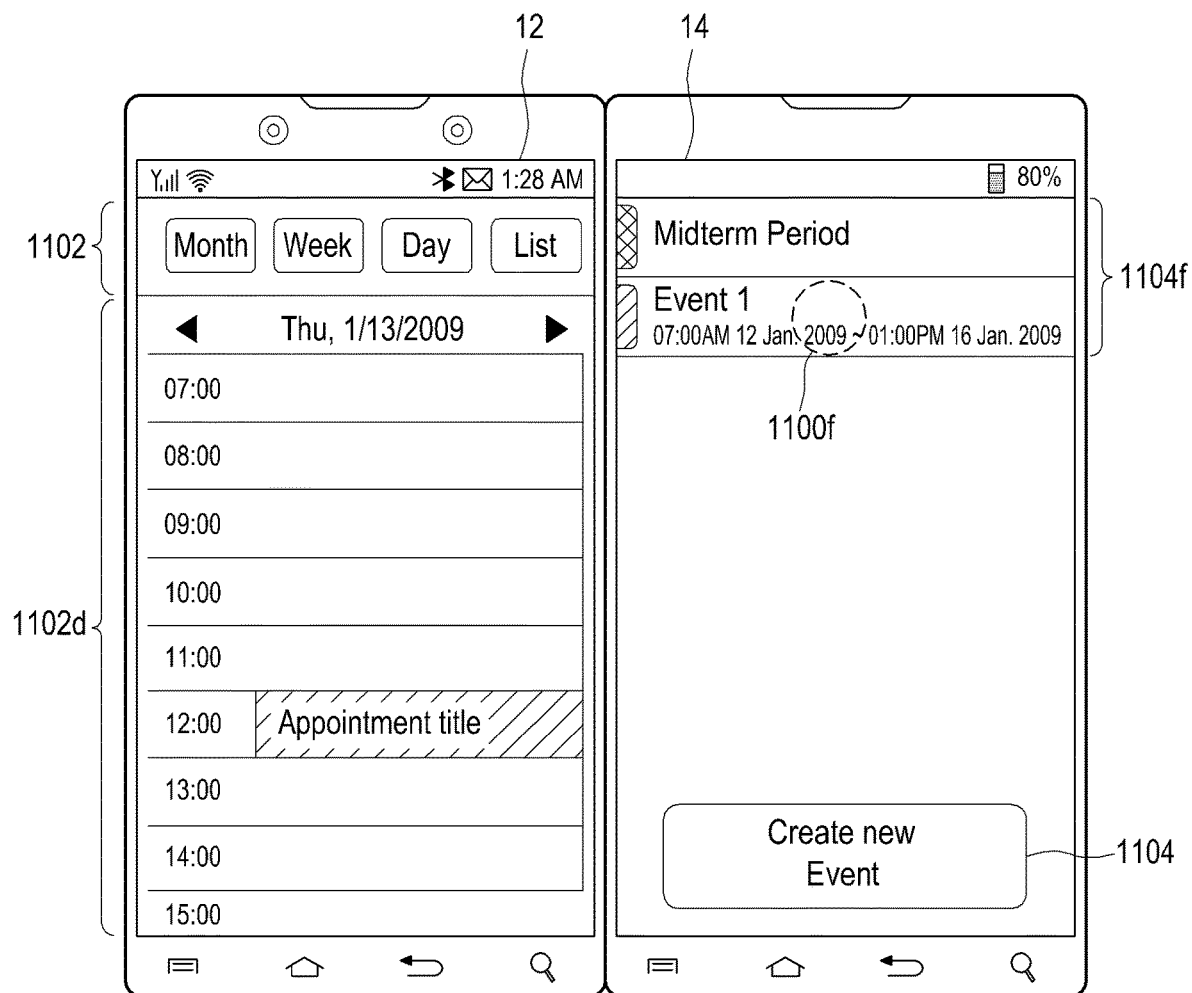
Figure 21E:
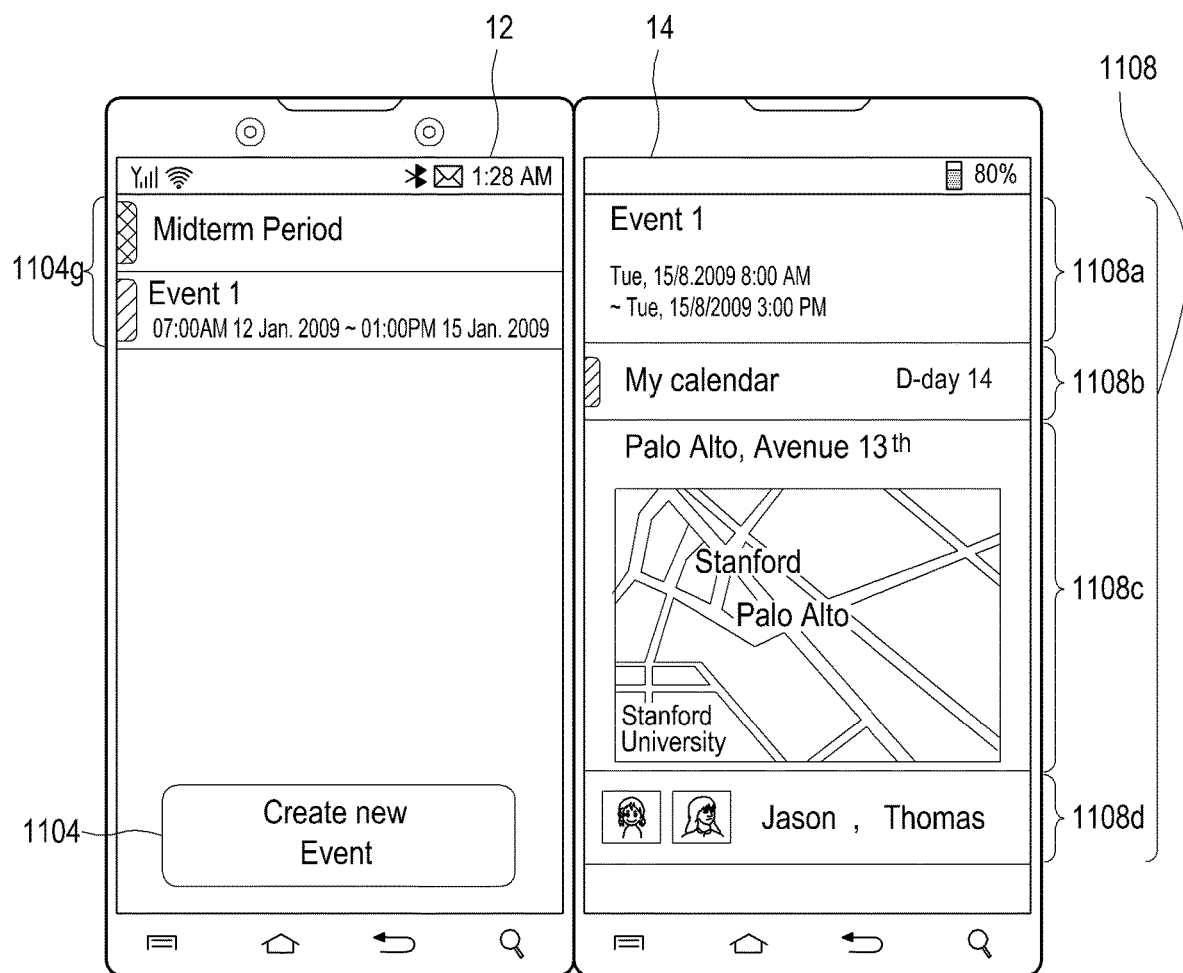
Figure 21F:
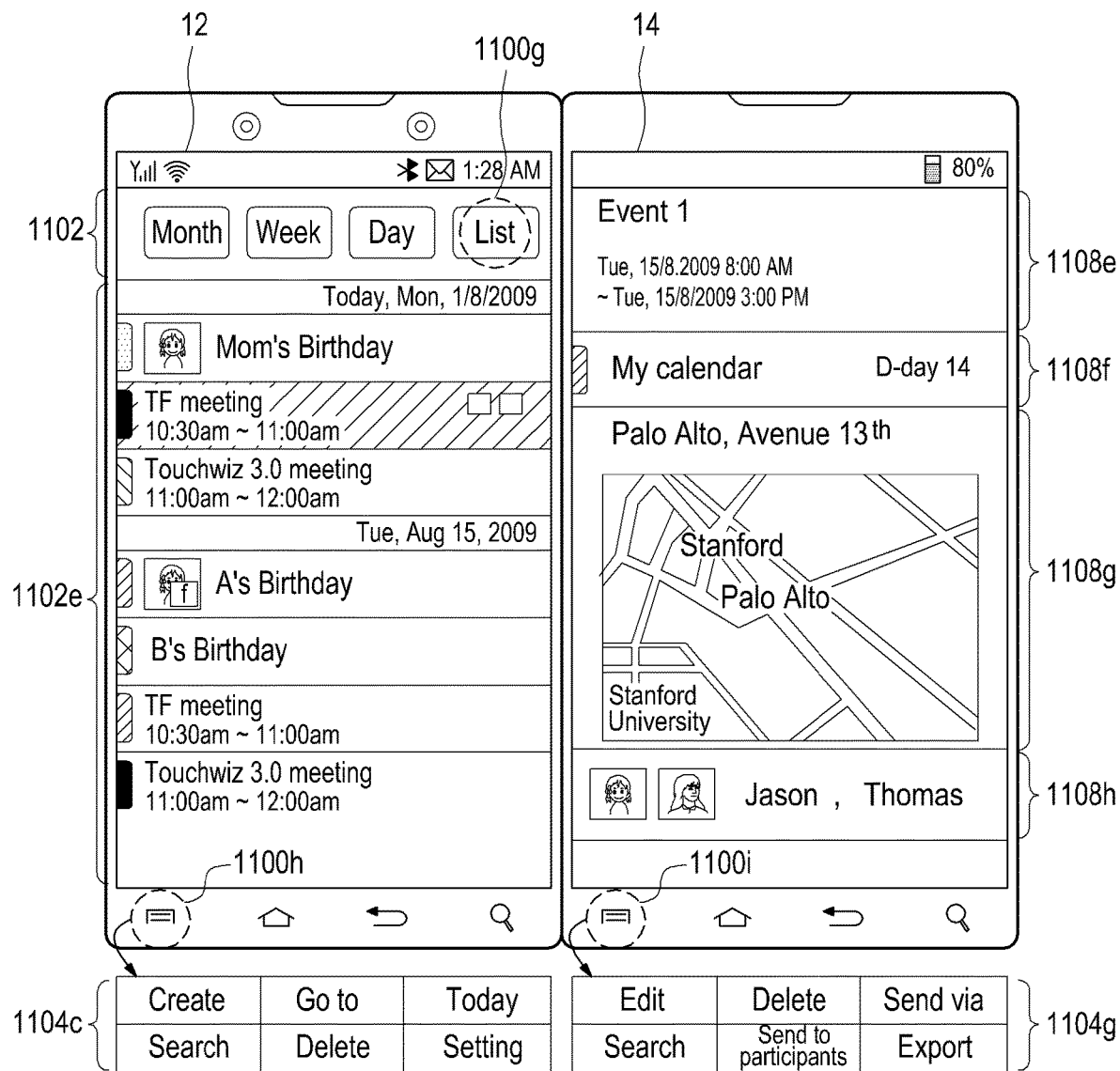
Figure 21G:
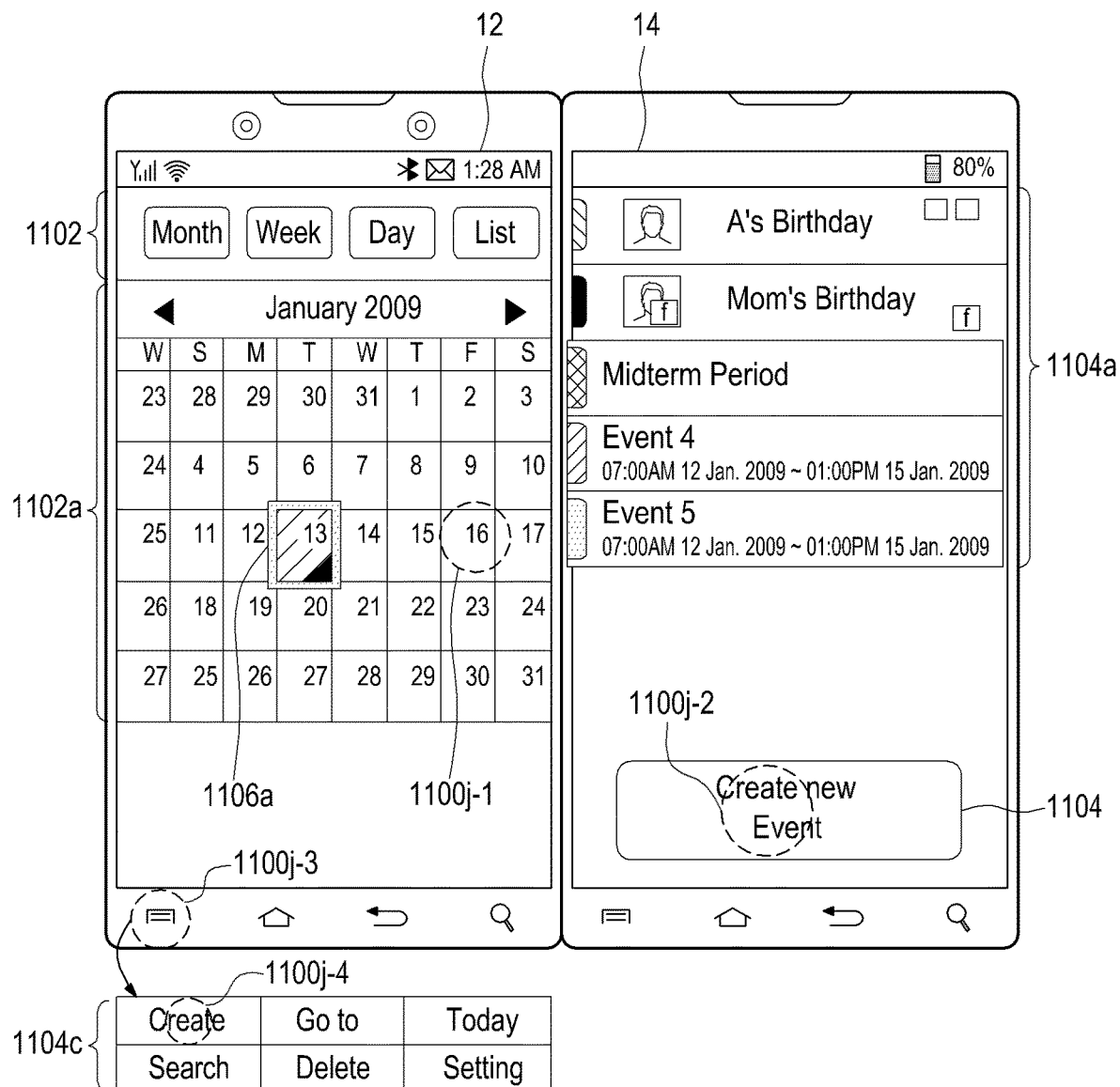
Figure 21H:
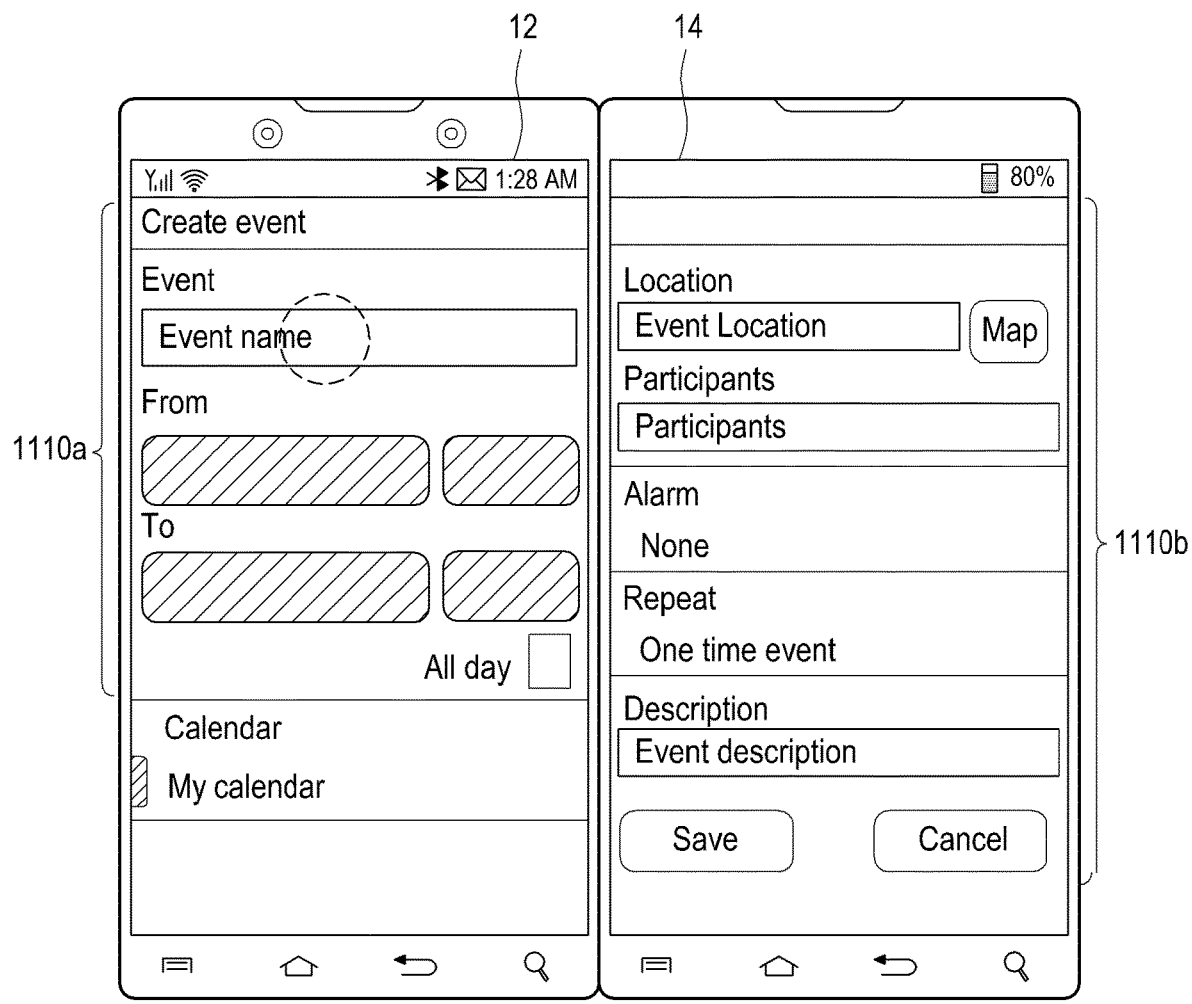
Figure 21I:
Figure 21J:
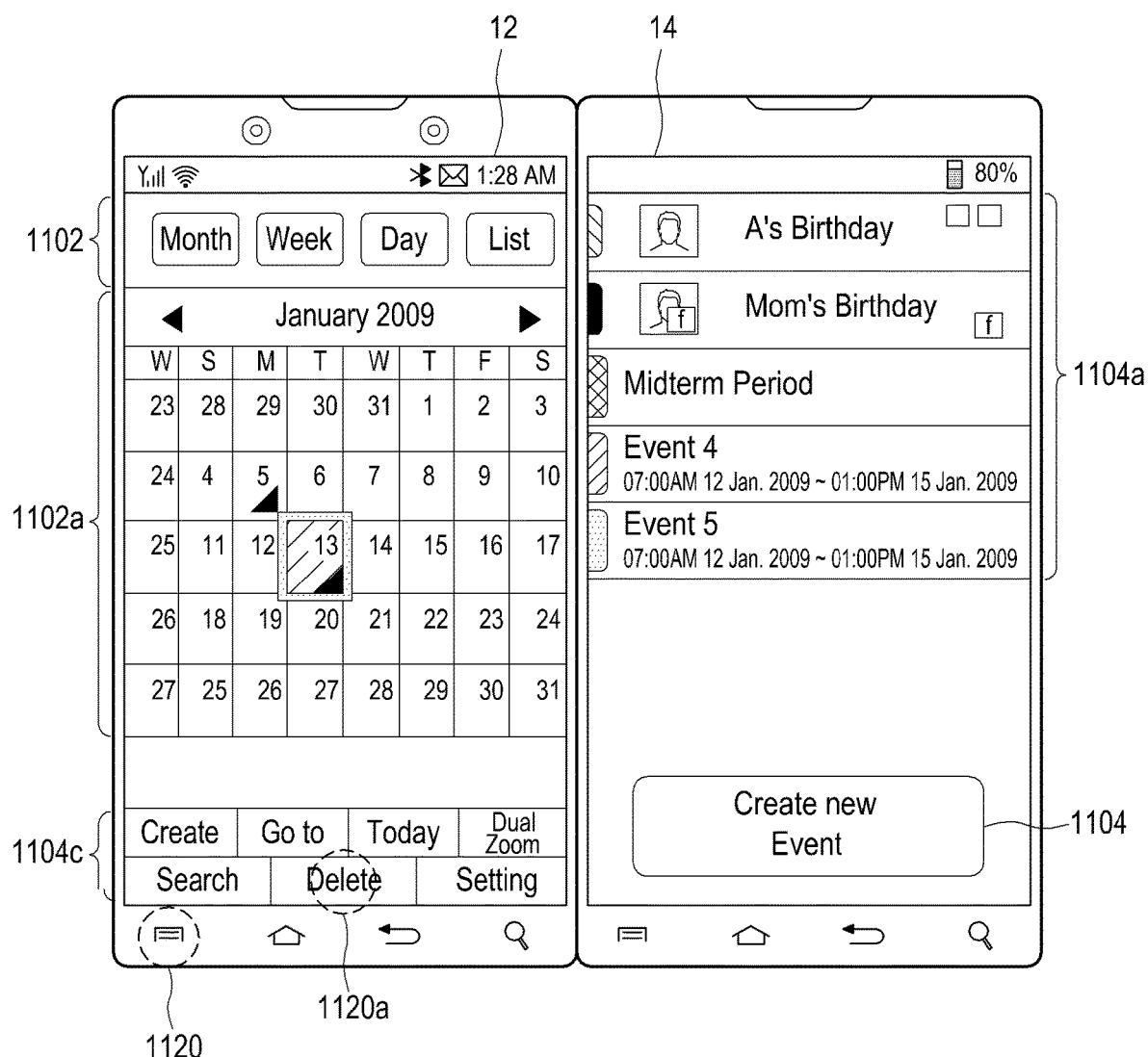
Figure 21K:
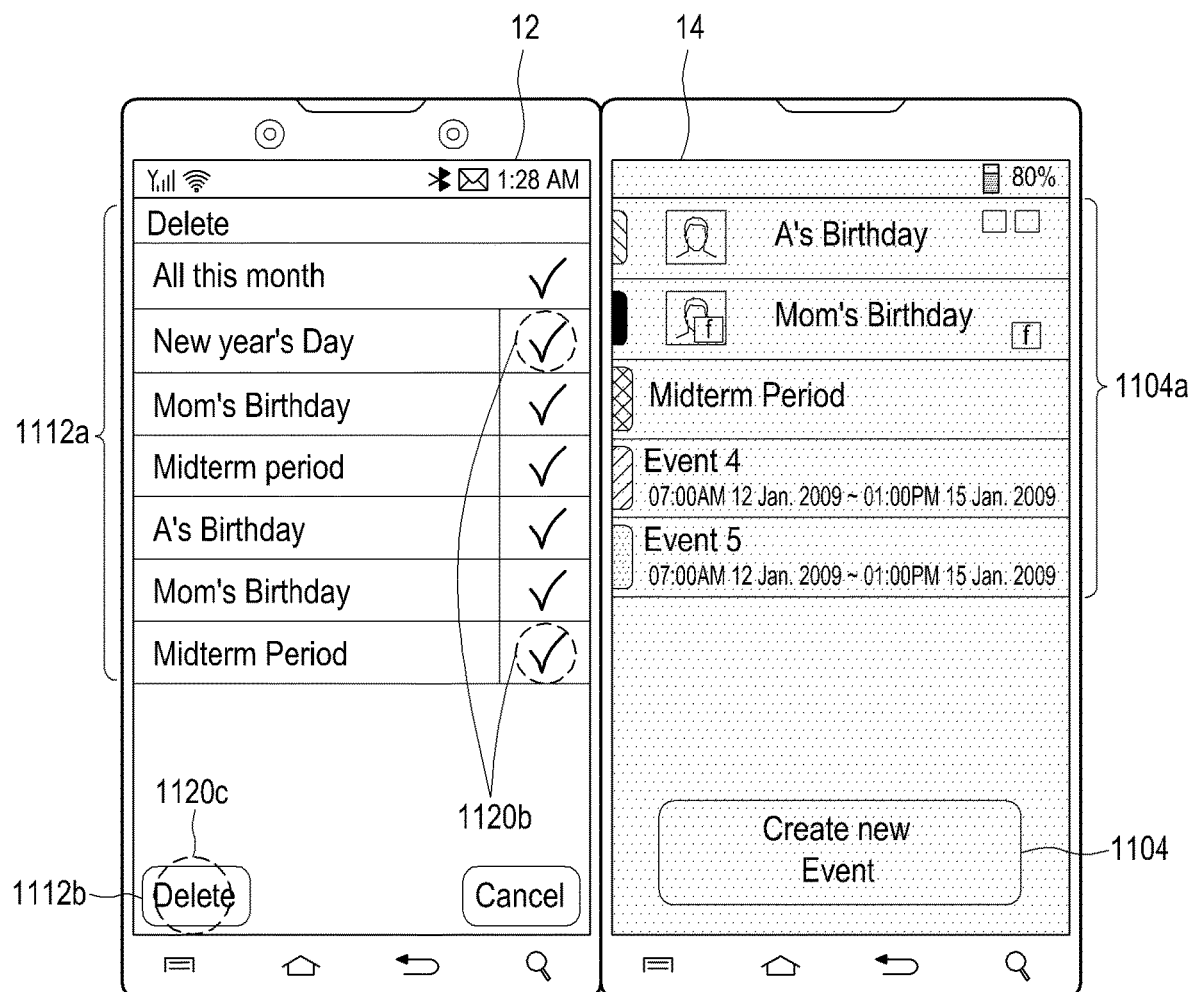
Figure 21L:
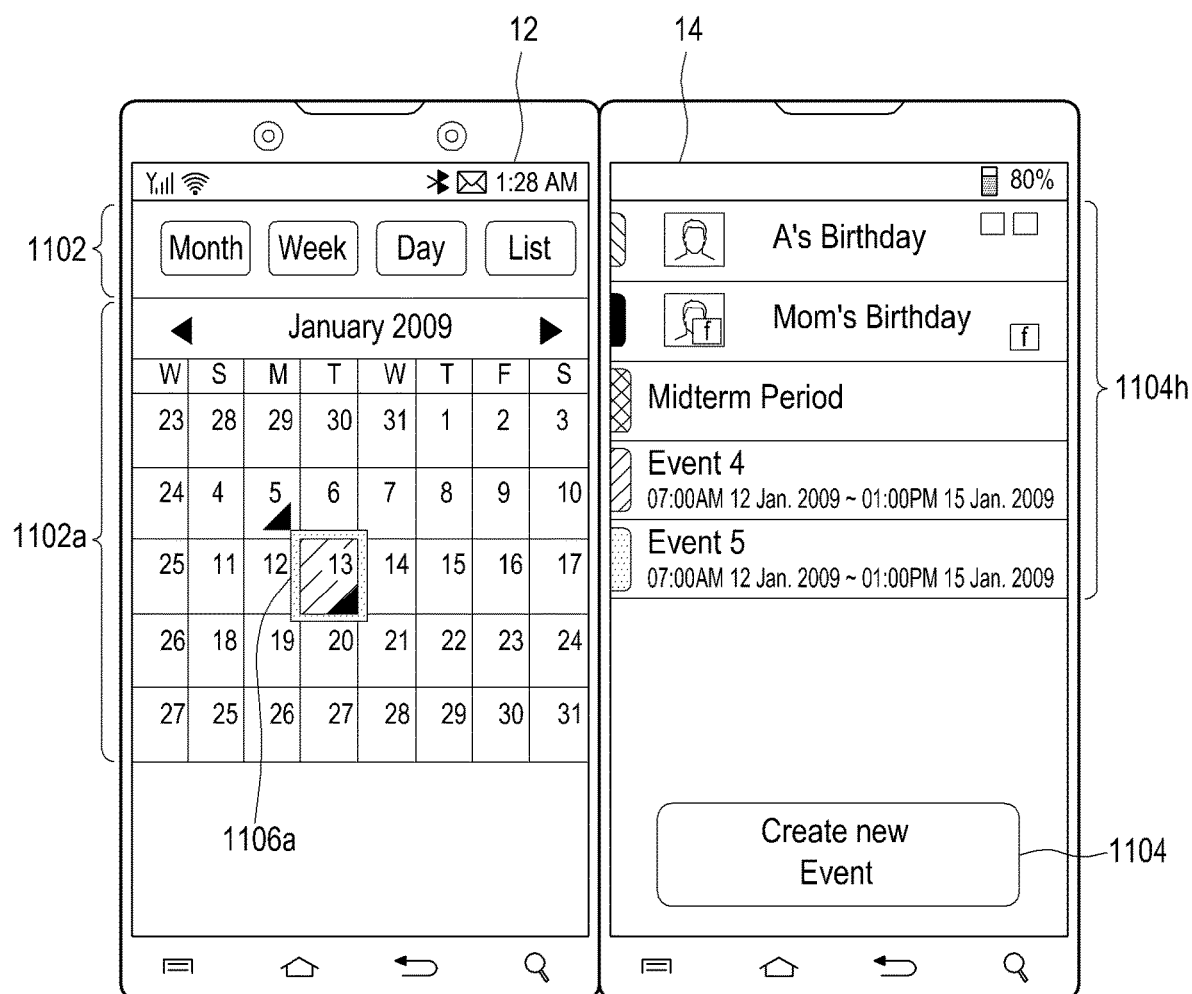
Figure 21M:
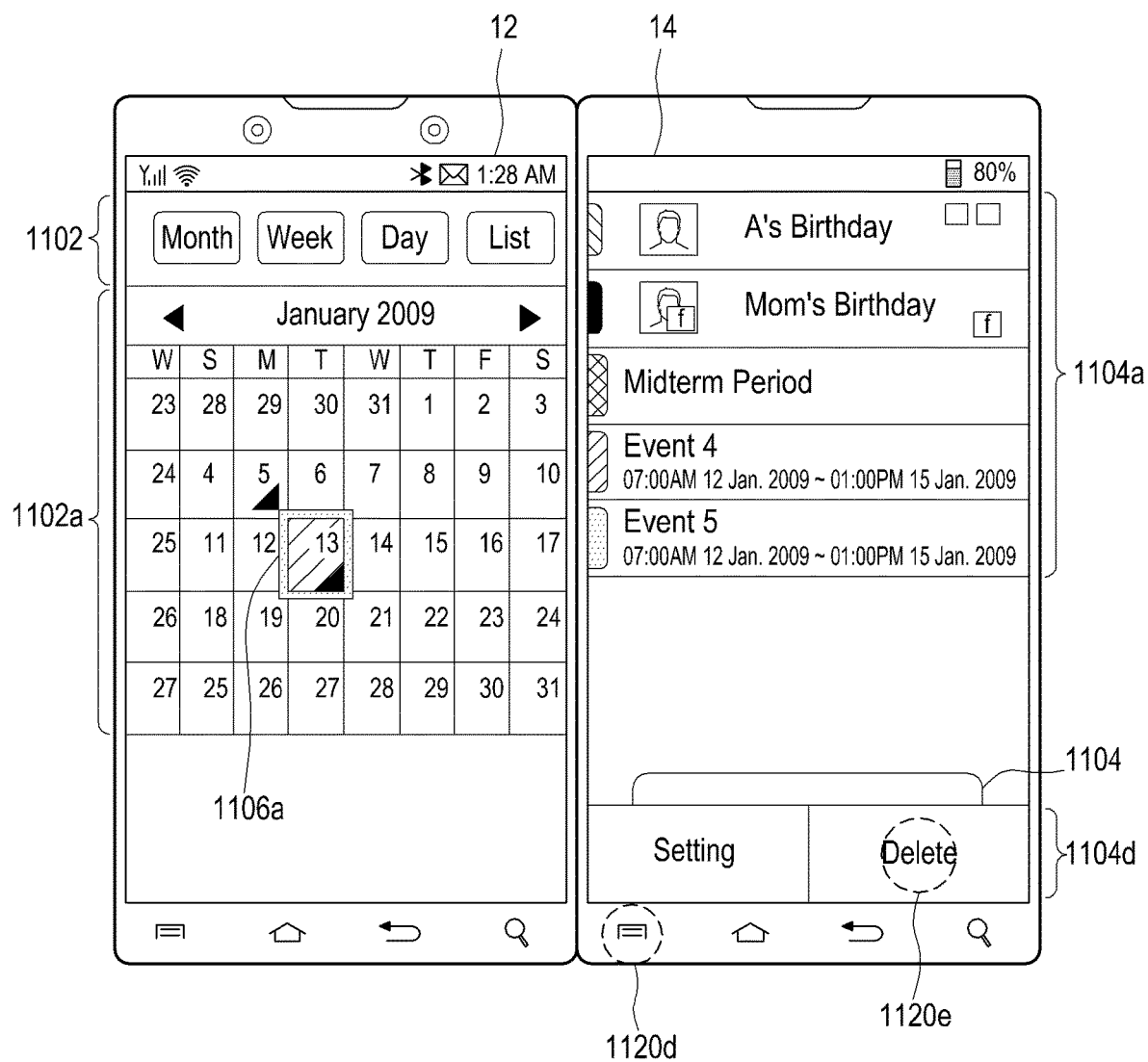
Figure 21N:
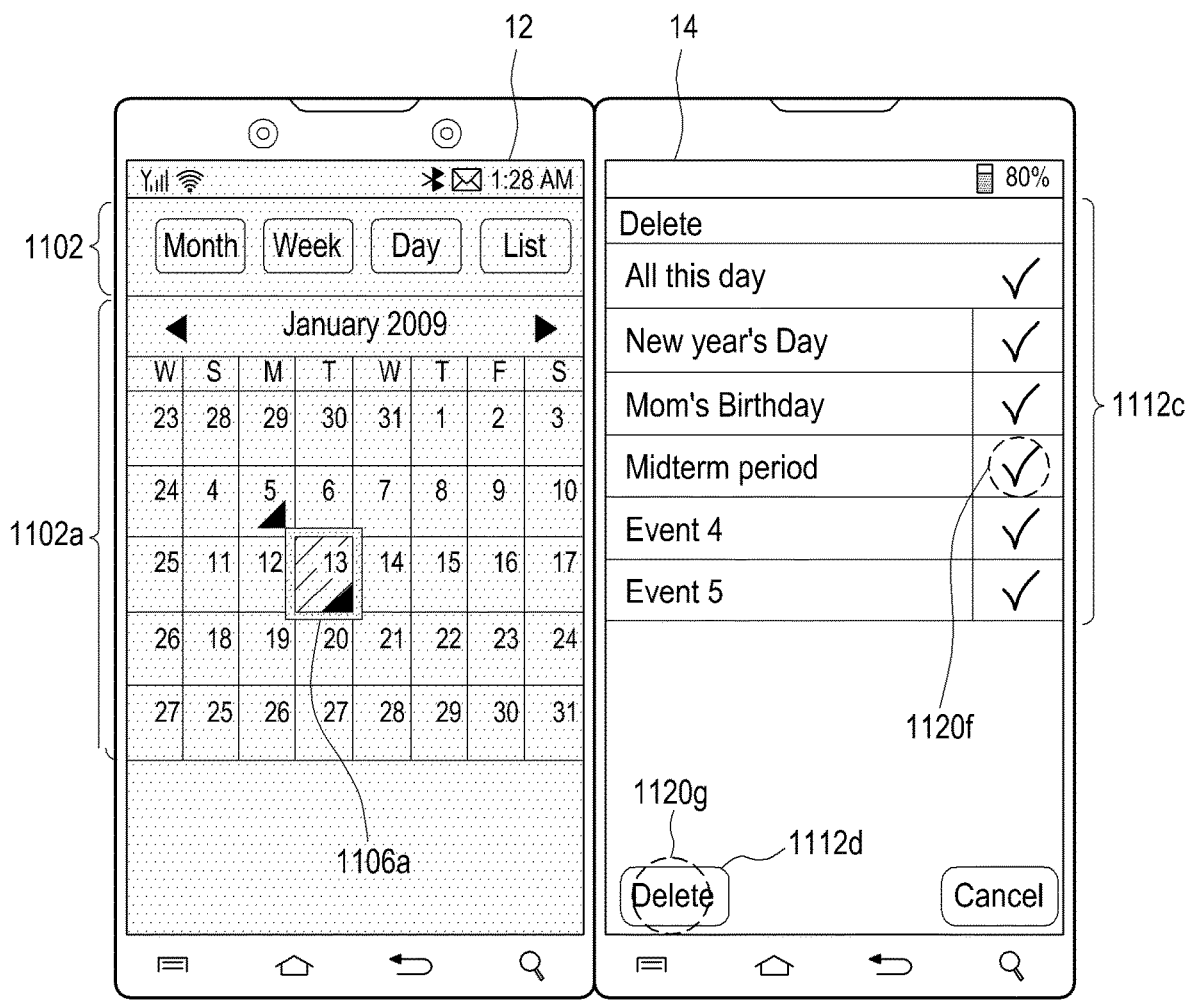
Figure 21O:
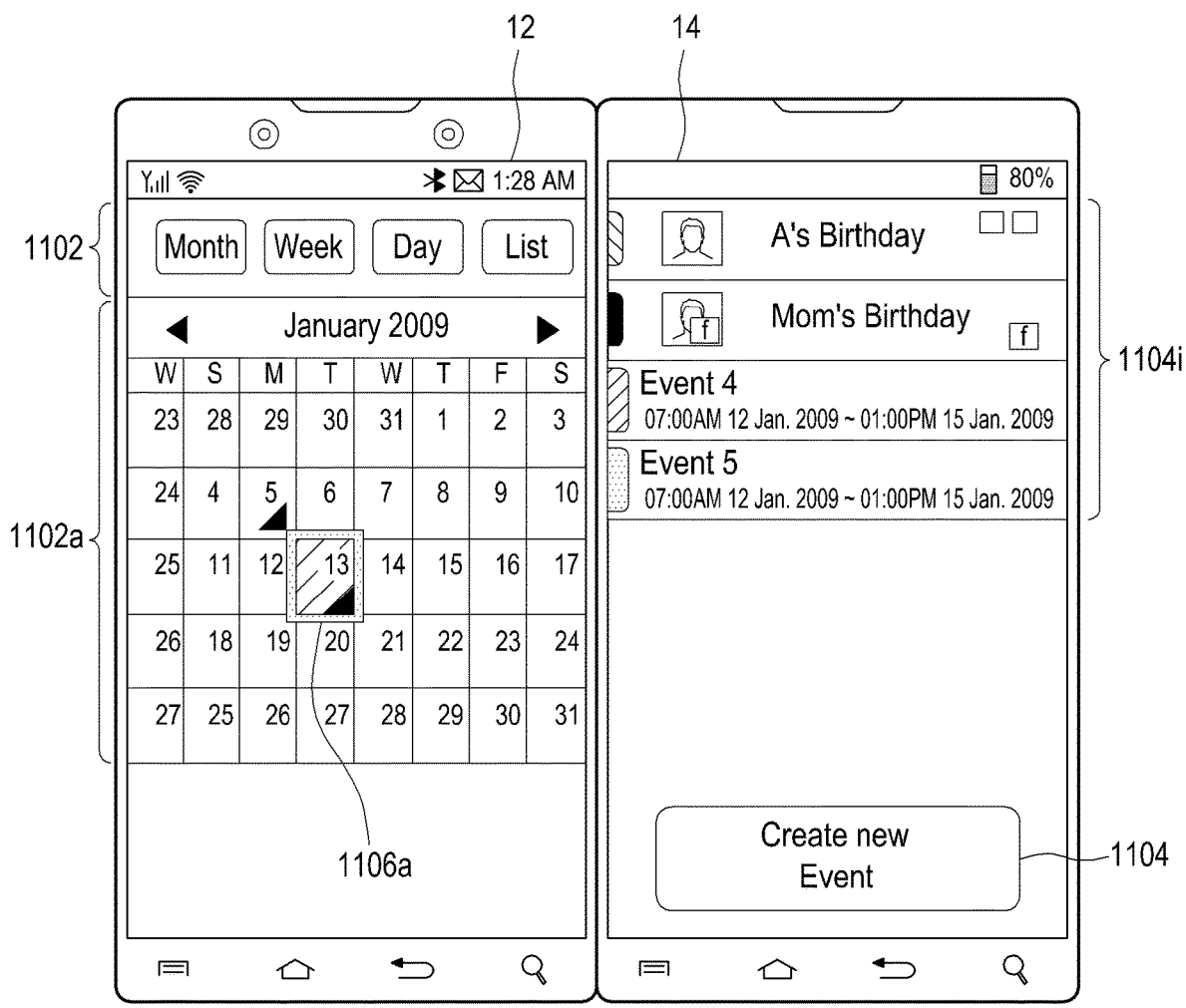

FIGS. 21A to 21O include user interfaces of the schedule management application according to one or more exemplary embodiments.

Referring to FIG. 21A, the first touch screen 12 displays a view mode selection area 1102 for selecting a schedule view mode and a calendar area 1102a of a month mode. The schedule management application selects a schedule view mode through a month mode key, a week mode key, a day mode key, and a list mode key included in the view mode selection area 1102. As one embodiment, the schedule management application displays the calendar area 1102a in a month mode, that is, dates of a current month including a today's date by default when the schedule management application starts. The calendar area 1102a of the month mode includes day blocks corresponding to dates included in the selected month and may include some of the day blocks of a previous month and a next month. For example, the day blocks form a row corresponding to a week and a column corresponding to a day. A day block corresponding to today's date among the day blocks may be displayed with a predetermined color which is visually distinguished. A date indicator 1106a indicating a date selected by the user is disposed in one of the day blocks and may be, for example, a rectangular form in a bold line surrounding a number of the selected date. When the calendar application starts, the date indicator 1106a is displayed in the day block of the today's date.

The second touch screen 14 can display another application or information on the schedule management program according to a setting of a schedule management program or a selection by the user while the first touch screen 12 displays the calendar area of a month mode, a week mode, a day mode, or a list mode. FIG. 21A illustrates an example of displaying information provided by the schedule management program in the second touch screen 14.

Referring to FIG. 21A, the second touch screen 14 displays event lists 1104a including registered event items of the selected date of the calendar area 1102a. Each of the event items may indicate an event registered in a selected date or an event registered in a period including the selected date. As another embodiment, the event lists 1104a of the second touch screen 14 may include event items registered in a month of the calendar area 1102a. Each of the event items includes at least one of an event title, an event date(s), an event time, and an event related image icon. Further, the first or second touch screen 12 or 14 displays a new event create key 1104 for registering a new event in a predetermined position. For example, the new event create key 1104 is disposed in a lower part of the event lists 1104a of the second touch screen 14.

When a predetermined touch gesture 1100a, for example, a tap gesture is detected from one date of the calendar area 1102 of the first touch screen 12, for example, "16", the portable device proceeds to FIG. 21B.

Referring to FIG. 21B, the portable device places a date indicator 1106b on the date selected by the touch gesture 1100a within the calendar area 1102a of the first touch screen 12 in response to the detection of the tap gesture 1100a and displays the event lists 1104b including the registered event items of the selected date in the second touch screen 14.

When a selection of a menu button which is one of the physical buttons disposed in a lower part of the first touch screen 12, for example, a touch gesture 1100b is detected while the calendar area 1102a is displayed in the first touch screen 12, the portable device displays a first menu window 1104c in the lower part of the first touch screen 12 in response to the detection of the touch gesture 1100b. The first menu window 1104c includes at least one of a create key for creating a new event, a go to key for moving to a selected date, a today key for moving to today's date, a search key for searching for a desired event, a deletion key for deleting a registered event, and a setting key for changing a setting of the schedule management application. The first menu window 1104c may be loaded by a touch of the menu button while the calendar area of the month mode, the week mode, the day mode, or the list mode is displayed in the first touch screen 12.

When the menu button which is one of the physical buttons disposed in the lower part of the second touch screen 14 is selected, for example, when a touch gesture 1100d is detected while the event lists 1104b are displayed in the second touch screen 12, the portable device displays a second menu window 1104d in the lower part of the second touch screen 14 in response to the detection of the touch gesture 1100c. The second menu window 1104d includes at least one of a search key for searching for a desired event and a deletion key for deleting a registered event. The second menu window 1104d may be loaded by a touch of the menu button while the event lists are displayed in the second touch screen 140

When a tap gesture 1100d is detected from a main mode key included in the view mode selection area 1102 of the first touch screen 12, the portable device proceeds to FIG. 21C.

Referring to FIG. 21C, the portable device displays a calendar area 1102c of the week mode including the today's date (or a selected date) in the first touch screen and displays event lists 1104e including event items registered in the selected date of the calendar area 1102c or week of the calendar area 1102c in the second touch screen 14 in response to the detection of the tap gesture 1100d. The calendar area 1102c of the week mode includes a week display line indicating a selected week, for example, "3rd week January, 2009", dates of the selected week, for example, S11, M12, T13, W14, T15, F16, and S17, and hour blocks indicating a schedule for each hour of each date. That is, the calendar area 1102c of the week mode includes columns corresponding to the day and rows corresponding to the hour. A first letter of each date refers to the day. Each of the hour blocks may be displayed with a predetermined color when there is an event registered in the corresponding hour.

When a tap gesture 1100e is detected from the day mode key included in the view mode selection area 1102 of the first touch screen 12, the portable device proceeds to FIG. 21D.

Referring to FIG. 21D, the portable device displays a calendar area 1102d of the day mode including the today's date (or a selected date) in the first touch screen 12 and displays event lists 1104f including event items registered in the date of the calendar area 1102d in the second touch screen 14 in response to the detection of the tap gesture 1100e. The calendar area 1102d of the day mode includes a date display line indicating the selected date, for example, "Thu, 1/13/2009" and an hour line for each hour on the selected date. When there is an event registered in the corresponding hour, each of the hour lines includes an event tile of the corresponding event and may be displayed with a predetermined color.

When a predetermined touch gesture 1100f, for example, a tap gesture is detected from one event item of the event lists 1104f of the second touch screen 14, the portable device proceeds to FIG. 21E.

Referring to FIG. 21E, the portable device replaces the calendar area 1102d of the first touch screen 12 with event lists 1104g including an event item selected by the tap gesture 1100f and displays the replaced event lists 1104g, and displays detailed information 1108 on the event item selected from the event lists 1104g in the second touch screen 14 in response to the detection of the tap gesture 1100f. The detailed information 1108 includes at least one of an event title and date 1108a, the remaining days to the event 1108b, a registered image 1108c of the event item, and participant lists 1108d related to the event item. The first touch screen 12 can dispose the new event create key 1104 in a lower part of the event lists 104g while the event lists 1104g are displayed in the first touch screen 12.

Referring to FIG. 21F, a tap gesture 1100g is detected from the list mode key included in the view mode selection area 1102 of the first touch screen 12, and a calendar area 1102e listing all the registered event items including the event item registered in the selected date (or today's date) is displayed in the first touch screen 12 and detailed information 1108e, 1108f, 1108g, and 1108h of the event item selected from the calendar area 1102e are displayed in the second touch screen 14 in response to the tap gesture 1100g. As one embodiment, the calendar area 1102e of the list mode includes event lines corresponding to the event items, and each of the event lines may include an event title and event hour.

When a touch gesture 1100h is detected from the menu button disposed in the lower part of the first touch screen 12 while the calendar area 1102a of the list mode is displayed in the first touch screen 12, the portable device displays the first menu window 1104c in the lower part of the first touch screen 12 in response to the detection of the touch gesture 1100h.

As the event item is selected from the event lists 1104g displayed in the first touch screen 12 or the list mode key within the view mode selection area 1102 is selected, when a touch gesture 1100i is detected from the menu button disposed in the lower part of the second touch screen 14 while the detailed information 1108a to 1108h of the selected event item are displayed in the second touch screen 14, the portable device displays a third menu window 1104g in the lower part of the second touch screen 14 in response to the detection of the touch gesture 1100i. The third menu window 1104g includes at least one of an editing key for editing a selected event item, a deletion key for deleting a selected event item, a sending key for sending a selected event item to a desired recipient, a search key for searching for a desired event item, a participant sending key for sending a selected event item to the participants, and a export key for sending a selected event item to a plurality of recipients.

As a selectable embodiment, when the schedule management application starts, the second touch screen 14 can display another application, for example, a home screen, an application menu, or a previously executed other application. It is referred to as a schedule management application operating in a multi mode.

Although not illustrated, when the portable device is in a landscape view mode, a lower touch screen can display the calendar area of the month mode, the week mode, the day mode, or the list mode provided by the schedule management application and an upper touch screen can display an event list related to the selected date of the calendar area or detailed information on the selected event item. As a selectable embodiment, when the portable device is in the landscape view mode, the upper touch screen can display the calendar area of the month mode, the week mode, the day mode, or the list mode provided by the schedule management application and the lower touch screen can display information on another application.

FIGS. 21G to 21I illustrate a scenario for generating a new event in the schedule management application according to an exemplary embodiment.

Referring to FIG. 21G, the portable device displays the view mode selection area 1102 and the calendar area 1102a in the first touch screen 12 and displays the event lists 1104a of the selected data of the calendar area 1102a and the new event create key 1104 in the second touch screen 14. Although the calendar area 1102a of the month mode is illustrated herein, a new event can be generated in a similar way when the calendar area corresponds to a calendar area 1102c, 1102d, or 1102e of the week mode, the day mode, or the list mode. The portable device can detect a create command of a new event through the first or second touch screen 12 or 14 or the menu button in the lower part of the first touch screen 12. For example, when a touch and hold 1100j-1 is detected from a particular date of the calendar area 1102a of the first touch screen 12, a tap gesture 1100j-2 is detected from the new event create key 1104 of the second touch screen 14, or a tap gesture 1100j-4 is generated from the create key within the first menu window 1104c loaded by selecting a menu button 1100j-3, the portable device recognizes the detection as a create command of the new event and proceeds to FIG. 21H.

Referring to FIG. 21H, the portable device replaces the view mode selection area 1102 of the first and second touch screens 12 and 14, the calendar area 1102a, the event lists 1104a, and the new event create key 1104 with first and second event create windows 1110a and 1110b for receiving event elements of the new event and displays the replaced first and second event create windows 1110a and 1110b in response to the create commands 1100j-1, 1100j-2, and 1100j-4 of the new event. The first event create window 1110a displayed in the first touch screen 12 includes an event title input area, a start date selection area, an end date input area, and an all day selection area. The second event create window 1110b displayed in the second touch screen 14 includes at least one of a position input area related to the event, a participant input area, an alarm selection area, a repetition selection area, and an explanation input area. Each of the event create windows 1110a and 1110b may be scrolled in response to the detection of a flick up/down or a touch drag up/down within the corresponding window.

When a tap gesture is detected from at least one of the input areas, a virtual keypad is displayed in a predetermined area of the touch screen selected by the corresponding tap gesture. For example, when a tap gesture is detected from the event title input area displayed in the first touch screen 12, the first touch screen 12 displays a virtual keypad in a lower half part of the first touch screen 12 and receives an event title through the virtual keypad. As a selectable embodiment, when a tap gesture is detected from one of the input areas, one virtual keypad is displayed in lower parts of both the first and second touch screens 12 and 14.

/ ppt #13, 11. Text Input /

Although not illustrated, when the portable device is in the landscape view mode, the upper touch screen can display the first event create window 1110a and the lower touch screen can display the second event create window 1110b.

As one embodiment, when a tap gesture is detected from one of the input areas included in the upper touch screen, the virtual keypad is displayed in at least a part of the lower touch screen (lower half part or whole lower part). As one embodiment, when a tap gesture is detected from one of the input areas included in the lower touch screen, the virtual keypad is displayed in at least a part of the lower touch screen (for example, lower half part). As one embodiment, when a tap gesture is detected from one of the input areas included in the lower touch screen, the second event create window 1110b is displayed in the upper touch screen and the virtual keypad is displayed in the whole lower touch screen.

FIG. 21I illustrates another example of first and second event create windows 1110c and 1110d displayed when a touch and hold 1100j-1 is detected from a particular date of the calendar area 1102a of the first touch screen 12. As illustrated in FIG. 21I, a date in a position where the touch and hold 1100j-1 is detected may be automatically input into the start date selection area and the end date selection area of the first event create window 1110c. As a selectable embodiment, when the touch and hold 1100j-1 is generated in a time line of the calendar area 1102d of the day mode, a start time and/or an end time may be automatically input into the first event create window 1110c.

FIGS. 21J to 21L illustrate a scenario for deleting an event registered in the schedule management application according to an exemplary embodiment.

Referring to FIG. 21J, the portable device displays the view mode selection area 1102 and the calendar area 1102a in the first touch screen 12 and displays the event lists 1104a of the date selected from the calendar area 1102a of the second touch screen 14 and the new event create key 1104 in the second touch screen 14. Although the calendar area 1102a of the month mode is illustrated herein, the event can be deleted in a similar way to that when the calendar area corresponds to the calendar area 1102c, 1102d, or 1102e of the week mode, the day mode, or the list mode. The portable device can detect a deletion command of the event through the first or second touch screen 12 or 14 or the physical button (menu button) in the lower part of the first touch screen 12. For example, when a tap gesture 1120a is detected from the deletion key within the first menu window 1104c loaded by selecting the menu button 1120, the portable device recognizes the detection as a deletion command of the registered event and proceeds to FIG. 21K.

Referring to FIG. 21K, the portable device replaces the view mode selection area 1102 and the calendar area 1102a of the first touch screen 12 with an event deletion window 1112a and a deletion key 1112b for executing the deletion command and displays the replaced event deletion window 1112a and deletion key 1112b in response to the deletion command 1120a. The event deletion window 1112a lists event deletion items corresponding to events registered in the month of the calendar area 1102a displayed in the first touch screen 12. Each of the event deletion items includes an event name of each registered event and a check box, and an input of selecting the event item to be deleted is detected through the check box. When the calendar area 1102a of the month mode is displayed in the first touch screen 12, the event deletion window 1112a includes events registered in the month of the calendar area 1102a. Similarly, when the calendar area 1102c, 1102d, or 1102e of the week mode, the day mode, or the list mode is displayed in the first touch screen 12, the event deletion window 1112a includes events registered in the corresponding week, day, or list.

The second touch screen 14 may be in a deactivated state while the event deletion window 1112a is displayed in the first touch screen 12. In the deactivated state, the second touch screen 14 is filled with a shadow and does not respond to the touch gesture.

When a tap gesture 1120b is detected from at least one check box of the event deletion events of the first touch screen 12 and a tap gesture 1120c is detected from the deletion key 1112b, the portable device proceeds to FIG. 21L.

Referring to FIG. 21L, the portable device replaces the event deletion window 1112a and the deletion key 1112b of the first touch screen 12 with previous information, that is, the view mode selection area 1102 and the calendar area 1102a and displays the replaced view mode selection area 1102 and calendar area 1102a in response to the detection of the tap gesture 1120c. When the event deletion window 1112a is removed from the first touch screen 12, the second touch screen 14 escapes from the deactivated state and event lists 1104h including registered events except for the event item selected from the event deletion window 1112a by the tap gesture 1102b are displayed.

FIGS. 21M to 21O illustrate another scenario for deleting an event registered in the schedule management application.

Referring to FIG. 21M, the portable device displays the view mode selection area 1102 and the calendar area 1102c in the first touch screen 12 and displays the event lists 1104a of the date selected from the calendar area 1102a and the new event create key 1104 in the second touch screen 14. Although the calendar area 1102a of the month mode is illustrated herein, the event can be deleted in a similar way to that when the calendar area corresponds to the calendar area 1102c, 1102d, or 1102e of the week mode, the day mode, or the list mode. When a tap gesture 1120e is detected from the deletion key within the second menu window 1104d loaded by selecting the menu button 1120d in the lower part of the second touch screen 14, the portable device recognizes the detection as a deletion command of the registered event and proceeds to FIG. 21N.

Referring to FIG. 21N, the portable device replaces the event lists 1104a and the new event create key 1104 of the second touch screen 14 with an event deletion window 1112c and a deletion key 1112d for executing the deletion command and displays the replaced event deletion window 1112c and deletion key 1112d in response to the deletion command 1120e. The event deletion window 1112c lists events registered in the event lists 1104a displayed in the second touch screen 14, that is, event deletion items corresponding to the events registered in the selected date of the first touch screen 12. Each of the event deletion items includes an event name of each registered event and a check box, and an input of selecting the event item to be deleted is detected through the check box. The first touch screen 12 may be in a deactivated state while the event deletion window 1112c is displayed in the second touch screen 14. In the deactivated state, the first touch screen 12 may be filled with a shadow and does not respond to the touch gesture.

When a tap gesture 1120f is detected from at least one check box of the event deletion events of the second touch screen 14 and a tap gesture 1120g is detected from the deletion key 1112d, the portable device proceeds to FIG. 21O.

Referring to FIG. 21O, the portable device replaces the event deletion window 1112c and the deletion key 1112d of the second touch screen 14 with event lists 1104i and the new event create key 1104 and displays the replaced event lists 1104i and new event create key 1104 in response to the detection of the tap gesture 1120g. The event lists 1104i includes registered events except for the event item selected from the event deletion window 1112c by the tap gesture 1120f in comparison with the previous event lists 1104a. When the event deletion window 1112c is removed from the second touch screen 14, the first touch screen 12 escapes from the deactivated state.

FIGS. 22A to 22M illustrate scenarios of expanding the calendar area in the schedule management application and displaying the expanded calendar area according to one or more exemplary embodiments.

Figure 22A:
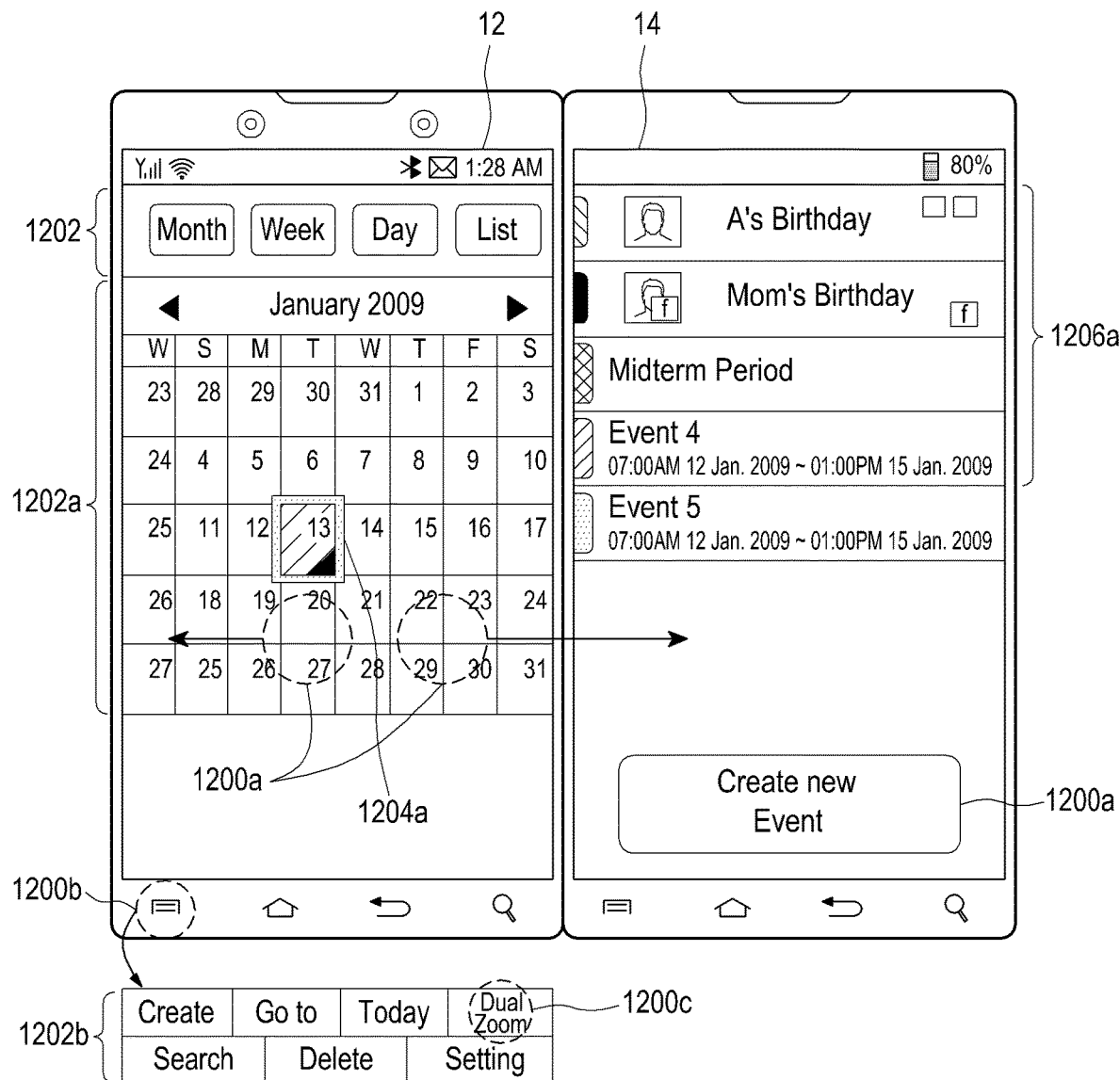
FIGS. 22A to 22M are diagrams illustrating scenarios of expanding a calendar area and displaying the expanded calendar area in a schedule management application according to one or more exemplary embodiments.

Referring to FIG. 22A, the portable device displays a view mode selection area 1202 and a calendar area 1202a in the first touch screen 12 and displays event lists 1206a of a date 1204a selected from a calendar area 1202a and a new event create key 1206 in the second touch screen 14. Although the expansion of the calendar area 1202a of the month mode is illustrated herein, the calendar area 1102c, 1102d, or 1102e of the week mode, the day mode, or the list mode can be expanded in a similar way. The portable device detects a touch gesture 1200a of expanding an area selected from the calendar area 1202a, that is, a pinch zoom-in. As another embodiment, the touch gesture 1200a includes two touch drags which are generated at the same time and move away from each other in approximately opposite directions. The touch gesture 1200a starts at two positions within the calendar area 1202a, and one of the two touch drags may end at the second touch screen 14. At least one touch included in the touch gesture 1200a passes through the hinge between the two touch screens 12 and 14.

As another embodiment, the portable device can detect a zoom-in command through the menu button in the lower part of the first touch screen 12. That is, when the menu button which is one of the physical buttons located in the lower part of the first touch screen 12 is selected, for example, when a touch gesture 1200b is detected, the portable device displays a first menu window 1202b in the lower part of the first touch screen 12 in response to the detection of the touch gesture 1200b. The first menu window 1202b includes at least one of a create key for creating a new event, a go to key for moving to a selected date, a today key for moving to the today's date, a dual zoom key for expanding a displayed calendar area, a search key for searching for a desired event, a deletion key for deleting a registered event, and a setting key for changing a setting of the schedule management application. The first menu window 1202b including the dual zoom key may be loaded by a touch of the menu button while the calendar area of the month mode or the week mode is displayed in the first touch screen 12.

Figure 22B:
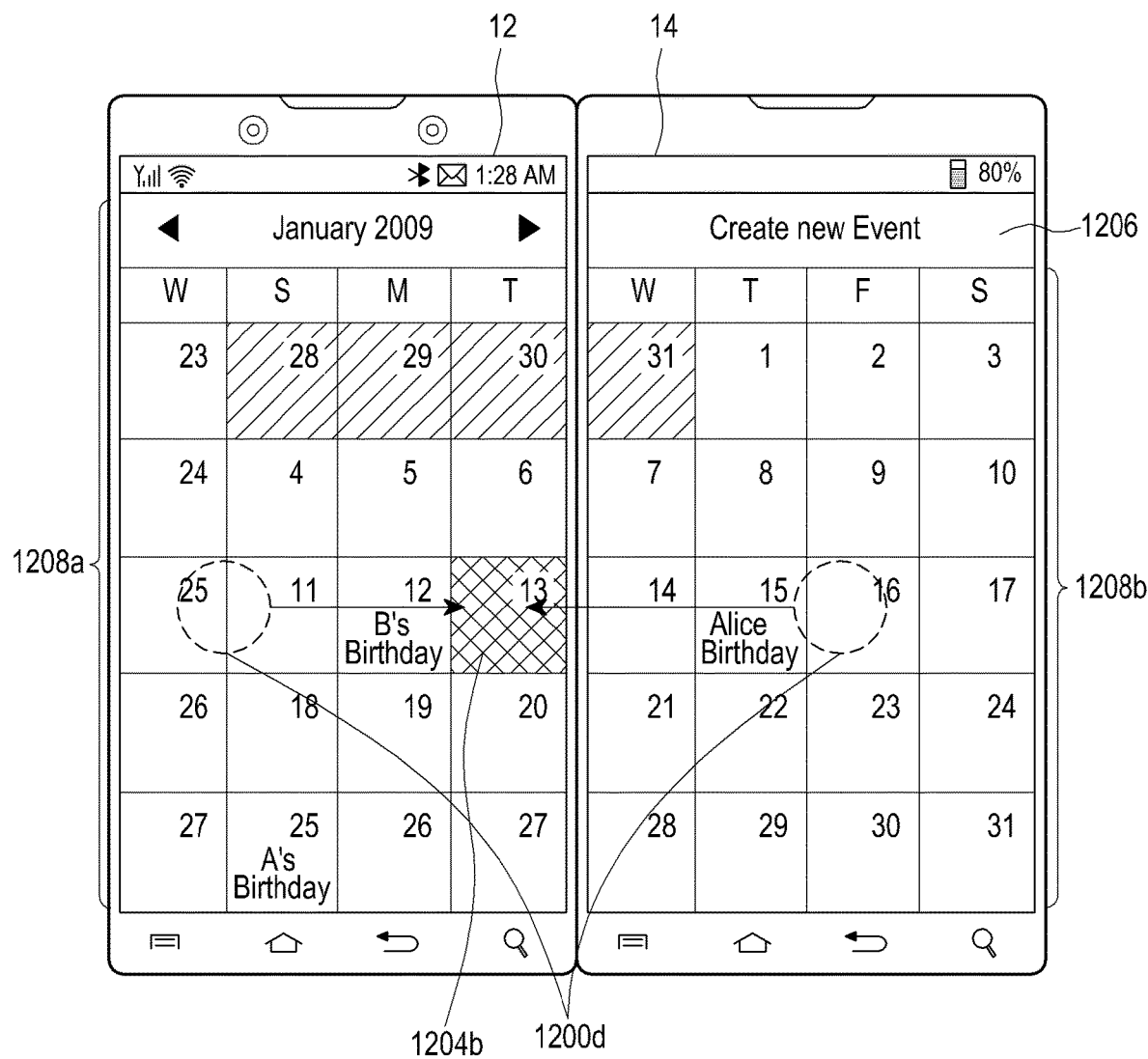

When the portable device detects a touch gesture 1200c, that is, a tap gesture from the dual zoom key within the first menu window 1202b loaded by selecting the menu button 1200b in the lower part of the first touch screen 12, the portable device proceeds to FIG. 22B.

Referring to FIG. 22B, in response to the detection of the pinch zoom-in 1200a on the calendar area 1202a or the tap gesture 1200c on the dual zoom key, the portable device displays first and second calendar areas 1208a and 1208b expanded from the calendar area 1202a in the first and second touch screens 12 and 14. The first and second calendar areas 1208a and 1208b include larger day blocks than the calendar area 1202a before the expansion and display more information in comparison with the events registered in each day block. The first calendar area 1208a includes some of the day blocks corresponding to the month of the calendar area 1202a, and the second calendar area 1208b includes the remainders of the day blocks corresponding to the month of the calendar area 1202a. The new event create key 1206 may be disposed in an upper part of the second calendar area 1208b in the second touch screen 14 in order to successively dispose the first and second calendar areas 1208a and 1208b. The day block 1204b located in the today's date in the first and second calendar areas 1208a and 1208b may be displayed with a predetermined color which is visually distinguished.

As a selectable embodiment, detailed information on the date selected from the month areas 1208a and 1208b may be displayed in a form of a popup window while the first and second month areas 1208a and 1208b are displayed in the first and second touch screens 12 and 14.

The portable device detects a touch gesture 1200d of reducing the area selected from the first and second month areas 1208a and 1208b, that is, pinch zoom-out and returns to FIG. 22A. As another embodiment, the touch gesture 1200d includes two touch drags which are simultaneously generated and approach each other. The touch gesture 1200d may start at each of different touch screens 12 and 14 and end at one of the first and second touch screens 12 and 14. At least one touch included in the touch gesture 1200d passes through the hinge between the two touch screens 12 and 14.

Figure 22C:
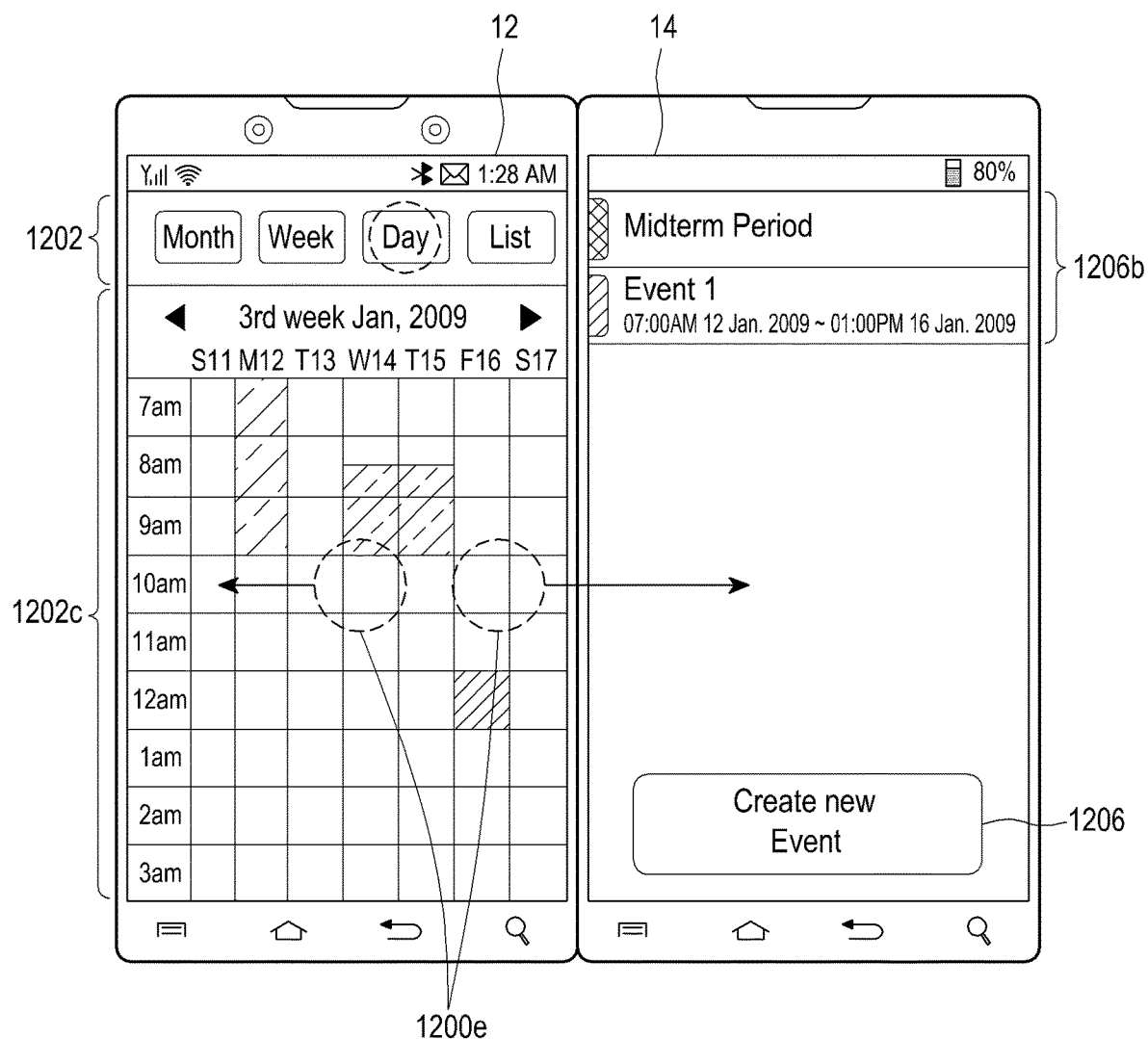

Referring to FIG. 22C, the portable device displays a view mode selection area 1202 and a calendar area 1202c of the week mode in the first touch screen 12 and displays event lists 1206b of the date selected from the calendar area 1202c and the new event create key 1206 in the second touch screen 14. The portable device recognizes a touch gesture 1200e of expanding the area selected from the calendar area 1202c, that is, pinch zoom-in. As another embodiment, the touch gesture 1200e includes two touch drags which are simultaneously generated and move away from each other in approximately opposite directions. The touch gesture 1200e may start at two positions within the calendar area 1202a and one of the two touch drags may end at the second touch screen 14. At least one touch included in the touch gesture 1200e passes through the hinge between the two touch screens 12 and 14. Although not illustrated, the portable device can detect a zoom-in command of the calendar area 1202c of the week mode through the menu button in the lower part of the first touch screen 12.

Figure 22D:
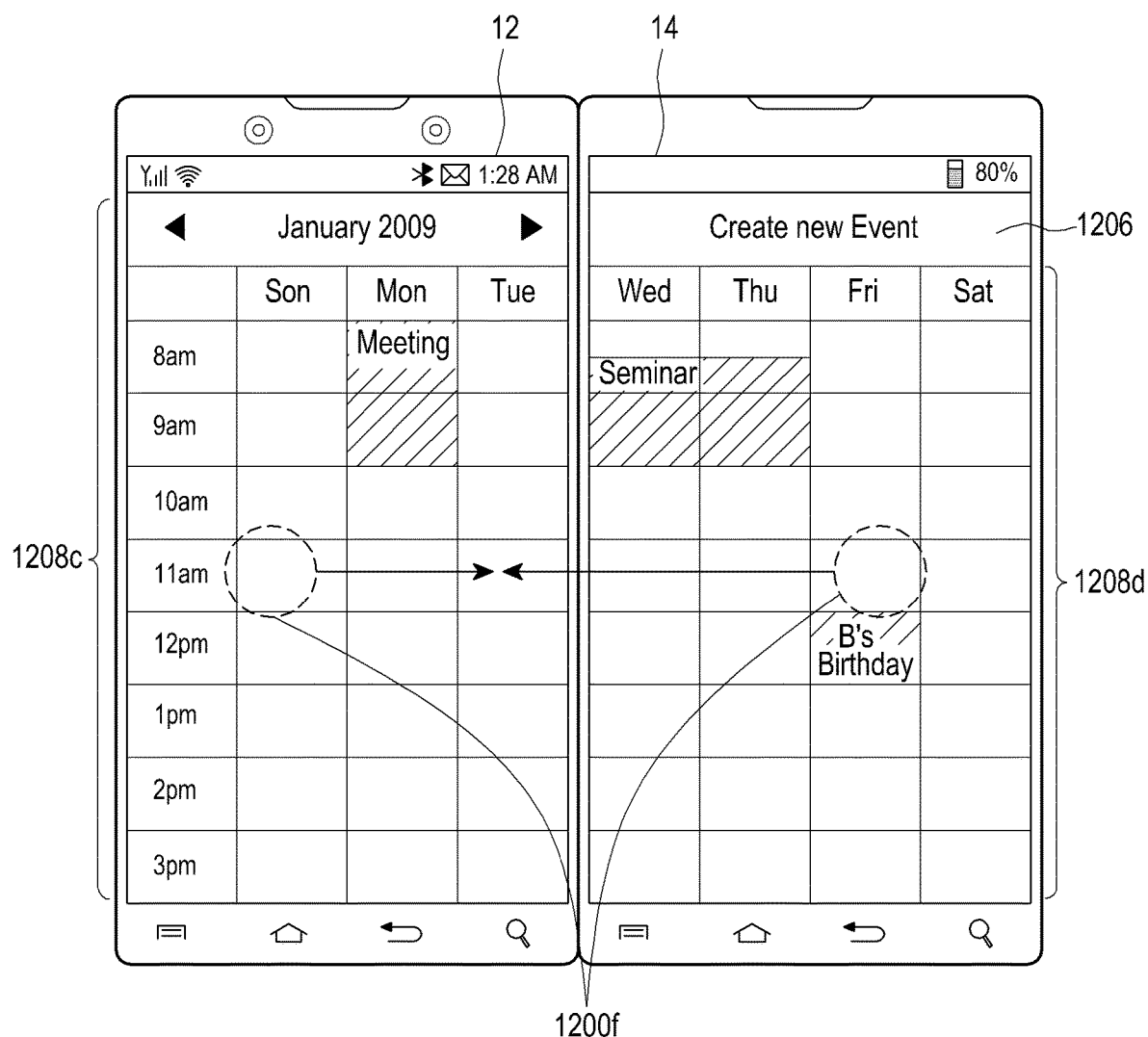

Referring to FIG. 22D, the portable device detects a tap gesture from the dual zoom key within the first menu window loaded by selecting the menu button in the lower part of the first touch screen 12 or detects the pinch zoom-in on the calendar area 1202c, and displays the first and second calendar areas 1208c and 1208d expanded from the calendar area 1202c in the first and second touch screens 12 and 14. The first and second calendar areas 1208c and 1208d include larger hour blocks in comparison with the calendar area 1202c before the expansion and display more information on the event registered in each of the hour blocks. The first calendar area 1208c includes hour blocks of some of the dates corresponding to the week of the calendar area 1202c, and the second calendar area 1208d includes hour blocks of the remainders of the dates corresponding to the week of the calendar area 1202c. The new event create key 1206 may be disposed in an upper part of the second calendar area 1208d in the second touch screen 14 in order to successively dispose the first and second calendar areas 1208c and 1208d.

As a selectable embodiment, detailed information on the date selected from the calendar areas 1208c and 1208d may be displayed in a form of a popup window while the first and second calendar areas 1208c and 1208d are displayed in the first and second touch screens 12 and 14.

The portable device detects a touch gesture 1200*f* of reducing the area selected from the first and second calendar areas 1208*c* and 1208*d*, that is, pinch zoom-out and returns to FIG. 22C. As another embodiment, the touch gesture 1200*f* includes two touch drags which are simultaneously generated and approach each other. The touch gesture 1200*f* may start at each of the different touch screens 12 and 14 and end at one of the first and second touch screens 12 and 14. As one embodiment, the calendar area reduced by the touch gesture 1200*f* may be displayed in one touch screen where the touch gesture 1200*f* ends. At least one touch included in the touch gesture 1200*f* passes through the hinge between the two touch screens 12 and 14.

A scenario in the calendar area expanded to occupy the first and second touch screens 12 and 14 will be described with reference to FIGS. 22E to 22G.

Figure 22E:
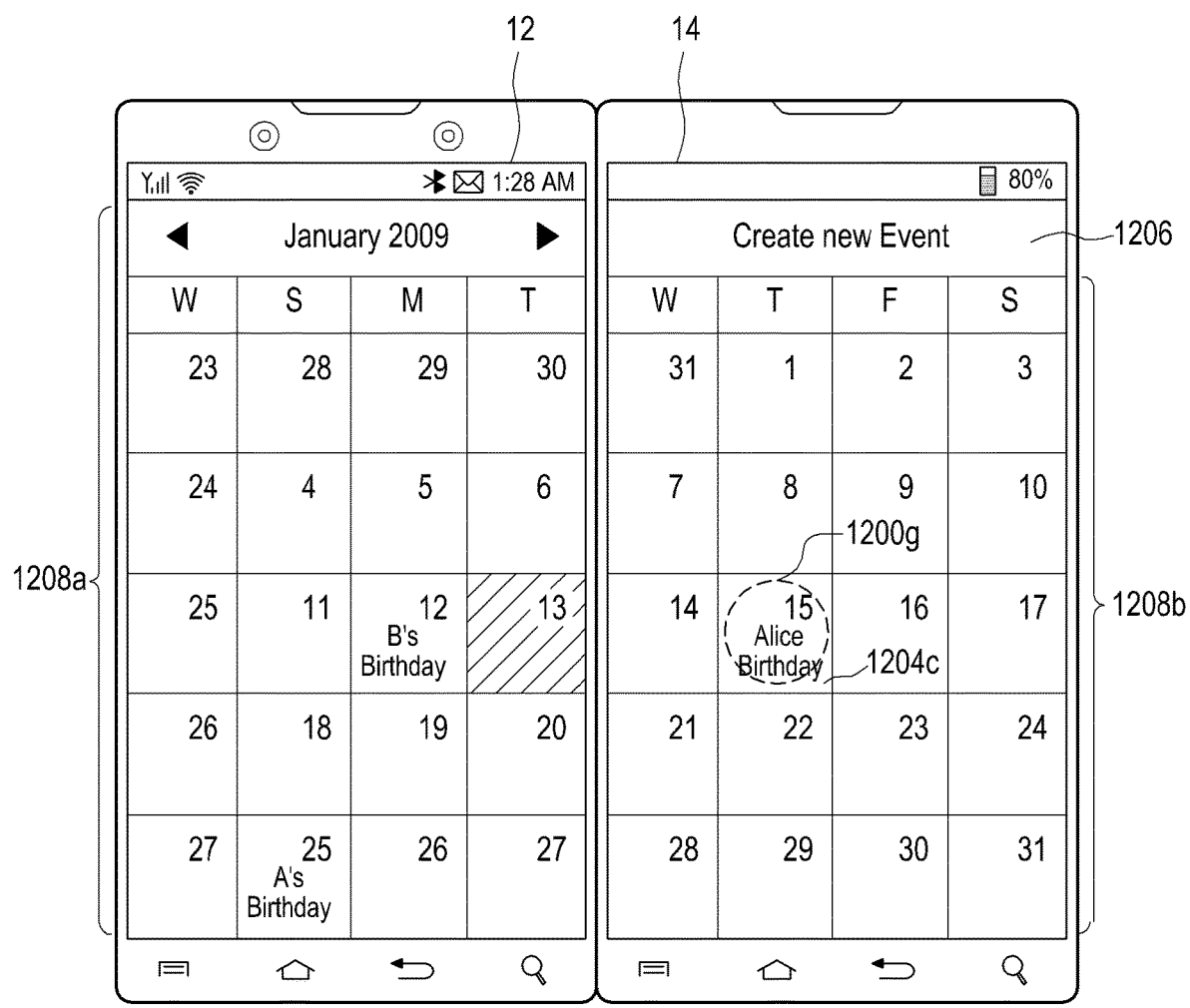

Referring to FIG. 22E, the portable device displays the first and second calendar areas 1208*a* and 1208*b* including day blocks corresponding to one month in the first and second touch screens 12 and 14, respectively. The first calendar area 1208*a* includes some of the day blocks corresponding to the selected month, and the second calendar area 1208*b* includes the remainders of the day blocks. When a predetermined touch gesture 1200*g*, for example, a tap gesture or a touch and hold is detected from one 1204*c* of the day blocks included in the first and second calendar areas 1208*a* and 1208*b*, the portable device proceeds to FIG. 22F.

Figure 22F:
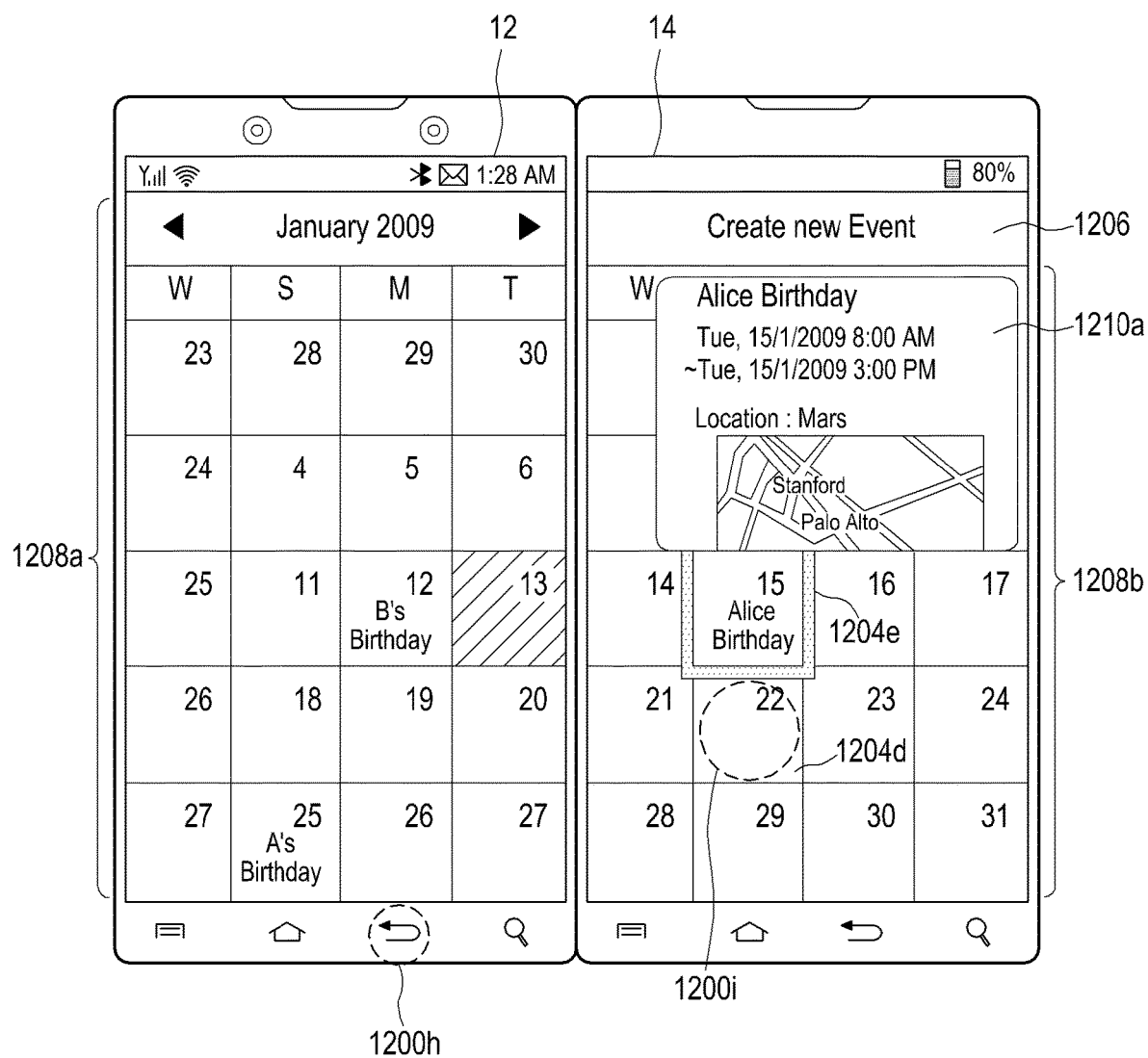

Referring to FIG. 22F, the portable device places a date indicator 1204*e* in a date of the day block 1204 selected by the touch gesture 1200*g* and displays a popup window 1210*a* showing detailed information on an event registered in the selected date in an area near the selected date. In the shown example, the popup window 1210*a* is detailed information on the registered event of "Alice Birthday" of the selected date of "15" and provides at least one of a time such as "Tue, 15/01/2009 8:00 AM~Tue, 15/01/2009 3:00 PM", a place, and a map image. When an input 1200*h* of a back button which is one of the physical buttons located in the lower part of the first touch screen 12 is detected while the popup window 1210*a* is displayed, the portable device removes the popup window 1210*a* and restores the first and second touch screens 12 and 14 as illustrated in FIG. 22E.

Figure 22G:
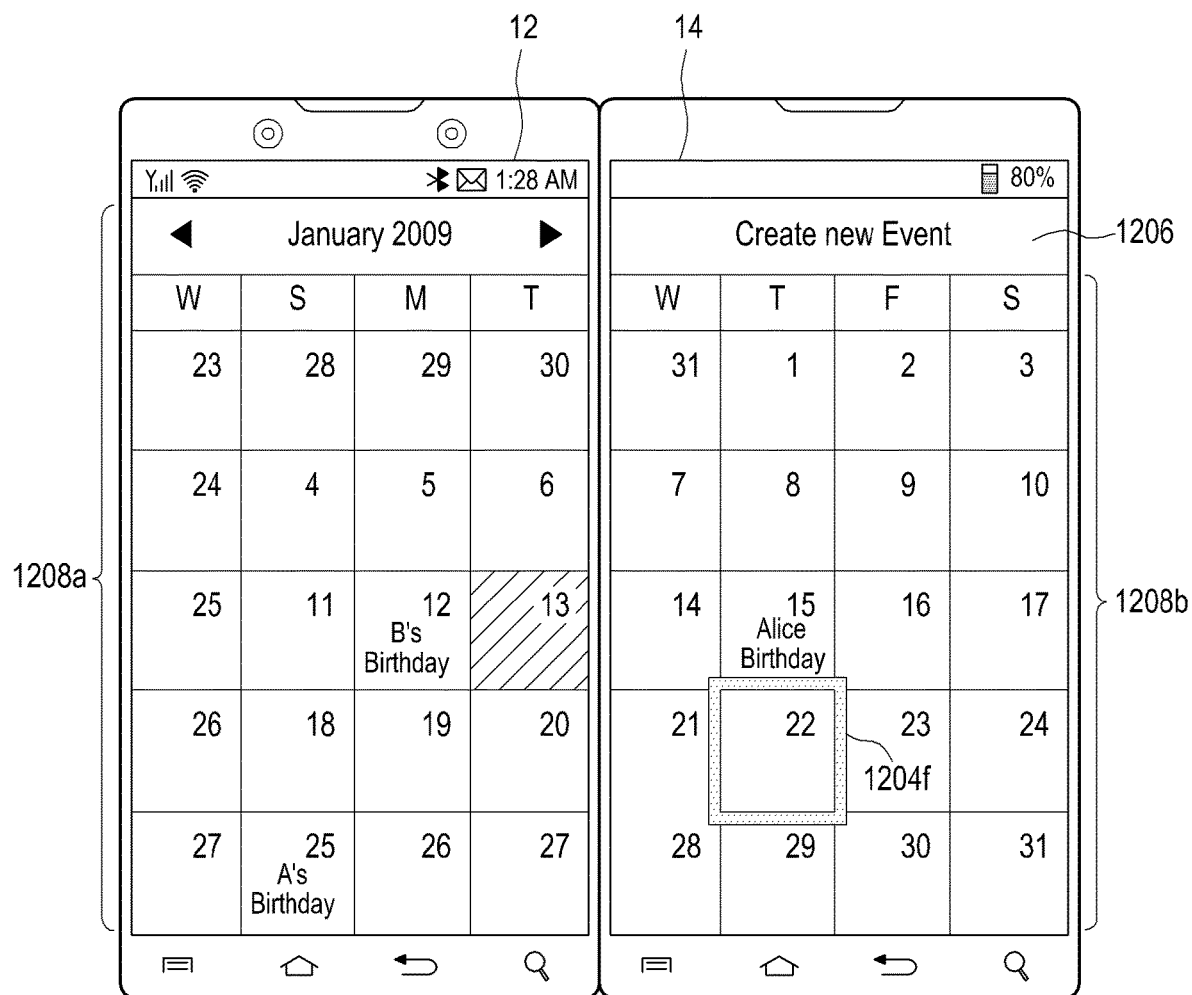

When a predetermined touch gesture 1200*i*, for example, a tap gesture or a touch and hold is detected from another one 1204 of the day blocks included in the first and second calendar areas 1208*a* and 1208*b* while the popup window 1210*a* is displayed, the portable device proceeds to FIG. 22G.

Referring to FIG. 22G, the portable device places a date indicator 1204*f* in the date of the day block 1204*d* selected by the touch gesture 1200*i* and removes the displayed popup window 1210*a* in response to the detection of the touch gesture 1200*i*. When there is no event registered in the date of the day block 1204*d* selected by the touch gesture 1200*i*, a new popup window is not displayed.

Figure 22H:
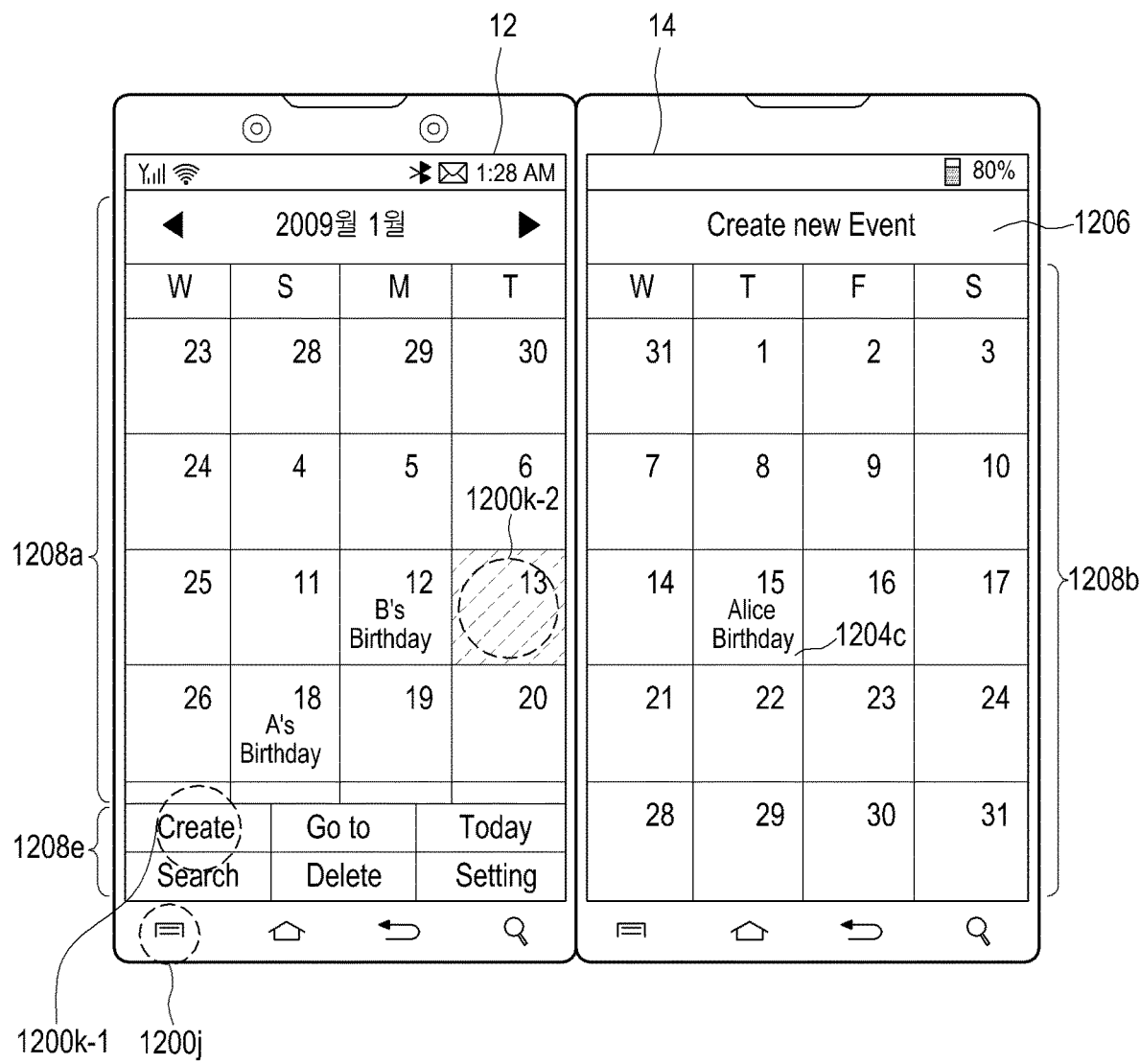
Figure 22I:
Figure 22J:

FIGS. 22H to 22J illustrate a scenario for generating a new event in the expanded calendar area of the schedule management application according to an exemplary embodiment.

Referring to FIG. 22H, the portable device displays the first and second calendar areas 1208*a* and 1208*b* including day blocks corresponding to the selected month in the first and second touch screens 12 and 14, respectively. When the menu button which is one of the physical buttons disposed in the lower part of the first touch screen 12 is selected, for example, when a touch gesture 1200*j* is detected while the calendar area of the month mode or the week mode is displayed over the two touch screens 12 and 14, the portable device displays a menu window 1208*e* for the expanded calendar area in the lower part of the first touch screen 12 in response to the detection of the touch gesture 1200*j*. The menu window 1208*e* includes at least one of a create key for creating a new event, a go to key for moving to a selected date, a today key for moving to the today's date, a search key for searching for a desired event, a deletion key for deleting a registered event, and a setting key for changing a setting of the schedule management application.

The portable device can detect a create command of a new event through the first or second touch screen 12 or 14 or the menu button in the lower part of the first touch screen 12. For example, when a touch and hole 1200*k*-2 is detected from one of the day blocks included in the first and second calendar areas 1208*a* and 1208*b* or a tap gesture 1200*k*-1 is detected from the create key within the menu window 1208*e* loaded by selecting the menu button 1200*j* located in the lower part of the first touch screen 12, the portable device recognizes the detection as a create command of the new event and proceeds to FIG. 22I.

Referring to FIG. 22I, the portable device replaces the first and second calendar areas 1208*a* and 1208*b* of the first and second touch screens 12 and 14 with first and second event create windows 1210*a* and 1210*b* and displays the replaced first and second event create windows 1210*a* and 1210*b* in response to the create commands 1200*k*-1 and 1200*k*-2. The first event create window 1210*a* displayed in the first touch screen 12 includes an event title input area, a start date selection area, an end date selection area, and an all day selection area. The second event create window 1210*b* displayed in the second touch screen 14 includes at least one of a position input area related to the event, a participant input area, an alarm selection area, a repetition selection area, an explanation input area, and a storage key. When a tap gesture is detected from one of the input areas, a virtual keypad is displayed in a lower area of the corresponding touch screen. For example, when a tap gesture is detected from the event title input area, the first touch screen 12 displays the virtual keypad in a lower half part of the first touch screen 12 and receives an event title through the virtual keypad.

FIG. 22J illustrates another example of first and second event create windows 1210*c* and 1210*b* displayed when the touch and hold 1200*k*-2 is detected from a particular block of the calendar area 1208*a* displayed in the first touch screen 12. As illustrated in FIG. 22J, a date in a position where the touch and hold 1200*k*-2 is detected is automatically input into a start date selection area and an end date selection area of the first event create window 1210*c*. As a selectable embodiment, when the touch and hold 1200*k*-2 is generated in a time line of the calendar area of the day mode, a start time and/or an end time may be additionally input into the first event create window 1210*c* together with the start/end date.

Figure 22K:
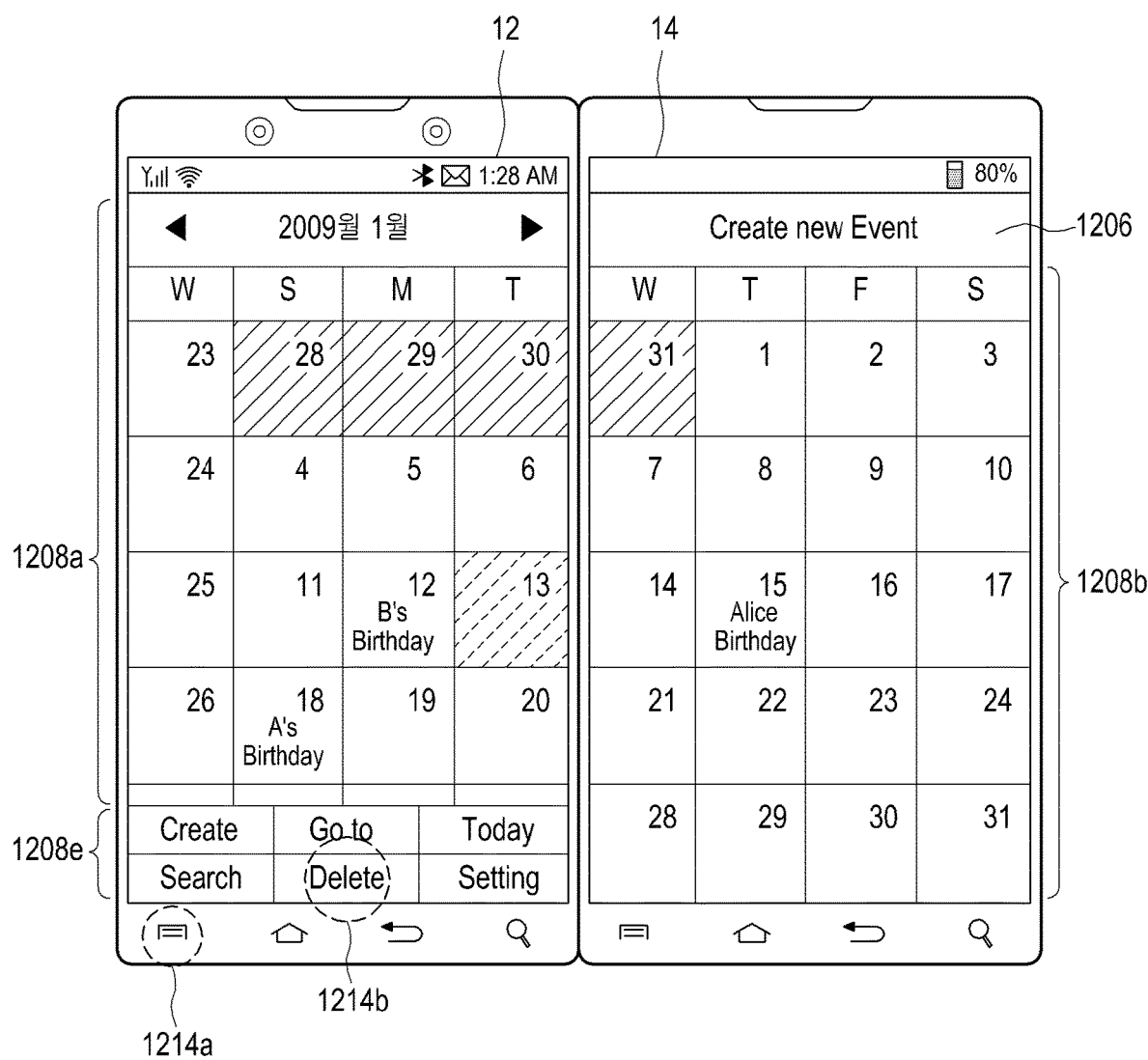
Figure 22L:
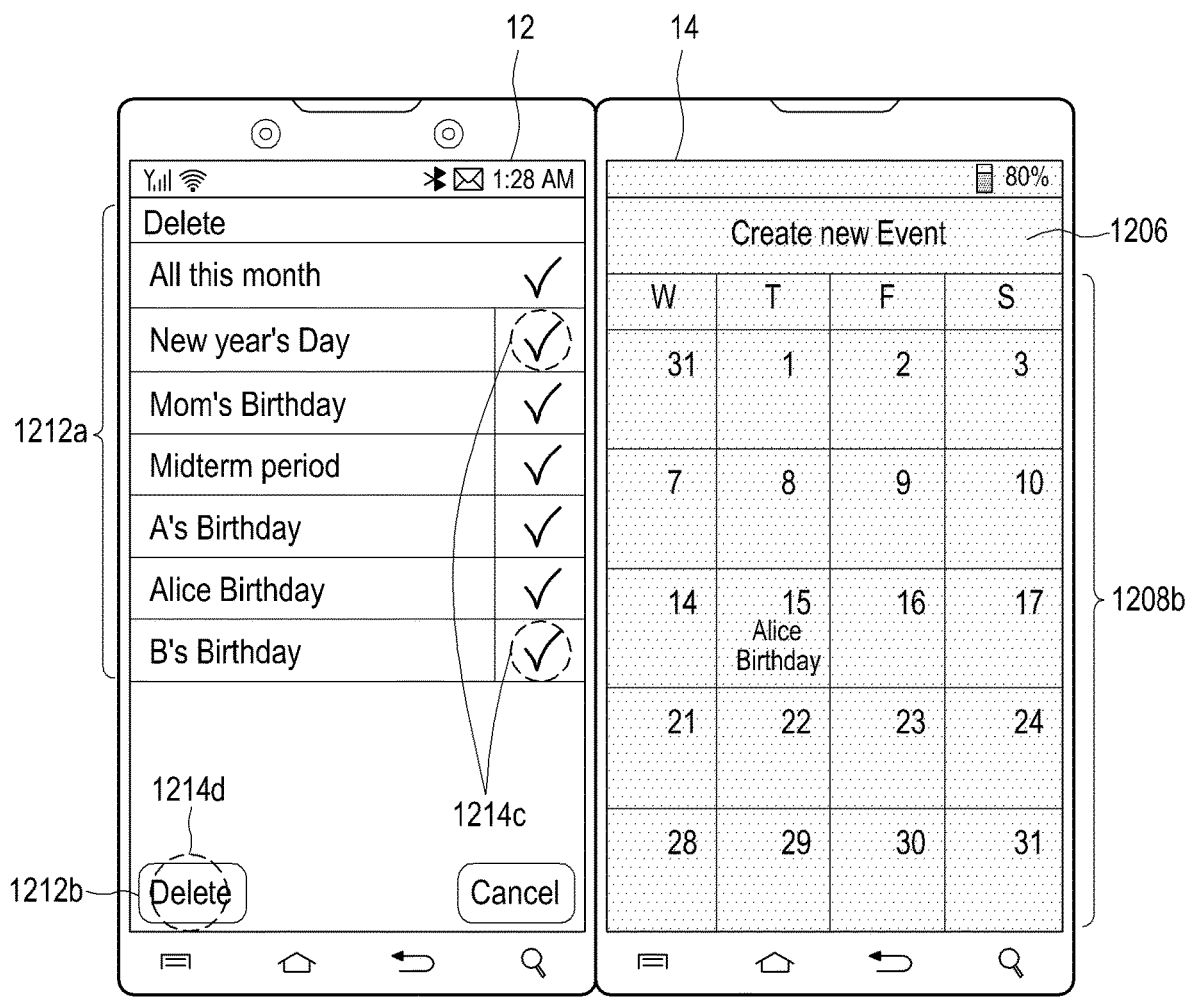
Figure 22M:
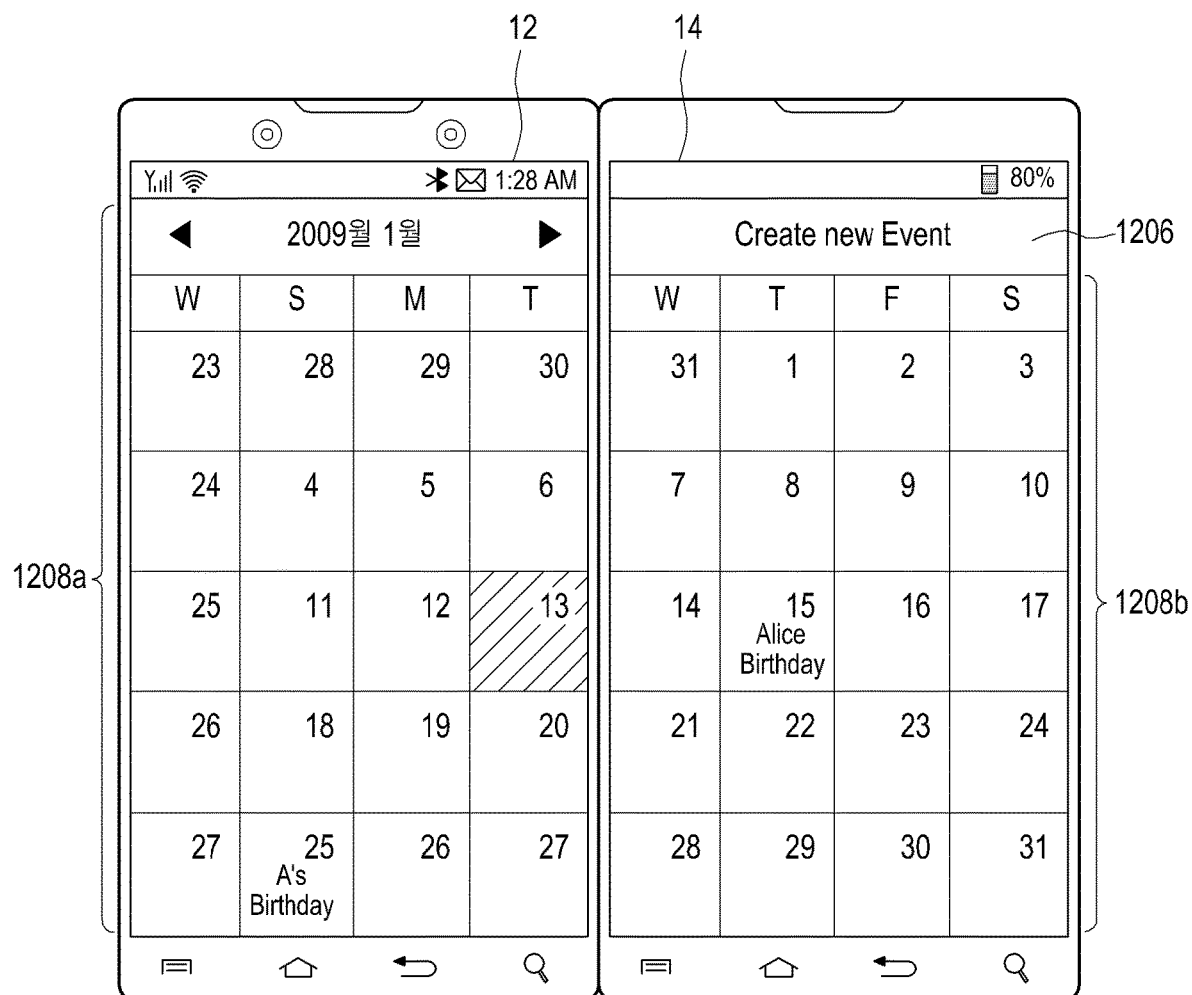

FIGS. 22K to 22M illustrate a scenario for deleting an event registered in the schedule management application according to an exemplary embodiment.

Referring to FIG. 22K, the portable device displays the first and second calendar areas 1208*a* and 1208*b* including day blocks included in the selected month in the first and second touch screens 12 and 14, respectively. Although the calendar areas 1208*a* and 1208*b* of the month mode are illustrated herein, the event may be deleted in a similar way to that when the calendar area of the week mode is displayed over the two touch screens 12 and 14. The portable device can detect a deletion command of the event through the first or second touch screen 12 or 14 or the menu button which is one of the physical buttons in the lower part of the first touch screen 12. For example, when a tap gesture 1214b is detected from the deletion key within the menu window 1208e loaded by selecting the menu button 1214a, the portable device recognizes the detection as a deletion command of the registered event and proceeds to FIG. 22L.

Referring to FIG. 22L, the portable device replaces the calendar area 1208a of the first touch screen 12 with an event deletion window 1212a and a deletion key 1212b for executing the deletion command and displays the replaced event deletion window 1212a and deletion key 1212b in response to the deletion command 1214b. The event deletion window 121a lists event deletion items corresponding to the registered events of the month of the calendar area 1202a displayed in the first touch screen 12. Each of the event deletion items includes an event name of each registered event and a check box, and an input of selecting the event item to be deleted is detected through the check box. When the calendar area 1208a of the month mode is displayed in the first touch screen 12, the event deletion window 1212a includes events registered in the month of the calendar area 1208a. Similarly, when the calendar area of the week mode is displayed in the first touch screen 12, the event deletion window 1212a includes events registered in the corresponding week.

The second touch screen 14 may be in a deactivated state when the event deletion window 1212a is displayed in the first touch screen 12. In the deactivated state, the second touch screen 14 is filled with a shadow and does not respond to the touch gesture.

When a tap gesture 1214c is detected from at least one check box of the event deletion item, that is, when a tap gesture 1214 is detected from "New year's Day" and "B's Birthday" and then a tap gesture 1214d is detected from the deletion key 1212b in the shown example, the portable device proceeds to FIG. 22M.

Referring to FIG. 22M, the portable device replaces the event deletion window 1212a and the deletion key 1212b of the first touch screen 12 with previous information, that is, the calendar area 1208a and displays the replaced calendar area 1208a in response to the detection of the tap gesture 1214d. When the event deletion window 1212a is removed from the first touch screen 12, the second touch screen 14 escapes from the deactivated state. From the first and second calendar areas 1208a and 1208b of FIG. 22M, the event item selected by the tap gesture 1214c on the event deletion window 1212a, that is, "B's Birthday" is removed.

The portable device provides a more convenient user interface for a call application through the display device including the first touch screen and the second touch screen arranged on at least one foldable panel.

Figure 23A:
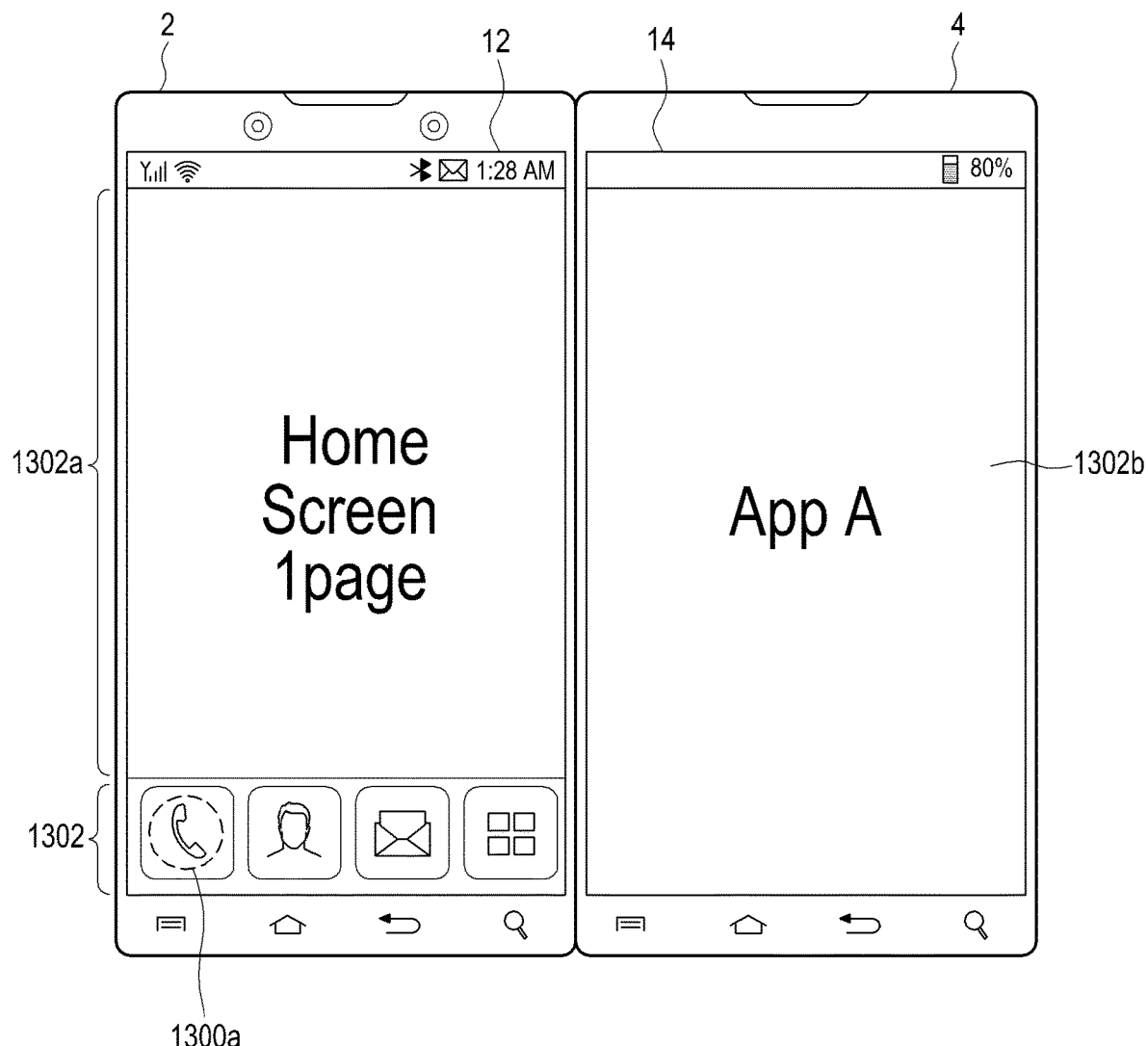
FIGS. 23A to 23P are diagrams illustrating a user interface of a call application according to one or more exemplary embodiments.
Figure 23B:
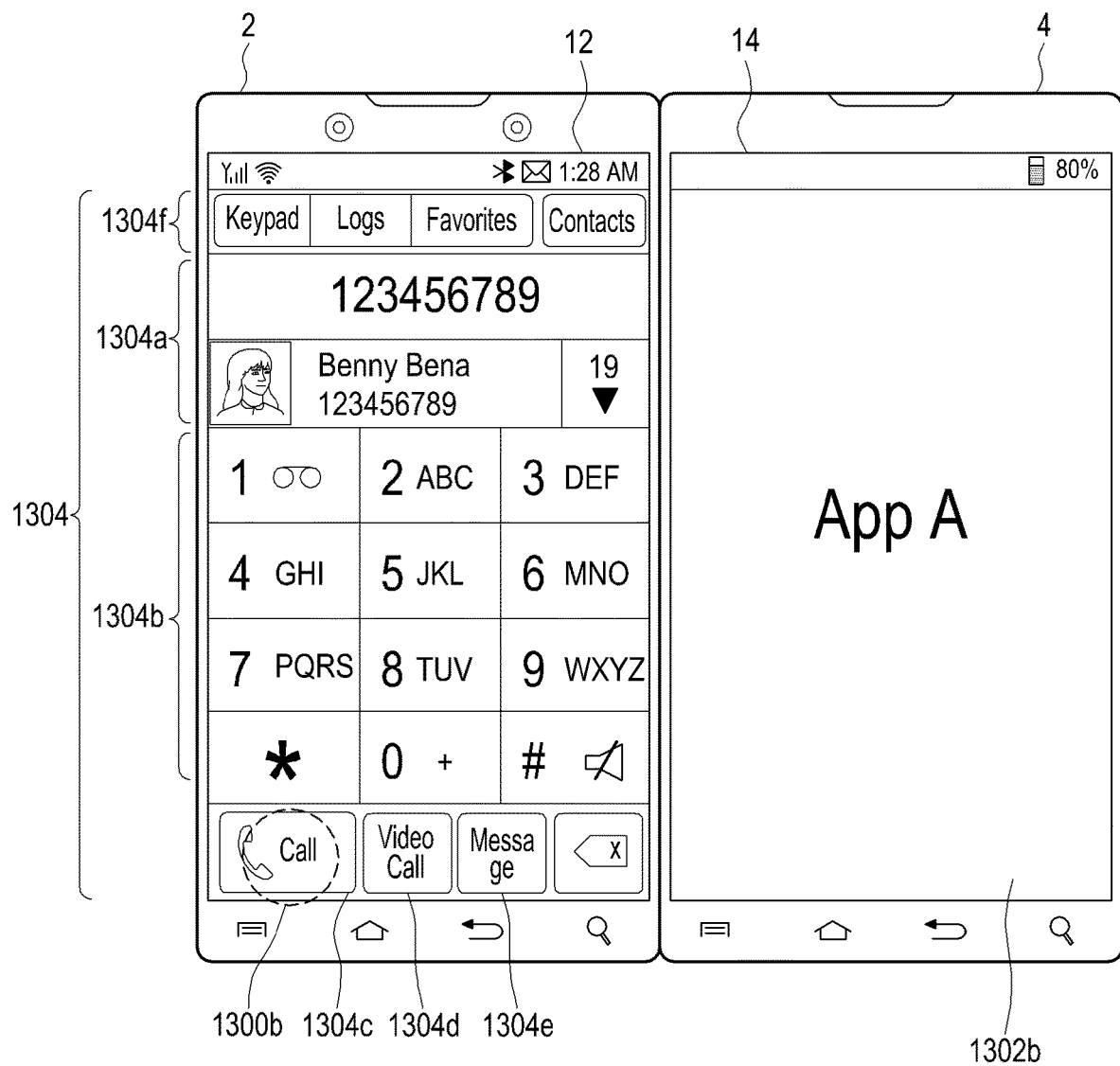
Figure 23C:
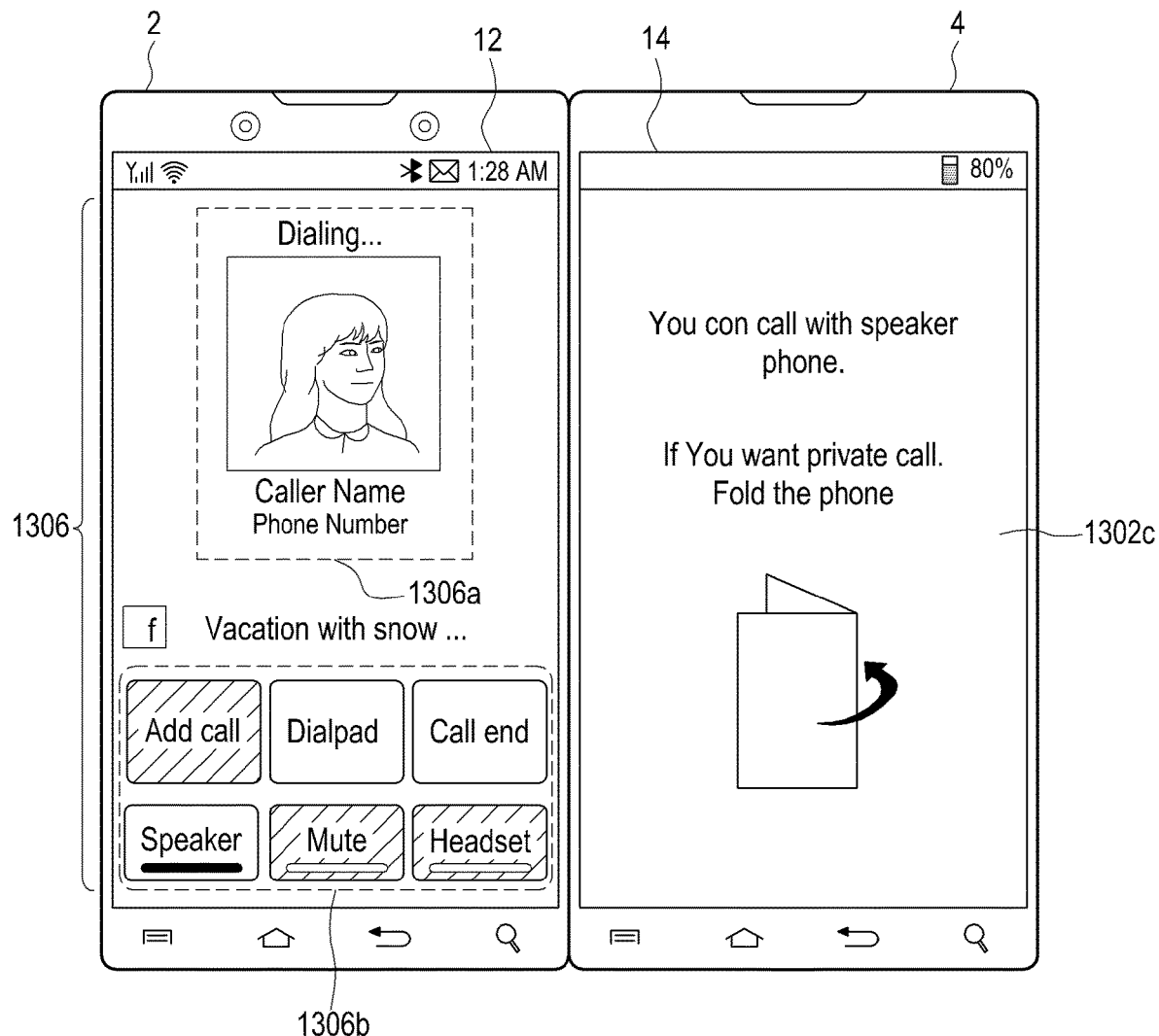
Figure 23D:
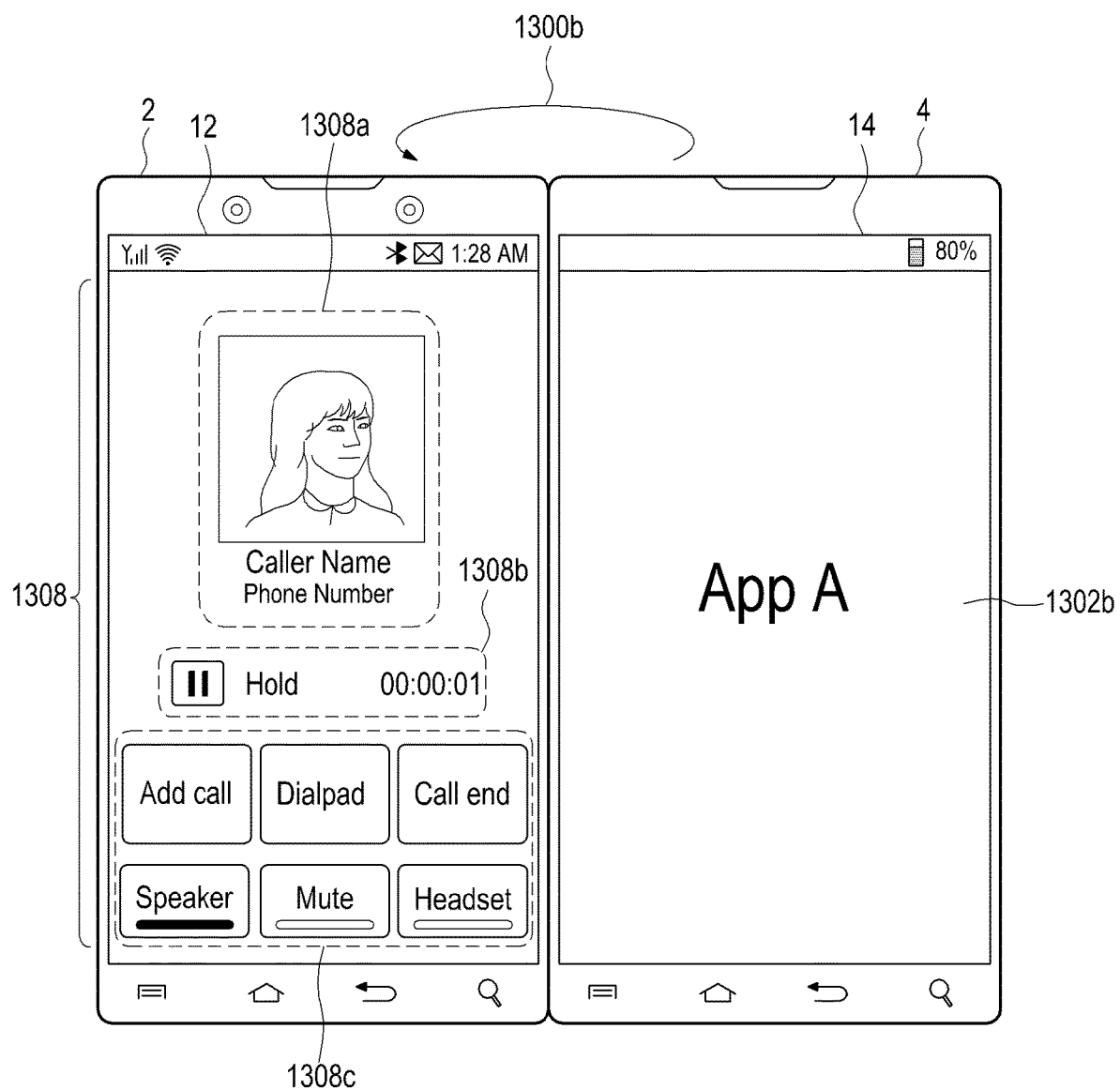
Figure 23E:
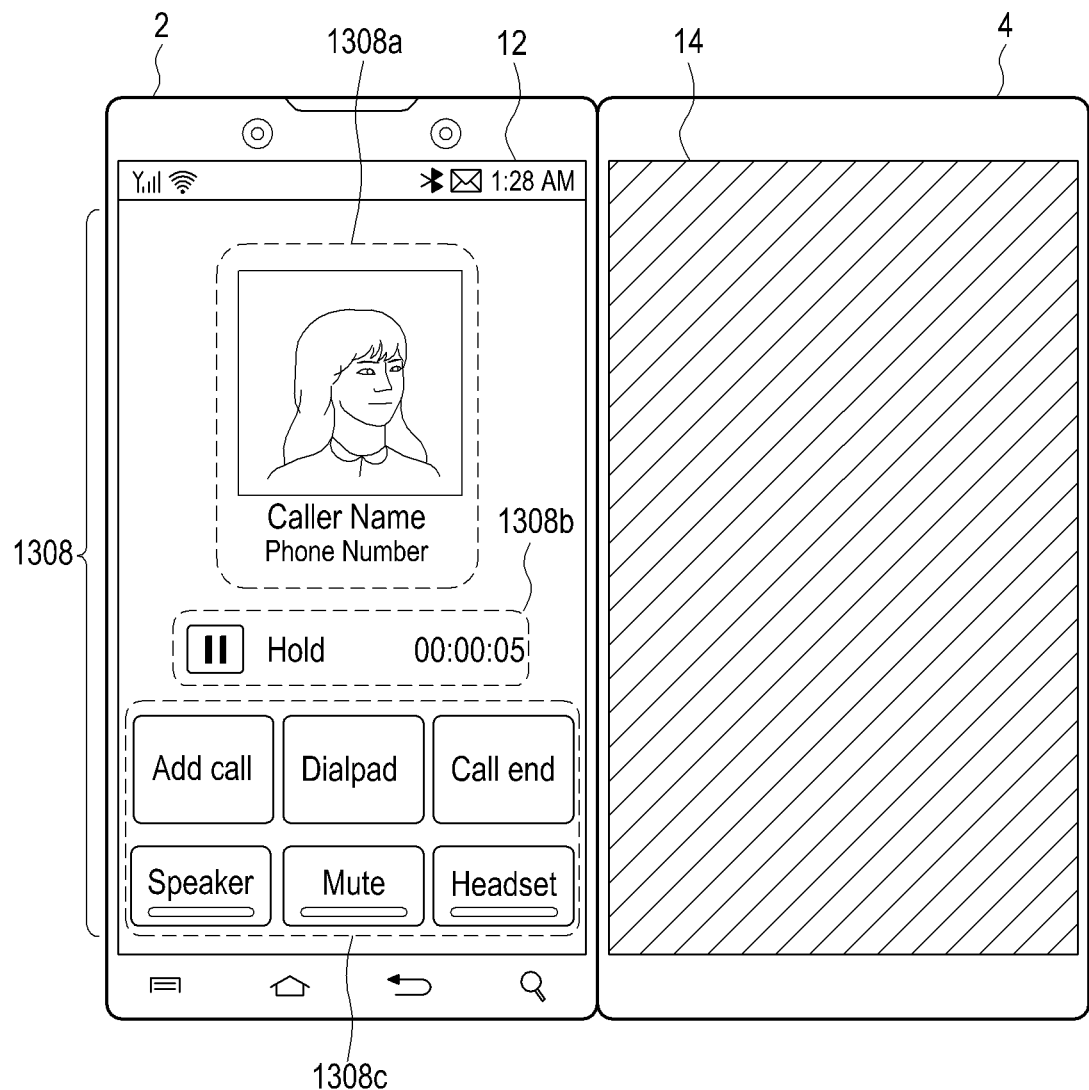
Figure 23F:
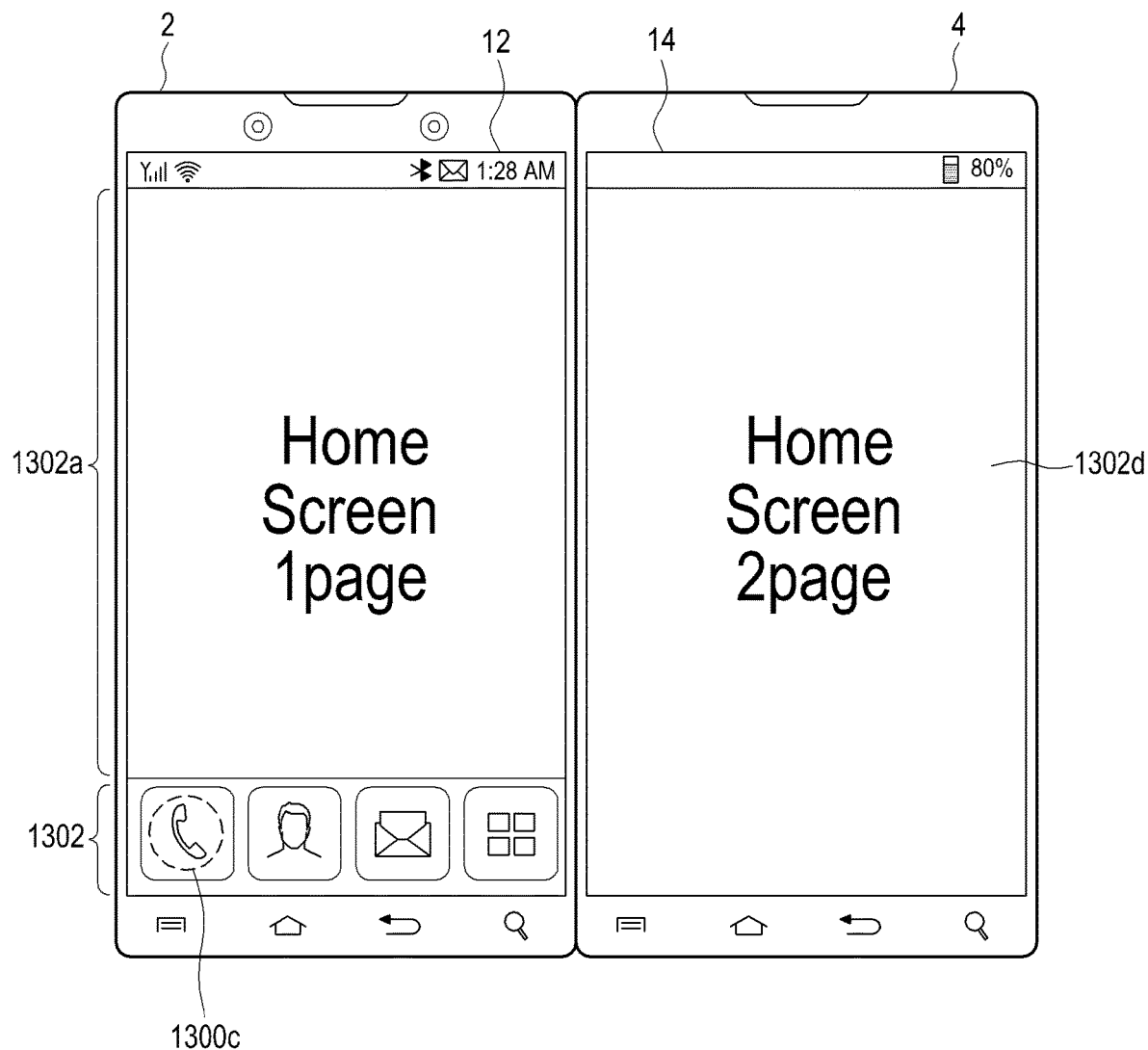
Figure 23G:
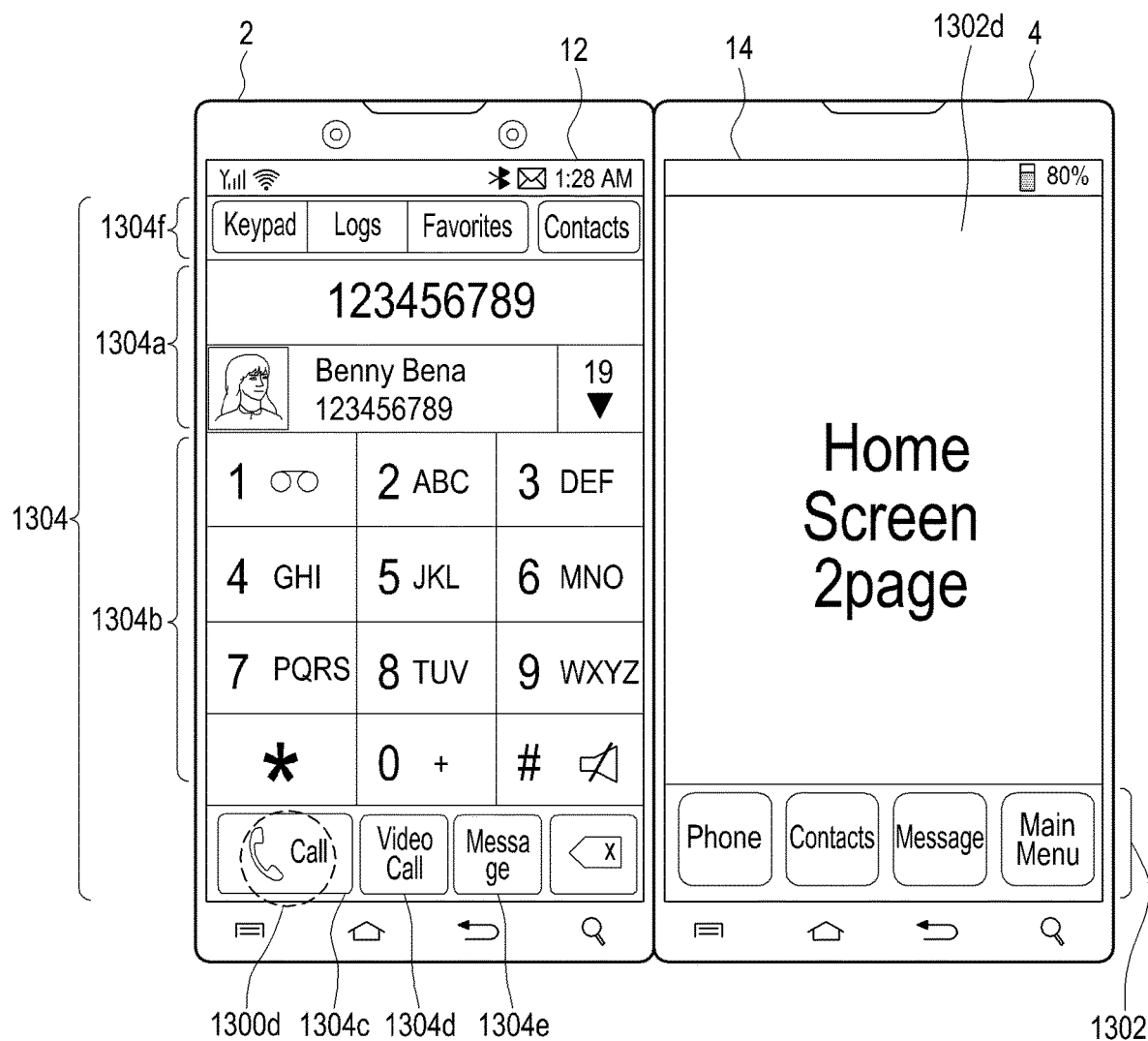
Figure 23H:
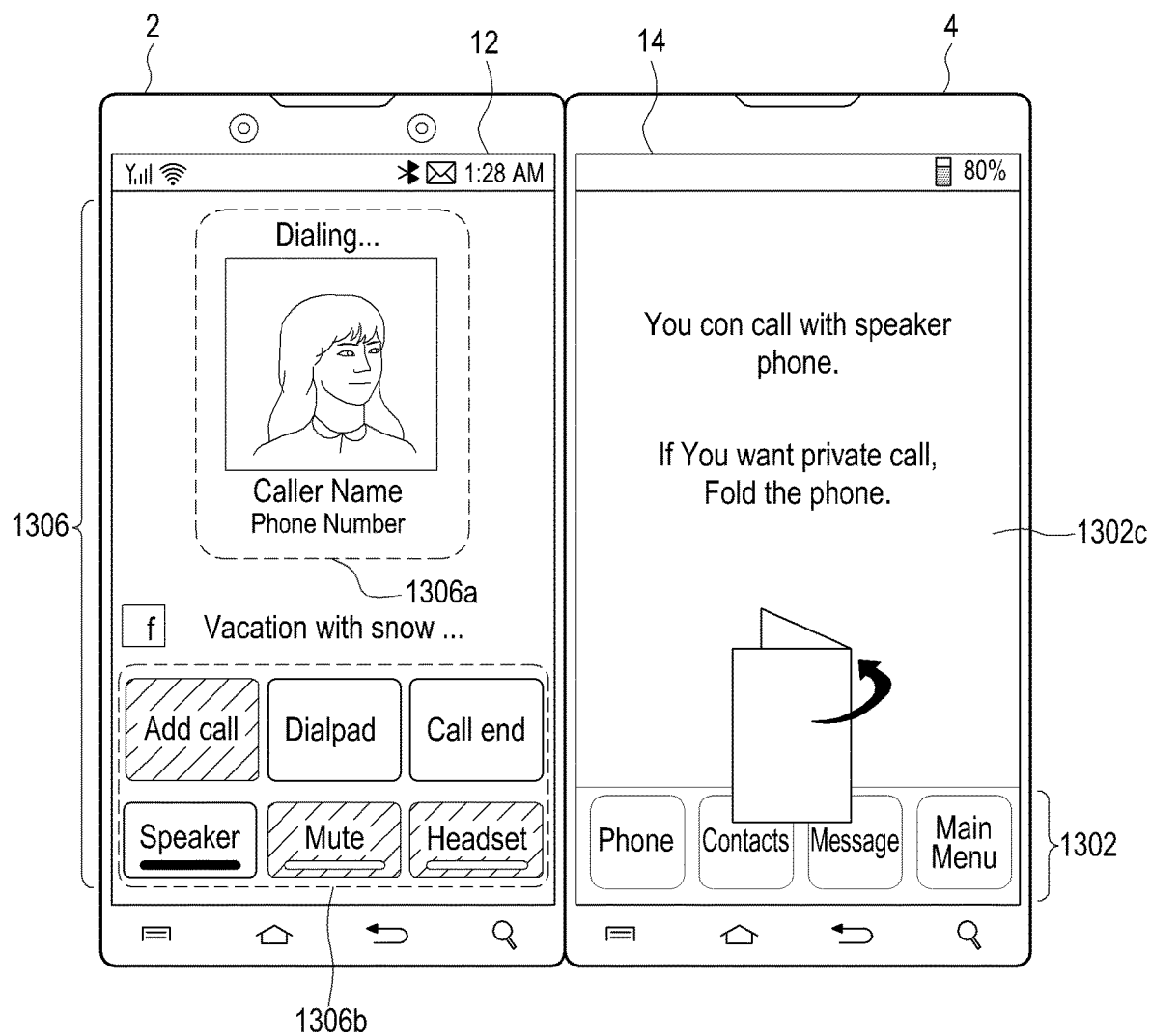
Figure 23I:
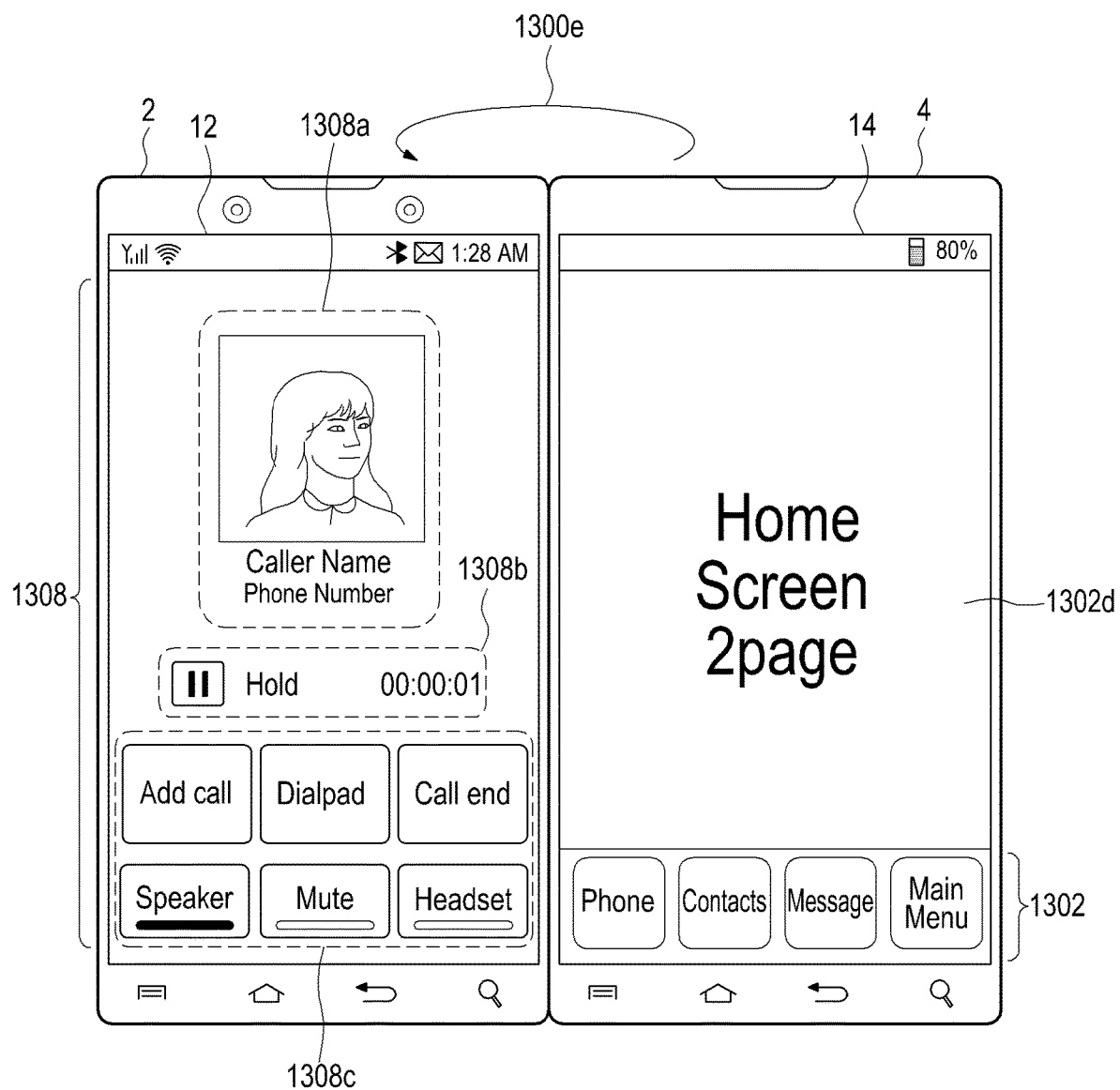
Figure 23J:
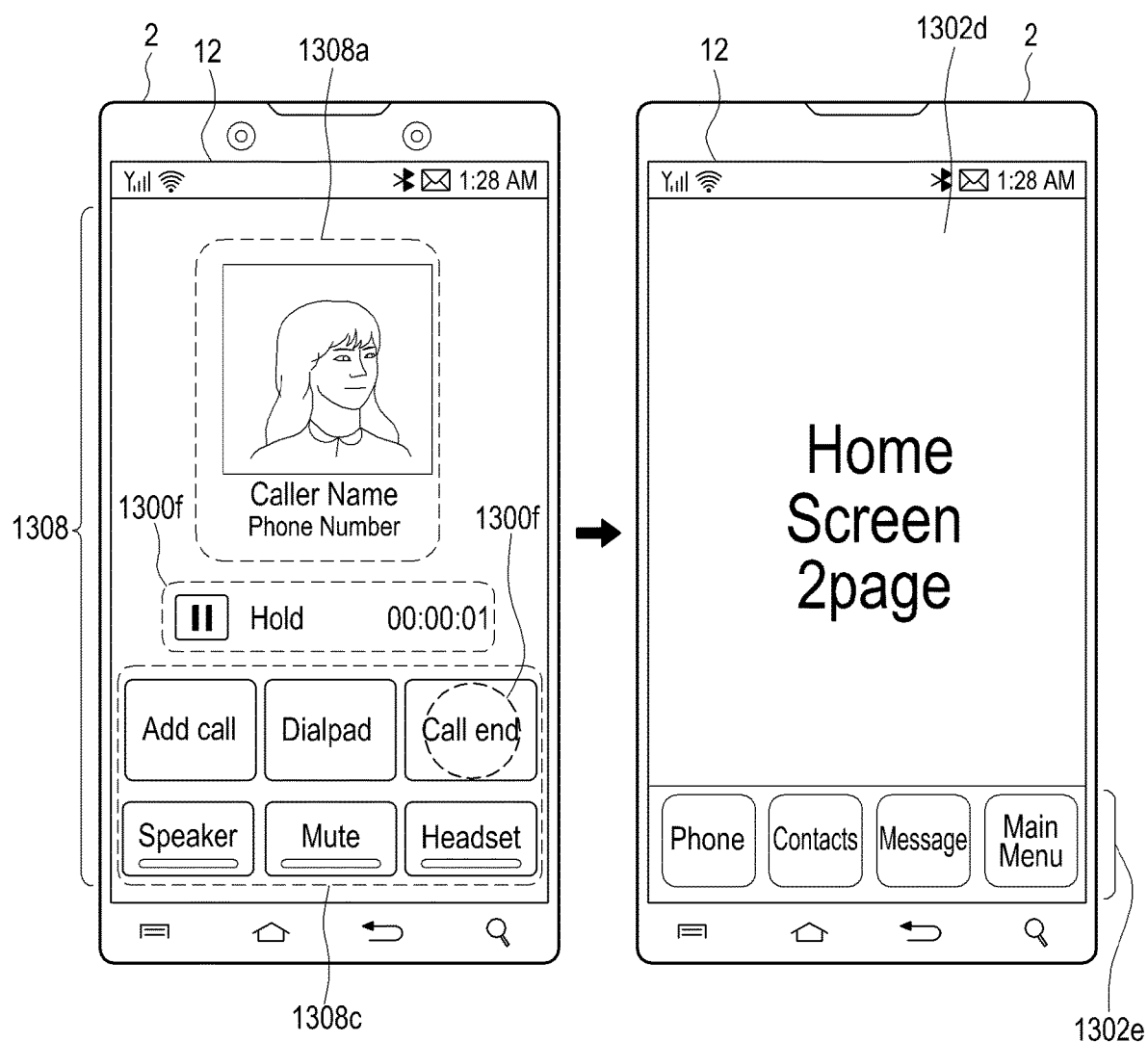
Figure 23K:
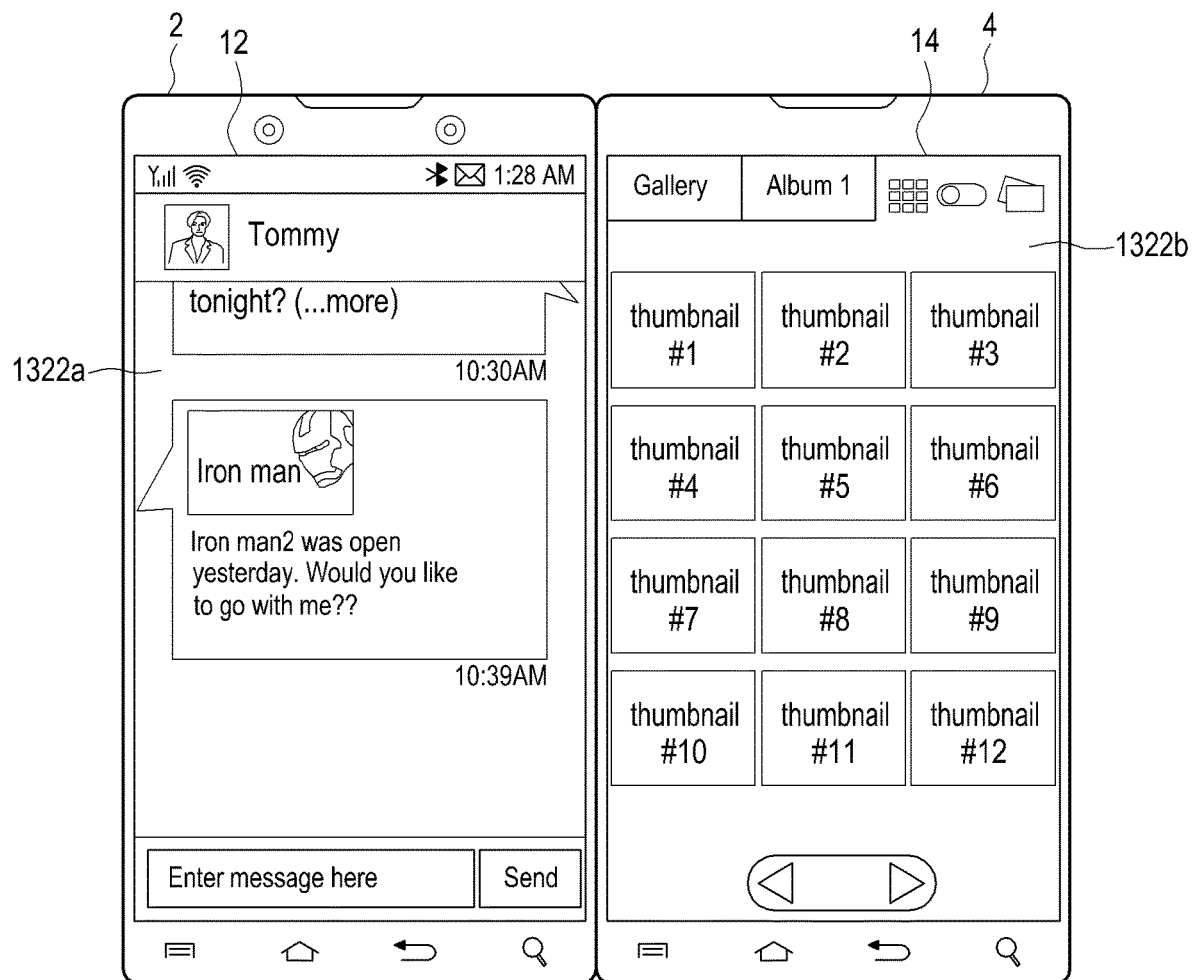
Figure 23L:
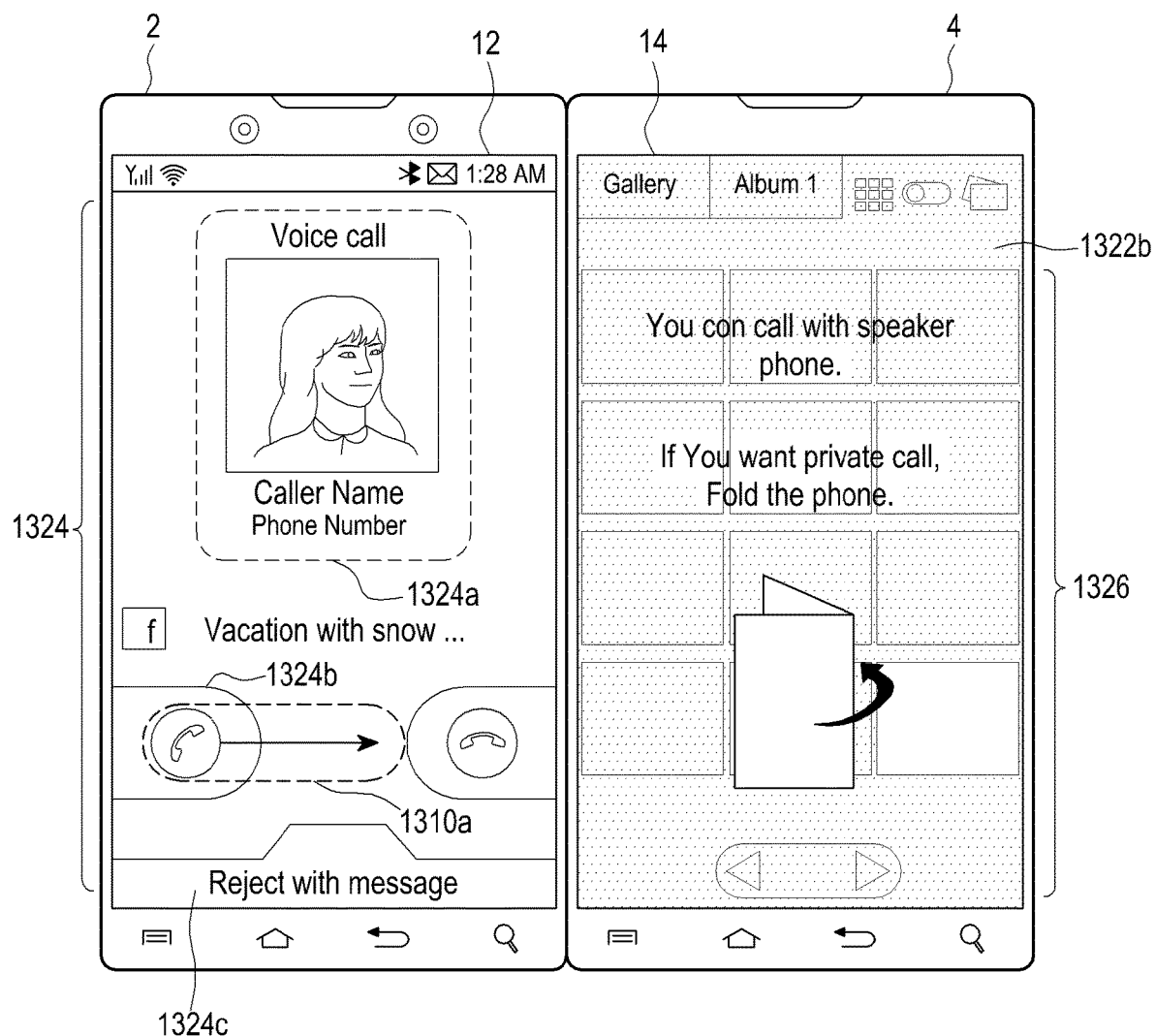
Figure 23M:
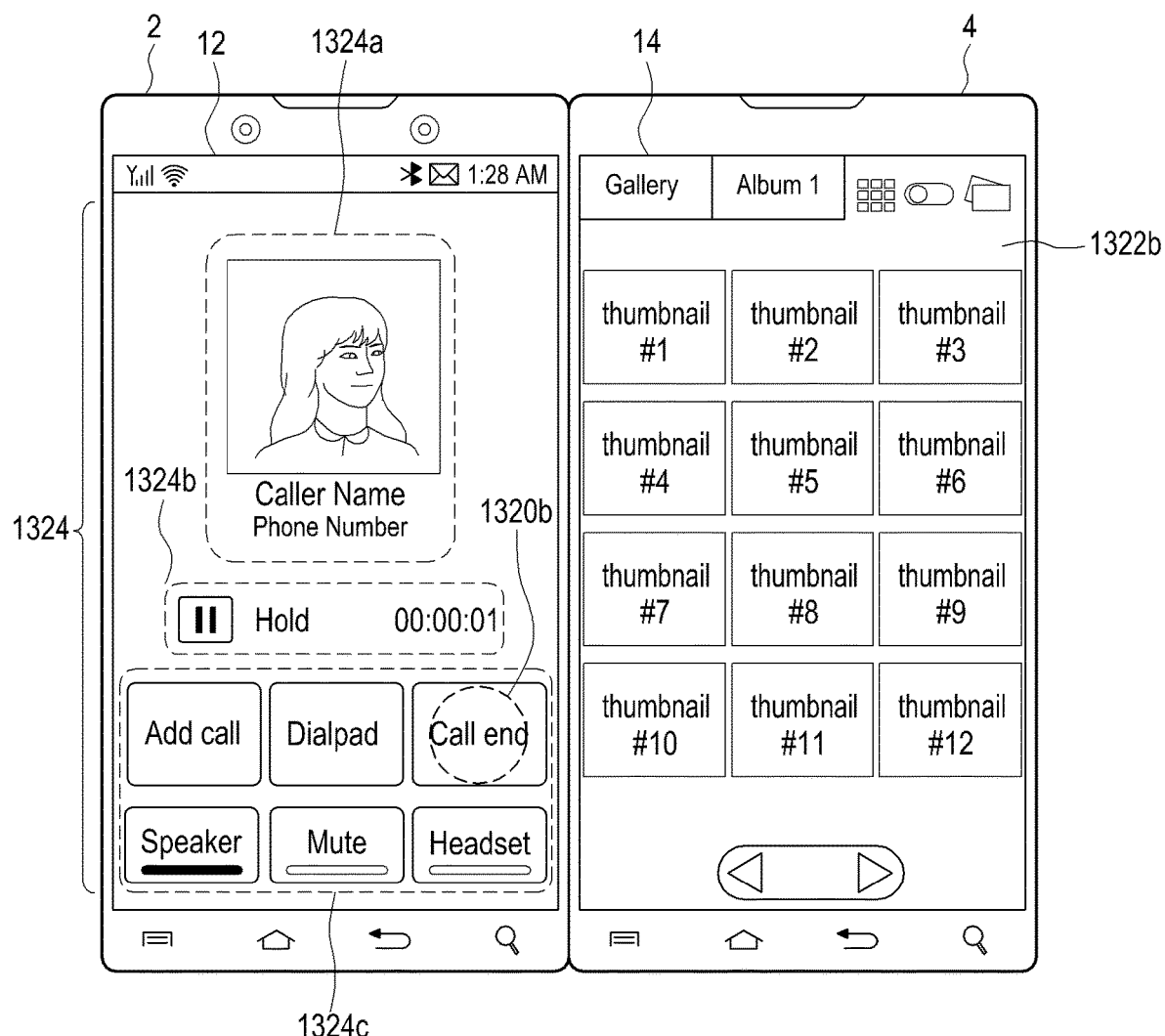
Figure 23N:
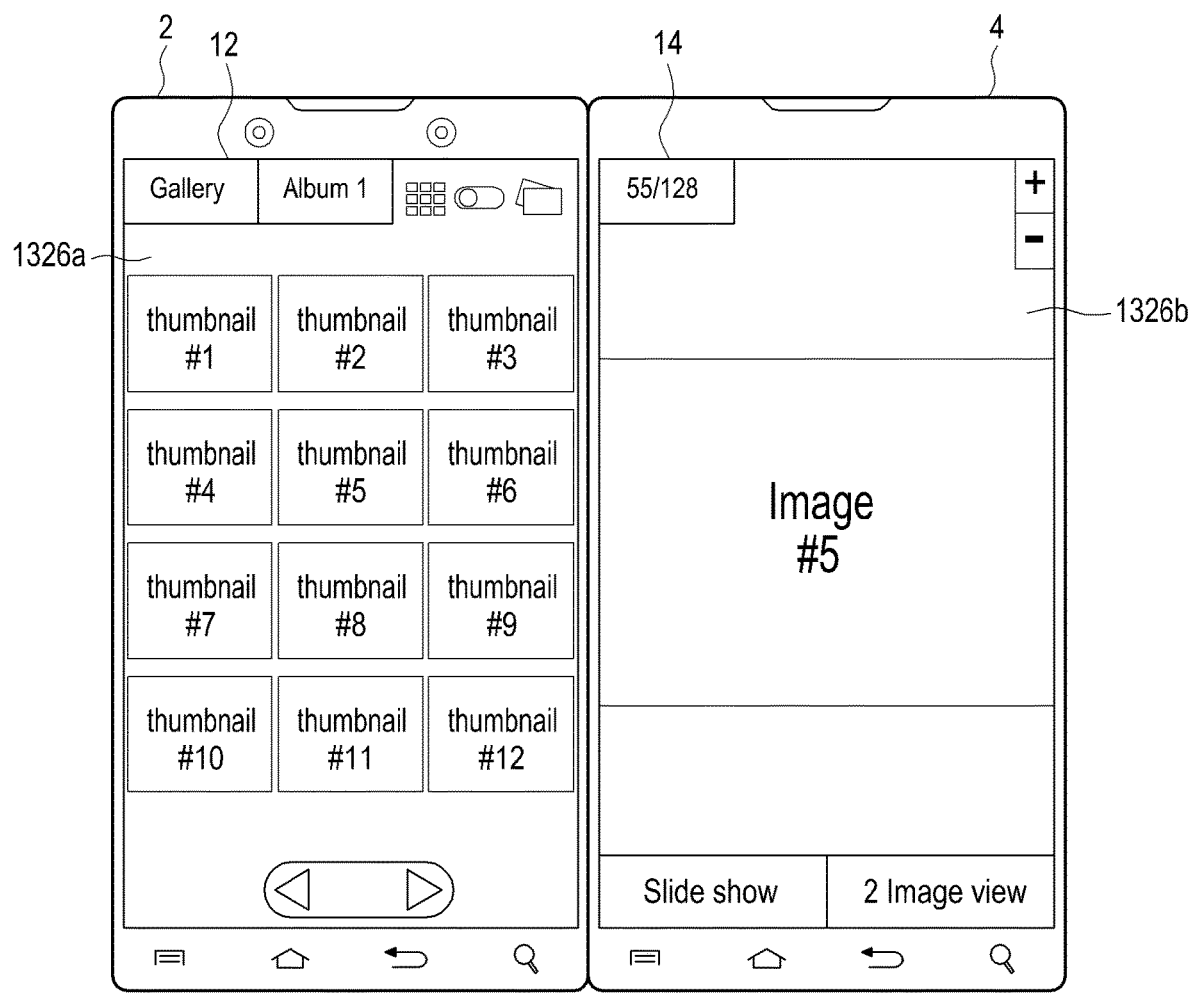
Figure 23O:
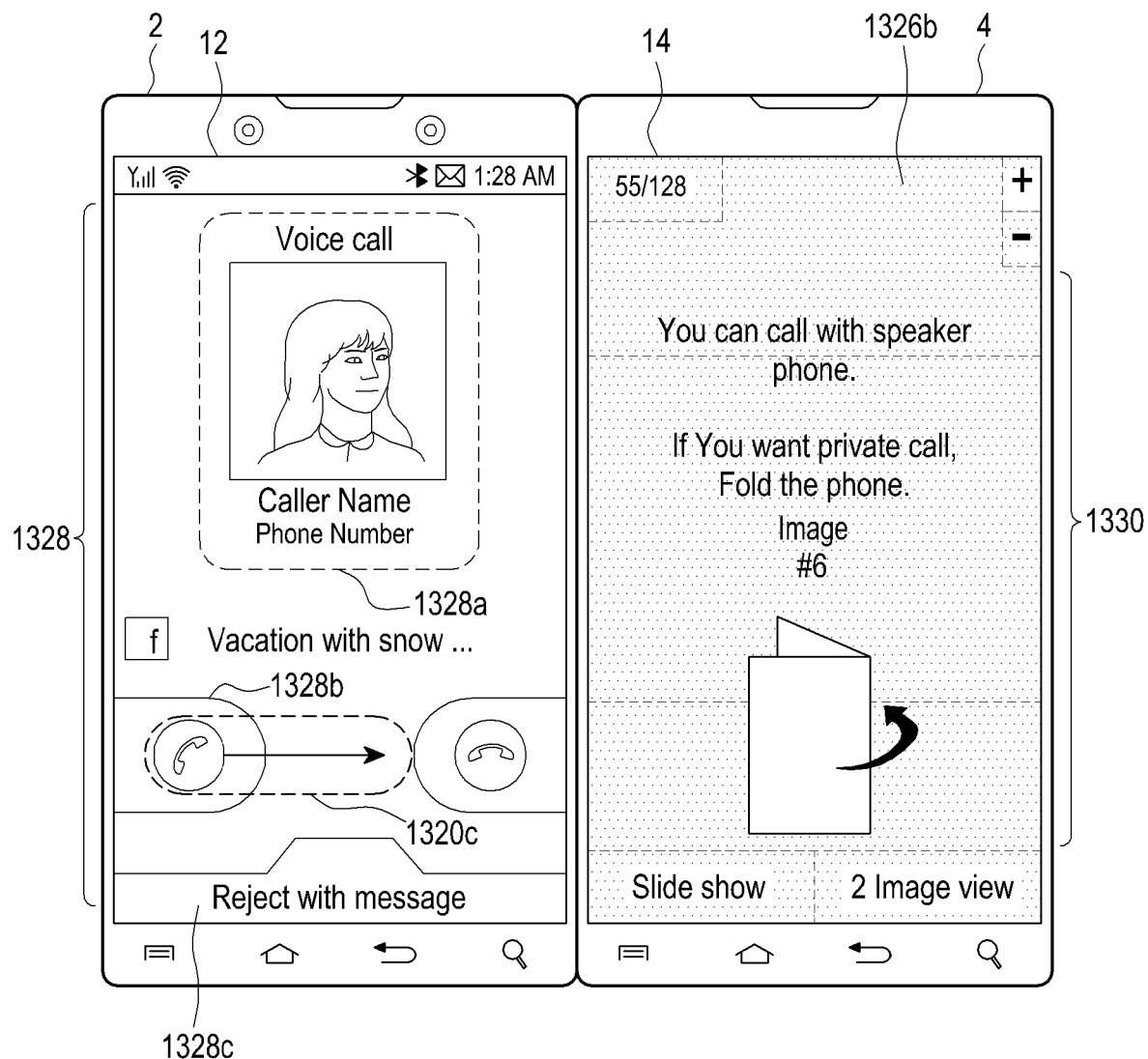
Figure 23P:
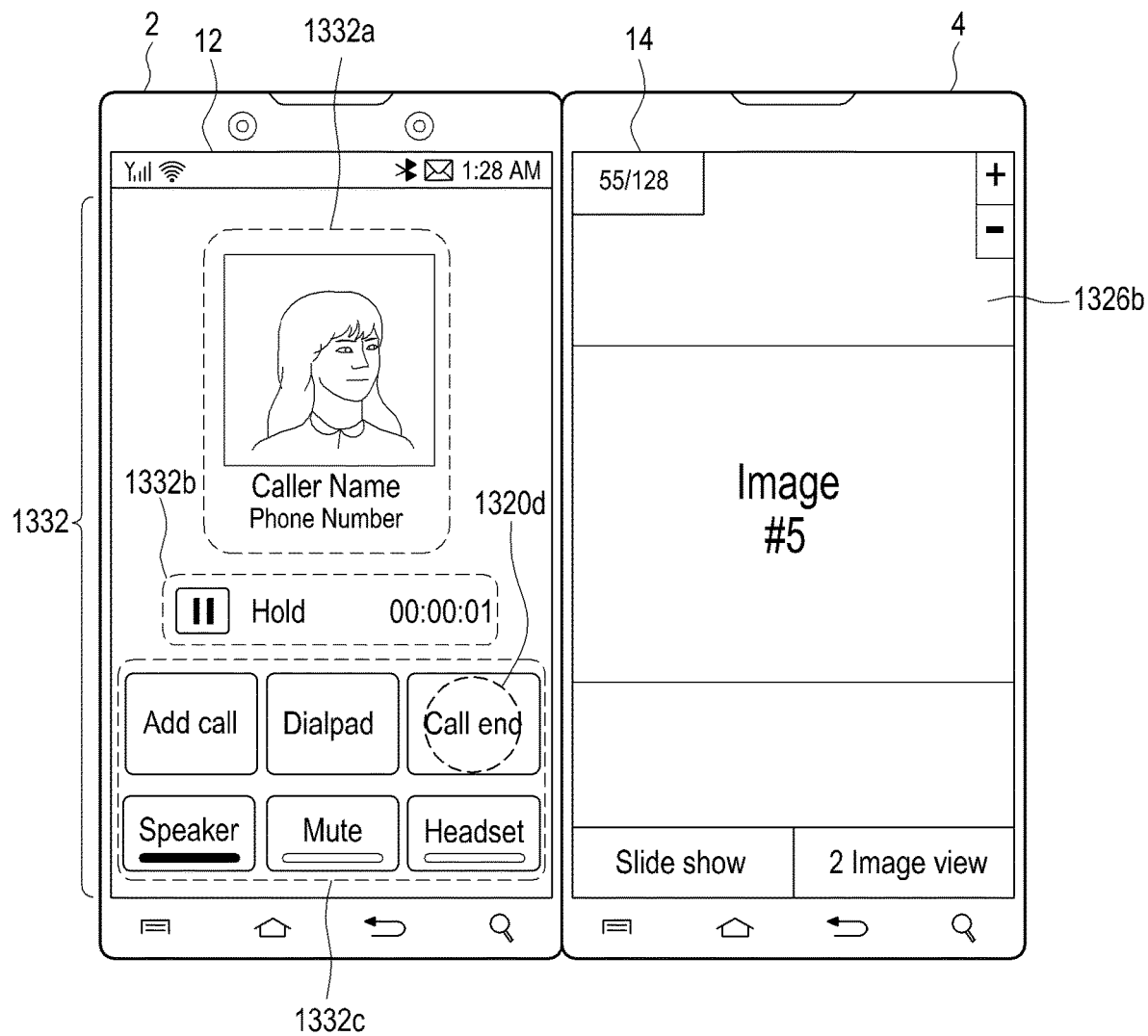

FIGS. 23A to 23P illustrate a user interface of a call application according to one or moreexemplary embodiments.

FIGS. 23A to 23E illustrate a scenario for processing an outgoing call in the call application according to an exemplary embodiment.

Referring to FIG. 23A, the first touch screen 12 displays a first page 1302a of the home screen and a dock area 1302 including icons of frequently used applications, and the second touch screen 14 displays an A application 1302b. When a predetermined touch gesture 1300a, for example, a tap gesture is detected from an icon of the call application among icons of the application menu which provides the call application, a contact information application, a message application, and application lists included in the dock area 1302, the portable device executes the call application and proceeds to FIG. 23B. Although the dock area 1302 displayed together with the home screen is illustrated herein, the following description can be similarly applied to a case where the dock area 1302 is displayed together with another application or the call application starts through a control of another menu of the portable device.

Referring to FIG. 23B, the portable device starts the call application in response to the detection of a touch gesture 1300a and replaces the first page 1302a of the home screen and the dock area 1302 with an outgoing call screen 1304 provided by the call application and displays the replaced outgoing call screen 1304 in the first touch screen 12. The outgoing call screen 1304 includes at least one of a number display area 1304a, a keypad area 1304b, a call key 1304c, a video call key 1304d, a message sending key 1304e, and a function key area 1304f Here, the function key area 1304f includes at least one of soft keys of functions which can be provided by the call application, for example, a keypad selection key for selecting whether to display the keypad area 1304b or selecting a type of keypad area 1304b, a log key for showing a call record, and a contact information key for calling contact numbers. As a selectable embodiment, when the call application is displayed in the first touch screen 12, the second touch screen 14 continuously displays the A application 1302b.

When a phone number to be called is input through the keypad area 1304b, the first touch screen 12 displays the input phone number in the number display area 1304a, and further displays a picture image and a name of the contact information corresponding to the phone number when they exist. When the input of the phone number is completely input into the keypad area 1304b of the first touch screen 12 and a tap gesture 1300b is detected from the call key 1304c, the portable device proceeds to FIG. 23C.

Referring to FIG. 23C, the portable device replaces the outgoing call screen 1304 with a dialing screen 1306 and displays the replaced dialing screen 1306 in the first touch screen 12 in response to the detection of the tap gesture 1300b. The dialing screen 1306 includes a call participant identification area 1306a and a function key area 1306b. The call participant identification area 1306a includes at least one of a name, a picture image, and a phone number of a counterpart call participant corresponding to the input phone number. The function key area 1306b includes at least one of soft keys of mid-call functions, for example, a phone number addition key, a dial pad call key, a call end key, a speaker key, a mute key, and a headset connection key. The phone number addition key, the mute key, and the headset connection key which cannot be used during the dialing may be deactivated. Here, the speaker key performs switching between a public call mode and a private call mode. Here, the public call mode refers to a state of relatively increasing volume of the speaker and sensitivity of the microphone to allow a remote call (or a state of turning on an external speaker), that is, a speaker phone mode, and the private call mode refers to a state of relatively decreasing volume of the speaker and sensitivity of the microphone to allow a call performed by the user having the portable device close to user's ear and mouth (or a state of turning off an external speaker).

When a call connection starts in a state where the first and second panels 2 and 4 including the first and second touch screens 12 and 14 are unfolded, the second touch screen 14 continuously displays the previously displayed A application

1302*b*, is turned off, or displays a guide message screen 1302*c* of advising the user to fold the portable device for the call.

As a selectable embodiment, the call application connects the call in the public call mode in the state where the first and second panels 2 and 4 are unfolded. Further, when the first and second panels 2 and 4 of the portable device are folded-out such that the first touch screen 12 faces a front side during the dialing, the second touch screen 14 may be turned off.

When a counterpart call participant detects that the call is connected in response to the call connection, the portable device proceeds to FIG. 23D.

Referring to FIG. 23D, the portable device displays a mid-call screen 1308 in the first touch screen 12 in response to the detection of the call connection. The mid-call screen 1308 includes a call participant identification area 1308*a*, a call duration time 1308*b*, and a function key area 1308*c*. The call participant identification area 1308*a* includes at least one of a picture image, a call participant name, and a phone number. The function key area 1308*c* includes at least one of a phone number addition key, a dial pad call key, a call end key, a speaker mode switching key, a mute key, and a headset connection key.

When the call is connected in the state where the first and second panels 2 and 4 including the first and second touch screens 12 and 14 are unfolded, the second touch screen 14 can remove the guide message screen 1302 and display the previously displayed information, that is, the A application 1302*b*. As another embodiment, the second touch screen 14 continuously maintains the guide message screen 1302*c* during the call in the unfolded state.

When it is detected that the first and second panels 2 and 4 included in the portable device are folded-out 1300*b* during the call in the public call mode, the portable device proceeds to FIG. 23E. Referring to FIG. 23E, the portable device turns off the second touch screen 14 and switches the public call mode to a deactivated state, that is, the private call mode in response to the folded-out 1300*b* of the first and second panels 2 and 4. Although not illustrated, when it is detected that the first and second panels 2 and 4 included in the portable device are unfolded during the call in the private call mode, the portable device displays again the previously displayed information, that is, the A application 1302*b* in the second touch screen 14 and activates the public call mode as illustrated in FIG. 23D.

FIGS. 23F to 23J illustrate another scenario for processing an outgoing call in the call application according to an exemplary embodiment.

Referring to FIG. 23F, the first touch screen 12 displays the first page 1302*a* of the home screen and the dock area 1302, and the second touch screen 14 displays a second page 1302*d*. When a predetermined touch gesture 1300*c*, for example, a tap gesture is detected from an icon of the call application included in the dock area 1302, the portable device executes the call application and proceeds to FIG. 23G. Although the dock area 1302 displayed together with the home screen is illustrated herein, the following description can be similarly applied to a case where the dock area 1302 is displayed with another application or the call application starts through a control of another menu of the portable device.

Referring to FIG. 23G, the portable device starts the call application in response to the detection of the touch gesture 1300*c* and displays an outgoing call screen provided by the call application 1304, that is, a number display area 1304*a*, the keypad area 1304*b*, the call key 1304*c*, the video call key 1304*d*, the message sending key 1304*e*, and the function key area 1304*f* in the first touch screen 12. For example, the key area 1304*f* includes at least one of a keypad selection key for selecting whether to display the keypad area 1304*b* or selecting a type of keypad area 1304*b*, a log key for showing a call record, and a contact information key for loading contact numbers. As a selectable embodiment, when the call application starts in the first touch screen 12 while the second touch screen 14 displays the second page 1302*d* of the home screen, the dock area 1302 may be moved to and then displayed in a lower part of the second page 1302*d* of the second touch screen 14.

When a phone number to be called is input through the keypad area 1304*b*, the first touch screen 12 displays the input phone number in the number display area 1304*a*, and further displays a picture image and a name of the contact information corresponding to the phone number when they exist. When the phone number is completely input and a tap gesture 1300*d* is detected from the call key 1304*c*, the portable device proceeds to FIG. 23H.

Referring to FIG. 23H, the portable device displays the dialing screen 1306 in the first touch screen 12 in response to the detection of the tap gesture 1300*d*. The dialing screen 1306 includes the call participant identification area 1306*a* and the function key area 1306*b*. The call participant identification area 1306*a* includes at least one of a picture image, a call participant name, and a phone number. The function key area 1306*b* includes at least one of a phone number addition key, a dial pad call key, a call end key, a speaker key, a mute key, and a headset connection key. The phone number addition key, the mute key, and the headset connection key which cannot be used during the dialing may be deactivated.

When a call connection starts in a state where the first and second panels 2 and 4 including the first and second touch screens 12 and 14 are unfolded, the second touch screen 14 continuously displays the previously displayed A application 1302*b*, is turned off, or displays a guide message screen 1302*c* of advising the user to fold the portable device for the call. At this time, the guide message screen 1302*c* may be displayed to be overwritten with the second page 1302*d* of the home screen and the dock area 1302*e* which are previously displayed.

As a selectable embodiment, the call application connects the call in the public call mode in the state where the first and second panels 2 and 4 are unfolded. Further, when the portable device is folded-out, the second touch screen 14 may be turned off.

When a counterpart call participant detects that the call is connected in response to the call connection, the portable device proceeds to FIG. 23I.

Referring to FIG. 23D, the portable device displays the mid-call screen 1308 in the first touch screen 12 in response to the detection of the call connection. The mid-call screen 1308 includes the call participant identification area 1308*a*, the call duration time 1308*b*, and the function key area 1308*c*.

When the call is connected in the state where the first and second panels 2 and 4 including the first and second touch screens 12 and 14 are unfolded, the second touch screen can replace the guide message screen 1302*c* with the previously displayed information, that is, the second page 1302*d* of the home screen and display the replaced second page 1302*d*. As another embodiment, the second touch screen 14 continuously maintains the guide message screen 1302*c* during the call in the unfolded state.

When it is detected that the first and second panels 2 and 4 included in the portable device are folded-out 1300*e* during the call in the public call mode, the portable device turns off the second touch screen 14 and switches the public call mode to the private call mode as illustrated in FIG. 23J. When the call is performed in the folded-out state and then ends, for example, when a tap gesture 1300*f* is detected from the call end key, the portable device replaces the mid-call screen 1308 of the second touch screen 12 with the previous information, that is, the second page 1302*d* of the home screen and the dock area 1302*e* and displays the replaced second page 1302*d* and the dock area 1302*e*.

FIGS. 23K to 23M illustrate a scenario for processing an incoming call in the call application according to one or more exemplary embodiments.

Referring to FIG. 23K, the first touch screen 12 displays a first application 1322*a* and the second touch screen 14 displays a second application 1322*b*. The first and second applications 1322*a* and 1322*b* may be any of the home screen, the application menu, a basic application, and an application installed by the user. In the shown example, the first application 1322*a* is a message application such as a Short Messaging Service (SMS), an e-mail, or an Instant Messaging Service (IMS) and the second application 704 is a photo gallery application. As another example, the first and second touch screens 12 and 14 can display two task screens of one application in a main-sub mode or commonly display one task screen of one application in a full mode. When an incoming call is generated while the first and second touch screens 12 and 14 display one or more applications 1322*a* and 1322*b*, the portable device proceeds to FIG. 23L.

Referring to FIG. 23L, the portable device starts the call application in response to the generation of the incoming call, and replaces the first application 1322*a* with an incoming call screen 1324 provided by the call application and displays the replaced incoming call screen 1324 in the first touch screen 12. The incoming call screen 1324 includes at least one of a call participant identification area 1324*a*, an incoming key area 1324*b*, and a rejection message key 1324*c*. The call participant identification area 1324*a* includes at least one of a picture image, a call participant name, and a phone number. The incoming key area 1324*b* may include an incoming key and a rejection key. The rejection key is used to reject the incoming call without sending a message. The rejection message key 1324*c* is used to automatically send a rejection message by the message application.

The second touch screen 14 is deactivated while the incoming call screen 1324 is displayed in the first touch screen 12 and a guide message screen 1326 of advising the user to fold the portable device for the call is displayed.

When a predetermined touch gesture 1310*a*, for example, a tap gesture on the incoming key or a touch drag (slide) starting at the incoming key and moving in a predetermined direction is detected, the portable device proceeds to FIG. 23M.

Referring to FIG. 23M, the portable device connects a call with a counterpart call participant, and replaces the incoming call screen 1324 with the mid-call screen 1324 and displays the replaced mid-call screen 1324 in the first touch screen 12 in response to the detection of the touch gesture 1310*a*. The mid-call screen 1324 includes the call participant identification area 1324*a*, the call duration time 1324*b*, and the function key area 1324*c*. The call participant identification area 1324*a* includes at least one of a picture image, a counterpart call participant name, and a phone number. The function key area 1324*c* includes at least one of a phone number addition key, a dial pad call key, a call end key, a speaker mode switching key, a mute key, and a headset connection key.

As a selectable embodiment, when a touch gesture 1310*a* is detected from the incoming key in the state where the first and second panels 2 and 4 including the first and second touch screens 12 and 14 are unfolded, the call application starts a call connection in the public call mode and the second touch screen 14 is activated again.

When the call ends in the mid-call screen 1324, for example, when a tap gesture 1320*b* is detected from the call end key within the function key area 1324*c*, the portable device returns to FIG. 23K to replace the mid-call screen 1324 of the first touch screen 12 with the previous information, that is, the first application 1322*a* and display the replaced first application 1322*a*.

FIGS. 23N to 23P illustrate another scenario for responding to an incoming call in the call application according to one or more exemplary embodiments.

Referring to FIG. 23N, the first and second touch screens 12 and 14 display first and second task screens 1326*a* and 1326*b* of the first application. The first application may be any of the home screen, the application menu, the basic application, and the application installed by the user. In the shown example, the first application is a photo gallery application providing two task screens having different depths, the first task screen 1326*a* of the first touch screen 12 includes one page of a plurality of thumbnail images, and the second task screen 1326*b* of the second touch screen 14 displays a picture image of one thumbnail image selected from the thumbnail images with a larger size, that is, a full size.

When an incoming call is generated while the first and second touch screens 12 and 14 displays the task screens 1326*a* and 1326*b* of the first application, the portable device proceeds to FIG. 23O.

Referring to FIG. 23O, the portable device starts the call application in response to the generation of the incoming call, and replaces the first task screen 1326*a* of the first application with an incoming call screen 1328 provided by the call application and displays the replaced incoming call screen 1328 in the first touch screen 12. The incoming call screen 1328 includes a call participant identification area 1328*a*, an incoming key area 1328*b*, and a rejection message key 1328*c*. The call participant identification area 1328*a* includes at least one of a picture image, a call participant name, and a phone number. The incoming key area 1328*b* may include an incoming key and a rejection key. The rejection message key 1328*c* is used to automatically send a rejection message by the message application.

The second touch screen 14 is deactivated while the incoming call screen 1328 is displayed in the first touch screen 12, and a guide message screen 1330 of advising the user to fold the portable device for the call is displayed.

When a predetermined touch gesture 1320*c* on the incoming key within the incoming key area 1328*b*, for example, a tap gesture or a touch drag (slide) starting at the incoming key and moving in a predetermined direction is detected, the portable device proceeds to FIG. 23P.

Referring to FIG. 23P, the portable device connects a call with a counterpart call participant, and replaces the incoming call screen 1328 with the mid-call screen 1332 and displays the replaced mid-call screen 1332 in the first touch screen 12 in response to the detection of the touch gesture 1320*c*. The mid-call screen 1332 includes a call participant identification area 1332*a*, a call duration time 1332*b*, and a function key area 1332*c*. The call participant identification area 1332*a* includes at least one of a picture image, a counterpart call participant name, and a phone number. The function key area 1332*c* includes at least one of a phone number addition key, a dial pad call key, a call end key, a speaker mode switching key, a mute key, and a headset connection key.

As a selectable embodiment, when a touch gesture 1320*c* is detected from the incoming key in the state where the first and second panels 2 and 4 including the first and second touch screens 12 and 14 are unfolded, the call application starts a call connection in the public call mode and the second touch screen 14 is activated again.

When the call ends in the mid-call screen 1332, for example, when a tap gesture 1320*d* is detected from the call end key within the function key area 1332*c*, the portable device returns to FIG. 23N to replace the mid-call screen 1324 of the first touch screen 12 with the previous information, that is, the first task screen 1326*a* of the first application and display the replaced first task screen 1326*a*.

Figure 24A:
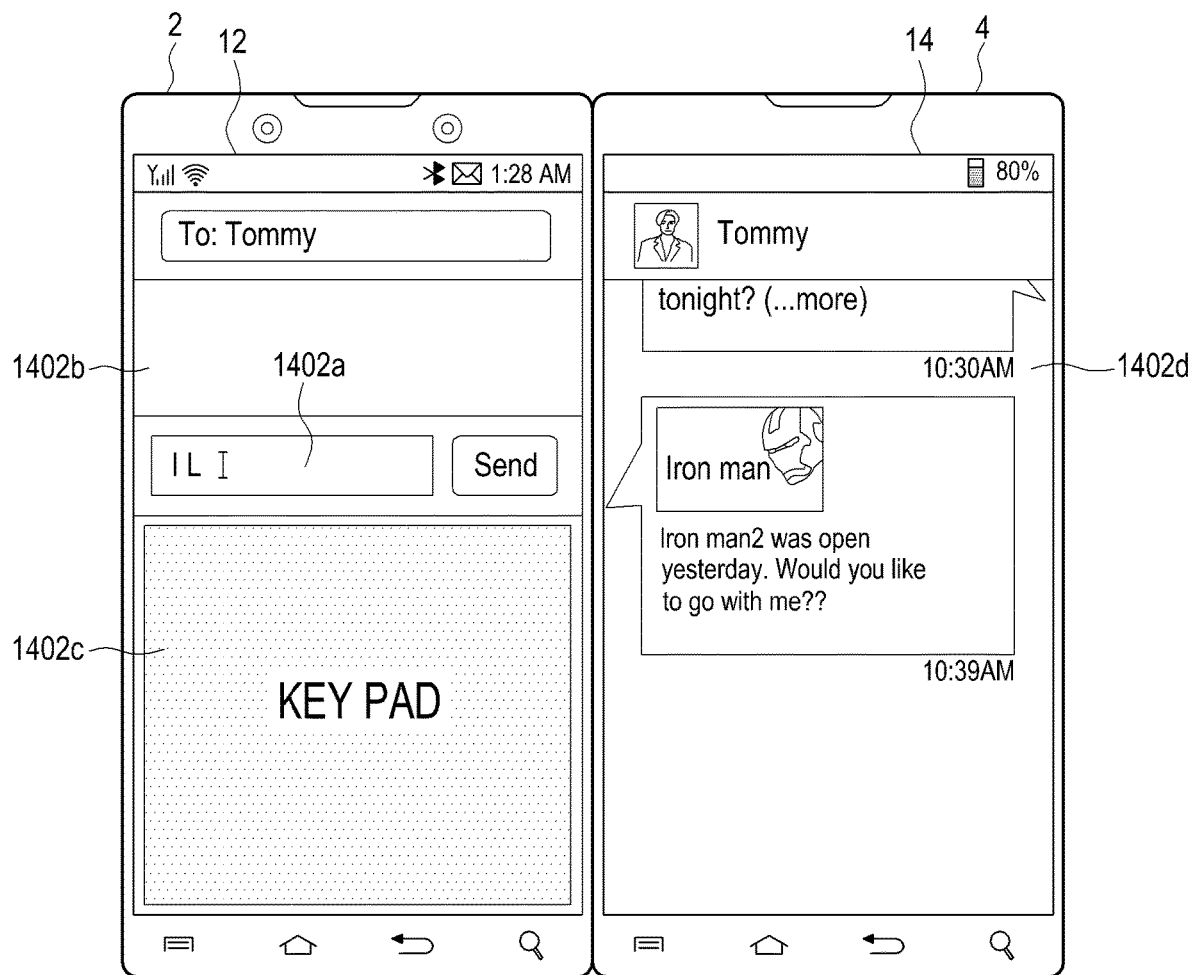
FIGS. 24A to 24R are diagrams illustrating a user interface of a call application according to one or more exemplary embodiments.
Figure 24B:
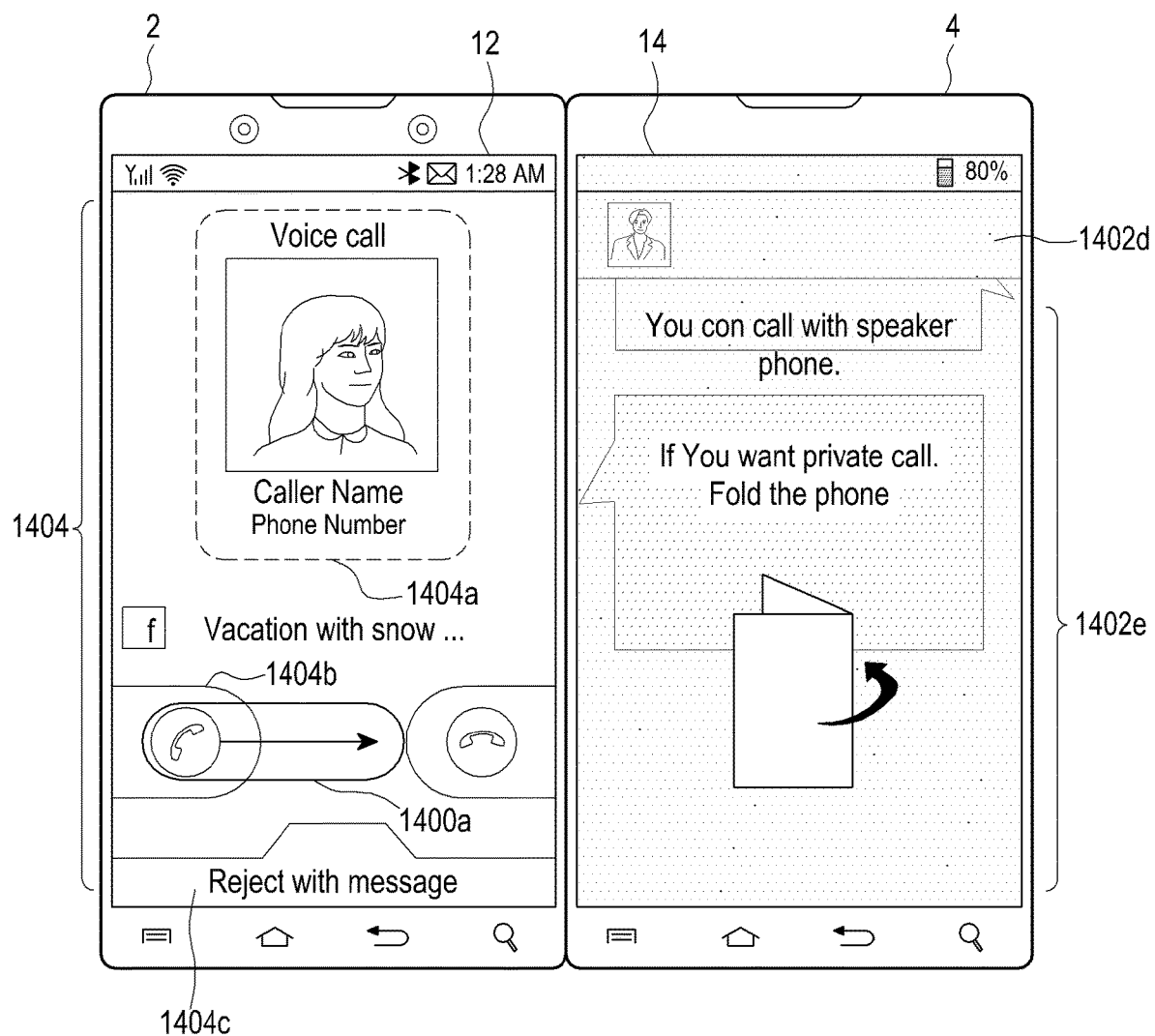
Figure 24C:
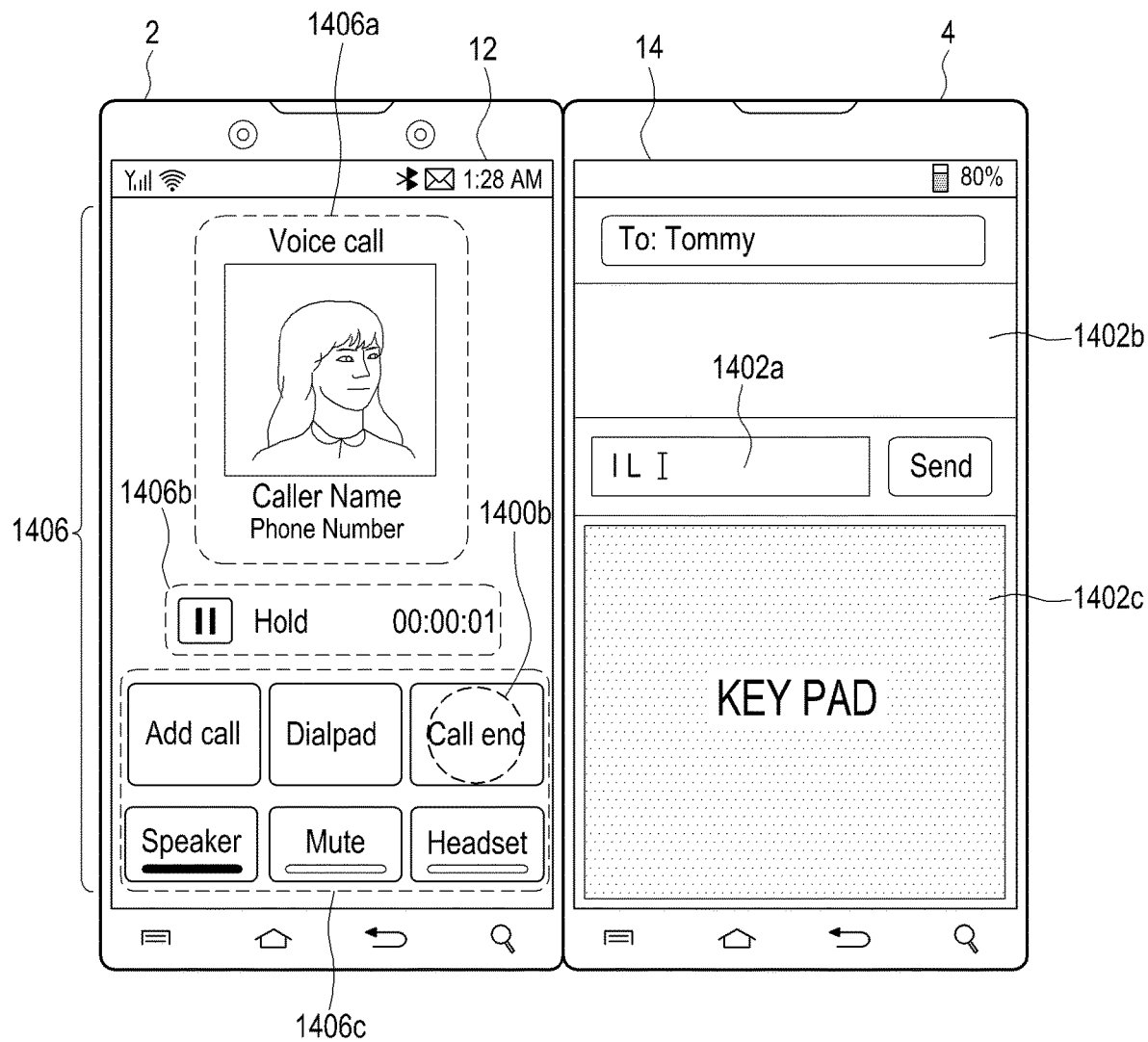
Figure 24D:
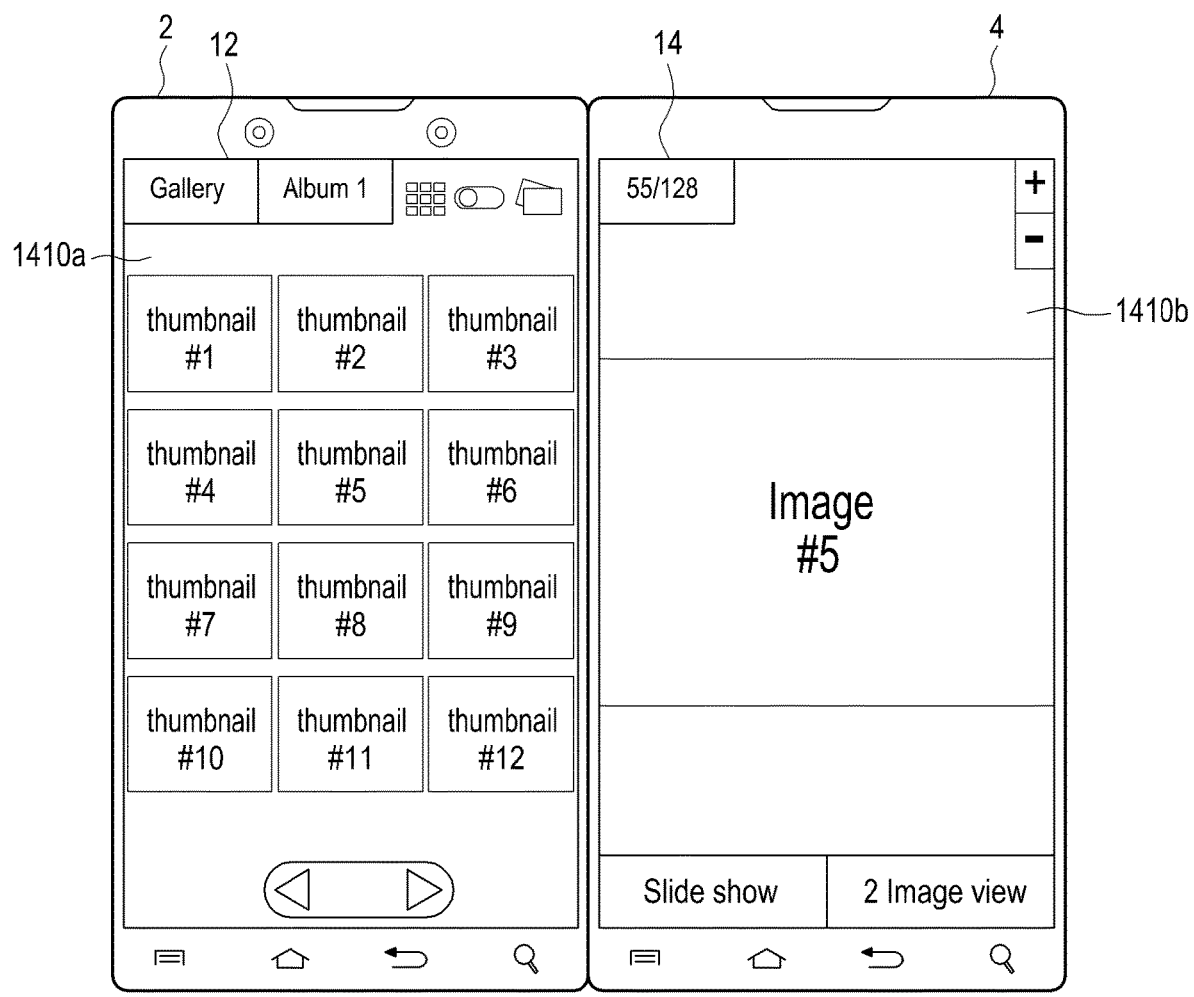
Figure 24E:
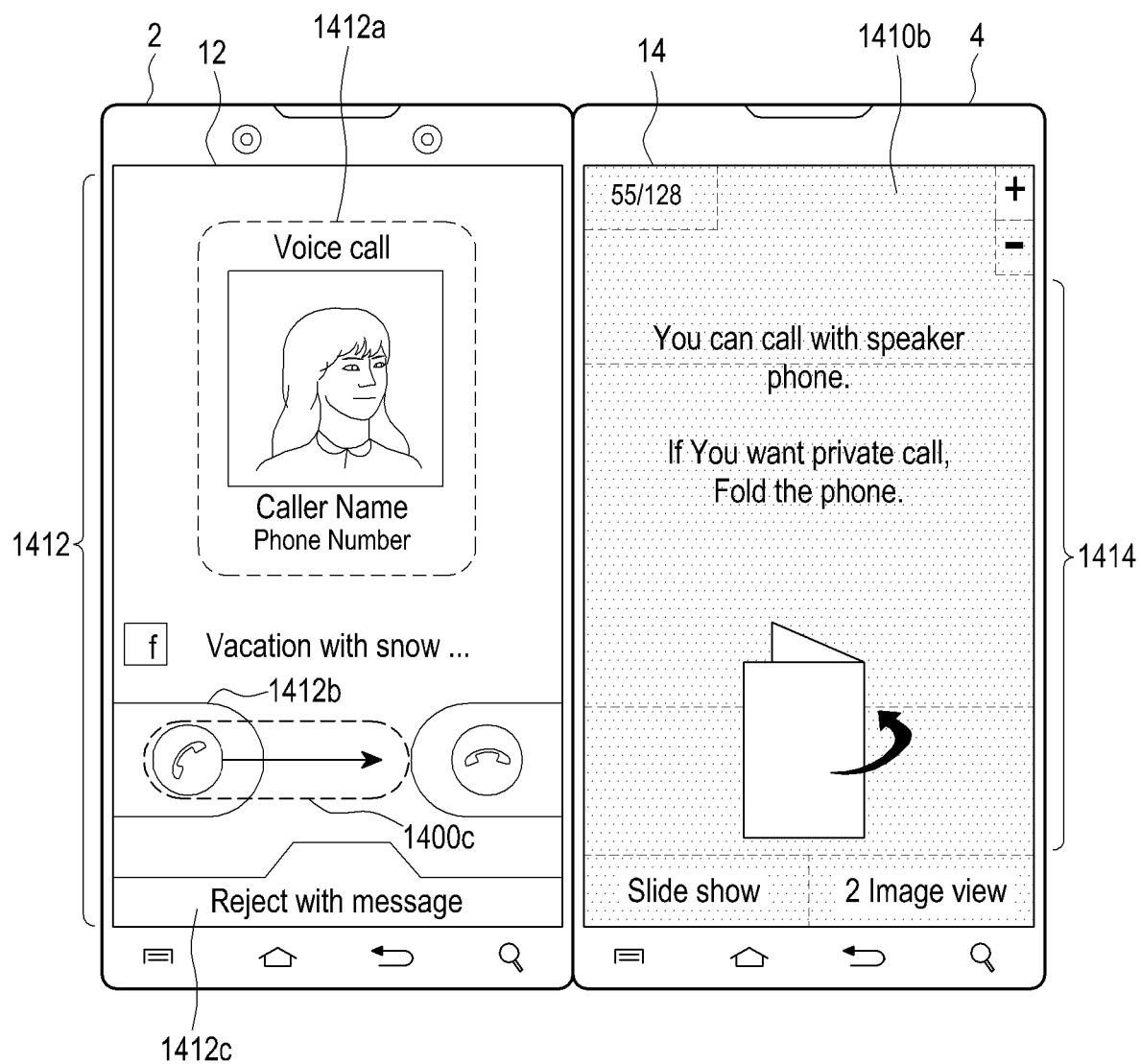
Figure 24F:
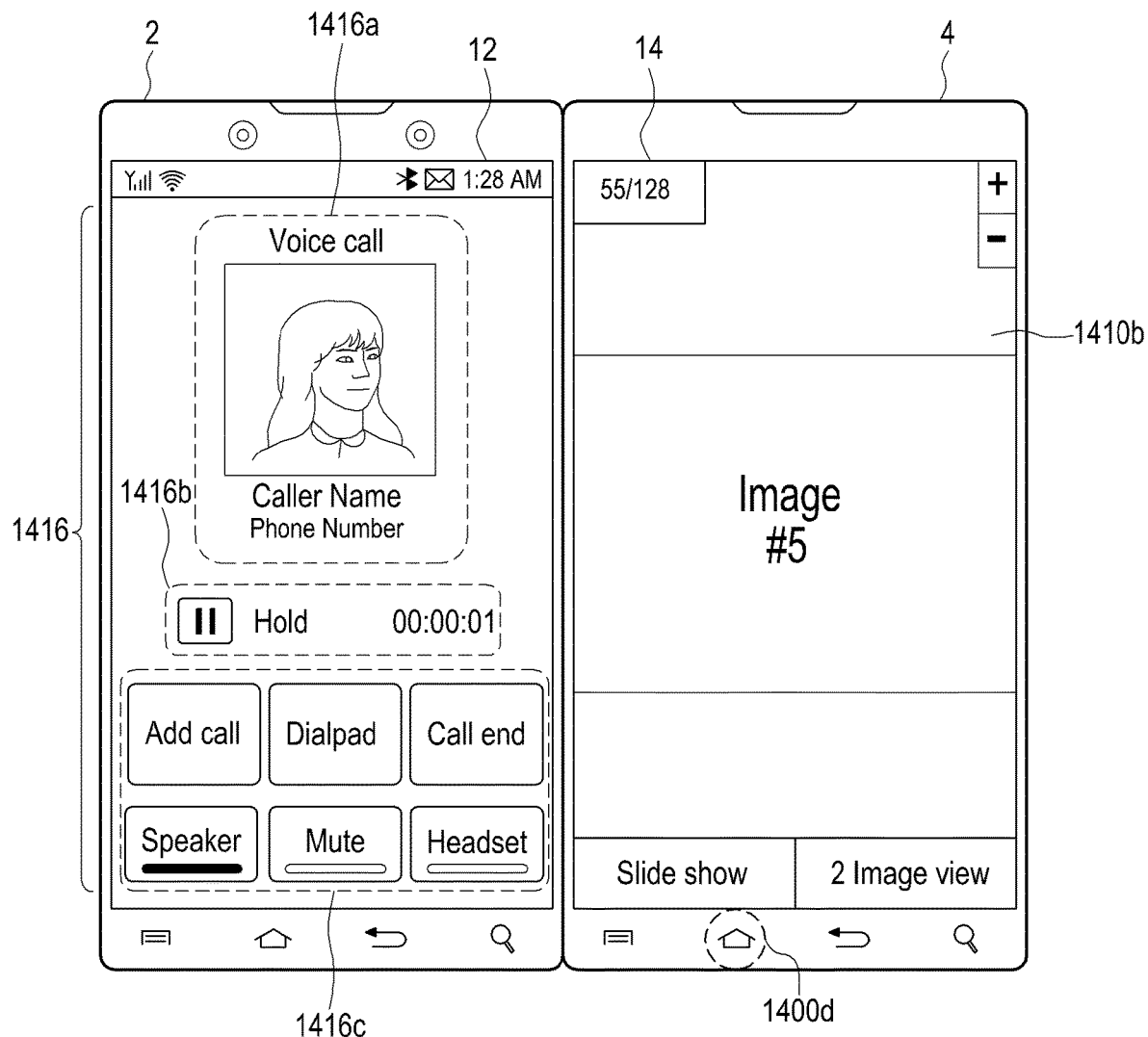
Figure 24G:
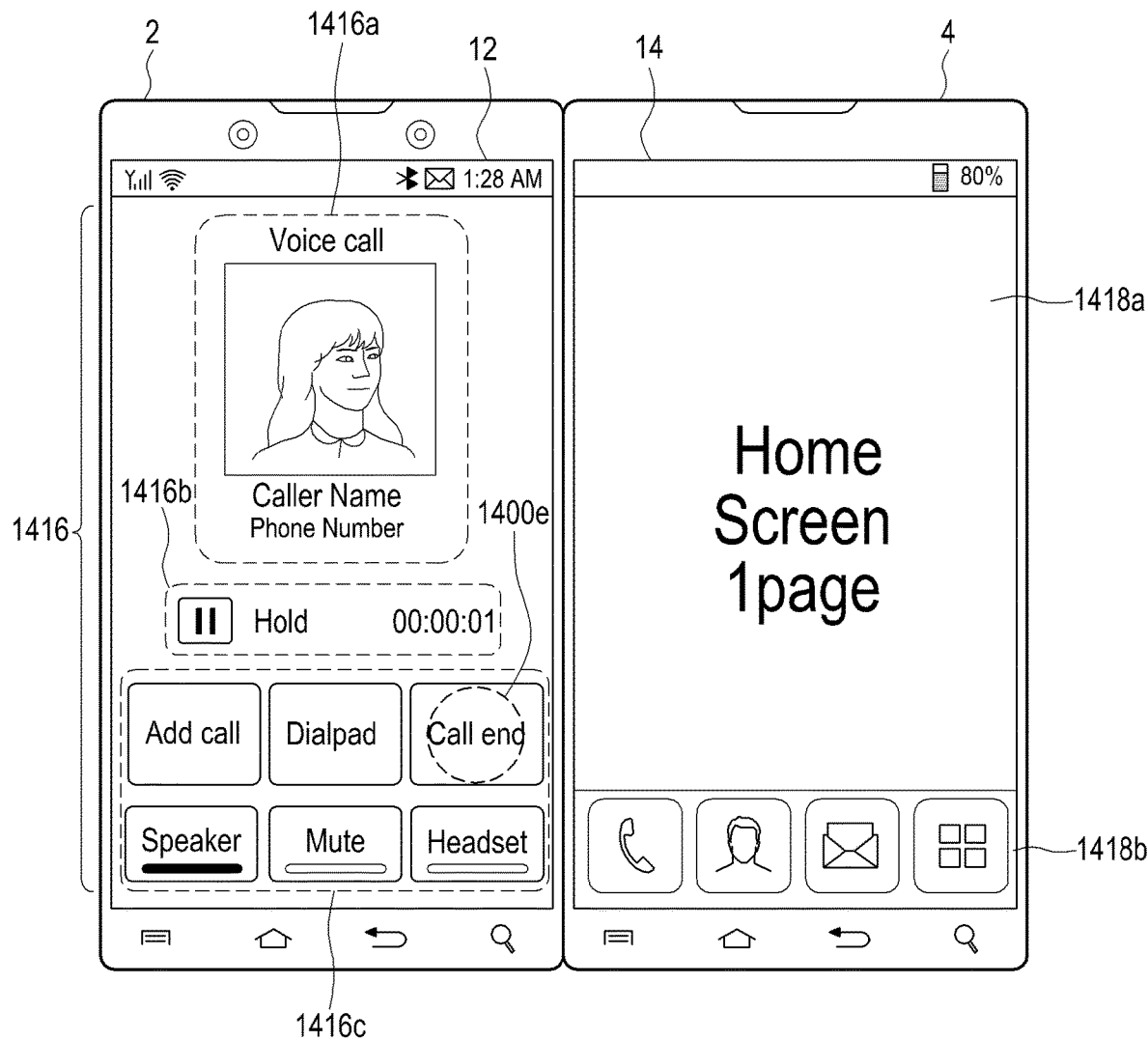
Figure 24H:
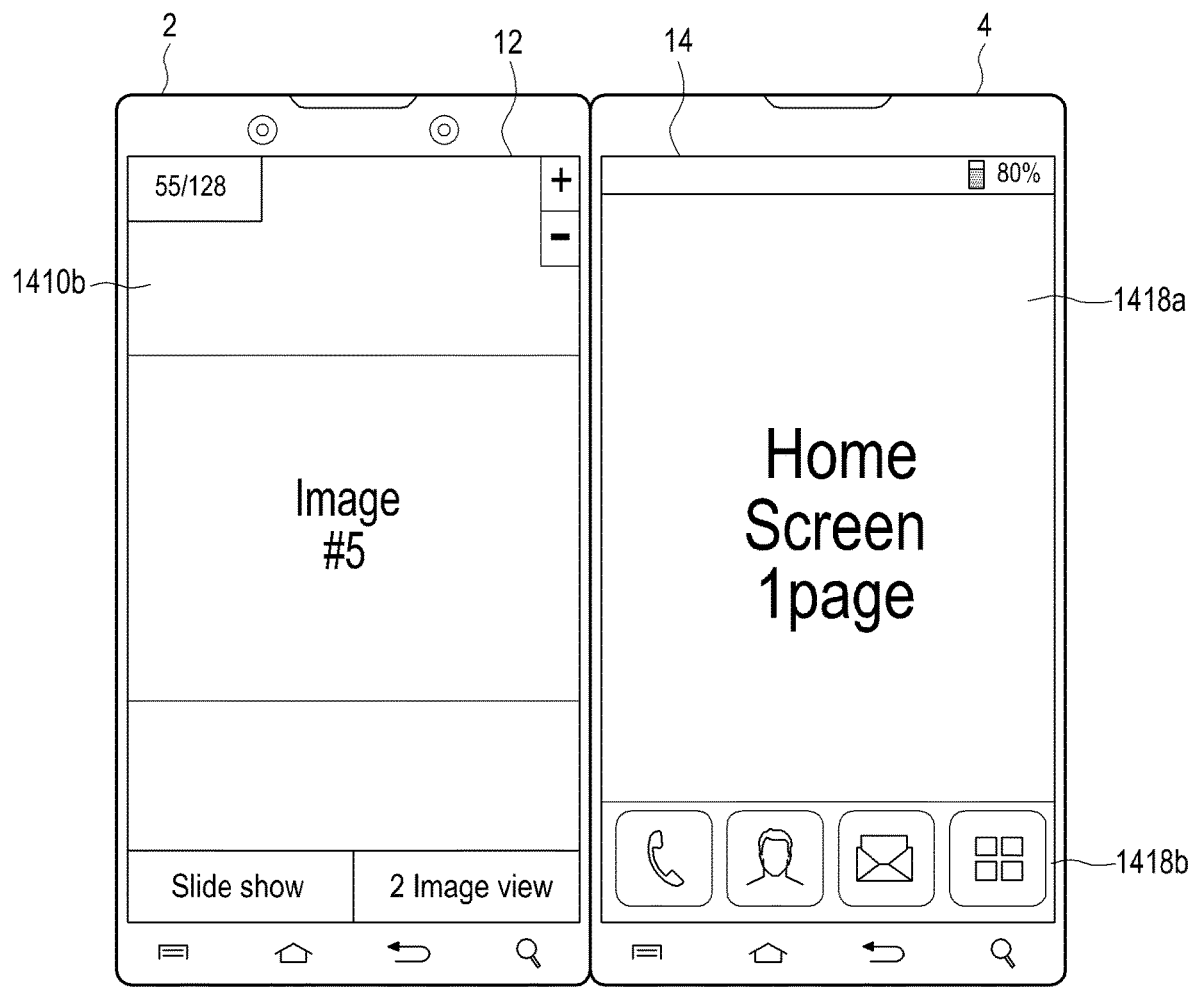
Figure 24I:
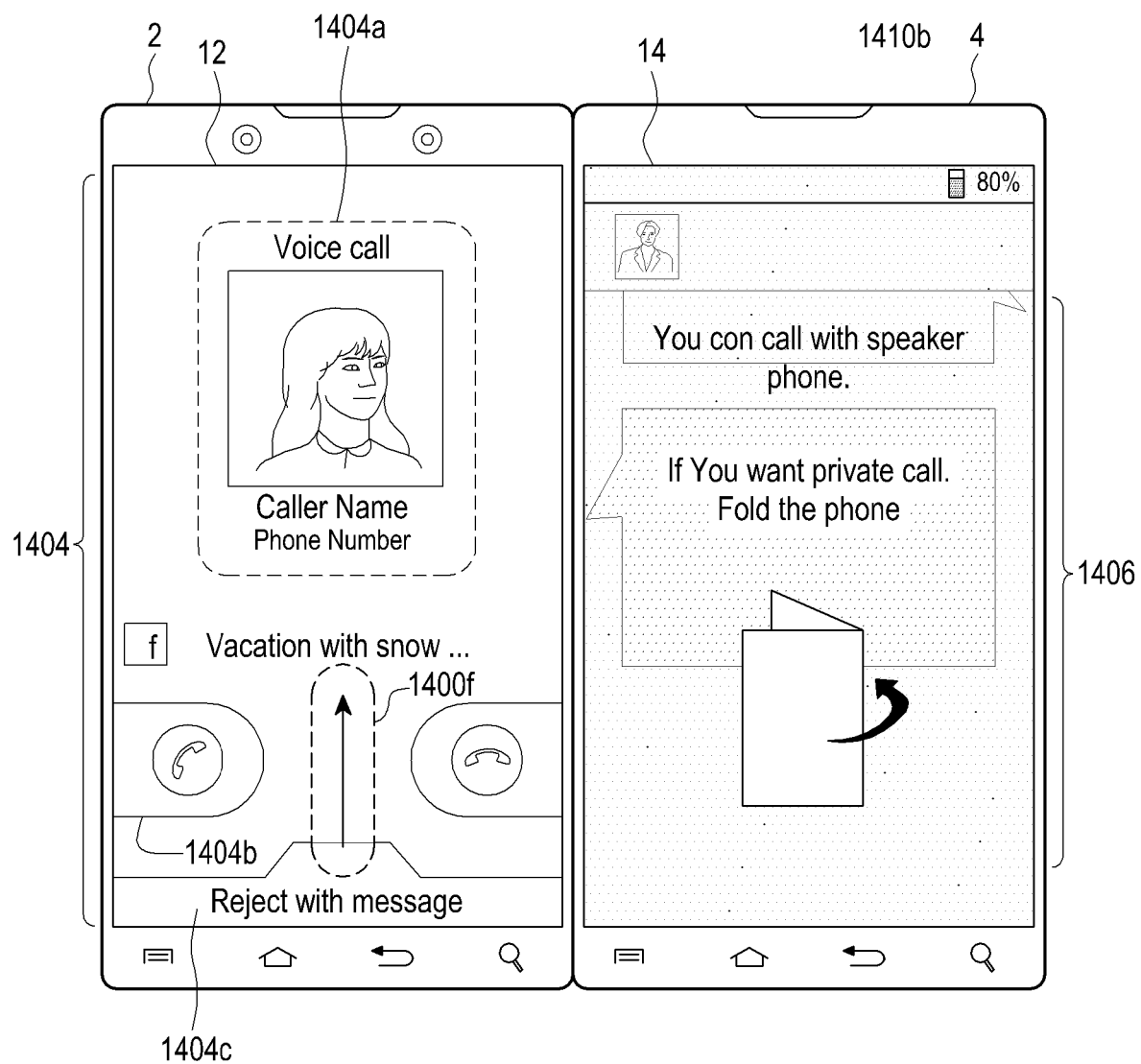
Figure 24J:
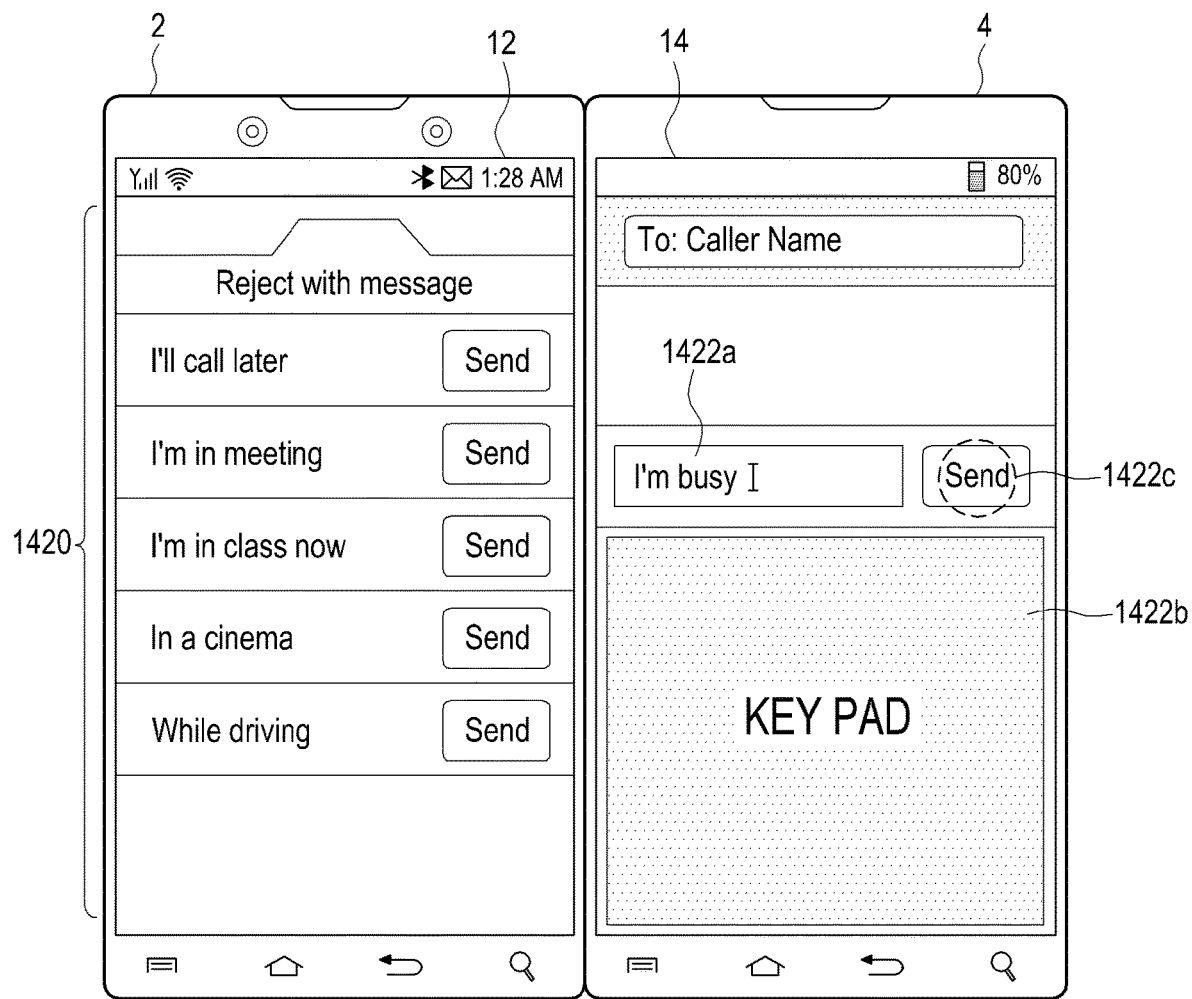
Figure 24K:
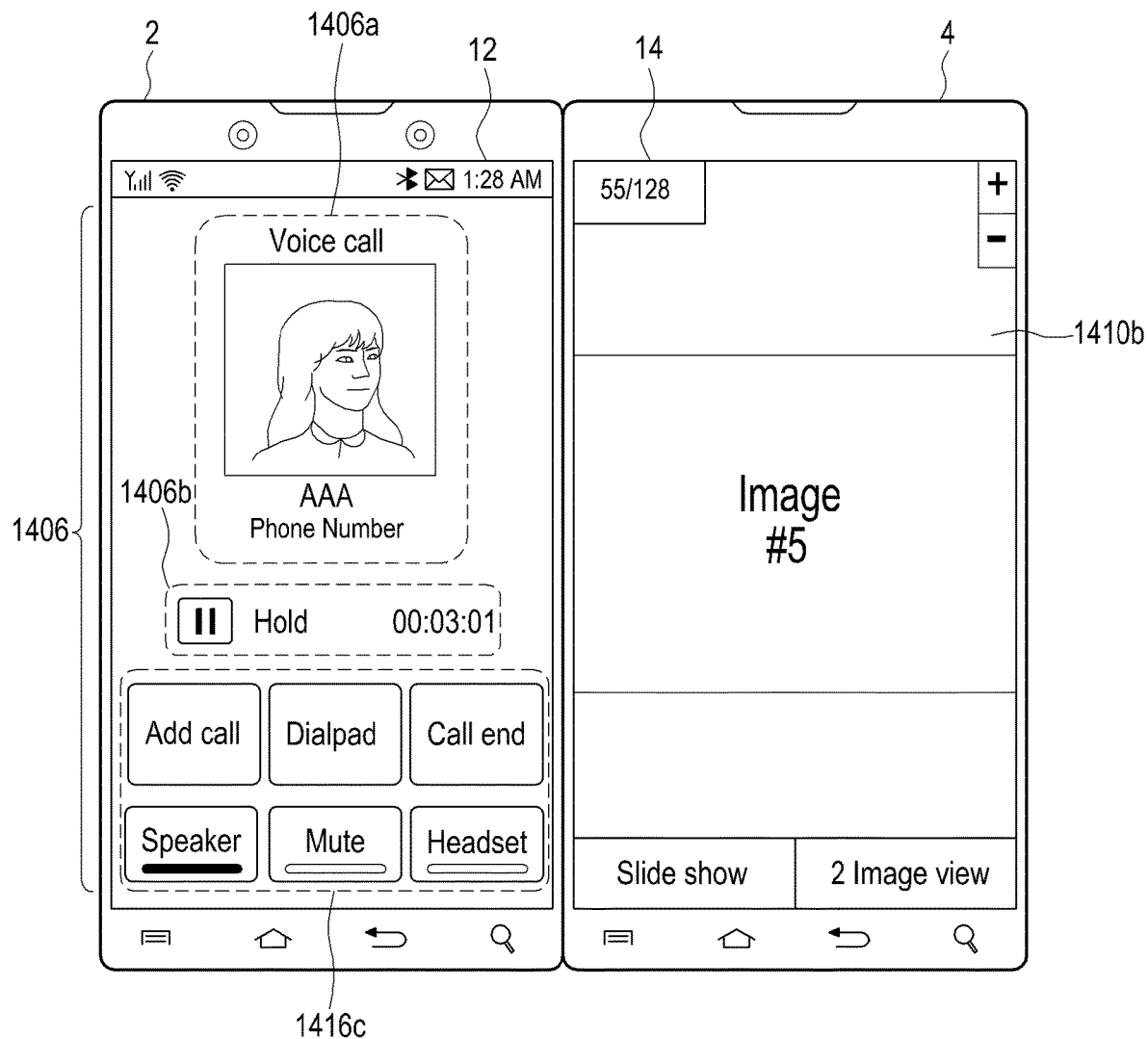
Figure 24L:
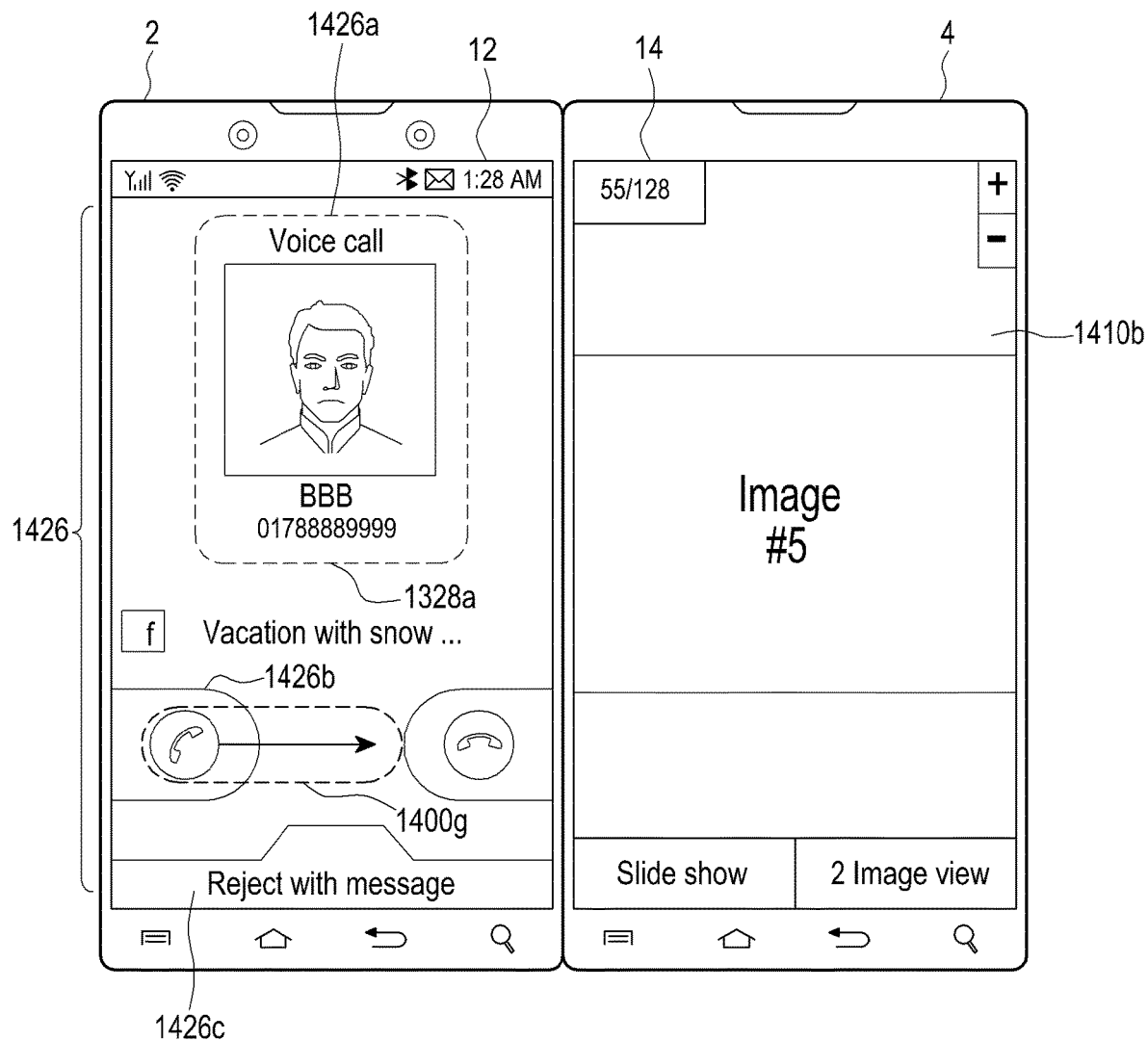
Figure 24M:
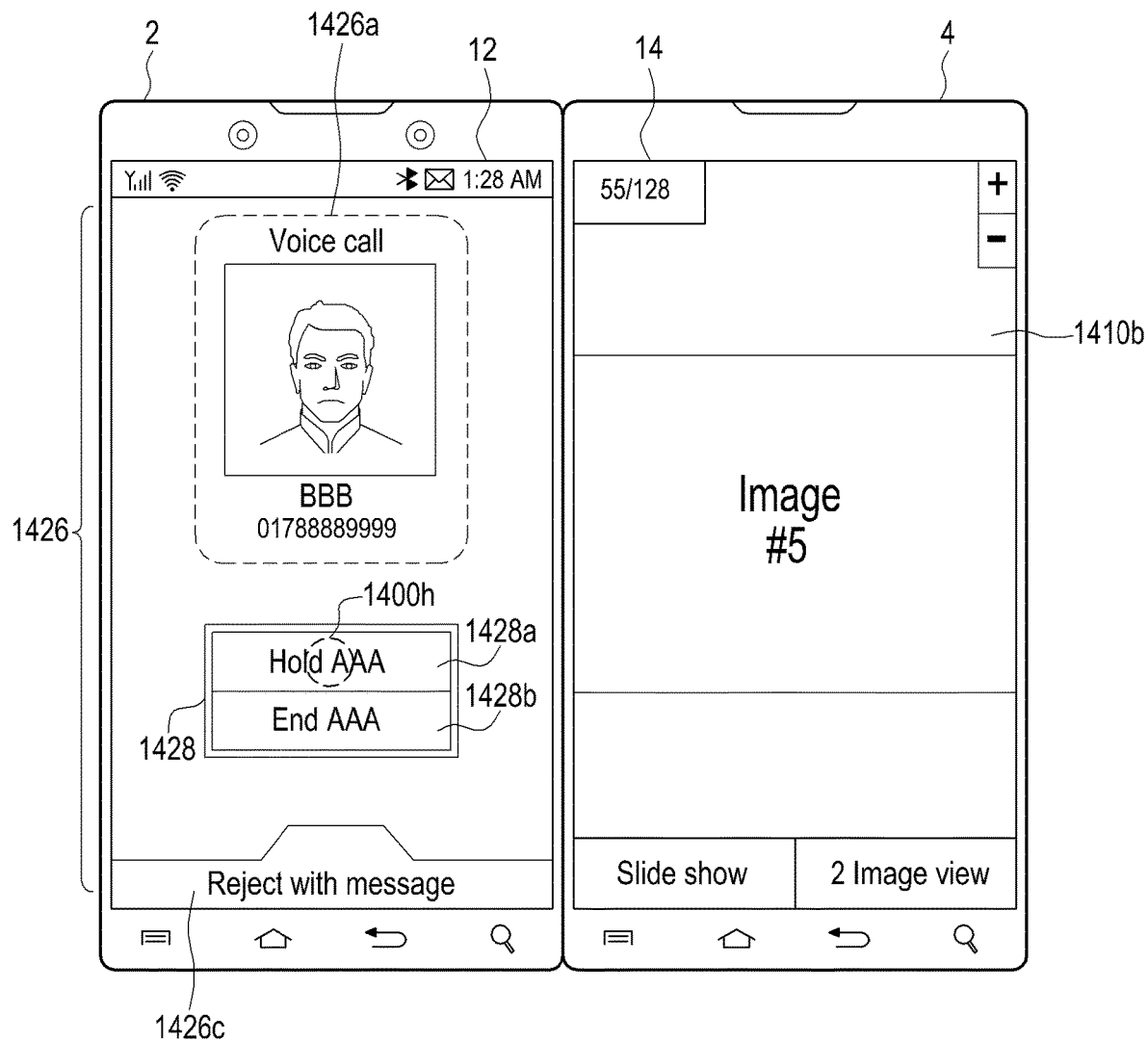
Figure 24N:
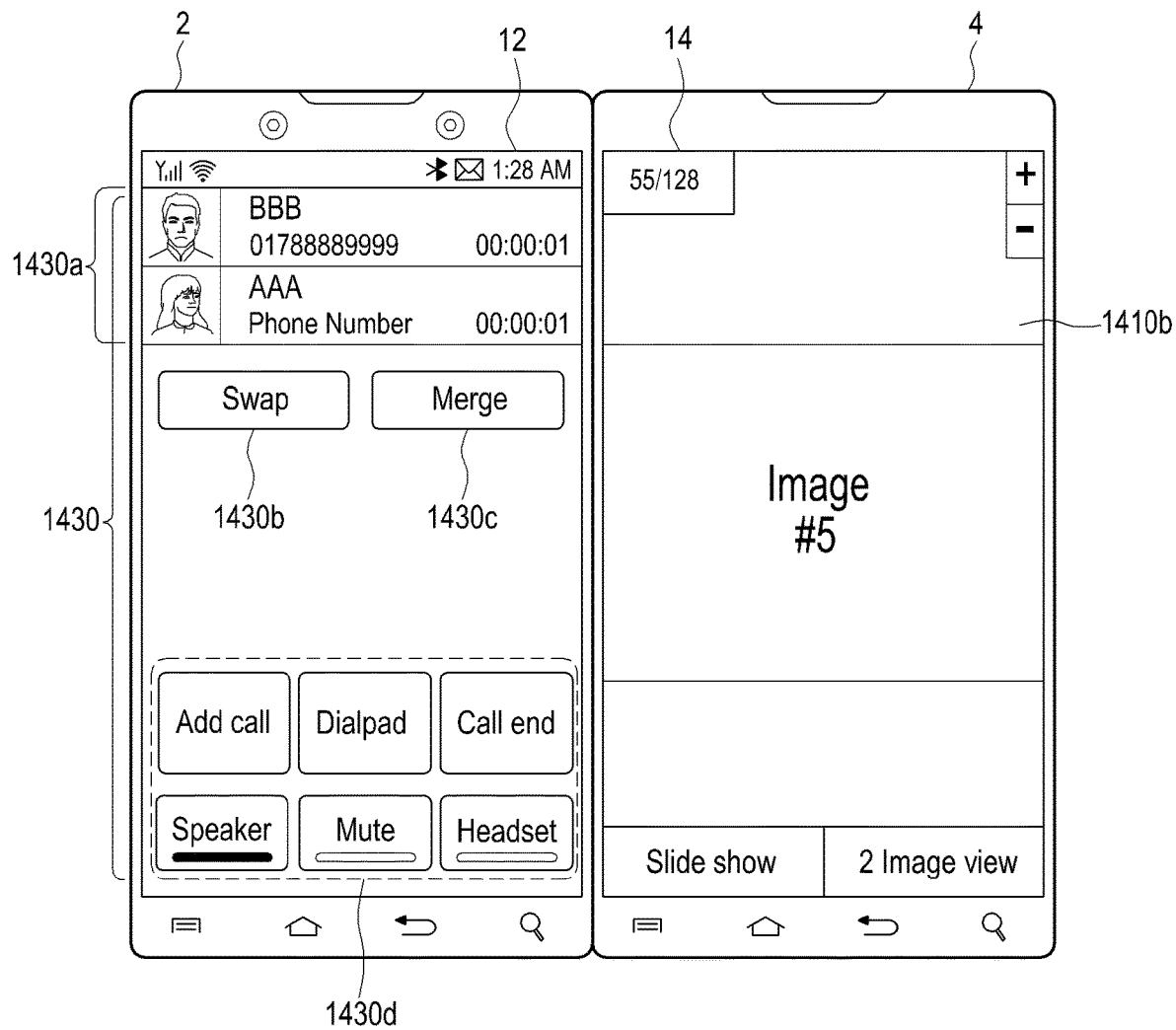
Figure 24O:
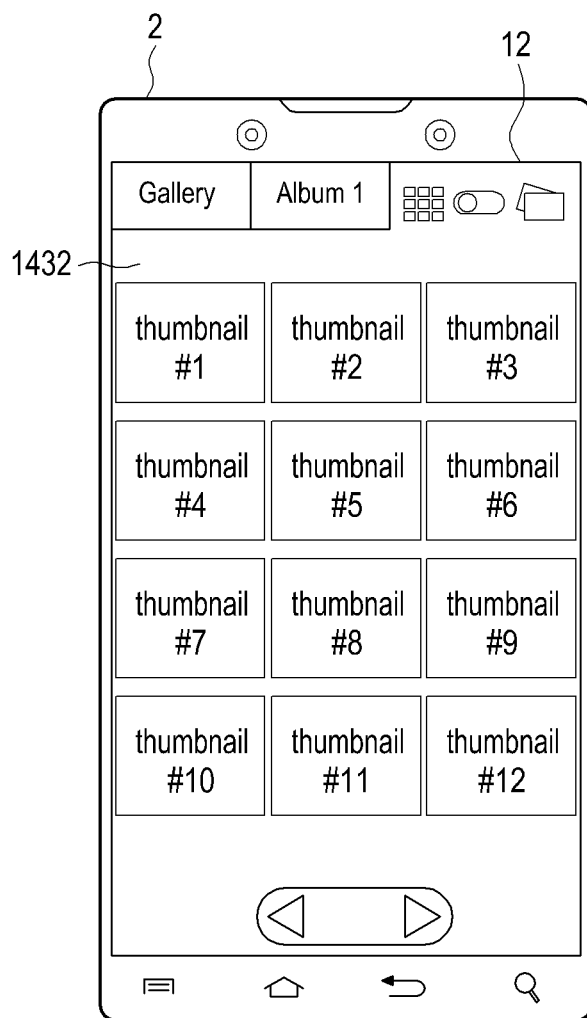
Figure 24P:
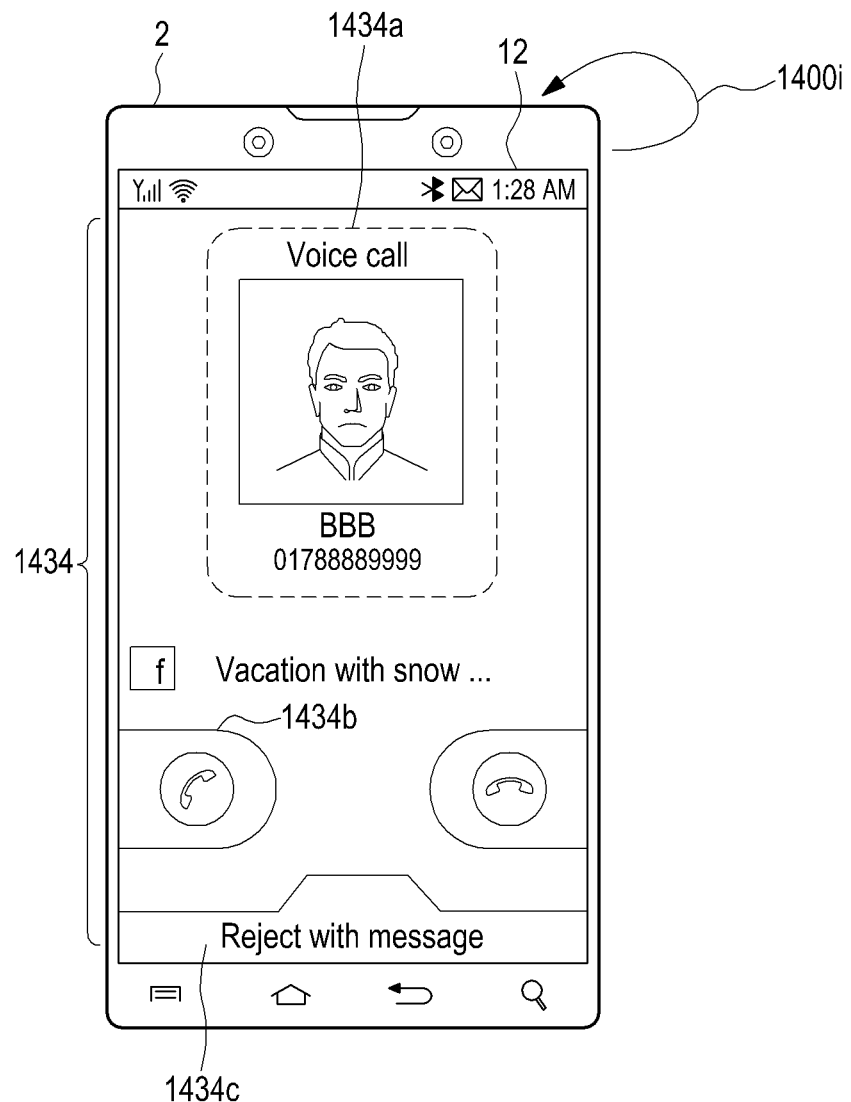
Figure 24Q:
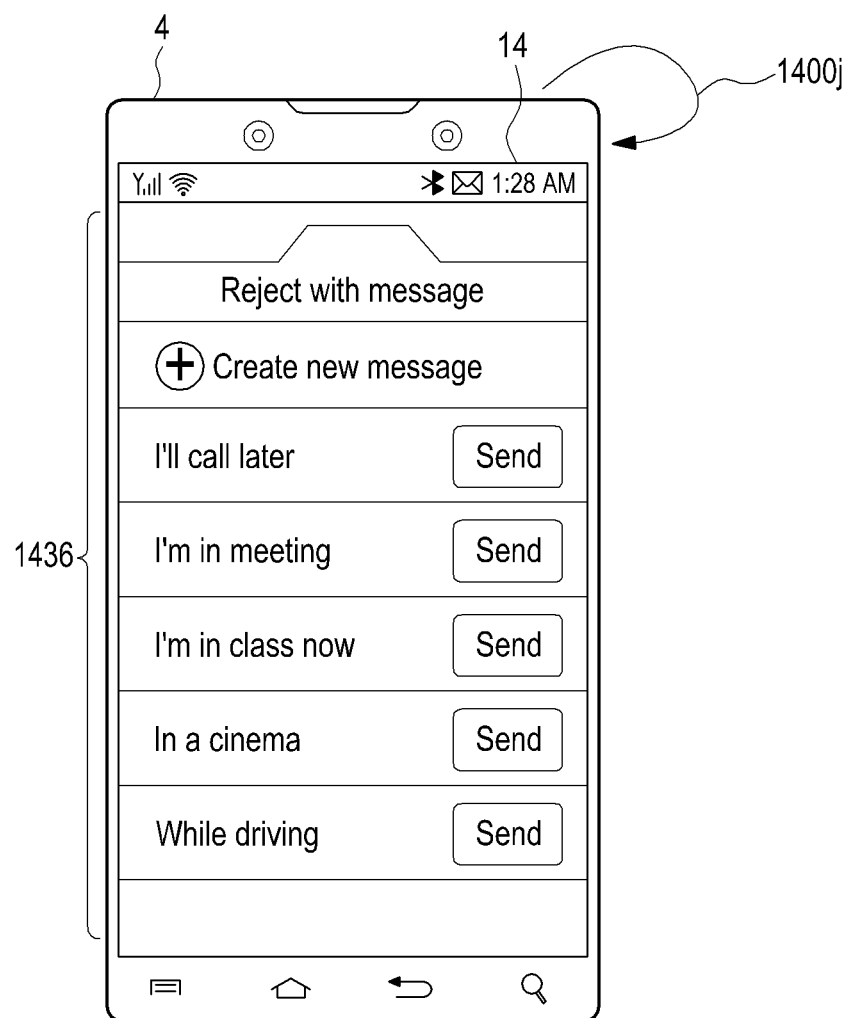
Figure 24R:
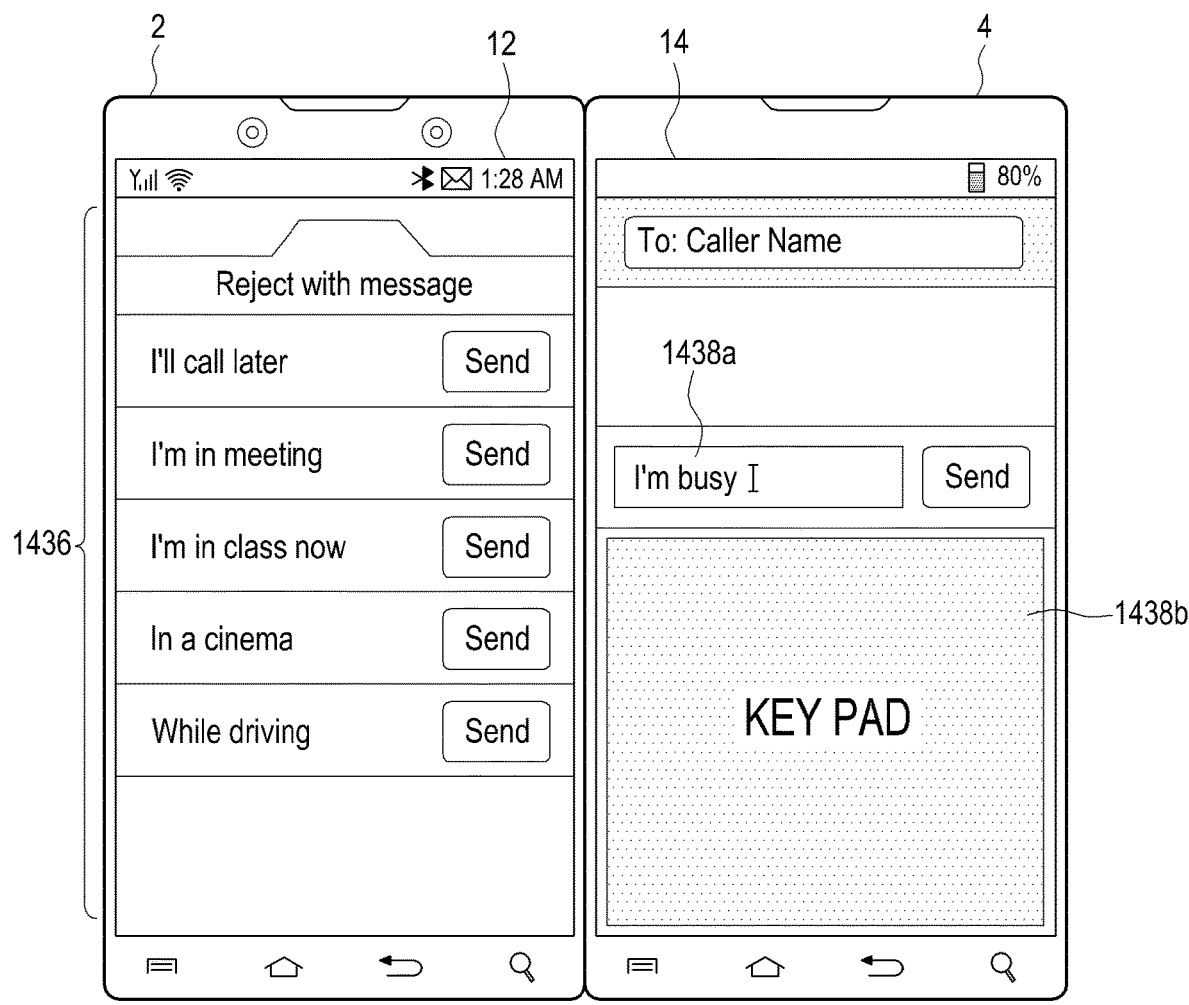

FIG. 24A to FIG. 24R illustrate user interface of the call application according to another exemplary embodiment.

FIGS. 24A to 24C illustrate another scenario for responding to an incoming call of the call application according to an exemplary embodiment.

Referring to FIG. 24A, the first touch screen 12 displays a text input area (that is, typing area) 1402*a* of the first application, and the second touch screen 14 displays additional information 1402*d* of the first application. The first application is an application requiring a typing input and illustrated as a message application herein. The first touch screen 12 further displays a message display area 1402*b* displaying a message input through the text input area 1402*a* and a virtual keypad area 1402*c* together with the text input area 1402*a*. The second touch screen 14 sequentially displays, for example, messages exchanged with the same counterpart as the additional information 1402*d* of the message application.

When an incoming call is generated while the first touch screen 12 displays the text input area 1402*a*, the portable device proceeds to FIG. 24B.

Referring to FIG. 24B, the portable device starts the call application in response to the generation of the incoming call, and replaces the text input area 1402*a* other information 1402*b* and 1402*c* with an incoming call screen 1404 provided by the call application and displays the replaced incoming call screen 1404 in the first touch screen 12. The incoming call screen 1404 includes a call participant identification area 1404*a*, an incoming key area 1324*b*, and a rejection message key 1404*c*. The call participant identification area 1404*a* includes at least one of a picture image, a call participant name, and a phone number. The incoming key area 1404*b* may include an incoming key and a rejection key. The rejection message key 1404*c* is used to automatically send the rejection message by the message application.

The second touch screen 14 is deactivated while the incoming call screen 1404 is displayed in the first touch screen 12, and a guide message screen 1406 of advising the user to fold the portable device for the call is displayed to be overwritten with the previous information 1402*d*.

When a predetermined touch gesture 1400*a* on the incoming key within the incoming key area 1404*b*, for example, a tap gesture, or a touch drag (slide) starting at the incoming key and moving in a predetermined direction is detected, the portable device proceeds to FIG. 24C.

Referring to FIG. 24C, the portable device connects a call with a counterpart call participant in response to the detection of the touch gesture 1400*a*, and replaces the incoming call screen 1404 with the mid-call screen 1404 and displays the replaced mid-call screen 1406 in the first touch screen 12. The mid-call screen 1406 includes a call participant identification area 1406*a*, a call duration time 1406*b*, and a function key area 1406*c*. The call participant identification area 1406*a* includes at least one of a picture image, a counterpart call participant name, and a phone number. The function key area 1406*c* includes at least one of a phone number addition key, a dial pad call key, a call end key, a speaker mode switching key, a mute key, and a headset connection key.

When an incoming call is generated while information 1402*a*, 1402*b*, and 1402*c* including the text input area 1402*a* is displayed in the first touch screen 12, the portable device moves the text input area 1402*a* and other information 1402*b* and 1402*c* previously displayed in the first touch screen 12 to the second touch screen 12 and displays the input area 1402*a* and other information 1402*b* and 1402*c* in the second touch screen 14 while displaying the mid-call screen 1406 in the first touch screen 12. At this time, the text input area 1402*a* includes a text input into the first touch screen 12 before the incoming call and displays the text in the second touch screen 14.

As a selectable embodiment, in the state where the first and second panels 2 and 4 including the first and second touch screens 12 and 14 are unfolded, the portable device starts the call connection in the public call mode through the mid-call screen 1406 of the first touch screen 12 and provide support such that the user can continuously input messages through the text input area 1402*a* of the second touch screen 14.

When a tap gesture 1400*b* is detected from the call end key of the function key area 1406*c*, the portable device returns to FIG. 24A to replace the mid-call screen 1406 of the first touch screen 12 with the previous information, that is, the text input area 1402*a*, the message display area 1402*b*, and the virtual keypad area 1402*c* and display the replaced text input area 1402*a*, the message display area 1402*b*, and the virtual keypad area 1402*c* and displays the information 1402*d* before the incoming call in the second touch screen 14.

FIGS. 24D to 24H illustrate another scenario for responding to an incoming call in the call application according to an exemplary embodiment.

Referring to FIG. 24D, the first and second touch screens 12 and 14 display first and second task screens 1410*a* and 1410*b* of the first application. The first application may be any of the home screen, the application menu, the basic application, and the application installed by the user. In the shown example, the first application is a photo gallery application providing two task screens having different depths, the first task screen 1410*a* of the first touch screen 12 includes one page of a plurality of thumbnail images, and the second task screen 1410*b* of the second touch screen 14 displays a picture image of one thumbnail image selected from the thumbnail images with a larger size, that is, a full size.

When an incoming call is generated while the first and second touch screens 12 and 14 display the task screens 1410*a* and 1410*b* of the first application, the portable device proceeds to FIG. 24E.

Referring to FIG. 24E the portable device starts the call application in response to the generation of the incoming call, and replaces the first task screen 1410*a* of the first application with an incoming call screen 1412 provided by the call application and displays the replaced incoming call screen 1412 in the first touch screen 12. The incoming call screen 1412 includes a call participant identification area 1412a, an incoming key area 1412b, and a rejection message key 1412c. The call participant identification area 1412a includes at least one of a picture image, a call participant name, and a phone number. The incoming key area 1412b may include an incoming key and a rejection key. The rejection message key 1412c is used to automatically send a rejection message by the message application.

The second touch screen 14 is deactivated while the incoming call screen 1412 is displayed in the first touch screen 12, and a guide message screen 1414 of advising the user to fold the portable device for the call is displayed.

When a predetermined touch gesture 1400c on the incoming key within the incoming key area 1412b, for example, a tap gesture or a touch drag (slide) starting at the incoming key and moving in a predetermined direction is detected, the portable device proceeds to FIG. 24F.

Referring to FIG. 24F, the portable device connects a call with a counterpart call participant, and replaces the incoming call screen 1412 with the mid-call screen 1416 and displays the replaced mid-call screen 1416 in the first touch screen 12 in response to the detection of the touch gesture 1400c. The mid-call screen 1416 includes a call participant identification area 1416a, a call duration time 1416b, and a function key area 1416c. The call participant identification area 1416a includes at least one of a picture image, a counterpart call participant name, and a phone number. The function key area 1416c includes at least one of a phone number addition key, a dial pad call key, a call end key, a speaker mode switching key, a mute key, and a headset connection key.

As a selectable embodiment, when a touch gesture 1400c is detected from the incoming key in the state where the first and second panels 2 and 4 including the first and second touch screens 12 and 14 are unfolded, the call application starts a call connection in the public call mode and the second touch screen 14 is activated again as illustrated in FIG. 24F.

When the home button which is one of the physical buttons disposed in the lower part of the second touch screen 14 is selected 1400d while the mid-call screen 1416 is displayed in the first touch screen 12 and the previous task screen 1410b is displayed in the second touch screen 14, the portable device proceeds to FIG. 23G.

Referring to FIG. 23G, the portable device displays a first page 1418a of the home screen in the second touch screen 14 in response to the selected home button 1400d. At this time, the first touch screen 12 still displays the mid-call screen 1416, and accordingly a dock area 1418b is displayed in the lower part of the second touch screen 14 together with the first page 1418a.

When a tap gesture 1400e is detected from the call end key of the function key area 1416c, the portable device proceeds to FIG. 24H to replace the mid-call screen 1406 of the first touch screen 12 with the information before the incoming call, that is, the task screen 1410b of the first application and display the replaced task screen 1410b and maintains the first page 1418a of the home screen and the dock area 1418b of the second touch screen 14. At this time, the first touch screen 12 displays a predetermined one of the task screens 1410a and 1410b of the first application, for example, the task screen 1418b having a final depth.

FIGS. 24I to 24J illustrate a scenario for rejecting an incoming call in the call application according to one or more exemplary embodiments.

Referring to FIG. 24I, the portable device displays the incoming call screen 1404 provided by the call application in response to the generation of the incoming call. The incoming call screen 1404 includes the call participant identification area 1404a, the incoming key area 1404b, and the rejection message key 1404c. The call participant identification area 1404a includes at least one of a picture image, a call participant name, and a phone number. The incoming key area 1404b may include an incoming key and a rejection key. The rejection message key 1404c is used to automatically send the rejection message by the message application.

The second touch screen 14 is deactivated while the incoming call screen 1404 is displayed in the first touch screen 12, and the guide message screen 1406 of advising the user to fold the portable device for the call is displayed.

When a predetermined touch gesture 1400f on the rejection message key 1404c within the incoming call screen 1404, for example, a tap gesture or a touch drag (slide) starting at the rejection message key 1404c and moving in a predetermined direction is detected, the portable device proceeds to FIG. 24J.

Referring to FIG. 24J, the portable device displays a rejection message screen 1420 in the first touch screen 12 and a text input area 1422a for inputting a rejection message and a virtual keypad 1422c in the second touch screen 14 in response to the detection of the touch gesture 1400f The rejection message screen 1420 includes a plurality of pre-designated commonly used phrases as the rejection messages for rejecting the incoming call and sending keys. Although not illustrated, when a tap gesture is detected from the sending key of one of the commonly used phrases, the portable device automatically sends the corresponding selected commonly used phrase, for example, a short message including one of "I'll call later", "I'm in meeting", "I'm in class now", "In a cinema", and "While driving" to a counterpart call participant of the incoming call.

When a message for the rejection, for example, "I'm busy" is input through the virtual keypad 1422c and a tap gesture 1422c is detected from the sending key included in the text input area 1422a, the portable device automatically sends a short message including the input message of "I'm busy" to a counterpart call participant of the incoming call by the message application.

Although not illustrated, when the message is sent through the rejection message screen 1420 or the text input area 1422a and the virtual keypad 1422c, the portable device replaces the incoming call screen 1404 and the guide message screen 1406 of the first and second touch screens 12 and 14 with the information displayed before the incoming call and displays the replaced information.

FIGS. 24K to 24N illustrate another scenario for responding to a second incoming call in the call application according to one or more exemplary embodiments.

Referring to FIG. 24K, the portable device displays the mid-call screen 1406 provided by the call application in the first touch screen 12, performs a call with a first counterpart call participant, for example, "AAA", and displays the first application 1410b in the second touch screen 14. The first application 1410b refers to another application, not the call application. When a second incoming call from a second counterpart call participant, for example, "BBB" is generated while the mid-call screen 1406 with the first counterpart call participant is displayed, the portable device proceeds to FIG. 24L.

Referring to FIG. 24L, the portable device replaces the mid-call screen 1406 of the first touch screen 12 with an incoming call screen 1426 of the second counterpart call participant and displays the incoming call screen 1426 while maintaining the call with the first counterpart call participant. The incoming call screen 1426 includes a call participant identification area 1426a of the second counterpart call participant "BBB", an incoming key area 1426b, and a rejection message key 1426c. The second touch screen 14 can continuously display the first application 1410b while the incoming call screen 1426 with the second counterpart call participant is displayed in the first touch screen 12. As a selectable embodiment, when at least one of the panels included in the portable device is folded while the incoming call screen 1426 with the second counterpart call participant is displayed in the first touch screen 12, the second touch screen 14 may be turned off.

When a predetermined touch gesture 1400g on the incoming key within the incoming key area 1426b, for example, a tap gesture or a touch drag (slide) starting at the incoming key and moving in a predetermined direction is detected, the portable device proceeds to FIG. 24M.

Referring to FIG. 24M, the portable device displays a multi incoming selection menu 1428 in the incoming call screen 1426 of the first touch screen 12 in a form of a popup window in response to the detection of the touch gesture 1400g. The multi incoming selection menu 1428a includes a waiting key 1427a for having the call with the first counterpart call participant wait and an end key 1428b for ending the call. Although not illustrated, when a tap gesture is detected from the end key 1428b, the portable device ends the call with the first counterpart call participant and displays the mid-call screen with the second counterpart call participant. When a tap gesture 1400h is detected from the waiting key 1428a, the portable device has the call with the first counterpart call participant wait and proceeds to FIG. 24N. The waiting call is not connected with the microphone and the speaker.

Referring to FIG. 24N, the portable device connects the call with the second counterpart call participant by the call application, and replaces the incoming call screen 1426 of the first touch screen 12 with a multi mid-call screen 1430 and displays the replaced multi mid-call screen 1430. The multi mid-call screen 1430 includes call participant identification areas 1430a of a plurality of counterpart call participants who perform the call such as "AAA" and "BBB", a call swap key 1430b, a merge key 1430c, and a function key area 1430d. Each of the call participant identification areas 1430a includes at least one of a small picture image, a counterpart call participant name, and a phone number, and the call participant identification area which is in a call connection state may be displayed with a shadow or highlighted. The function key area 1430c includes at least one of a phone number addition key, a dial pad call key, a call end key, a speaker mode switching key, a mute key, and a headset connection key.

The call swap key 1430b is used to swap a current call participant. When a tap gesture is detected from the call swap key 1430b in a state where the call is connected with the second counterpart call participant "BBB", the portable device has the call with the second counterpart call participant "BBB" wait and connects the call with the first counterpart call participant "AAA". The merge key 1430c is used to simultaneously connect calls with all the waiting counterpart call participants. When a tap gesture is detected from the merge key 1430c in a state where the call with the first counterpart call participant "AAA" is in a waiting state and the call with the second counterpart call participant "BBB" is connected, the portable device connects all the calls with both the first and second counterpart call participants "AAA" and "BBB". The user can talk to both the first and second counterpart call participants through the portable device.

The second touch screen 14 can continuously display the first application 1410b while the multi mid-call screen 1430 is displayed in the first touch screen 12 in the state where the first and second panels 2 and 4 including the first and second touch screens 12 and 14 are unfolded.

FIGS. 24O to 24R illustrate another scenario for responding to an incoming call by a motion of the portable device in the call application according to an exemplary embodiment.

Referring to FIG. 24O, the first touch screen 12 displays a first application 1432 in a state where the first and second panels 2 and 4 are completely folded such that the first and second touch screens 12 and 14 face outward. In the shown example, the first application 1432 is a photo gallery application which displays one page of thumbnail images. At this time, the second touch screen 14 may be turned off. When an incoming call is generated while the first application 1432 is displayed in the folded state, the portable device proceeds to FIG. 24P.

Referring to FIG. 24P, the portable device starts the call application in response to the generation of the incoming call, and replaces the first application 1432 with an incoming call screen 1434 provided by the call application and displays the replaced incoming call screen 1434 in the first touch screen 12. The incoming call screen 1434 includes a call participant identification area 1434a, an incoming key area 1434b, and a rejection message key 1434c. The call participant identification area 1434a includes at least one of a picture image, a call participant name, and a phone number. The incoming key area 1434b may include an incoming key and a rejection key. The rejection message key 1434c is used to automatically send a rejection message by the message application.

When the portable device detects overturning 1400i of making the second panel 4 including the second touch screen 14 side up while displaying the incoming call screen 1434 in the first touch screen 12 of the first panel 2 in the state where the first and second panels 2 and 4 are completely folded, the portable device proceeds to FIG. 24Q.

Referring to FIG. 24Q, the portable device turns off the first touch screen 12 and displays a rejection message screen 1436 in the second touch screen 14 in response to the detection of the overturning 1400i. Further, when the portable device is not in a vibration mode, the portable device turns off a ringtone. The rejection message screen 1436 includes a plurality of predetermined commonly used phrases for rejecting the incoming call and sending keys for the commonly used phrases and a new rejection message create key for additionally selecting an input of a new rejection message. Although not illustrated, when the sending key of one of the commonly used phrases is selected, the portable device automatically sends the corresponding selected commonly used phrase, for example, one of "I'll call later", "I'm in meeting", "I'm in class now", "In a cinema", and "While driving" to a counterpart call participant of the incoming call by the message application. Further, when a tap gesture is detected from the new rejection message create key, the portable device displays an input window of the rejection message in the second touch screen 14.

When unfolding 1400j of the first and second panels 2 and 4 is detected while the rejection message screen 1436 is displayed in the second touch screen 14, the portable device proceeds to FIG. 24R.

Referring to FIG. 24R, the portable device displays the rejection message screen 1436 in the first touch screen 12 and displays a text input area 1438a and a virtual keypad 1438b for sending the rejection message in the second touch screen 14 in response to the detection of the unfolding 1400j. When a message for the rejection, for example, "I'm busy" is input through the virtual keypad 1438b and a tap gesture is detected from the sending key included in the text input area 1438a, the portable device automatically sends a short message including the input message of "I'm busy" to a counterpart call participant of the incoming call by the message application.

The portable device provides a more convenient user interface for a camera application through the display device including the first touch screen and the second touch screen arranged on at least one foldable panel. As described above, the portable device drives the camera application and takes a picture through at least one camera module included in the first and second panels including the first and second touch screens to store the taken picture as a picture image.

A position of the camera module may be variously determined according to selection made by the manufacturer. For example, a first camera module is located in a front upper part of the first panel 2 and a second camera module is located in a rear upper part of the second panel 4, so that the first camera module operates as a front camera and the second camera module operates as a rear camera. As another example, one camera module is located in the front upper part of the second panel 4 and the camera module operates as the front camera or the rear camera according to whether the second panel 4 is folded. As another example, the first and second camera modules are located in the front upper part and the rear upper part of the second panel 4, the first camera module operates as the front camera or the rear camera according to whether the second panel 4 is folded, and the second camera module operates as the rear camera when the first camera module operates as the front camera.

FIGS. 25A to 25L and FIGS. 26A to 26K illustrate a user interface of the camera application according to one or more exemplary embodiments.

Here, an embodiment where the camera module is located in the front upper part of the second panel 4 including the second touch screen 14 will be described. Although not illustrated, an additional camera module may exist in a rear surface of the second panel 4. When the portable device is in a portrait view mode, the first touch screen 12 which does not have the camera module is a main screen and the second touch screen 14 having the camera module is a sub screen. Although not illustrated, when the portable device is in a landscape view mode, an upper touch screen is a main screen and a lower touch screen is a sub screen. As another embodiment, the main screen and the sub screen may be determined according to the number and positions of the camera modules.

Figure 25A:
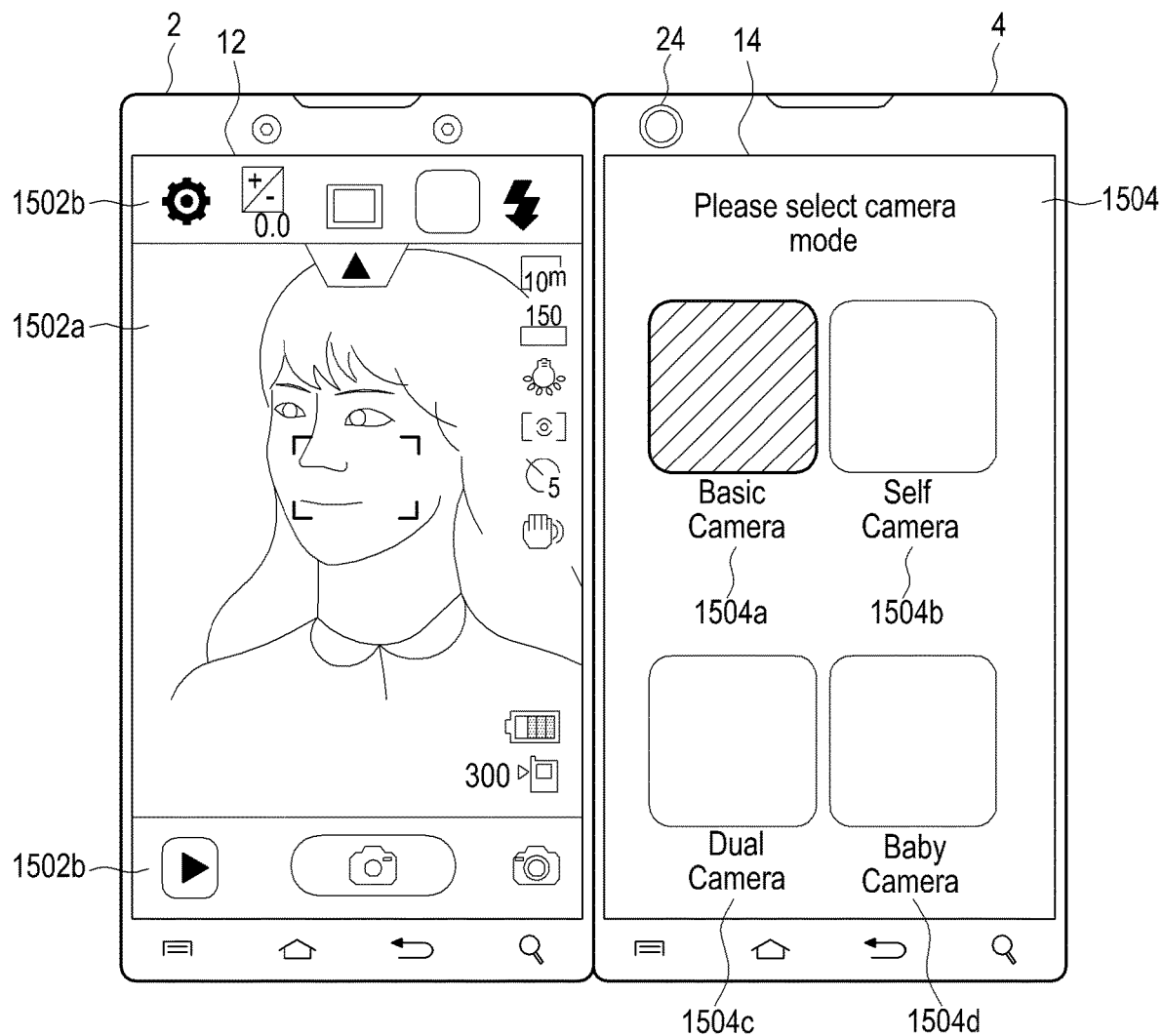
FIGS. 25A to 25L and FIGS. 26A to 26K are diagrams illustrating a user interface of a camera application according to one or more exemplary embodiments.

When the camera application is started by a shortcut button arranged in the housing of the portable device or a touch of a soft key provided through the touch screen of the portable device in the state where the first and second panels including the first and second touch screens 12 and 14 are unfolded, the camera application drives at least one camera module included in the portable device and displays, for example, screens shown in FIG. 25A in the first and second touch screen 12 and 14.

Referring to FIG. 25A, the first touch screen 12 displays a live view screen 1502a shot by the camera module in a basic camera module and a camera menu 1502b, and the second touch screen 14 displays a camera mode menu 1504 for changing a camera mode. The camera mode menu 1504 includes mode buttons 1504a, 1504b, 1504c, and 1504d corresponding to a plurality of camera modes. For example, the camera mode menu 1504 may include at least one of a basic camera button 1504a for shooting a scene or model through the camera module 24 in the state where the first and second panels 2 and 4 are folded, a self camera button 1504b for shooting the user him/herself through the camera module 24 in the state where the first and second panels 2 and 4 are folded, a dual camera button 1504c for displaying a shot image through both the first and second touch screens 12 and 14, and a baby camera button 1504d for displaying an image or animation generating the interest of the shot subject through the second touch screen 14 shown to the shot subject.

When the camera application starts, the camera application is set to operate in the basic camera mode, and a button corresponding to the selected camera mode, that is, the basic camera button 1504a is highlighted with a bold line or a different color to be distinguished. Further, when a touch gesture, for example, a tap gesture is detected from the basic camera button 1504a within the camera mode menu 1504 provided through the second touch screen 14 is detected, the camera application operates in the basic camera mode.

The camera menu 1502b may be disposed to be included in one or both sides of the shot image 1502a and includes function buttons for the shooting such as a shutter button, a stored image loading button, a mode selection button, a flash selection button, a timer shooting button, a white balance button, a resolution selection button and the like.

As a selectable embodiment, when the portable device includes the camera module 24 located in the front surface of the first or second panel 2 or 4 and the camera module 26 located in the rear surface of the second panel 4, the shot image 1502a may be reproduced by combining images of the front camera module 24 and the rear camera module 26.

Figure 25B:
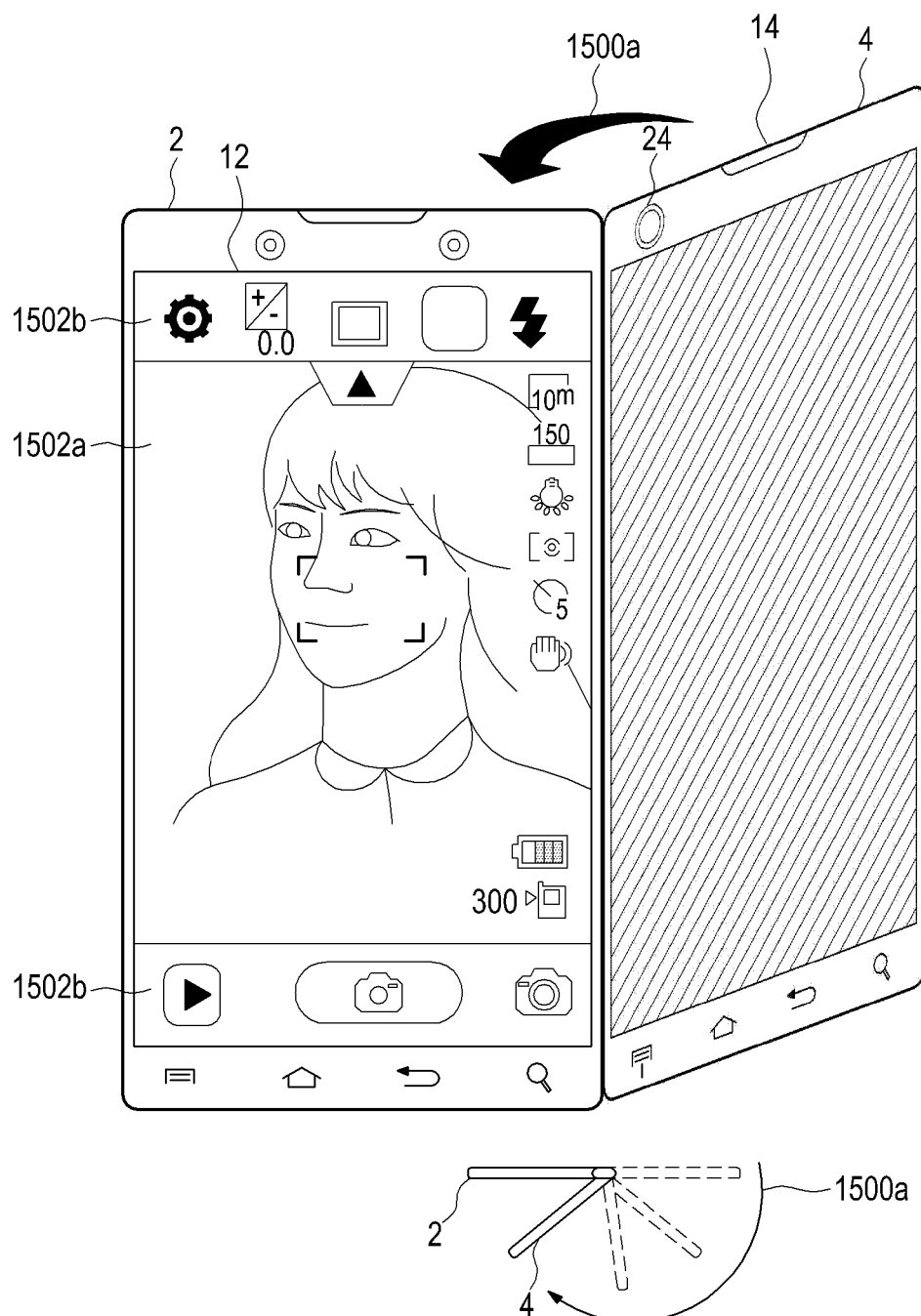
Figure 25C:
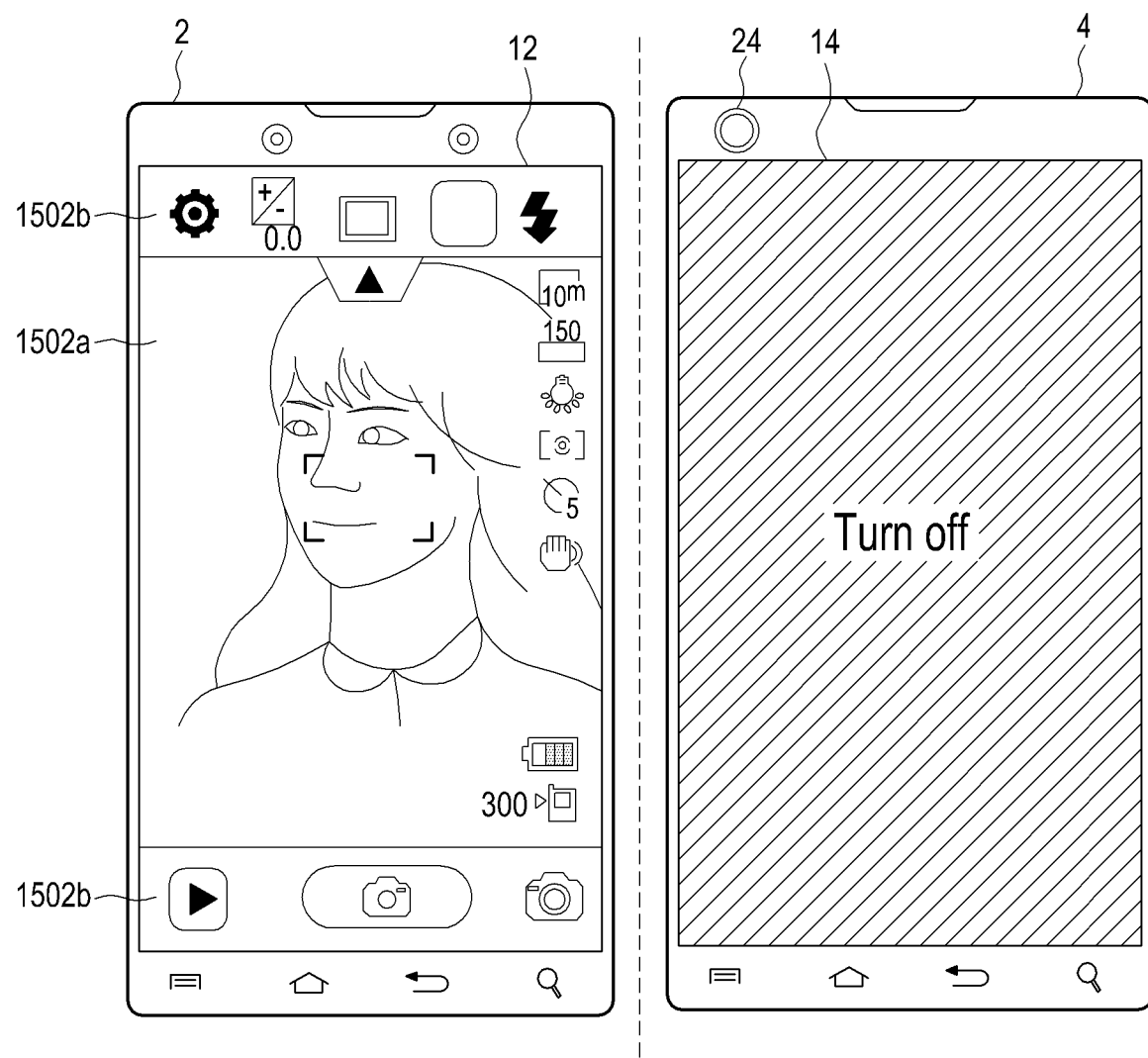

Referring to FIG. 25B, the portable device detects folding 1500a between the first and second panels 2 and 4 within a predetermined effective angle range while the shot image 1502a is displayed in the first touch screen 12 in the basic camera mode and proceeds to FIG. 25C. Referring to FIG. 25C, the portable device turns off the second touch screen 14 in response to the folding 1500a between the first and second panels 2 and 4. As one embodiment, when the first and second panels 2 and 4 starts being folded, when the first and second panels 2 and 4 are folded within a predetermined relative angle (for example, 60 degrees), or when the first and second panels 2 and 4 are completely folded, the second touch screen 14 may be turned off. The first touch screen 12 maintains the shot image 1502a and the camera menu 1502b after the folding 1500a.

Figure 25D:
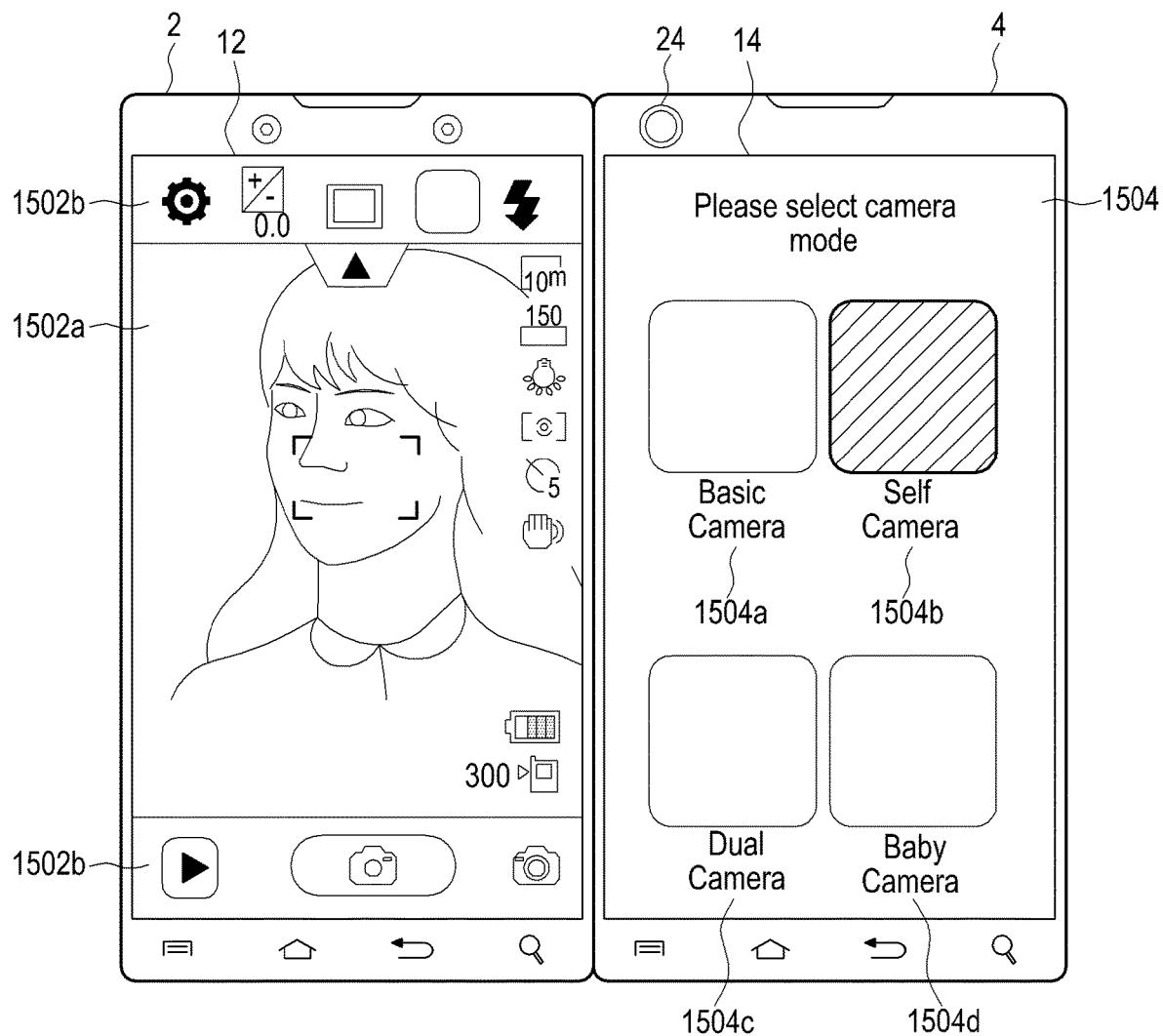

Referring to FIG. 25D, the first touch screen 12 displays the shot image 1502a shot by the camera module 24 in the self camera mode and the camera menu 1502b, and the second touch screen 14 displays the camera mode menu 1504 for changing the camera mode. The camera mode menu 1504 includes at least one of the basic camera button 1504a, the self camera button 1504b, the dual camera button 1504c, and the baby camera button 1504d. In the self camera mode, the self camera button 1504b is displayed with a bold line or a different color to be distinguished.

Figure 25E:
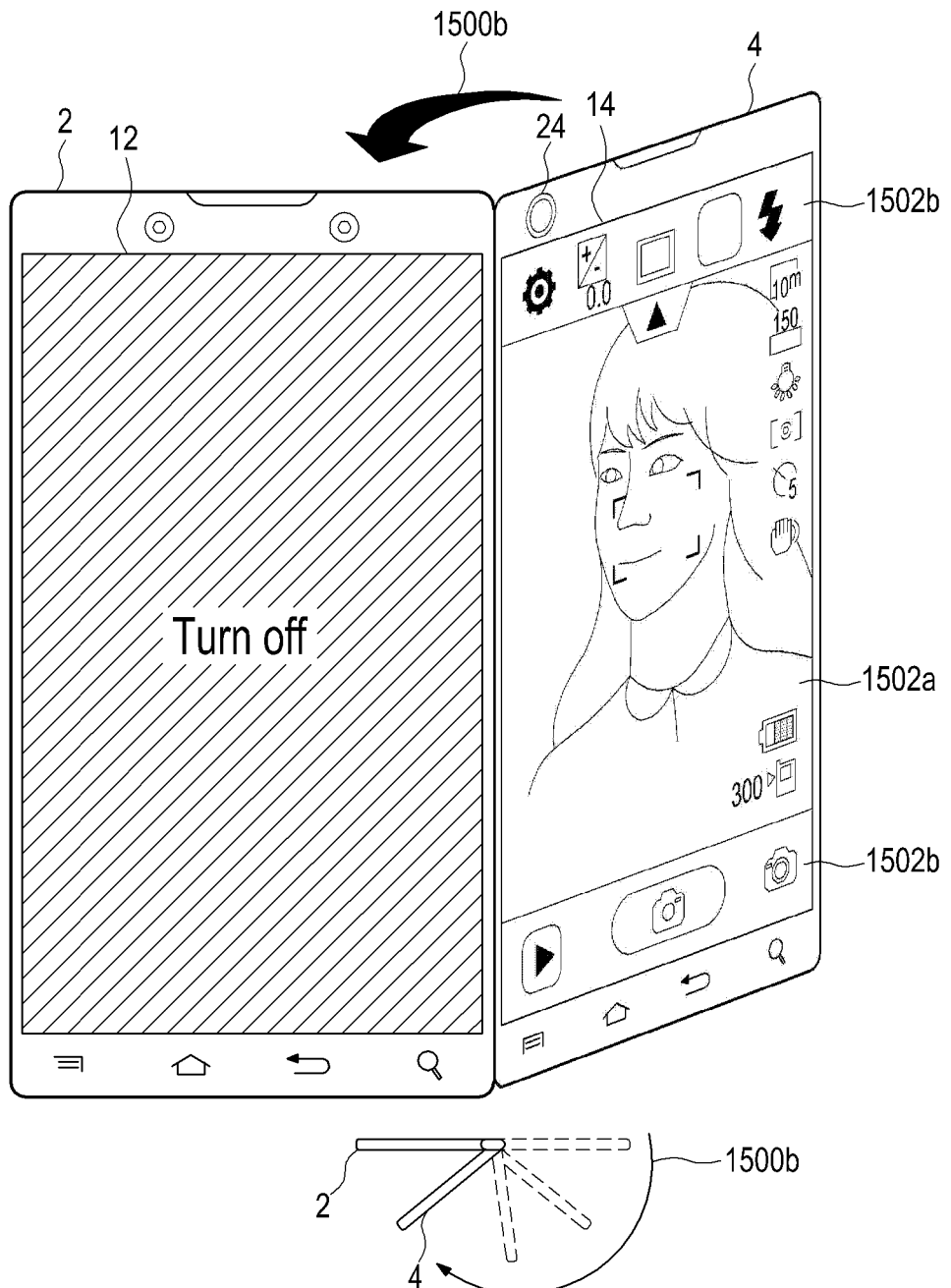
Figure 25F:
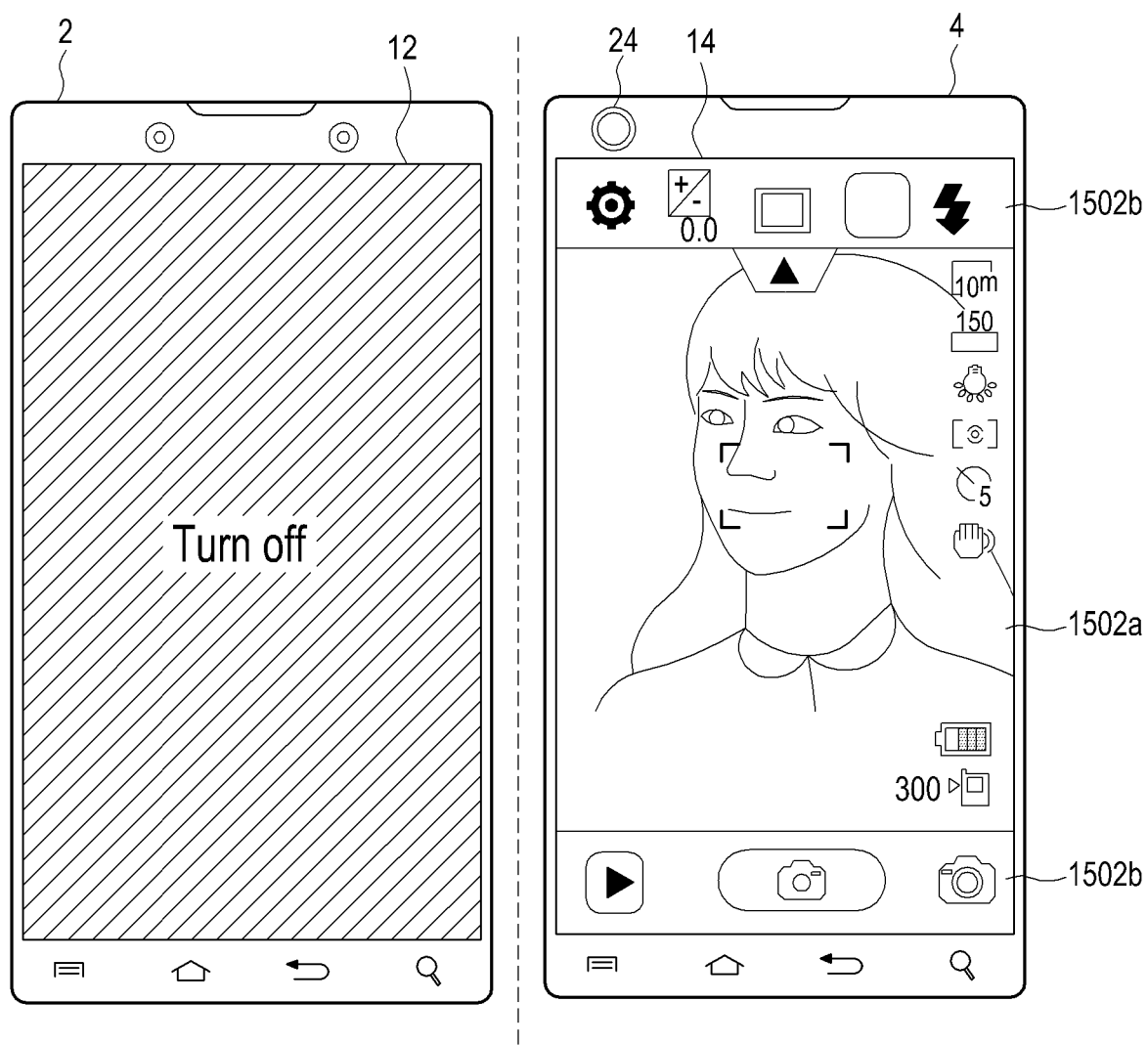

Referring to FIG. 25E, the portable device detects folding 500b between the first and second panels 2 and 4 while the shot image 1502a is displayed in the first touch screen 12 in the self camera mode and proceeds to FIG. 25F. Referring to FIG. 25F, the portable device displays the shot image 1502a of the self camera mode and the camera menu 1502b in the second touch screen 14 of the second panel 4 having the camera module 24 in the front surface thereof and turns off the first touch screen 12 of the first panel 2 which does not have the camera module 24 in response to the detection of the folding 1500b between the first and second panels 2 and 4.

Figure 25G:
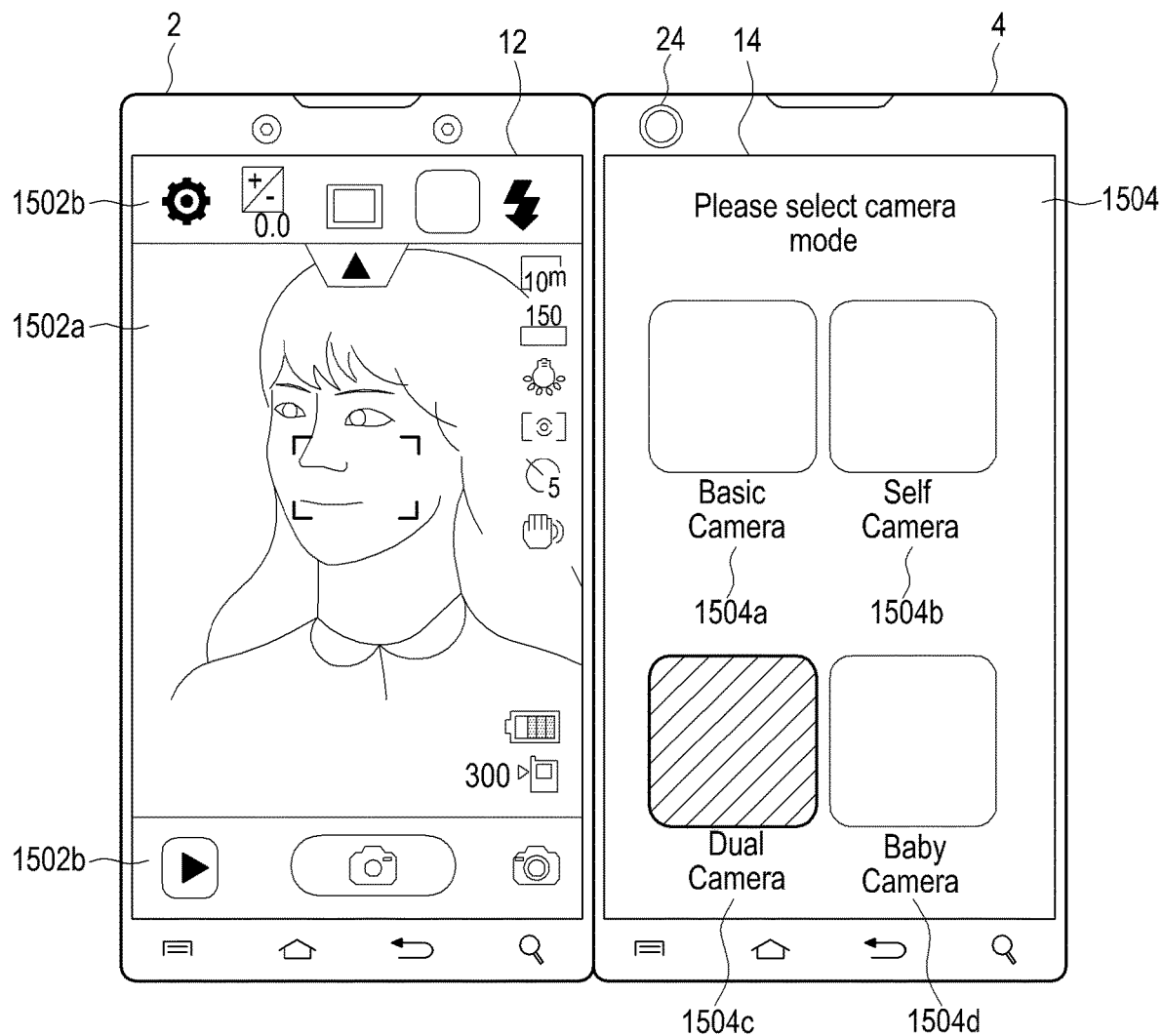

Referring to FIG. 25G, the first touch screen 12 displays the shot image 1502a shot by the camera module 24 in the dual camera mode and the camera menu 1502b and the second touch screen 14 displays the camera mode menu 1504 for changing the camera mode. The camera mode menu 1504 includes at least one of the basic camera button 1504a, the self camera button 1504b, the dual camera button 1504c, and the baby camera button 1504d. In the dual camera mode, the dual camera button 15004c is displayed with a bold line or a different color to be distinguished.

Figure 25H:
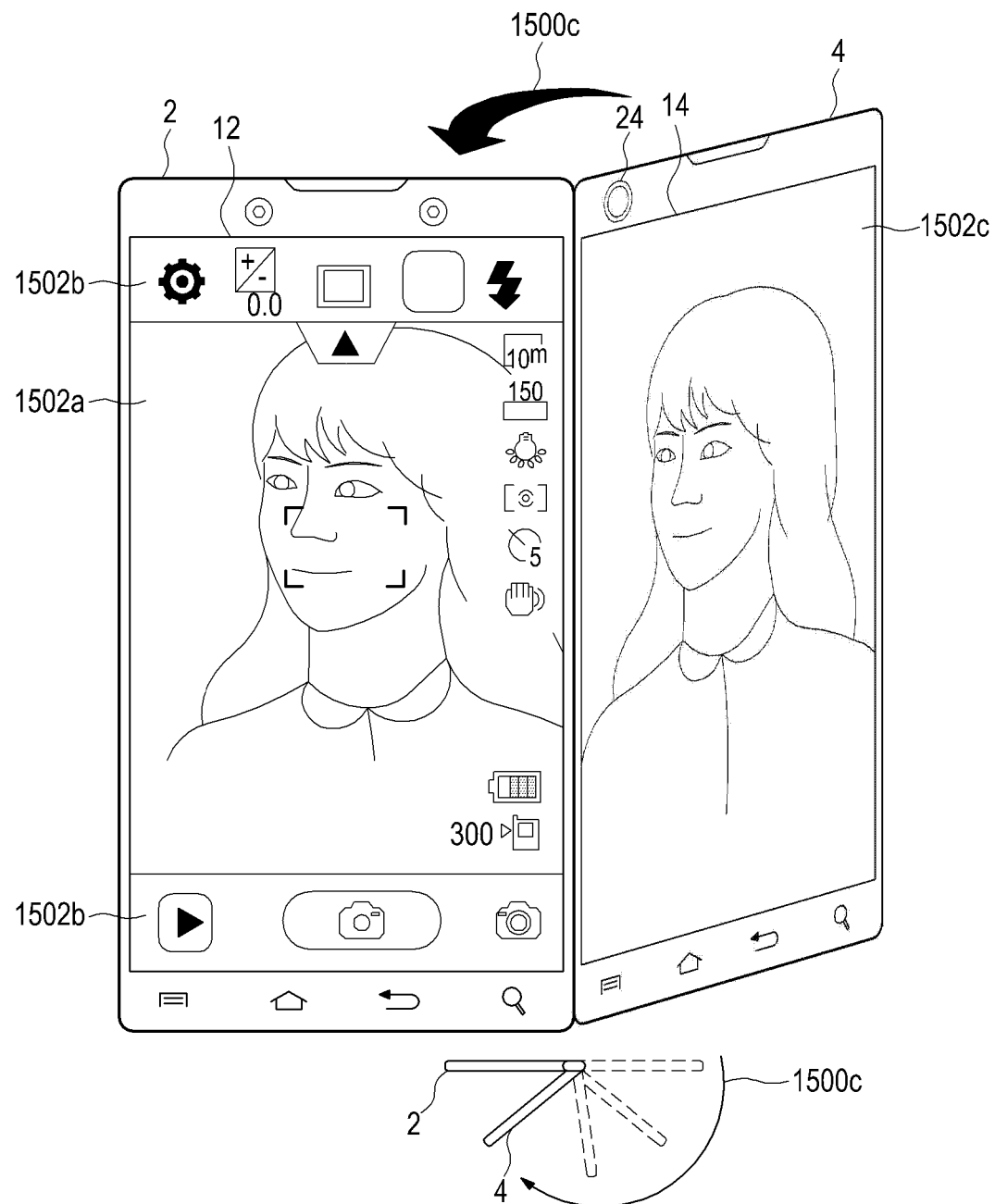
Figure 25I:
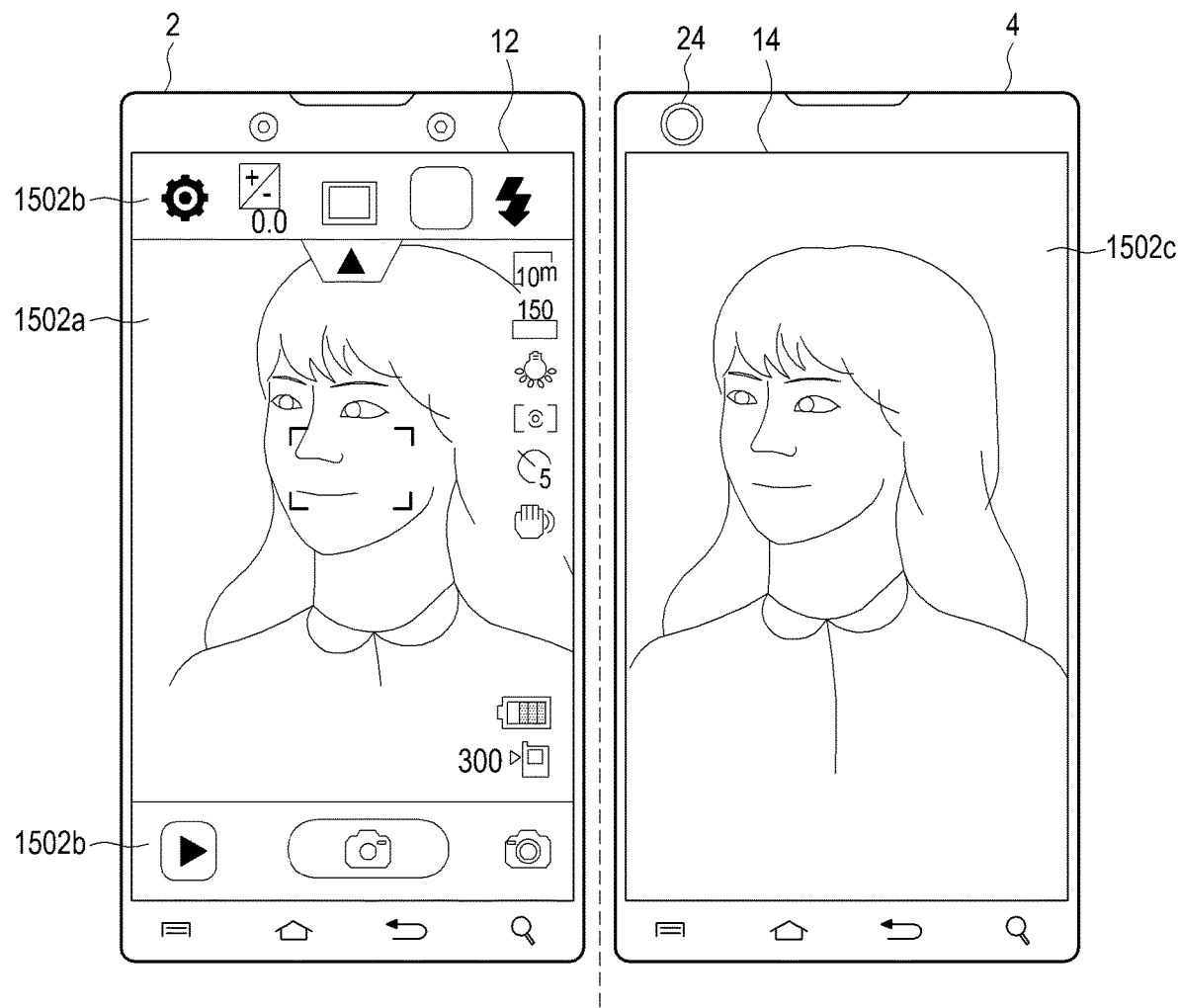

Referring to FIG. 25H, the portable device detects folding 1500c between the first and second panels 2 and 4 while the shot image 1502a is displayed in the first touch screen 12 in the dual camera mode and proceeds to FIG. 25I. Referring to FIG. 25I, the portable device displays a shot image 1502c in the second touch screen 14 without the camera menu 1502b in response to the detection of the folding 1500c between the first and second touch panels 2 and 4. Because the shot image 1502c of the second touch screen 14 has the purpose to be shown to the shot subject, the shot image 1502c does not require including the camera menu. The first touch screen 12 maintains the shot image 1502a and the camera menu 1502b after the folding 1500c.

Figure 25J:
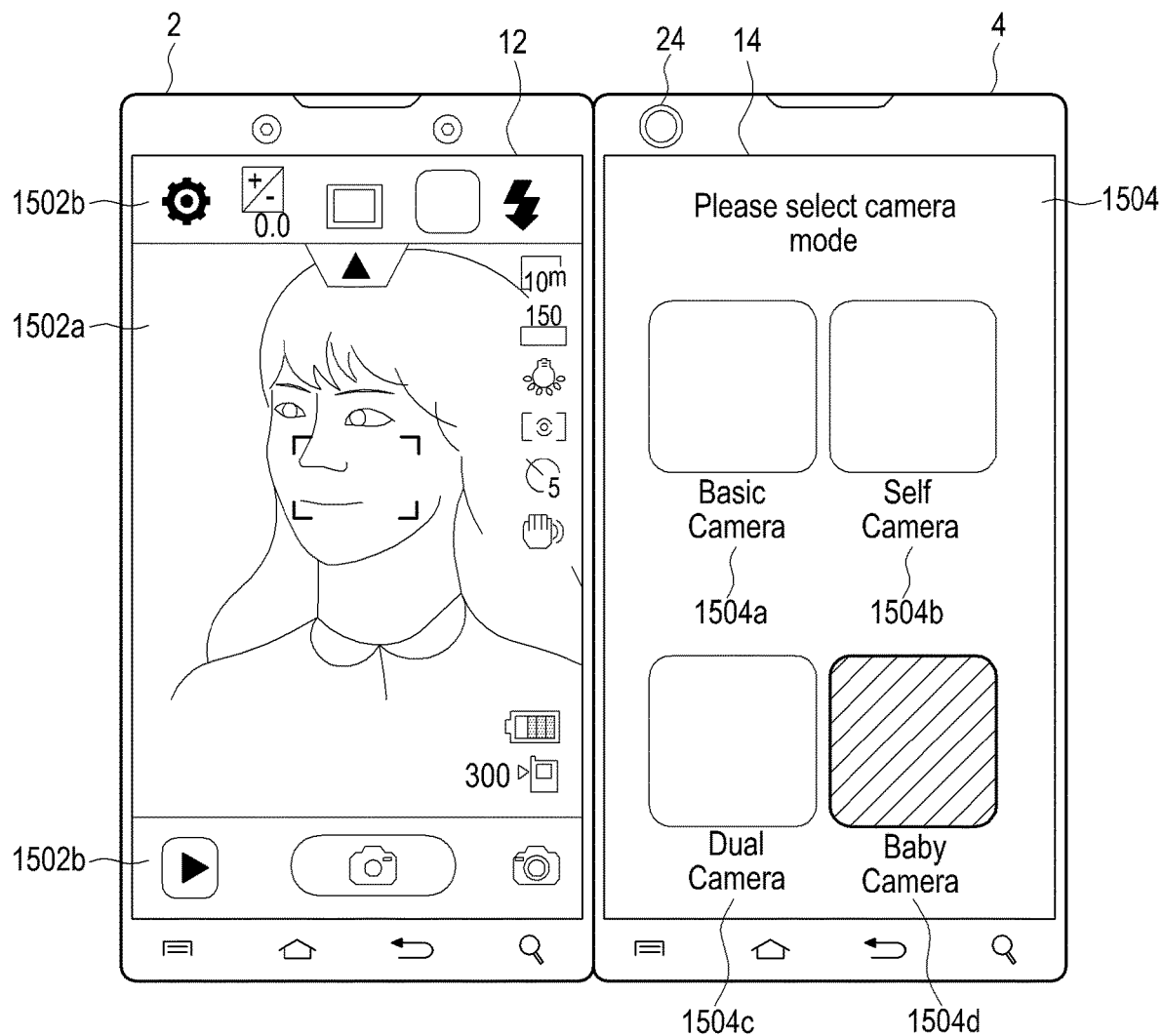

Referring to FIG. 25J, the first touch screen 12 displays the shot image 1502a shot by the camera module 24 in the baby camera mode and the camera menu 1502b, and the second touch screen 14 displays the camera mode menu 1504 for changing the camera mode. The camera mode menu 1504 includes at least one of the basic camera button 1504a, the self camera button 1504b, the dual camera button 1504c, and the baby camera button 1504d. In the self camera mode, the self camera button 1504d is displayed with a bold line or a different color to be distinguished.

Figure 25K:
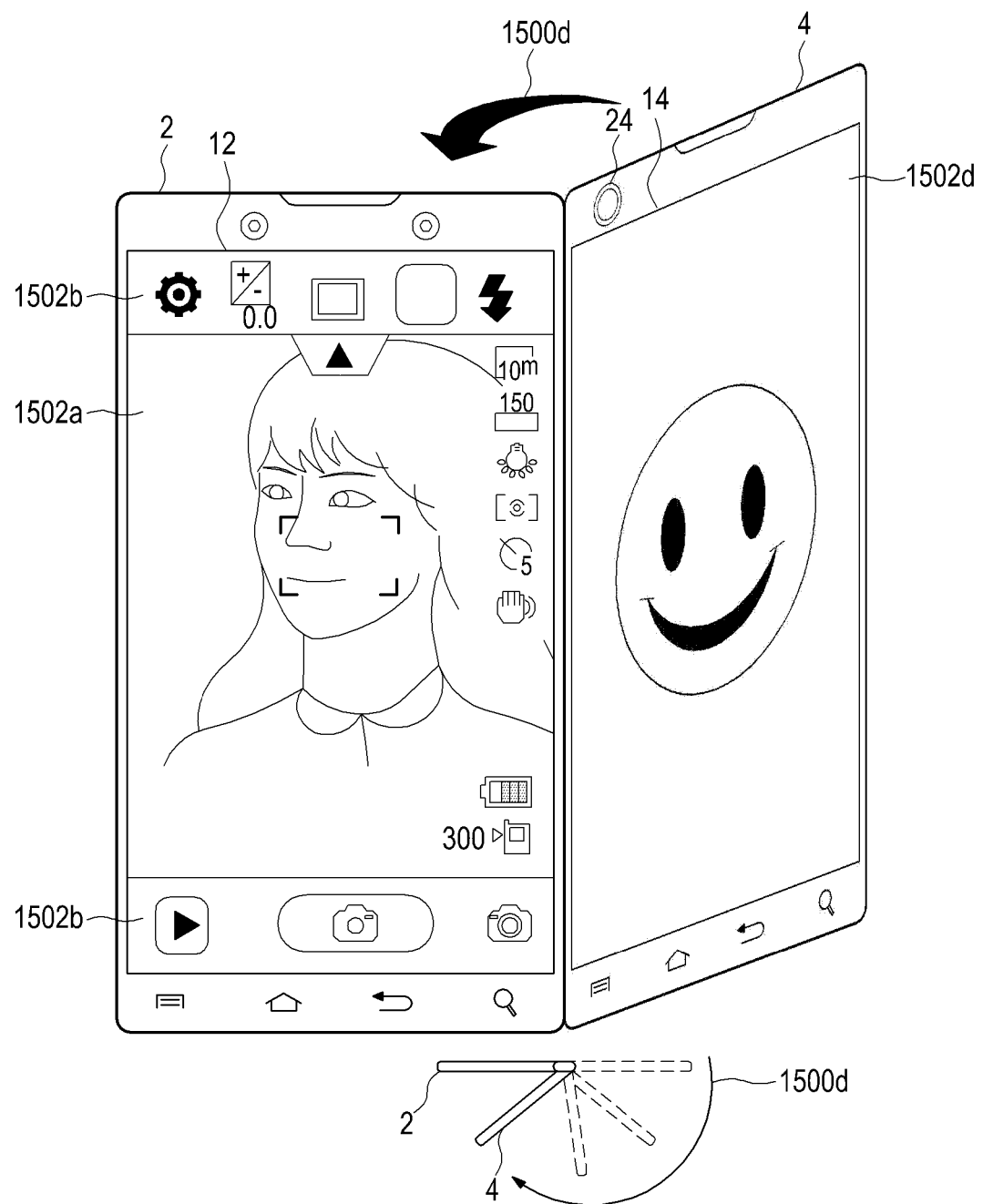
Figure 25L:
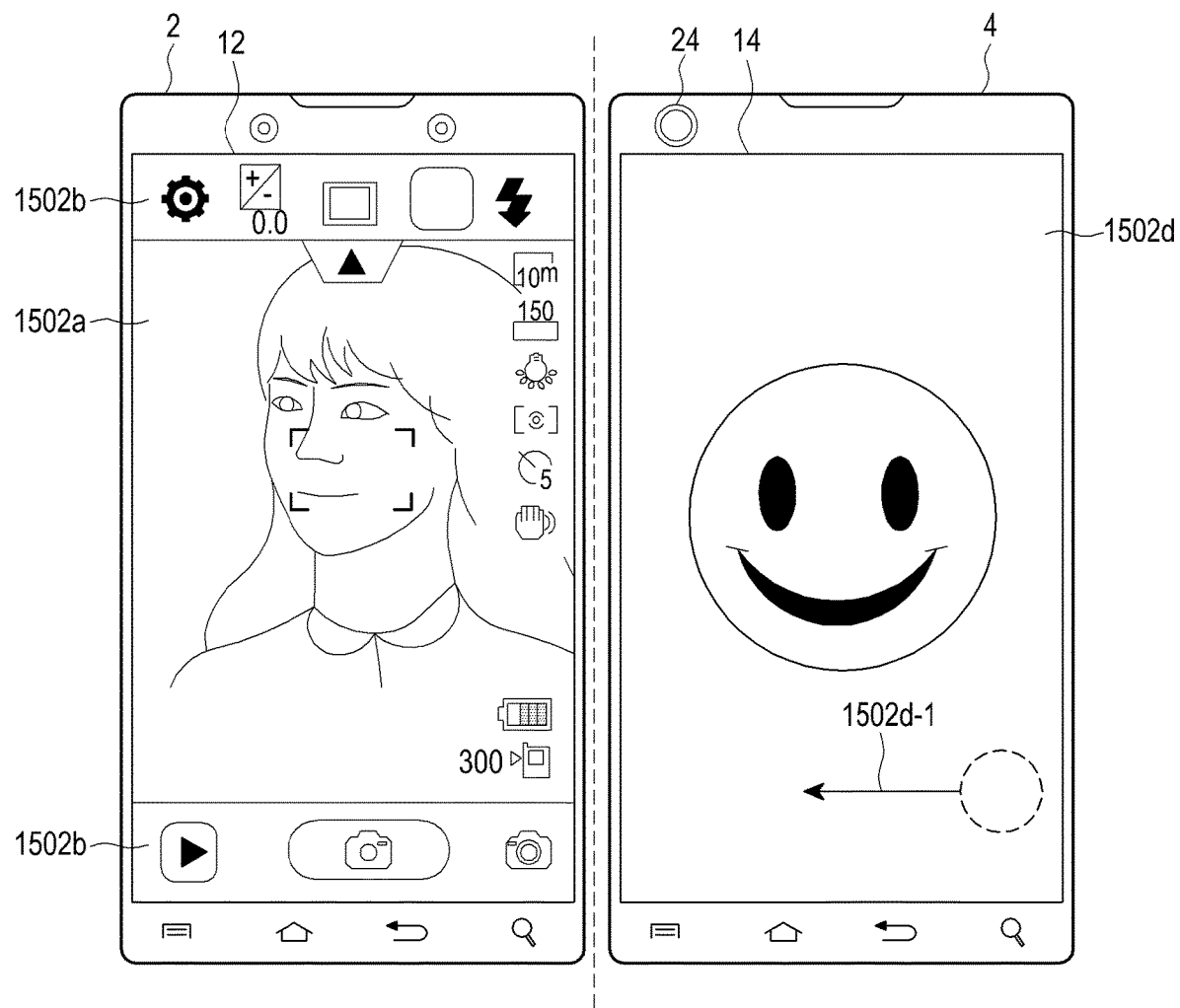

Referring to FIG. 25K, the portable device detects folding 1500d between the first and second panels 2 and 4 while the shot image 1502a is displayed in the first touch screen 12 in the dual camera mode and proceeds to FIG. 25L. Referring to FIG. 25L, the portable device displays an animation 1502d pre-stored in the second touch screen 14 in response to the detection of the folding 1500d between the first and second touch panels 2 and 4. The animation is a video stored in the portable device by the manufacturer or user to generate the interest of the shot subject, and may be selected by a setting menu provided by the camera application. For example, the setting menu may be loaded by selecting the menu button which is one of the physical buttons in the lower part of the first touch screen 12 displayed in the shot image 1502a.

As one embodiment, the portable device stores a plurality of animations which can be used in the baby camera mode of the camera application and displays a previous or next animation (not shown) in the second touch screen 14 as a predetermine gesture 1502d-1, for example, a left/right direction flick, a touch drag, or a sliding is detected from the second touch screen 14 while the animation 1502d is displayed in the second touch screen 14 in the baby camera mode.

Although not illustrated, the portable device can display the shot image 1502a and the camera menu 1502b in one of the first and second touch screens and display another application in the other touch screen. As one example, the first touch screen 12 displays the shot image 1502a and the camera menu 1502b in the basic camera mode and the second touch screen 14 displays another application. As another embodiment, the second touch screen 14 displays the shot image 1502a and the camera menu 1502b in the self camera mode and the first touch screen 12 displays another application.

When the camera mode menu is not displayed, the camera application supports switching of the camera mode through the camera menu 1502b.

Figure 26A:
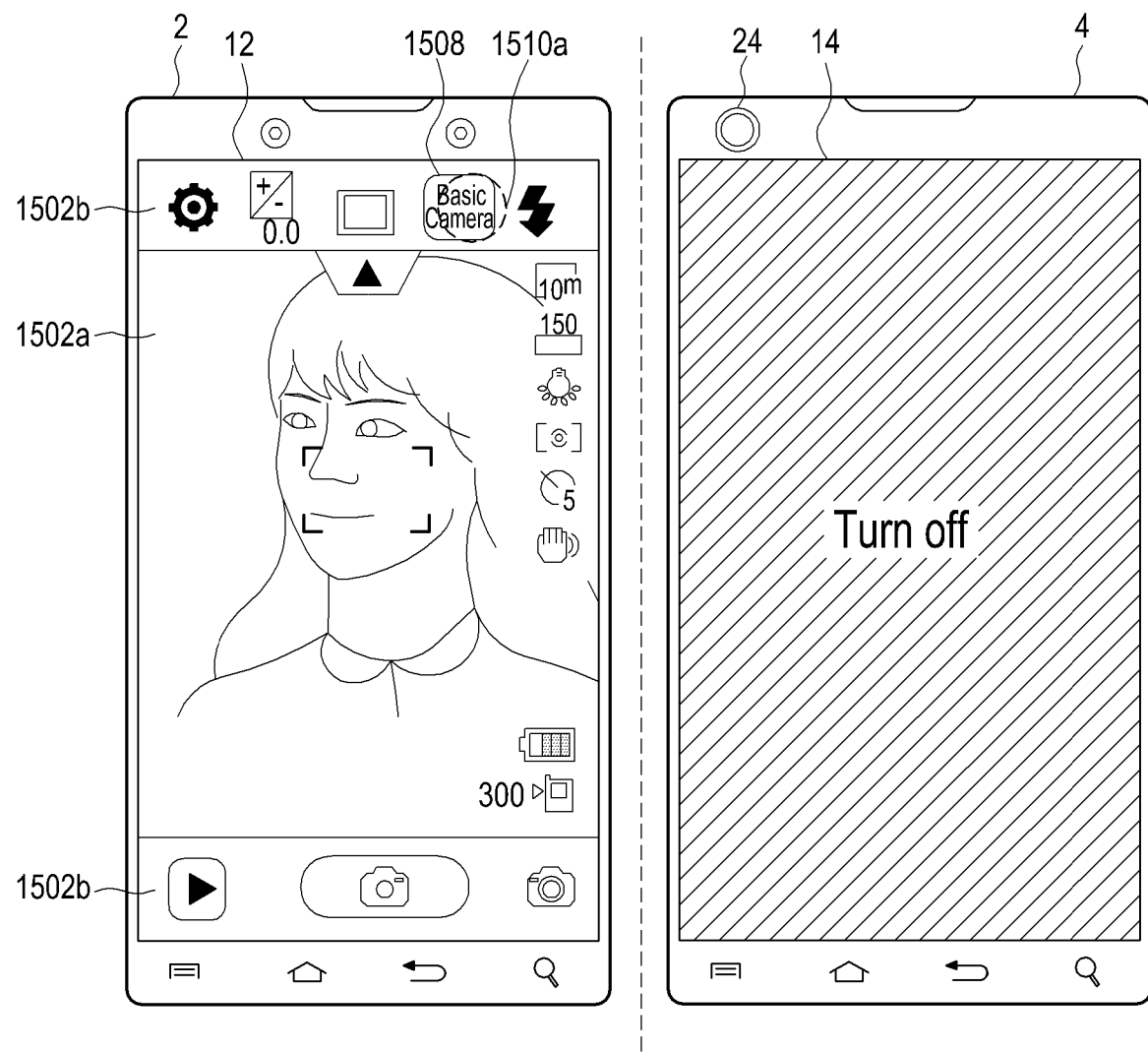
Figure 26B:
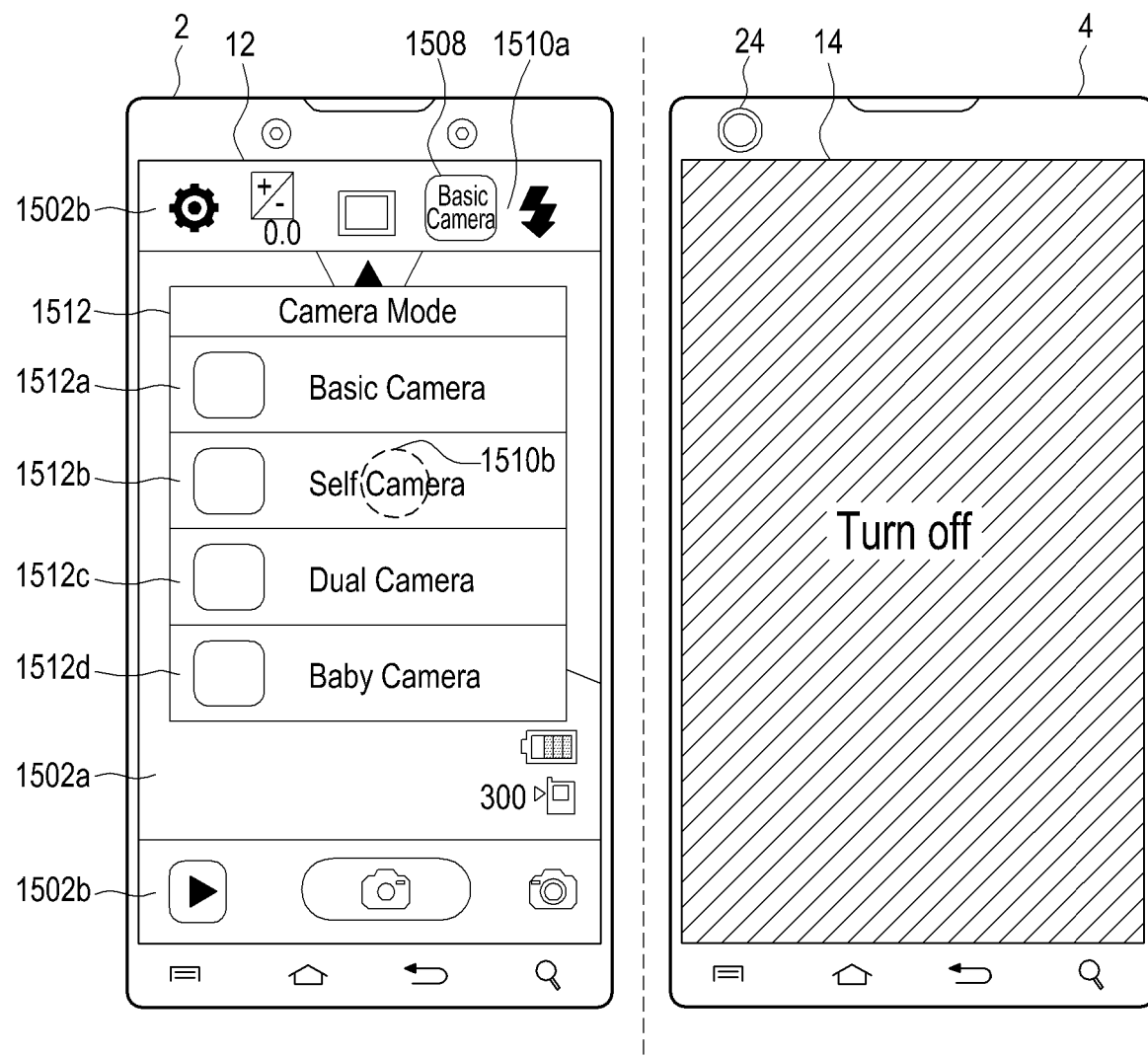
Figure 26C:
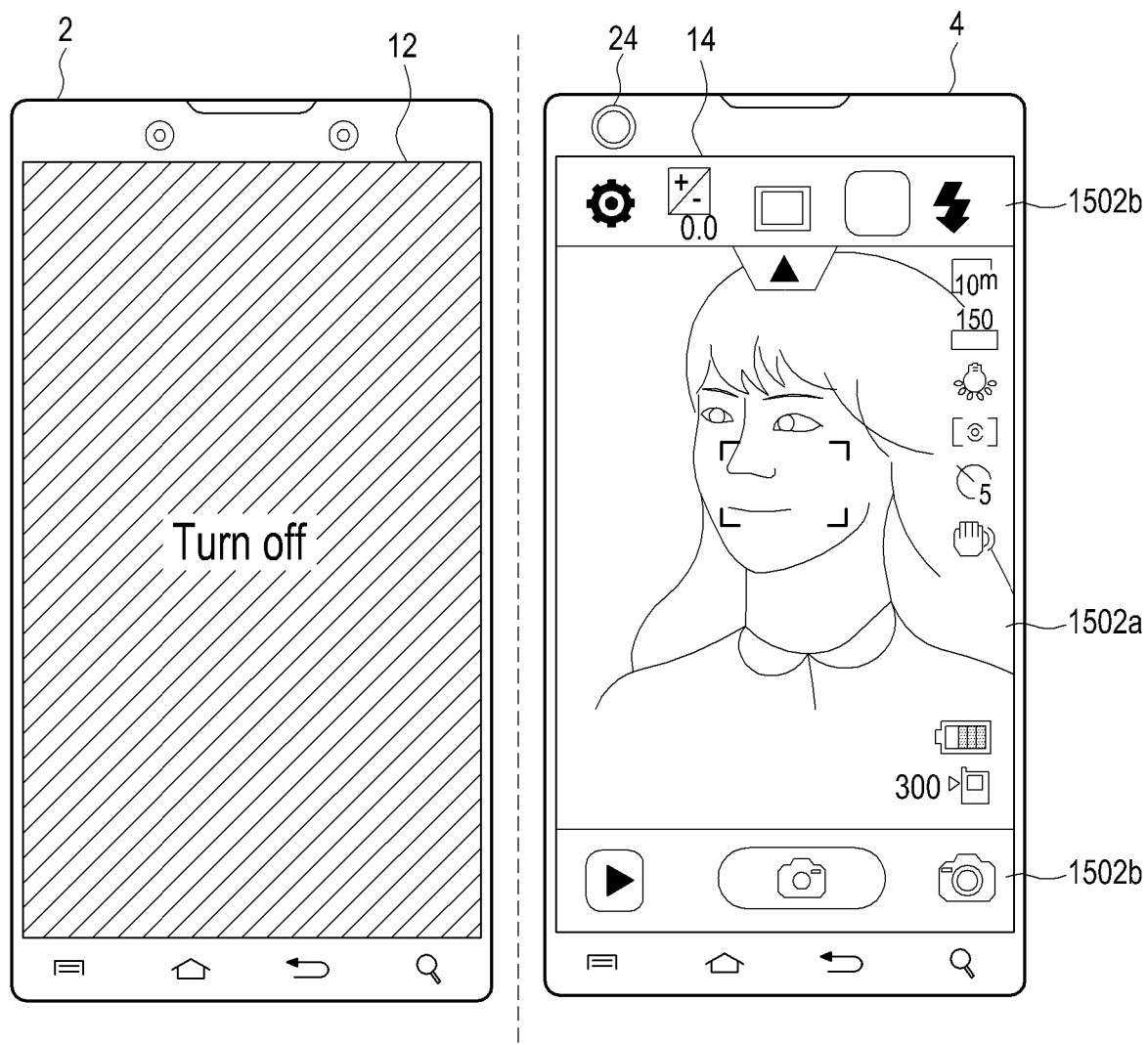

FIGS. 26A to 26C illustrate a scenario of switching the camera mode by the camera menu 1502b of the portable device. Although it is herein illustrated that the touch screen which does not display the shot image 1502a is turned off, the following description can be applied to a case where another application is displayed in the touch screen which does not display the shot image 1502a.

Referring to FIG. 26A, the first touch screen 12 displays the shot image 1502a and the camera menu 1502b and the second touch screen 14 is turned off. The camera menu 1502b includes function buttons such as a shutter button, a stored image loading button, a mode selection button 1508, a flash selection button and the like. When a predetermined touch gesture 1510a, for example, a tap gesture is detected from the mode selection button 1508, the portable device proceeds to FIG. 26B.

Referring to FIG. 26B, the portable device displays a camera mode menu window 1512 for changing the camera mode in the shot image 1502a of the first touch screen 12 in response to the detection of the touch gesture 1510a. The camera mode menu window 1512 includes check boxes 1512a, 1512b, 1512c, and 1512d corresponding to a plurality of camera modules, for example, the basic camera mode, the self camera mode, the dual camera mode, and the baby camera mode. When a tap gesture 1510b is detected from the check box 1512b in the self camera mode among the check boxes 1512a to 1512d, the portable device proceeds to FIG. 26C.

Referring to FIG. 26C, the portable device displays the shot image 1502a and the camera menu 1502b in the second touch screen 14 and turns off the first touch screen 12 in response to the detection of the tap gesture 1510b. AS another embodiment, when another application is displayed in the second touch screen 14 before the camera mode is changed, the first touch screen 12 can display another application in response to the detection of the tap gesture 1510b.

Although not illustrated, when a tap gesture is detected from the dual camera mode 1512c within the camera mode menu window 1512, the portable device displays the shot image 1502c in the second touch screen 14 without the camera menu while maintaining the shot image 1502a of the first touch screen 12 and the camera menu 1502b as illustrated in FIG. 25I. Further, when a tap gesture is detected from the baby camera mode 1512d within the camera mode menu window 1512, the portable device displays the pre-stored animation 1502d in the second touch screen 14 while maintaining the shot image 1502a of the first touch screen 12 and the camera menu 1502b as illustrated in FIG. 25L.

FIGS. 26D to 26G illustrate a scenario of switching the camera mode by a touch of the touch screen which does not display the shot image.

Figure 26D:
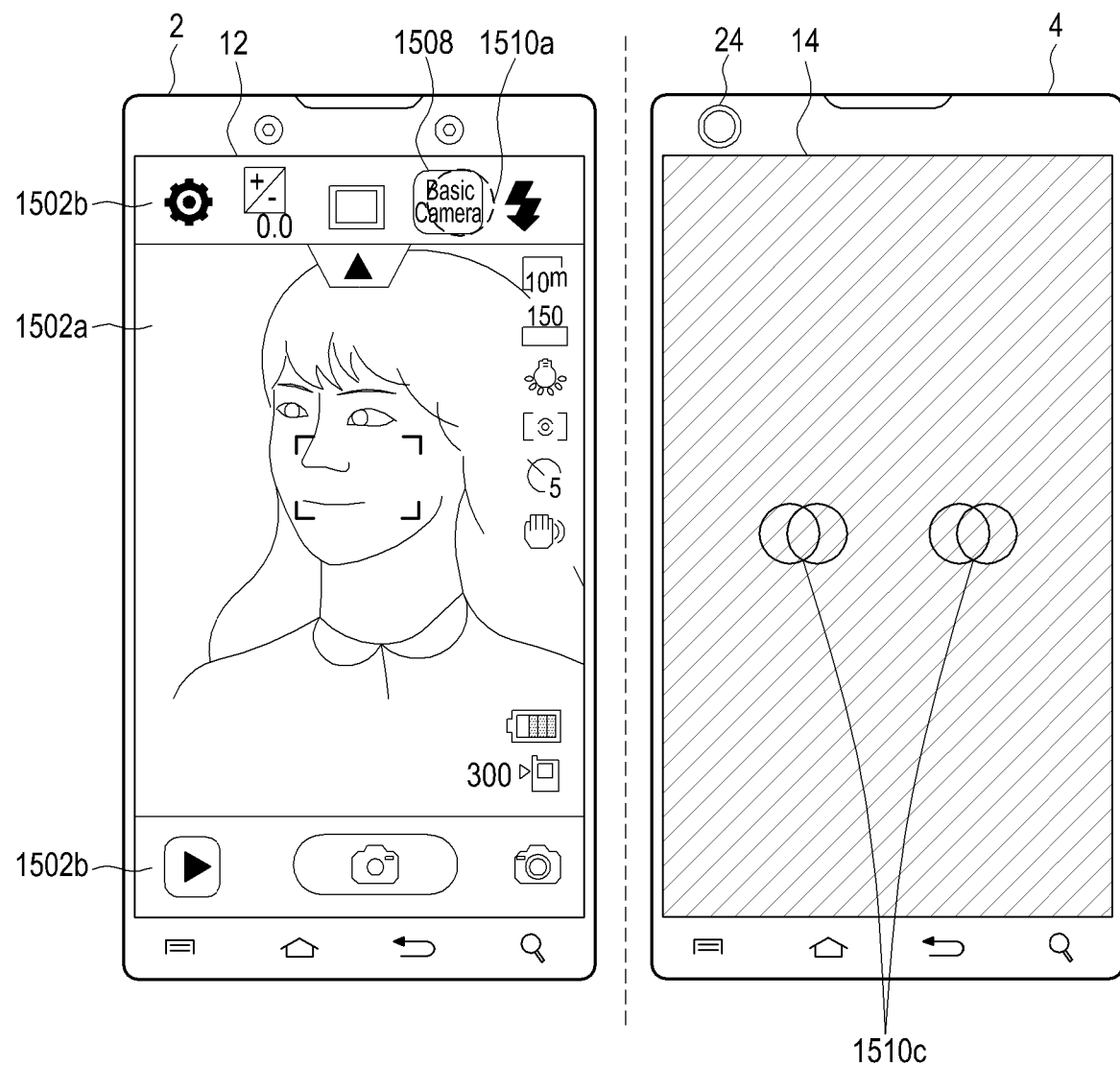

Referring to FIG. 26D, the first touch screen 12 displays the shot image 1502b and the camera menu 1202b and the second touch screen 14 is turned off. The first panel 2 including the first touch screen 12 and the second panel 4 including the second touch screen 14 are in a folded state.

Figure 26E:
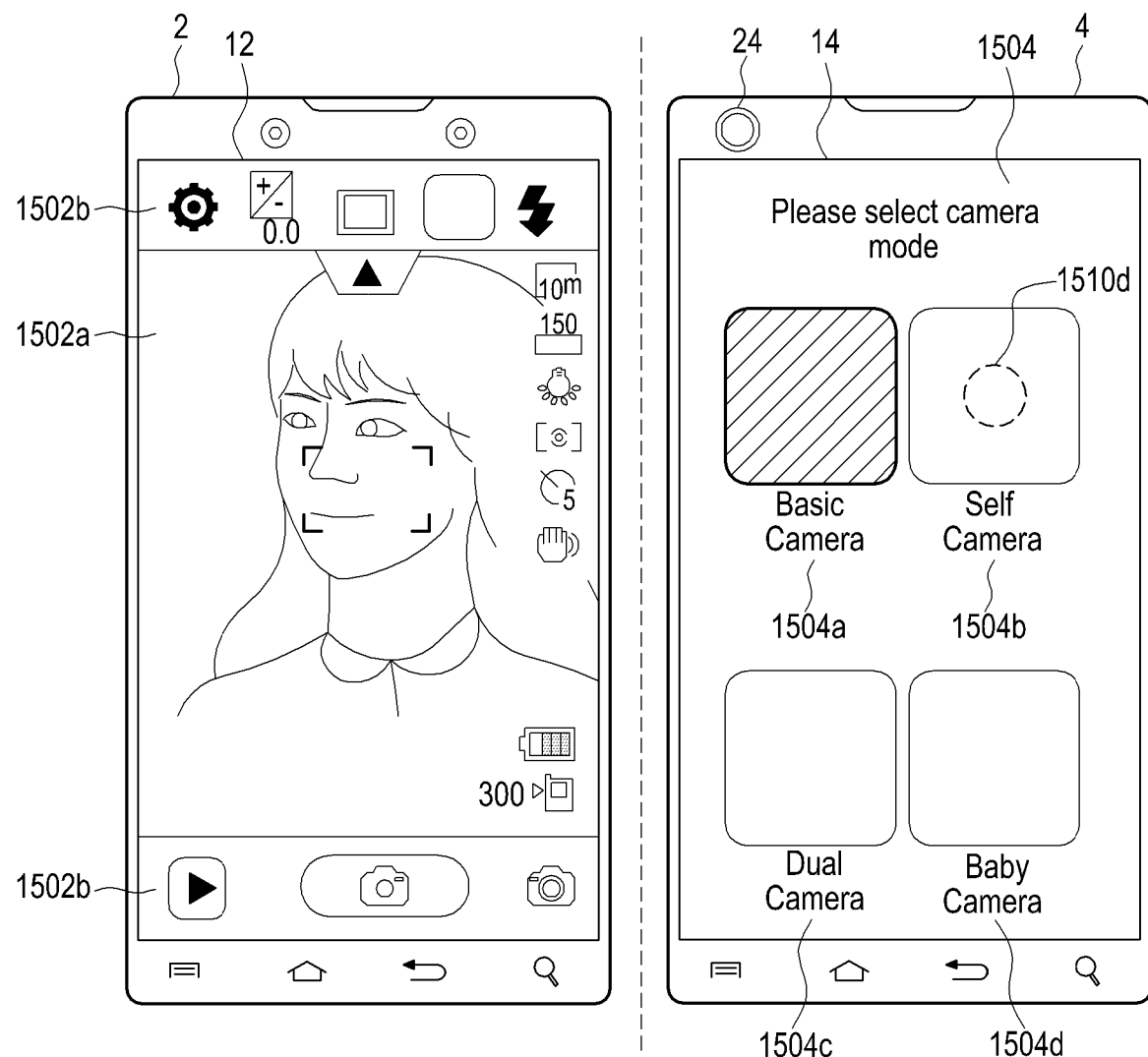

When a predetermined touch gesture 1510c, for example, two touches (double touch) or two taps (double tap) actually generated at the same time are detected from the turned off second touch screen 14, the portable device proceeds to FIG. 26E.

Referring to FIG. 26E, the portable device displays the camera mode menu 1504 including mode buttons 1504a, 1504b, 1504c, and 1504d corresponding to a plurality of camera modes in the second touch screen 14 in response to the detection of the touch gesture 1510c. In an initial display, a camera mode corresponding to the shot image 1502a of the first touch screen 12 among the camera mode menu 1504, that is, the basic camera button 1504a corresponding to the basic camera mode is highlighted in the shown example.

Figure 26F:
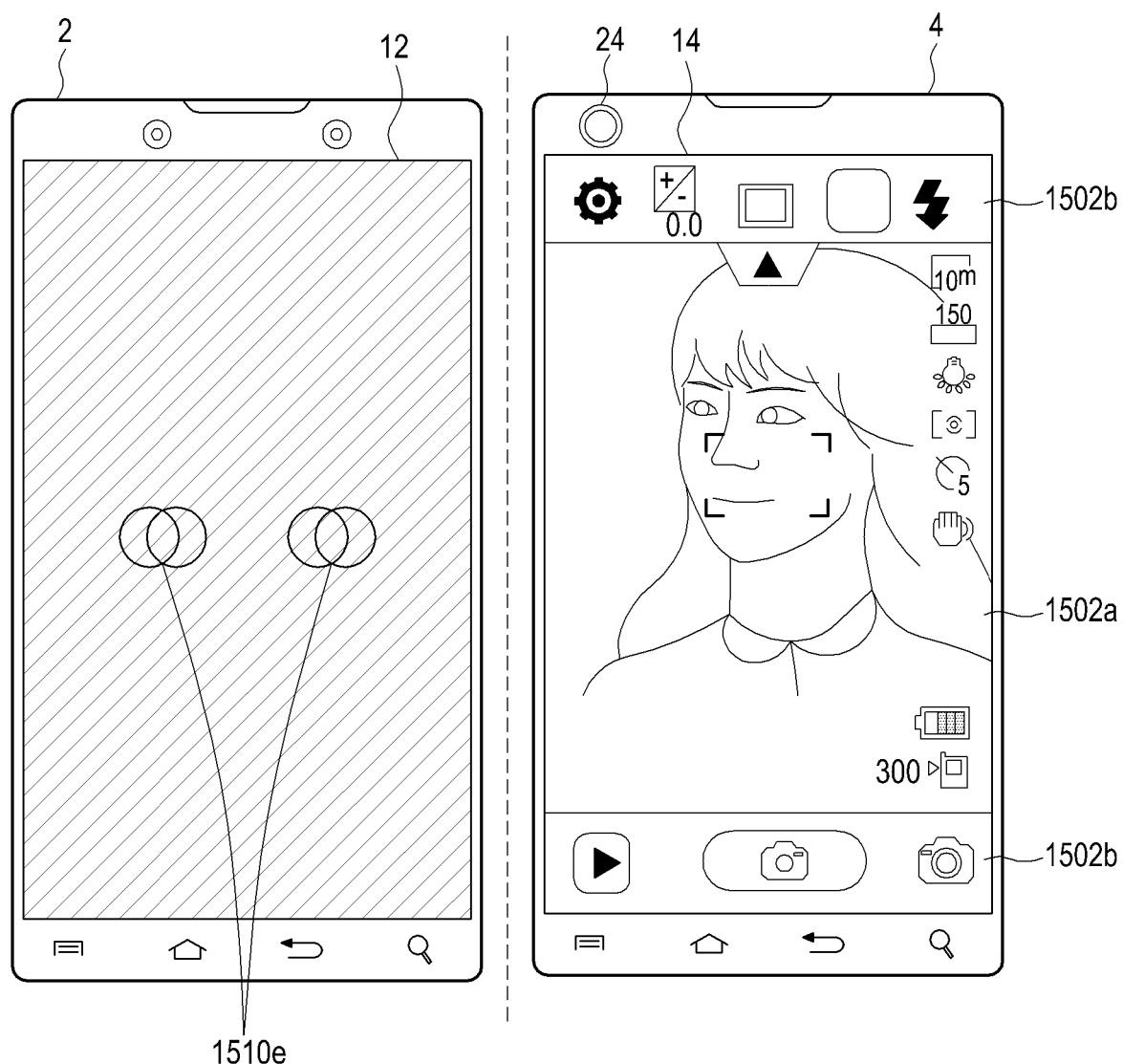

When a predetermined touch gesture 1510d, for example, a tap gesture is detected from one of the different mode buttons within the camera mode menu 1504, for example, the self camera button 1504b, the portable device proceeds to FIG. 26F.

Referring to FIG. 26F, the portable device switches the camera mode to the self camera mode, displays the shot image 1502a and the camera menu 1502b in the second touch screen 14, and turns off the first touch screen 12 in response to the detection of the touch gesture 1510d. When a predetermined touch gesture 1510e, for example, two touches (double touch) or two taps (double tap) which are actually generated at the same are detected from the turned off first touch screen 12, the portable device proceeds to FIG. 26G.

Figure 26G:
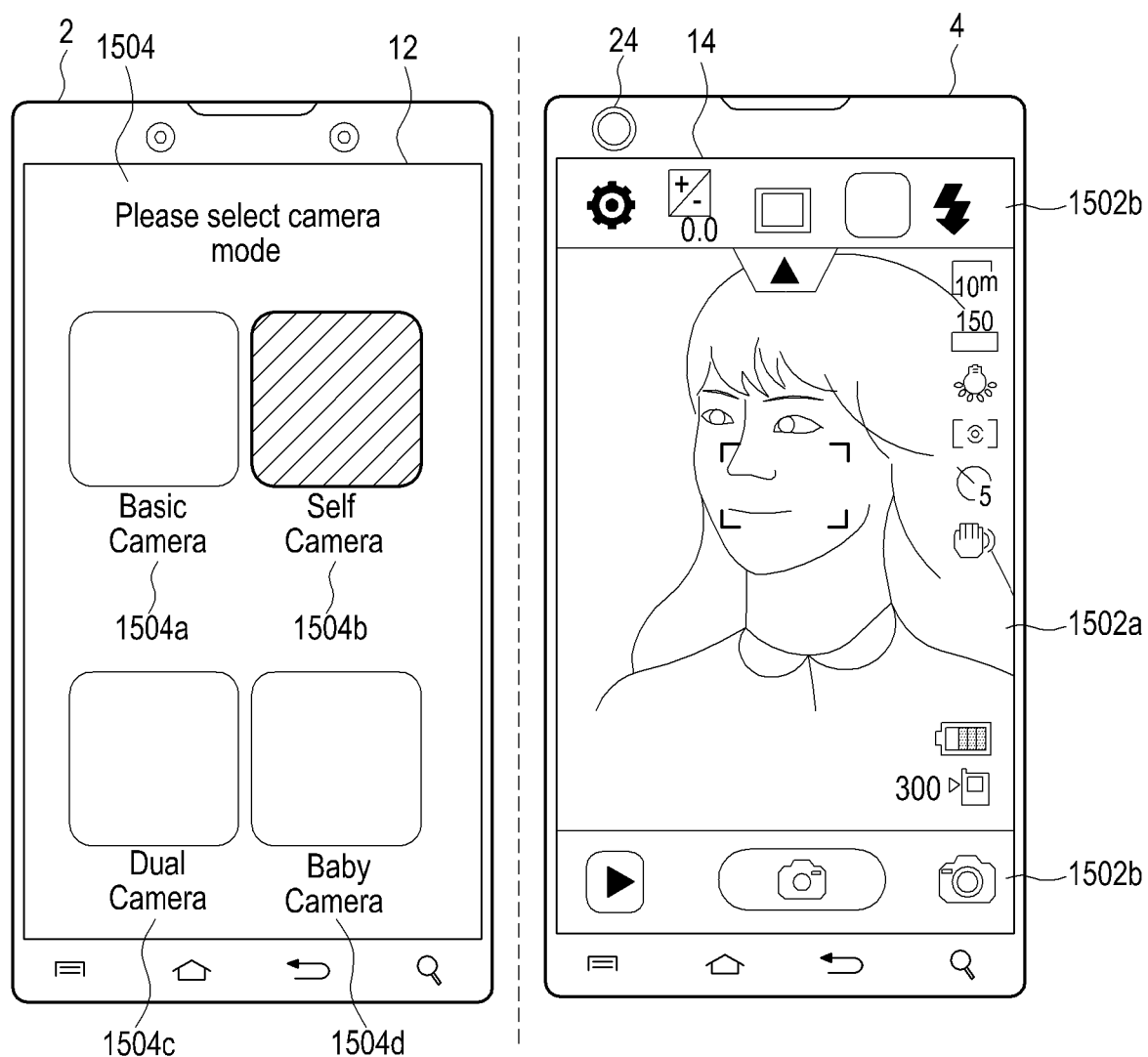

Referring to FIG. 26G, the portable device displays the camera mode menu 1504 including the mode buttons 1504a, 1504b, 1504c, and 1504d corresponding to the plurality of camera modes in the first touch screen 12 in response to the detection of the touch screen 1510e. When the camera mode menu 1504 is displayed, the camera mode corresponding to the shot image 1502a of the second touch screen 14 among the camera mode menu 1504, that is, the self camera button 1504d is highlighted. Similarly, when a tap gesture of the dual camera button 1504c or the baby camera button 1504d of the camera mode menu 1504 is detected, the portable device displays the shot image and the animation in the corresponding camera mode in the first and second touch screens 12 and 14.

Figure 26H:
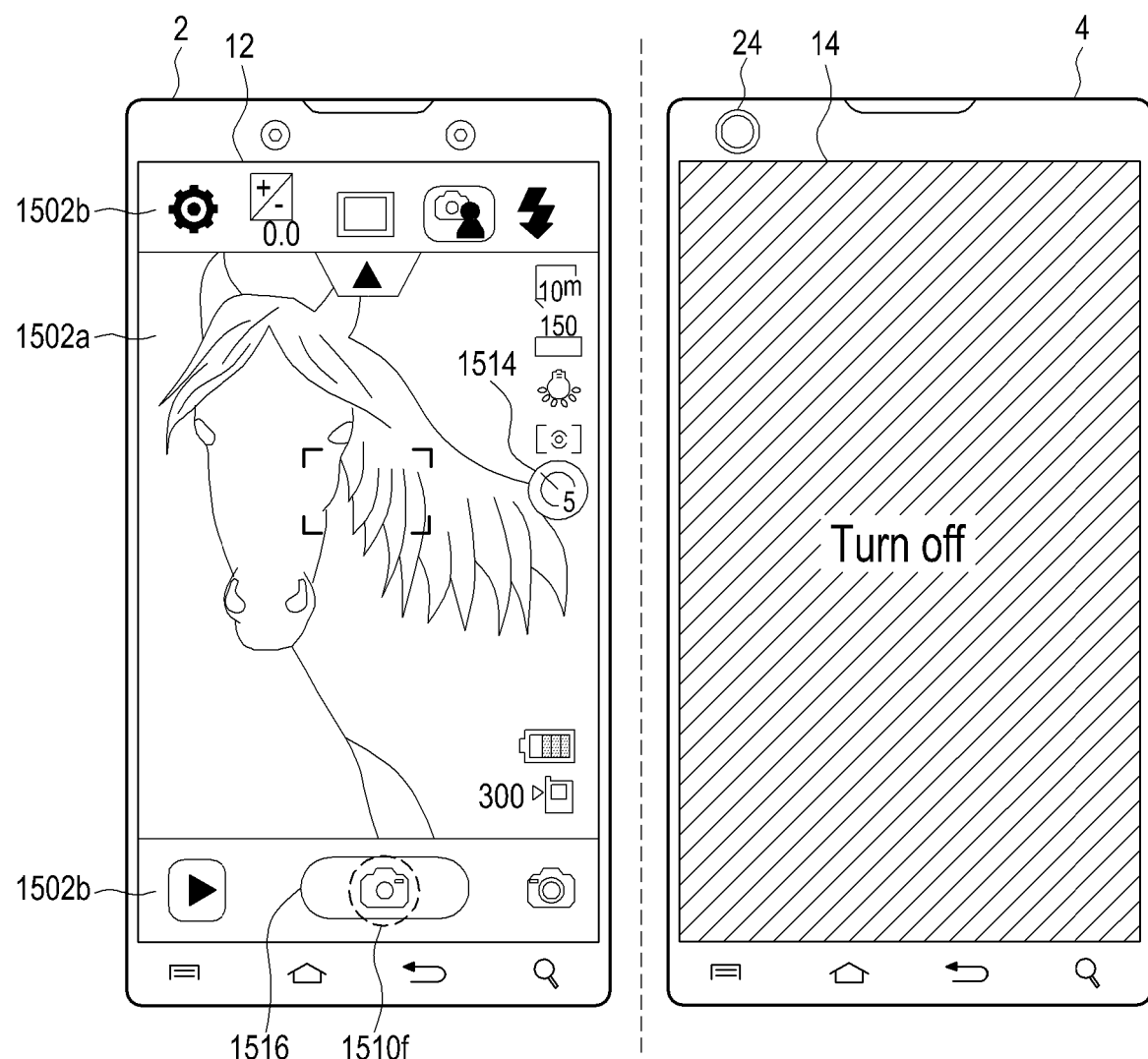
Figure 26I:
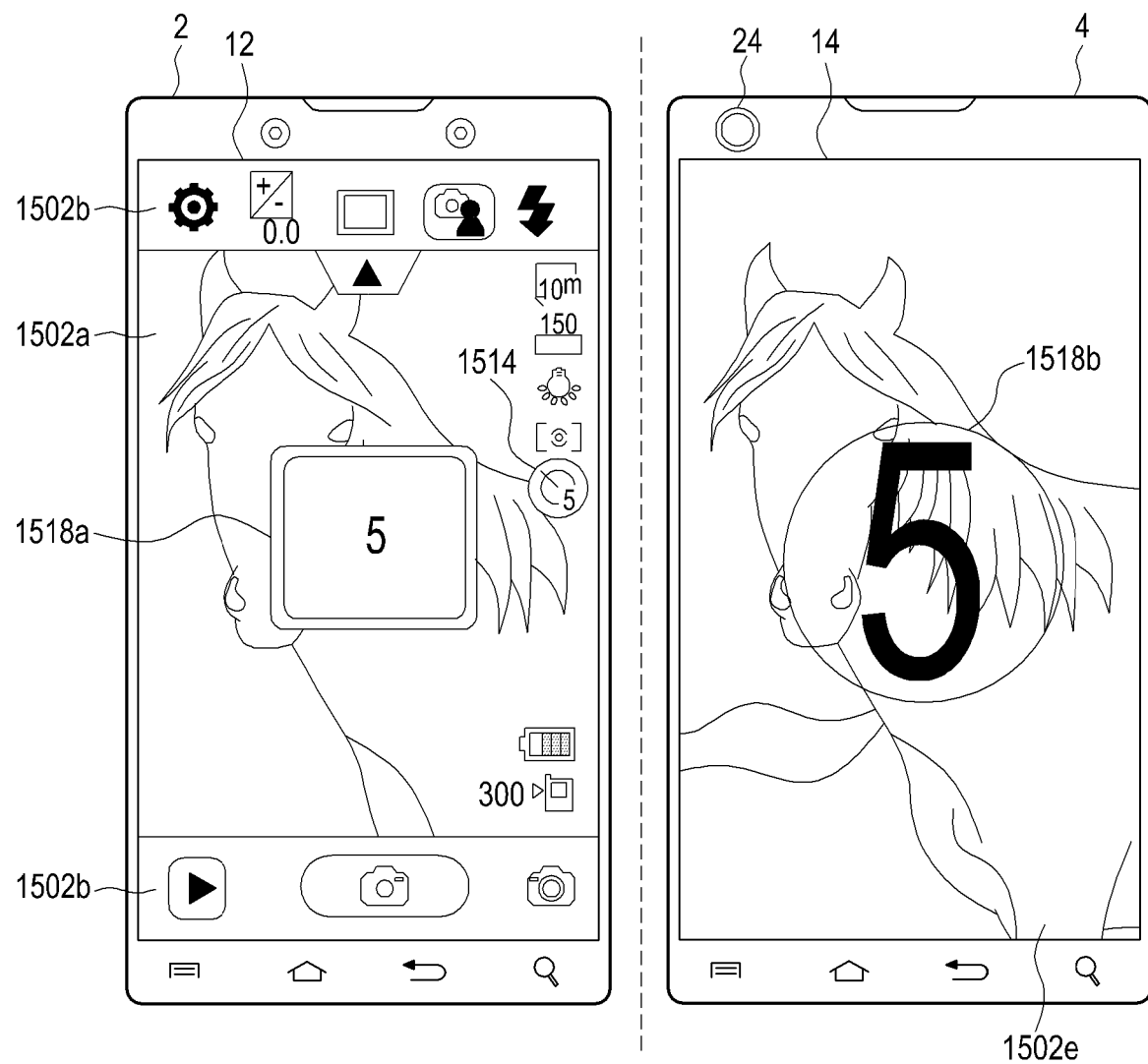
Figure 26J:
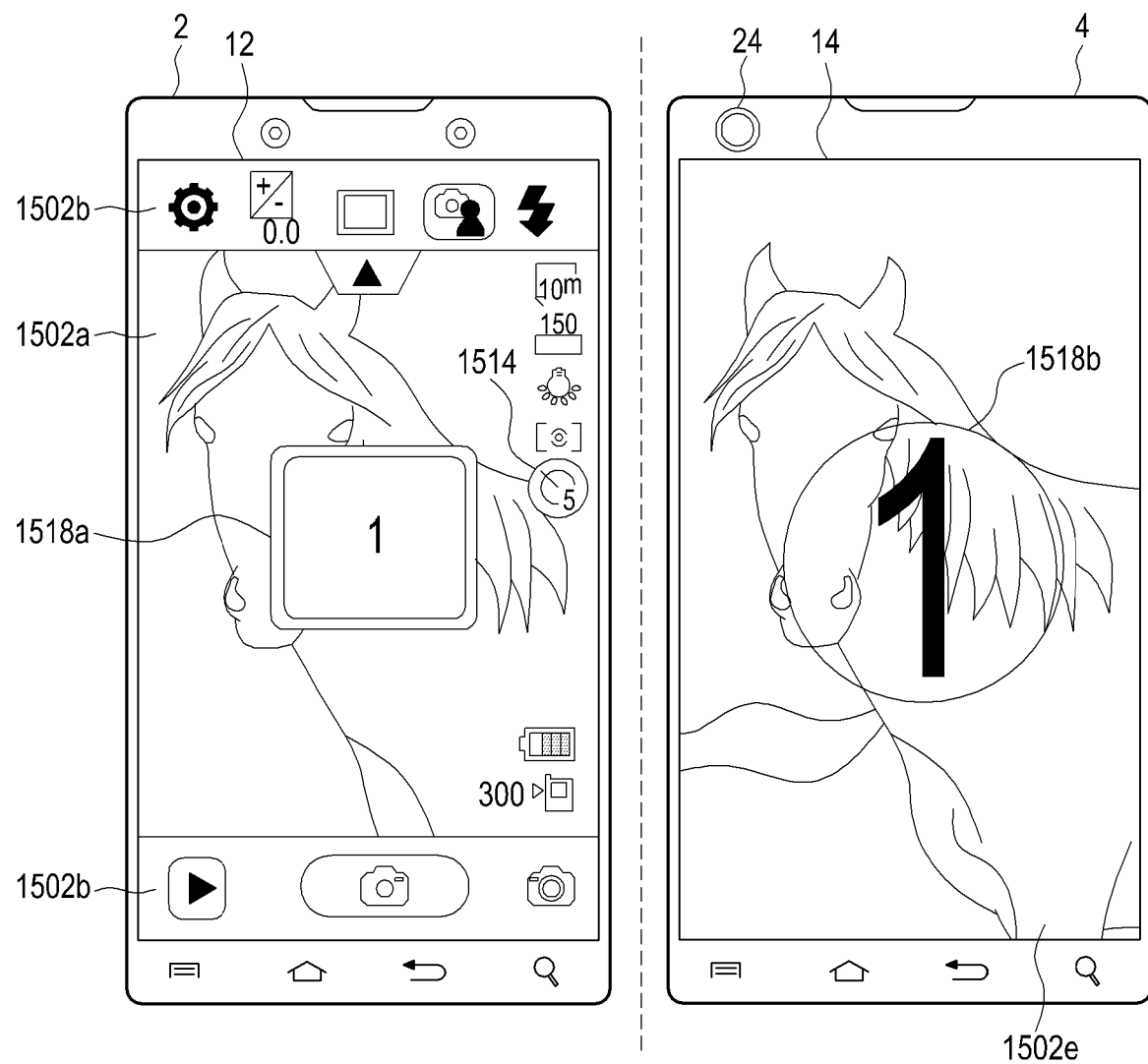

FIGS. 26H to 26J illustrate a scenario of a timer shooting. Although a scenario in the basic camera mode will be described hereinafter, a count and a shot image can be displayed in a sub screen as well as a main screen in all the camera modes in the timer shooting.

Referring to FIG. 26H, the first touch screen 12 displays the shot image 1502a and the camera menu 1502b, and the second touch screen 14 is turned off. The first panel 2 including the first touch screen 12 and the second panel 4 including the second touch screen 14 may be in a folded state. The camera menu 1502b of the first touch screen 12 includes a timer shooting button 1514. When a tap gesture 1510f is detected from a shutter button 1516 in a state where the timer shooting is selected by using the timer shooting button 1514, the portable device proceeds to FIG. 26I.

Referring to FIG. 26I, the portable device displays a count window 1518a in the shot image 1502a of the first touch screen 12 in response to the detection of the tap gesture 1510f. The portable device simultaneously displays a shot image 1502e in the second touch screen 14 and displays a count window 1518b on the shot image 1502a. Initially, the two count windows 1518a and 1518b display a preset maximum timer value N, for example, 5. As illustrated in FIG. 26J, the count windows 1518a and 1518b of the first and second touch screens 12 and 14 reduce the timer value one by one in the predetermined unit (for example, one second). When the timer value reaches 0 after N seconds, the portable device automatically performs the shooting by driving the camera module while feeding back a shooting effect sound. At this time, the timer value 0 may not be displayed.

Figure 26K:
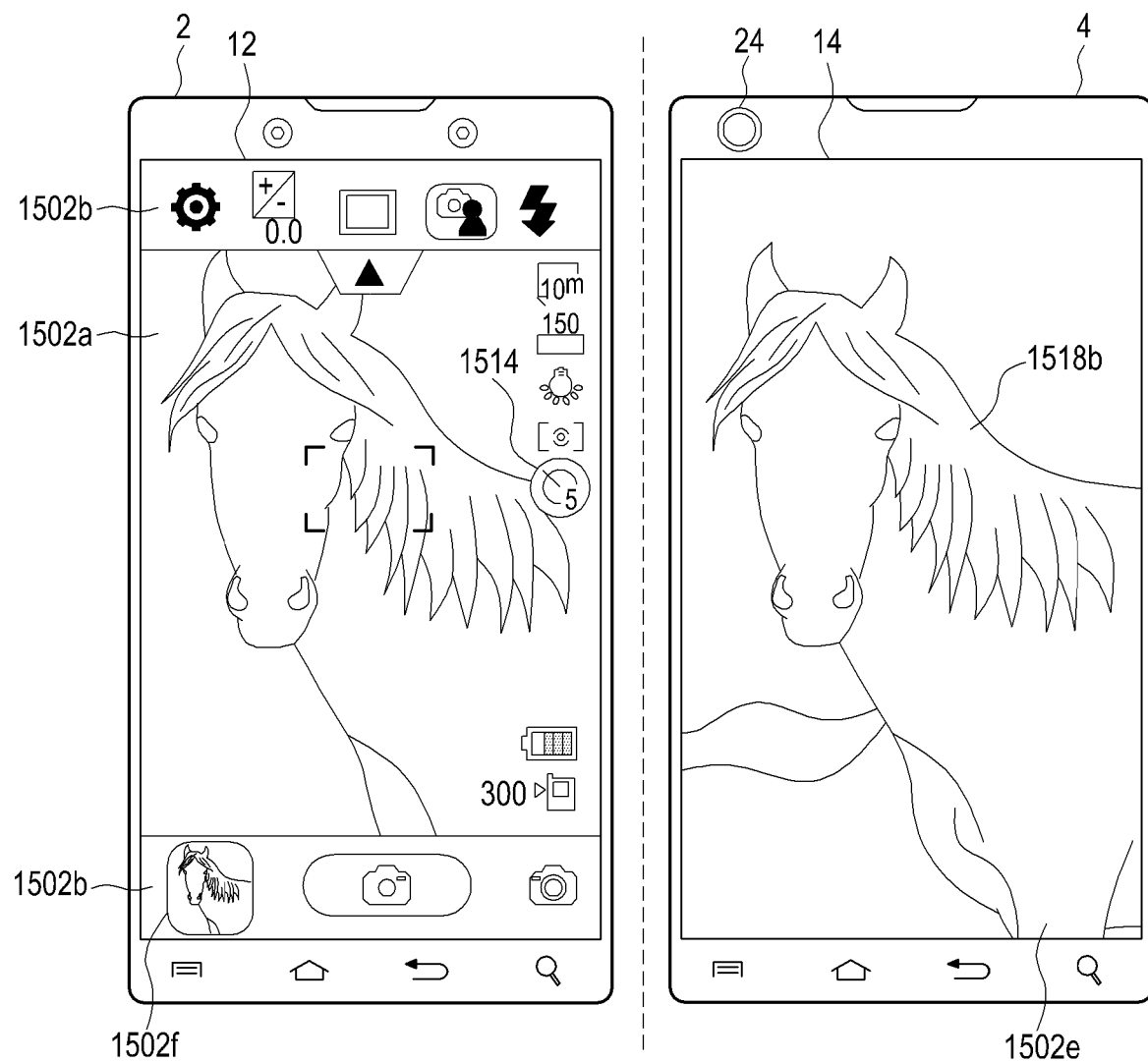

Although not illustrated, a save screen may be displayed in the first and second touch screens 12 and 14 while a picture image shot just after the shooting is stored in a memory of the portable device. When the storage is quickly performed, a display of the save screen may be omitted. As illustrated in FIG. 26K, after the picture image is stored, the portable device returns the first and second touch screens 12 and 14 to a state before the shooting as illustrated in FIG. 26H. At this time, a thumbnail image 1502f miniaturized from the just previously shot picture image may be included in the camera menu 1502b in the first touch screen 12.

Figure 27A:
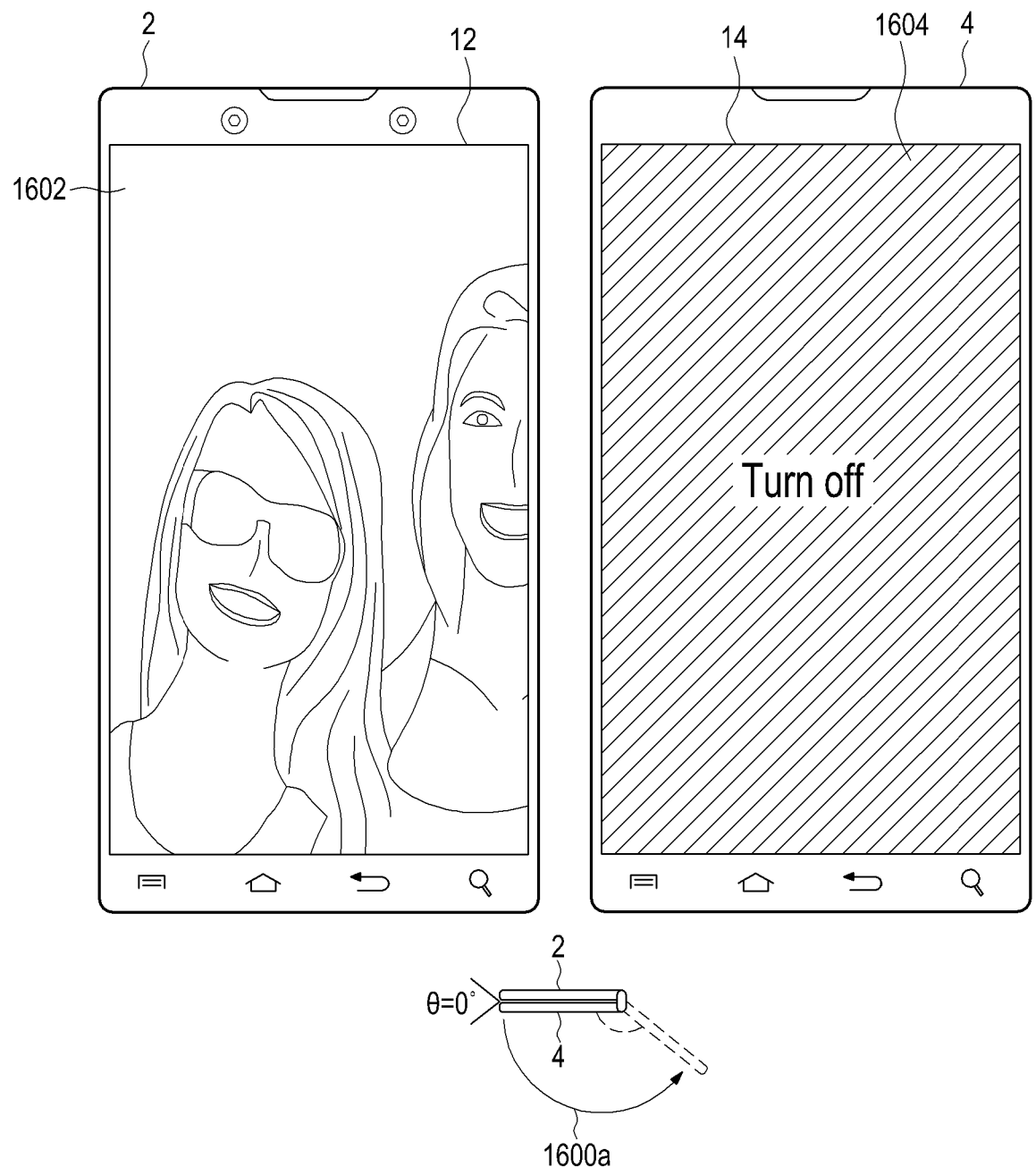
FIGS. 27A to 27Q are diagrams illustrating a change in a view mode according to a physical motion of the portable device according to one or more exemplary embodiments.
Figure 27B:
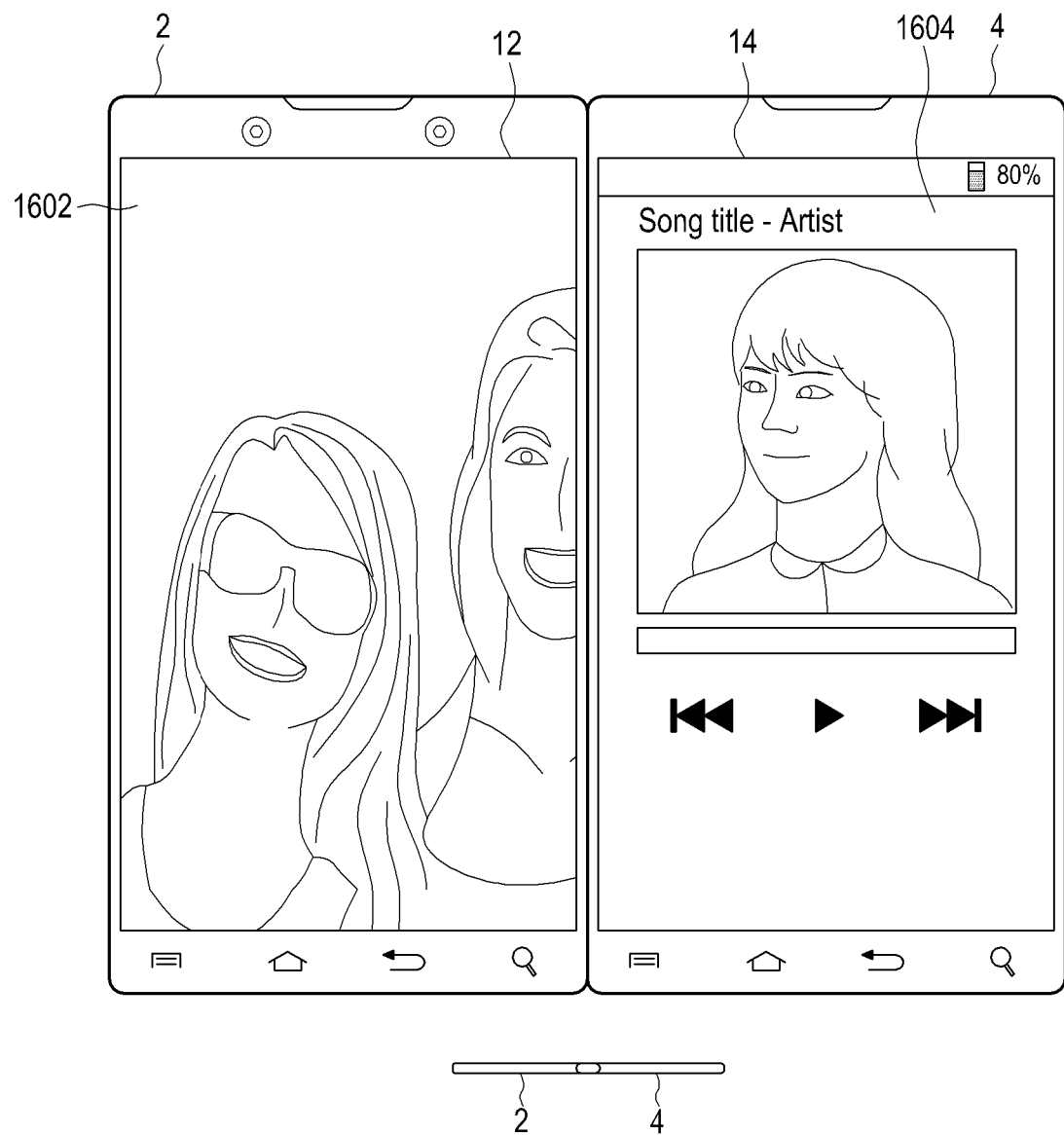
Figure 27C:
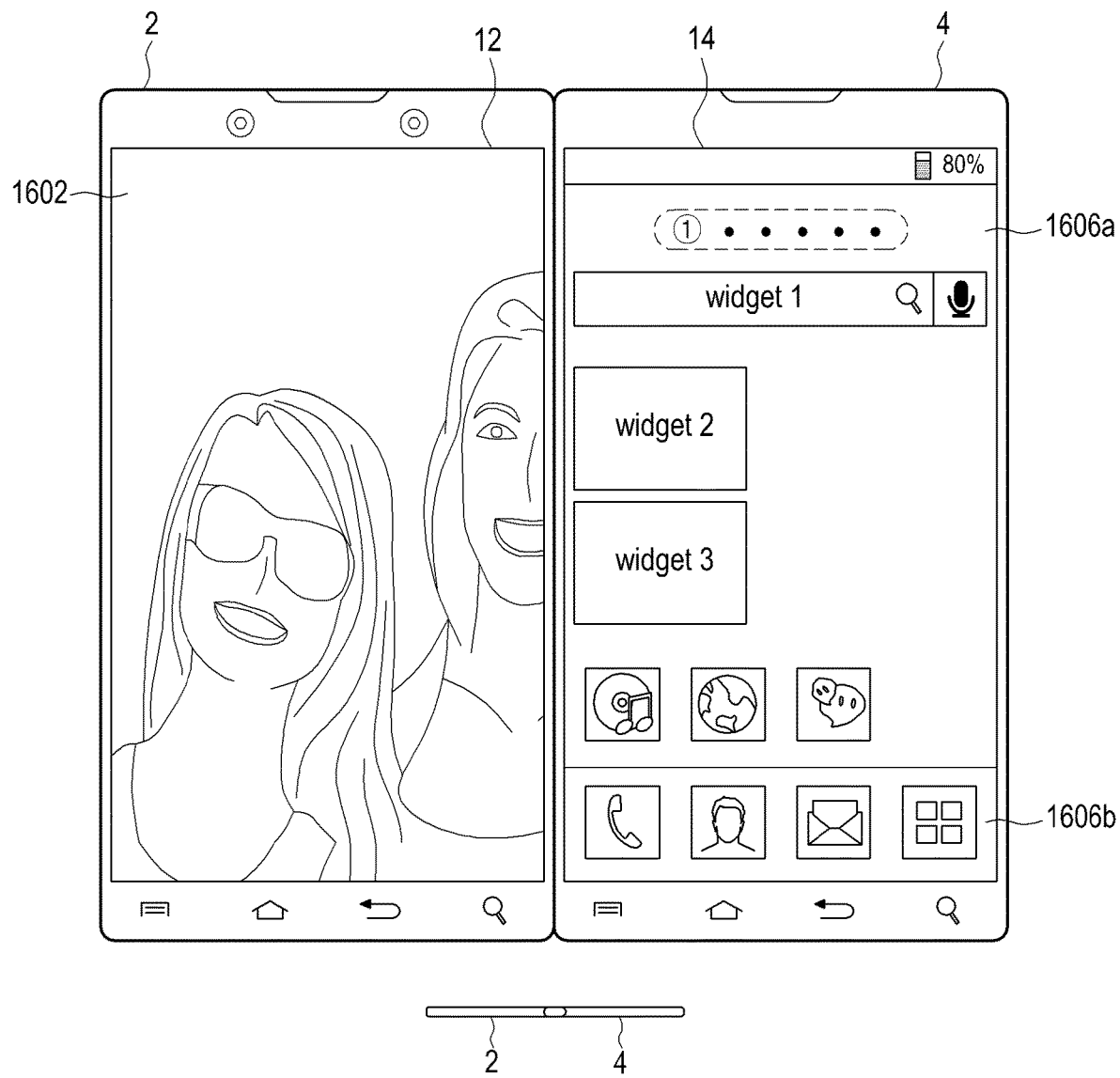
Figure 27D:
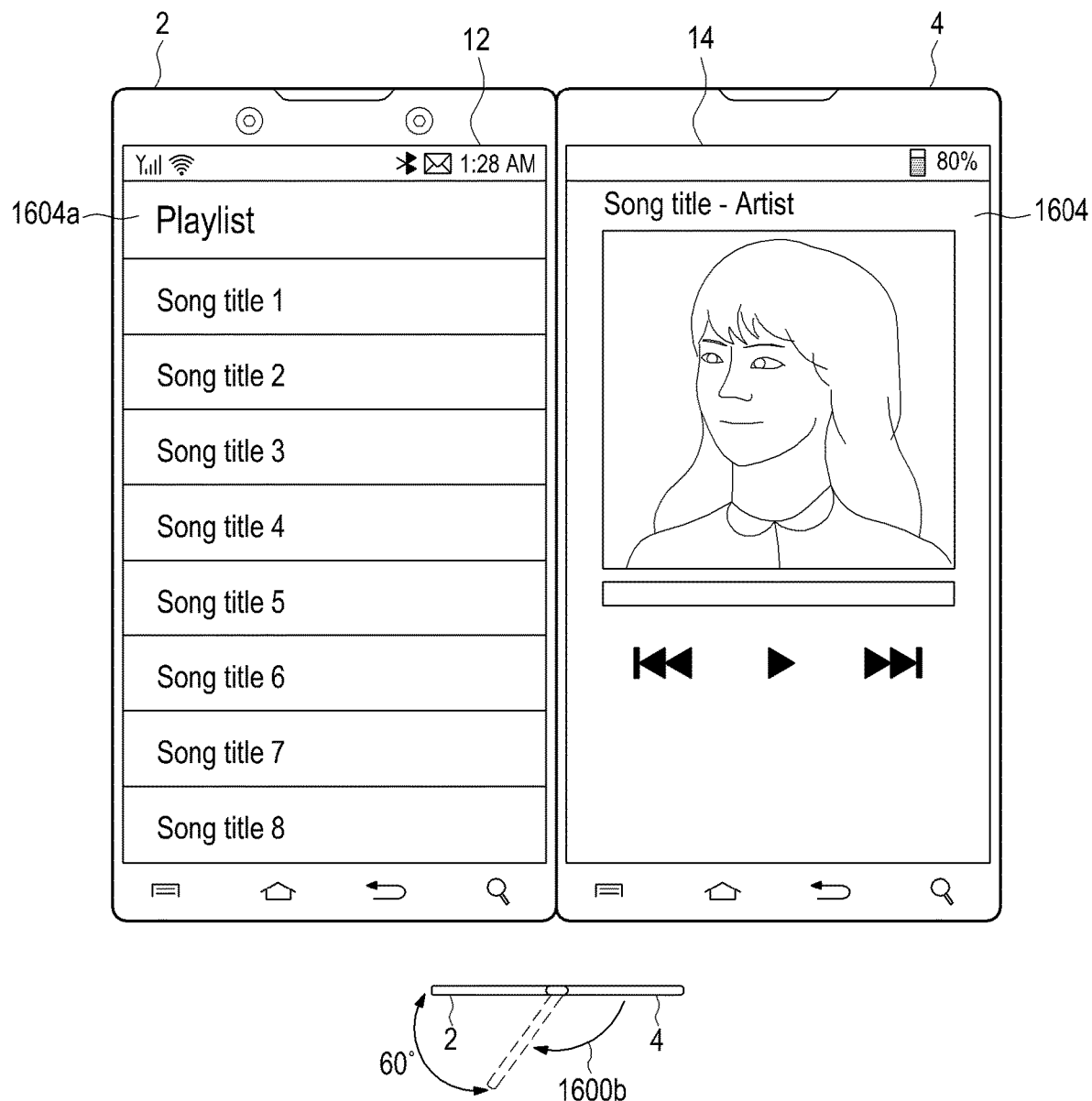
Figure 27E:
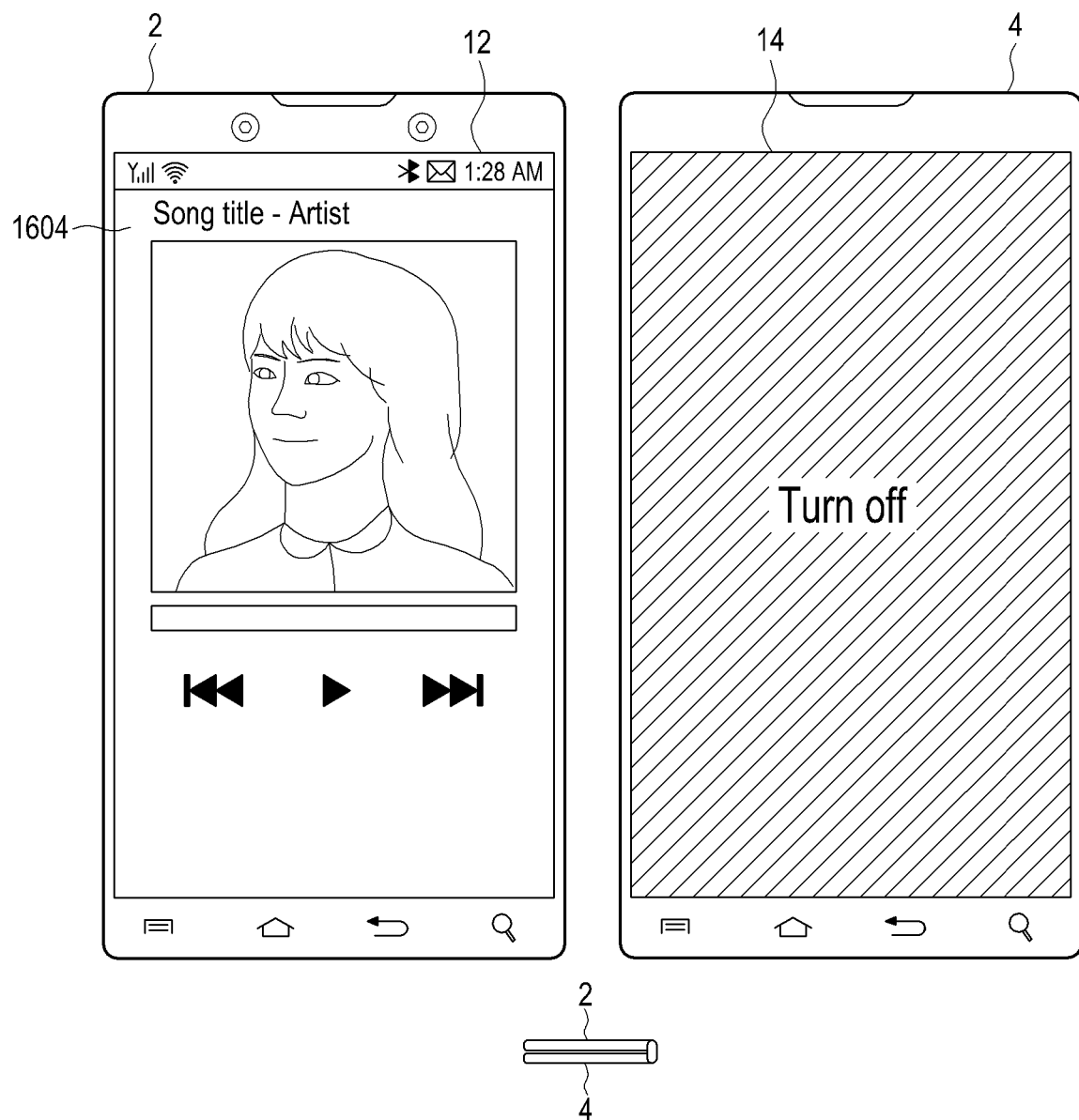
Figure 27F:
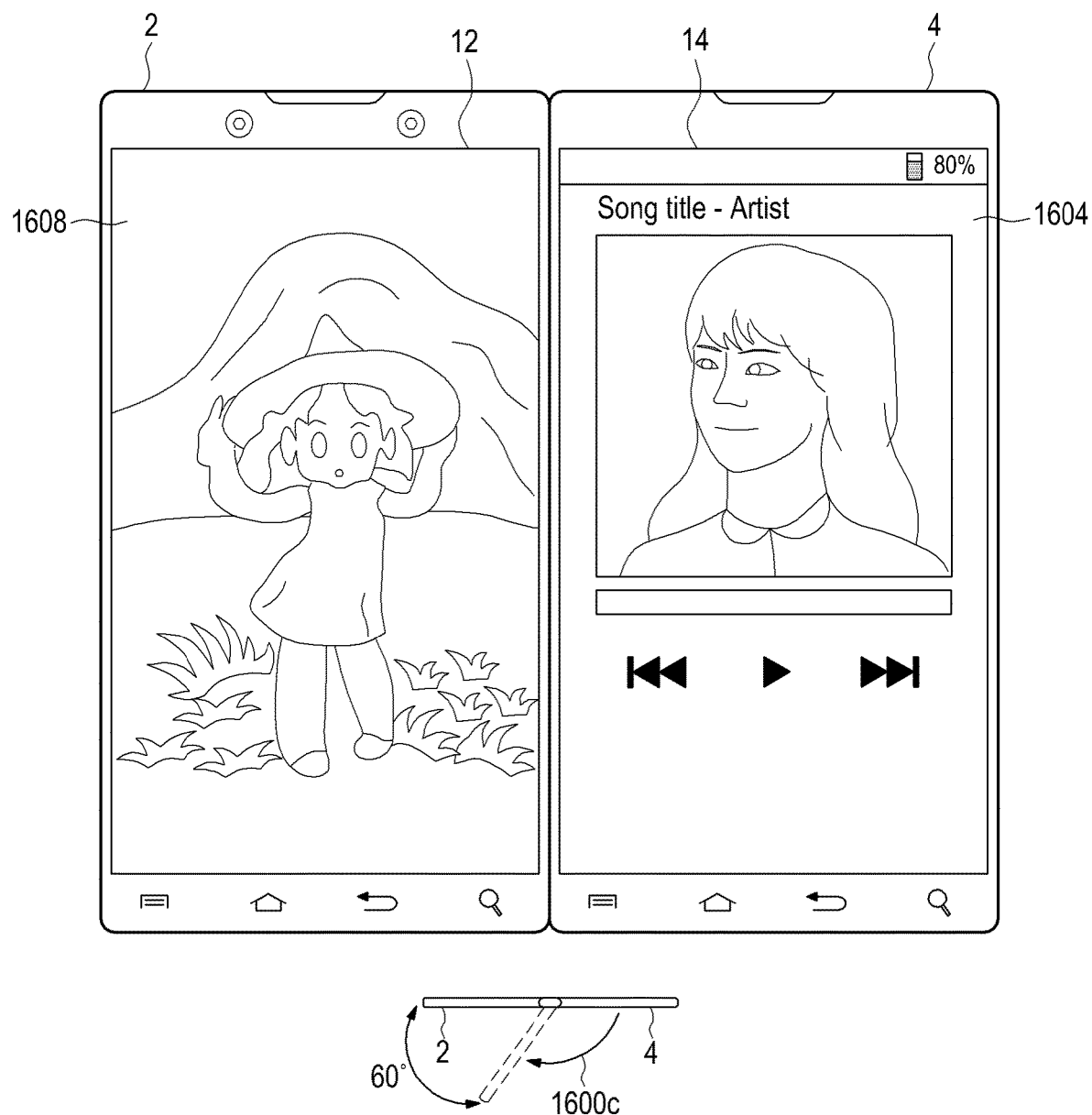
Figure 27G:
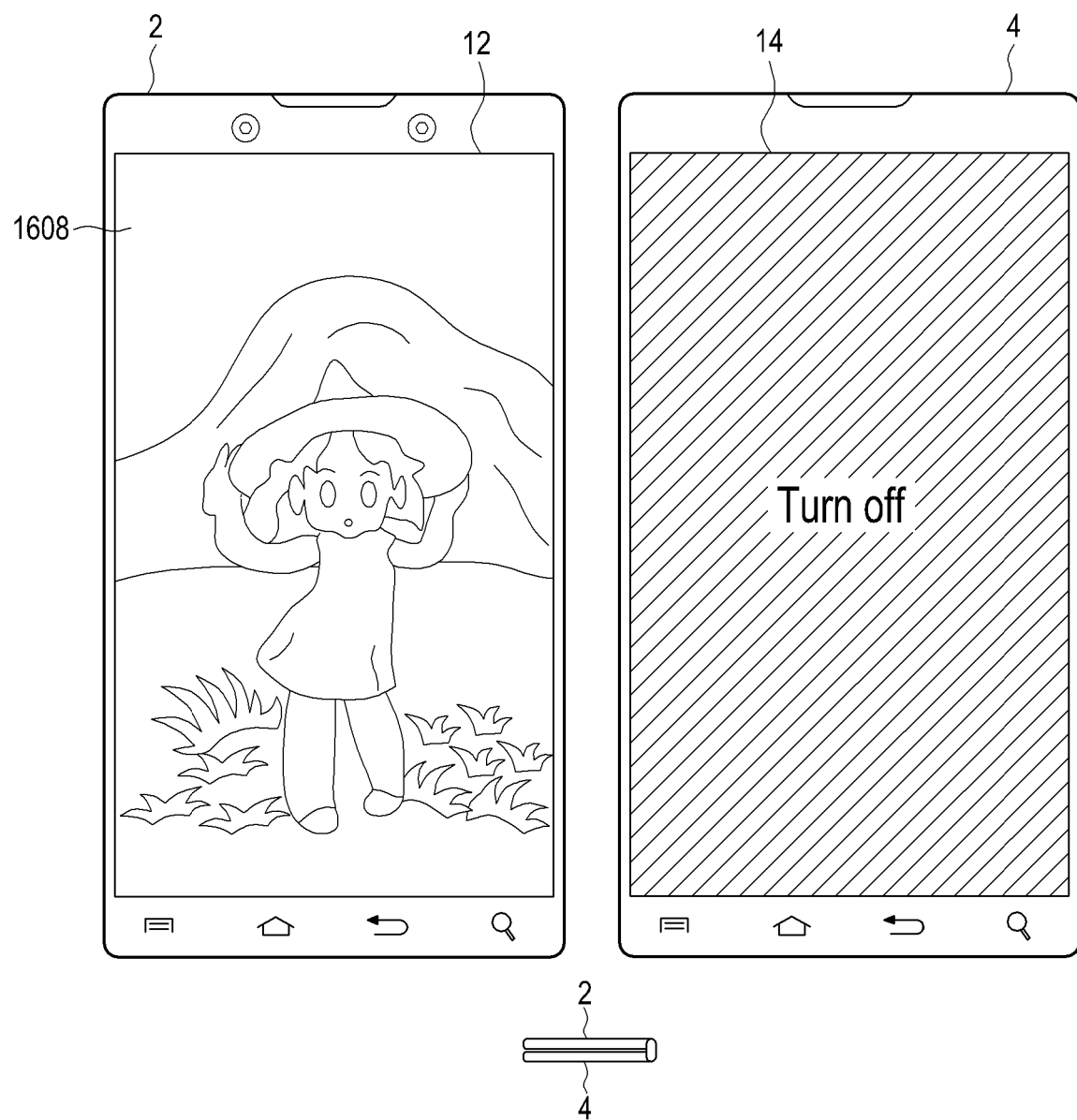
Figure 27H:
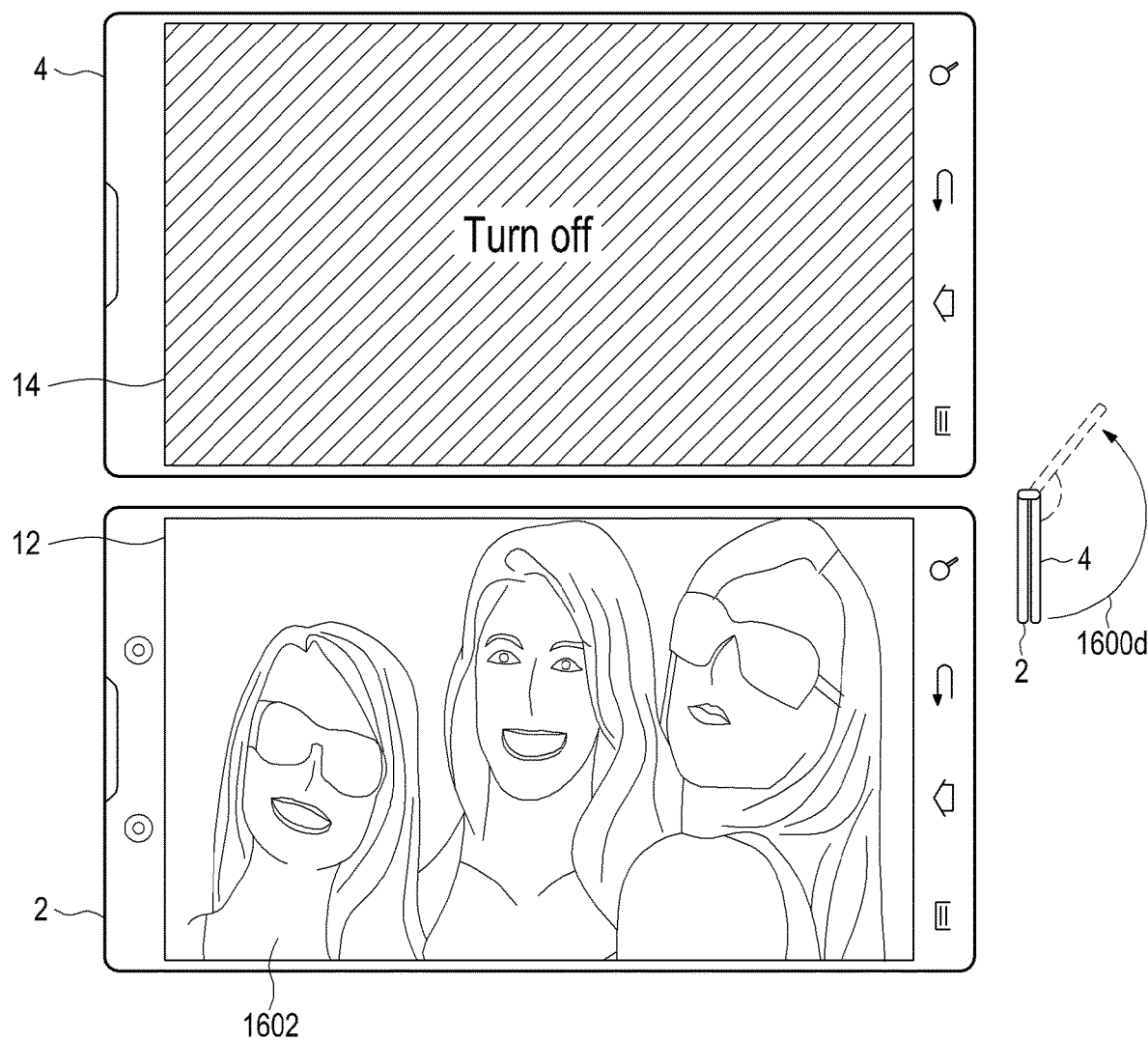
Figure 27I:
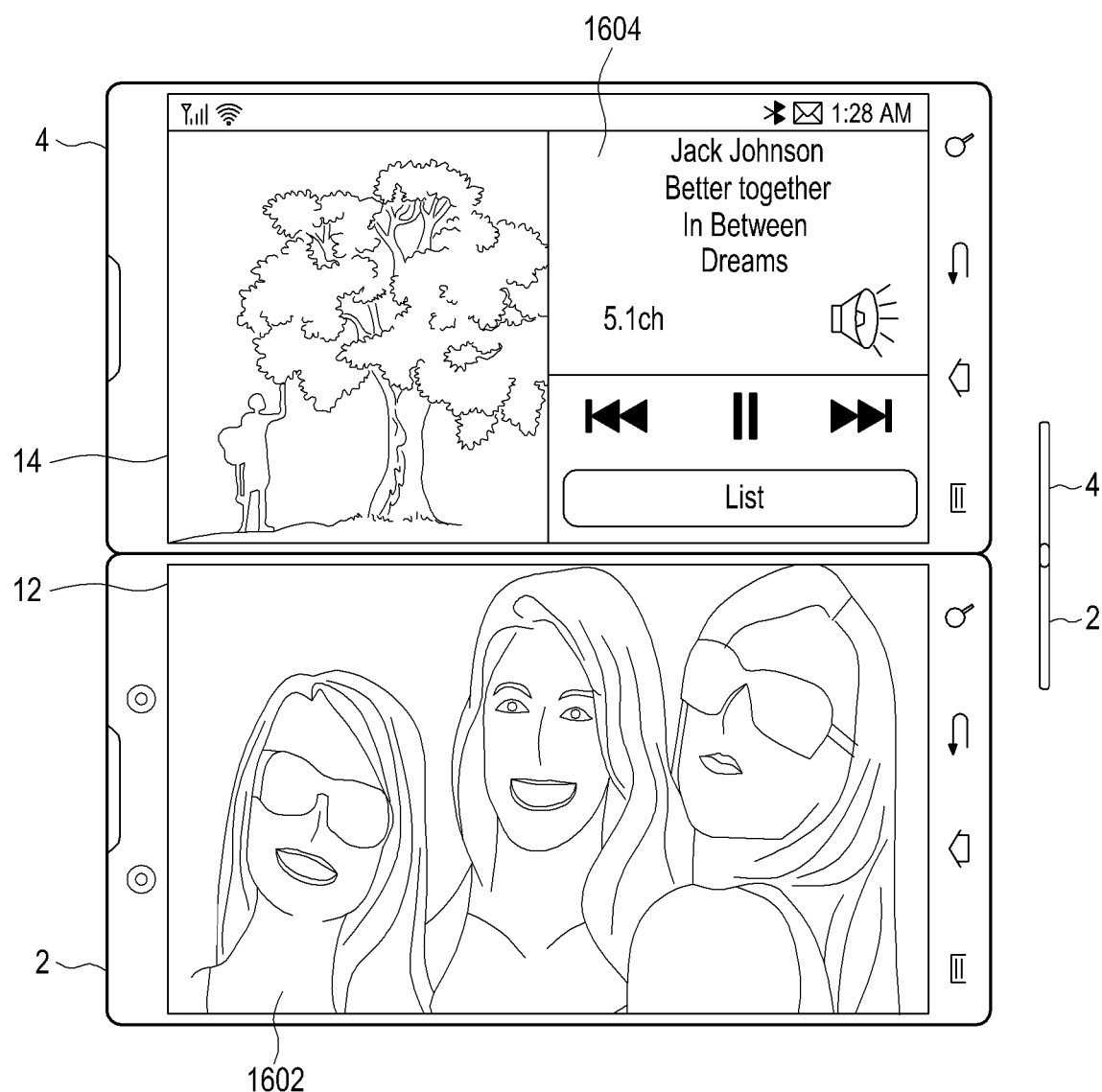
Figure 27J:
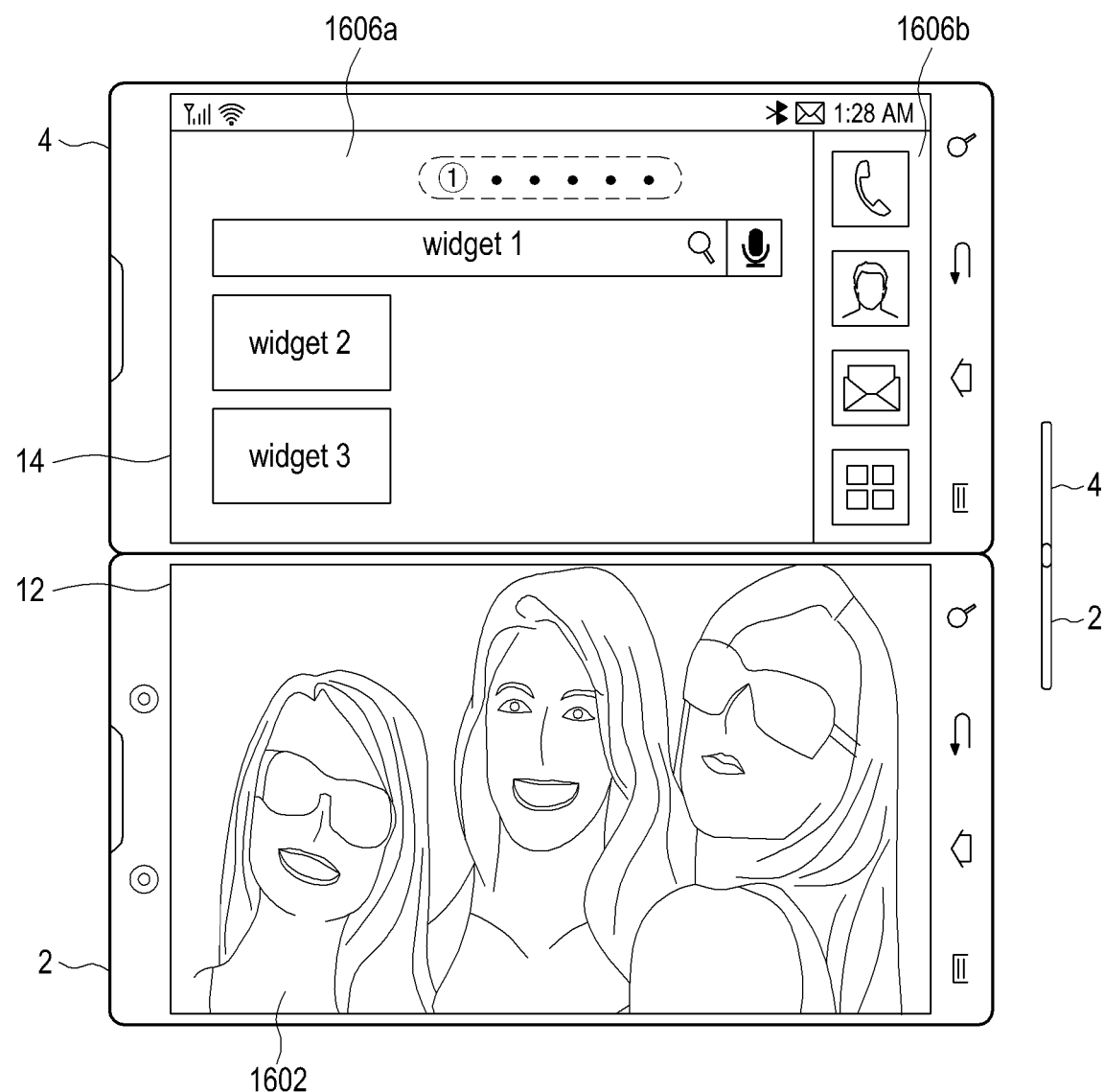
Figure 27K:
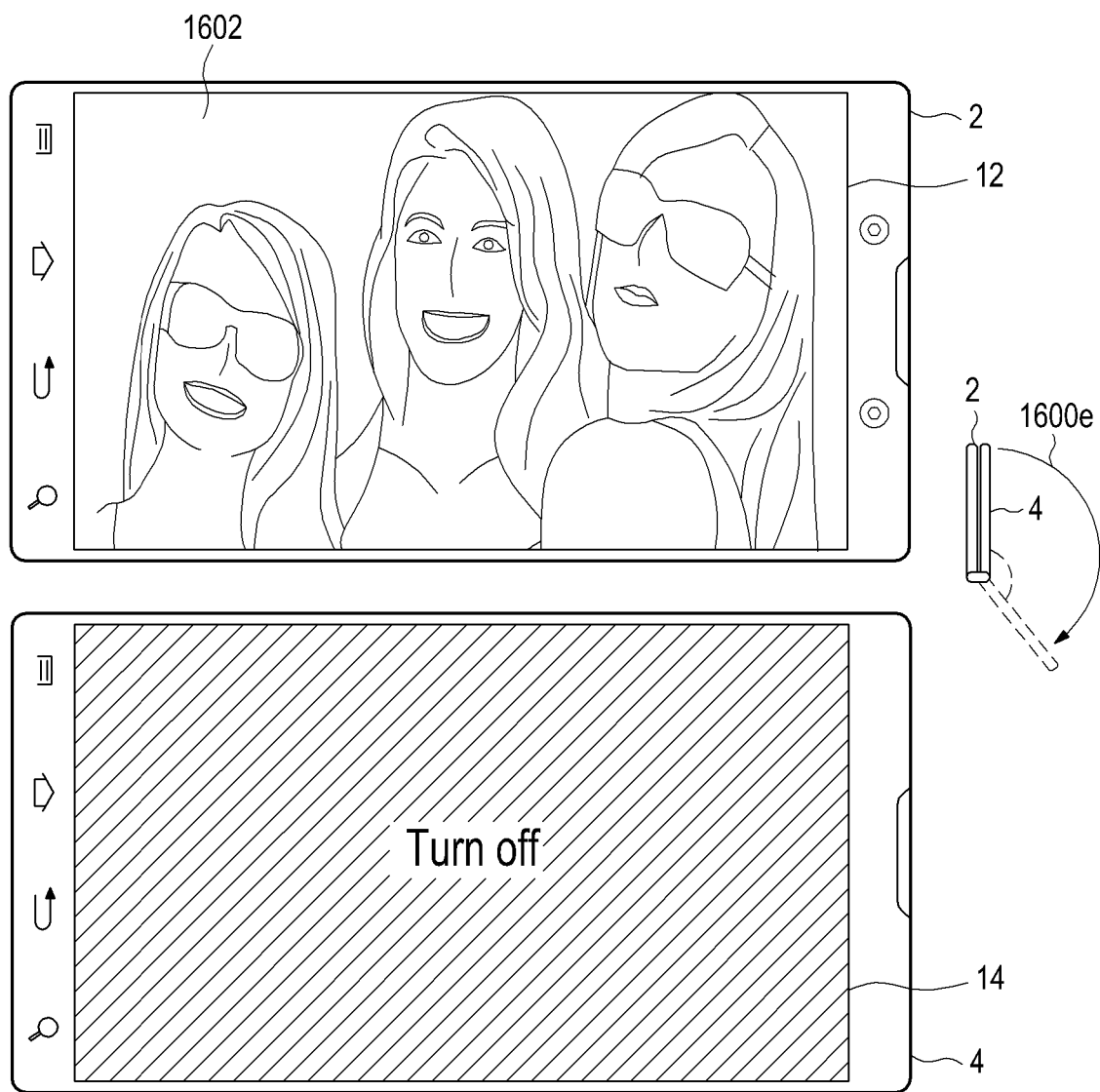
Figure 27L:
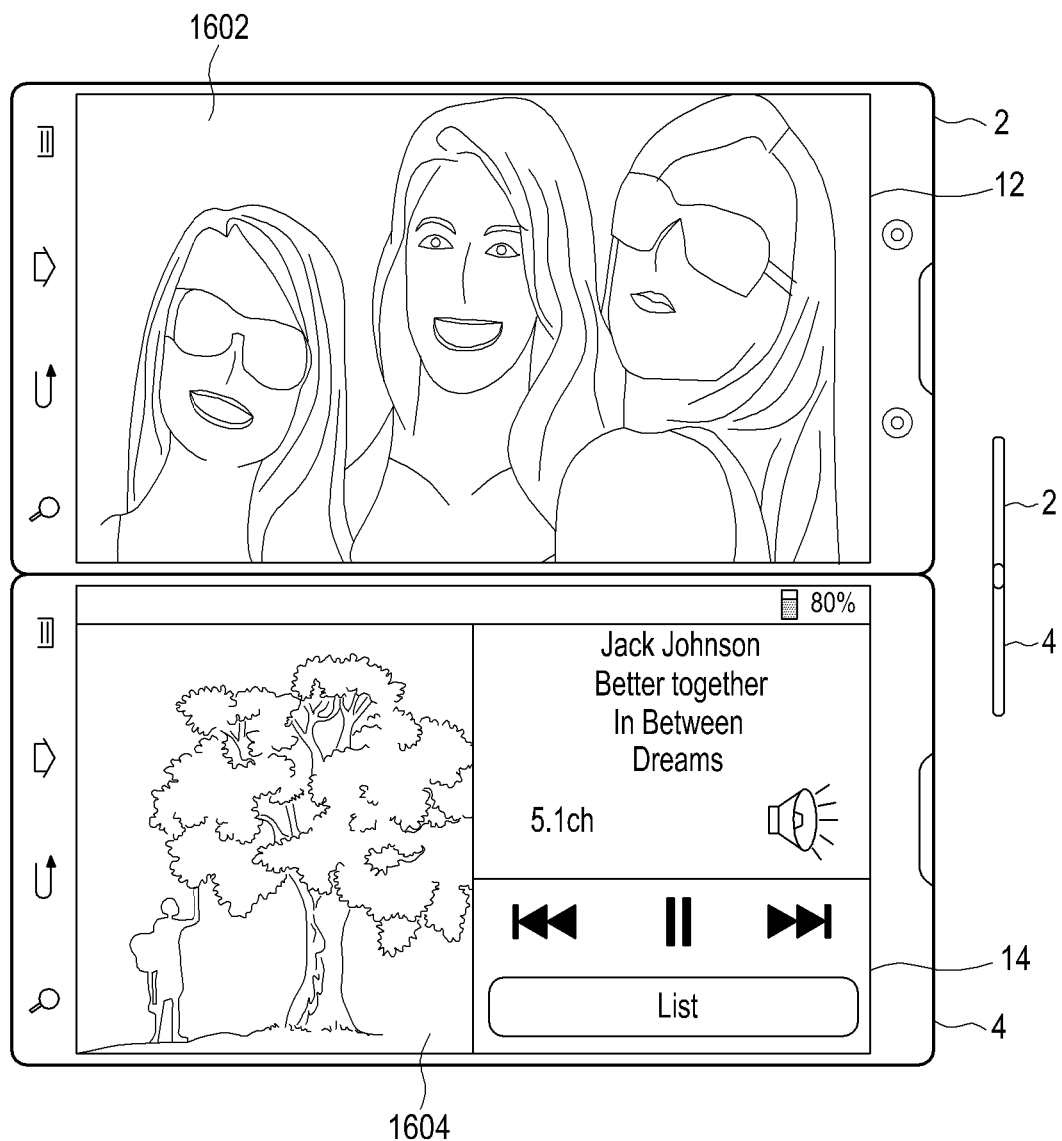
Figure 27M:
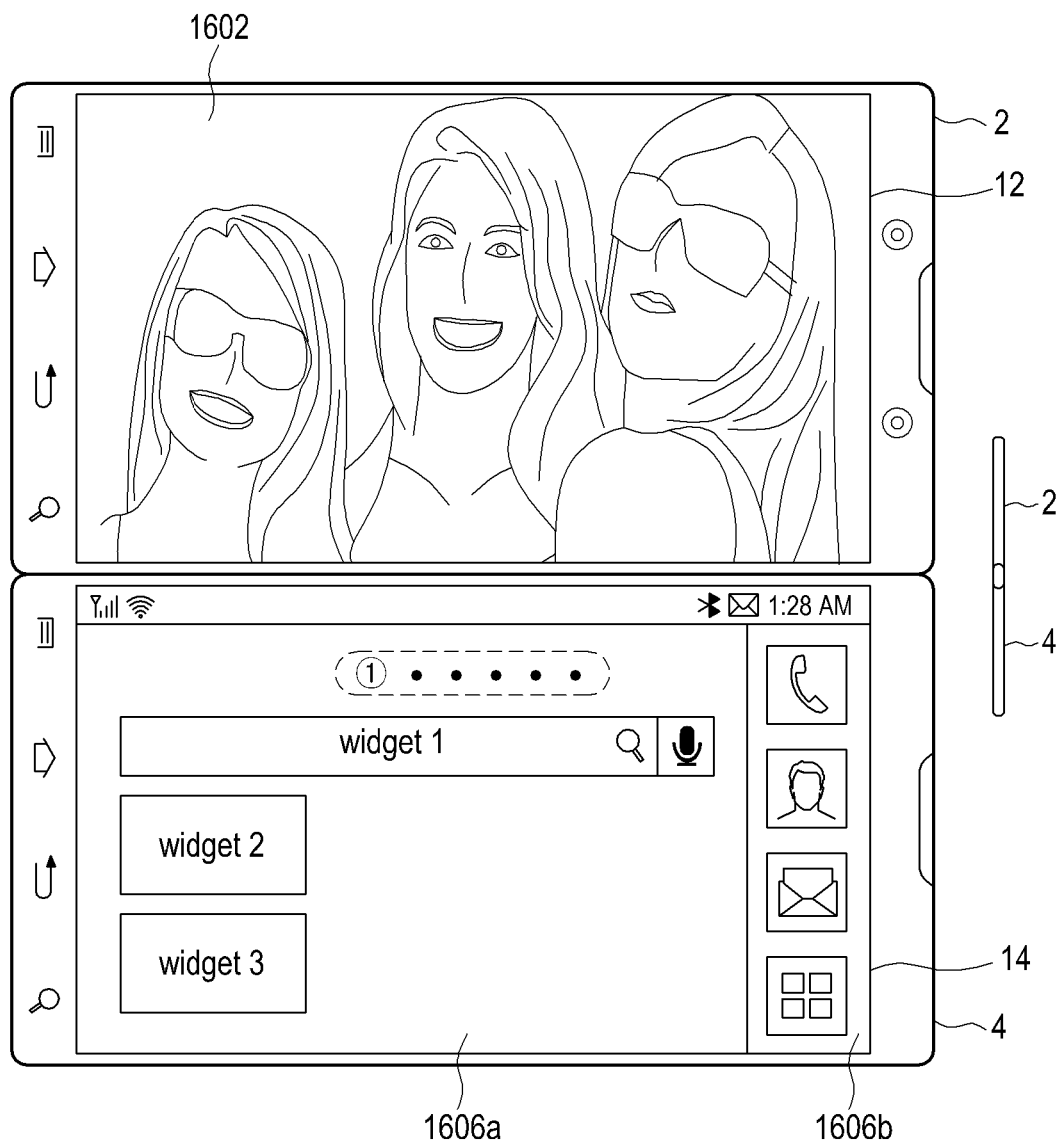
Figure 27N:
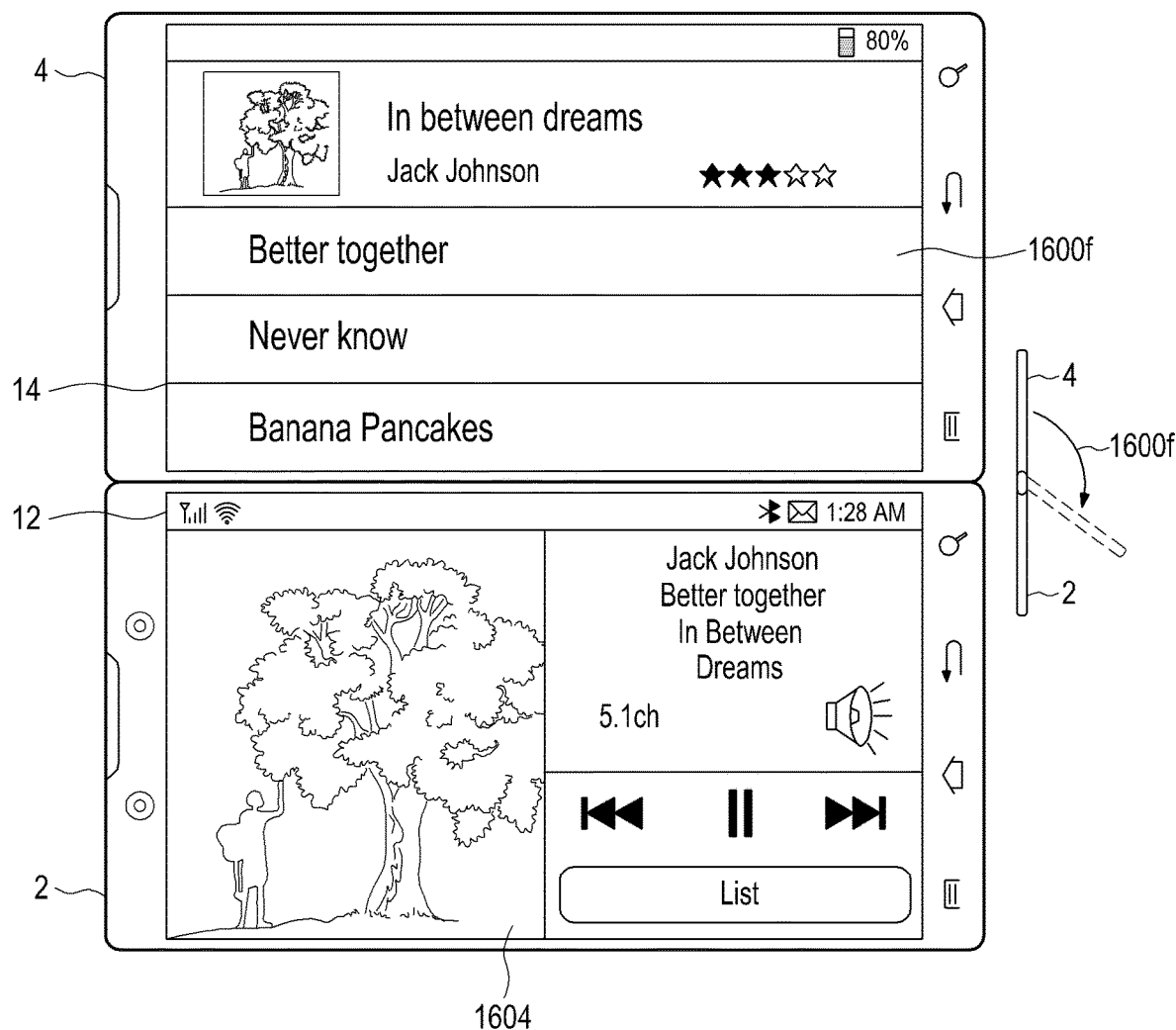
Figure 27O:
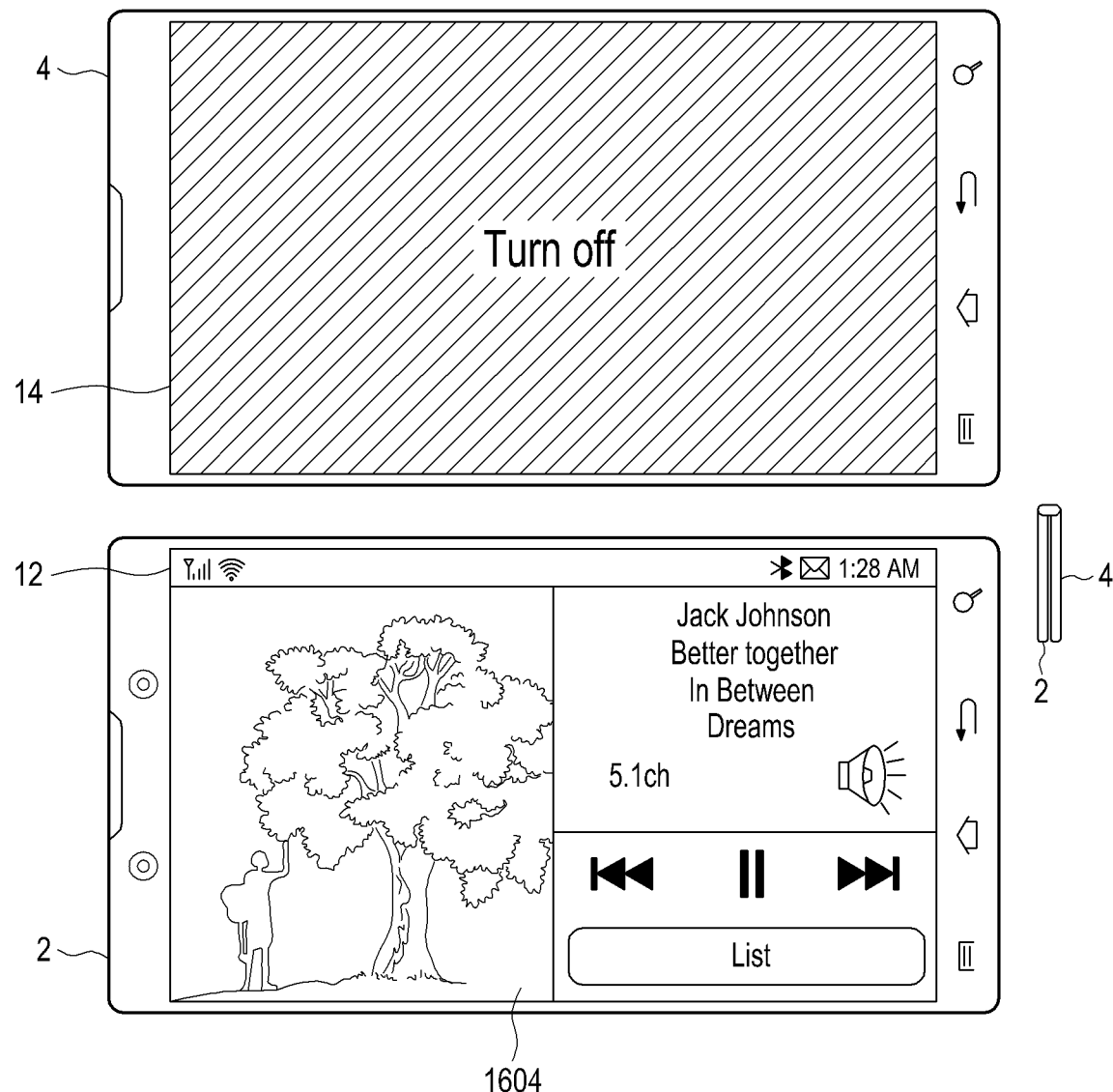
Figure 27P:
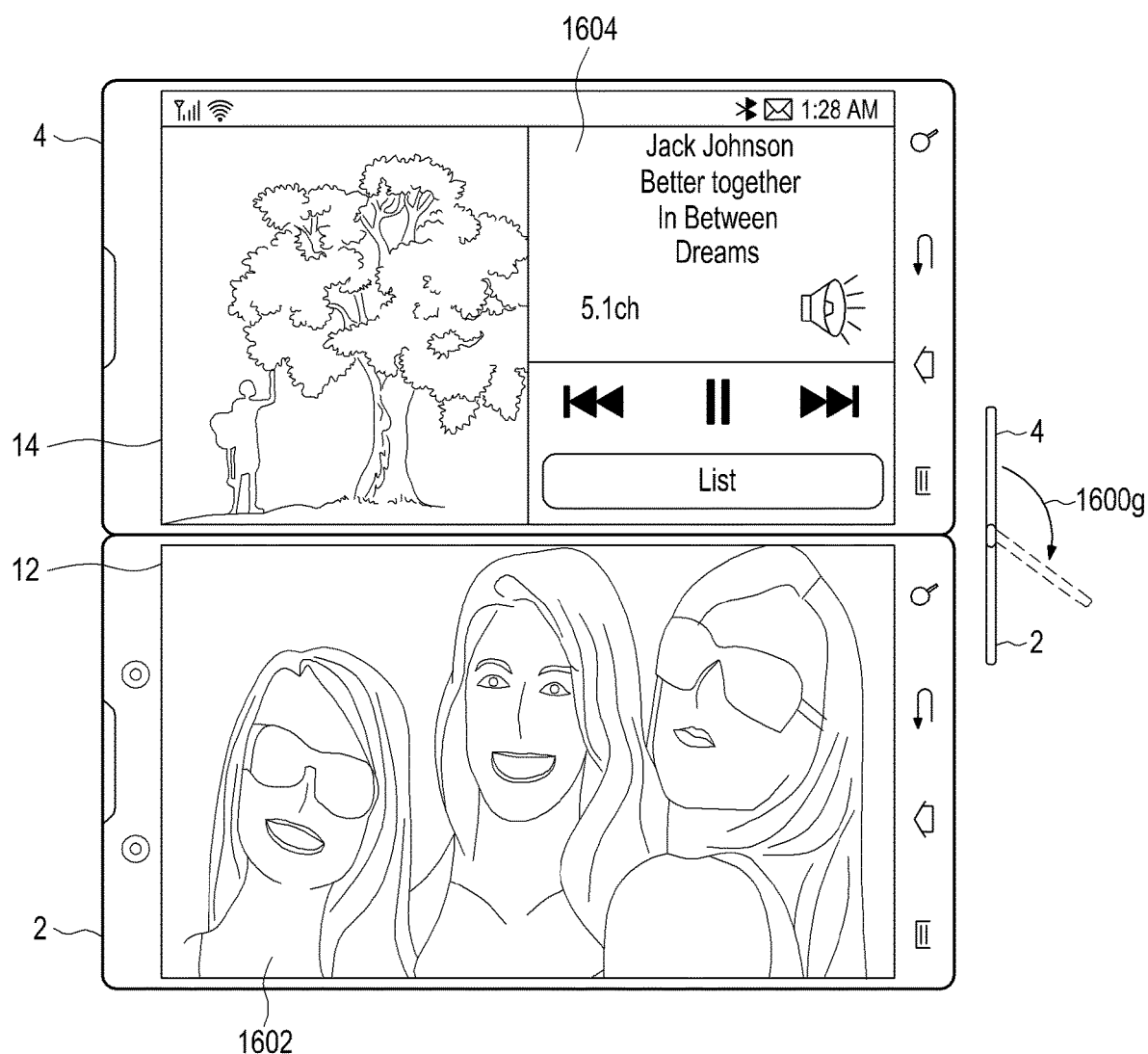
Figure 27Q:
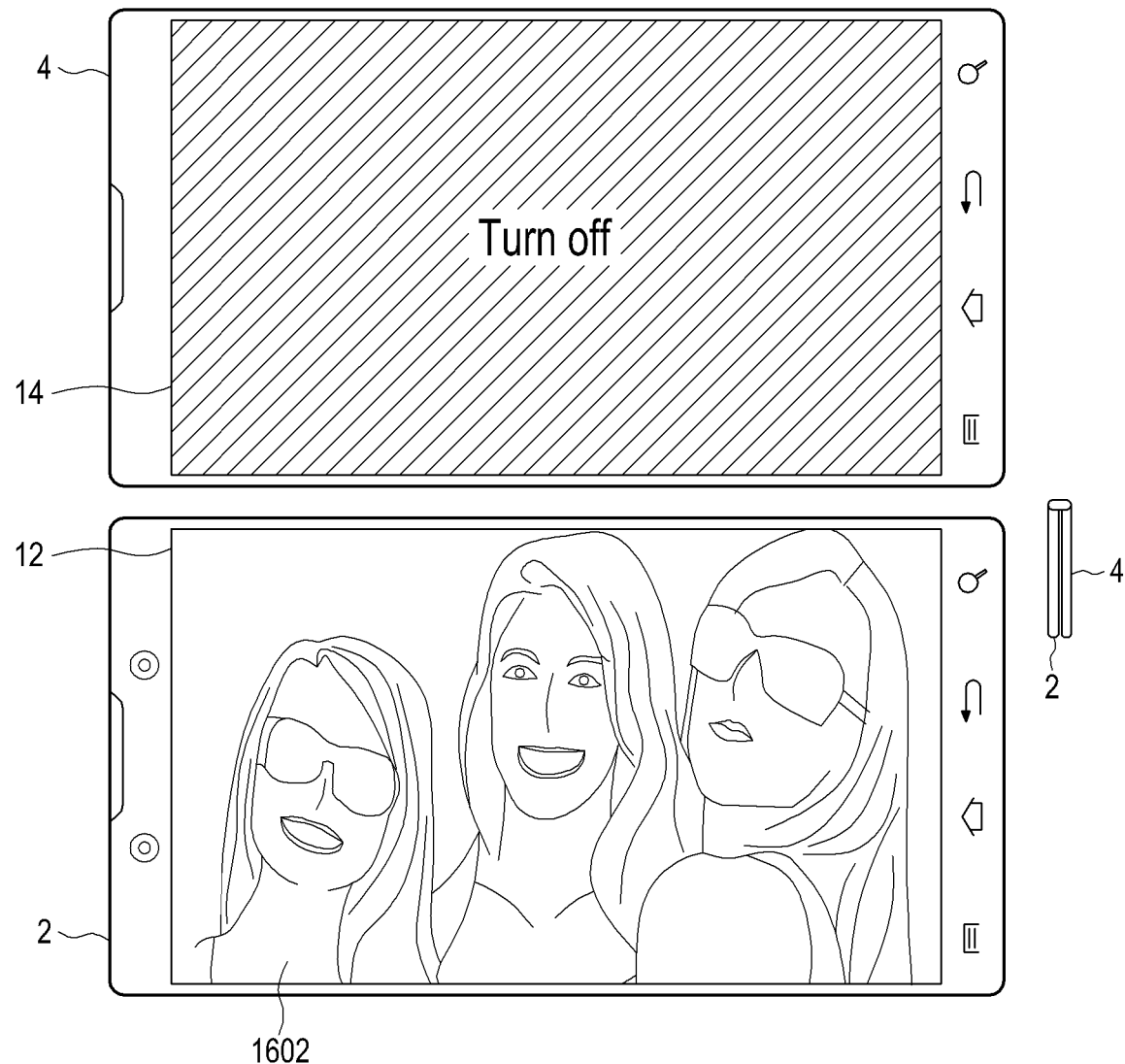

FIGS. 27A to 27Q illustrate examples of changing a view mode according to physical motion of the portable device according to one or more exemplary embodiments.

FIGS. 27A to 27C illustrate a scenario when the folded portable device is unfolded.

Referring to FIG. 27A, the first and second panels 2 and 4 including the first and second touch screens 12 and 14 are in the folded state, that is, a state where a relative angle is 0 degrees, wherein the first touch screen 12 displays a first application, for example, a photo gallery application and the second touch screen 14 is turned off. Only the first touch screen 12 is displayed until the relative angle increases to be a threshold angle, for example, 60 degrees as the first and second panels 2 and 4 are slightly unfolded. When the relative angle reaches 60 degrees as the first and second panels 2 and 4 are further unfolded 1600a, the portable device proceeds to FIG. 27B.

Referring to FIG. 27B, the portable device displays a running second application 1604, for example, a music play application in the second touch screen 14 in response to the unfolding 1600a between the first and second panels 2 and 4. When there is no another running application even though the portable device detects the unfolding 1600a between the first and second panels 2 and 4, the portable device displays a first page 1606a of the home screen and a dock area 1606b in the second touch screen 14 as illustrated in FIG. 27C.

FIGS. 27D to 27E illustrate a scenario when the unfolded portable device is folded.

Referring to FIG. 27D, the first and second panels 2 and 4 including the first and second touch screens 12 and 14 are in the unfolded state, that is, a state where a relative angle is actually 180 degrees, wherein the first touch screen 12 displays a first task screen 1604a of the second application and the second touch screen 14 displays a second task screen 1604 of the second application. Here, the second task screen 1604 is a screen designated to have a final depth of the second application. As one example, the second application is the music play application, the first task screen 1604a is a music list screen, and the second task screen 1604 is a music play screen. When the relative angle decreases to be a threshold angle, for example, an angle smaller than 60 degrees as the first and second panels 2 and 4 are folded 1600b, the portable device proceeds to FIG. 27E.

Referring to FIG. 27E, the portable device turns off the second touch screen 14 and displays the task screen 1604 designated to have the final depth of the running second application in the first touch screen 12 in response to the folding 1600b between the first and second panels 2 and 4. After the relative angle between the first and second panels 2 and 4 becomes smaller than 60 degrees, the first and second touch screens 12 and 14 are maintained until the relative angle reaches 0 degrees.

FIGS. 27F to 27G illustrate another scenario when the unfolded portable device is folded.

Referring to FIG. 27F, the first and second panels 2 and 4 including the first and second touch screens 12 and 14 are in the unfolded state, that is, a state where the relative angle is actually 180 degrees, wherein the first touch screen 12 displays a third application 1608 and the second touch screen 14 displays the second application 1604. For example, the third application 1608 is a game application and the second application 1604 is the music play application. When the relative angle decreases to be a threshold angle, for example, an angle smaller than 60 degrees as the first and second panels 2 and 4 are folded 1600c, the portable device proceeds to FIG. 27G.

Referring to FIG. 27G, the portable device turns off the second touch screen 14 and maintains the running third application 1608 in the first touch screen 12 in response to the folding 1600c between the first and second panels 2 and 4. After the relative angle between the first and second panels 2 and 4 becomes smaller than 60 degrees, the first and second touch screens 12 and 14 are maintained until the relative reaches 0 degrees.

FIGS. 27H and 27I illustrate a scenario when the folded portable device is unfolded in a landscape view mode in which the portable device is rotated by 90 degrees in a left direction.

Referring to FIG. 27H, the first and second panels 2 and 4 including the first and second touch screens 12 and 14 is in the folded state, that is, a state in which the relative angle is 0 degrees. In the landscape view mode, the first touch screen 12 displays the first application 1602, for example, a photo gallery application and the second touch screen 14 is turned off. Only the first touch screen 12 is displayed until the relative angle increases to be a predetermined threshold angle, for example, 60 degrees as the first and second panels 2 and 4 are slightly unfolded. When the relative angle becomes larger than 60 degrees and smaller than 180 degrees as the first and second panels 2 and 4 are further unfolded 1600d, the portable device proceeds to FIG. 27I.

Referring to FIG. 27I, the portable device displays the running second application 1604, for example, the music play application in the second touch screen 14 in response to the unfolding 1600d between the first and second panels 2 and 4. When there is no other running application even though the portable device detects the unfolding 1600d between the first and second panels 2 and 4, the portable device displays a first page 1606a of the home screen and a dock area 1606b in the second touch screen 14 as illustrated in FIG. 27J.

FIGS. 27K to 27M illustrate a scenario when the folded portable device is unfolded in the landscape view mode in which the portable device is rotated by 90 degrees in a right direction.

Referring to FIG. 27K, the first and second panels 2 and 4 including the first and second touch screens 12 and 14 are in the folded state, that is, the state where the relative angle is 0 degrees. In the landscape view mode, the first touch screen 12 displays the first application 1602, for example, the photo gallery application and the second touch screen 14 is turned off. Only the first touch screen 12 is displayed until the relative angle increases to be a threshold angle, for example, 60 degrees as the first and second panels 2 and 4 are slightly unfolded. When the relative angle becomes larger than 60 degrees and smaller than 180 degrees as the first and second panels 2 and 4 are further unfolded 1600e, the portable device proceeds to FIG. 27L.

Referring to FIG. 27L, the portable device displays the running second application 1604, for example, the music play application in the second touch screen 14 in response to the unfolding 1600e between the first and second panels 2 and 4. When there is no other running application even though the portable device detects the unfolding 1600e between the first and second panels 2 and 4, the portable device displays the first page 1606a of the home screen and the dock area 1606b in the second touch screen 14 as illustrated in FIG. 27M.

FIGS. 27N to 27P illustrate a scenario when the unfolded portable device is folded in the landscape view mode.

Referring to FIG. 27N, the first and second panels 2 and 4 including the first and second touch screens 12 and 14 are in the unfolded state, that is, the state where the relative angle is actually 180 degrees, wherein the first touch screen 12 displays the first task screen 1604 of the second application and the second touch screen 14 displays the second task screen 1604a of the second application. Here, the first task screen 1604 is a screen designated to have a final depth of the second application. For example, the second application is the music play application, the first task screen 1604 is the music play screen, and the second task screen 1604a is the music list screen. When the relative angle decreases to be a threshold angle, for example, 60 degrees as the first and second panels 2 and 4 are folded 1600f, the portable device proceeds to FIG. 27O.

Referring to FIG. 27O, the portable device turns off the second touch screen 14 and displays the task screen 1604 designated to have the final depth of the running second application in the first touch screen 12 in response to the folding 1600f between the first and second panels 2 and 4. After the relative angle between the first and second panels 2 and 4 becomes smaller than 60 degrees, the first and second touch screens 12 and 14 are maintained until the relative angle reaches 0 degrees.

FIGS. 27P and 27Q illustrate another scenario when the unfolded portable device is folded in the landscape view mode.

Referring to FIG. 27P, the first and second panels 2 and 4 including the first and second touch screens 12 and 14 are in the unfolded state, that is, the state in which the relative angle is actually 180 degrees, wherein the first touch screen 12 displays the first application 1602 and the second touch screen 14 displays the second application 1604. For example, the first application 1602 is the photo gallery application and the second application 1604 is the music play application. When the relative angle decreases to be a threshold angle, for example, 60 degrees as the first and second panels 2 and 4 are folded 1600g, the portable device proceeds to FIG. 27Q.

Referring to FIG. 27Q, the portable device turns off the second touch screen 14 and maintains the running first application 1602 in the first touch screen 12 in response to the folding 1600g between the first and second panels 2 and 4. After the relative angle between the first and second panels 2 and 4 becomes smaller than 60 degrees, the first and second touch screens 12 and 14 maintain displayed information until the relative angle reaches 0 degrees.

While the detailed description of the present invention has described the concrete embodiments, the embodiments can be modified without departing from the scope of the present invention. Therefore, the scope of the present invention should not be limited to the described embodiments, but should be defined by the appended claims and the equivalents thereof

The invention claimed is:

1. A method of controlling an electronic device comprising a first touch display mounted to a first housing, a second touch display mounted to a second housing, and a hinge connecting the first housing and the second housing, the method comprising:
displaying, on the first touch display, a first page of a home screen of the electronic device among a plurality of pages of the home screen of the electronic device, wherein the first page of the home screen includes an icon for executing a first application of the electronic device, and wherein the first page of the home screen is changed to a first execution screen of the first application when a first user input for selecting the icon is received on the first touch display;
displaying, on the second touch display, a second execution screen of a second application of the electronic device that is being executed by the electronic device;
receiving, on the first touch display while displaying the second execution screen of the second application on the second touch display, a second user input to change from displaying the first page of the home screen of the electronic device on the first touch display to displaying a second page of the home screen of the electronic device among the plurality of pages of the home screen of the electronic device; and
based on receiving the second user input, changing, on the first touch display while displaying the second execution screen of the second application on the second touch display, from displaying the first page of the home screen to displaying the second page of the home screen.

2. The method of claim 1, wherein the first page of the home screen of the electronic device is a current page among the plurality of pages of the home screen of the electronic device and the second page of the home screen is a next page among the plurality of pages of the home screen of the electronic device.

3. The method of claim 1, wherein the first page of the home screen of the electronic device is a current page among the plurality of pages of the home screen of the electronic device and the second page of the home screen is a previous page among the plurality of pages of the home screen of the electronic device.

4. The method of claim 1, wherein each of the first page of the home screen of the electronic device and the second page of the home screen of the electronic device comprises a dock area displayed in a predetermined position of the first touch display and the second touch display.

5. The method of claim 4, wherein the dock area comprises a plurality of docked icons corresponding to docked applications among the applications of the electronic device that are docked to the dock area.

6. The method of claim 5, wherein the predetermined position comprises a bottom area of the first touch display and the second touch display.

7. The method of claim 5, wherein the second user input comprises a touch and drag input, a flick input, or a swipe input.

8. The method of claim 7, wherein the second user input is in a first direction from the first touch display to the second touch display or in a second direction from the second touch display to the first touch display.

9. The method of claim 1, wherein each page of the plurality of pages includes a background image, and
wherein the background image comprises a common background image that is displayed on each page of the plurality of pages.

10. The method of claim 1, wherein each page of the plurality of pages includes a background image, and
wherein the background image comprises a plurality of background images, the plurality of background images comprising a first background image displayed on the first page and a second background image displayed on the second page.

11. The method of claim 1, wherein each page of the plurality of pages includes a background image, and
wherein the background image comprises a common background image that is displayed across the plurality of pages.

12. The method of claim 1, wherein the home screen comprises a screen of an operating system of the electronic device.

13. The method of claim 1, further comprising:
booting the electronic device; and
displaying, on the first touch display, the first page of the home screen based on booting the electronic device.

14. An electronic device comprising:
a first housing;
a first touch display mounted on the first housing;
a second housing;
a second touch display mounted on the first housing; and
a hinge connecting the first housing and the second housing; and
at least one processor that is configured to control to:
display, on the first touch display, a first page of a home screen of the electronic device among a plurality of pages of the home screen of the electronic device, wherein the first page of the home screen includes an icon for executing a first application of the electronic device, and wherein the first page of the home screen is changed to a first execution screen of the first application when a first user input for selecting the icon is received on the first touch display;
display, on the second touch display, a second execution screen of a second application of the electronic device that is being executed by the electronic device;
receive, on the first touch display while displaying the second execution screen of the application on the second touch display, a second user input to change from displaying the first page of the home screen of the electronic device on the first touch display to displaying a second page of the home screen of the electronic device among the plurality of pages of the home screen of the electronic device,
change, on the first touch display while displaying the second execution screen of the second application on the second touch display, from displaying the first page of the home screen to displaying the second page of the home screen in response to receiving the second user input.

15. The electronic device of claim 14, wherein the first page of the home screen of the electronic device is a current page among the plurality of pages of the home screen of the electronic device and the second page of the home screen is a next page among the plurality of pages of the home screen of the electronic device.

16. The electronic device of claim 14, wherein the first page of the home screen of the electronic device is a current page among the plurality of pages of the home screen of the electronic device and the second page of the home screen is a previous page among the plurality of pages of the home screen of the electronic device.

17. The electronic device of claim 14, wherein each of the first page of the home screen of the electronic device and the second page of the home screen of the electronic device comprises a dock area displayed in a predetermined position of the first touch display and the second display.

18. The electronic device of claim 17, wherein the dock area comprises a plurality of docked icons corresponding to docked applications among the applications of the electronic device that are docked to the dock area.

19. The electronic device of claim 18, wherein the predetermined position comprises a bottom area of the first touch display and the second touch display.

20. The electronic device of claim 18, wherein the second user input comprises a touch and drag input, a flick input, or a swipe input.

21. The electronic device of claim 18, wherein the second user input is in a first direction from the first touch display to the second touch display or in a second direction from the second touch display to the first touch display.

22. The electronic device of claim 14, wherein each page of the plurality of pages includes a background image, and
wherein the background image comprises a common background image that is displayed on each page of the plurality of pages.

23. The electronic device of claim 14, wherein each page of the plurality of pages includes a background image, and
wherein the background image comprises a plurality of background images, the plurality of background images comprising a first background image displayed on the first page and a second background image displayed on the second page.

24. The electronic device of claim 14, wherein each page of the plurality of pages includes a background image, and
wherein the background image comprises a common background image that is displayed across the plurality of pages.

25. The electronic device of claim 14, wherein the home screen comprises a screen of an operating system of the electronic device.

26. The electronic device of claim 14, wherein the at least one processor is further configured to control to:
boot the electronic device; and
display, on the first touch display, the first page of the home screen based on booting the electronic device.

27. A non-transitory computer-readable medium storing instructions for controlling an electronic device comprising one or more processors, a first touch display mounted to a first housing, a second touch display mounted to a second housing, and a hinge connecting the first housing and the second housing, the instructions, when executed by the one or more processors, controlling the electronic device to:
display, on the first touch display, a first page of a home screen of the electronic device among a plurality of pages of the home screen of the electronic device, wherein the first page of the home screen includes an icon for executing a first application of the electronic device, and wherein the first page of the home screen is changed to a first execution screen of the first application when a first user input for selecting the icon is received on the first touch display;
display, on the second touch display, a second execution screen of a second application of the electronic device that is being executed by the electronic device;
receive, on the first touch display while displaying the second execution screen of the second application on the second touch display, a second user input to change from displaying the first page of the home screen of the electronic device on the first touch display to displaying a second page of the home screen of the electronic device among the plurality of pages of the home screen of the electronic device; and
change, on the first touch display while displaying the second execution screen of the second application on the second touch display, from displayng the first page of the home screen to displaying the second page of the home screen in response to receiving the second user input.

28. The non-transitory computer-readable medium of claim 27, wherein each page of the plurality of pages includes a background image, and
wherein the background image comprises a common background image that is displayed on each page of the plurality of pages.

29. The non-transitory computer-readable medium of claim 27, wherein each page of the plurality of pages includes a background image, and
wherein the background image comprises a plurality of background images, the plurality of background images comprising a first background image displayed on the first page and a second background image displayed on the second page.

30. The non-transitory computer-readable medium of claim 27, wherein each page of the plurality of pages includes a background image, and
wherein the background image comprises a common background image that is displayed across the plurality of pages.

31. The non-transitory computer-readable medium of claim 27, wherein the home screen comprises a screen of an operating system of the electronic device.

32. The non-transitory computer-readable medium of claim 27, wherein the instructions, when executed by the one or more processors, further controlling the electronic device to:
boot the electronic device; and
display, on the first touch display, the first page of the home screen based on booting the electronic device.

* * * * *